United States Patent
Kondo et al.

(10) Patent No.: US 7,512,285 B2
(45) Date of Patent: Mar. 31, 2009

(54) SIGNAL PROCESSING DEVICE AND SIGNAL PROCESSING METHOD, AND PROGRAM AND RECORDING MEDIUM

(75) Inventors: Tetsujiro Kondo, Tokyo (JP); Tetsushi Kokubo, Kanagawa (JP); Kazushi Yoshikawa, Kanagawa (JP); Hisakazu Shiraki, Kanagawa (JP); Michimasa Obana, Tokyo (JP); Hideo Kasama, Kanagawa (JP); Masanori Kanemaru, Kanagawa (JP)

(73) Assignee: Sony Corporation, Tokyo (JP)

( * ) Notice: Subject to any disclaimer, the term of this patent is extended or adjusted under 35 U.S.C. 154(b) by 14 days.

(21) Appl. No.: 11/626,556

(22) Filed: Jan. 24, 2007

(65) Prior Publication Data

US 2007/0116372 A1    May 24, 2007

Related U.S. Application Data

(63) Continuation of application No. 10/562,176, filed as application No. PCT/JP2004/008691 on Jun. 15, 2004.

(30) Foreign Application Priority Data

Jun. 27, 2003  (JP) .............................. 2003-184015

(51) Int. Cl.
G06K 9/40      (2006.01)
H04N 5/228     (2006.01)
(52) U.S. Cl. .................. 382/266; 382/255; 348/208.6
(58) Field of Classification Search .............. 382/255, 382/199, 266; 348/208.99, 208.6, 208.4, 348/208.12, 208.13
See application file for complete search history.

(56) References Cited

U.S. PATENT DOCUMENTS

| | | | | |
|---|---|---|---|---|
| 5,030,984 A | * | 7/1991 | Buckler et al. | 396/153 |
| 5,537,226 A | | 7/1996 | Wolberg et al. | |
| 5,689,737 A | * | 11/1997 | Kanbara | 396/52 |
| 5,729,290 A | * | 3/1998 | Tokumitsu et al. | 348/349 |
| 5,881,170 A | * | 3/1999 | Araki et al. | 382/199 |
| 5,892,602 A | * | 4/1999 | Sirat | 359/30 |
| 5,943,090 A | * | 8/1999 | Eiberger et al. | 348/97 |
| 6,381,285 B1 | * | 4/2002 | Borer | 375/260 |
| 6,678,405 B1 | | 1/2004 | Kondo et al. | |

(Continued)

FOREIGN PATENT DOCUMENTS

EP       1061473 A1 * 12/2000

(Continued)

OTHER PUBLICATIONS

U.S. Appl. No. 10/556,842, filed Nov. 16, 2005, Kondo et al.

(Continued)

*Primary Examiner*—Matthew C Bella
*Assistant Examiner*—Michael A Newman
(74) *Attorney, Agent, or Firm*—Oblon, Spivak, McClelland, Maier & Neustadt, P.C.

(57) ABSTRACT

A signal processing device, signal processing method, and program and recording medium which provide images and the like closer approximating real world signals. The signal processing device includes a processing region setting unit, a movement vector setting unit, a model generator, a normal equation generator, an activity detector, a weighting change unit, and a real world estimating unit.

3 Claims, 151 Drawing Sheets

U.S. PATENT DOCUMENTS

| | | |
|---|---|---|
| 6,683,677 B2 * | 1/2004 | Chon et al. .................... 356/28 |
| 6,801,248 B1 * | 10/2004 | Horiuchi ................ 348/208.13 |
| 2002/0051584 A1 | 5/2002 | Shimizu et al. |
| 2004/0052415 A1 | 3/2004 | Kondo et el. |
| 2007/0098289 A1 * | 5/2007 | Kondo et al. ................ 382/254 |
| 2007/0115386 A1 * | 5/2007 | Wakabayashi .............. 348/362 |

FOREIGN PATENT DOCUMENTS

| | | |
|---|---|---|
| JP | 8-237476 | 9/1996 |
| JP | 10-200753 | 7/1998 |
| JP | 2000-201283 | 7/2000 |
| JP | 2001-84368 | 3/2001 |
| JP | 2002-112025 | 4/2002 |
| JP | 2003-16456 | 1/2003 |
| JP | 2003-18578 | 1/2003 |

OTHER PUBLICATIONS

U.S. Appl. No. 10/557,112, filed Nov. 16, 2005, Kondo et al.
U.S. Appl. No. 11/626,439, filed Jan. 24, 2007, Kondo et al.
U.S. Appl. No. 11/626,556, filed Jan. 24, 2007, Kondo et al.
U.S. Appl. No. 11/627,116, filed Jan. 25, 2007, Kondo et al.
U.S. Appl. No. 11/627,145, filed Jan. 25, 2007, Kondo et al.
U.S. Appl. No. 11/627,163, filed Jan. 25, 2007, Kondo et al.

* cited by examiner

SIGNAL PROCESSING DEVICE AND SIGNAL PROCESSING METHOD, AND PROGRAM AND RECORDING MEDIUM

CROSS REFERENCE TO RELATED APPLICATIONS

This application is a continuation of U.S. application Ser. No. 10/562,176, filed on Dec. 23, 2005, and is based upon and claims the benefit of priority to International Application No. PCT/JP04/08691, filed on Jun. 15, 2004 and from the prior Japanese Patent Application No. 2003-184015 filed on Jun. 27, 2003. The entire contents of each of these documents are incorporated herein by reference.

TECHNICAL FIELD

The present invention relates to a signal processing device and signal processing method, and a program and recording medium, and in particular relates to a signal processing device and signal processing method, and a program and recording medium, enabling images and the like with closer approximation to real world signals.

BACKGROUND ART

Technology for detecting phenomena in the actual world (real world) with sensors and processing sampling data output from the sensors is widely used. For example, image processing technology wherein the actual world is imaged with an imaging sensor and sampling data which is the image data is processed, is widely employed.

Also, arrangements are known having second dimensions with fewer dimensions than first dimensions obtained by detecting with sensors first signals, which are signals of the real world having first dimensions, obtaining second signals including distortion as to the first signals, and performing signal processing based on the second signals, thereby generating third signals with alleviated distortion as compared to the second signals (e.g., Japanese Unexamined Patent Application Publication No. 2001-250119).

However, conventionally, signal processing taking into consideration the continuity of real world signals had not been performed, so obtaining images and the like which closer approximate real world signals has been difficult.

DISCLOSURE OF INVENTION

The present invention has been made in light of the situation as described above, and provides for obtaining of images and the like which closer approximate real world signals.

A signal processing device according to the present invention comprises: processing region setting means for setting the processing region within data, wherein light signals of the real world have been projected on a plurality of pixels each having time integration effects and a part of the continuity of the real world light signals has been lost; movement vector setting means for setting movement vectors of an object within the image data corresponding to the continuity of the real world light signals of which a part of the continuity has been lost in the image data; model generating means for modeling the region between pixel values of each of the pixels within the processing region and pixel values of each of the pixels where there is no movement blurring, with the understanding that the pixel values of each of the pixels within the processing region are values obtained by pixel values of each of the pixels without movement blurring as to the object being integrated while moving corresponding to a movement vector; normal equation generating means for generating normal equations from a first equation wherein the pixel values of the pixels within the processing region have been substituted into a model generated by the model generating means, and a second equation for constraining the relation between the pixels where there is no movement blurring; and actual world estimating means for estimating the pixel values of each of the pixels where there is no movement blurring, by computing the normal equations generated from the normal equation generating means.

The normal equation generating means allow a normal equation to be generated from a first equation wherein the pixel values of each of the pixels within the processing region are substituted as to the model generated by the model generating means, and a second equation wherein the difference of the pixel value between each of the pixels not generating movement blurring is zero.

A signal processing method according to the present invention comprises: a processing region setting step for setting the processing region within data, wherein light signals of the real world have been projected on a plurality of pixels each having time integration effects and a part of the continuity of the real world light signals has been lost; a movement vector setting step for setting movement vectors of an object within the image data corresponding to the continuity of the real world light signals of which a part of the continuity has been lost in the image data; a model generating step for modeling the region between pixel values of each of the pixels within the processing region and pixel values of each of the pixels where there is no movement blurring, with the understanding that the pixel values of each of the pixels within the processing region are values obtained by pixel values of each of the pixels without movement blurring as to the object being integrated while moving corresponding to a movement vector; a normal equation generating step for generating normal equations from a first equation wherein the pixel values of the pixels within the processing region have been substituted into a model generated in the model generating step, and a second equation for constraining the relation between the pixels where there is no movement blurring; and an actual world estimating step for estimating the pixel values of each of the pixels where there is no movement blurring, by computing the normal equations generated from the normal equation generating step.

A program for a recording medium according to the present invention causes a computer to execute: a processing region setting step for setting the processing region within data, wherein light signals of the real world have been projected on a plurality of pixels each having time integration effects and a part of the continuity of the real world light signals has been lost; a movement vector setting step for setting movement vectors of an object within the image data corresponding to the continuity of the real world light signals of which a part of the continuity has been lost in the image data; a model generating step for modeling the region between pixel values of each of the pixels within the processing region and pixel values of each of the pixels where there is no movement blurring, with the understanding that the pixel values of each of the pixels within the processing region are values obtained by pixel values of each of the pixels without movement blurring as to the object being integrated while moving corresponding to a movement vector; a normal equation generating step for generating normal equations from a first equation wherein the pixel values of the pixels within the processing region have been substituted into a model generated in the model generating step, and a second equation for constraining the relation between the pixels where there is no movement blurring; and an actual world estimating step for estimating the pixel values of each of the pixels where there is no movement blurring, by computing the normal equations generated from the normal equation generating step.

A program according to the present invention causes a computer to execute: a processing region setting step for setting the processing region within data, wherein light signals of the real world have been projected on a plurality of pixels each having time integration effects and a part of the continuity of the real world light signals has been lost; a movement vector setting step for setting movement vectors of an object within the image data corresponding to the continuity of the real world light signals of which a part of the continuity has been lost in the image data; a model generating step for modeling the region between pixel values of each of the pixels within the processing region and pixel values of each of the pixels where there is no movement blurring, with the understanding that the pixel values of each of the pixels within the processing region are values obtained by pixel values of each of the pixels without movement blurring as to the object being integrated while moving corresponding to a movement vector; a normal equation generating step for generating normal equations from a first equation wherein the pixel values of the pixels within the processing region have been substituted into a model generated in the model generating step, and a second equation for constraining the relation between the pixels where there is no movement blurring; and an actual world estimating step for estimating the pixel values of each of the pixels where there is no movement blurring, by computing the normal equations generated from the normal equation generating step.

With the present invention, a light signal of the real world is projected on multiple pixels, each of which has a time integration effect, and assuming a processing region is set within the image data wherein a portion of the continuity of the light signal of the real world has been lost, and a movement vector of the object within the image data corresponding to the continuity of the light signal of the real world wherein a portion of the continuity of the image data is lost, is set, and the pixel values of each of the pixels within the processing region are said to be a value integrated while the pixel values of each of the pixels not generating movement blurring corresponding to the object is shifted corresponding to the movement vector, and the relation between the pixel values of each of the pixels of the processing region and the pixel values of each of the pixels not generating movement blurring is modeled, and a normal equation is generated as to the model, from the first equation wherein the pixel values of each of the pixels within the processing region are substituted and the second equation which constrains the relation between each of the pixels not generating movement blurring, and by computing the generated normal equation, pixel values for each of the pixels not generating movement blurring can be estimated.

BRIEF DESCRIPTION OF THE DRAWINGS

FIG. 120 is a diagram illustrating an approximation function f(x) of the X cross-section, wherein the value of y within the approximation function f(x,y) in FIG. 120 is a predetermined value $y_c(y=y_c)$.

FIG. 121 is a diagram showing the approximation function f(x) in FIG. 120 after 1/v time has passed.

FIG. 122 is a diagram showing the approximation function f(x) in FIG. 121 after 1/v time has passed.

FIG. 123 is a diagram describing the movement of the object to be imaged in the input image moves v pixels for every shutter time.

FIG. 124 is a diagram showing the approximation function f(x) of $y=y_c$ at a predetermined precise timing, illustrated in FIG. 120, with a X-t plane.

FIG. 125 is a diagram showing pixel values $P_0$ through $P_9$ generating movement blurring, with aX-t plane, so as to correspond with the pixel values $Q_0$ through $Q_9$ in FIG. 124.

FIG. 126 is a diagram showing the pixel values $P_0$ through $P_9$ of an input image with the pixel values $Q_0$ through $Q_9$ in FIG. 124.

FIG. 127 is a diagram describing a method for solving the blank regions in FIG. 126, hypothesizing the edge portions of the processing region as "being flat".

FIG. 128 is a diagram describing the line of interest of the processing region in FIG. 119.

FIG. 129 is a block diagram illustrating a configuration example of the actual world estimating unit 15013 in FIG. 113.

FIG. 130 is a flowchart describing the actual world estimating processing of step S15008 in FIG. 114.

FIG. 131 is a flowchart describing the actual world estimating processing of step S15008 in FIG. 114.

Figure 113:
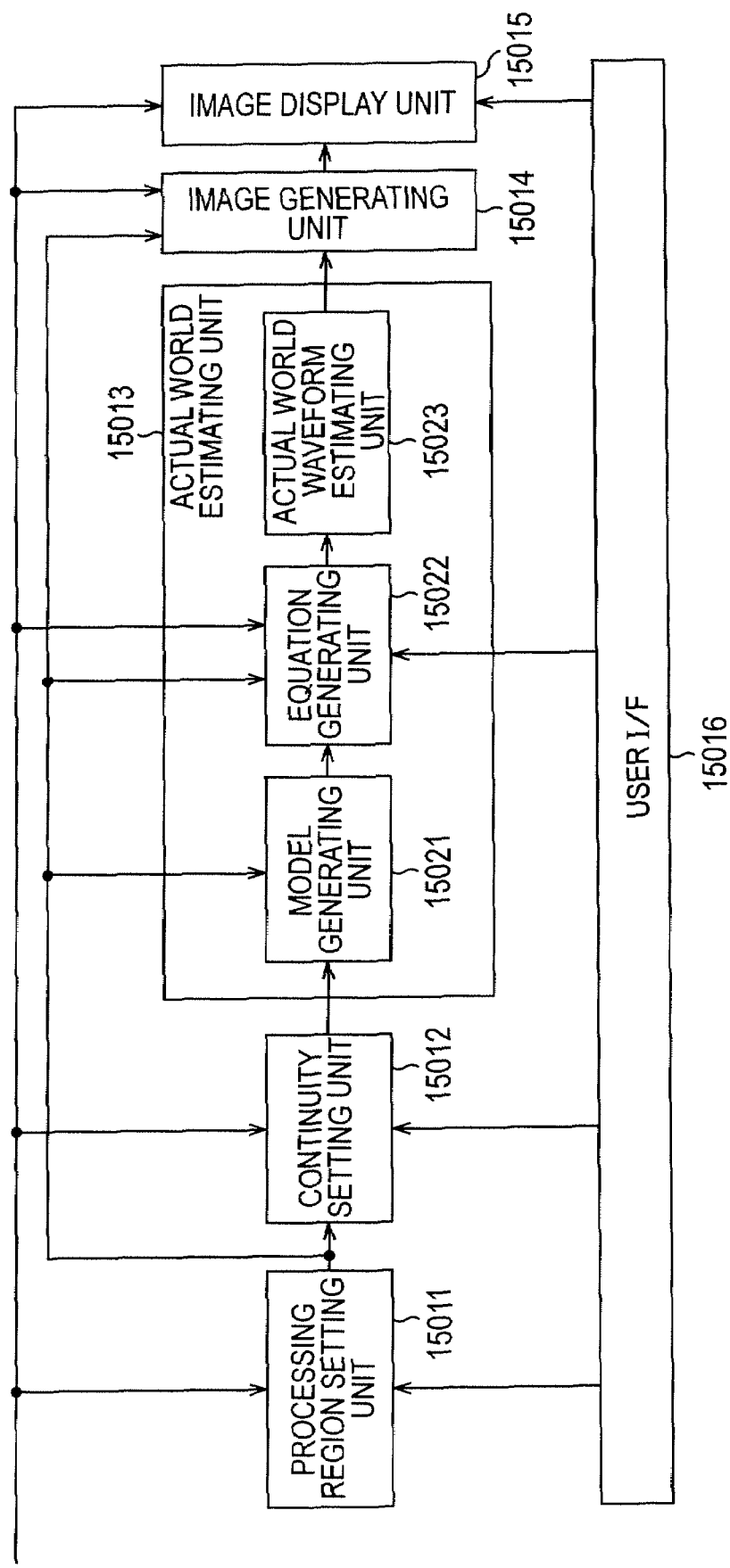
FIG. 113 is a block diagram illustrating a configuration example of an applied embodiment of the signal processing device 4 shown in FIG. 111.
Figure 132:

FIG. 132 is a diagram illustrating the input image to be input into the signal processing device 4 in FIG. 113.

Figure 133:

FIG. 133 is a diagram illustrating a processed and output image wherein the signal processing device 4 in FIG. 113 has processed the input image in FIG. 132 with the first method, which adds an equation which is postulated as having the edge portions of the processing regions as "being flat".

Figure 134:
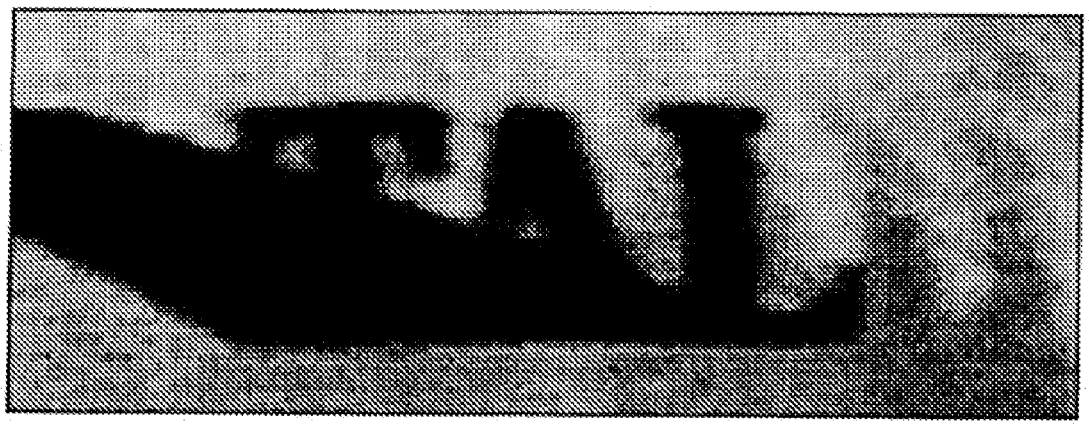

FIG. 134 is a diagram illustrating a processed and output image wherein the signal processing device 4 in FIG. 113 has processed the input image in FIG. 132 with the second method, which adds a conditional expression constraining the relation between the adjacent pixel values.

Figure 111:
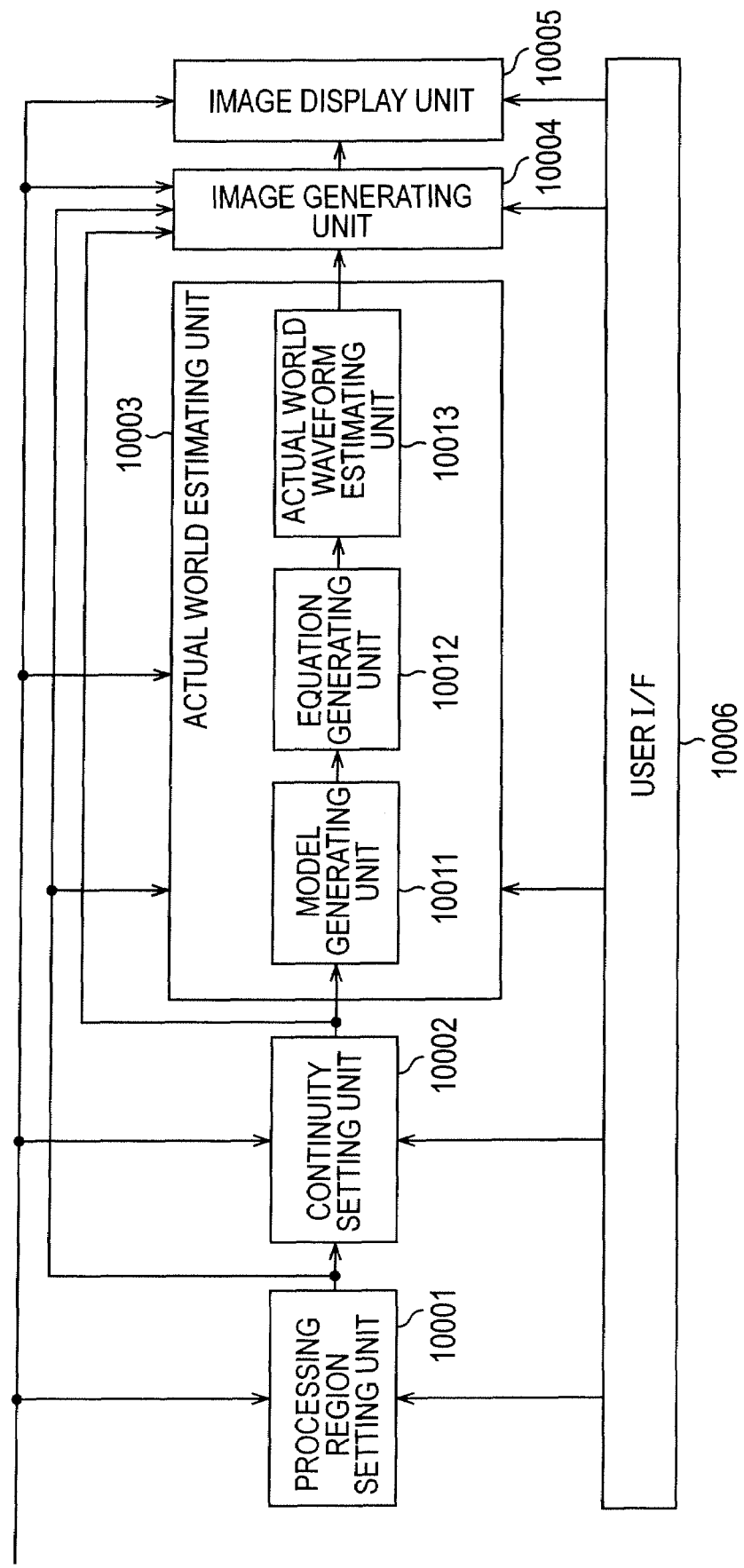
FIG. 111 is a block diagram illustrating a configuration example of another embodiment of the signal processing device 4 shown in FIG. 1.
Figure 135:
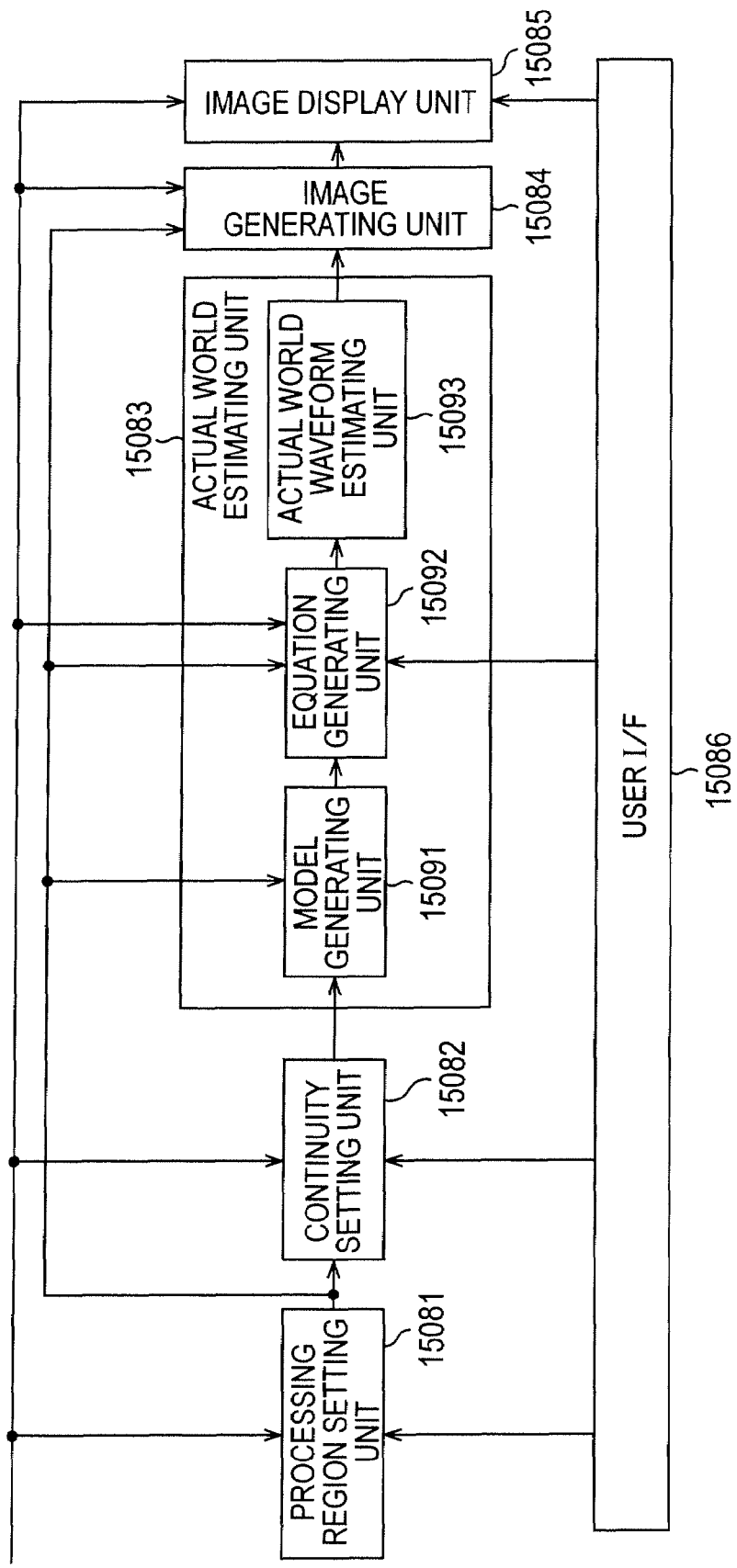

FIG. 135 is a block diagram of a configuration example of another embodiment of an application example of the signal processing device 4 in FIG. 111.

Figure 136:
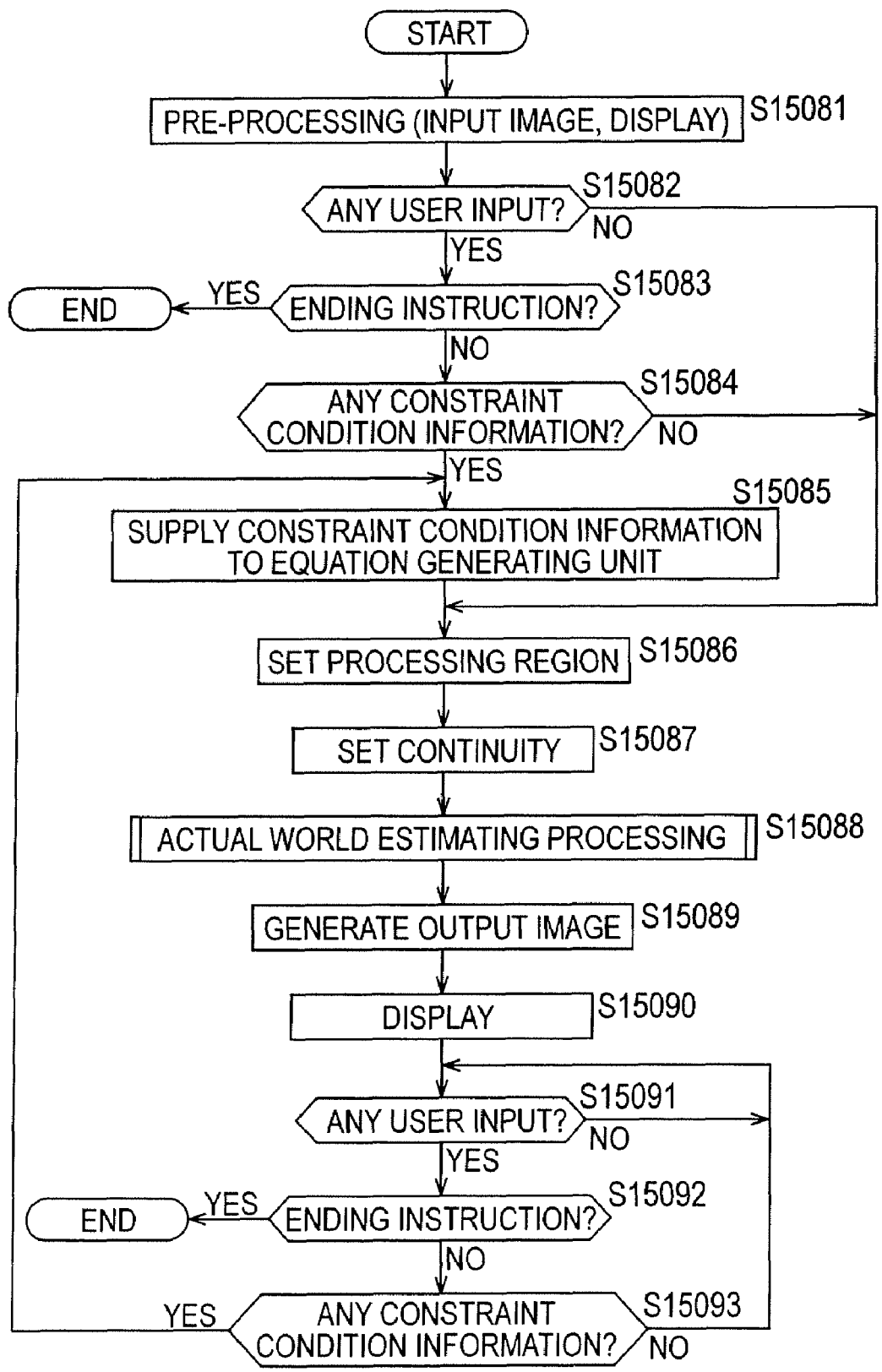

FIG. 136 is a flowchart describing the processing of the signal processing device 4 in FIG. 135.

Figure 137:
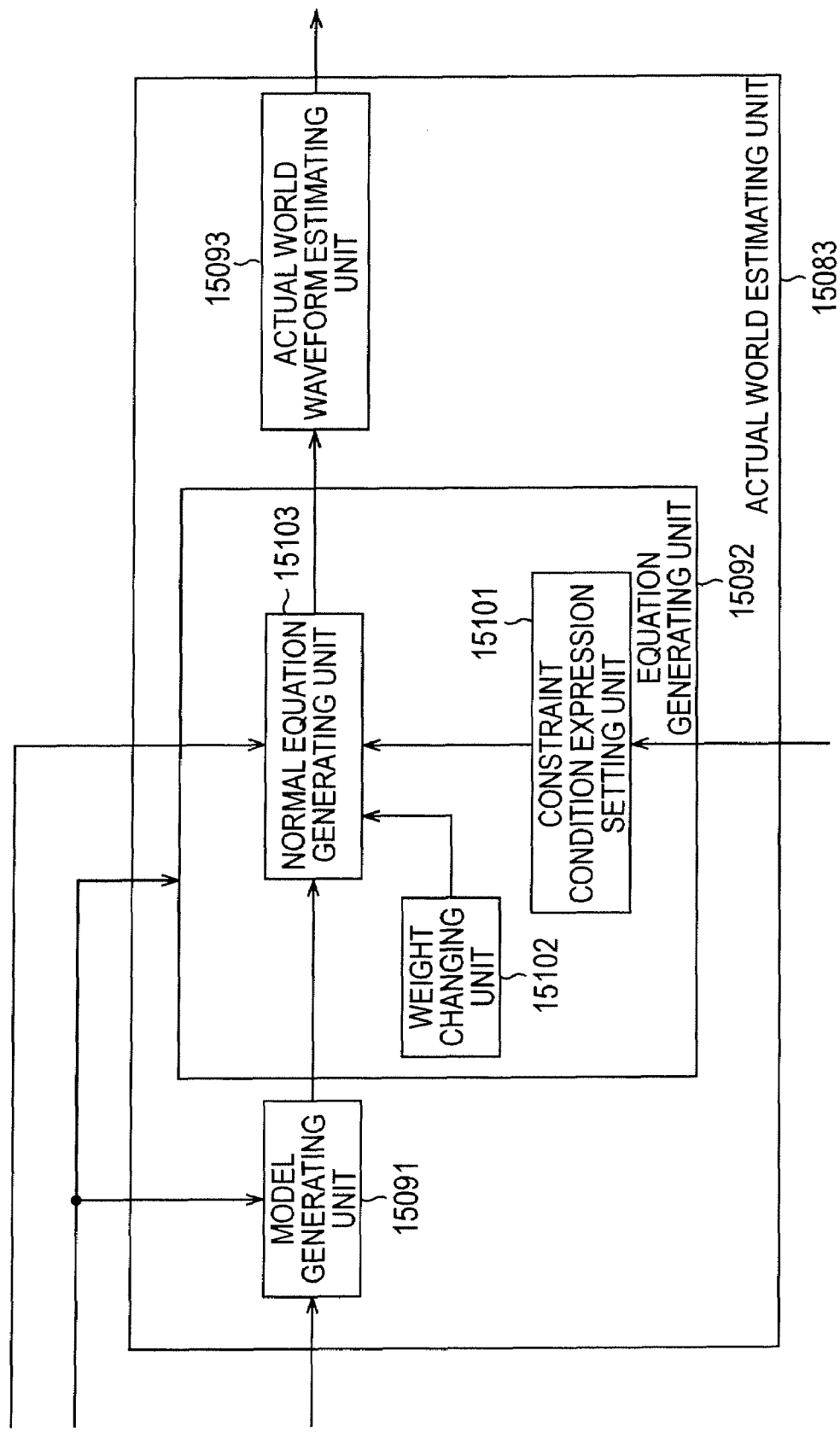

FIG. 137 is a block diagram illustrating a configuration example of the actual world estimating unit 15083 in FIG. 135.

Figure 138:
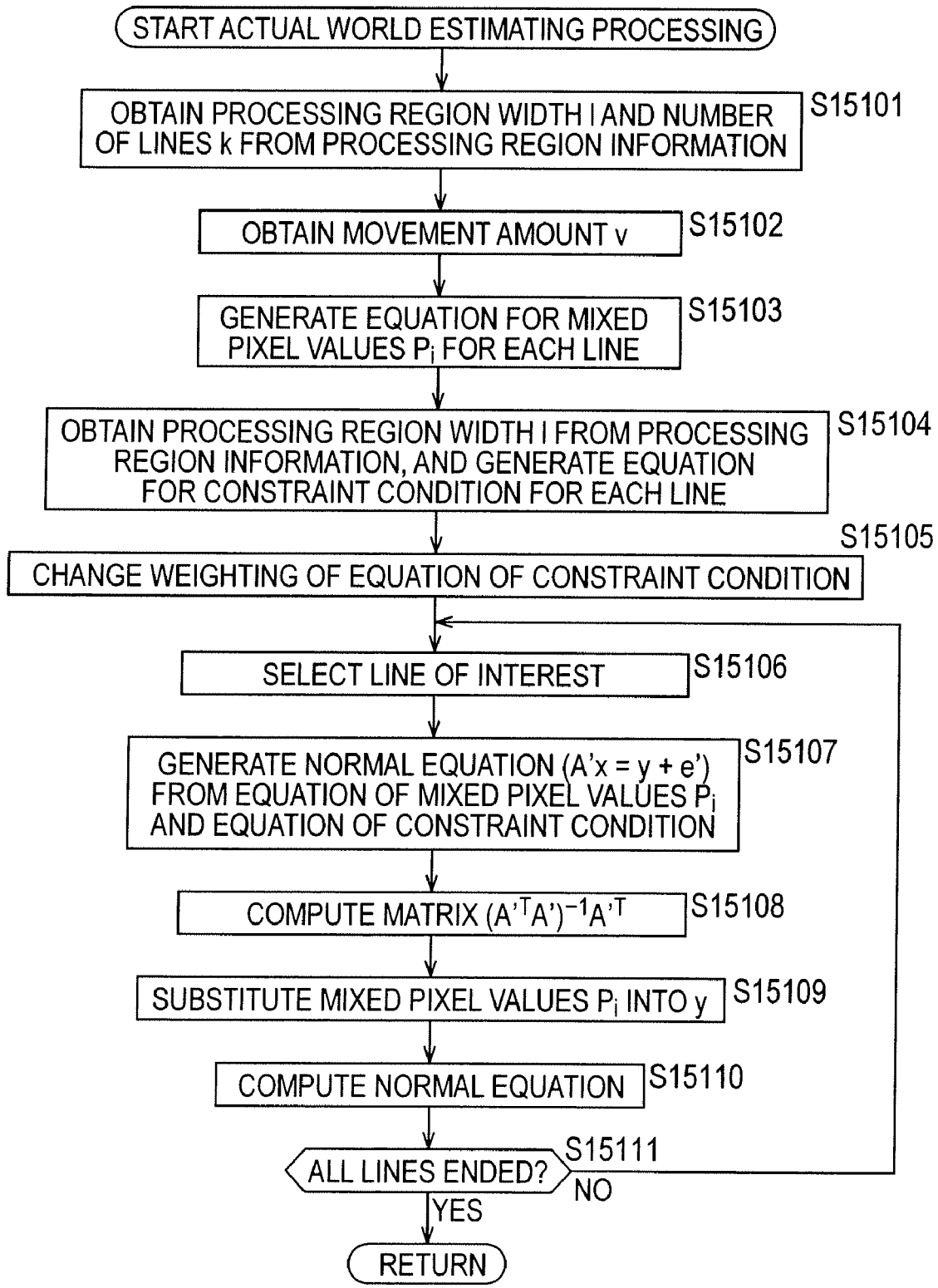

FIG. 138 is a flowchart describing the actual world estimating processing in step S15088 in FIG. 136.

Figure 139:
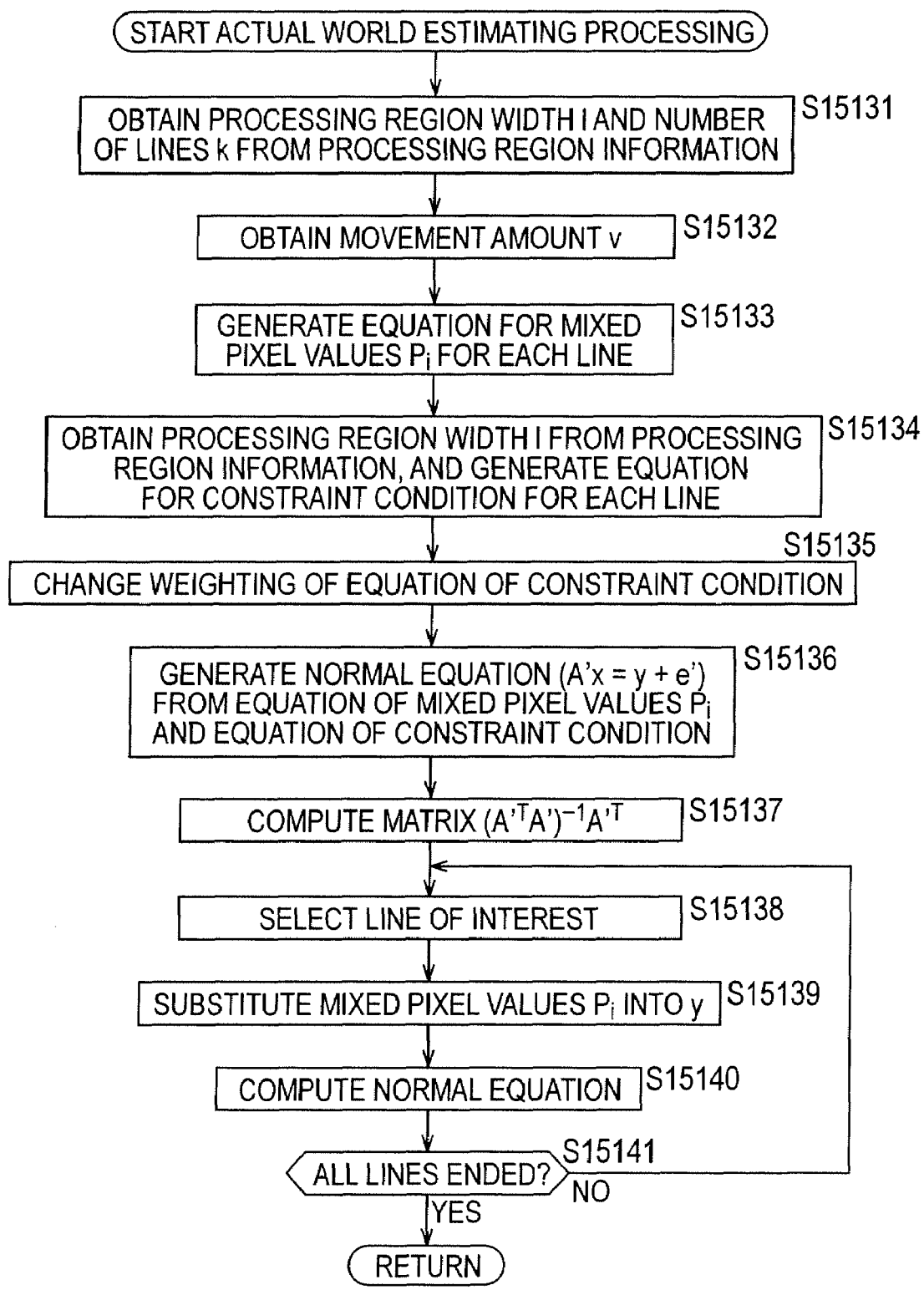

FIG. 139 is a flowchart describing the actual world estimating processing in step S15088 in FIG. 136.

Figure 140:
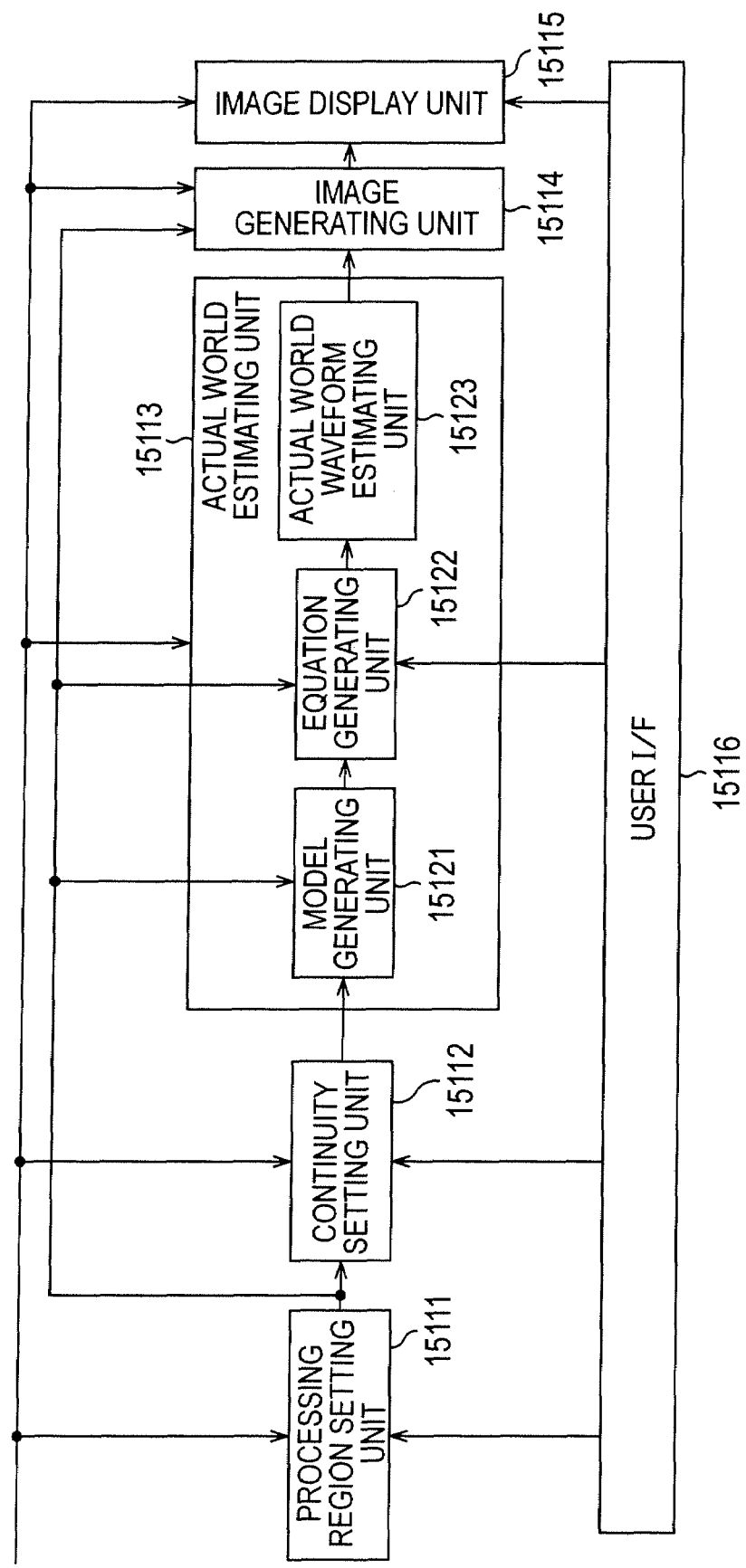

FIG. 140 is a block diagram of a configuration example of another embodiment of an application example of the signal processing device 4 in FIG. 111.

Figure 141:
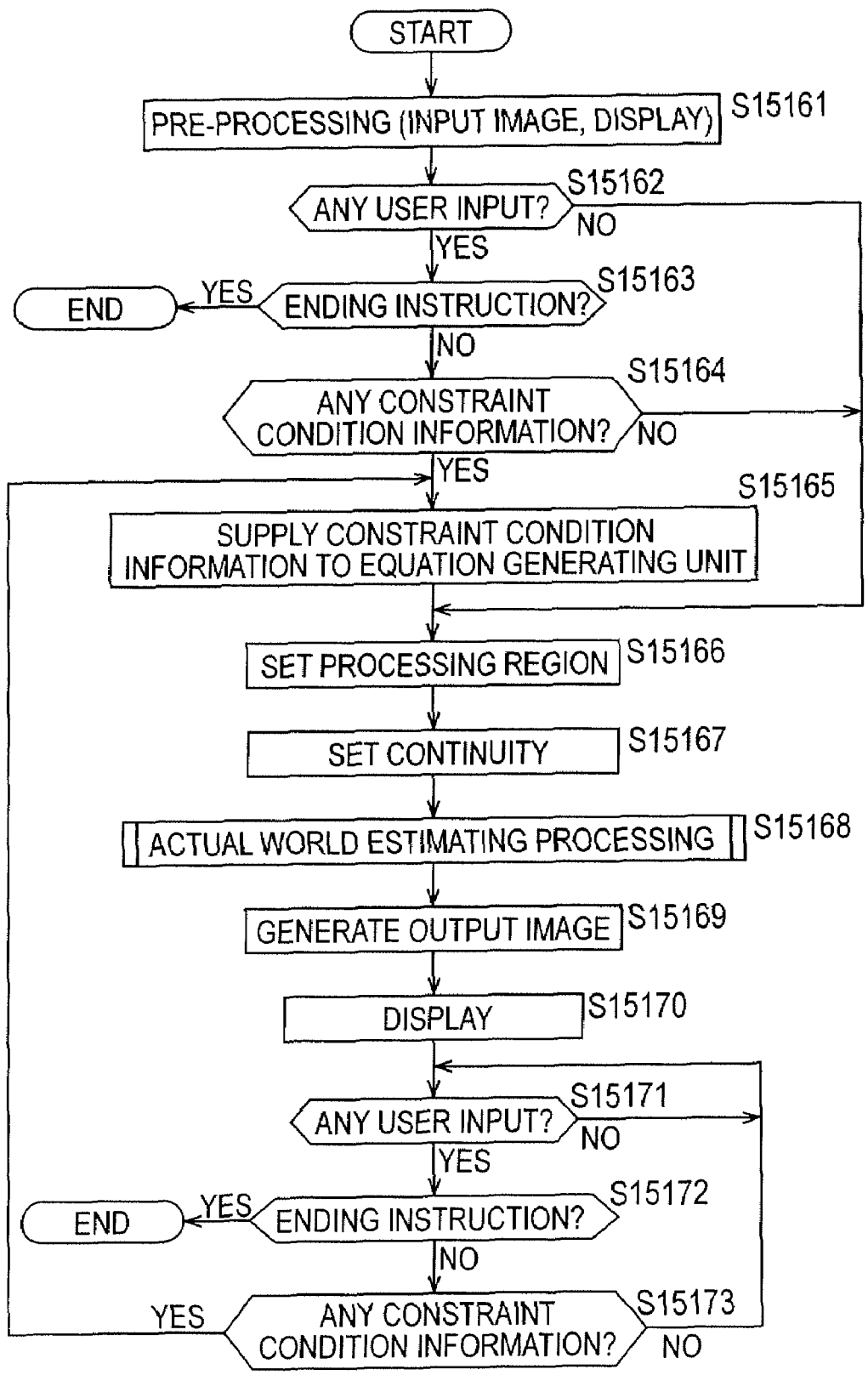

FIG. 141 is a flowchart describing the processing of the signal processing device 4 in FIG. 140.

Figure 142:
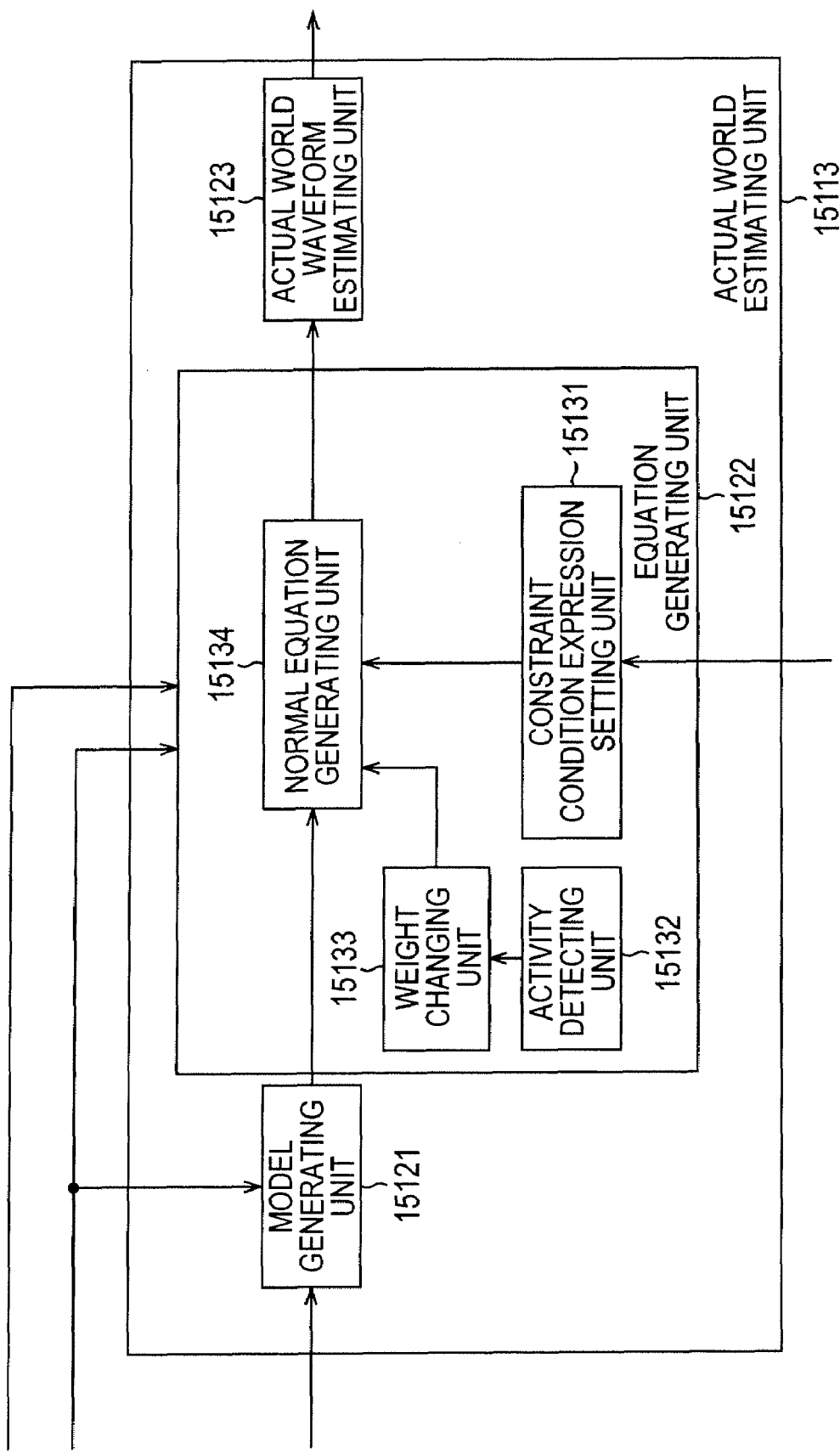

FIG. 142 is a block diagram illustrating a configuration example of the actual world estimating unit 15113 in FIG. 140.

Figure 143:
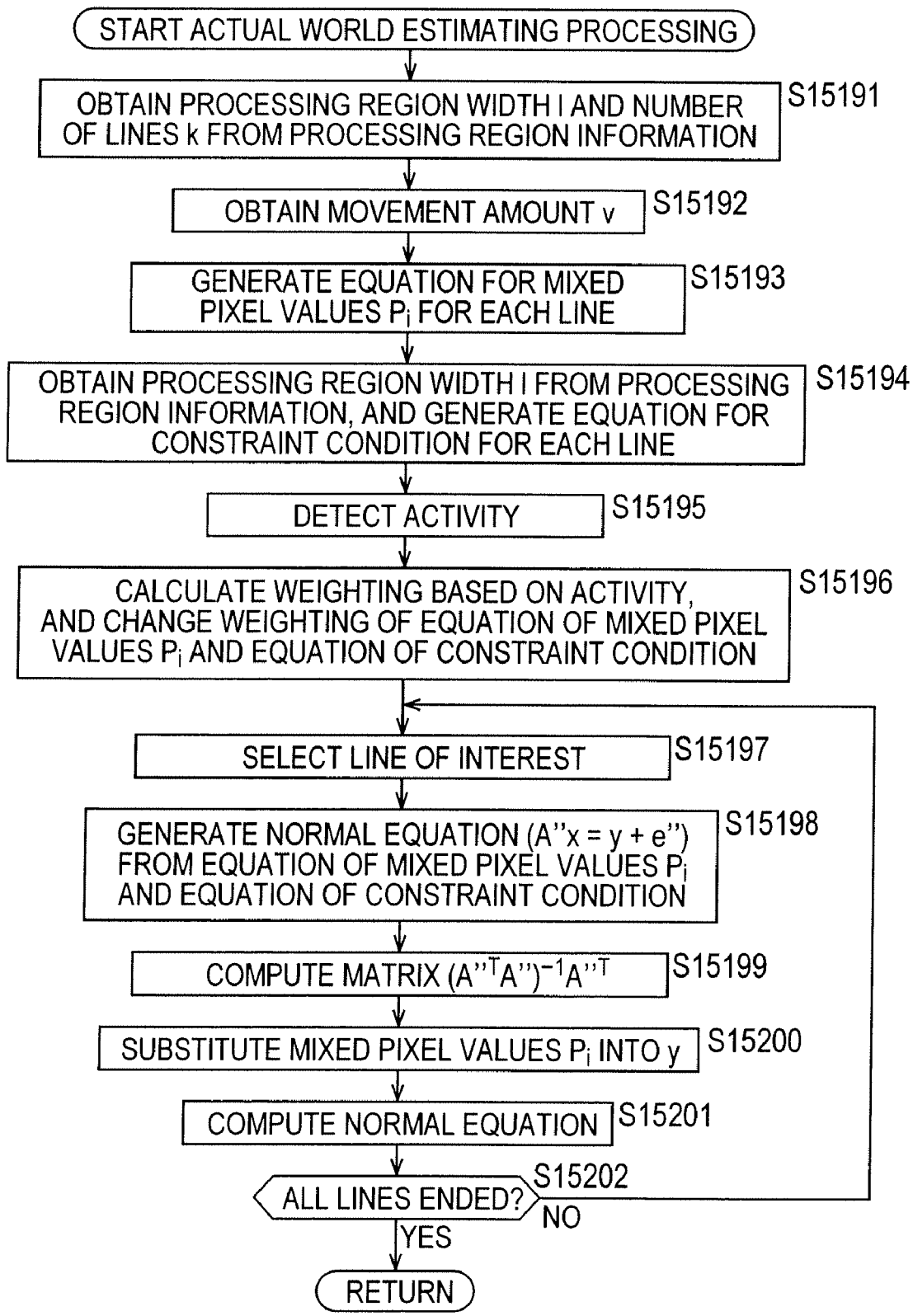

FIG. 143 is a flowchart describing the actual world estimating processing in step S15168 in FIG. 141.

Figure 144:

FIG. 144 is a diagram illustrating the input image which is input into the signal processing device 4 in FIG. 140.

Figure 145:

FIG. 145 is a diagram illustrating an example of an output image wherein the signal processing device 4 in FIG. 135 processes the input image in FIG. 144 using the weighting $W_{bj}$ corresponding to the constraint condition expression as the same weighting for all of the constraint condition expressions.

Figure 146:

FIG. 146 is a diagram illustrating an example of an output image wherein the signal processing device 4 in FIG. 140 processes the input image in FIG. 144 using the weighting $W_{bj}$ corresponding to the constraint condition expression as a 0 or a 1, according to the activity of the input image.

Figure 147:
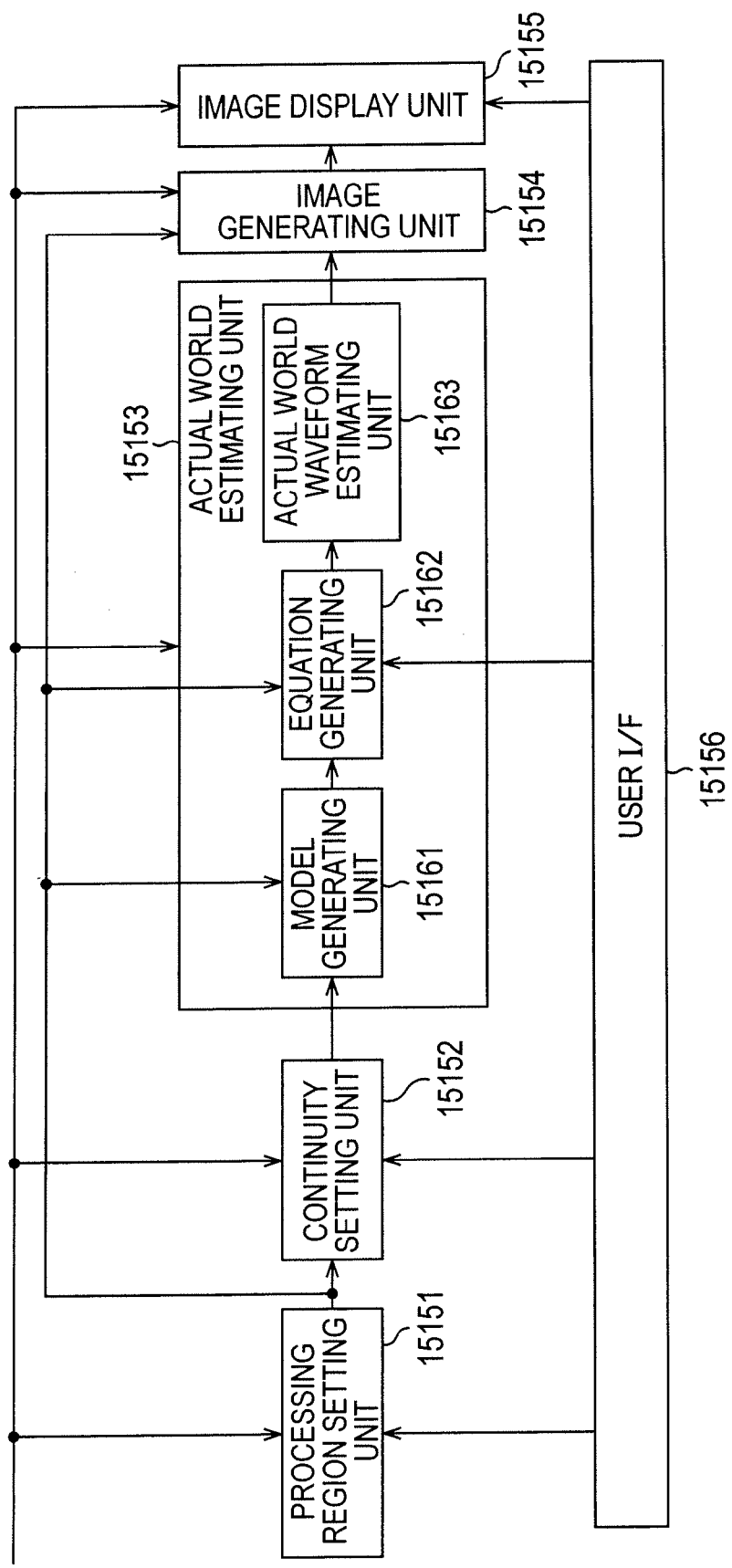

FIG. 147 is a block diagram of a configuration example of another embodiment of an application example of the signal processing device 4 in FIG. 111.

Figure 148:
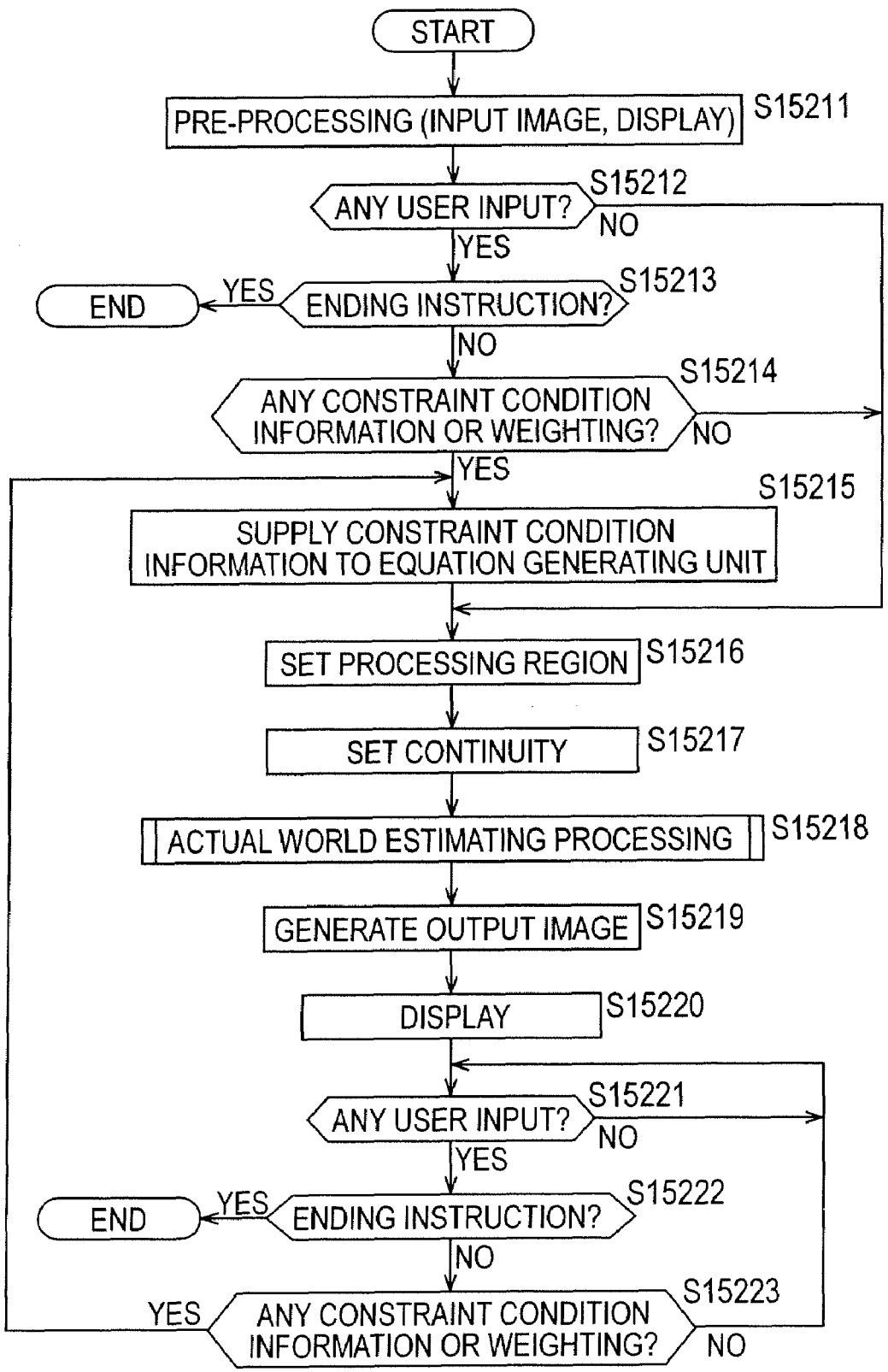

FIG. 148 is a flowchart describing the processing of the signal processing device 4 in FIG. 147.

Figure 149:
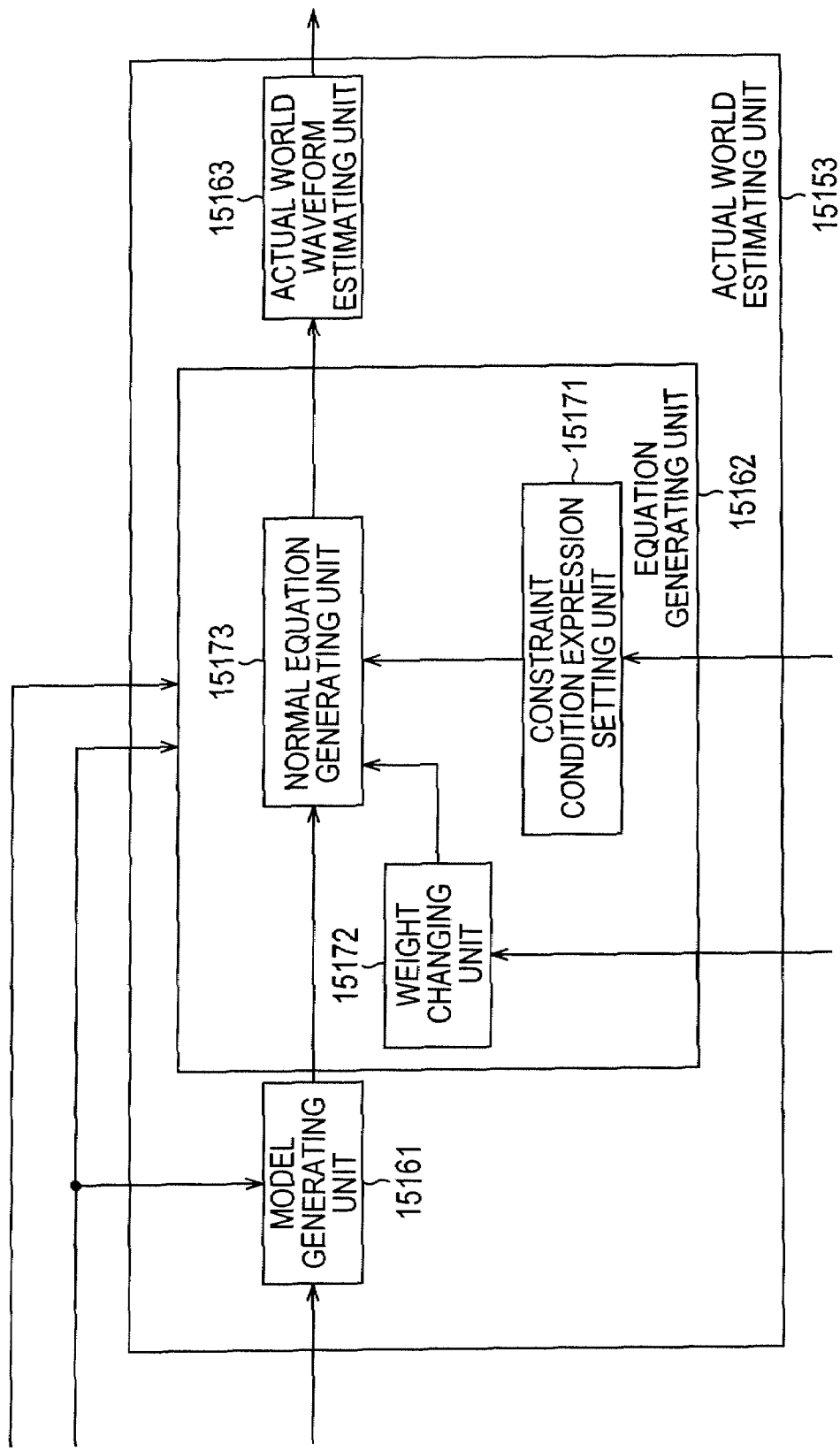

FIG. 149 is a block diagram illustrating a configuration example of the actual world estimating unit 15153 in FIG. 147.

Figure 150:
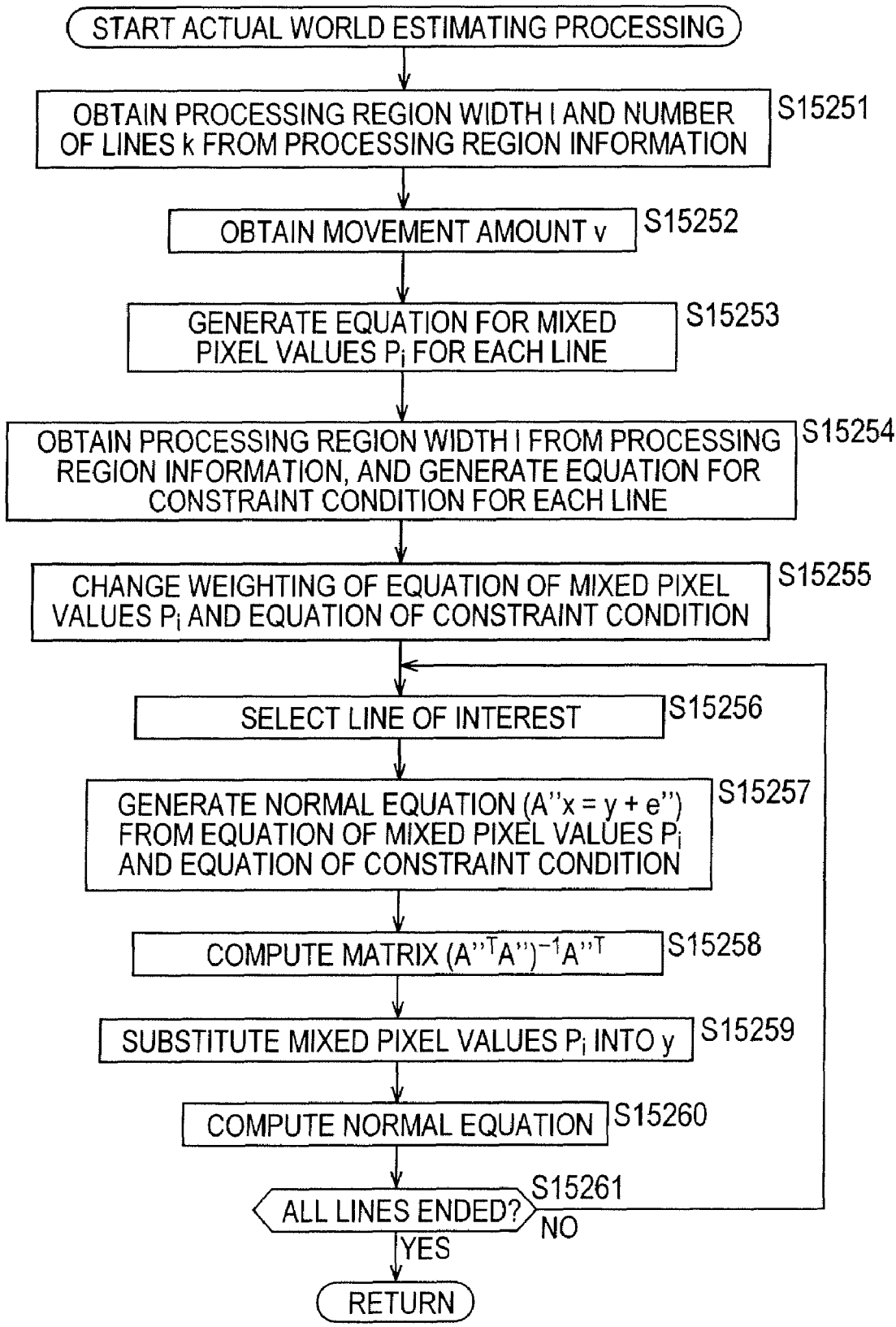

FIG. 150 is a flowchart for describing the actual world estimating processing in step S15218 in FIG. 148.

Figure 151:
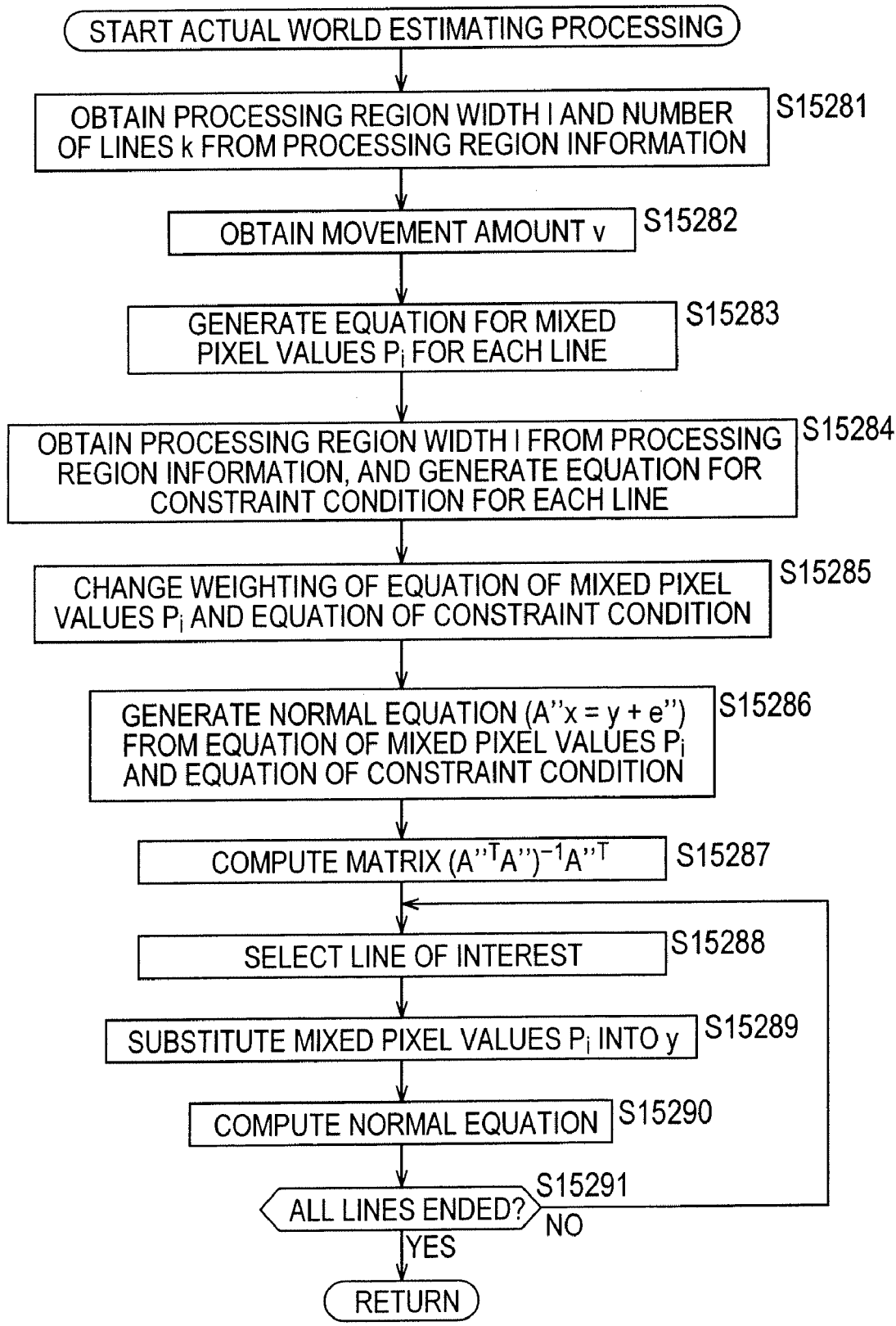

FIG. 151 is a flowchart for describing the actual world estimating processing in step S15218 in FIG. 148.

Figure 152:
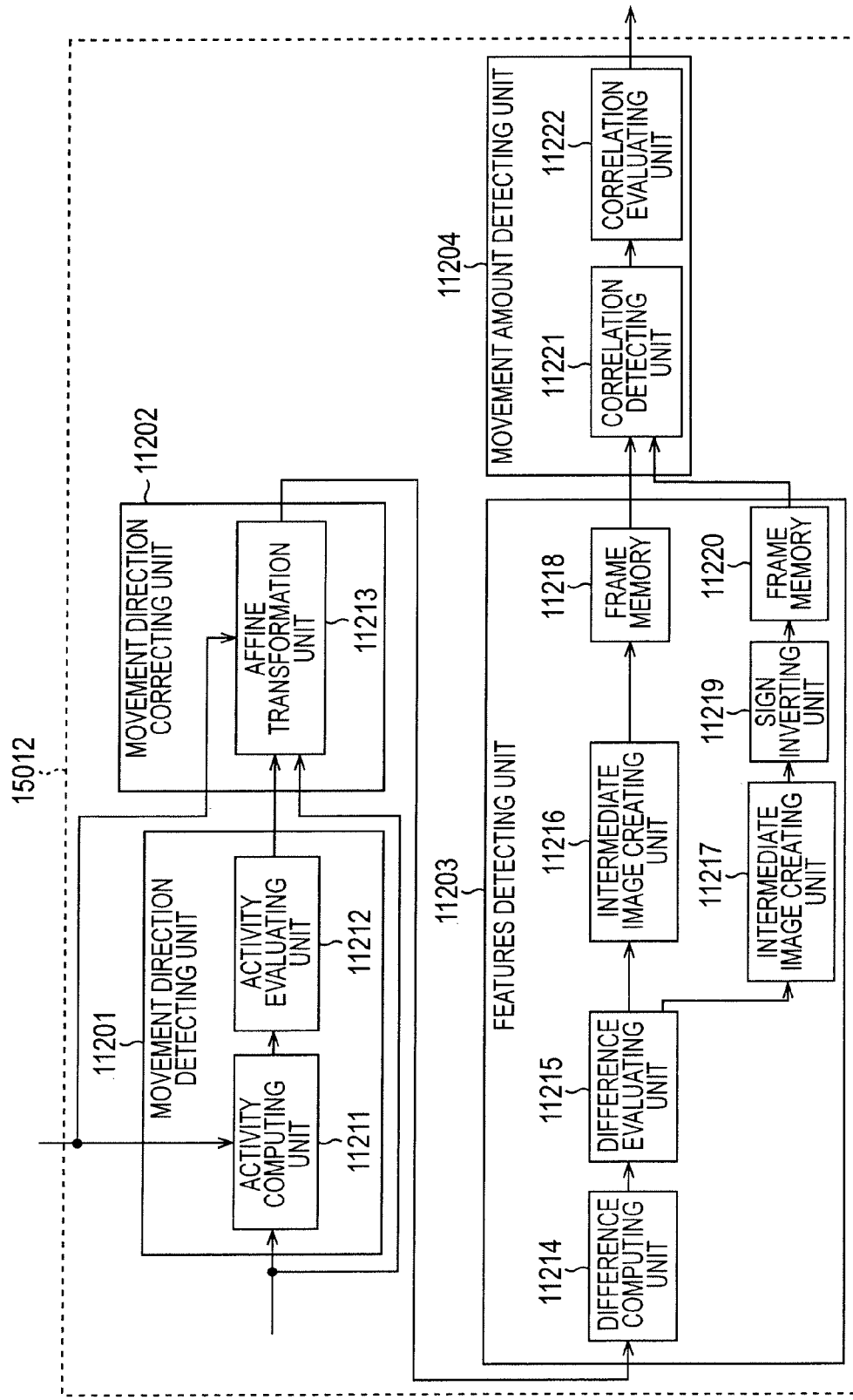

FIG. 152 is a block diagram illustrating a configuration example of a continuity setting unit 15012 shown in FIG. 113.

Figure 153:
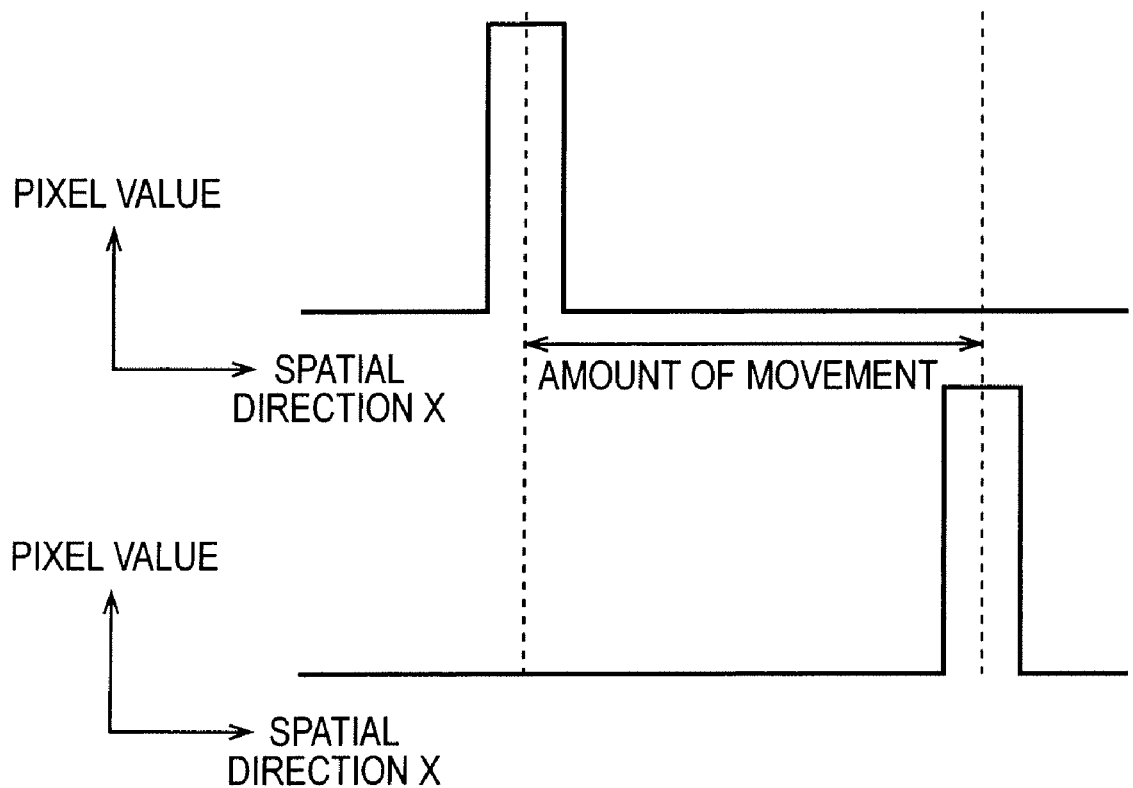

FIG. 153 is a diagram for describing amount of movement.

Figure 154:
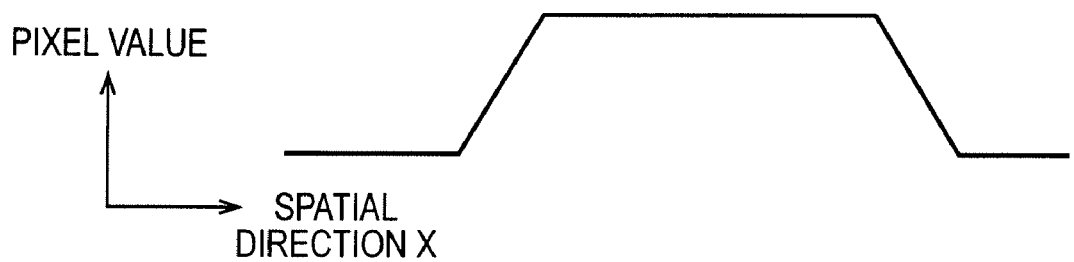

FIG. 154 is a diagram illustrating pixel values of an image output from a camera, taken by the camera while a foreground object passes in front of a background object.

Figure 155:
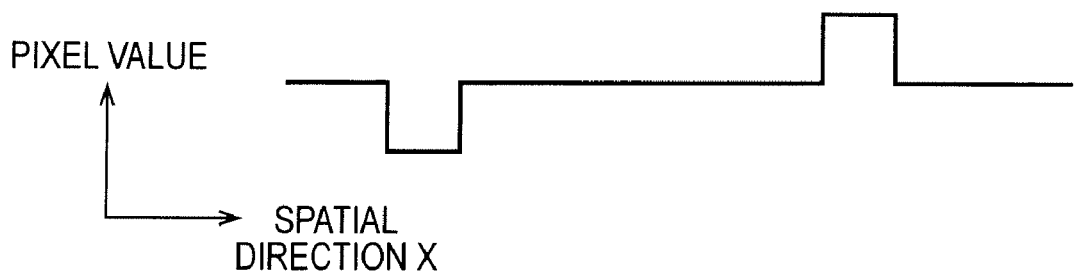

FIG. 155 is a diagram illustrating difference values of the pixel values of pixels in the image shown in FIG. 154.

Figure 156:
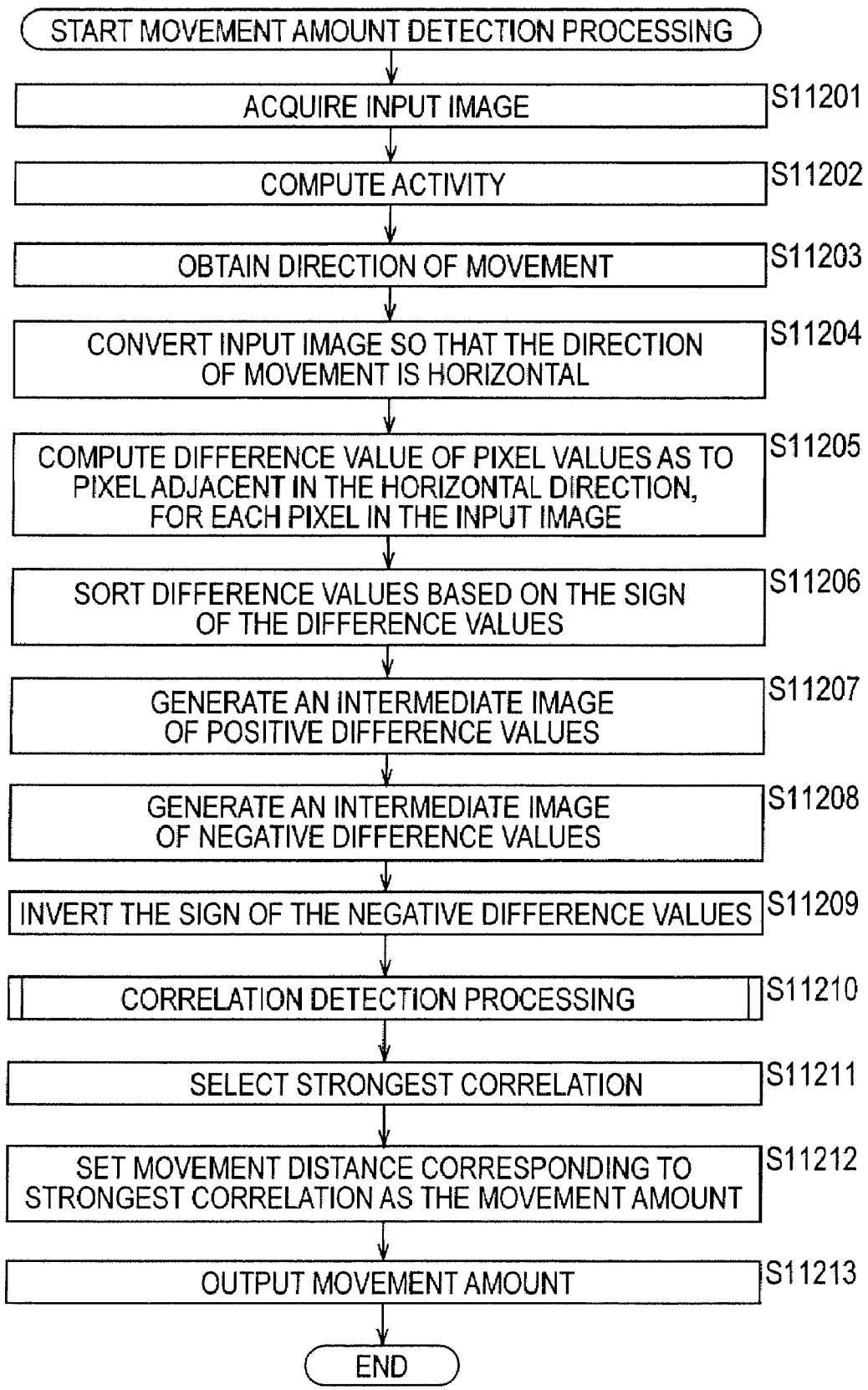

FIG. 156 is a flowchart for describing processing for detecting amount of movement.

Figure 157:
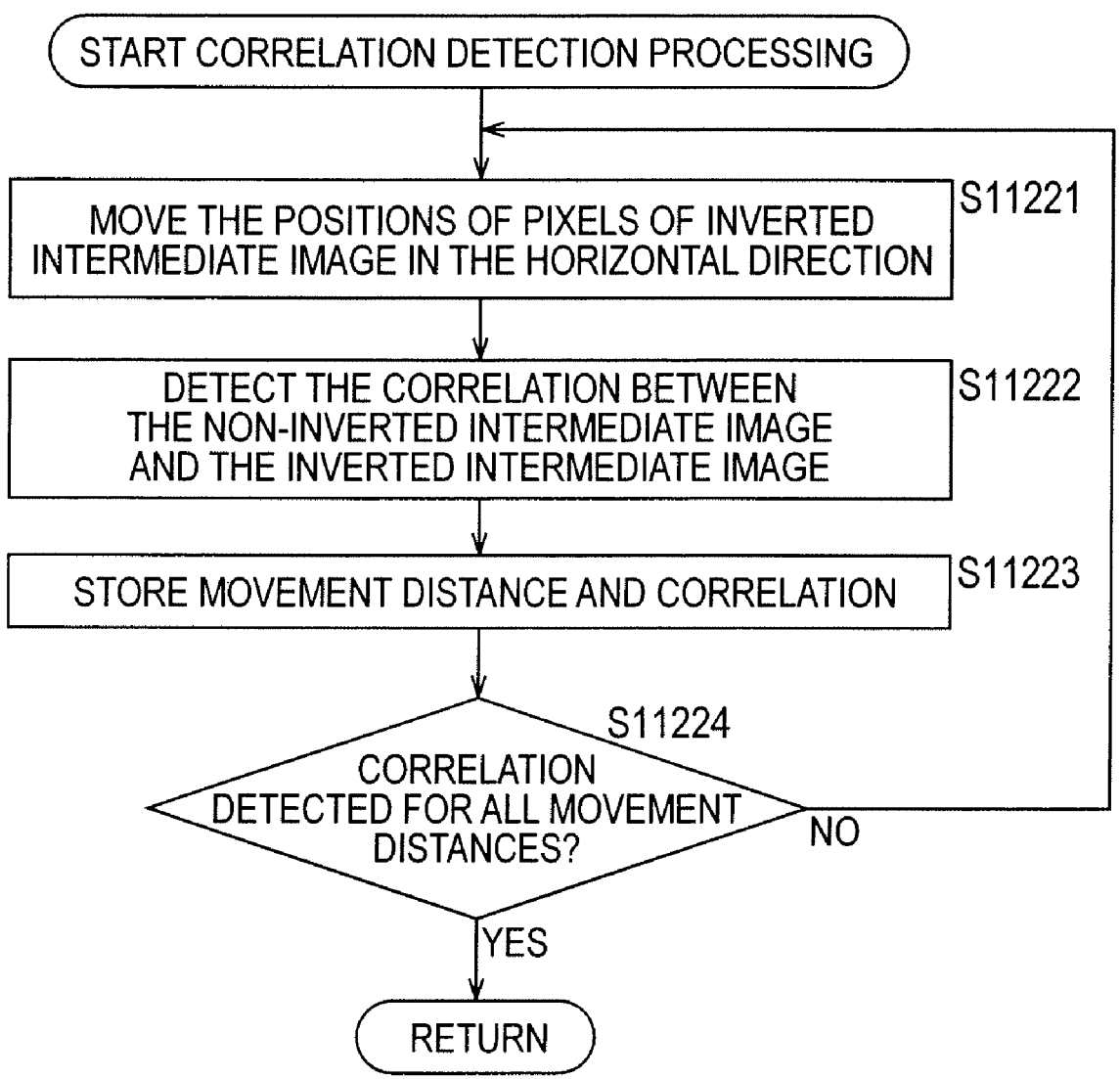

FIG. 157 is a flowchart for describing processing for detecting correlation.

BEST MODE FOR CARRYING OUT THE INVENTION

Figure 1:
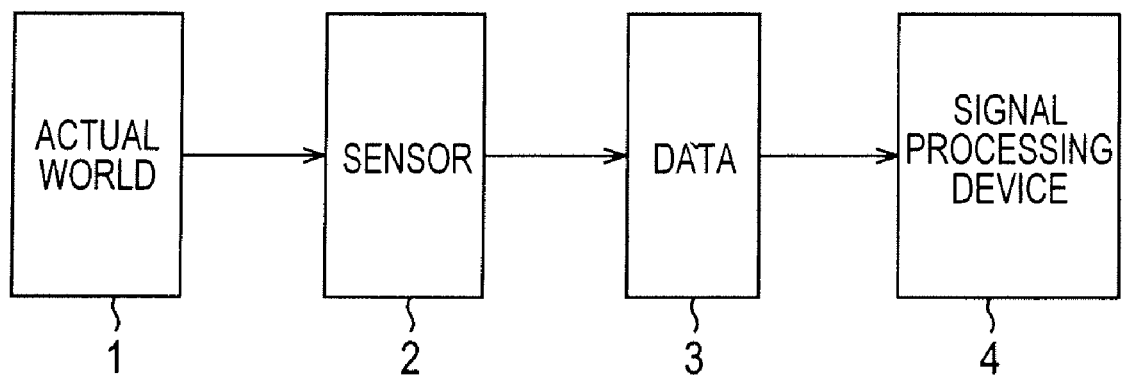
FIG. 1 is a diagram illustrating the principle of the present invention.

FIG. 1 illustrates the principle of the present invention. As shown in the drawing, events (phenomena) in an actual world 1 having dimensions of space, time, and mass, are acquired by a sensor 2, and formed into data. Events in the actual world 1 refer to light (images), sound, pressure, temperature, mass, humidity, brightness/darkness, or smells, and so forth. The events in the actual world 1 are distributed in the space-time directions. For example, an image of the actual world 1 is a distribution of the intensity of light of the actual world 1 in the space-time directions.

Taking note of the sensor 2, of the events in the actual world 1 having the dimensions of space, time, and mass, the events in the actual world 1 which the sensor 2 can acquire, are converted into data 3 by the sensor 2. It can be said that information indicating events in the actual world 1 are acquired by the sensor 2.

That is to say, the sensor 2 converts information indicating events in the actual world 1, into data 3. It can be said that signals which are information indicating the events (phenomena) in the actual world 1 having dimensions of space, time, and mass, are acquired by the sensor 2 and formed into data.

Hereafter, the distribution of events such as images, sound, pressure, temperature, mass, humidity, brightness/darkness, or smells, and so forth, in the actual world 1, will be referred to as signals of the actual world 1, which are information indicating events. Also, signals which are information indicating events of the actual world 1 will also be referred to simply as signals of the actual world 1. In the present Specification, signals are to be understood to include phenomena and events, and also include those wherein there is no intent on the transmitting side.

The data 3 (detected signals) output from the sensor 2 is information obtained by projecting the information indicating the events of the actual world 1 on a space-time having a lower dimension than the actual world 1. For example, the data 3 which is image data of a moving image, is information obtained by projecting an image of the three-dimensional space direction and time direction of the actual world 1 on the time-space having the two-dimensional space direction and time direction. Also, in the event that the data 3 is digital data for example, the data 3 is rounded off according to the sampling increments. In the event that the data 3 is analog data, information of the data 3 is either compressed according to the dynamic range, or a part of the information has been deleted by a limiter or the like.

Thus, by projecting the signals shown are information indicating events in the actual world 1 having a predetermined number of dimensions onto data 3 (detection signals), a part of the information indicating events in the actual world 1 is lost. That is to say, a part of the information indicating events in the actual world 1 is lost from the data 3 which the sensor 2 outputs.

However, even though a part of the information indicating events in the actual world 1 is lost due to projection, the data 3 includes useful information for estimating the signals which are information indicating events (phenomena) in the actual world 1.

With the present invention, information having continuity contained in the actual world 1 or the data 3 is used as useful information for estimating the signals which is information of the actual world 1. Continuity is a concept which is newly defined.

Taking note of the actual world 1, events in the actual world 1 include characteristics which are constant in predetermined dimensional directions. For example, an object (corporeal object) in the actual world 1 either has shape, pattern, or color that is continuous in the space direction or time direction, or has repeated patterns of shape, pattern, or color.

Accordingly, the information indicating the events in actual world 1 includes characteristics constant in a predetermined dimensional direction.

With a more specific example, a linear object such as a string, cord, or rope, has a characteristic which is constant in the length-wise direction, i.e., the spatial direction, that the cross-sectional shape is the same at arbitrary positions in the length-wise direction. The continuity in the spatial direction that the cross-sectional shape is the same at arbitrary positions in the length-wise direction comes from the characteristic that the linear object is long.

Accordingly, an image of the linear object has a characteristic which is constant in the length-wise direction, i.e., the spatial direction, that the cross-sectional shape is the same, at arbitrary positions in the length-wise direction.

Also, a monotone object, which is a corporeal object, having an expanse in the spatial direction, can be said to have a continuity of having the same color in the spatial direction regardless of the part thereof.

In the same way, an image of a monotone object, which is a corporeal object, having an expanse in the spatial direction, have a continuity of having the same color in the spatial direction regardless of the part thereof.

In this way, events in the actual world 1 (real world) have characteristics which are constant in predetermined dimensional directions, so signals of the actual world 1 have characteristics which are constant in predetermined dimensional directions In the present Specification, such characteristics which are constant in predetermined dimensional directions will be called continuity. Continuity of the signals of the actual world 1 (real world) means the characteristics which are constant in predetermined dimensional directions which the signals indicating the events of the actual world 1 (real world) have.

Countless such continuities exist in the actual world 1 (real world).

Next, taking note of the data 3, the data 3 is obtained by signals which is information indicating events of the actual world 1 having predetermined dimensions being projected by the sensor 2, and includes continuity corresponding to the continuity of signals in the real world. It can be said that the data 3 includes continuity wherein the continuity of actual world signals has been projected.

However, as described above, in the data 3 output from the sensor 2, a part of the information of the actual world 1 has been lost, so a part of the continuity contained in the signals of the actual world 1 (real world) may be lost from the data.

In other words, the data 3 contains at least a part of the continuity within the continuity of the signals of the actual world 1 (real world) as data continuity. Data continuity means characteristics which are constant in predetermined dimensional directions, which the data 3 has.

With the present invention, continuity of the actual world 1 signals, or the data continuity which the data 3 has, is used as significant data for estimating signals which are information indicating events of the actual world 1.

For example, with the signal processing device 4, information indicating an event in the actual world 1 which has been lost is generated by signals processing of the data 3, using data continuity.

Now, with the signal processing device 4, of the length (space), time, and mass, which are dimensions of signals serving as information indicating events in the actual world 1, continuity in the spatial direction or time direction, are used.

In FIG. 1, the sensor 2 is formed of, for example, a digital still camera, a video camera, or the like, and takes images of the actual world 1, and outputs the image data which is the obtained data 3, to a signal processing device 4. The sensor 2 may also be a thermography device, a pressure sensor using photo-elasticity, or the like.

The signal processing device 4 is configured of, for example, a personal computer or the like, and performs signal processing with regard to the data 3.

Figure 2:
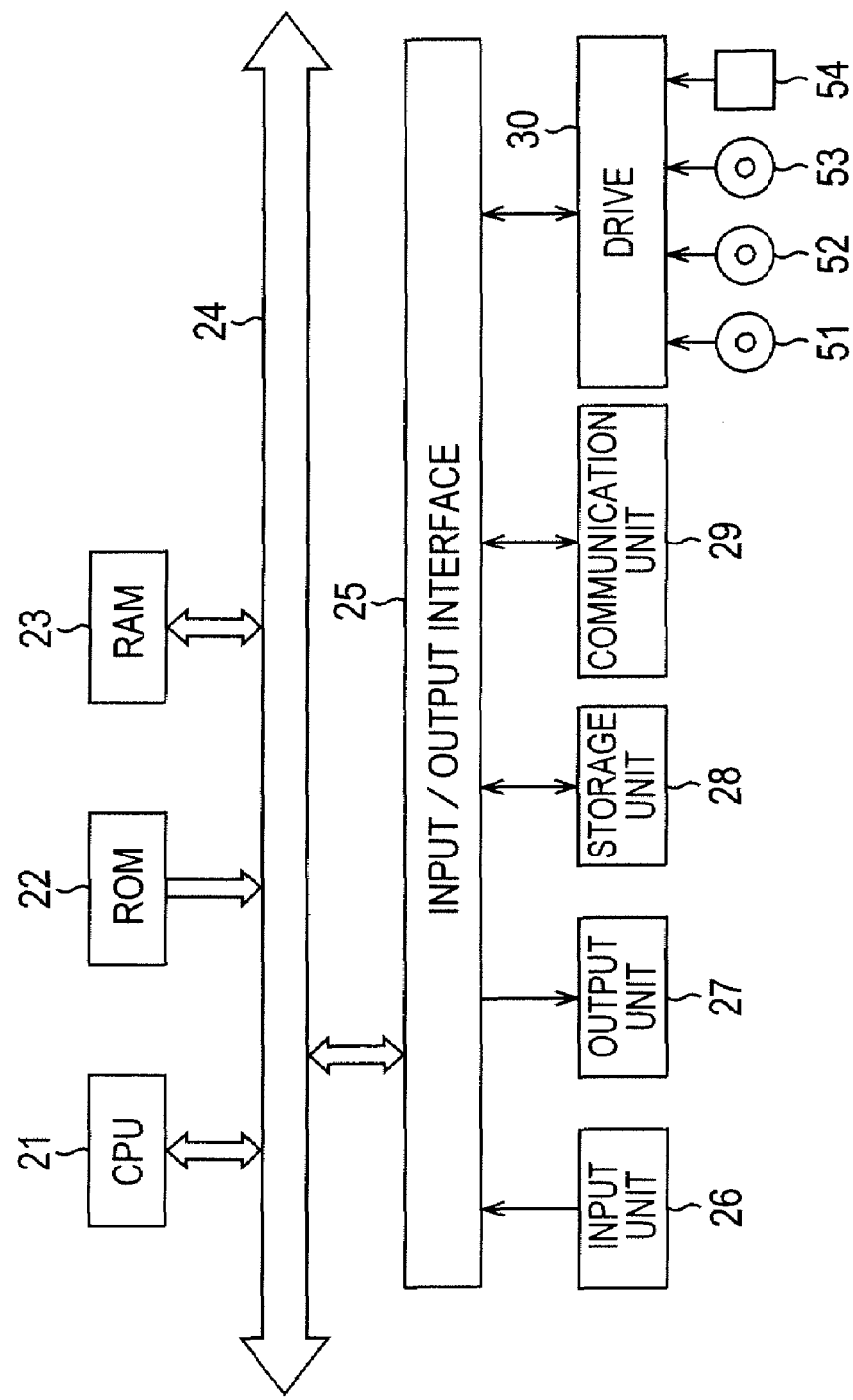
FIG. 2 is a block diagram illustrating an example of the hardware configuration of a signal processing device 4.

The signal processing device 4 is configured as shown in FIG. 2, for example. A CPU (Central Processing Unit) 21 executes various types of processing following programs stored in ROM (Read Only Memory) 22 or the storage unit 28. RAM (Random Access Memory) 23 stores programs to be executed by the CPU 21, data, and so forth, as suitable. The CPU 21, ROM 22, and RAM 23, are mutually connected by a bus 24.

Also connected to the CPU 21 is an input/output interface 25 via the bus 24. An input device 26 made up of a keyboard, mouse, microphone, and so forth, and an output unit 27 made up of a display, speaker, and so forth, are connected to the input/output interface 25. The CPU 21 executes various types of processing corresponding to commands input from the input unit 26. The CPU 21 then outputs images and audio and the like obtained as a result of processing to the output unit 27.

A storage unit 28 connected to the input/output interface 25 is configured of a hard disk for example, and stores the programs and various types of data which the CPU 21 executes. A communication unit 29 communicates with external devices via the Internet and other networks. In the case of this example, the communication unit 29 acts as an acquiring unit for capturing data 3 output from the sensor 2.

Also, an arrangement may be made wherein programs are obtained via the communication unit 29 and stored in the storage unit 28.

A drive 30 connected to the input/output interface 25 drives a magnetic disk 51, optical disk 52, magneto-optical disk 53, or semiconductor memory 54 or the like mounted thereto, and obtains programs and data recorded therein. The obtained programs and data are transferred to the storage unit 28 as necessary and stored.

Figure 3:
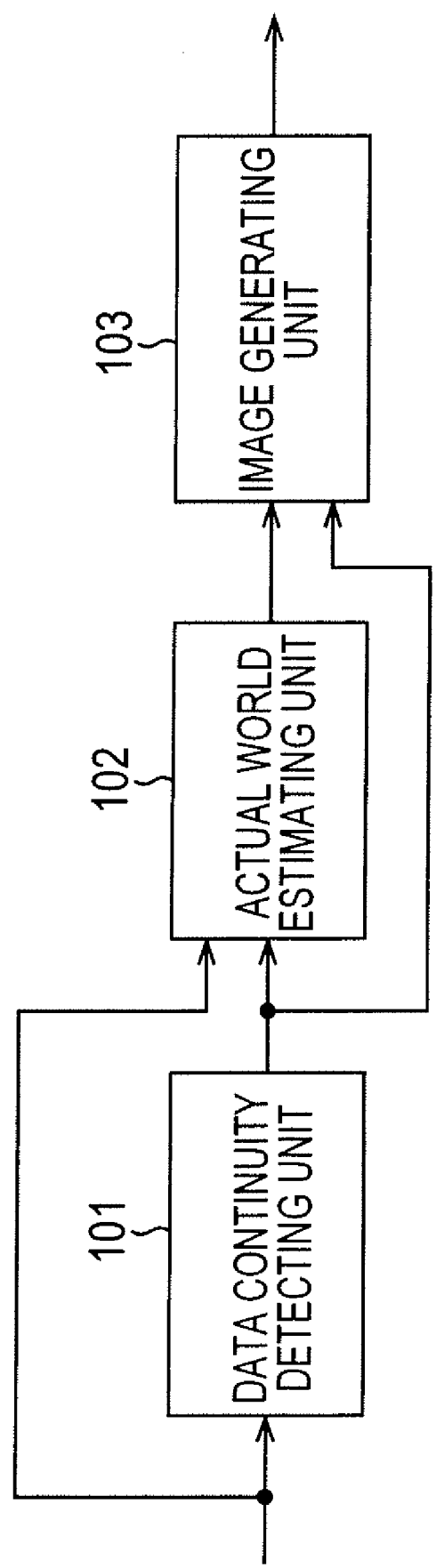
FIG. 3 is a block diagram illustrating a configuration example of an embodiment of the signal processing device 4 shown in FIG. 1.

FIG. 3 is a block diagram illustrating a signal processing device 4.

Note that whether the functions of the signal processing device 4 are realized by hardware or realized by software is irrelevant. That is to say, the block diagrams in the present Specification may be taken to be hardware block diagrams or may be taken to be software function block diagrams.

With the signal processing device 4 of which the configuration is shown in FIG. 3, image data which is an example of the data 3 is input, and the continuity of the data is detected from the input image data (input image). Next, the signals of the actual world 1 acquired by the sensor 2 are estimated from the continuity of the data detected. Then, based on the estimated signals of the actual world 1, an image is generated, and the generated image (output image) is output. That is to say, FIG. 3 is a diagram illustrating the configuration of the signal processing device 4 which is an image processing device.

The input image (image data which is an example of the data 3) input to the signal processing device 4 is supplied to a data continuity detecting unit 101 and actual world estimating unit 102.

The data continuity detecting unit 101 detects the continuity of the data from the input image, and supplies data continuity information indicating the detected continuity to the actual world estimating unit 102 and an image generating unit 103. The data continuity information includes, for example, the position of a region of pixels having continuity of data, the direction of a region of pixels having continuity of data (the angle or gradient of the time direction and space direction), or the length of a region of pixels having continuity of data, or the like in the input image. Detailed configuration of the data continuity detecting unit 101 will be described later. The actual world estimating unit 102 estimates the signals of the actual world 1, based on the input image and the data continuity information supplied from the data continuity detecting unit 101. That is to say, the actual world estimating unit 102 estimates an image which is the signals of the actual world cast into the sensor 2 at the time that the input image was acquired. The actual world estimating unit 102 supplies the actual world estimation information indicating the results of the estimation of the signals of the actual world 1, to the image generating unit 103. The detailed configuration of the actual world estimating unit 102 will be described later.

The image generating unit 103 generates signals further approximating the signals of the actual world 1, based on the actual world estimation information indicating the estimated signals of the actual world 1, supplied from the actual world estimating unit 102, and outputs the generated signals. Or, the image generating unit 103 generates signals further approximating the signals of the actual world 1, based on the data continuity information supplied from the data continuity detecting unit 101, and the actual world estimation information indicating the estimated signals of the actual world 1, supplied from the actual world estimating unit 102, and outputs the generated signals.

That is to say, the image generating unit 103 generates an image further approximating the image of the actual world 1 based on the actual world estimation information, and outputs the generated image as an output image. Or, the image generating unit 103 generates an image further approximating the image of the actual world 1 based on the data continuity information and actual world estimation information, and outputs the generated image as an output image.

For example, the image generating unit 103 generates an image with higher resolution in the spatial direction or time direction in comparison with the input image, by integrating the estimated image of the actual world 1 within a desired range of the spatial direction or time direction, based on the actual world estimation information, and outputs the generated image as an output image. For example, the image generating unit 103 generates an image by extrapolation/interpolation, and outputs the generated image as an output image.

Detailed configuration of the image generating unit 103 will be described later.

Next, the principle of the present invention will be described with reference to FIG. 4.

For example, signals of the actual world 1, which are an image for example, are imaged on the photoreception face of a CCD (Charge Coupled Device) which is an example of the sensor 2. The CCD, which is an example of the sensor 2, has integration properties, so difference is generated in the data 3 output from the CCD as to the image of the actual world 1. Details of the integration properties of the sensor 2 will be described later.

With the signal processing by the signal processing device 4, the relation between the image of the actual world 1 obtained by the CCD, and the data 3 taken by the CCD and output, is explicitly taken into consideration. That is to say, the relation between the data 3 and the signals which is information of the actual world obtained by the sensor 2, is explicitly taken into consideration.

Figure 4:
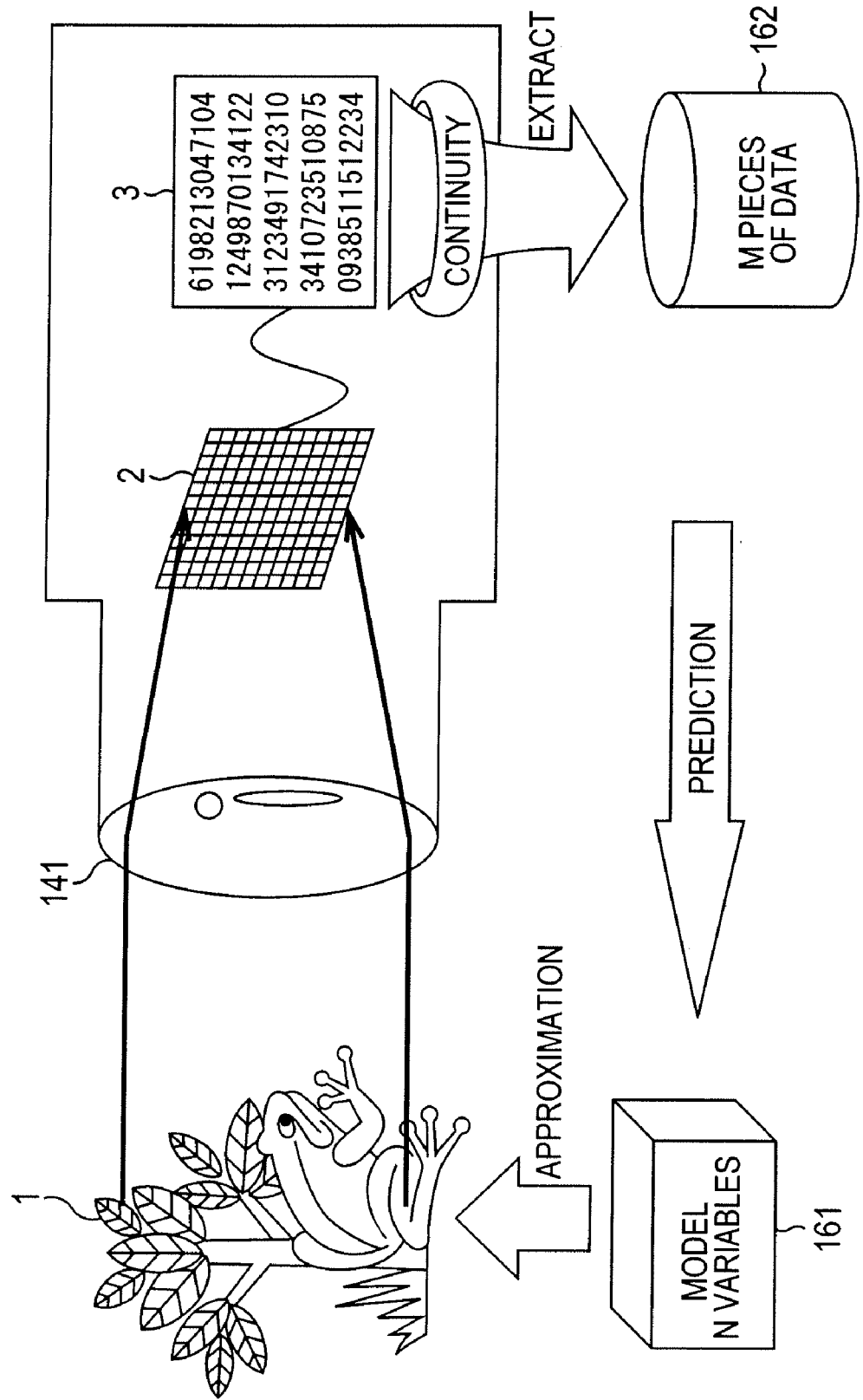
FIG. 4 is a diagram describing in detail the principle of the signal processing performed by the signal processing device 4.

More specifically, as shown in FIG. 4, the signal processing device 4 uses a model 161 to approximate (describe) the actual world 1. The model 161 is represented by, for example, N variables. More accurately, the model 161 approximates (describes) signals of the actual world 1.

In order to predict the model 161, the signal processing device 4 extracts M pieces of data 162 from the data 3. At the time of extracting the M pieces of data 162 from the data 3, the signal processing device 4 uses the continuity of the data contained in the data 3, for example. In other words, the signal processing device 4 extracts data 162 for predicting the model 161, based on the continuity of the data contained in the data 3. Consequently, in this case, the model 161 is constrained by the continuity of the data.

That is to say, the model 161 approximates (information (signals) indicating) events of the actual world 1 having continuity (continuity in a predetermined dimensional direction), which generates the data continuity in the data 3 when acquired with the sensor 2.

Now, in the event that the number M of the data 162 is N or more, which is the number of variables of the model, the model 161 represented by the N variables can be predicted, from the M pieces of the data 162.

In this way, the signal processing device 4 can take into consideration the signals which are information of the actual world 1, by predicting the model 161 approximating (describing) the (signals of the) actual world 1.

Next, the integration effects of the sensor 2 will be described.

An image sensor such as a CCD or CMOS (Complementary Metal-Oxide Semiconductor) sensor or the like, which is the sensor 2 for taking images, projects signals, which are information of the real world, onto two-dimensional data, at the time of imaging the real world. The pixels of the image sensor each have a predetermined area, as a so-called photoreception face (photoreception region). Incident light to the photoreception face having a predetermined area is integrated in the space direction and time direction for each pixel, and is converted into a single pixel value for each pixel.

The space-time integration of images will be described with reference to FIG. 5 through FIG. 8.

An image sensor images a subject (object) in the real world, and outputs the obtained image data as a result of imagining in increments of single frames. That is to say, the image sensor acquires signals of the actual world 1 which is light reflected off of the subject of the actual world 1, and outputs the data 3.

For example, the image sensor outputs image data of 30 frames per second. In this case, the exposure time of the image sensor can be made to be 1/30 seconds. The exposure time is the time from the image sensor starting conversion of incident light into electric charge, to ending of the conversion of incident light into electric charge. Hereafter, the exposure time will also be called shutter time.

Figure 5:
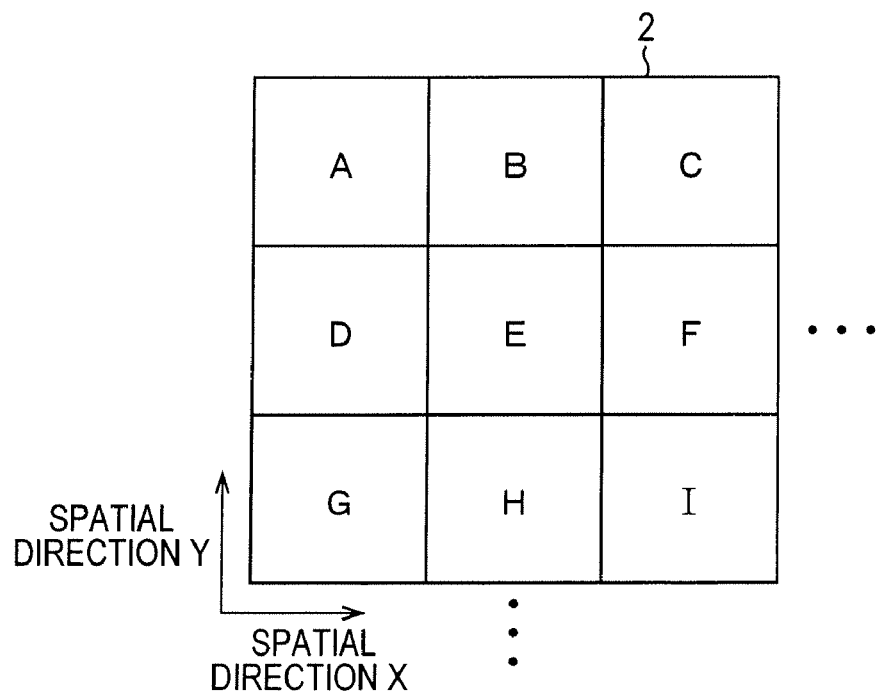
FIG. 5 is a diagram for describing an example of array of pixels on an image sensor.

FIG. 5 is a diagram describing an example of a pixel array on the image sensor. In FIG. 5, A through I denote individual pixels. The pixels are placed on a plane corresponding to the image displayed by the image data. A single detecting element corresponding to a single pixel is placed on the image sensor. At the time of the image sensor taking images of the actual world 1, the one detecting element outputs one pixel value corresponding to the one pixel making up the image data. For example, the position in the spatial direction X (X coordinate) of the detecting element corresponds to the horizontal position on the image displayed by the image data, and the position in the spatial direction Y (Y coordinate) of the detecting element corresponds to the vertical position on the image displayed by the image data.

Distribution of intensity of light of the actual world 1 has expanse in the three-dimensional spatial directions and the time direction, but the image sensor acquires light of the actual world 1 in two-dimensional spatial directions and the time direction, and generates data 3 representing the distribution of intensity of light in the two-dimensional spatial directions and the time direction.

Figure 6:
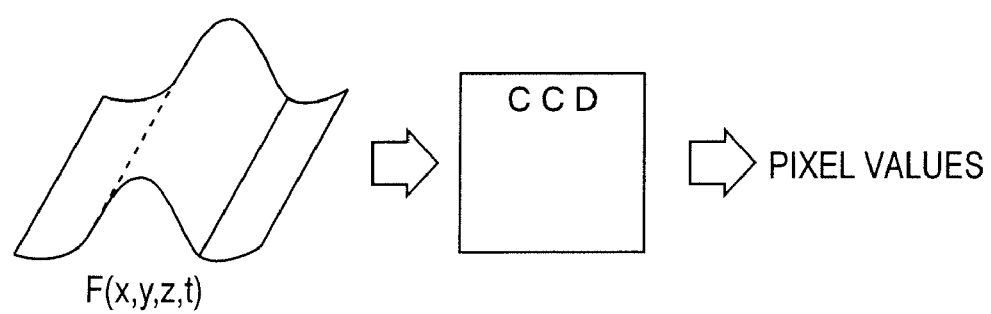
FIG. 6 is a diagram for describing the operations of a detecting device which is a CCD.

As shown in FIG. 6, the detecting device which is a CCD for example, converts light cast onto the photoreception face (photoreception region) (detecting region) into electric charge during a period corresponding to the shutter time, and accumulates the converted charge. The light is information (signals) of the actual world 1 regarding which the intensity is determined by the three-dimensional spatial position and point-in-time. The distribution of intensity of light of the actual world 1 can be represented by a three-dimensional function F(x, y, z, t), wherein position x, y, z, in space, and point-in-time t, are variables.

The amount of charge accumulated in the detecting device which is a CCD is approximately proportionate to the intensity of the light cast onto the entire photoreception face having two-dimensional spatial expanse, and the amount of time that light is cast thereupon. The detecting device adds the charge converted from the light cast onto the entire photoreception face, to the charge already accumulated during a period corresponding to the shutter time. That is to say, the detecting device integrates the light cast onto the entire photoreception face having a two-dimensional spatial expanse, and accumulates a change of an amount corresponding to the integrated light during a period corresponding to the shutter time. The detecting device can also be said to have an integration effect regarding space (photoreception face) and time (shutter time).

The charge accumulated in the detecting device is converted into a voltage value by an unshown circuit, the voltage value is further converted into a pixel value such as digital data or the like, and is output as data 3. Accordingly, the individual pixel values output from the image sensor have a value projected on one-dimensional space, which is the result of integrating the portion of the information (signals) of the actual world 1 having time-space expanse with regard to the time direction of the shutter time and the spatial direction of the photoreception face of the detecting device.

That is to say, the pixel value of one pixel is represented as the integration of F(x, y, t). F(x, y, t) is a function representing the distribution of light intensity on the photoreception face of the detecting device. For example, the pixel value P is represented by Expression (1).

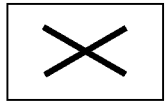

(1)

In Expression (1), $x_1$ represents the spatial coordinate at the left-side boundary of the photoreception face of the detecting device (X coordinate). $x_2$ represents the spatial coordinate at the right-side boundary of the photoreception face of the detecting device (X coordinate). In Expression (1), $y_1$ represents the spatial coordinate at the top-side boundary of the photoreception face of the detecting device (Y coordinate). $y_2$ represents the spatial coordinate at the bottom-side boundary of the photoreception face of the detecting device (Y coordinate). Also, $t_1$ represents the point-in-time at which conversion of incident light into an electric charge was started. $t_2$ represents the point-in-time at which conversion of incident light into an electric charge was ended.

Note that actually, the gain of the pixel values of the image data output from the image sensor is corrected for the overall frame, for example.

Each of the pixel values of the image data are integration values of the light cast on the photoreception face of each of the detecting elements of the image sensor, and of the light cast onto the image sensor, waveforms of light of the actual world 1 finer than the photoreception face of the detecting element are hidden in the pixel value as integrated values.

Hereafter, in the present Specification, the waveform of signals represented with a predetermined dimension as a reference may be referred to simply as waveforms.

Thus, the image of the actual world 1 (light signals) is integrated in the spatial direction and time direction in increments of pixels, so a part of the continuity of the image of the actual world 1 drops out from the image data, so another part of the continuity of the image of the actual world 1 is left in the image data. Or, there may be cases wherein continuity which has changed from the continuity of the image of the actual world 1 is included in the image data.

Further description will be made regarding the integration effect in the spatial direction for an image taken by an image sensor having integration effects.

Figure 7:
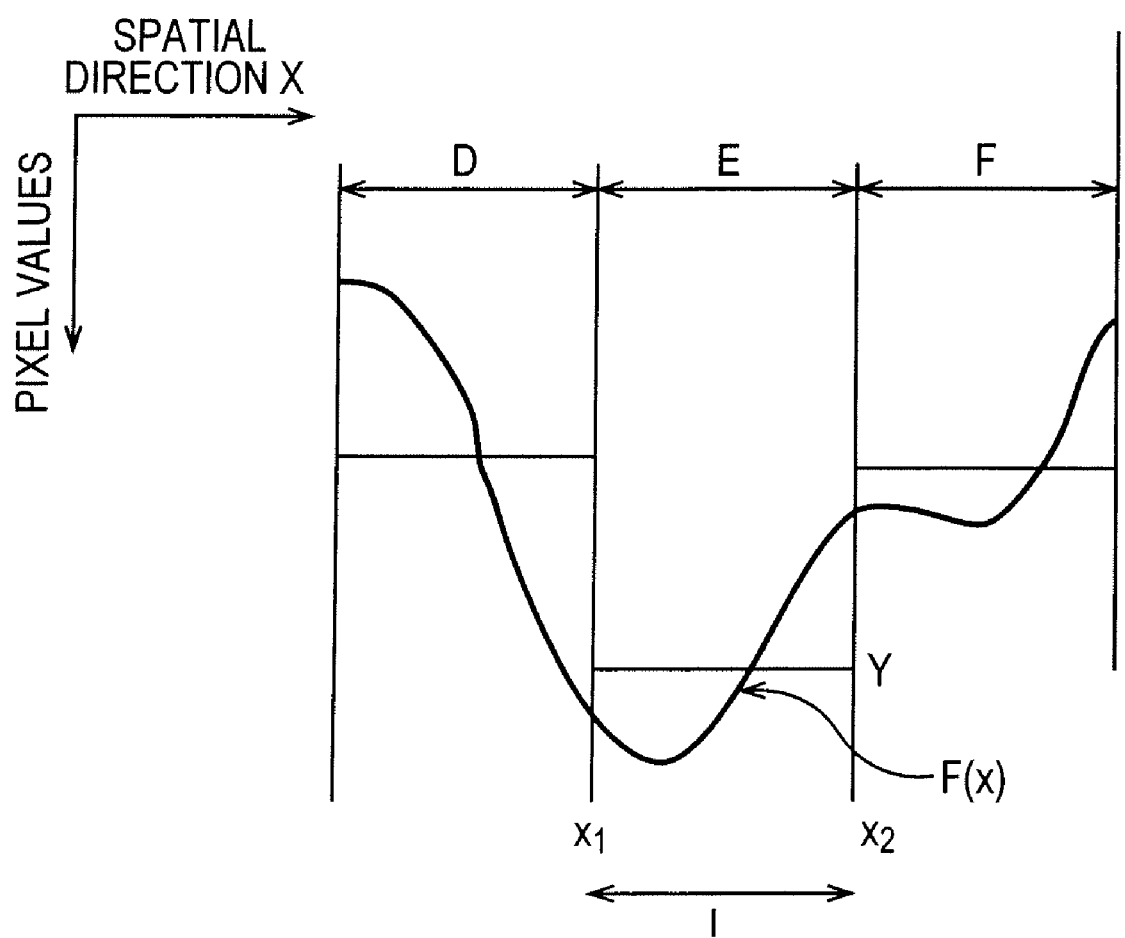
FIG. 7 is a diagram for describing the relation between light cast into detecting elements corresponding to pixel D through pixel F, and pixel values.

FIG. 7 is a diagram describing the relation between incident light to the detecting elements corresponding to the pixel D through pixel F, and the pixel values. F(x) in FIG. 7 is an example of a function representing the distribution of light intensity of the actual world 1, having the coordinate x in the spatial direction X in space (on the detecting device) as a variable. In other words, F(x) is an example of a function representing the distribution of light intensity of the actual world 1, with the spatial direction Y and time direction constant. In FIG. 7, L indicates the length in the spatial direction X of the photoreception face of the detecting device corresponding to the pixel D through pixel F.

The pixel value of a single pixel is represented as the integral of F(x). For example, the pixel value P of the pixel E is represented by Expression (2).

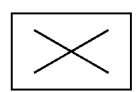

(2)

In Expression (2), $x_1$ represents the spatial coordinate in the spatial direction X at the left-side boundary of the photoreception face of the detecting device corresponding to the pixel E. $x_2$ represents the spatial coordinate in the spatial direction X at the right-side boundary of the photoreception face of the detecting device corresponding to the pixel E.

In the same way, further description will be made regarding the integration effect in the time direction for an image taken by an image sensor having integration effects.

Figure 8:
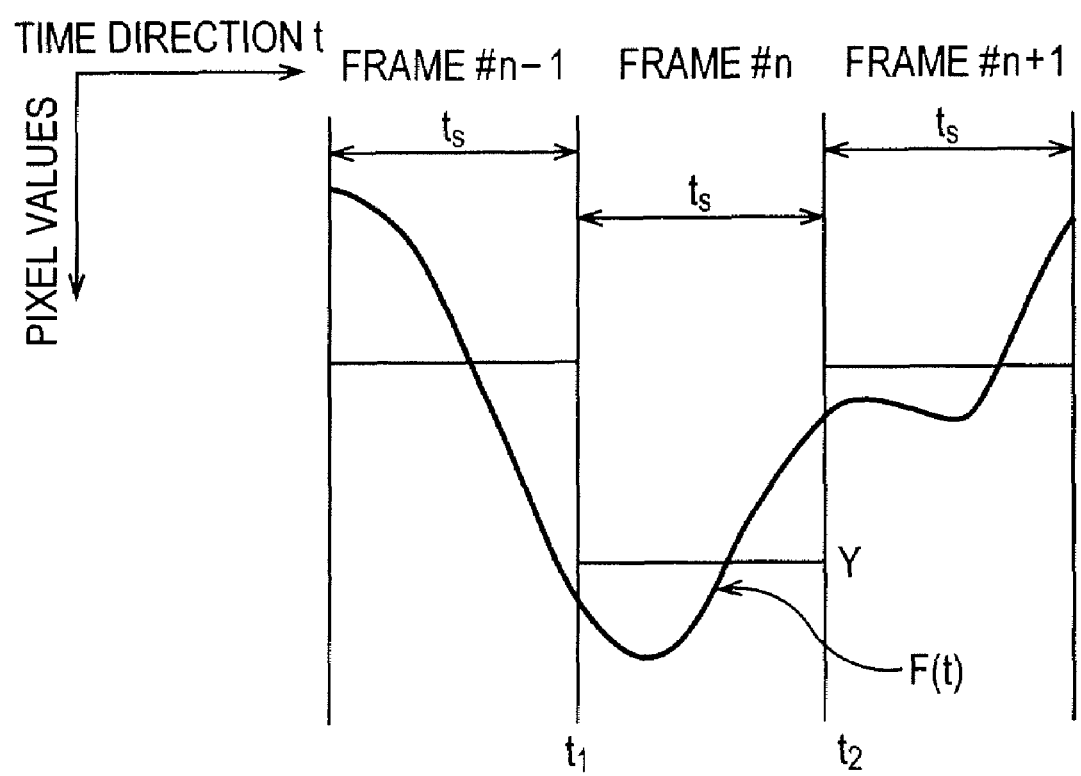
FIG. 8 is a diagram describing the relation between elapsing of time, light cast into a detecting element corresponding to one pixel, and pixel values.

FIG. 8 is a diagram for describing the relation between time elapsed, the incident light to a detecting element corresponding to a single pixel, and the pixel value. F(t) in FIG. 8 is a function representing the distribution of light intensity of the actual world 1, having the point-in-time t as a variable. In other words, F(t) is an example of a function representing the distribution of light intensity of the actual world 1, with the spatial direction Y and the spatial direction X constant. $T_s$ represents the shutter time.

The frame #n−1 is a frame which is previous to the frame #n time-wise, and the frame #n+1 is a frame following the frame #n time-wise. That is to say, the frame #n−1, frame #n, and frame #n+1, are displayed in the order of frame #n−1, frame #n, and frame #n+1.

Note that in the example shown in FIG. 8, the shutter time $t_s$ and the frame intervals are the same.

The pixel value of a single pixel is represented as the integral of F(t). For example, the pixel value P of the pixel of frame #n is represented by Expression (3).

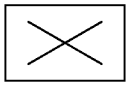
(3)

In Expression (3), $t_1$ represents the time at which conversion of incident light into an electric charge was started. $t_2$ represents the time at which conversion of incident light into an electric charge was ended.

Hereafter, the integration effect in the spatial direction by the sensor 2 will be referred to simply as spatial integration effect, and the integration effect in the time direction by the sensor 2 also will be referred to simply as time integration effect. Also, space integration effects or time integration effects will be simply called integration effects.

Next, description will be made regarding an example of continuity of data included in the data 3 acquired by the image sensor having integration effects.

Figure 9:
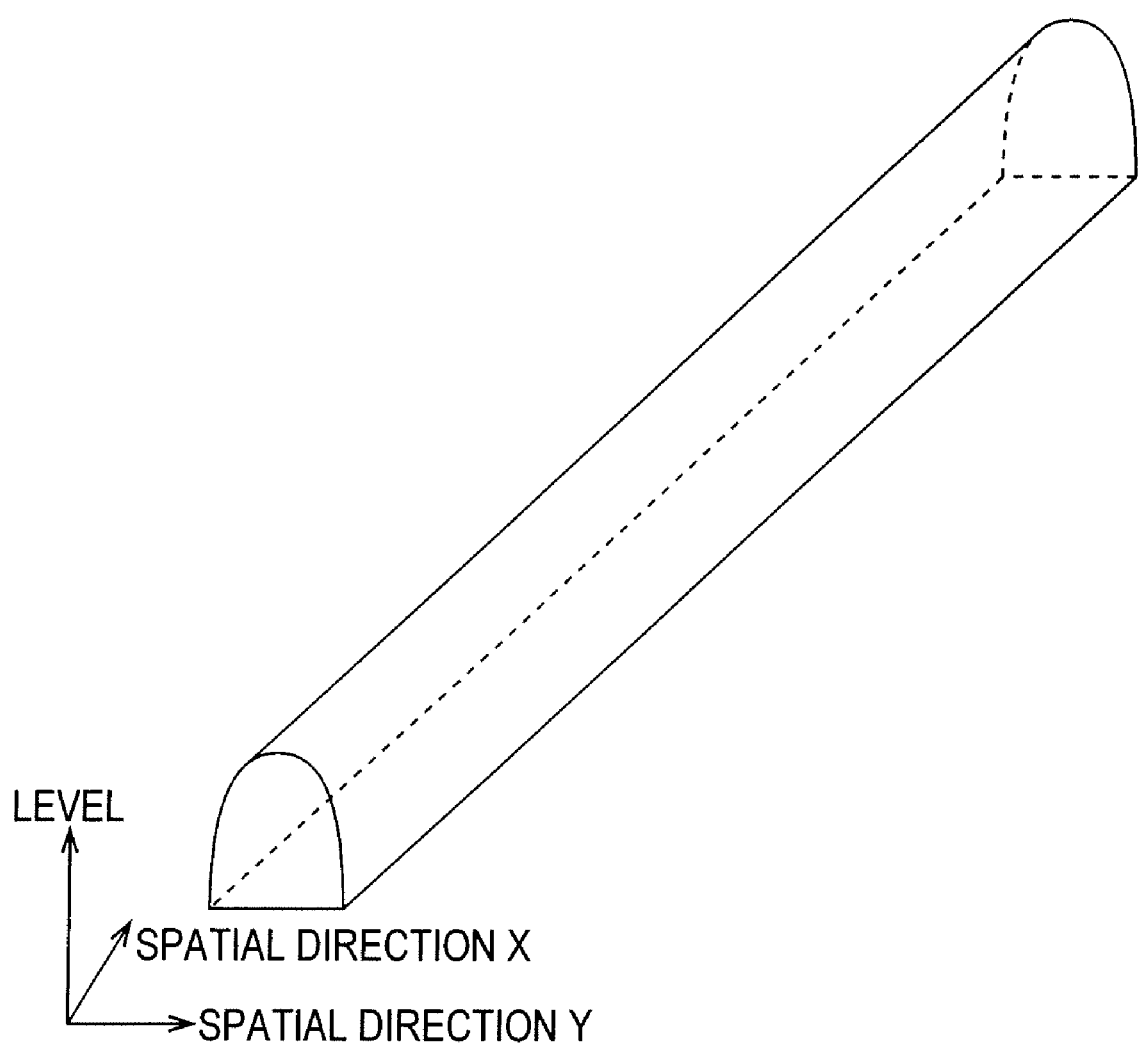
FIG. 9 is a diagram illustrating an example of an image of a linear object in the actual world 1.

FIG. 9 is a diagram illustrating a linear object of the actual world 1 (e.g., a fine line), i.e., an example of distribution of light intensity. In FIG. 9, the position to the upper side of the drawing indicates the intensity (level) of light, the position to the upper right side of the drawing indicates the position in the spatial direction X which is one direction of the spatial directions of the image, and the position to the right side of the drawing indicates the position in the spatial direction Y which is the other direction of the spatial directions of the image.

The image of the linear object of the actual world 1 includes predetermined continuity. That is to say, the image shown in FIG. 9 has continuity in that the cross-sectional shape (the change in level as to the change in position in the direction orthogonal to the length direction), at any arbitrary position in the length direction.

Figure 10:
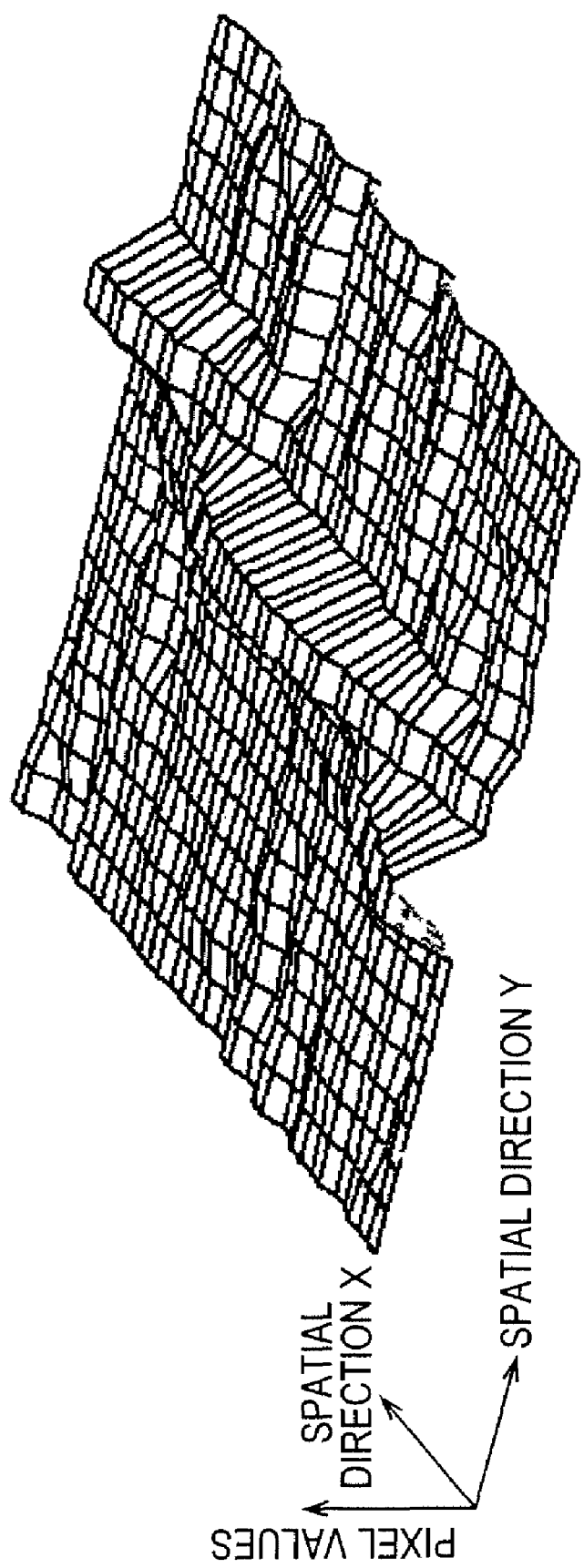
FIG. 10 is a diagram illustrating an example of pixel values of image data obtained by actual imaging.

FIG. 10 is a diagram illustrating an example of pixel values of image data obtained by actual image-taking, corresponding to the image shown in FIG. 9.

That is to say, FIG. 10 is a model diagram of the image data obtained by imaging, with the image sensor, an image of a linear object having a diameter shorter than the length L of the photoreception face of each pixel, and extending in a direction offset from the array of the pixels of the image sensor (the vertical or horizontal array of the pixels). The image cast into the image sensor at the time that the image data shown in FIG. 10 was acquired is an image of the linear object of the actual world 1 shown in FIG. 9.

In FIG. 10, the position to the upper side of the drawing indicates the pixel value, the position to the upper right side of the drawing indicates the position in the spatial direction X which is one direction of the spatial directions of the image, and the position to the right side of the drawing indicates the position in the spatial direction Y which is the other direction of the spatial directions of the image. The direction indicating the pixel value in FIG. 10 corresponds to the direction of level in FIG. 9, and the spatial direction X and spatial direction Y in FIG. 10 also are the same as the directions in FIG. 9.

In the event of taking an image of a linear object having a diameter shorter than the length L of the photoreception face of each pixel with the image sensor, the linear object is represented in the image data obtained as a result of the image-taking as multiple arc shapes (half-discs) having a predetermined length which are arrayed in a diagonally-offset fashion, in a model representation, for example. The arc shapes are of approximately the same shape. One arc shape is formed on one row of pixels vertically, or is formed on one row of pixels horizontally. For example, one arc shape shown in FIG. 10 is formed on one row of pixels vertically.

Thus, with the image data taken and obtained by the image sensor for example, the continuity in that the cross-sectional shape in the spatial direction Y at any arbitrary position in the length direction is the same, which the linear object image of the actual world 1 had, is lost. Also, it can be said that the continuity, which the linear object image of the actual world 1 had, has changed into continuity in that arc shapes of the same shape formed on one row of pixels vertically or formed on one row of pixels horizontally are arrayed at predetermined intervals.

Figure 11:
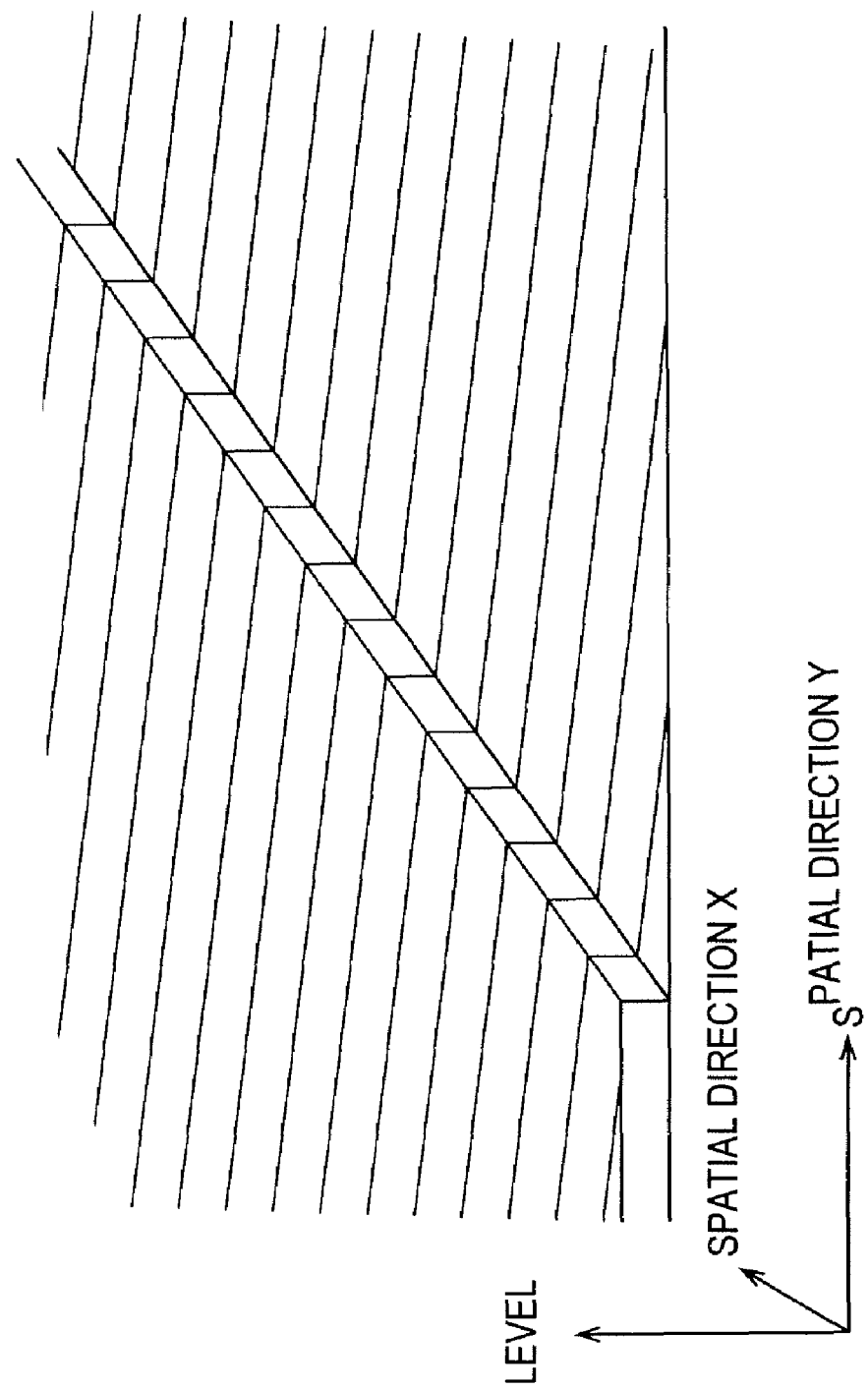
FIG. 11 is a diagram illustrating an example of an image of the actual world 1, of an object which is of a color different from that of the background, having a monotone and linear edge.

FIG. 11 is a diagram illustrating an image in the actual world 1 of an object having a straight edge, and is of a monotone color different from that of the background, i.e., an example of distribution of light intensity. In FIG. 11, the position to the upper side of the drawing indicates the intensity (level) of light, the position to the upper right side of the drawing indicates the position in the spatial direction X which is one direction of the spatial directions of the image, and the position to the right side of the drawing indicates the position in the spatial direction Y which is the other direction of the spatial directions of the image.

The image of the object of the actual world 1 which has a straight edge and is of a monotone color different from that of the background, includes predetermined continuity. That is to say, the image shown in FIG. 11 has continuity in that the cross-sectional shape (the change in level as to the change in position in the direction orthogonal to the edge) is the same at any arbitrary position in the length direction of the edge.

Figure 12:
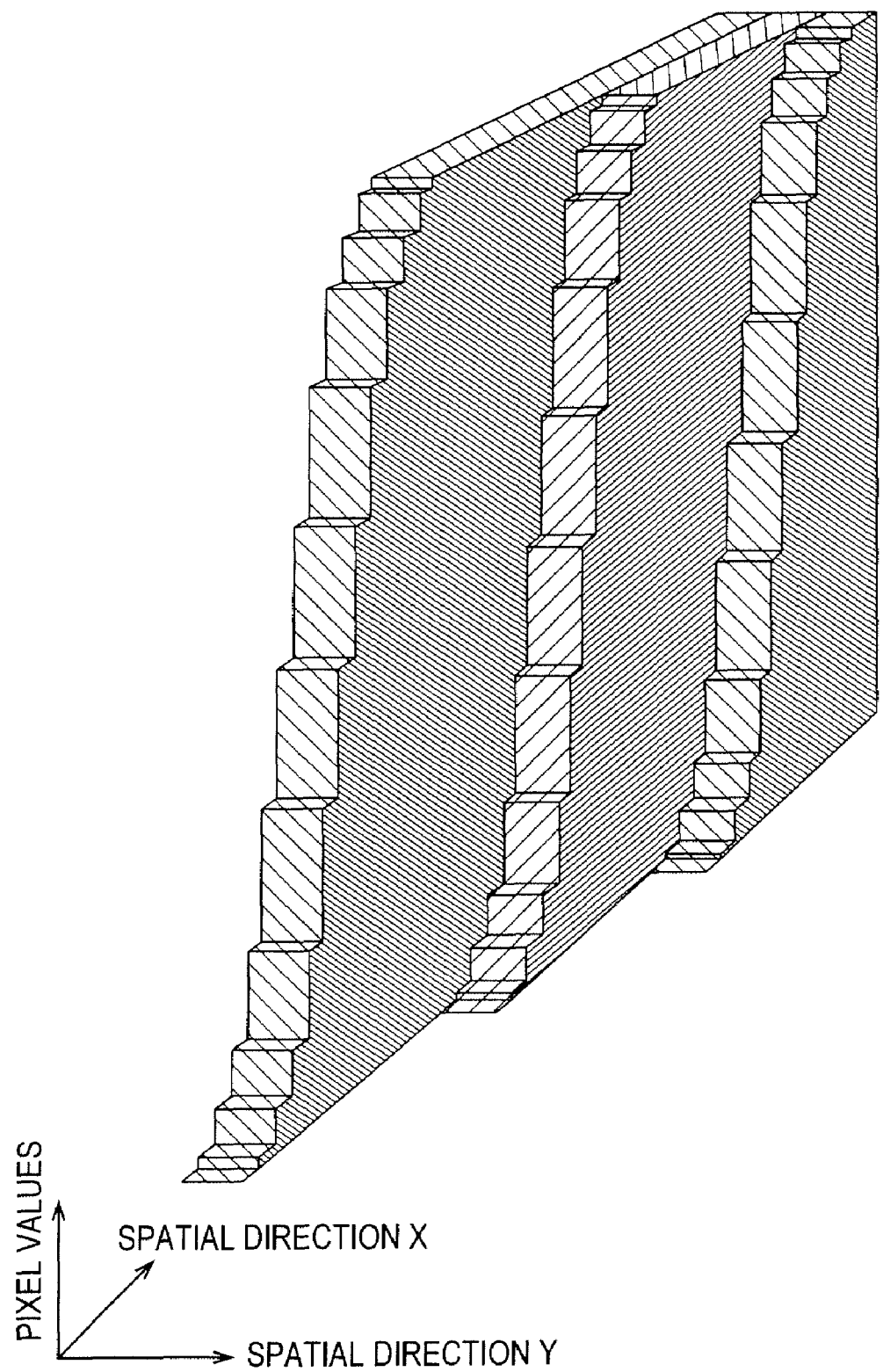
FIG. 12 is a diagram illustrating an example of pixel values of image data obtained by actual imaging.

FIG. 12 is a diagram illustrating an example of pixel values of the image data obtained by actual image-taking, corresponding to the image shown in FIG. 11. As shown in FIG. 12, the image data is in a stepped shape, since the image data is made up of pixel values in increments of pixels.

Figure 13:
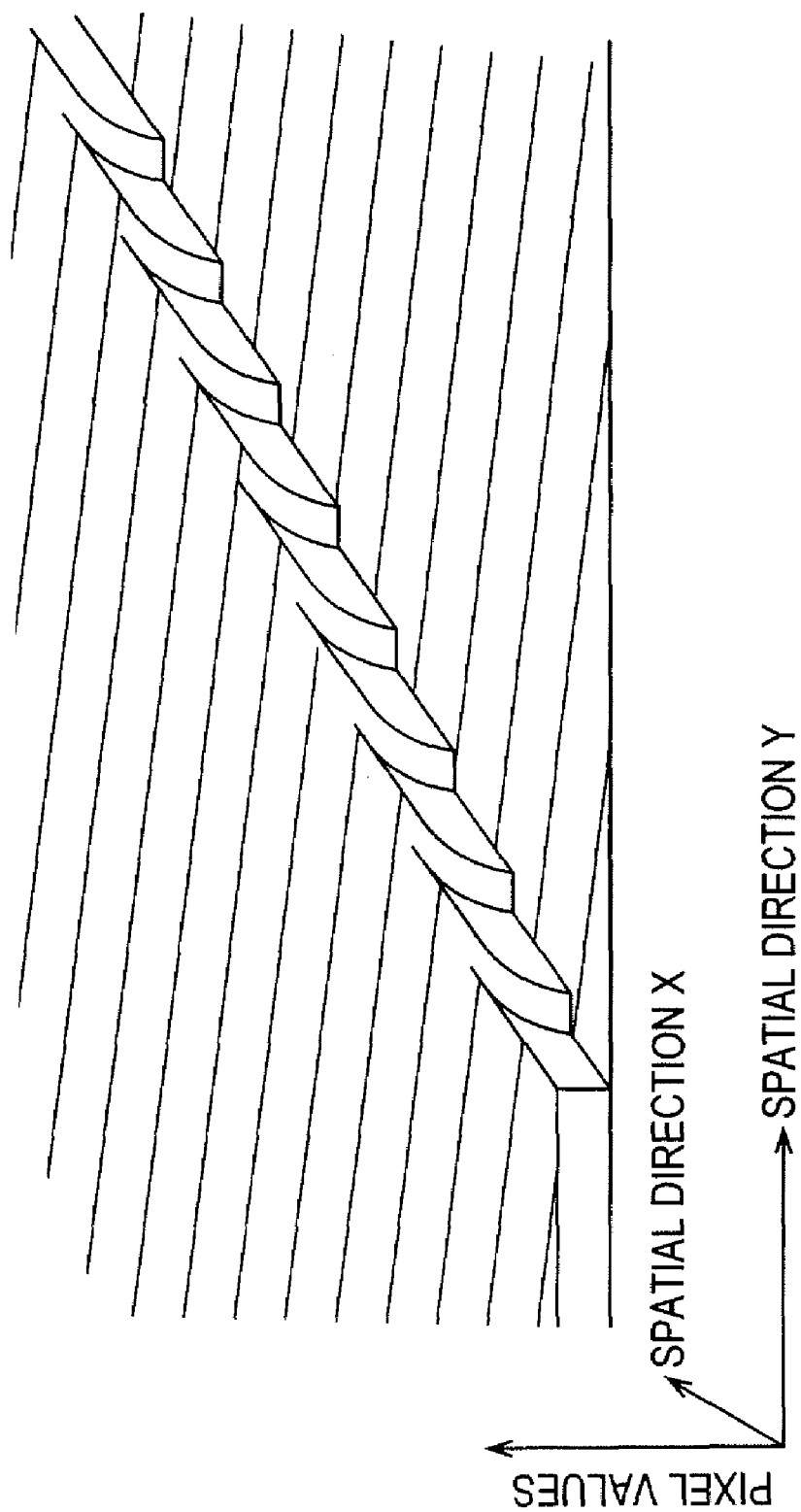
FIG. 13 is a schematic diagram of image data.

FIG. 13 is a model diagram illustrating the image data shown in FIG. 12.

The model diagram shown in FIG. 13 is a model diagram of image data obtained by taking, with the image sensor, an image of the object of the actual world 1 which has a straight edge and is of a monotone color different from that of the background, and extending in a direction offset from the array of the pixels of the image sensor (the vertical or horizontal array of the pixels). The image cast into the image sensor at the time that the image data shown in FIG. 13 was acquired is an image of the object of the actual world 1 which has a straight edge and is of a monotone color different from that of the background, shown in FIG. 11.

In FIG. 13, the position to the upper side of the drawing indicates the pixel value, the position to the upper right side of the drawing indicates the position in the spatial direction X which is one direction of the spatial directions of the image, and the position to the right side of the drawing indicates the position in the spatial direction Y which is the other direction of the spatial directions of the image. The direction indicating the pixel value in FIG. 13 corresponds to the direction of level in FIG. 11, and the spatial direction X and spatial direction Y in FIG. 13 also are the same as the directions in FIG. 11.

In the event of taking an image of an object of the actual world 1 which has a straight edge and is of a monotone color different from that of the background with an image sensor, the straight edge is represented in the image data obtained as a result of the image-taking as multiple pawl shapes having a predetermined length which are arrayed in a diagonally-offset fashion, in a model representation, for example. The pawl shapes are of approximately the same shape. One pawl shape is formed on one row of pixels vertically, or is formed on one row of pixels horizontally. For example, one pawl shape shown in FIG. 13 is formed on one row of pixels vertically.

Thus, the continuity of image of the object of the actual world 1 which has a straight edge and is of a monotone color different from that of the background, in that the cross-sectional shape is the same at any arbitrary position in the length direction of the edge, for example, is lost in the image data obtained by imaging with an image sensor. Also, it can be said that the continuity, which the image of the object of the actual world 1 which has a straight edge and is of a monotone color different from that of the background had, has changed into continuity in that pawl shapes of the same shape formed on one row of pixels vertically or formed on one row of pixels horizontally are arrayed at predetermined intervals.

The data continuity detecting unit 101 detects such data continuity of the data 3 which is an input image, for example. For example, the data continuity detecting unit 101 detects data continuity by detecting regions having a continuity in a predetermined dimensional direction. For example, the data continuity detecting unit 101 detects a region wherein the same arc shapes are arrayed at constant intervals, such as shown in FIG. 10. Also, for example, the data continuity detecting unit 101 detects a region wherein the same pawl shapes are arrayed at constant intervals, such as shown in FIG. 13.

Also, the data continuity detecting unit 101 detects continuity of the data by detecting angle (gradient) in the spatial direction, indicating an array of the same shapes.

Also, for example, the data continuity detecting unit 101 detects continuity of data by detecting angle (movement) in the space direction and time direction, indicating the array of the same shapes in the space direction and the time direction.

Further, for example, the data continuity detecting unit 101 detects continuity in the data by detecting the length of the region having continuity in a predetermined dimensional direction.

Hereafter, the portion of data 3 where the sensor 2 has projected the image of the object of the actual world 1 which has a straight edge and is of a monotone color different from that of the background, will also be called a two-valued edge.

Now, with conventional signal processing, desired high-resolution data, for example, is generated from the data 3.

Conversely, with the signal processing by the signal processing device 4, the actual world 1 is estimated from the data 3, and the high-resolution data is generated based on the estimation results. That is to say, the actual world 1 is estimated from the data 3, and the high-resolution data is generated based on the estimated actual world 1, taking into consideration the data 3.

In order to generate the high-resolution data from the actual world 1, there is the need to take into consideration the relation between the actual world 1 and the data 3. For example, how the actual world 1 is projected on the data 3 by the sensor 2 which is a CCD, is taken into consideration.

The sensor 2 which is a CCD has integration properties as described above. That is to say, one unit of the data 3 (e.g., pixel value) can be calculated by integrating a signal of the actual world 1 with a detection region (e.g., photoreception face) of a detection device (e.g., CCD) of the sensor 2.

Applying this to the high-resolution data, the high-resolution data can be obtained by applying processing, wherein a virtual high-resolution sensor projects signals of the actual world 1 to the data 3, to the estimated actual world 1.

In other words, if the signals of the actual world 1 can be estimated from the data 3, one value contained in the high-resolution data can be obtained by integrating signals of the actual world 1 for each detection region of the detecting elements of the virtual high-resolution sensor (in the time-space direction).

For example, in the event that the change in signals of the actual world 1 are smaller than the size of the detection region of the detecting elements of the sensor 2, the data 3 cannot expresses the small changes in the signals of the actual world 1. Accordingly, high-resolution data indicating small change of the signals of the actual world 1 can be obtained by integrating the signals of the actual world 1 estimated from the data 3 with each region (in the time-space direction) that is smaller in comparison with the change in signals of the actual world 1.

That is to say, integrating the signals of the estimated actual world 1 with the detection region with regard to each detecting element of the virtual high-resolution sensor enables the high-resolution data to be obtained.

With the signal processing device 4, the image generating unit 103 generates the high-resolution data by integrating the signals of the estimated actual world 1 in the time-space direction regions of the detecting elements of the virtual high-resolution sensor, for example.

Next, in order to estimate the actual world 1 from the data 3, at the signal processing device 4, the relationship between the data 3 and the actual world 1, continuity, and a spatial or temporal mixture in the data 3 (space mixture or time mixture), are used.

Here, a mixture means a value in the data 3 wherein the signals of two objects in the actual world 1 are mixed to yield a single value.

A space mixture means the mixture of the signals of two objects in the spatial direction due to the spatial integration effects of the sensor 2. Time mixture will be described later.

The actual world 1 itself is made up of countless events, and accordingly, in order to represent the actual world 1 itself with mathematical expressions, for example, there is the need to have an infinite number of variables. It is impossible to predict all events of the actual world 1 from the data 3.

In the same way, it is impossible to predict all of the signals of the actual world 1 from the data 3.

Figure 14:
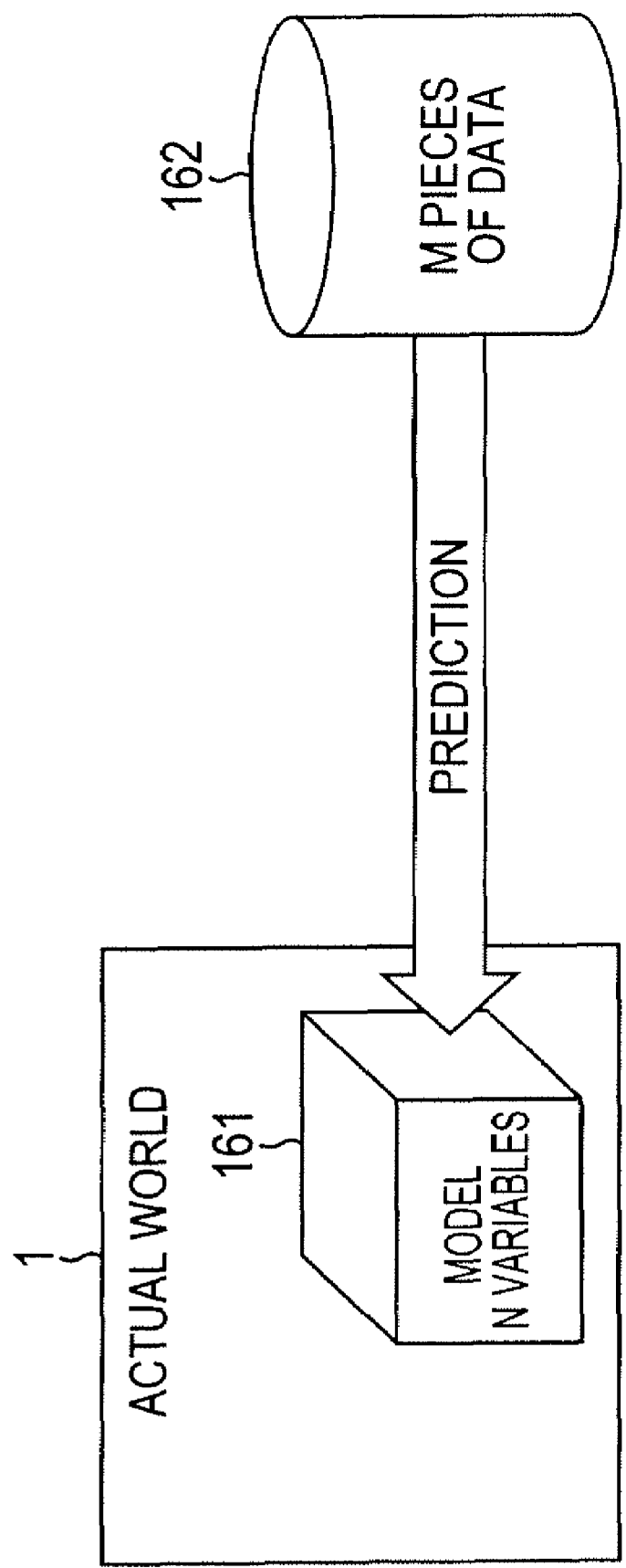
FIG. 14 is a diagram for describing estimation of a model 161 with M pieces of data 162.

Accordingly, with the signal processing device 4, of the signals of the actual world 1, a portion which has continuity and which can be expressed by the function $f(x, y, z, t)$ is taken note of, and the portion of the signals of the actual world 1 which can be represented by the function $f(x, y, z, t)$ and has continuity is approximated with a model 161 represented by N variables. As shown in FIG. 14, the model 161 is predicted from the M pieces of data 162 in the data 3.

In order to enable the model 161 to be predicted from the M pieces of data 162, first, there is the need to represent the model 161 with N variables based on the continuity, and second, to generate an expression using the N variables which indicates the relation between the model 161 represented by the N variables and the M pieces of data 162 based on the integral properties of the sensor 2. Since the model 161 is represented by the N variables, based on the continuity, it can be said that the expression using the N variables that indicates the relation between the model 161 represented by the N variables and the M pieces of data 162, describes the relation between the part of the signals of the actual world 1 having continuity, and the part of the data 3 having data continuity.

In other words, the part of the signals of the actual world 1 having continuity, that is approximated by the model 161 represented by the N variables, generates data continuity in the data 3.

The data continuity detecting unit 101 detects the part of the data 3 where data continuity has been generated by the part of the signals of the actual world 1 having continuity, and the characteristics of the part where data continuity has been generated.

Figure 15:
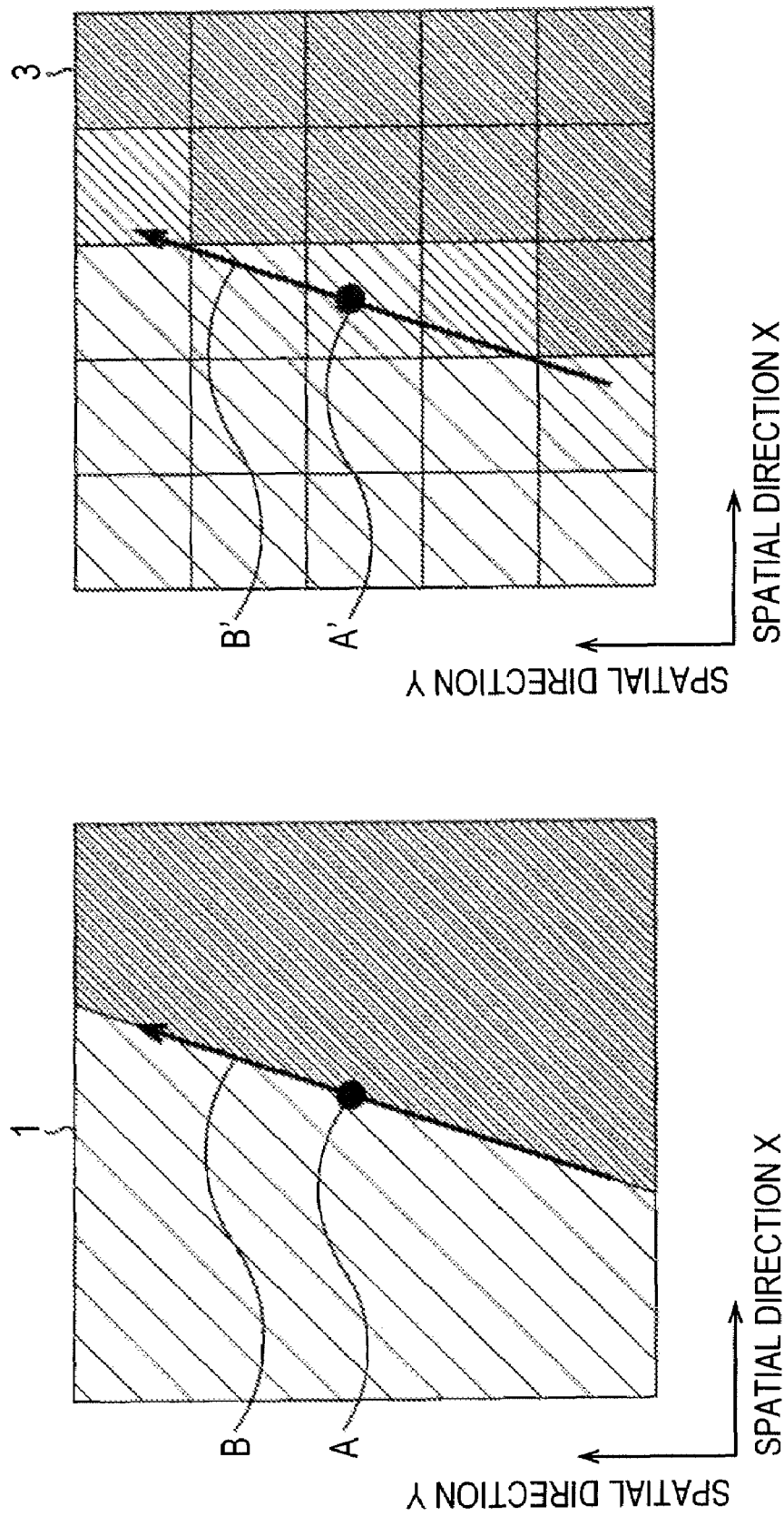
FIG. 15 is a diagram for describing the relation between signals of the actual world 1 and data 3.

For example, as shown in FIG. 15, in an image of the object of the actual world 1 which has a straight edge and is of a monotone color different from that of the background, the edge at the position of interest indicated by A in FIG. 15, has a gradient. The arrow B in FIG. 15 indicates the gradient of the edge. A predetermined edge gradient can be represented as an angle as to a reference axis or as a direction as to a reference position. For example, a predetermined edge gradient can be represented as the angle between the coordinates axis of the spatial direction X and the edge. For example, the predetermined edge gradient can be represented as the direction indicated by the length of the spatial direction X and the length of the spatial direction Y.

At the time that the image of the object of the actual world 1 which has a straight edge and is of a monotone color different from that of the background is obtained at the sensor 2 and the data 3 is output, pawl shapes corresponding to the edge are arrayed in the data 3 at the position corresponding to the position of interest (A) of the edge in the image of the actual world 1, which is indicated by A' in FIG. 15, and pawl shapes corresponding to the edge are arrayed in the direction corresponding to the gradient of the edge of the image in the actual world 1, in the direction of the gradient indicated by B' in FIG. 15.

The model 161 represented with the N variables approximates such a portion of the signals of the actual world 1 generating data continuity in the data 3.

At the time of formulating an expression using the N variables indicating the relation between the model 161 represented with the N variables and the M pieces of data 162, the values of part where data continuity is generated in the data 3 are used.

Figure 16:
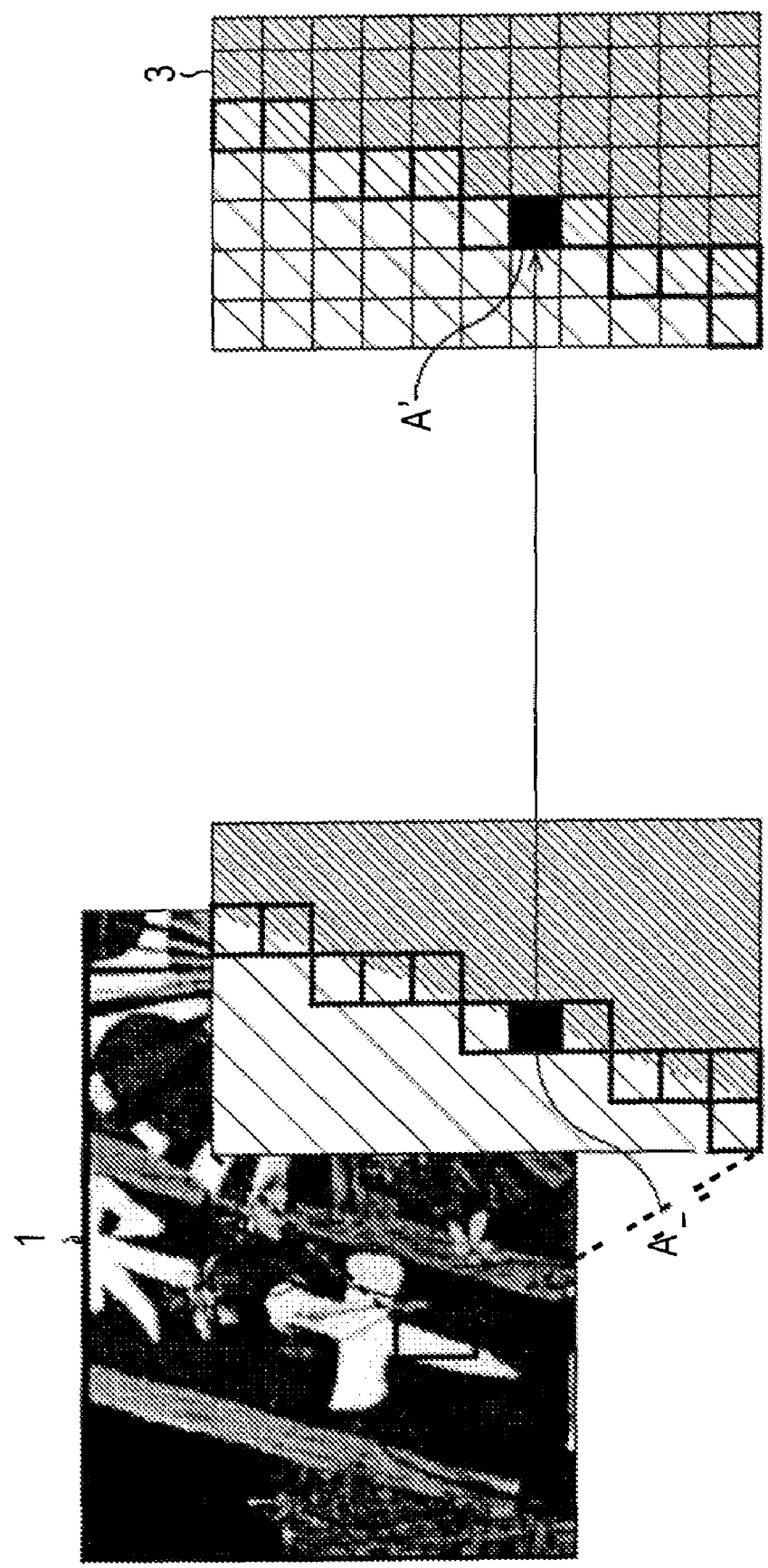
FIG. 16 is a diagram illustrating an example of data 3 of interest at the time of creating an Expression.

In this case, in the data 3 shown in FIG. 16, taking note of the values where data continuity is generated and which belong to a mixed region, an expression is formulated with a value integrating the signals of the actual world 1 as being equal to a value output by the detecting element of the sensor 2. For example, multiple expressions can be formulated regarding the multiple values in the data 3 where data continuity is generated.

In FIG. 16, A denotes the position of interest of the edge, and A' denotes (the position of) the pixel corresponding to the position (A) of interest of the edge in the image of the actual world 1.

Now, a mixed region means a region of data in the data 3 wherein the signals for two objects in the actual world 1 are mixed and become one value. For example, a pixel value wherein, in the image of the object of the actual world 1 which has a straight edge and is of a monotone color different from that of the background in the data 3, the image of the object having the straight edge and the image of the background are integrated, belongs to a mixed region.

Figure 17:
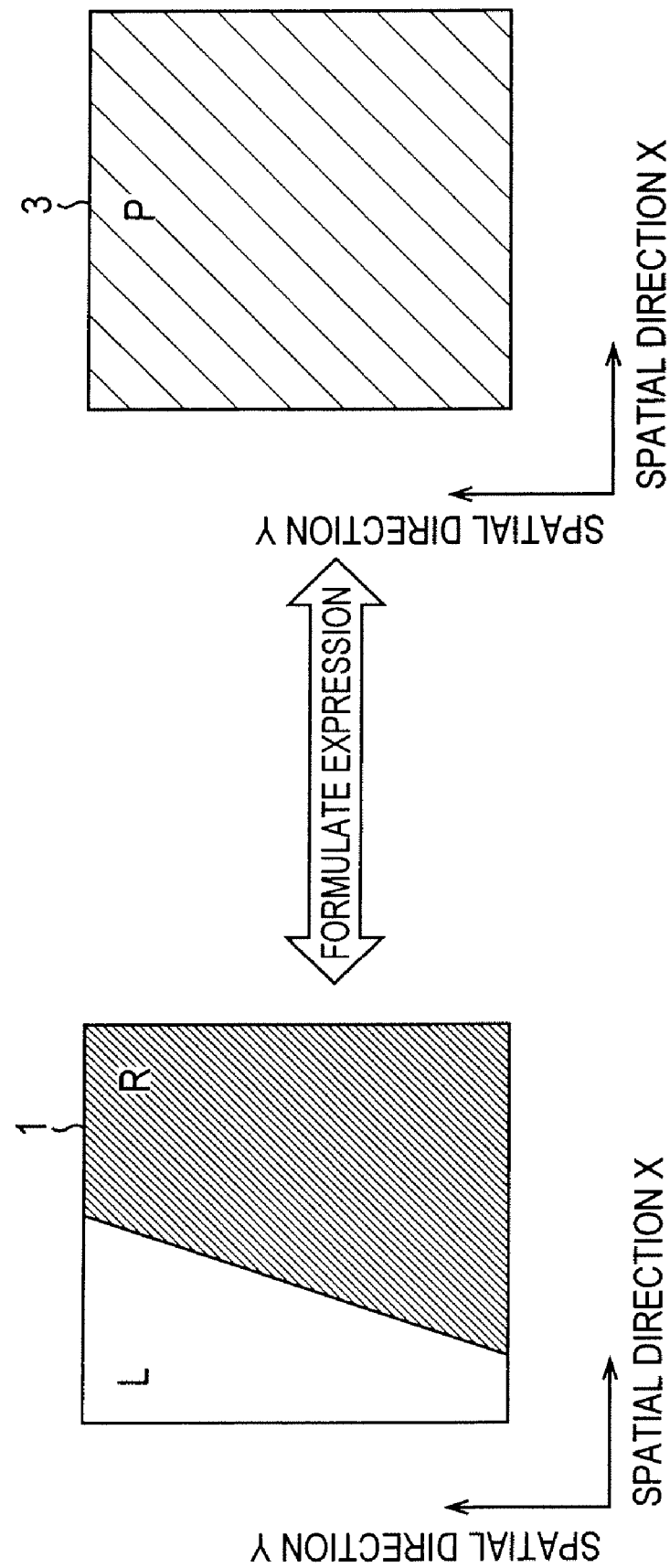
FIG. 17 is a diagram for describing signals for two objects in the actual world 1, and values belonging to a mixed region at the time of creating an expression.

FIG. 17 is a diagram describing signals for two objects in the actual world 1 and values belonging to a mixed region, in a case of formulating an expression.

FIG. 17 illustrates, to the left, signals of the actual world 1 corresponding to two objects in the actual world 1 having a predetermined expansion in the spatial direction X and the spatial direction Y. which are acquired at the detection region of a single detecting element of the sensor 2. FIG. 17 illustrates, to the right, a pixel value P of a single pixel in the data 3 wherein the signals of the actual world 1 illustrated to the left in FIG. 17 have been projected by a single detecting element of the sensor 2. That is to say, illustrates a pixel value P of a single pixel in the data 3 wherein the signals of the actual world 1 corresponding to two objects in the actual world 1 having a predetermined expansion in the spatial direction X and the spatial direction Y which are acquired by a single detecting element of the sensor 2, have been projected.

L in FIG. 17 represents the level of the signal of the actual world 1 which is shown in white in FIG. 17, corresponding to one object in the actual world 1. R in FIG. 17 represents the level of the signal of the actual world 1 which is shown hatched in FIG. 17, corresponding to the other object in the actual world 1.

Here, the mixture ratio $\alpha$ is the ratio of (the area of) the signals corresponding to the two objects cast into the detecting region of the one detecting element of the sensor 2 having a predetermined expansion in the spatial direction X and the spatial direction Y. For example, the mixture ratio $\alpha$ represents the ratio of area of the level L signals cast into the detecting region of the one detecting element of the sensor 2 having a predetermined expansion in the spatial direction X and the spatial direction Y, as to the area of the detecting region of a single detecting element of the sensor 2.

In this case, the relation between the level L, level R, and the pixel value P, can be represented by Expression (4).

$$\alpha \times L + f(1-\alpha) \times R = P \tag{4}$$

Note that there may be cases wherein the level R may be taken as the pixel value of the pixel in the data 3 positioned to the right side of the pixel of interest, and there may be cases wherein the level L may be taken as the pixel value of the pixel in the data 3 positioned to the left side of the pixel of interest.

Also, the time direction can be taken into consideration in the same way as with the spatial direction for the mixture ratio $\alpha$ and the mixed region. For example, in the event that an object in the actual world 1 which is the object of image-taking, is moving as to the sensor 2, the ratio of signals for the two objects cast into the detecting region of the single detecting element of the sensor 2 changes in the time direction. The signals for the two objects regarding which the ratio changes in the time direction, that have been cast into the detecting region of the single detecting element of the sensor 2, are projected into a single value of the data 3 by the detecting element of the sensor 2.

The mixture of signals for two objects in the time direction due to time integration effects of the sensor 2 will be called time mixture.

The data continuity detecting unit 101 detects regions of pixels in the data 3 where signals of the actual world 1 for two objects in the actual world 1, for example, have been projected. The data continuity detecting unit 101 detects gradient in the data 3 corresponding to the gradient of an edge of an image in the actual world 1, for example.

The actual world estimating unit 102 estimates the signals of the actual world 1 by formulating an expression using N variables, representing the relation between the model 161 represented by the N variables and the M pieces of data 162, based on the region of the pixels having a predetermined mixture ratio α detected by the data continuity detecting unit 101 and the gradient of the region, for example, and solving the formulated expression.

Description will be made further regarding specific estimation of the actual world 1.

Of the signals of the actual world represented by the function F(x, y, z, t) let us consider approximating the signals of the actual world represented by the function F(x, y, t) at the cross-section in the spatial direction Z (the position of the sensor 2), with an approximation function f(x, y, t) determined by a position x in the spatial direction X, a position y in the spatial direction Y, and a point-in-time t.

Now, the detection region of the sensor 2 has an expanse in the spatial direction X and the spatial direction Y. In other words, the approximation function f(x, y, t) is a function approximating the signals of the actual world 1 having an expanse in the spatial direction and time direction, which are acquired with the sensor 2.

Let us say that projection of the signals of the actual world 1 from the sensor 2 yields a value P(x, y, t) of the data 3. The value P(x, y, t) of the data 3 is a pixel value which the sensor 2 which is an image sensor outputs, for example.

Now, in the event that the projection by the sensor 2 can be formulated, the value obtained by projecting the approximation function f(x, y, t) can be represented as a projection function S(x, y, t).

Obtaining the projection function S(x, y, t) has the following problems.

First, generally, the function F(x, y, z, t) representing the signals of the actual world 1 can be a function with an infinite number of orders.

Second, even if the signals of the actual world could be described as a function, the projection function S(x, y, t) via projection of the sensor 2 generally cannot be determined. That is to say, the action of projection by the sensor 2, in other words, the relation between the input signals and output signals of the sensor 2, is unknown, so the projection function S(x, y, t) cannot be determined.

With regard to the first problem, let us consider expressing the function f(x, y, t) approximating signals of the actual world 1 with the sum of products of the function $f_i(x, y, t)$ which is a describable function (e.g., a function with a finite number of orders) and variables $w_i$.

Also, with regard to the second problem, formulating projection by the sensor 2 allows us to describe the function $S_i(x, y, t)$ from the description of the function $f_i(x, y, t)$.

That is to say, representing the function f(x, y, t) approximating signals of the actual world 1 with the sum of products of the function $f_i(x, y, t)$ and variables $w_i$, Expression (5) can be obtained.

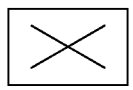

(5)

For example, as indicated in Expression (6), the relation between the data 3 and the signals of the actual world can be formulated as shown in Expression (7) from Expression (5) by formulating the projection of the sensor 2.

(6)

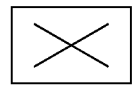

(7)

In Expression (7), j represents the index of the data.

In the event that M data groups (j=1 through M) common with the N variables $w_i$ (i=1 through N) exists in Expression (7), Expression (8) is satisfied, so the model 161 of the actual world can be obtained from data 3.

$$N \leq M \quad (8)$$

N is the number of variables representing the model 161 approximating the actual world 1. M is the number of pieces of data 162 include in the data 3.

Representing the function f(x, y, t) approximating the actual world 1 signals with Expression (5) allows the variable portion $w_i$ to be handled independently. At this time, i represents the number of variables. Also, the form of the function represented by $f_i$ can be handed independently, and a desired function can be used for $f_i$.

Accordingly, the number N of the variables $w_i$ can be defined without dependence on the function $f_i$, and the variables $w_i$ can be obtained from the relation between the number N of the variables $w_i$ and the number of pieces of data M.

That is to say, using the following three allows the actual world 1 to be estimated from the data 3.

First, the N variables are determined. That is to say, Expression (5) is determined. This enables describing the actual world 1 using continuity. For example, the signals of the actual world 1 can be described with a model 161 wherein a cross-section is expressed with a polynomial, and the same cross-sectional shape continues in a constant direction.

Second, for example, projection by the sensor 2 is formulated, describing Expression (7). For example, this is formulated such that the results of integration of the signals of the actual world 2 are data 3.

Third, M pieces of data 162 are collected to satisfy Expression (8). For example, the data 162 is collected from a region having data continuity that has been detected with the data continuity detecting unit 101. For example, data 162 of a region wherein a constant cross-section continues, which is an example of continuity, is collected.

In this way, the relation between the data 3 and the actual world 1 is described with Expression (5), and M pieces of data 162 are collected, thereby satisfying Expression (8), and the actual world 1 can be estimated.

More specifically, in the event of N=M, the number of variables N and the number of expressions M are equal, so the variables $w_i$ can be obtained by formulating a simultaneous equation.

Also, in the event that N<M, various solving methods can be applied. For example, the variables $w_i$ can be obtained by least-square.

Now, the solving method by least-square will be described in detail

First, an Expression (9) for predicting data 3 from the actual world 1 will be shown according to Expression (7).

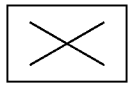 (9)

In Expression (9), $P'_j(x_j, y_j, t_j)$ is a prediction value.

The sum of squared differences E for the prediction value P' and observed value P is represented by Expression (10).

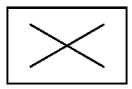 (10)

The variables $w_i$ are obtained such that the sum of squared differences E is the smallest. Accordingly, the partial differential value of Expression (10) for each variable $W_k$ is 0. That is to say, Expression (11) holds.

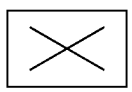 (11)

Expression (11) yields Expression (12).

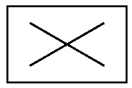 (12)

When Expression (12) holds with K=1 through N, the solution by least-square is obtained. The normal equation thereof is shown in Expression (13).

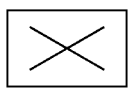 (13)

Note that in Expression (13), $S_i(x_j, y_j, t_j)$ is described as $S_i(j)$

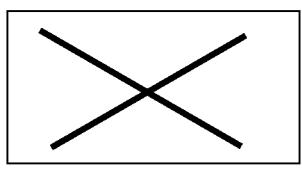 (14)

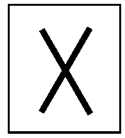 (15)

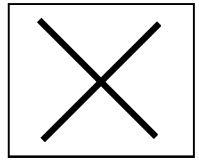 (16)

From Expression (14) through Expression (16), Expression (13) can be expressed as $S_{MAT}W_{MAT}=P_{MAT}$.

In Expression (13), $S_i$ represents the projection of the actual world 1. In Expression (13), $P_j$ represents the data 3. In Expression (13), $w_i$ represents variables for describing and obtaining the characteristics of the signals of the actual world 1.

Accordingly, inputting the data 3 into Expression (13) and obtaining $W_{MAT}$ by a matrix solution or the like enables the actual world 1 to be estimated. That is to say, the actual world 1 can be estimated by computing Expression (17).

$$W_{MAT}=S_{MAT}^{-1}P_{MAT} \qquad (17)$$

Note that in the event that $S_{MAT}$ is not regular, a transposed matrix of $S_{MAT}$ can be used to obtain $W_{MAT}$.

The actual world estimating unit 102 estimates the actual world 1 by, for example, inputting the data 3 into Expression (13) and obtaining $W_{MAT}$ by a matrix solution or the like.

Now, an even more detailed example will be described. For example, the cross-sectional shape of the signals of the actual world 1, i.e., the change in level as to the change in position, will be described with a polynomial. Let us assume that the cross-sectional shape of the signals of the actual world 1 is constant, and that the cross-section of the signals of the actual world 1 moves at a constant speed. Projection of the signals of the actual world 1 from the sensor 2 to the data 3 is formulated by three-dimensional integration in the time-space direction of the signals of the actual world 1.

The assumption that the cross-section of the signals of the actual world 1 moves at a constant speed yields Expression (18) and Expression (19).

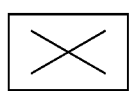 (18)

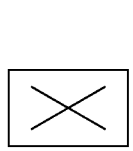 (19)

Here, $v_x$ and $v_y$ are constant.

Using Expression (18) and Expression (19), the cross-sectional shape of the signals of the actual world 1 can be represented as in Expression (20).

$$f(x', y') = f(x + v_x t, y + v_y t) \quad (20)$$

Formulating projection of the signals of the actual world 1 from the sensor 2 to the data 3 by three-dimensional integration in the time-space direction of the signals of the actual world 1 yields Expression (21).

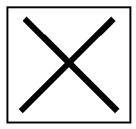

(21)

In Expression (21), S(x, y, t) represents an integrated value the region from position $x_s$ to position $x_e$ for the spatial direction X, from position $y_s$ to position $y_e$ for the spatial direction Y, and from point-in-time $t_s$ to point-in-time $t_e$ for the time direction t, i.e., the region represented as a space-time cuboid.

Solving Expression (13) using a desired function f(x', y') whereby Expression (21) can be determined enables the signals of the actual world 1 to be estimated.

In the following, we will use the function indicated in Expression (22) as an example of the function f(x', y').

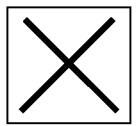

(22)

Figure 18:
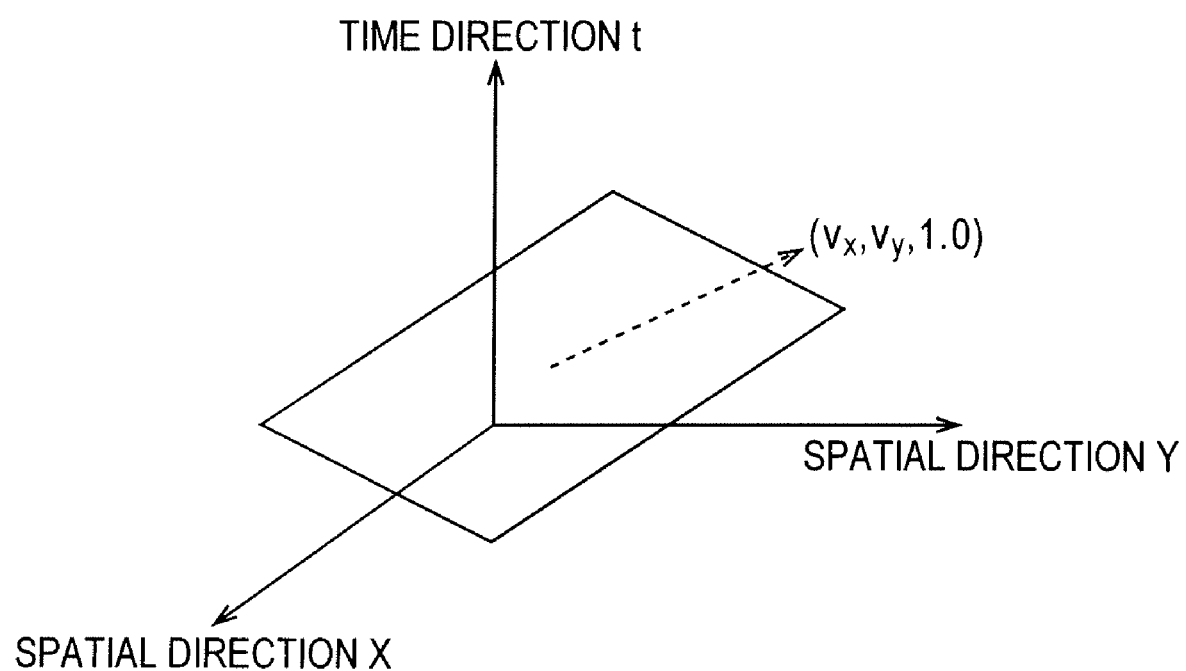
FIG. 18 is a diagram for describing continuity represented by Expression (18), Expression (19), and Expression (22).

That is to say, the signals of the actual world 1 are estimated to include the continuity represented in Expression (18), Expression (19), and Expression (22). This indicates that the cross-section with a constant shape is moving in the space-time direction as shown in FIG. 18.

Substituting Expression (22) into Expression (21) yields Expression (23).

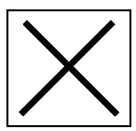

(23)

wherein
Volume=$(x_e-x_s)(y_e-y_s)(t_e-t_s)$
$S_0(x, y, t) = \text{Volume}/2 \times (x_e + x_s + v_x(t_e + t_s))$
$S_1(x, y, t) = \text{Volume}/2 \times (y_e + y_s + v_y(t_e + t_s))$
$S_2(x, y, t) = 1$ holds.

Figure 19:
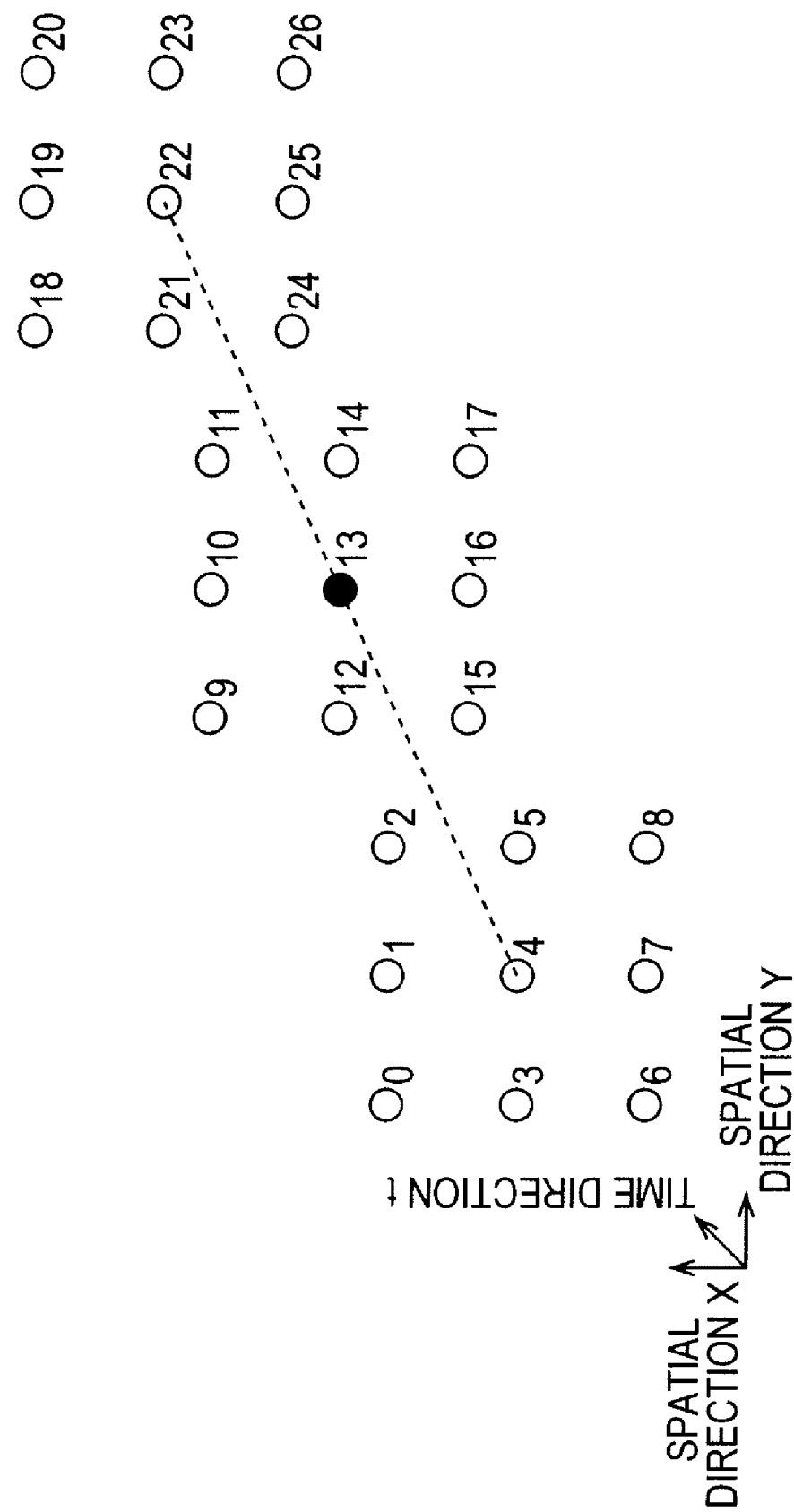
FIG. 19 is a diagram illustrating an example of M pieces of data 162 extracted from data 3.

FIG. 19 is a diagram illustrating an example of the M pieces of data 162 extracted from the data 3. For example, let us say that 27 pixel values are extracted as the data 162, and that the extracted pixel values are $P_j(x, y, t)$ In this case, j is 0 through 26.

In the example shown in FIG. 19, in the event that the pixel value of the pixel corresponding to the position of interest at the point-in-time t which is n is $P_{13}(x, y, t)$, and the direction of array of the pixel values of the pixels having the continuity of data (e.g., the direction in which the same-shaped pawl shapes detected by the data continuity detecting unit 101 are arrayed) is a direction connecting $P_4(X, y, t)$, $P_{13}(x, y, t)$, and $P_{22}(x, y, t)$, the pixel values $P_9(x, y, t)$ through $P_{17}(x, y, t)$ at the point-in-time t which is n, the pixel values $P_0(x, y, t)$ through $P_8(x, y, t)$ at the point-in-time t which is n−1 which is earlier in time than n, and the pixel values $P_{18}(x, y, t)$ through $P_{26}(x, y, t)$ at the point-in-time t which is n+1 which is later in time than n, are extracted.

Now, the region regarding which the pixel values, which are the data 3 output from the image sensor which is the sensor 2, have been obtained, have a time-direction and two-dimensional spatial direction expansion. Now, for example, the center of gravity of the cuboid corresponding to the pixel values (the region regarding which the pixel values have been obtained) can be used as the position of the pixel in the space-time direction.

Generating Expression (13) from the 27 pixel values $P_0(x, y, t)$ through $P_{26}(x, y, t)$ and from Expression (23), and obtaining W, enables the actual world 1 to be estimated.

In this way, the actual world estimating unit 102 generates Expression (13) from the 27 pixel values $P_0(x, y, t)$ through $P_{26}(x, y, t)$ and from Expression (23), and obtains W, thereby estimating the signals of the actual world 1.

Note that a Gaussian function, a sigmoid function, or the like, can be used for the function $f_i(x, y, t)$.

An example of processing for generating high-resolution data with even higher resolution, corresponding to the data 3, from the estimated actual world 1 signals, will be described with reference to FIG. 20 through FIG. 23.

Figure 20:
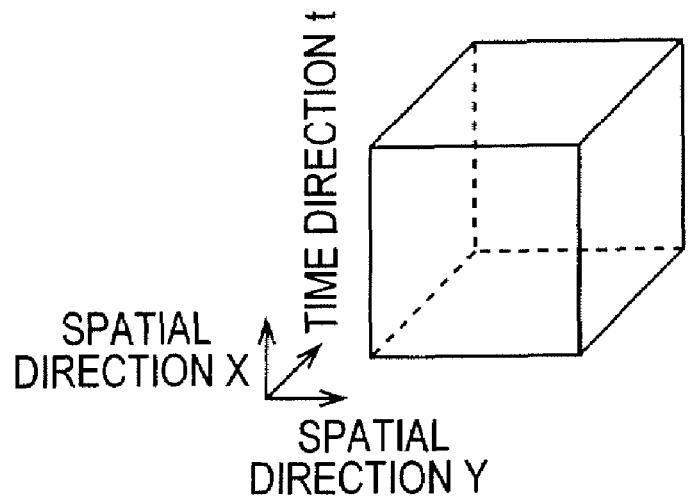
FIG. 20 is a diagram for describing integration of signals of the actual world 1 in the time direction and two-dimensional spatial direction, in the data 3.

As shown in FIG. 20, the data 3 has a value wherein signals of the actual world 1 are integrated in the time direction and two-dimensional spatial directions. For example, a pixel value which is data 3 that has been output from the image sensor which is the sensor 2 has a value wherein the signals of the actual world 1, which is light cast into the detecting device, are integrated by the shutter time which is the detection time in the time direction, and integrated by the photoreception region of the detecting element in the spatial direction.

Figure 21:
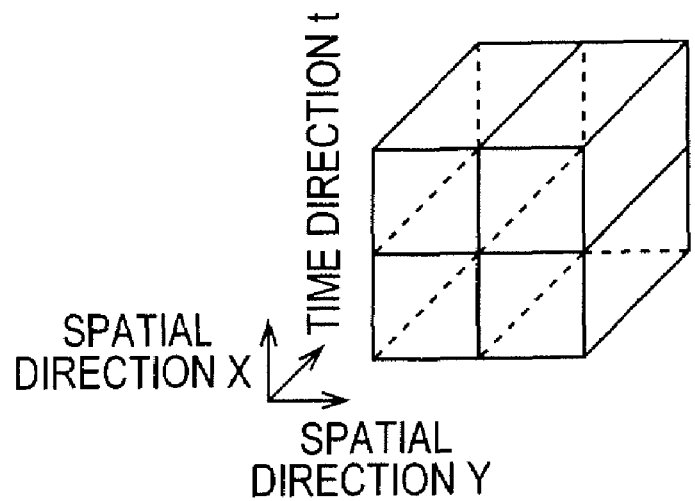
FIG. 21 is a diagram for describing an integration region at the time of generating high-resolution data with higher resolution in the spatial direction.

Conversely, as shown in FIG. 21, the high-resolution data with even higher resolution in the spatial direction is generated by integrating the estimated actual world 1 signals in the time direction by the same time as the detection time of the sensor 2 which has output the data 3, and also integrating in the spatial direction by a region narrower in comparison with the photoreception region of the detecting element of the sensor 2 which has output the data 3.

Note that at the time of generating the high-resolution data with even higher resolution in the spatial direction, the region where the estimated signals of the actual world 1 are integrated can be set completely disengaged from photoreception region of the detecting element of the sensor 2 which has output the data 3. For example, the high-resolution data can be provided with resolution which is that of the data 3 magnified in the spatial direction by an integer, of course, and further, can be provided with resolution which is that of the data 3 magnified in the spatial direction by a rational number such as 5/3 times, for example.

Figure 22:
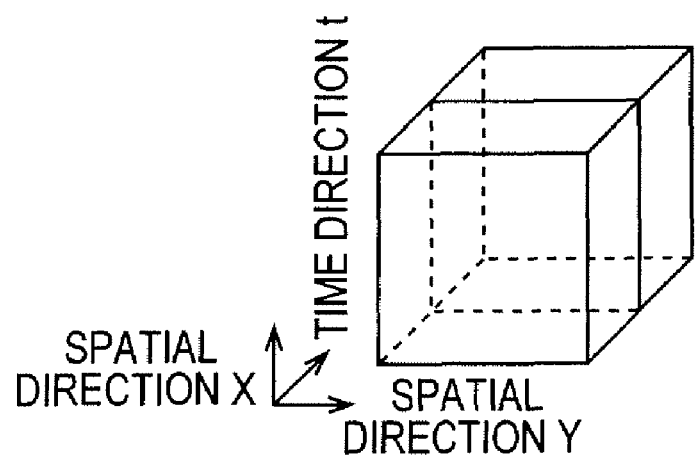
FIG. 22 is a diagram for describing an integration region at the time of generating high-resolution data with higher resolution in the time direction.

Also, as shown in FIG. 22, the high-resolution data with even higher resolution in the time direction is generated by integrating the estimated actual world 1 signals in the spatial direction by the same region as the photoreception region of the detecting element of the sensor 2 which has output the data 3, and also integrating in the time direction by a time shorter than the detection time of the sensor 2 which has output the data 3.

Note that at the time of generating the high-resolution data with even higher resolution in the time direction, the time by which the estimated signals of the actual world 1 are integrated can be set completely disengaged from shutter time of the detecting element of the sensor 2 which has output the data 3. For example, the high-resolution data can be provided with resolution which is that of the data 3 magnified in the time direction by an integer, of course, and further, can be provided with resolution which is that of the data 3 magnified in the time direction by a rational number such as 7/4 times, for example.

High-resolution data with movement blurring removed is generated by integrating the estimated actual world 1 signals only in the spatial direction and not in the time direction.

Figure 23:
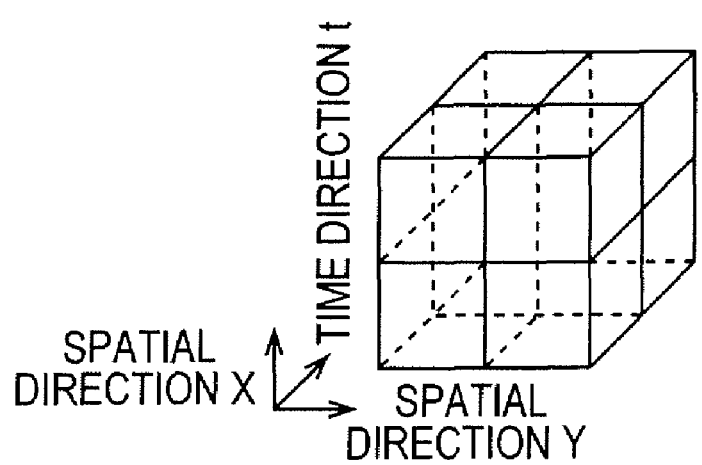
FIG. 23 is a diagram for describing an integration region at the time of generating high-resolution data with higher resolution in the time-spatial directions.

Further, as shown in FIG. 23, high-resolution data with higher resolution in the time direction and space direction is generated by integrating the estimated actual world 1 signals in the spatial direction by a region narrower in comparison with the photoreception region of the detecting element of the sensor 2 which has output the data 3, and also integrating in the time direction by a time shorter in comparison with the detection time of the sensor 2 which has output the data 3.

In this case, the region and time for integrating the estimated actual world 1 signals can be set completely unrelated to the photoreception region and shutter time of the detecting element of the sensor 2 which has output the data 3.

Thus, the image generating unit 103 generates data with higher resolution in the time direction or the spatial direction, by integrating the estimated actual world 1 signals by a desired space-time region, for example.

Accordingly, data which is more accurate with regard to the signals of the actual world 1, and which has higher resolution in the time direction or the space direction, can be generated by estimating the signals of the actual world 1.

FIG. 24 through FIG. 28 illustrate an example of an input image and an example of the results of processing with the signal processing device 4 used for signal processing.

Figure 24:
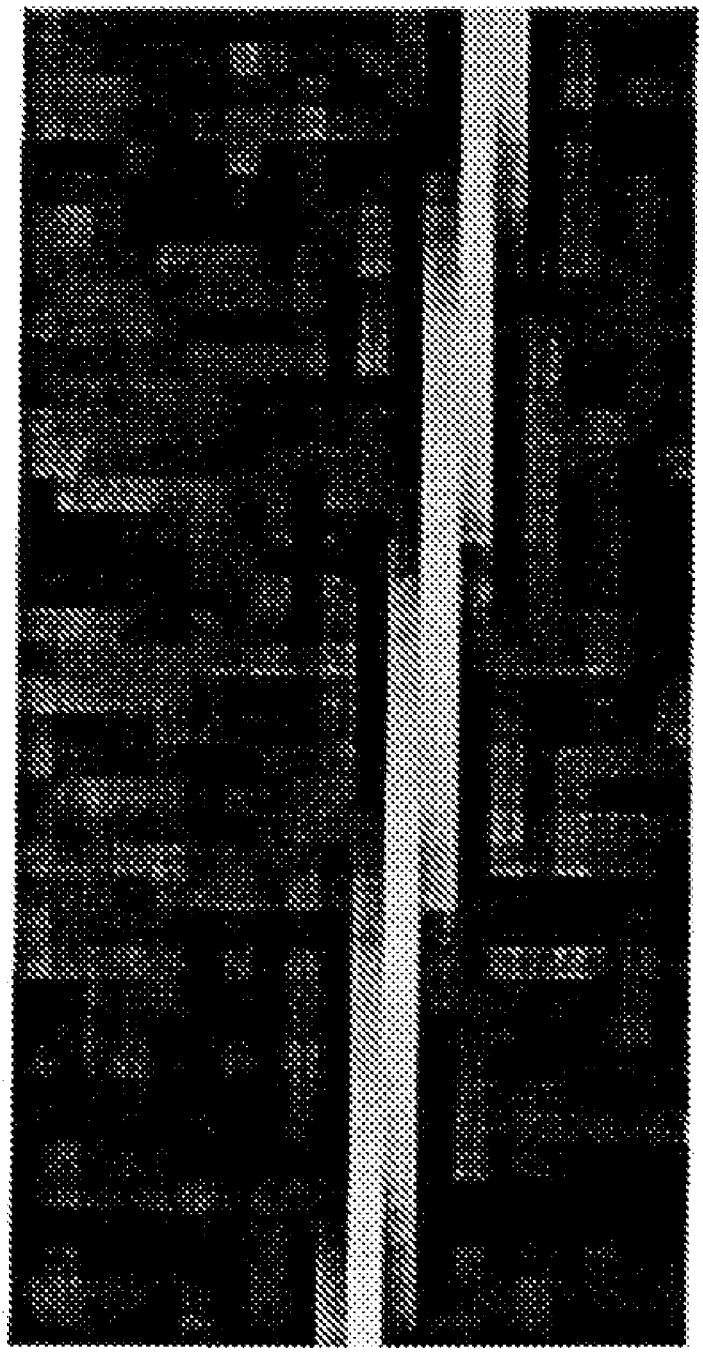
FIG. 24 is a diagram illustrating the original image of the input image.
Figure 25:
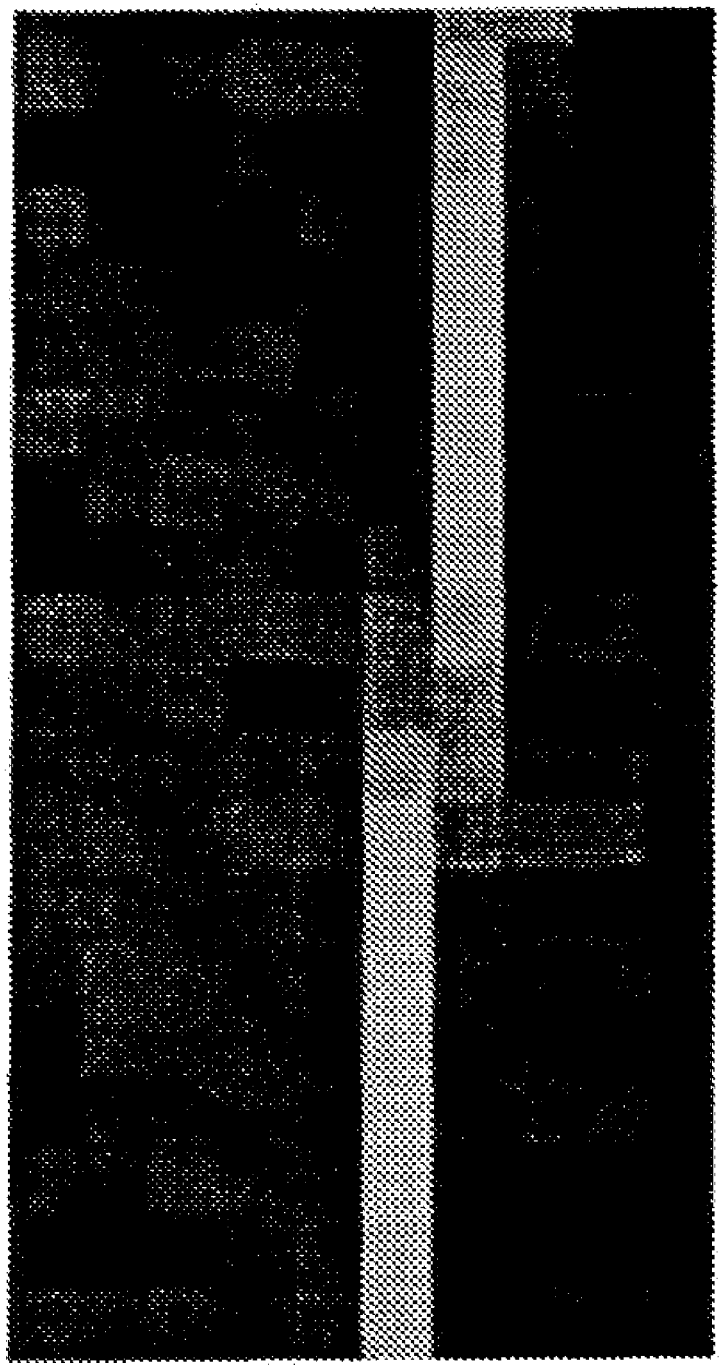
FIG. 25 is a diagram illustrating an example of an input image.

FIG. 24 is a diagram illustrating an original image of an input image (equivalent to light signals of the actual world 1). FIG. 25 is a diagram illustrating an example of an input image. The input image shown in FIG. 25 is an image generated by taking the average value of pixel values of pixels belonging to blocks made up of 2 by 2 pixels of the image shown in FIG. 24, as the pixel value of a single pixel. That is to say, the input image is an image obtained by applying spatial direction integration to the image shown in FIG. 24, imitating the integrating properties of the sensor.

The original image shown in FIG. 24 contains an image of a fine line inclined at approximately 5 degrees in the clockwise direction from the vertical direction. In the same way, the input image shown in FIG. 25 contains an image of a fine line inclined at approximately 5 degrees in the clockwise direction from the vertical direction.

Figure 26:
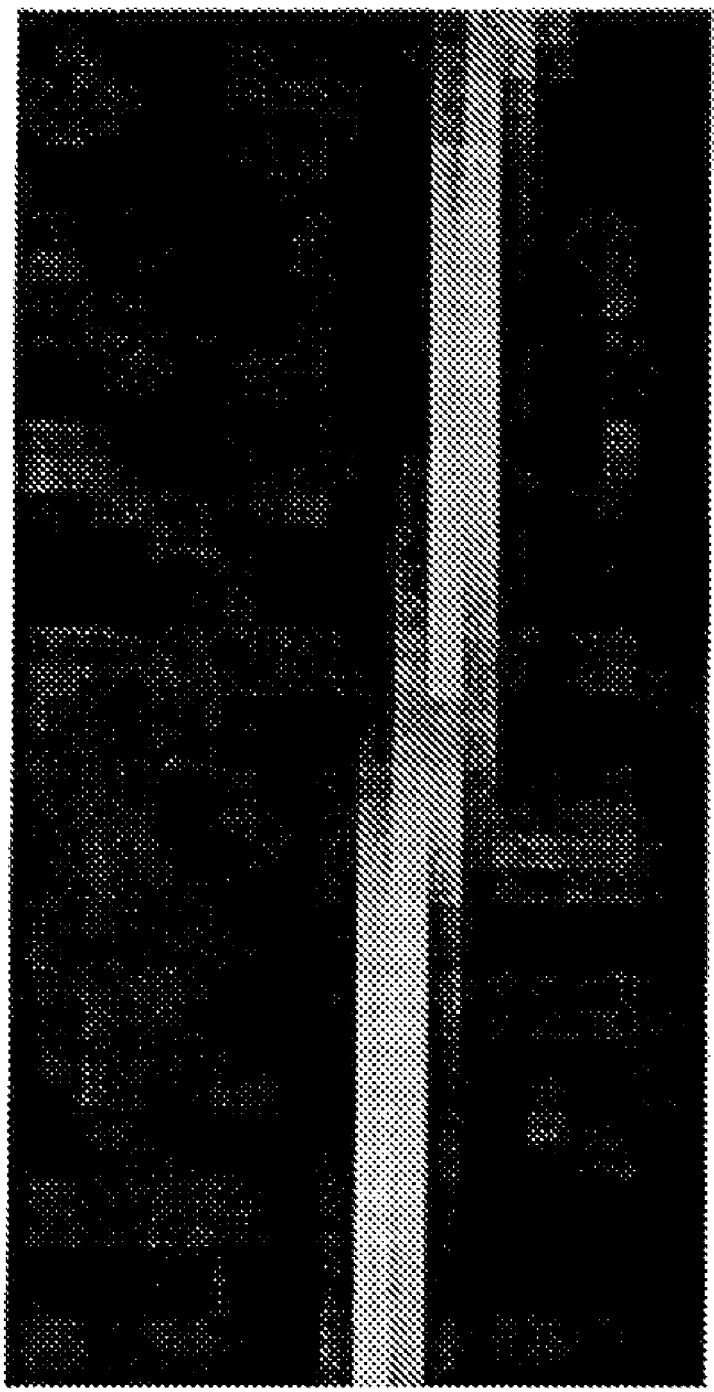
FIG. 26 is a diagram illustrating an image obtained by applying conventional class classification adaptation processing.

FIG. 26 is a diagram illustrating an image obtained by applying conventional class classification adaptation processing to the input image shown in FIG. 25. Now, class classification processing is made up of class classification processing and adaptation processing, wherein the data is classified based on the nature thereof by the class classification adaptation processing, and subjected to adaptation processing for each class. In the adaptation processing, a low-image quality or standard image quality image, for example, is converted into a high image quality image by being subjected to mapping (mapping) using a predetermined tap coefficient.

That is to say, with adaptation processing, first data is converted into second data by being mapped (mapping) using a predetermined tap coefficient.

Now, adaptation processing will be described with regard to a mapping method using the tap coefficient, wherein for example, a linear combination model is used, and also a low-resolution image or standard resolution SD (Standard Definition) image obtained by filtering a high-resolution HD (High Definition) image with a low-pass filter is used as the first data, and the HD image used for obtaining the SD image is used as the second data.

Now, under the above-described conditions, an HD pixel y making up the HD image can be obtained with the following linear Expression (linear combination) using multiple SD pixels extracted from SD pixels making up the SD image, as a prediction tap for predicting the HD image, and the tap coefficient.

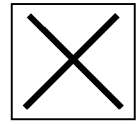

(24)

Wherein, in Expression (24), $x_n$ represents the pixel value of the n'th pixel in the SD image, making up a prediction tap regarding the HD pixel y, and $w_n$ represents the n'th tap coefficient to be multiplied by (the pixel value of) the n'th SD pixel. Note that in Expression (24), a prediction tap is made up of an N number of SD pixels $x_1, x_2, \ldots, x_N$.

Now, the pixel value y of the HD pixel can be obtained by a quadratic expression or higher, instead of the linear expression shown in Expression (24).

Now, in the HD image, saying that $y_k$ represents the true value of (the pixel value of) the k'th HD pixel, and $y_k'$ represents a prediction value of the true value $y_k$ obtained by Expression (24), the prediction error $e_k$ thereof is as expressed in the following Expression, for example.

$$e_k = y_k - y_k' \qquad (25)$$

The prediction value $y_k'$ in Expression (25) is obtained according to Expression (24), so substituting the $y_k'$ in Expression (25) according Expression (24) yields the following Expression.

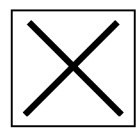

(26)

Wherein, in Expression (26), $X_{n,k}$ represents the n'th SD pixel making up the prediction tap for the k'th HD pixel.

While a tap coefficient $w_n$ wherein the prediction error $e_k$ is 0 in Expression (26) is optimal for predicting the HD pixel, obtaining such a tap coefficient $w_n$ for all HD pixels is generally difficult.

Accordingly, as a rule representing the tap coefficient $w_n$ as being optimal, employing the least-square method for example, means that the optimal tap coefficient $w_n$ can be obtained by minimizing the summation E of squared errors represented in the following Expression for example, as a statistical error.

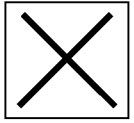

(27)

Wherein, in Expression (27), K represents the number of samples of sets made up of an HD pixel $y_k$ and SD pixels $X_{1,k}, X_{2,k}, \ldots, X_{N,k}$ making up a prediction tap regarding that HD pixel $y_k$.

The tap coefficient $W_n$ which makes the summation E of squared errors in Expression (27) smallest (the minimum) is such that the partial differentiation of the summation E by the tap coefficient $w_n$ yields 0. Accordingly, the following Expression must be satisfied.

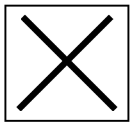

(28)

Now, partial differentiation of the above Expression (26) by the tap coefficient $w_n$ yields the following Expression.

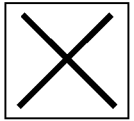

(29)

Expressions (28) and (29) yield the following Expression.

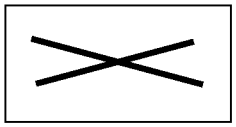

(30)

Substituting Expression (26) for $e_k$ in Expression (30) allows Expression (30) to be expressed in the form of the normal equation in Expression (31).

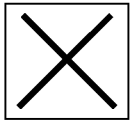

(31)

Preparing a certain number of sets of the HD pixel $y_k$ and SD pixels $x_{n,k}$ allows as many of the normal equations in Expression (31) to be formulated as the number of tap coefficients $w_n$ to be obtained, and solving Expression (31) allows optimal tap coefficients $w_n$ to be obtained. Note that sweeping (Gauss-Jordan elimination) or the like, for example, can be used for solving Expression (31).

As described above, adaptation processing involves taking a great number of HD pixels $y_1, y_2, \ldots, y_K$ as tutor data to serve as a tutor for learning for tap coefficients, and also taking SD pixels $X_{1,k}, X_{2,k}, \ldots, X_{N,k}$ making up a prediction tap regarding each HD pixel $y_k$ as student data to serve as a student for learning for tap coefficients, and solving Expression (31), thereby performing learning for obtaining an optimal tap coefficient $w_n$ and further using the optimal tap coefficient $w_n$ to perform mapping (conversion) of an SD image into an HD image according to Expression (24).

Now, for the SD pixels $X_{1,k}, X_{2,k}, \ldots, X_{N,k}$ making up the prediction tap regarding the HD pixels $Y_k$, an SD pixel close to a position on the SD image corresponding to the HD pixel $y_k$, either spatially or temporally, can be used.

Also, with class classification adaptation processing, learning of the tap coefficient $w_n$ and mapping using the tap coefficient $w_n$ are performed by class. With class classification adaptation processing, class classification processing is performed with regard to the HD pixel $y_k$ of interest, and learning of the tap coefficient $w_n$ and mapping using the tap coefficient $w_n$ are performed for each class obtained by the class classification processing.

An example of class classification processing with regard to the HD pixel $y_k$ is to extract multiple SD pixels from the SD image to serve as a class tap used for class classification of the HD pixel $y_k$, and to perform M-bit ADRC (Adaptive Dynamic Range Coding) using the class tap made up of the multiple SD pixels.

In M-bit ADRC processing, the maximum value MAX and minimum value MIN of the SD pixels making up the class tap are detected, DR=MAX−MIN is set as a local dynamic range, and the SD pixels making up the class tap are re-quantized into K bits, based on this dynamic range DR. That is to say, the minimum value MIN is subtracted from the SD pixels making up the class tap, and the subtraction value is divided by $DR/2^K$ (quantized). Accordingly, in the event that a class tap is subjected to 1-bit ADRC processing for example, each SD pixel making up the class tap is one bit. In this case, a bit string obtained by arraying in a predetermined order the 1-bit pixel values regarding each SD pixel making up the class tap that have been obtained as described above is output as ADRC code, and the ADRC code is taken as a class code representing the class.

Note that class classification adaptation processing differs from simple interpolation processing or the like, for example, in that components not included in the SD image but are included in the HD image are reproduced. That is to say, with class classification adaptation processing, it would seem by looking at Expression (24) alone that this is the same as interpolation processing using a so-called interpolation filter, but the tap coefficient $w_n$ which is equivalent to the tap coefficient of the interpolation filter has been obtained by learning using an HD image serving as tutor data and an SD image serving as student data, so the component contained in the HD image can be reproduced.

Now, tap coefficients $w_n$ which perform various types of conversion can be obtained in the tap coefficient $w_n$ learning, depending on what sort of combination of tutor data y and student data x is employed.

That is to say, in a case of taking a high-resolution HD image as the tutor data y and taking an SD image wherein the resolution of the HD image has been deteriorated as the student data x, for example, a tap coefficient $w_n$ for mapping an image into an image with the resolution improved, can be obtained. Further, in a case of taking an HD image as the tutor data y and taking an SD image wherein the number of pixels of the HD image has been reduced as the student data x, for example, a tap coefficient $w_n$ for mapping an image into an image with an increased number of pixels making up the image, can be obtained.

FIG. 26 is an image obtained by subjecting the input image shown in FIG. 25 to mapping by the class classification adaptation processing such as described above. It can be understood in the image shown in FIG. 26 that the image of the fine line is different to that of the original image in FIG. 24.

Figure 27:
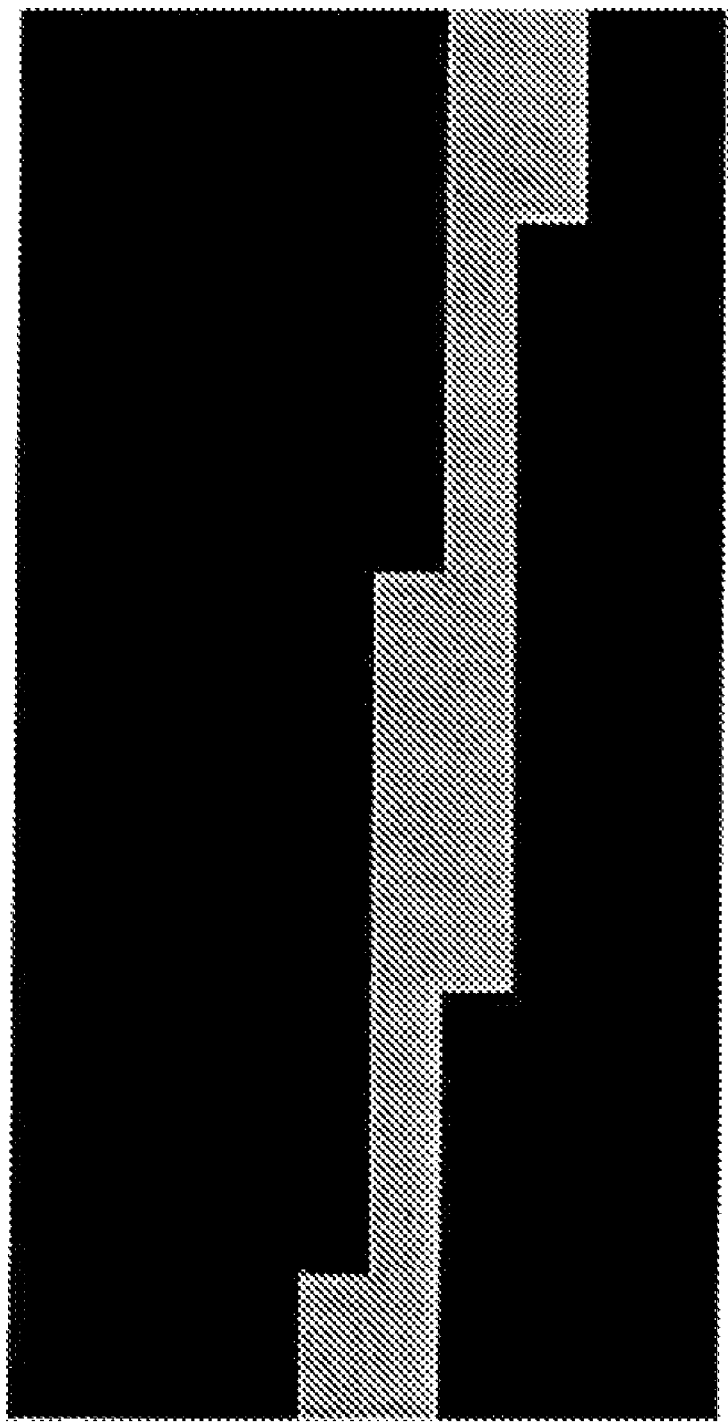
FIG. 27 is a diagram illustrating results of detecting a fine line region.

FIG. 27 is a diagram illustrating the results of detecting the fine line regions from the input image shown in the example in FIG. 25, by the data continuity detecting unit 101. In FIG. 27, the white region indicates the fine line region, i.e., the region wherein the arc shapes shown in FIG. 10 are arrayed.

Figure 28:
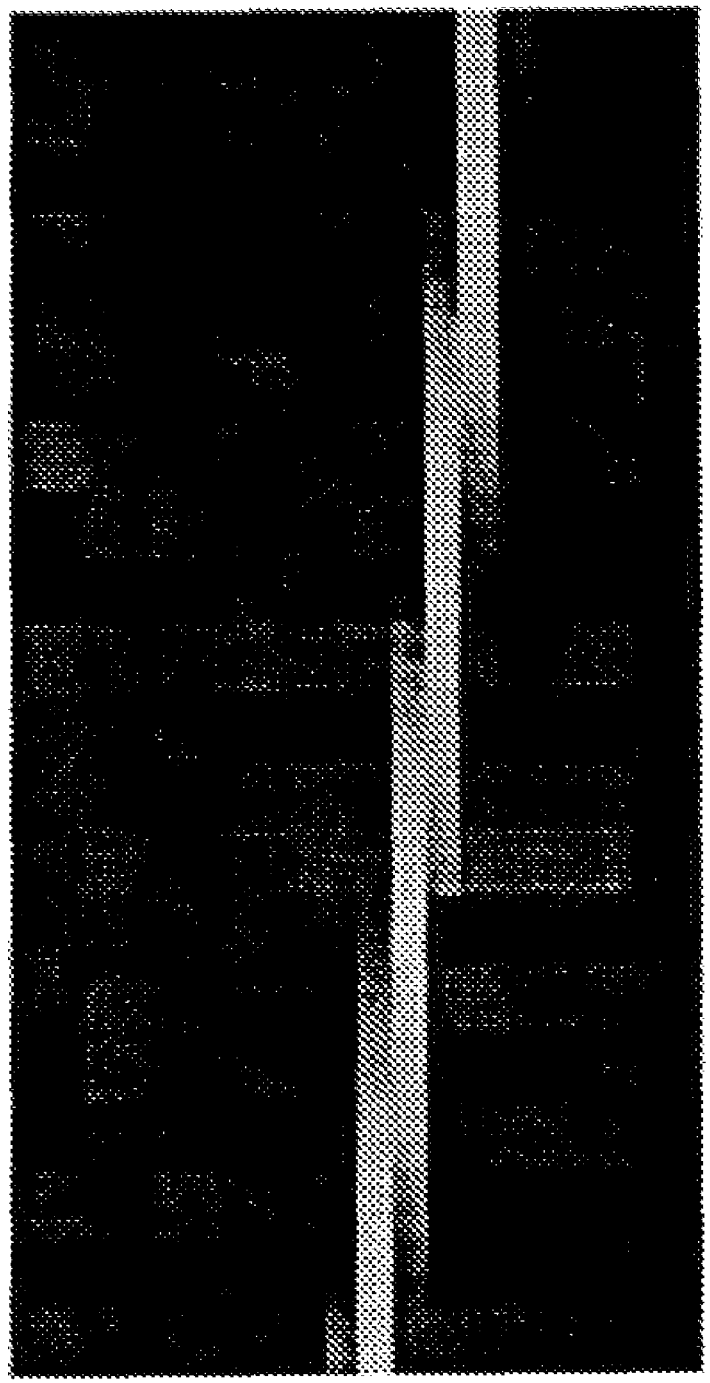
FIG. 28 is a diagram illustrating an example of an output image output from the signal processing device 4.

FIG. 28 is a diagram illustrating an example of the output image obtained by performing signal processing at the signal processing device 4, with the image shown in FIG. 25 as the input image. As shown in FIG. 28, the signals processing device 4 yields an image closer to the fine line image of the original image shown in FIG. 24.

Figure 29:
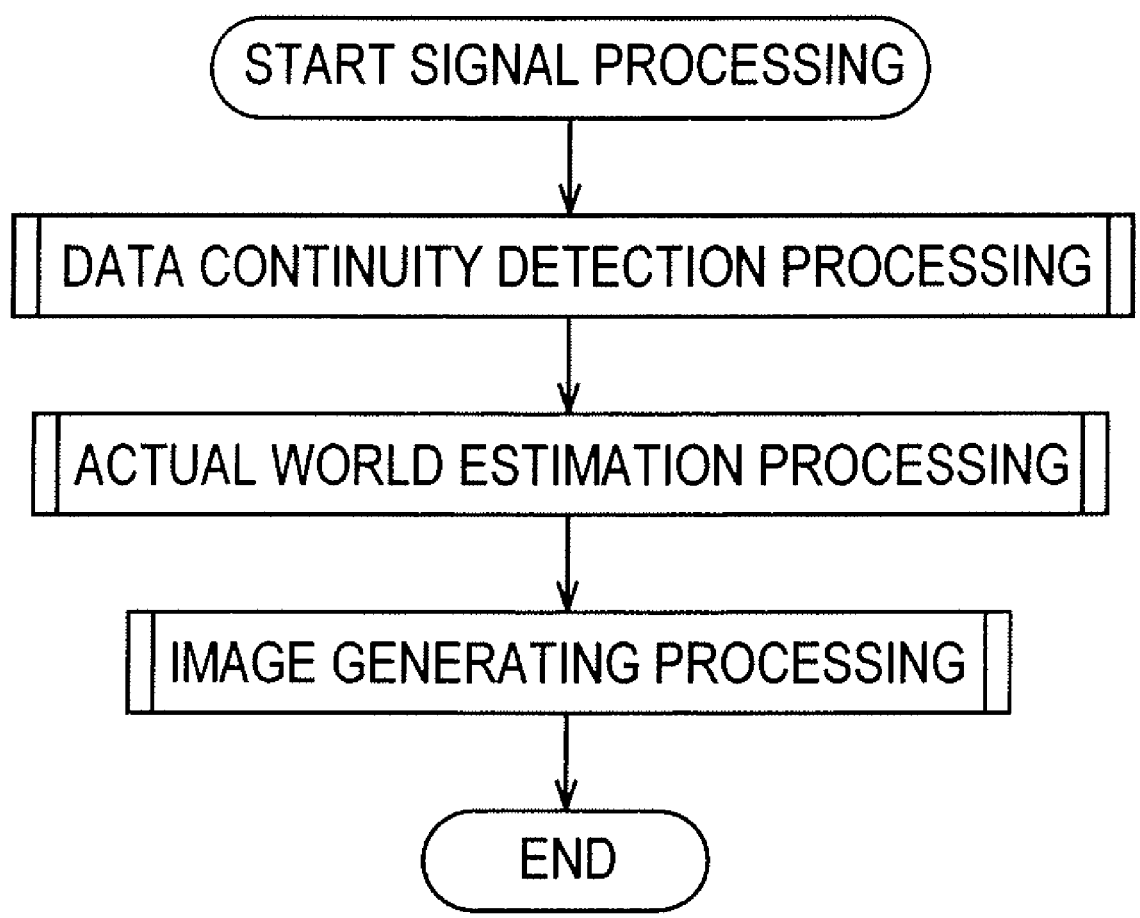
FIG. 29 is a flowchart for describing signal processing with the signal processing device 4.

FIG. 29 is a flowchart for describing the processing of signals with the signal processing device 4.

In step S101, the data continuity detecting unit 101 executes the processing for detecting continuity. The data continuity detecting unit 101 detects data continuity contained in the input image which is the data 3, and supplies the data continuity information indicating the detected data continuity to the actual world estimating unit 102 and the image generating unit 103.

The data continuity detecting unit 101 detects the continuity of data corresponding to the continuity of the signals of the actual world. In the processing in step S101, the continuity of data detected by the data continuity detecting unit 101 is either part of the continuity of the image of the actual world 1 contained in the data 3, or continuity which has changed from the continuity of the signals of the actual world 1.

For example, the data continuity detecting unit 101 detects the data continuity by detecting a region having a continuity in a predetermined dimensional direction. Also, for example, the data continuity detecting unit 101 detects data continuity by detecting angle (gradient) in the spatial direction indicating the array of the same shape.

Details of the continuity detecting processing in step S101 will be described later.

Note that the data continuity information can be used as features, indicating the characteristics of the data 3.

In step S102, the actual world estimating unit 102 executes processing for estimating the actual world. That is to say, the actual world estimating unit 102 estimates the signals of the actual world based on the input image and the data continuity information supplied from the data continuity detecting unit 101. In the processing in step S102 for example, the actual world estimating unit 102 estimates the signals of the actual world 1 by predicting a model 161 approximating (describing) the actual world 1. The actual world estimating unit 102 supplies the actual world estimation information indicating the estimated signals of the actual world 1 to the image generating unit 103.

For example, the actual world estimating unit 102 estimates the actual world 1 signals by predicting the width of the linear object. Also, for example, the actual world estimating unit 102 estimates the actual world 1 signals by predicting a level indicating the color of the linear object.

Details of processing for estimating the actual world in step S102 will be described later.

Note that the actual world estimation information can be used as features, indicating the characteristics of the data 3.

In step S103, the image generating unit 103 performs image generating processing, and the processing ends. That is to say, the image generating unit 103 generates an image based on the actual world estimation information, and outputs the generated image. Or, the image generating unit 103 generates an image based on the data continuity information and actual world estimation information, and outputs the generated image.

For example, in the processing in step S103, the image generating unit 103 integrates the estimated real world light in the spatial direction, based on the actual world estimated information, thereby generating an image with higher resolution in the spatial direction in comparison with the input image, and outputs the generated image. For example, the image generating unit 103 integrates estimated real world light in the time-space direction, based on the actual world estimated information, hereby generating an image with higher resolution in the time direction and the spatial direction in comparison with the input image, and outputs the generated image. The details of the image generating processing in step S103 will be described later.

Thus, the signal processing device 4 detects data continuity from the data 3, and estimates the actual world 1 from the detected data continuity. The signal processing device 4 then generates signals closer approximating the actual world 1 based on the estimated actual world 1.

As described above, in the event of performing the processing for estimating signals of the real world, accurate and highly-precise processing results can be obtained.

Also, in the event that first signals which are real world signals having first dimensions are projected, the continuity of data corresponding to the lost continuity of the real world signals is detected for second signals of second dimensions, having a number of dimensions fewer than the first dimensions, from which a part of the continuity of the signals of the real world has been lost, and the first signals are estimated by estimating the lost real world signals continuity based on the detected data continuity, accurate and highly-precise processing results can be obtained as to the events in the real world.

Next, the details of the configuration of the data continuity detecting unit 101 will be described.

Figure 30:
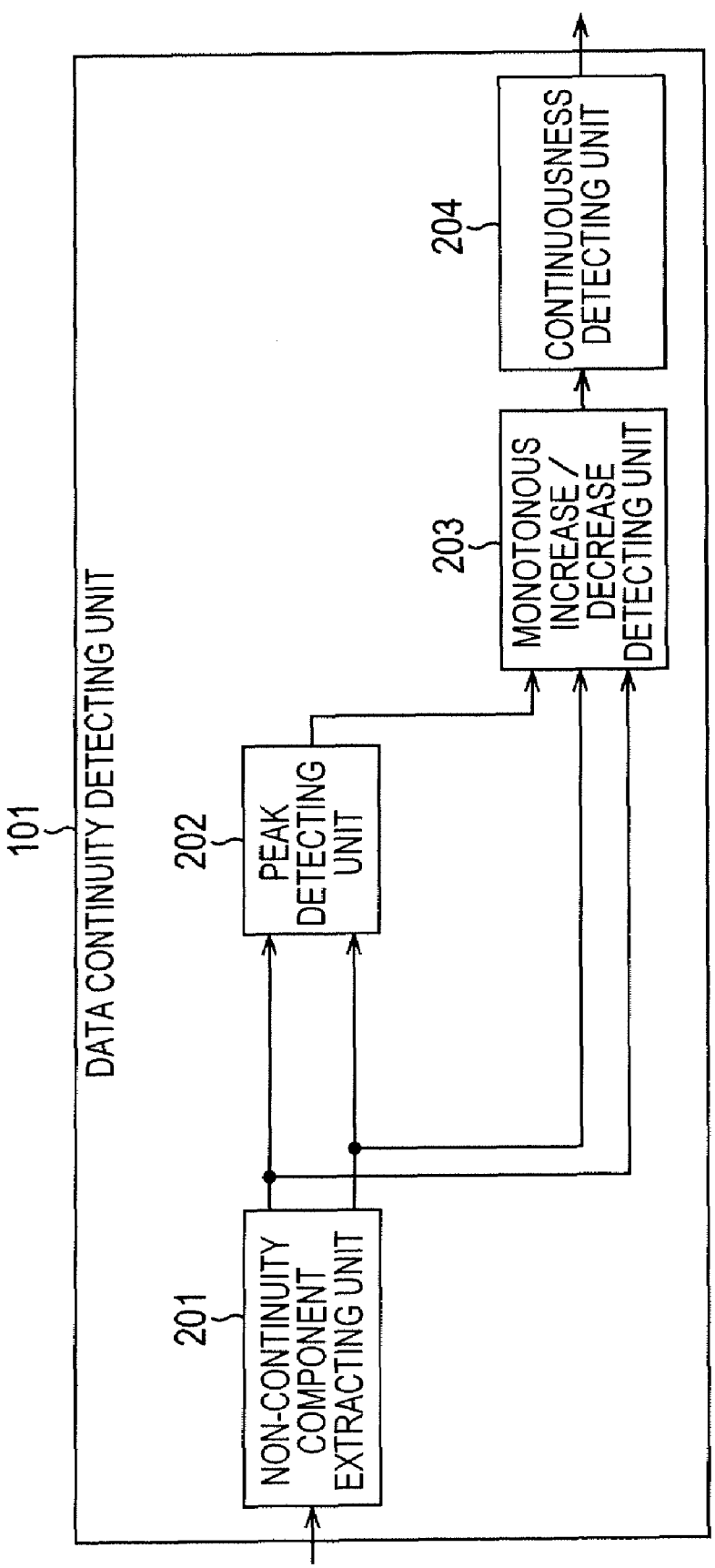
FIG. 30 is a block diagram illustrating the configuration of a data continuity detecting unit 101.

FIG. 30 is a block diagram illustrating the configuration of the data continuity detecting unit 101.

Upon taking an image of an object which is a fine line, the data continuity detecting unit 101, of which the configuration is shown in FIG. 30, detects the continuity of data contained in the data 3, which is generated from the continuity in that the cross-sectional shape which the object has is the same. That is to say, the data continuity detecting unit 101 of the configuration shown in FIG. 30 detects the continuity of data contained in the data 3, which is generated from the continuity in that the change in level of light as to the change in position in the direction orthogonal to the length-wise direction is the same at an arbitrary position in the length-wise direction, which the image of the actual world 1 which is a fine line, has.

More specifically, the data continuity detecting unit 101 of which configuration is shown in FIG. 30 detects the region where multiple arc shapes (half-disks) having a predetermined length are arrayed in a diagonally-offset adjacent manner, within the data 3 obtained by taking an image of a fine line with the sensor 2 having spatial integration effects.

The data continuity detecting unit 101 extracts the portions of the image data (hereafter referred to as con-continuity component) other than the portion of the image data where the image of the fine line having data continuity has been projected (hereafter, the portion of the image data where the image of the fine line having data continuity has been projected will also be called continuity component, and the other portions will be called non-continuity component), from an input image which is the data 3, detects the pixels where the image of the fine line of the actual world 1 has been projected, from the extracted non-continuity component and the input image, and detects the region of the input image made up of pixels where the image of the fine line of the actual world 1 has been projected.

A non-continuity component extracting unit 201 extracts the non-continuity component from the input image, and supplies the non-continuity component information indicating the extracted non-continuity component to a peak detecting unit 202 and a monotonous increase/decrease detecting unit 203 along with the input image.

Figure 31:
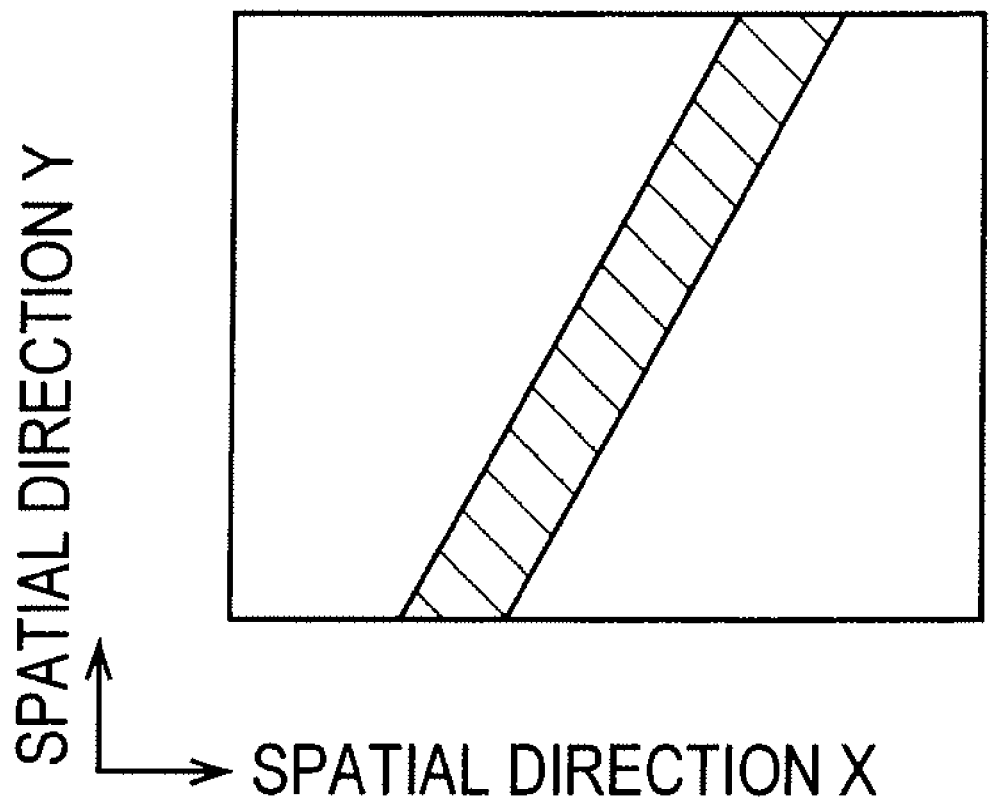
FIG. 31 is a diagram illustrating an image in the actual world 1 with a fine line in front of the background.
Figure 32:
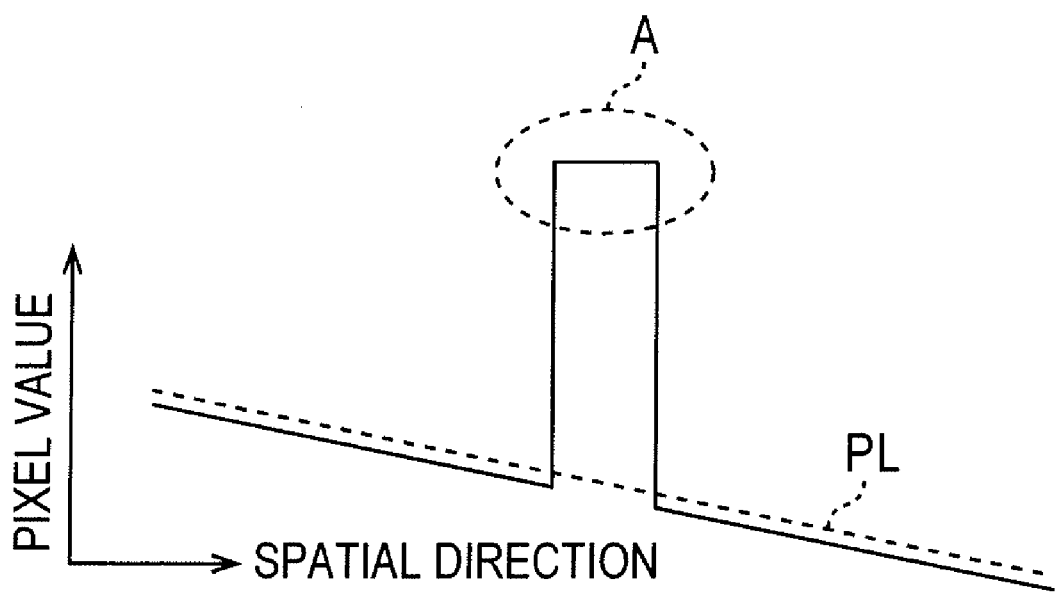
FIG. 32 is a diagram for describing approximation of a background with a plane.

For example, as shown in FIG. 31, in the event that an image of the actual world 1 wherein a fine line exists in front of a background with an approximately constant light level is projected on the data 3, the non-continuity component extracting unit 201 extracts the non-continuity component which is the background, by approximating the background in the input image which is the data 3, on a plane, as shown in FIG. 32. In FIG. 32, the solid line indicates the pixel values of the data 3, and the dotted line illustrates the approximation values indicated by the plane approximating the background. In FIG. 32, A denotes the pixel value of the pixel where the image of the fine line has been projected, and the PL denotes the plane approximating the background.

In this way, the pixel values of the multiple pixels at the portion of the image data having data continuity are discontinuous as to the non-continuity component.

The non-continuity component extracting unit 201 detects the discontinuous portion of the pixel values of the multiple pixels of the image data which is the data 3, where an image which is light signals of the actual world 1 has been projected and a part of the continuity of the image of the actual world 1 has been lost.

Details of the processing for extracting the non-continuity component with the non-continuity component extracting unit 201 will be described later.

The peak detecting unit 202 and the monotonous increase/decrease detecting unit 203 remove the non-continuity component from the input image, based on the non-continuity component information supplied from the non-continuity component extracting unit 201. For example, the peak detecting unit 202 and the monotonous increase/decrease detecting unit 203 remove the non-continuity component from the input image by setting the pixel values of the pixels of the input image where only the background image has been projected, to 0. Also, for example, the peak detecting unit 202 and the monotonous increase/decrease detecting unit 203 remove the non-continuity component from the input image by subtracting values approximated by the plane PL from the pixel values of each pixel of the input image.

Since the background can be removed from the input image, the peak detecting unit 202 through continuousness detecting unit 204 can process only the portion of the image data where the fine line has be projected, thereby further simplifying the processing by the peak detecting unit 202 through the continuousness detecting unit 204.

Note that the non-continuity component extracting unit 201 may supply image data wherein the non-continuity component has been removed from the input image, to the peak detecting unit 202 and the monotonous increase/decrease detecting unit 203.

In the example of processing described below, the image data wherein the non-continuity component has been removed from the input image, i.e., image data made up from only pixel containing the continuity component, is the object.

Now, description will be made regarding the image data upon which the fine line image has been projected, which the peak detecting unit 202 through continuousness detecting unit 204 are to detect.

Figure 33:
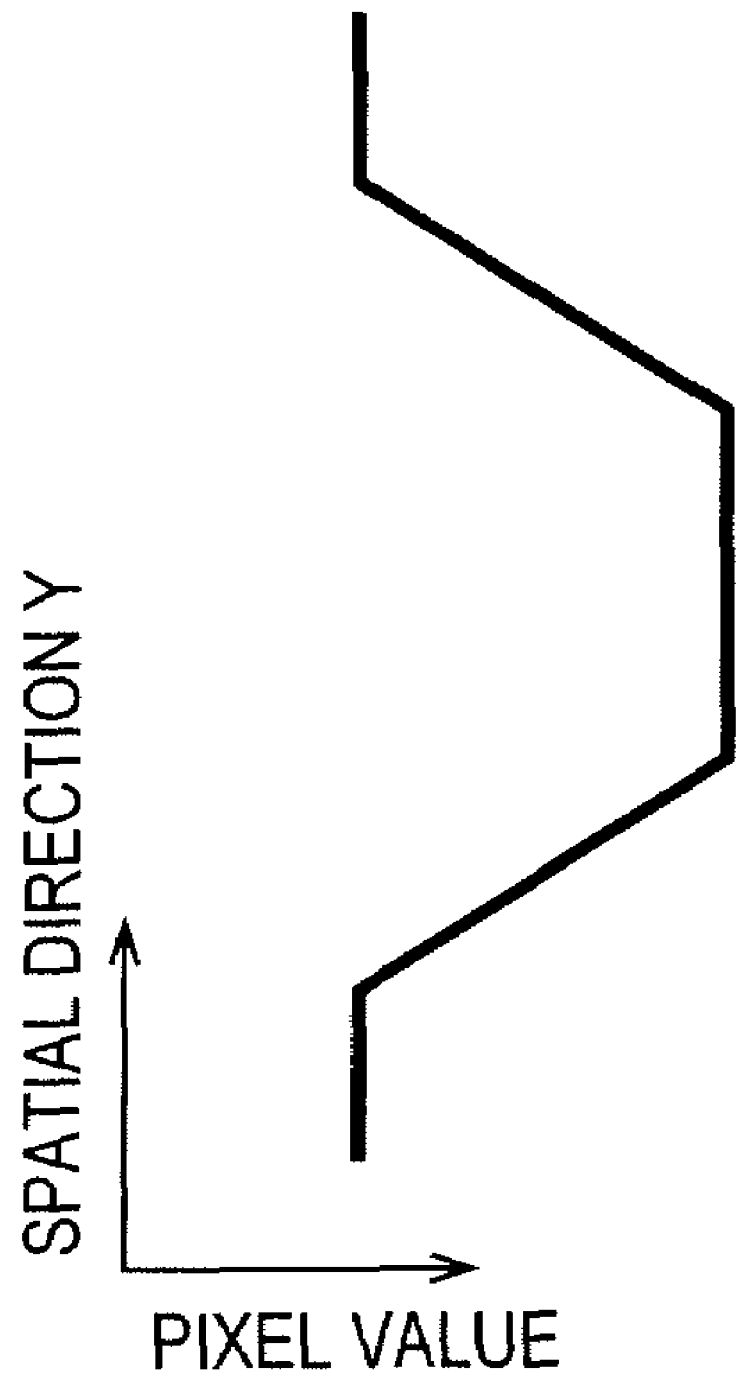
FIG. 33 is a diagram illustrating the cross-sectional shape of image data regarding which the image of a fine line has been projected.
Figure 34:
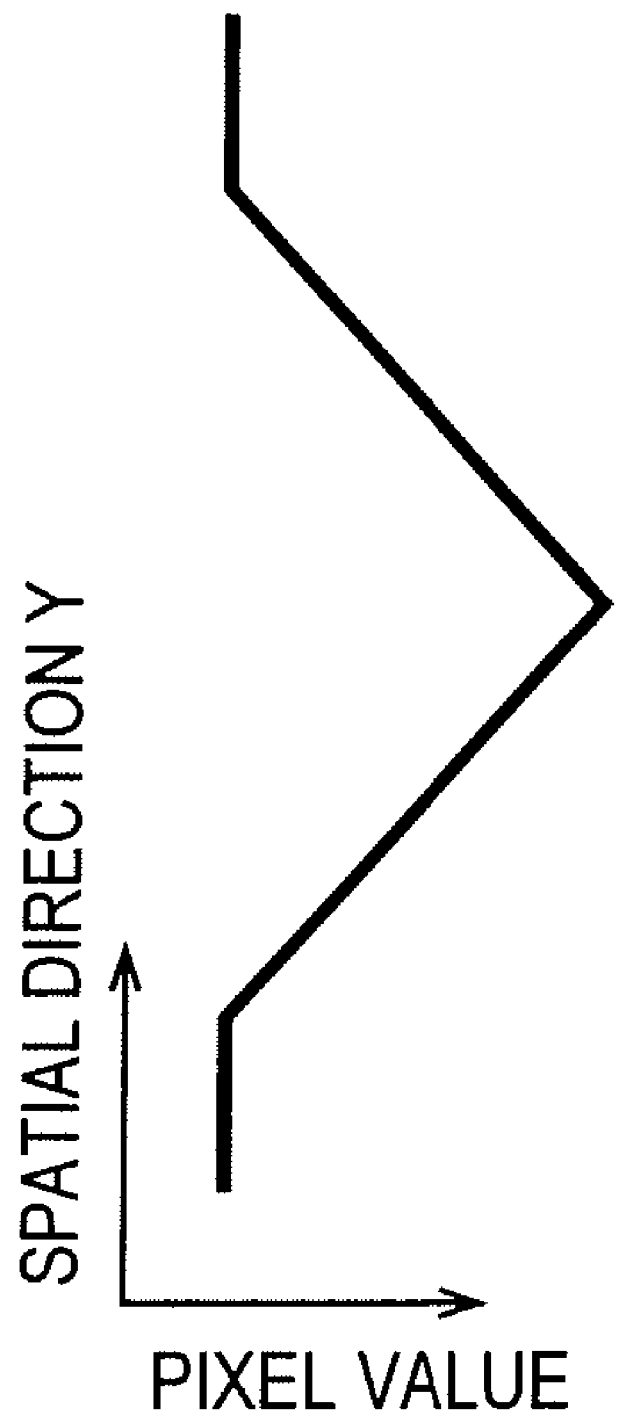
FIG. 34 is a diagram illustrating the cross-sectional shape of image data regarding which the image of a fine line has been projected.
Figure 35:
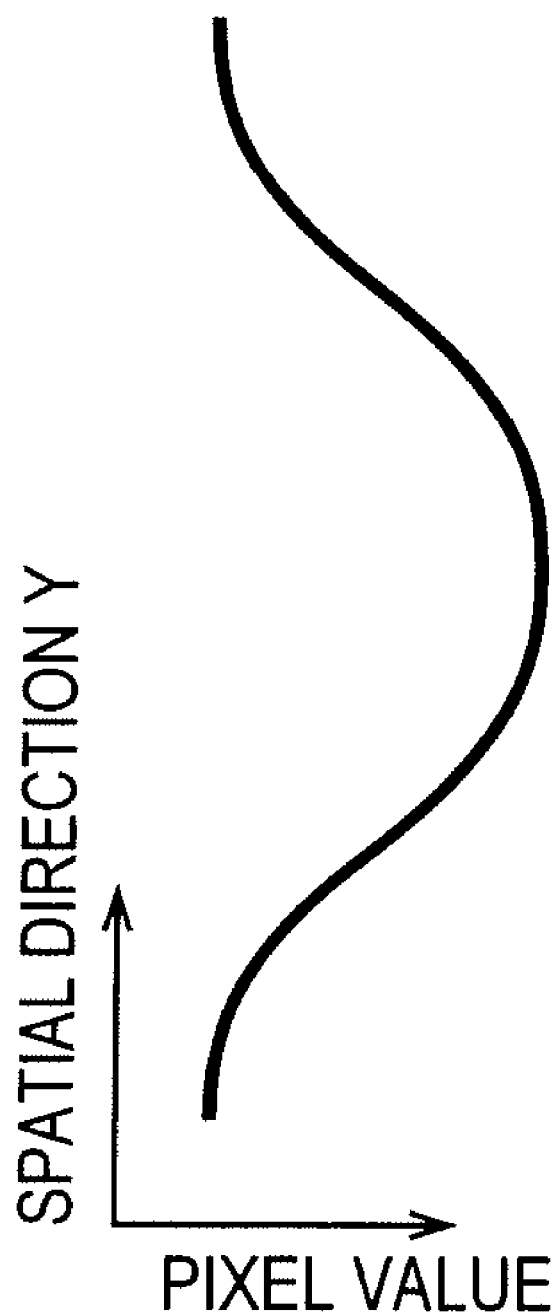
FIG. 35 is a diagram illustrating the cross-sectional shape of image data regarding which the image of a fine line has been projected.

In the event that there is no optical LPF, the cross-dimensional shape in the spatial direction Y (change in the pixel values as to change in the position in the spatial direction) of the image data upon which the fine line image has been projected as shown in FIG. 31 can be thought to be the trapezoid shown in FIG. 33, or the triangle shown in FIG. 34, from the spatial; integration effects of the image sensor which is the sensor 2. However, ordinary image sensors have an optical LPF with the image sensor obtaining the image which has passed through the optical LPF and projects the obtained image on the data 3, so in reality, the cross-dimensional shape of the image data with fine lines in the spatial direction Y has a shape resembling Gaussian distribution, as shown in FIG. 35.

The peak detecting unit 202 through continuousness detecting unit 204 detect a region made up of pixels upon which the fine line image has been projected wherein the same cross-sectional shape (change in the pixel values as to change in the position in the spatial direction) is arrayed in the vertical direction in the screen at constant intervals, and further, detect a region made up of pixels upon which the fine line image has been projected which is a region having data continuity, by detecting regional connection corresponding to the length-wise direction of the fine line of the actual world 1. That is to say, the peak detecting unit 202 through continuousness detecting unit 204 detect regions wherein arc shapes (half-disc shapes) are formed on a single vertical row of pixels in the input image, and determine whether or not the detected regions are adjacent in the horizontal direction, thereby detecting connection of regions where arc shapes are formed, corresponding to the length-wise direction of the fine line image which is signals of the actual world 1.

Also, the peak detecting unit 202 through continuousness detecting unit 204 detect a region made up of pixels upon which the fine line image has been projected wherein the same cross-sectional shape is arrayed in the horizontal direction in the screen at constant intervals, and further, detect a region made up of pixels upon which the fine line image has been projected which is a region having data continuity, by detecting connection of detected regions corresponding to the length-wise direction of the fine line of the actual world 1. That is to say, the peak detecting unit 202 through continuousness detecting unit 204 detect regions wherein arc shapes are formed on a single horizontal row of pixels in the input image, and determine whether or not the detected regions are adjacent in the vertical direction, thereby detecting connection of regions where arc shapes are formed, corresponding to the length-wise direction of the fine line image, which is signals of the actual world 1.

First, description will be made regarding processing for detecting a region of pixels upon which the fine line image has been projected wherein the same arc shape is arrayed in the vertical direction in the screen at constant intervals.

The peak detecting unit 202 detects a pixel having a pixel value greater than the surrounding pixels, i.e., a peak, and supplies peak information indicating the position of the peak to the monotonous increase/decrease detecting unit 203. In the event that pixels arrayed in a single vertical direction row in the screen are the object, the peak detecting unit 202 compares the pixel value of the pixel position upwards in the screen and the pixel value of the pixel position downwards in the screen, and detects the pixel with the greater pixel value as the peak. The peak detecting unit 202 detects one or multiple peaks from a single image, e.g., from the image of a single frame.

A single screen contains frames or fields. This holds true in the following description as well.

For example, the peak detecting unit 202 selects a pixel of interest from pixels of an image of one frame which have not yet been taken as pixels of interest, compares the pixel value of the pixel of interest with the pixel value of the pixel above the pixel of interest, compares the pixel value of the pixel of interest with the pixel value of the pixel below the pixel of interest, detects a pixel of interest which has a greater pixel value than the pixel value of the pixel above and a greater pixel value than the pixel value of the pixel below, and takes the detected pixel of interest as a peak. The peak detecting unit 202 supplies peak information indicating the detected peak to the monotonous increase/decrease detecting unit 203.

There are cases wherein the peak detecting unit 202 does not detect a peak. For example, in the event that the pixel values of all of the pixels of an image are the same value, or in the event that the pixel values decrease in one or two directions, no peak is detected. In this case, no fine line image has been projected on the image data.

The monotonous increase/decrease detecting unit 203 detects a candidate for a region made up of pixels upon which the fine line image has been projected wherein the pixels are vertically arrayed in a single row as to the peak detected by the peak detecting unit 202, based upon the peak information indicating the position of the peak supplied from the peak detecting unit 202, and supplies the region information indicating the detected region to the continuousness detecting unit 204 along with the peak information.

More specifically, the monotonous increase/decrease detecting unit 203 detects a region made up of pixels having pixel values monotonously decreasing with reference to the peak pixel value, as a candidate of a region made up of pixels upon which the image of the fine line has been projected. Monotonous decrease means that the pixel values of pixels which are farther distance-wise from the peak are smaller than the pixel values of pixels which are closer to the peak.

Also, the monotonous increase/decrease detecting unit 203 detects a region made up of pixels having pixel values monotonously increasing with reference to the peak pixel value, as a candidate of a region made up of pixels upon which the image of the fine line has been projected. Monotonous increase means that the pixel values of pixels which are farther distance-wise from the peak are greater than the pixel values of pixels which are closer to the peak.

In the following, the processing regarding regions of pixels having pixel values monotonously increasing is the same as the processing regarding regions of pixels having pixel values monotonously decreasing, so description thereof will be omitted. Also, with the description regarding processing for detecting a region of pixels upon which the fine line image has been projected wherein the same arc shape is arrayed horizontally in the screen at constant intervals, the processing regarding regions of pixels having pixel values monotonously increasing is the same as the processing regarding regions of pixels having pixel values monotonously decreasing, so description thereof will be omitted.

For example, the monotonous increase/decrease detecting unit 203 obtains pixel values of each of the pixels in a vertical row as to a peak, the difference as to the pixel value of the pixel above, and the difference as to the pixel value of the pixel below. The monotonous increase/decrease detecting unit 203 then detects a region wherein the pixel value monotonously decreases by detecting pixels wherein the sign of the difference changes.

Further, the monotonous increase/decrease detecting unit 203 detects, from the region wherein pixel values monotonously decrease, a region made up of pixels having pixel values with the same sign as that of the pixel value of the peak, with the sign of the pixel value of the peak as a reference, as a candidate of a region made up of pixels upon which the image of the fine line has been projected.

For example, the monotonous increase/decrease detecting unit 203 compares the sign of the pixel value of each pixel with the sign of the pixel value of the pixel above and sign of the pixel value of the pixel below, and detects the pixel where the sign of the pixel value changes, thereby detecting a region of pixels having pixel values of the same sign as the peak within the region where pixel values monotonously decrease.

Thus, the monotonous increase/decrease detecting unit 203 detects a region formed of pixels arrayed in a vertical direction wherein the pixel values monotonously decrease as to the peak and have pixels values of the same sign as the peak.

Figure 36:
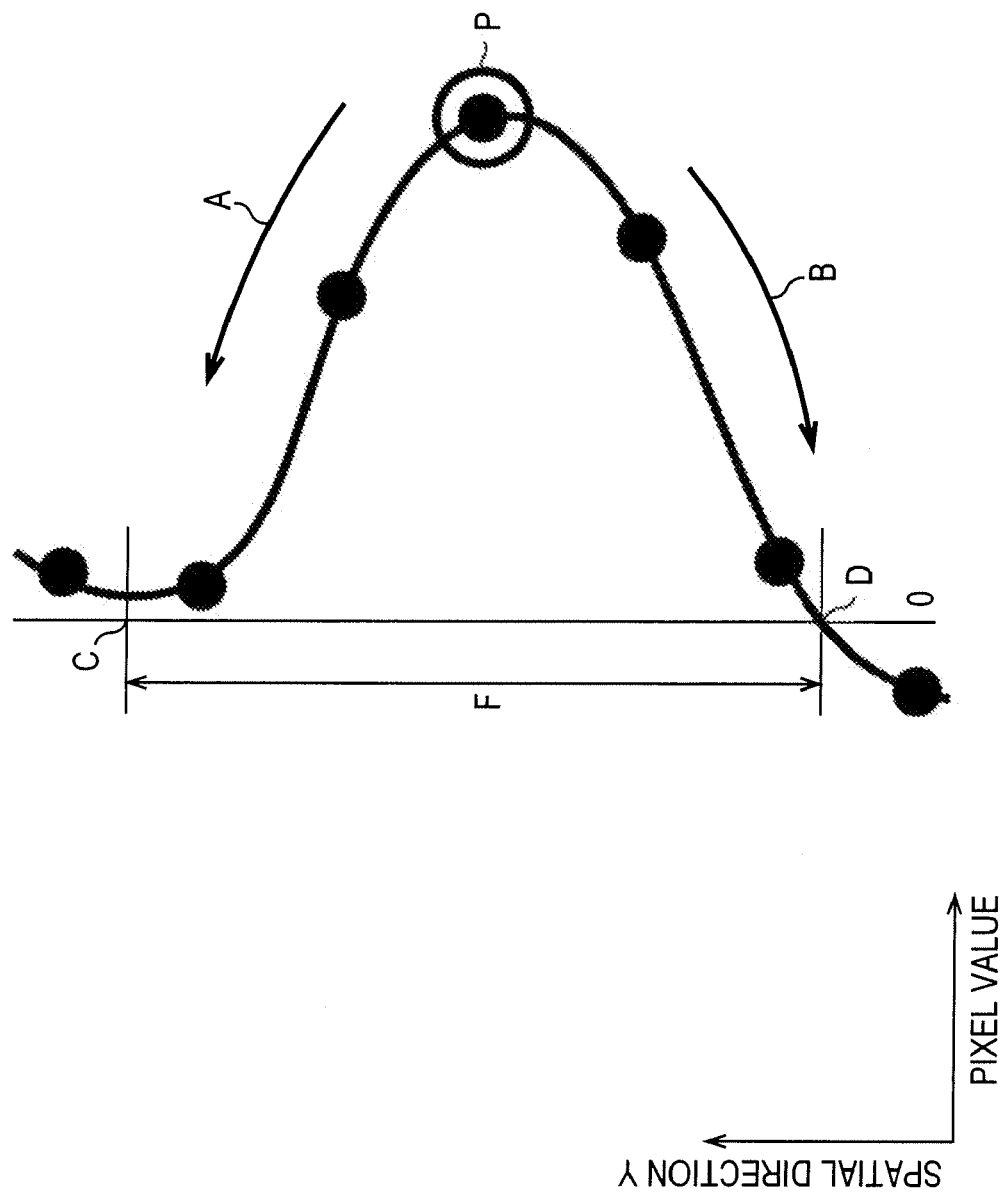
FIG. 36 is a diagram for describing the processing for detecting a peak and detecting of monotonous increase/decrease regions.

FIG. 36 is a diagram describing processing for peak detection and monotonous increase/decrease region detection, for detecting the region of pixels wherein the image of the fine line has been projected, from the pixel values as to a position in the spatial direction Y.

Figure 37:
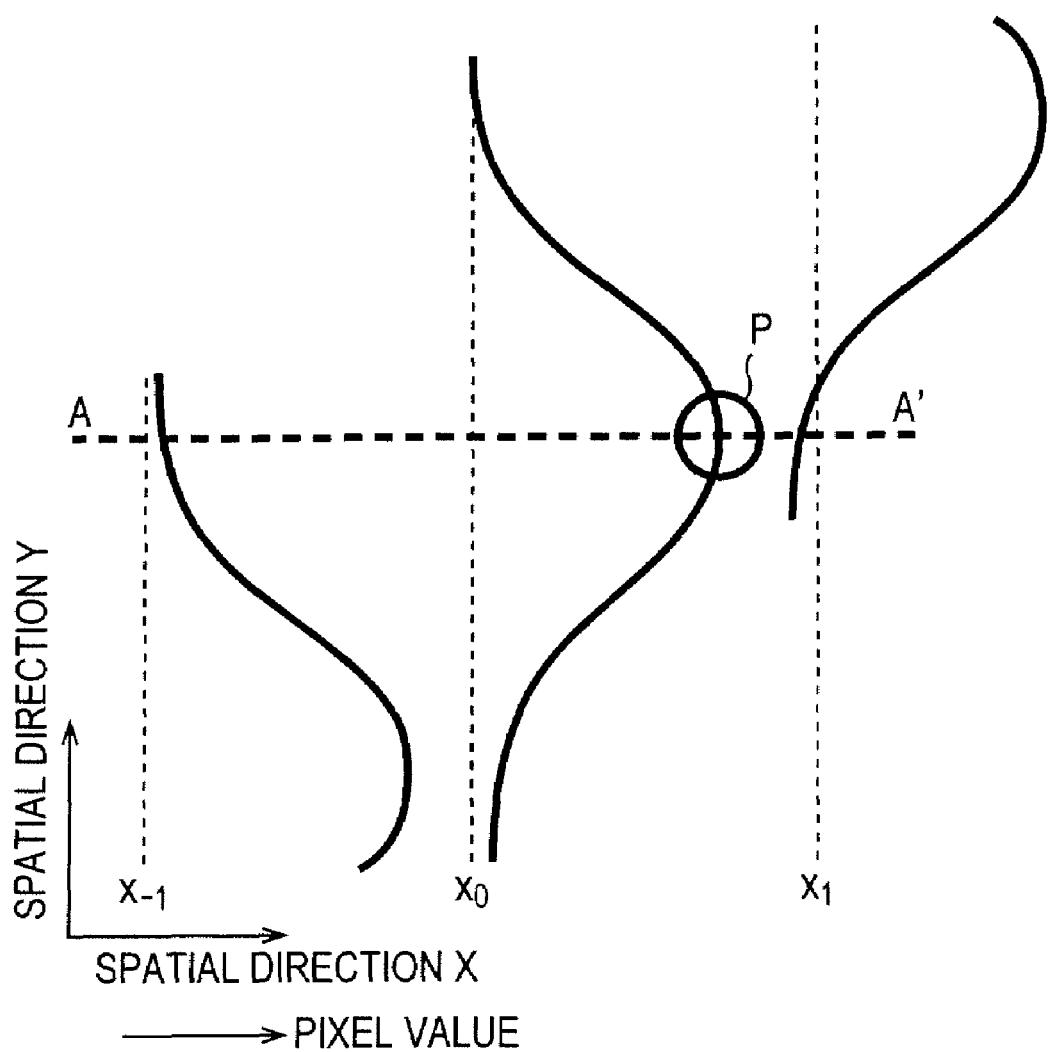
FIG. 37 is a diagram for describing the processing for detecting a fine line region wherein the pixel value of the peak exceeds a threshold, while the pixel value of the adjacent pixel is equal to or below the threshold value.
Figure 38:
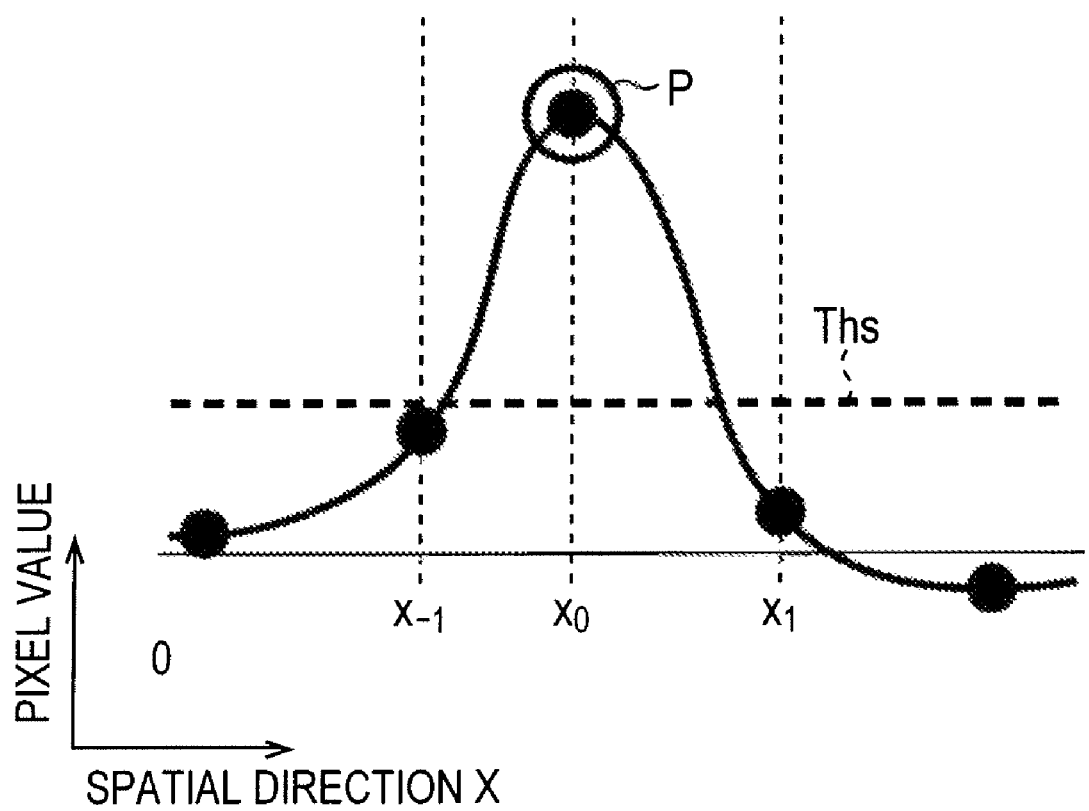
FIG. 38 is a diagram representing the pixel value of pixels arrayed in the direction indicated by dotted line AA' in FIG. 37.

In FIG. 36 through FIG. 38, P represents a peak. In the description of the data continuity detecting unit 101 of which the configuration is shown in FIG. 30, P represents a peak.

The peak detecting unit 202 compares the pixel values of the pixels with the pixel values of the pixels adjacent thereto in the spatial direction Y, and detects the peak P by detecting a pixel having a pixel value greater than the pixel values of the two pixels adjacent in the spatial direction Y.

The region made up of the peak P and the pixels on both sides of the peak P in the spatial direction Y is a monotonous decrease region wherein the pixel values of the pixels on both sides in the spatial direction Y monotonously decrease as to the pixel value of the peak P. In FIG. 36, the arrow denoted A and the arrow denoted by B represent the monotonous decrease regions existing on either side of the peak P.

The monotonous increase/decrease detecting unit 203 obtains the difference between the pixel values of each pixel and the pixel values of the pixels adjacent in the spatial direction Y, and detects pixels where the sign of the difference changes. The monotonous increase/decrease detecting unit 203 takes the boundary between the detected pixel where the sign of the difference changes and the pixel immediately prior thereto (on the peak P side) as the boundary of the fine line region made up of pixels where the image of the fine line has been projected.

In FIG. 36, the boundary of the fine line region which is the boundary between the pixel where the sign of the difference changes and the pixel immediately prior thereto (on the peak P side) is denoted by C.

Further, the monotonous increase/decrease detecting unit 203 compares the sign of the pixel values of each pixel with the pixel values of the pixels adjacent thereto in the spatial direction Y, and detects pixels where the sign of the pixel value changes in the monotonous decrease region. The monotonous increase/decrease detecting unit 203 takes the boundary between the detected pixel where the sign of the pixel value changes and the pixel immediately prior thereto (on the peak P side) as the boundary of the fine line region.

In FIG. 36, the boundary of the fine line region which is the boundary between the pixel where the sign of the pixel value changes and the pixel immediately prior thereto (on the peak P side) is denoted by D.

As shown in FIG. 36, the fine line region F made up of pixels where the image of the fine line has been projected is the region between the fine line region boundary C and the fine line region boundary D.

The monotonous increase/decrease detecting unit 203 obtains a fine line region F which is longer than a predetermined threshold value, from fine line regions F made up of such monotonous increase/decrease regions, i.e., a fine line region F having a greater number of pixels than the threshold value. For example, in the event that the threshold value is 3, the monotonous increase/decrease detecting unit 203 detects a fine line region F including 4 or more pixels.

Further, the monotonous increase/decrease detecting unit 203 compares the pixel value of the peak P, the pixel value of the pixel to the right side of the peak P, and the pixel value of the pixel to the left side of the peak P, from the fine line region F thus detected, each with the threshold value, detects a fine line pixel region F having the peak P wherein the pixel value of the peak P exceeds the threshold value, and wherein the pixel value of the pixel to the right side of the peak P is the threshold value or lower, and wherein the pixel value of the pixel to the left side of the peak P is the threshold value or lower, and takes the detected fine line region F as a candidate for the region made up of pixels containing the component of the fine line image.

In other words, determination is made that a fine line region F having the peak P, wherein the pixel value of the peak P is the threshold value or lower, or wherein the pixel value of the pixel to the right side of the peak P exceeds the threshold value, or wherein the pixel value of the pixel to the left side of the peak P exceeds the threshold value, does not contain the component of the fine line image, and is eliminated from candidates for the region made up of pixels including the component of the fine line image.

That is, as shown in FIG. 37, the monotonous increase/decrease detecting unit 203 compares the pixel value of the peak P with the threshold value, and also compares the pixel value of the pixel adjacent to the peak P in the spatial direction X (the direction indicated by the dotted line AA') with the threshold value, thereby detecting the fine line region F to which the peak P belongs, wherein the pixel value of the peak P exceeds the threshold value and wherein the pixel values of the pixel adjacent thereto in the spatial direction X are equal to or below the threshold value.

FIG. 38 is a diagram illustrating the pixel values of pixels arrayed in the spatial direction X indicated by the dotted line AA' in FIG. 37. The fine line region F to which the peak P belongs, wherein the pixel value of the peak P exceeds the threshold value $Th_s$ and wherein the pixel values of the pixel adjacent thereto in the spatial direction X are equal to or below the threshold value $Th_s$, contains the fine line component.

Note that an arrangement may be made wherein the monotonous increase/decrease detecting unit 203 compares the difference between the pixel value of the peak P and the pixel value of the background with the threshold value, taking the pixel value of the background as a reference, and also compares the difference between the pixel value of the pixels adjacent to the peak P in the spatial direction X and the pixel value of the background with the threshold value, thereby detecting the fine line region F to which the peak P belongs, wherein the difference between the pixel value of the peak P and the pixel value of the background exceeds the threshold value, and wherein the difference between the pixel value of the pixel adjacent in the spatial direction X and the pixel value of the background is equal to or below the threshold value.

The monotonous increase/decrease detecting unit 203 supplies to the continuousness detecting unit 204 monotonous increase/decrease region information indicating a region made up of pixels of which the pixel value monotonously decrease with the peak P as a reference and the sign of the pixel value is the same as that of the peak P, wherein the peak P exceeds the threshold value and wherein the pixel value of the pixel to the right side of the peak P is equal to or below the threshold value and the pixel value of the pixel to the left side of the peak P is equal to or below the threshold value.

In the event of detecting a region of pixels arrayed in a single row in the vertical direction of the screen where the image of the fine line has been projected, pixels belonging to the region indicated by the monotonous increase/decrease region information are arrayed in the vertical direction and include pixels where the image of the fine line has been projected. That is to say, the region indicated by the monotonous increase/decrease region information includes a region formed of pixels arrayed in a single row in the vertical direction of the screen where the image of the fine line has been projected.

In this way, the peak detecting unit 202 and the monotonous increase/decrease detecting unit 203 detects a continuity region made up of pixels where the image of the fine line has been projected, employing the nature that, of the pixels where the image of the fine line has been projected, change in the pixel values in the spatial direction Y approximates Gaussian distribution.

Of the region made up of pixels arrayed in the vertical direction, indicated by the monotonous increase/decrease region information supplied from the monotonous increase/decrease detecting unit 203, the continuousness detecting unit 204 detects regions including pixels adjacent in the horizontal direction, i.e., regions having similar pixel value change and duplicated in the vertical direction, as continuous regions, and outputs the peak information and data continuity information indicating the detected continuous regions. The data continuity information includes monotonous increase/decrease region information, information indicating the connection of regions, and so forth.

Arc shapes are aligned at constant intervals in an adjacent manner with the pixels where the fine line has been projected, so the detected continuous regions include the pixels where the fine line has been projected.

The detected continuous regions include the pixels where arc shapes are aligned at constant intervals in an adjacent manner to which the fine line has been projected, so the detected continuous regions are taken as a continuity region, and the continuousness detecting unit 204 outputs data continuity information indicating the detected continuous regions.

That is to say, the continuousness detecting unit 204 uses the continuity wherein arc shapes are aligned at constant intervals in an adjacent manner in the data 3 obtained by imaging the fine line, which has been generated due to the continuity of the image of the fine line in the actual world 1, the nature of the continuity being continuing in the length direction, so as to further narrow down the candidates of regions detected with the peak detecting unit 202 and the monotonous increase/decrease detecting unit 203.

Figure 39:
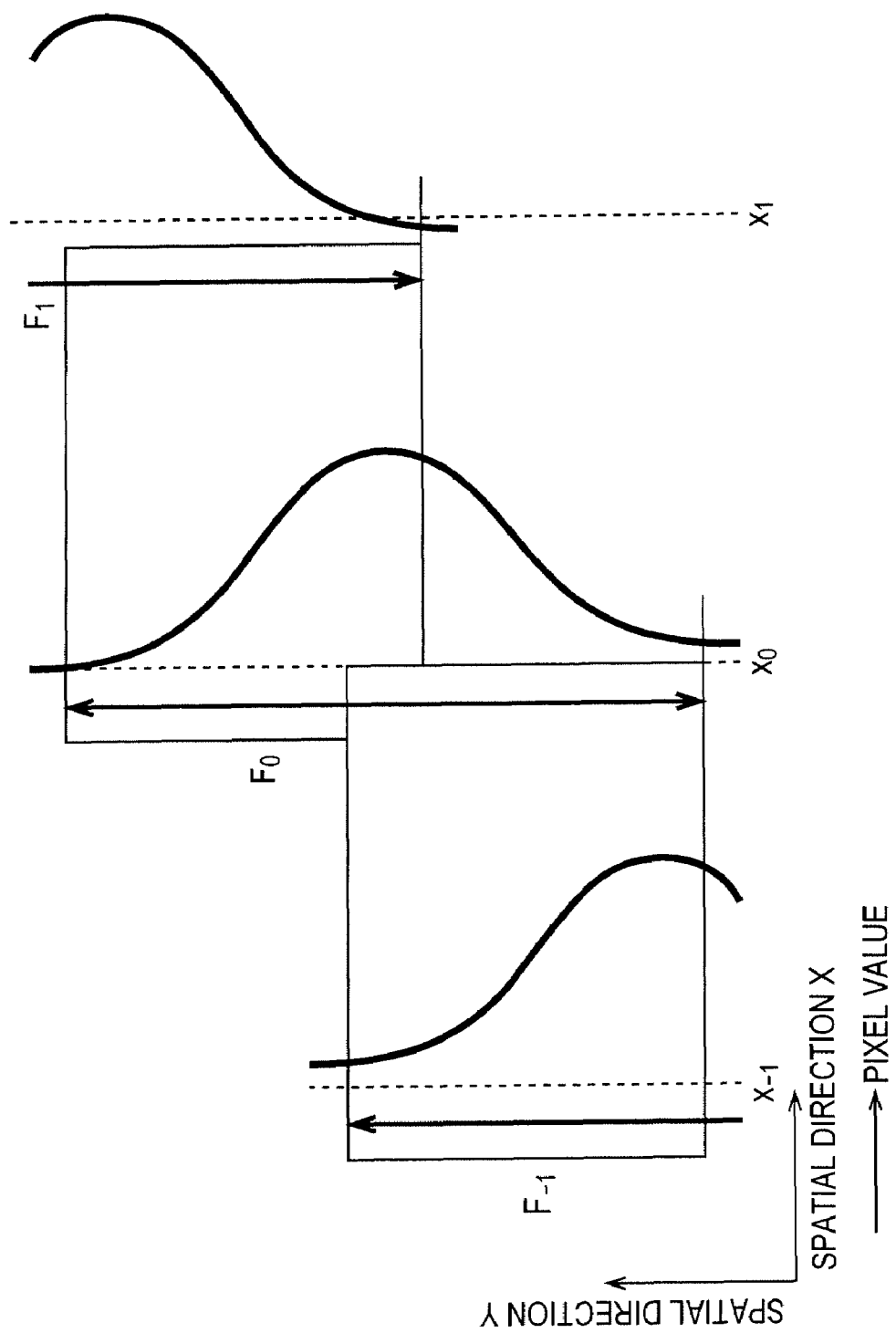
FIG. 39 is a diagram for describing processing for detecting continuity in a monotonous increase/decrease region.

FIG. 39 is a diagram describing the processing for detecting the continuousness of monotonous increase/decrease regions.

As shown in FIG. 39, in the event that a fine line region F formed of pixels aligned in a single row in the vertical direction of the screen includes pixels adjacent in the horizontal direction, the continuousness detecting unit 204 determines that there is continuousness between the two monotonous increase/decrease regions, and in the event that pixels adjacent in the horizontal direction are not included, determines that there is no continuousness between the two fine line regions F. For example, a fine line region $F_{-1}$ made up of pixels aligned in a single row in the vertical direction of the screen is determined to be continuous to a fine line region $F_0$ made up of pixels aligned in a single row in the vertical direction of the screen in the event of containing a pixel adjacent to a pixel of the fine line region $F_0$ in the horizontal direction. The fine line region $F_0$ made up of pixels aligned in a single row in the vertical direction of the screen is determined to be continuous to a fine line region $F_1$ made up of pixels aligned in a single row in the vertical direction of the screen in the event of containing a pixel adjacent to a pixel of the fine line region $F_1$ in the horizontal direction.

In this way, regions made up of pixels aligned in a single row in the vertical direction of the screen where the image of the fine line has been projected are detected by the peak detecting unit 202 through the continuousness detecting unit 204.

As described above, the peak detecting unit 202 through the continuousness detecting unit 204 detect regions made up of pixels aligned in a single row in the vertical direction of the screen where the image of the fine line has been projected, and further detect regions made up of pixels aligned in a single row in the horizontal direction of the screen where the image of the fine line has been projected.

Note that the order of processing is not particularly restricted, and may be executed in parallel, as a matter of course.

That is to say, the peak detecting unit 202, with regard to of pixels aligned in a single row in the horizontal direction of the screen, detects as a peak a pixel which has a pixel value greater in comparison with the pixel value of the pixel situated to the left side on the screen and the pixel value of the pixel situated to the right side on the screen, and supplies peak information indicating the position of the detected peak to the monotonous increase/decrease detecting unit 203. The peak detecting unit 202 detects one or multiple peaks from one image, for example, one frame image.

For example, the peak detecting unit 202 selects a pixel of interest from pixels in the one frame image which has not yet been taken as a pixel of interest, compares the pixel value of the pixel of interest with the pixel value of the pixel to the left side of the pixel of interest, compares the pixel value of the pixel of interest with the pixel value of the pixel to the right side of the pixel of interest, detects a pixel of interest having a pixel value greater than the pixel value of the pixel to the left side of the pixel of interest and having a pixel value greater than the pixel value of the pixel to the right side of the pixel of interest, and takes the detected pixel of interest as a peak. The peak detecting unit 202 supplies peak information indicating the detected peak to the monotonous increase/decrease detecting unit 203.

There are cases wherein the peak detecting unit 202 does not detect a peak.

The monotonous increase/decrease detecting unit 203 detects candidates for a region made up of pixels aligned in a single row in the horizontal direction as to the peak detected by the peak detecting unit 202 wherein the fine line image has been projected, and supplies the monotonous increase/decrease region information indicating the detected region to the continuousness detecting unit 204 along with the peak information.

More specifically, the monotonous increase/decrease detecting unit 203 detects regions made up of pixels having pixel values monotonously decreasing with the pixel value of the peak as a reference, as candidates of regions made up of pixels where the fine line image has been projected.

For example, the monotonous increase/decrease detecting unit 203 obtains, with regard to each pixel in a single row in the horizontal direction as to the peak, the pixel value of each pixel, the difference as to the pixel value of the pixel to the left side, and the difference as to the pixel value of the pixel to the right side. The monotonous increase/decrease detecting unit 203 then detects the region where the pixel value monotonously decreases by detecting the pixel where the sign of the difference changes.

Further, the monotonous increase/decrease detecting unit 203 detects, from a region wherein pixel values monotonously decrease, a region made up of pixels having pixel values with the same sign as the pixel value as the sign of the pixel value of the peak, with reference to the sign of the pixel value of the peak, as a candidate for a region made up of pixels where the fine line image has been projected.

For example, the monotonous increase/decrease detecting unit 203 compares the sign of the pixel value of each pixel with the sign of the pixel value of the pixel to the left side or with the sign of the pixel value of the pixel to the right side, and detects the pixel where the sign of the pixel value changes, thereby detecting a region made up of pixels having pixel values with the same sign as the peak, from the region where the pixel values monotonously decrease.

Thus, the monotonous increase/decrease detecting unit 203 detects a region made up of pixels aligned in the horizontal direction and having pixel values with the same sign as the peak wherein the pixel values monotonously decrease as to the peak.

From a fine line region made up of such a monotonous increase/decrease region, the monotonous increase/decrease detecting unit 203 obtains a fine line region longer than a threshold value set beforehand, i.e., a fine line region having a greater number of pixels than the threshold value.

Further, from the fine line region thus detected, the monotonous increase/decrease detecting unit 203 compares the pixel value of the peak, the pixel value of the pixel above the peak, and the pixel value of the pixel below the peak, each with the threshold value, detects a fine line region to which belongs a peak wherein the pixel value of the peak exceeds the threshold value, the pixel value of the pixel above the peak is within the threshold, and the pixel value of the pixel below the peak is within the threshold, and takes the detected fine line region as a candidate for a region made up of pixels containing the fine line image component.

Another way of saying this is that fine line regions to which belongs a peak wherein the pixel value of the peak is within the threshold value, or the pixel value of the pixel above the peak exceeds the threshold, or the pixel value of the pixel below the peak exceeds the threshold, are determined to not contain the fine line image component, and are eliminated from candidates of the region made up of pixels containing the fine line image component.

Note that the monotonous increase/decrease detecting unit 203 may be arranged to take the background pixel value as a reference, compare the difference between the pixel value of the peak and the pixel value of the background with the threshold value, and also to compare the difference between the pixel value of the background and the pixel values of the pixels adjacent to the peak in the vertical direction with the threshold value, and take a detected fine line region wherein the difference between the pixel value of the peak and the pixel value of the background exceeds the threshold value, and the difference between the pixel value of the background and the pixel value of the pixels adjacent in the vertical direction is within the threshold, as a candidate for a region made up of pixels containing the fine line image component.

The monotonous increase/decrease detecting unit 203 supplies to the continuousness detecting unit 204 monotonous increase/decrease region information indicating a region made up of pixels having a pixel value sign which is the same as the peak and monotonously decreasing pixel values as to the peak as a reference, wherein the peak exceeds the threshold value, and the pixel value of the pixel to the right side of the peak is within the threshold, and the pixel value of the pixel to the left side of the peak is within the threshold.

In the event of detecting a region made up of pixels aligned in a single row in the horizontal direction of the screen wherein the image of the fine line has been projected, pixels belonging to the region indicated by the monotonous increase/decrease region information include pixels aligned in the horizontal direction wherein the image of the fine line has been projected. That is to say, the region indicated by the monotonous increase/decrease region information includes a region made up of pixels aligned in a single row in the horizontal direction of the screen wherein the image of the fine line has been projected.

Of the regions made up of pixels aligned in the horizontal direction indicated in the monotonous increase/decrease region information supplied from the monotonous increase/decrease detecting unit 203, the continuousness detecting unit 204 detects regions including pixels adjacent in the vertical direction, i.e., regions having similar pixel value change and which are repeated in the horizontal direction, as continuous regions, and outputs data continuity information indicating the peak information and the detected continuous regions. The data continuity information includes information indicating the connection of the regions.

At the pixels where the fine line has been projected, arc shapes are arrayed at constant intervals in an adjacent manner, so the detected continuous regions include pixels where the fine line has been projected.

The detected continuous regions include pixels where arc shapes are arrayed at constant intervals in an adjacent manner wherein the fine line has been projected, so the detected continuous regions are taken as a continuity region, and the continuousness detecting unit 204 outputs data continuity information indicating the detected continuous regions.

That is to say, the continuousness detecting unit 204 uses the continuity which is that the arc shapes are arrayed at constant intervals in an adjacent manner in the data 3 obtained by imaging the fine line, generated from the continuity of the image of the fine line in the actual world 1 which is continuation in the length direction, so as to further narrow down the candidates of regions detected by the peak detecting unit 202 and the monotonous increase/decrease detecting unit 203.

Thus, the data continuity detecting unit 101 is capable of detecting continuity contained in the data 3 which is the input image. That is to say, the data continuity detecting unit 101 can detect continuity of data included in the data 3 which has been generated by the actual world 1 image which is a fine line having been projected on the data 3. The data continuity detecting unit 101 detects, from the data 3, regions made up of pixels where the actual world 1 image which is a fine line has been projected.

Figure 40:
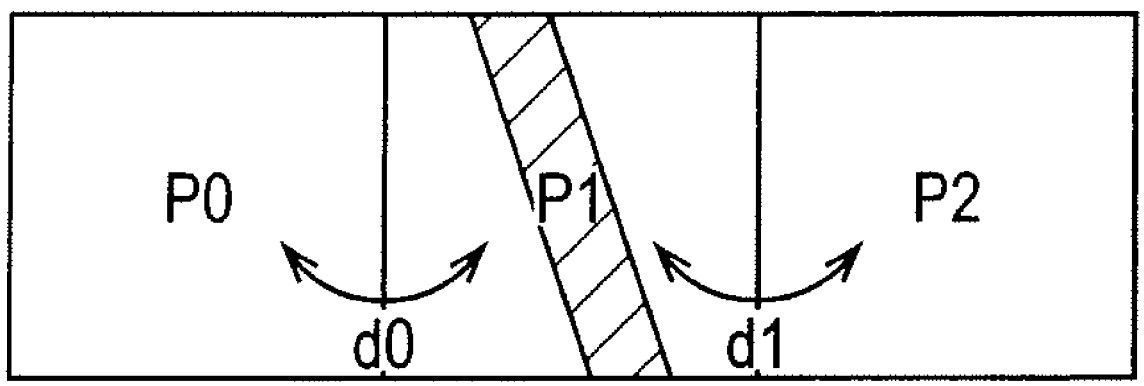
FIG. 40 is a diagram illustrating an example of other processing for detecting regions where an image of a fine line has been projected.

FIG. 40 is a diagram illustrating an example of other processing for detecting regions having continuity, where a fine line image has been projected, with the data continuity detecting unit 101.

As shown in FIG. 40, the data continuity detecting unit 101 calculates the absolute value of difference of pixel values for each pixel and adjacent pixels. The calculated absolute values of difference are placed corresponding to the pixels. For example, in a situation such as shown in FIG. 40 wherein there are pixels aligned which have respective pixel values of P0, P1, and P2, the data continuity detecting unit 101 calculates the difference d0=P0−P1 and the difference d1=P1−P2. Further, the data continuity detecting unit 101 calculates the absolute values of the difference d0 and the difference d1.

In the event that the non-continuity component contained in the pixel values P0, P1, and P2 are identical, only values corresponding to the component of the fine line are set to the difference d0 and the difference d1.

Accordingly, of the absolute values of the differences placed corresponding to the pixels, in the event that adjacent difference values are identical, the data continuity detecting unit 101 determines that the pixel corresponding to the absolute values of the two differences (the pixel between the two absolute values of difference) contains the component of the fine line. However, the data continuity detecting unit 101 does not need to detect the fine line in the event that the absolute value of difference is small. For example, in the event that the absolute value of difference is equal to or greater than a threshold value, the data continuity detecting unit 101 determines that the pixel contains a fine line component.

The data continuity detecting unit 101 can also detect fine lines with a simple method such as this.

Figure 41:
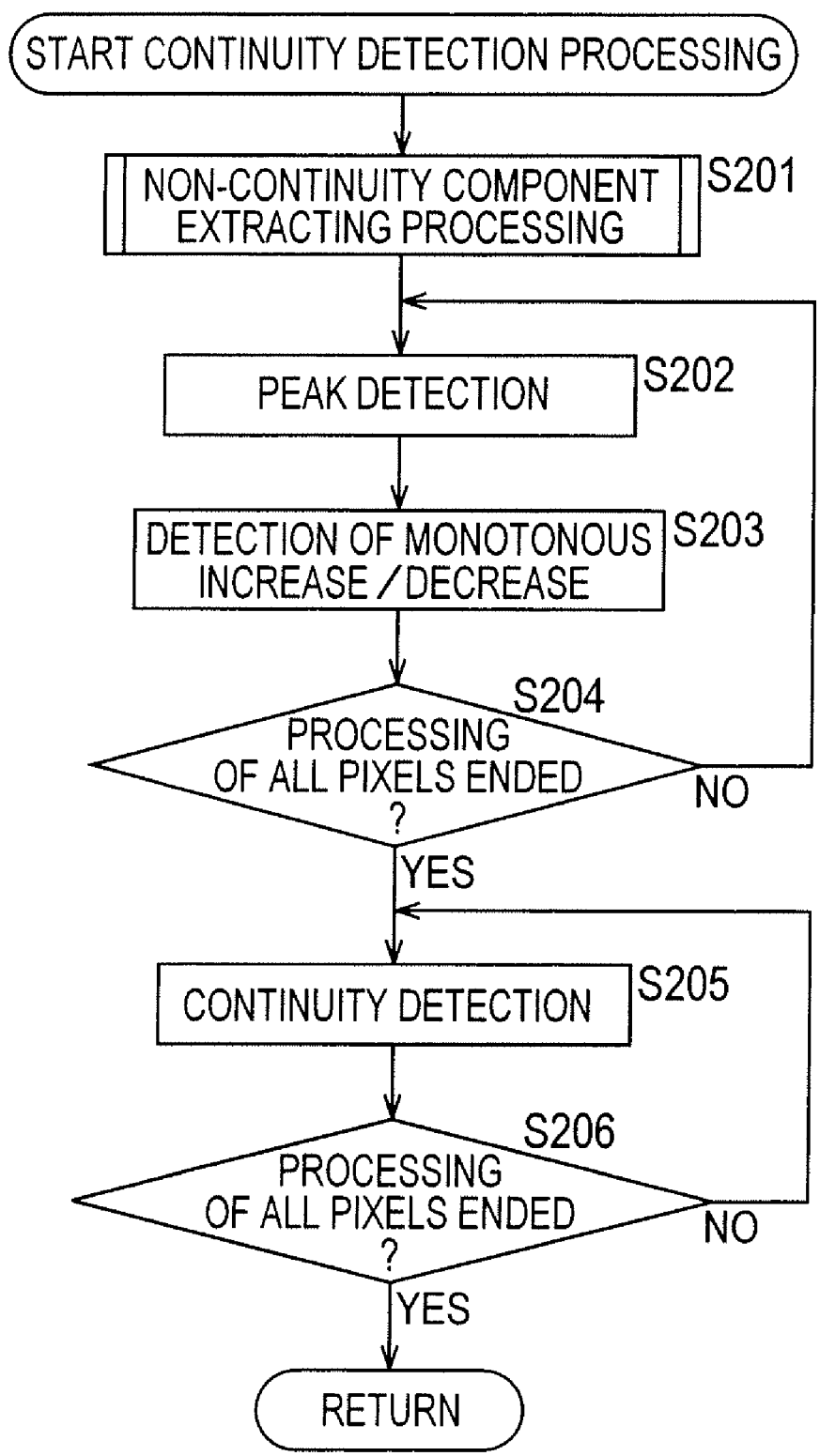
FIG. 41 is a flowchart for describing continuity detection processing.

FIG. 41 is a flowchart for describing continuity detection processing.

In step S201, the non-continuity component extracting unit 201 extracts non-continuity component, which is portions other than the portion where the fine line has been projected, from the input image. The non-continuity component extracting unit 201 supplies non-continuity component information indicating the extracted non-continuity component, along with the input image, to the peak detecting unit 202 and the monotonous increase/decrease detecting unit 203. Details of the processing for extracting the non-continuity component will be described later.

In step S202, the peak detecting unit 202 eliminates the non-continuity component from the input image, based on the non-continuity component information supplied from the non-continuity component extracting unit 201, so as to leave only pixels including the continuity component in the input image. Further, in step S202, the peak detecting unit 202 detects peaks.

That is to say, in the event of executing processing with the vertical direction of the screen as a reference, of the pixels containing the continuity component, the peak detecting unit 202 compares the pixel value of each pixel with the pixel values of the pixels above and below, and detects pixels having a greater pixel value than the pixel value of the pixel above and the pixel value of the pixel below, thereby detecting a peak. Also, in step S202, in the event of executing processing with the horizontal direction of the screen as a reference, of the pixels containing the continuity component, the peak detecting unit 202 compares the pixel value of each pixel with the pixel values of the pixels to the right side and left side, and detects pixels having a greater pixel value than the pixel value of the pixel to the right side and the pixel value of the pixel to the left side, thereby detecting a peak.

The peak detecting unit 202 supplies the peak information indicating the detected peaks to the monotonous increase/decrease detecting unit 203.

In step S203, the monotonous increase/decrease detecting unit 203 eliminates the non-continuity component from the input image, based on the non-continuity component information supplied from the non-continuity component extracting unit 201, so as to leave only pixels including the continuity component in the input image. Further, in step S203, the monotonous increase/decrease detecting unit 203 detects the region made up of pixels having data continuity, by detecting monotonous increase/decrease as to the peak, based on peak information indicating the position of the peak, supplied from the peak detecting unit 202.

In the event of executing processing with the vertical direction of the screen as a reference, the monotonous increase/decrease detecting unit 203 detects monotonous increase/decrease made up of one row of pixels aligned vertically where a single fine line image has been projected, based on the pixel value of the peak and the pixel values of the one row of pixels aligned vertically as to the peak, thereby detecting a region made up of pixels having data continuity. That is to say, in step S203, in the event of executing processing with the vertical direction of the screen as a reference, the monotonous increase/decrease detecting unit 203 obtains, with regard to a peak and a row of pixels aligned vertically as to the peak, the difference between the pixel value of each pixel and the pixel value of a pixel above or below, thereby detecting a pixel where the sign of the difference changes. Also, with regard to a peak and a row of pixels aligned vertically as to the peak, the monotonous increase/decrease detecting unit 203 compares the sign of the pixel value of each pixel with the sign of the pixel value of a pixel above or below, thereby detecting a pixel where the sign of the pixel value changes. Further, the monotonous increase/decrease detecting unit 203 compares pixel value of the peak and the pixel values of the pixels to the right side and to the left side of the peak with a threshold value, and detects a region made up of pixels wherein the pixel value of the peak exceeds the threshold value, and wherein the pixel values of the pixels to the right side and to the left side of the peak are within the threshold.

The monotonous increase/decrease detecting unit 203 takes a region detected in this way as a monotonous increase/decrease region, and supplies monotonous increase/decrease region information indicating the monotonous increase/decrease region to the continuousness detecting unit 204.

In the event of executing processing with the horizontal direction of the screen as a reference, the monotonous increase/decrease detecting unit 203 detects monotonous increase/decrease made up of one row of pixels aligned horizontally where a single fine line image has been projected, based on the pixel value of the peak and the pixel values of the one row of pixels aligned horizontally as to the peak, thereby detecting a region made up of pixels having data continuity. That is to say, in step S203, in the event of executing processing with the horizontal direction of the screen as a reference, the monotonous increase/decrease detecting unit 203 obtains, with regard to a peak and a row of pixels aligned horizontally as to the peak, the difference between the pixel value of each pixel and the pixel value of a pixel to the right side or to the left side, thereby detecting a pixel where the sign of the difference changes. Also, with regard to a peak and a row of pixels aligned horizontally as to the peak, the monotonous increase/decrease detecting unit 203 compares the sign of the pixel value of each pixel with the sign of the pixel value of a pixel to the right side or to the left side, thereby detecting a pixel where the sign of the pixel value changes. Further, the monotonous increase/decrease detecting unit 203 compares pixel value of the peak and the pixel values of the pixels to the upper side and to the lower side of the peak with a threshold value, and detects a region made up of pixels wherein the pixel value of the peak exceeds the threshold value, and wherein the pixel values of the pixels to the upper side and to the lower side of the peak are within the threshold.

The monotonous increase/decrease detecting unit 203 takes a region detected in this way as a monotonous increase/decrease region, and supplies monotonous increase/decrease region information indicating the monotonous increase/decrease region to the continuousness detecting unit 204.

In step S204, the monotonous increase/decrease detecting unit 203 determines whether or not processing of all pixels has ended. For example, the non-continuity component extracting unit 201 detects peaks for all pixels of a single screen (for example, frame, field, or the like) of the input image, and whether or not a monotonous increase/decrease region has been detected is determined.

In the event that determination is made in step S204 that processing of all pixels has not ended, i.e., that there are still pixels which have not been subjected to the processing of peak detection and detection of monotonous increase/decrease region, the flow returns to step S202, a pixel which has not yet been subjected to the processing of peak detection and detection of monotonous increase/decrease region is selected as an object of the processing, and the processing of peak detection and detection of monotonous increase/decrease region are repeated.

In the event that determination is made in step S204 that processing of all pixels has ended, i.e., that peaks and monotonous increase/decrease regions have been detected with regard to all pixels, the flow proceeds to step S205, where the continuousness detecting unit 204 detects the continuousness of detected regions, based on the monotonous increase/decrease region information. For example, in the event that monotonous increase/decrease regions made up of one row of pixels aligned in the vertical direction of the screen, indicated by monotonous increase/decrease region information, include pixels adjacent in the horizontal direction, the continuousness detecting unit 204 determines that there is continuousness between the two monotonous increase/decrease regions, and in the event of not including pixels adjacent in the horizontal direction, determines that there is no continuousness between the two monotonous increase/decrease regions. For example, in the event that monotonous increase/decrease regions made up of one row of pixels aligned in the horizontal direction of the screen, indicated by monotonous increase/decrease region information, include pixels adjacent in the vertical direction, the continuousness detecting unit 204 determines that there is continuousness between the two monotonous increase/decrease regions, and in the event of not including pixels adjacent in the vertical direction, determines that there is no continuousness between the two monotonous increase/decrease regions.

The continuousness detecting unit 204 takes the detected continuous regions as continuity regions having data continuity, and outputs data continuity information indicating the peak position and continuity region. The data continuity information contains information indicating the connection of regions. The data continuity information output from the continuousness detecting unit 204 indicates the fine line region, which is the continuity region, made up of pixels where the actual world 1 fine line image has been projected.

In step S206, a continuity direction detecting unit 205 determines whether or not processing of all pixels has ended. That is to say, the continuity direction detecting unit 205 determines whether or not region continuation has been detected with regard to all pixels of a certain frame of the input image.

In the event that determination is made in step S206 that processing of all pixels has not yet ended, i.e., that there are still pixels which have not yet been taken as the object of detection of region continuation, the flow returns to step S205, a pixel which has not yet been subjected to the processing of detection of region continuity is selected as the pixel for processing, and the processing for detection of region continuity is repeated.

In the event that determination is made in step S206 that processing of all pixels has ended, i.e., that all pixels have been taken as the object of detection of region continuity, the processing ends.

Thus, the continuity contained in the data 3 which is the input image is detected. That is to say, continuity of data included in the data 3 which has been generated by the actual world 1 image which is a fine line having been projected on the data 3 is detected, and a region having data continuity, which is made up of pixels on which the actual world 1 image which is a fine line has been projected, is detected from the data 3.

Now, the data continuity detecting unit 101 of which the configuration is shown in FIG. 30 can detect time-directional data continuity, based on the region having data continuity detected from the frame of the data 3.

Figure 42:
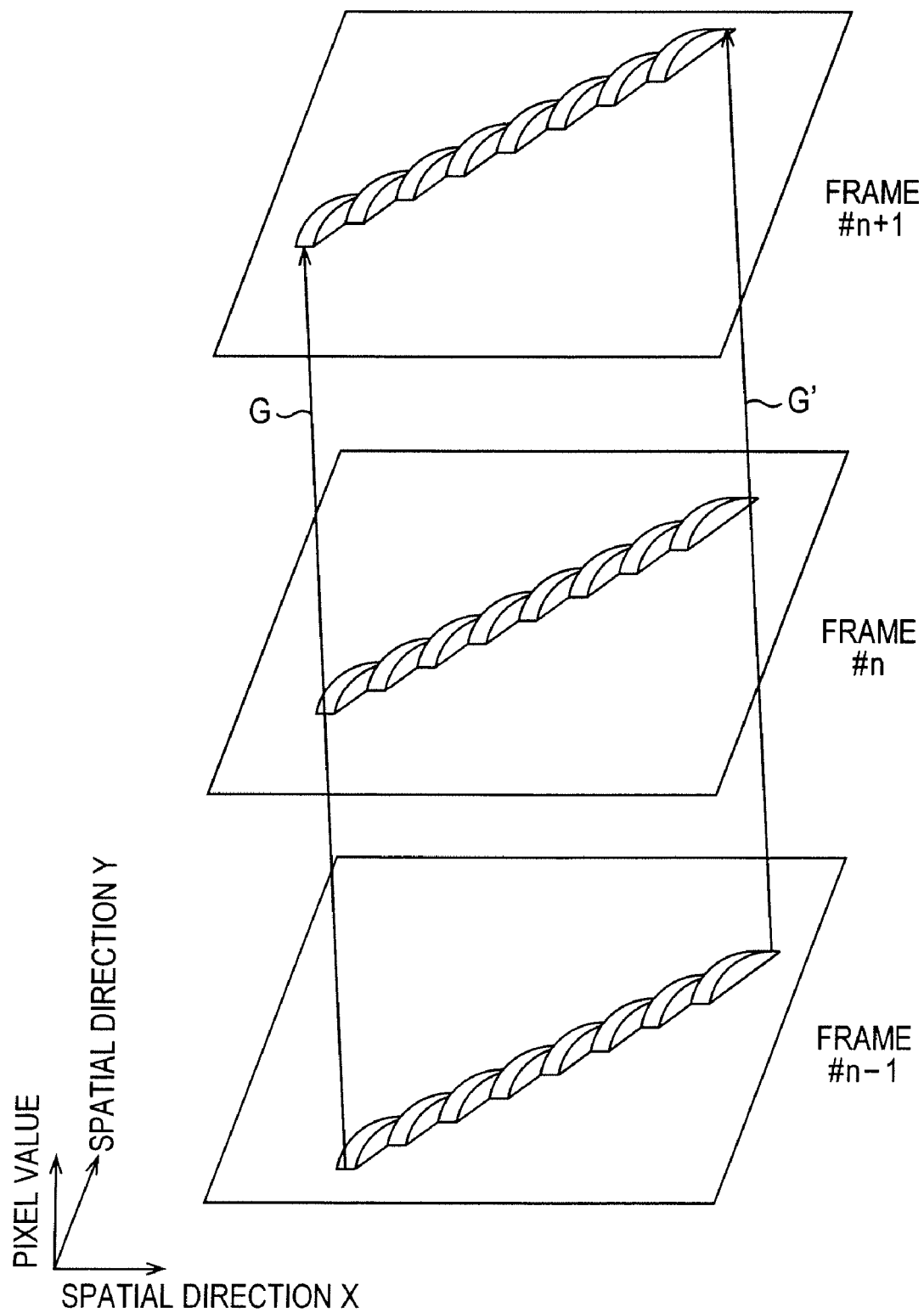
FIG. 42 is a diagram for describing processing for detecting continuity of data in the time direction.

For example, as shown in FIG. 42, the continuousness detecting unit 204 detects time-directional data continuity by connecting the edges of the region having detected data continuity in frame #n, the region having detected data continuity in frame #n−1, and the region having detected data continuity in frame #n+1.

The frame #n−1 is a frame preceding the frame #n time-wise, and the frame #n+1 is a frame following the frame #n time-wise. That is to say, the frame #n−1, the frame #n, and the frame #n+1, are displayed on the order of the frame #n−1, the frame #n, and the frame #n+1.

More specifically, in FIG. 42, G denotes a movement vector obtained by connecting the one edge of the region having detected data continuity in frame #n, the region having detected data continuity in frame #n−1, and the region having detected data continuity in frame #n+1, and G' denotes a movement vector obtained by connecting the other edges of the regions having detected data continuity. The movement vector G and the movement vector G' are an example of data continuity in the time direction.

Further, the data continuity detecting unit 101 of which the configuration is shown in FIG. 30 can output information indicating the length of the region having data continuity as data continuity information.

Figure 43:
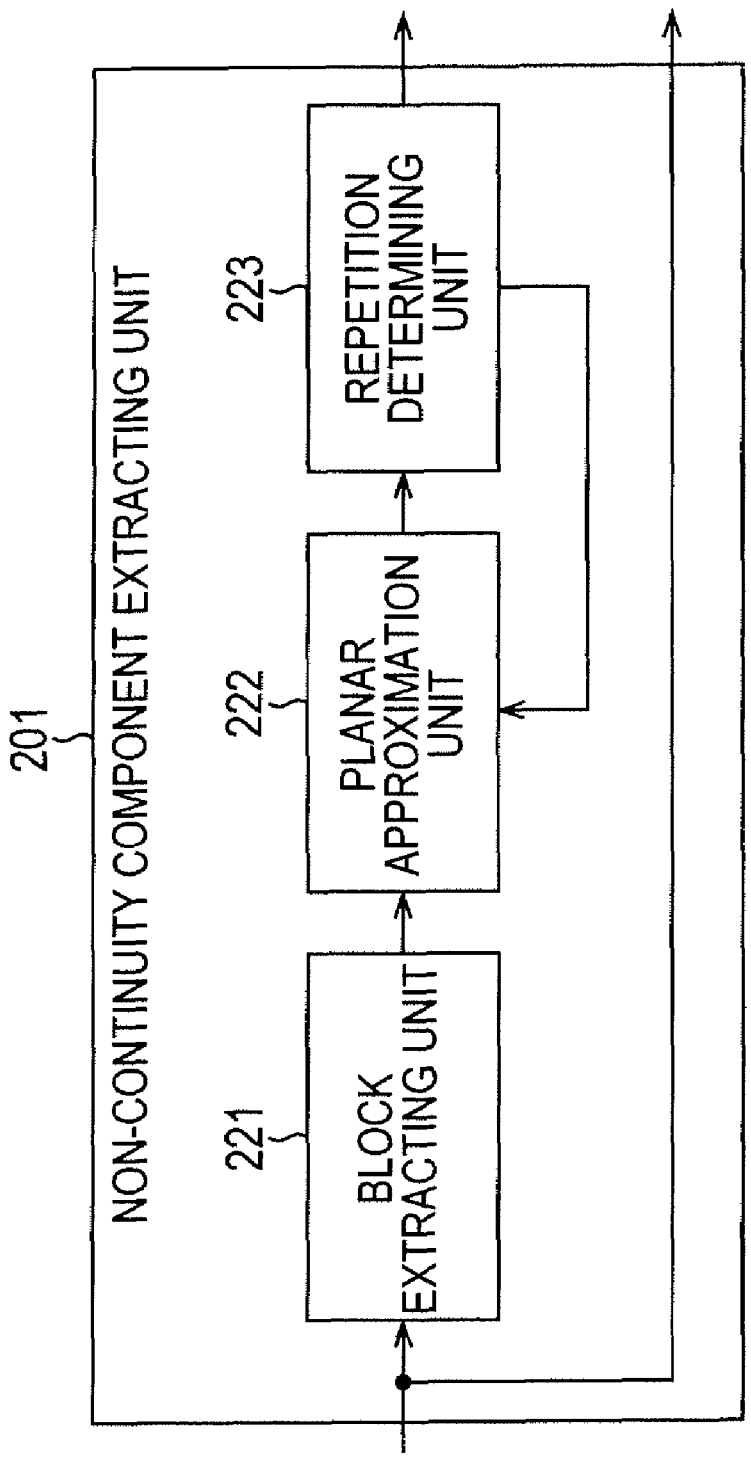
FIG. 43 is a block diagram illustrating the configuration of a non-continuity component extracting unit 201.

FIG. 43 is a block diagram illustrating the configuration of the non-continuity component extracting unit 201 which performs planar approximation of the non-continuity component which is the portion of the image data which does not have data continuity, and extracts the non-continuity component.

The non-continuity component extracting unit 201 of which the configuration is shown in FIG. 43 extracts blocks, which are made up of a predetermined number of pixels, from the input image, performs planar approximation of the blocks, so that the error between the block and a planar value is below a predetermined threshold value, thereby extracting the non-continuity component.

The input image is supplied to a block extracting unit 221, and is also output without change.

The block extracting unit 221 extracts blocks, which are made up of a predetermined number of pixels, from the input image. For example, the block extracting unit 221 extracts a block made up of 7×7 pixels, and supplies this to a planar approximation unit 222. For example, the block extracting unit 221 moves the pixel serving as the center of the block to be extracted in raster scan order, thereby sequentially extracting blocks from the input image.

The planar approximation unit 222 approximates the pixel values of a pixel contained in the block on a predetermined plane. For example, the planar approximation unit 222 approximates the pixel value of a pixel contained in the block on a plane expressed by Expression (32).

$$z = ax + by + c \tag{32}$$

In Expression (32), x represents the position of the pixel in one direction on the screen (the spatial direction X), and y represents the position of the pixel in the other direction on the screen (the spatial direction Y). z represents the application value represented by the plane. a represents the gradient of the spatial direction X of the plane, and b represents the gradient of the spatial direction Y of the plane. In Expression (32), c represents the offset of the plane (intercept).

For example, the planar approximation unit 222 obtains the gradient a, gradient b, and offset c, by regression processing, thereby approximating the pixel values of the pixels contained in the block on a plane expressed by Expression (32). The planar approximation unit 222 obtains the gradient a, gradient b, and offset c, by regression processing including rejection, thereby approximating the pixel values of the pixels contained in the block on a plane expressed by Expression (32).

For example, the planar approximation unit 222 obtains the plane expressed by Expression (32) wherein the error is least as to the pixel values of the pixels of the block using the least-square method, thereby approximating the pixel values of the pixels contained in the block on the plane.

Note that while the planar approximation unit 222 has been described approximating the block on the plane expressed by Expression (32), this is not restricted to the plane expressed by Expression (32), rather, the block may be approximated on a plane represented with a function with a higher degree of freedom, for example, an n-order (wherein n is an arbitrary integer) polynomial.

A repetition determining unit 223 calculates the error between the approximation value represented by the plane upon which the pixel values of the block have been approximated, and the corresponding pixel values of the pixels of the block. Expression (33) is an expression which shows the error ei which is the difference between the approximation value represented by the plane upon which the pixel values of the block have been approximated, and the corresponding pixel values zi of the pixels of the block.

$$e_i = z_i - \hat{z} = z_i - (\hat{a} x_i + \hat{b} y_i + \hat{c}) \tag{33}$$

In Expression (33), z-hat (A symbol with ^ over z will be described as z-hat. The same description will be used in the present specification hereafter.) represents an approximation value expressed by the plane on which the pixel values of the block are approximated, a-hat represents the gradient of the spatial direction X of the plane on which the pixel values of the block are approximated, b-hat represents the gradient of the spatial direction Y of the plane on which the pixel values of the block are approximated, and c-hat represents the offset (intercept) of the plane on which the pixel values of the block are approximated.

The repetition determining unit 223 rejects the pixel regarding which the error ei between the approximation value and the corresponding pixel values of pixels of the block is greatest, shown in Expression (33). Thus, pixels where the fine line has been projected, i.e., pixels having continuity, are rejected. The repetition determining unit 223 supplies rejection information indicating the rejected pixels to the planar approximation unit 222.

Further, the repetition determining unit 223 calculates a standard error, and in the event that the standard error is equal to or greater than threshold value which has been set beforehand for determining ending of approximation, and half or more of the pixels of the pixels of a block have not been rejected, the repetition determining unit 223 causes the planar approximation unit 222 to repeat the processing of planar approximation on the pixels contained in the block, from which the rejected pixels have been eliminated.

Pixels having continuity are rejected, so approximating the pixels from which the rejected pixels have been eliminated on a plane means that the plane approximates the non-continuity component.

At the point that the standard error below the threshold value for determining ending of approximation, or half or more of the pixels of the pixels of a block have been rejected, the repetition determining unit 223 ends planar approximation.

With a block made up of 5×5 pixels, the standard error $e_s$ can be calculated with, for example, Expression (34).

$$e_s = \sum (z_i - \hat{z})/(n-3) \quad (34)$$
$$= \sum \{(z_i - (\hat{a}x_i + \hat{b}y_i + \hat{c}))\}/(n-3)$$

Here, n is the number of pixels.

Note that the repetition determining unit 223 is not restricted to standard error, and may be arranged to calculate the sum of the square of errors for all of the pixels contained in the block, and perform the following processing.

Figure 44:
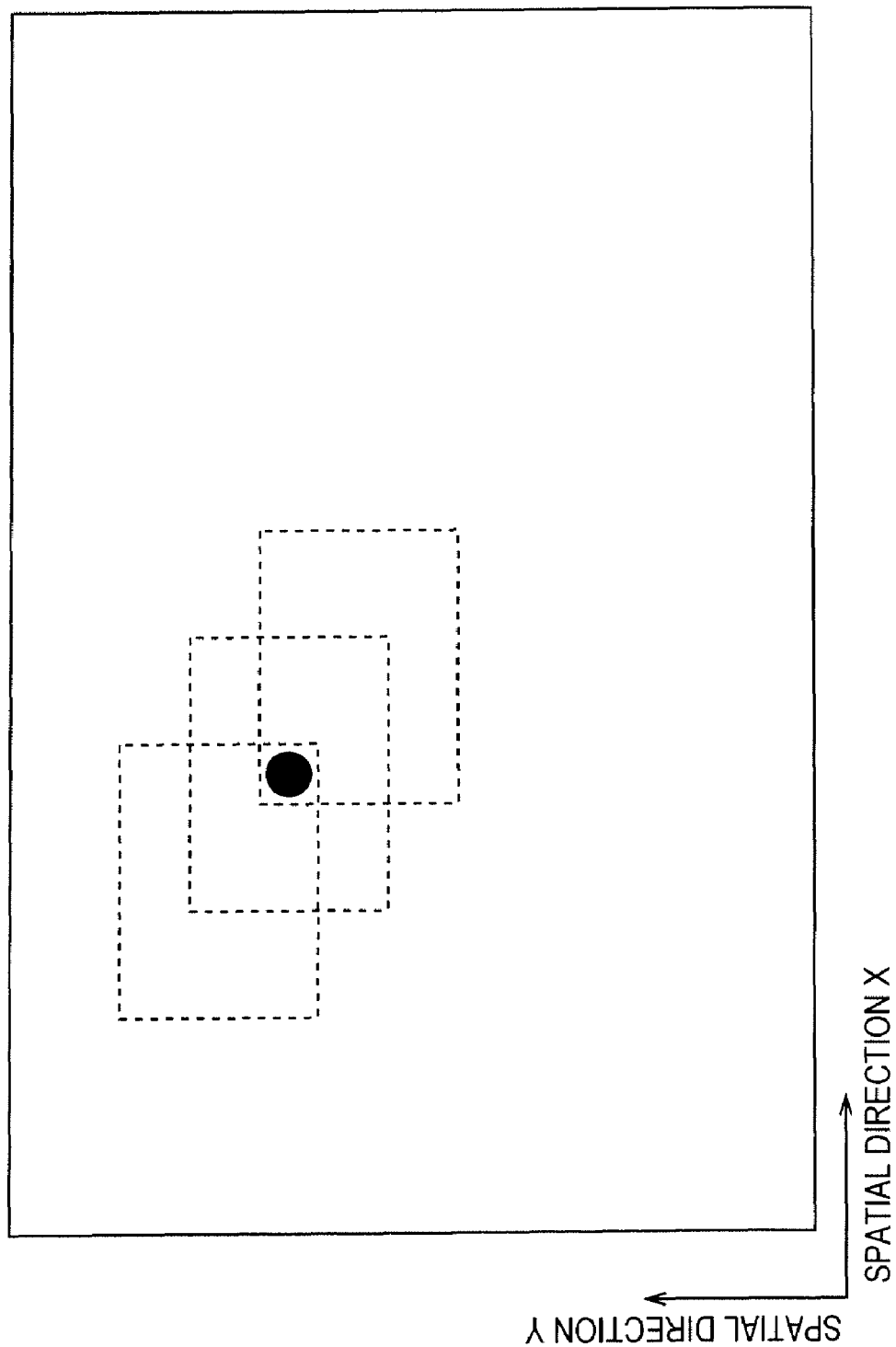
FIG. 44 is a diagram for describing the number of time of rejections.

Now, at the time of planar approximation of blocks shifted one pixel in the raster scan direction, a pixel having continuity, indicated by the black circle in the diagram, i.e., a pixel containing the fine line component, will be rejected multiple times, as shown in FIG. 44.

Upon completing planar approximation, the repetition determining unit 223 outputs information expressing the plane for approximating the pixel values of the block (the gradient and intercept of the plane of Expression 32)) as non-continuity information.

Note that an arrangement may be made wherein the repetition determining unit 223 compares the number of times of rejection per pixel with a preset threshold value, and takes a pixel which has been rejected a number of times equal to or greater than the threshold value as a pixel containing the continuity component, and output the information indicating the pixel including the continuity component as continuity component information. In this case, the peak detecting unit 202 through the continuity direction detecting unit 205 execute their respective processing on pixels containing continuity component, indicated by the continuity component information.

The number of times of rejection, the gradient of the spatial direction X of the plane for approximating the pixel values of the pixel of the block, the gradient of the spatial direction Y of the plane for approximating the pixel values of the pixel of the block, approximation values expressed by the plane approximating the pixel values of the pixels of the block, and the error ei, can be used as features of the input image.

Figure 45:
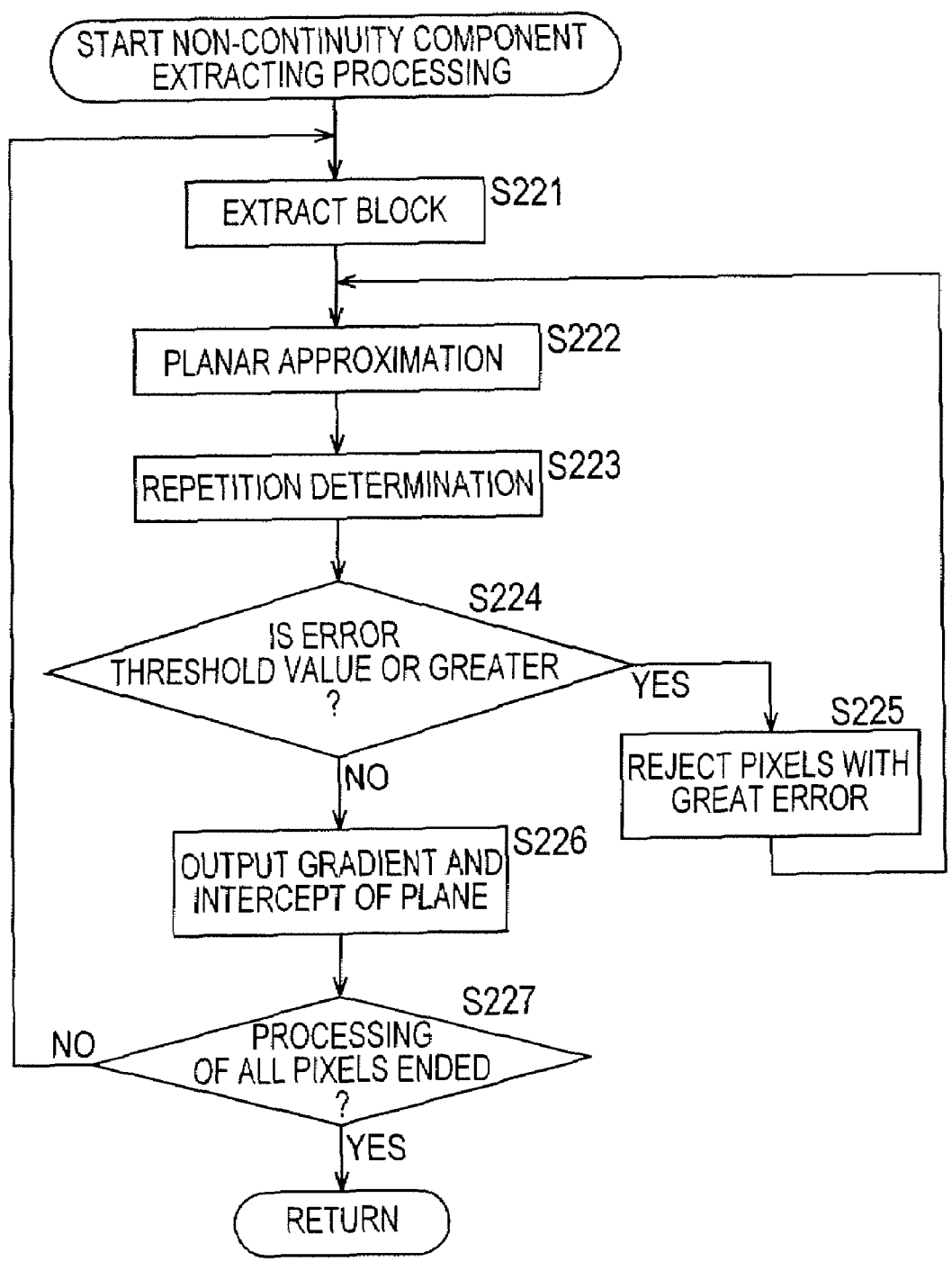
FIG. 45 is a flowchart describing the processing for extracting the non-continuity component.

FIG. 45 is a flowchart for describing the processing of extracting the non-continuity component with the non-continuity component extracting unit 201 of which the configuration is shown in FIG. 43, corresponding to step S201.

In step S221, the block extracting unit 221 extracts a block made up of a predetermined number of pixels from the input image, and supplies the extracted block to the planar approximation unit 222. For example, the block extracting unit 221 selects one pixel of the pixels of the input pixel which have not been selected yet, and extracts a block made up of 7×7 pixels centered on the selected pixel. For example, the block extracting unit 221 can select pixels in raster scan order.

In step S222, the planar approximation unit 222 approximates the extracted block on a plane. The planar approximation unit 222 approximates the pixel values of the pixels of the extracted block on a plane by regression processing, for example. For example, the planar approximation unit 222 approximates the pixel values of the pixels of the extracted block excluding the rejected pixels on a plane, by regression processing. In step S223, the repetition determining unit 223 executes repetition determination. For example, repetition determination is performed by calculating the standard error from the pixel values of the pixels of the block and the planar approximation values, and counting the number of rejected pixels.

In step S224, the repetition determining unit 223 determines whether or not the standard error is equal to or above a threshold value, and in the event that determination is made that the standard error is equal to or above the threshold value, the flow proceeds to step S225.

Note that an arrangement may be made wherein the repetition determining unit 223 determines in step S224 whether or not half or more of the pixels of the block have been rejected, and whether or not the standard error is equal to or above the threshold value, and in the event that determination is made that half or more of the pixels of the block have not been rejected, and the standard error is equal to or above the threshold value, the flow proceeds to step S225.

In step S225, the repetition determining unit 223 calculates the error between the pixel value of each pixel of the block and the approximated planar approximation value, rejects the pixel with the greatest error, and notifies the planar approximation unit 222. The procedure returns to step S222, and the planar approximation processing and repetition determination processing is repeated with regard to the pixels of the block excluding the rejected pixel.

In step S225, in the event that a block which is shifted one pixel in the raster scan direction is extracted in the processing in step S221, the pixel including the fine line component (indicated by the black circle in the drawing) is rejected multiple times, as shown in FIG. 44.

In the event that determination is made in step S224 that the standard error is not equal to or greater than the threshold value, the block has been approximated on the plane, so the flow proceeds to step S226.

Note that an arrangement may be made wherein the repetition determining unit 223 determines in step S224 whether or not half or more of the pixels of the block have been rejected, and whether or not the standard error is equal to or above the threshold value, and in the event that determination is made that half or more of the pixels of the block have been rejected, or the standard error is not equal to or above the threshold value, the flow proceeds to step S225.

In step S226, the repetition determining unit 223 outputs the gradient and intercept of the plane for approximating the pixel values of the pixels of the block as non-continuity component information.

In step S227, the block extracting unit 221 determines whether or not processing of all pixels of one screen of the input image has ended, and in the event that determination is made that there are still pixels which have not yet been taken as the object of processing, the flow returns to step S221, a block is extracted from pixels not yet been subjected to the processing, and the above processing is repeated.

In the event that determination is made in step S227 that processing has ended for all pixels of one screen of the input image, the processing ends.

Thus, the non-continuity component extracting unit 201 of which the configuration is shown in FIG. 43 can extract the non-continuity component from the input image. The non-continuity component extracting unit 201 extracts the non-continuity component from the input image, so the peak detecting unit 202 and monotonous increase/decrease detecting unit 203 can obtain the difference between the input image and the non-continuity component extracted by the non-continuity component extracting unit 201, so as to execute the processing regarding the difference containing the continuity component.

Note that the standard error in the event that rejection is performed, the standard error in the event that rejection is not performed, the number of times of rejection of a pixel, the gradient of the spatial direction X of the plane (a-hat in Expression (32)), the gradient of the spatial direction Y of the plane (b-hat in Expression (32)), the level of planar transposing (c-hat in Expression (32)), and the difference between the pixel values of the input image and the approximation values represented by the plane, calculated in planar approximation processing, can be used as features.

Figure 46:
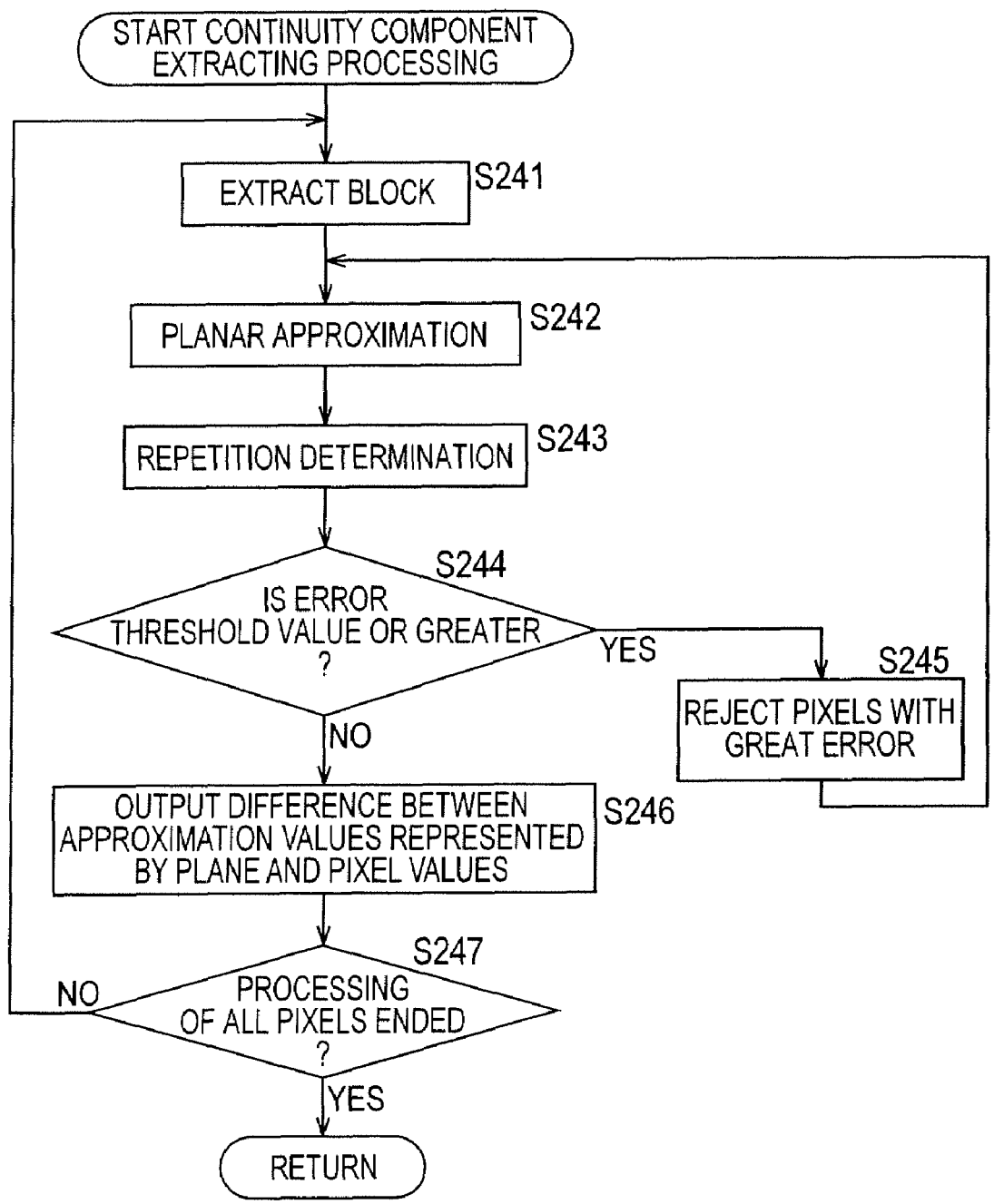
FIG. 46 is a flowchart describing the processing for extracting the continuity component.

FIG. 46 is a flowchart for describing processing for extracting the continuity component with the non-continuity component extracting unit 201 of which the configuration is shown in FIG. 43, instead of the processing for extracting the non-continuity component corresponding to step S201. The processing of step S241 through step S245 is the same as the processing of step S221 through step S225, so description thereof will be omitted.

In step S246, the repetition determining unit 223 outputs the difference between the approximation value represented by the plane and the pixel values of the input image, as the continuity component of the input image. That is to say, the repetition determining unit 223 outputs the difference between the planar approximation values and the true pixel values.

Note that the repetition determining unit 223 may be arranged to output the difference between the approximation value represented by the plane and the pixel values of the input image, regarding pixel values of pixels of which the difference is equal to or greater than a predetermined threshold value, as the continuity component of the input image.

The processing of step S247 is the same as the processing of step S227, and accordingly description thereof will be omitted.

The plane approximates the non-continuity component, so the non-continuity component extracting unit 201 can remove the non-continuity component from the input image by subtracting the approximation value represented by the plane for approximating pixel values, from the pixel values of each pixel in the input image. In this case, the peak detecting unit 202 through the continuousness detecting unit 204 can be made to process only the continuity component of the input image, i.e., the values where the fine line image has been projected, so the processing with the peak detecting unit 202 through the continuousness detecting unit 204 becomes easier.

Figure 47:
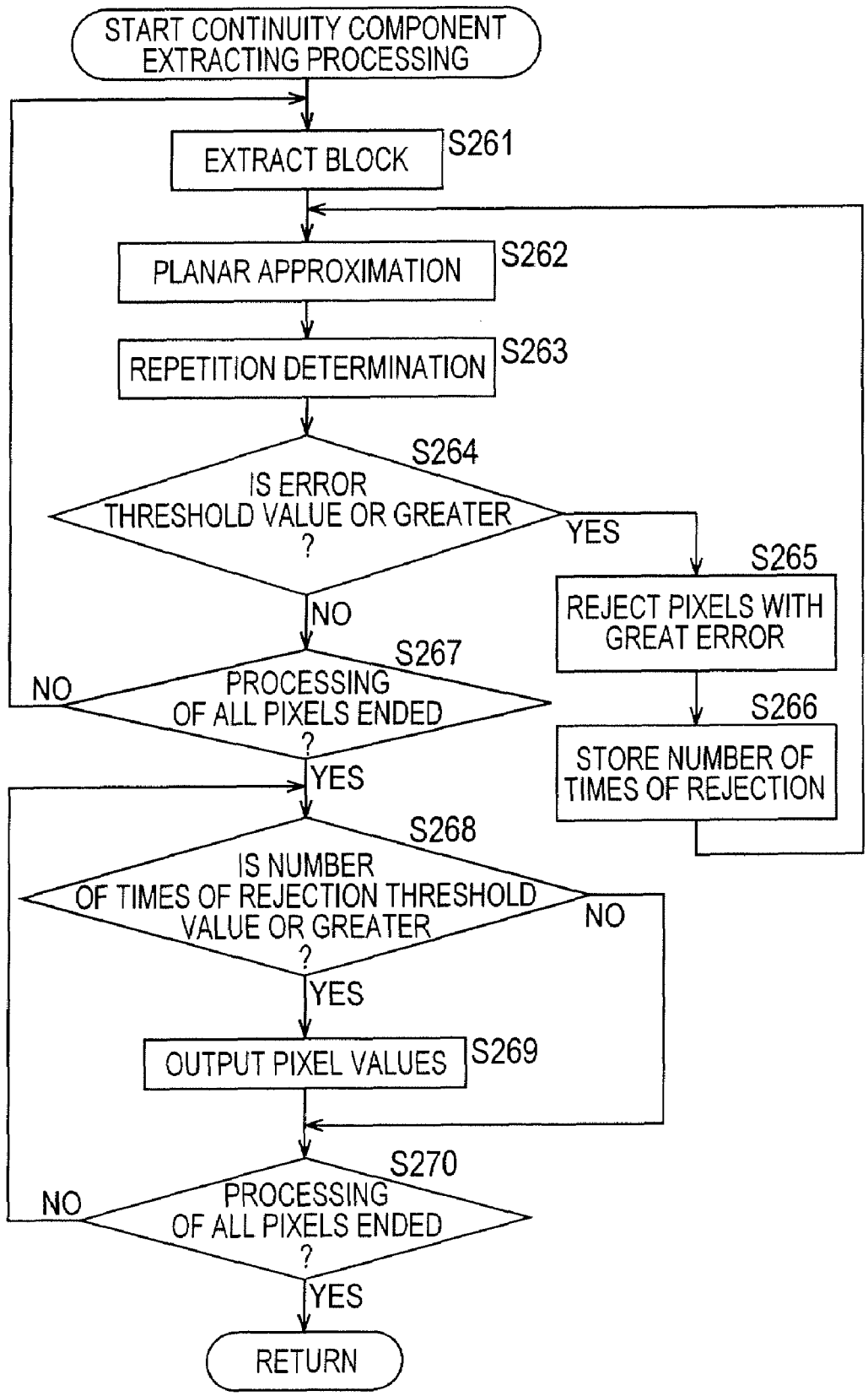
FIG. 47 is a flowchart describing other processing for extracting the continuity component.

FIG. 47 is a flowchart for describing other processing for extracting the continuity component with the non-continuity component extracting unit 201 of which the configuration is shown in FIG. 43, instead of the processing for extracting the non-continuity component corresponding to step S201. The processing of step S261 through step S265 is the same as the processing of step S221 through step S225, so description thereof will be omitted.

In step S266, the repetition determining unit 223 stores the number of times of rejection for each pixel, the flow returns to step S262, and the processing is repeated.

In step S264, in the event that determination is made that the standard error is not equal to or greater than the threshold value, the block has been approximated on the plane, so the flow proceeds to step S267, the repetition determining unit 223 determines whether or not processing of all pixels of one screen of the input image has ended, and in the event that determination is made that there are still pixels which have not yet been taken as the object of processing, the flow returns to step S261, with regard to a pixel which has not yet been subjected to the processing, a block is extracted, and the above processing is repeated.

In the event that determination is made in step S267 that processing has ended for all pixels of one screen of the input image, the flow proceeds to step S268, the repetition determining unit 223 selects a pixel which has not yet been selected, and determines whether or not the number of times of rejection of the selected pixel is equal to or greater than a threshold value. For example, the repetition determining unit 223 determines in step S268 whether or not the number of times of rejection of the selected pixel is equal to or greater than a threshold value stored beforehand.

In the event that determination is made in step S268 that the number of times of rejection of the selected pixel is equal to or greater than the threshold value, the selected pixel contains the continuity component, so the flow proceeds to step S269, where the repetition determining unit 223 outputs the pixel value of the selected pixel (the pixel value in the input image) as the continuity component of the input image, and the flow proceeds to step S270.

In the event that determination is made in step S268 that the number of times of rejection of the selected pixel is not equal to or greater than the threshold value, the selected pixel does not contain the continuity component, so the processing in step S269 is skipped, and the procedure proceeds to step S270. That is to say, the pixel value of a pixel regarding which determination has been made that the number of times of rejection is not equal to or greater than the threshold value is not output.

Note that an arrangement may be made wherein the repetition determining unit 223 outputs a pixel value set to 0 for pixels regarding which determination has been made that the number of times of rejection is not equal to or greater than the threshold value.

In step S270, the repetition determining unit 223 determines whether or not processing of all pixels of one screen of the input image has ended to determine whether or not the number of times of rejection is equal to or greater than the threshold value, and in the event that determination is made that processing has not ended for all pixels, this means that there are still pixels which have not yet been taken as the object of processing, so the flow returns to step S268, a pixel which has not yet been subjected to the processing is selected, and the above processing is repeated.

In the event that determination is made in step S270 that processing has ended for all pixels of one screen of the input image, the processing ends.

Thus, of the pixels of the input image, the non-continuity component extracting unit 201 can output the pixel values of pixels containing the continuity component, as continuity component information. That is to say, of the pixels of the input image, the non-continuity component extracting unit 201 can output the pixel values of pixels containing the component of the fine line image.

Figure 48:
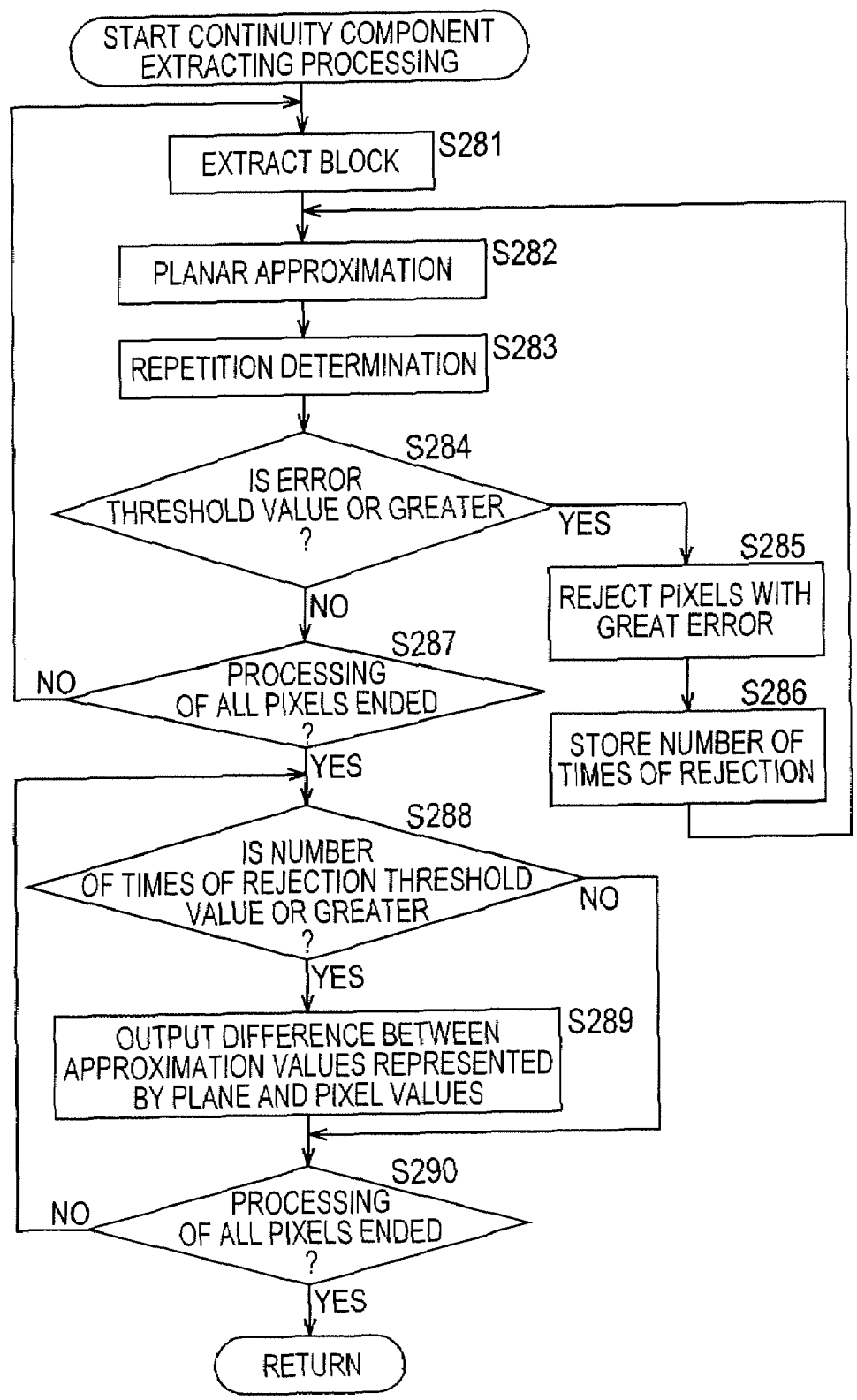
FIG. 48 is a flowchart describing still other processing for extracting the continuity component.

FIG. 48 is a flowchart for describing yet other processing for extracting the continuity component with the non-continuity component extracting unit 201 of which the configuration is shown in FIG. 43, instead of the processing for extracting the non-continuity component corresponding to step S201. The processing of step S281 through step S288 is the same as the processing of step S261 through step S268, so description thereof will be omitted.

In step S289, the repetition determining unit 223 outputs the difference between the approximation value represented by the plane, and the pixel value of a selected pixel, as the continuity component of the input image. That is to say, the repetition determining unit 223 outputs an image wherein the non-continuity component has been removed from the input image, as the continuity information.

The processing of step S290 is the same as the processing of step S270, and accordingly description thereof will be omitted.

Thus, the non-continuity component extracting unit 201 can output an image wherein the non-continuity component has been removed from the input image as the continuity information.

As described above, in a case wherein real world light signals are projected, a non-continuous portion of pixel values of multiple pixels of first image data wherein a part of the continuity of the real world light signals has been lost is detected, data continuity is detected from the detected non-continuous portions, a model (function) is generated for approximating the light signals by estimating the continuity of the real world light signals based on the detected data continuity, and second image data is generated based on the generated function, processing results which are more accurate and have higher precision as to the event in the real world can be obtained.

Figure 49:
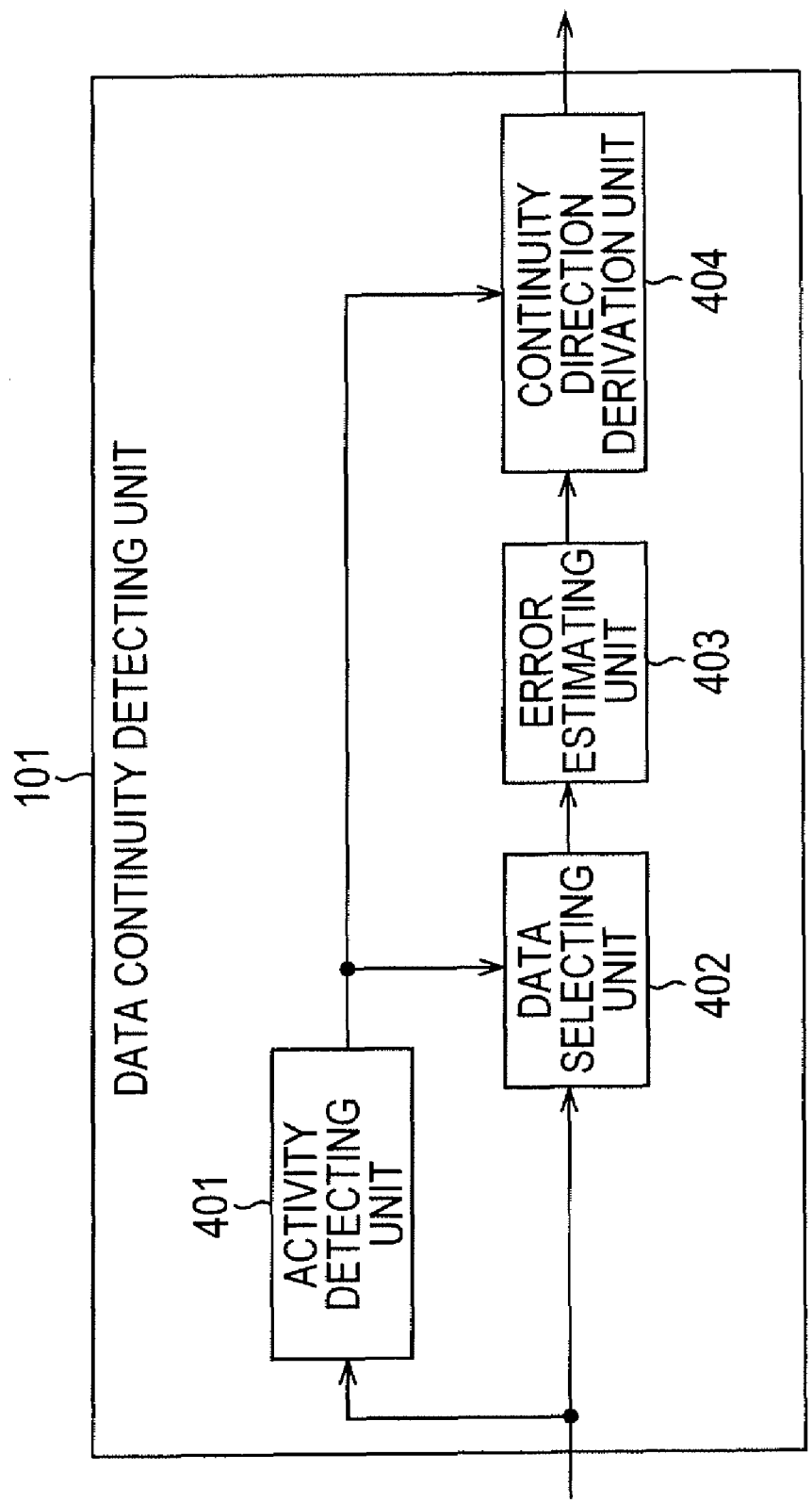
FIG. 49 is a block diagram illustrating another configuration of a continuity component extracting unit 101.

FIG. 49 is a block diagram illustrating another configuration of the data continuity detecting unit 101.

With the data continuity detecting unit 101 of which the configuration is shown in FIG. 49, change in the pixel value of the pixel of interest which is a pixel of interest in the spatial direction of the input image, i.e. activity in the spatial direction of the input image, is detected, multiple sets of pixels made up of a predetermined number of pixels in one row in the vertical direction or one row in the horizontal direction are extracted for each angle based on the pixel of interest and a reference axis according to the detected activity, the correlation of the extracted pixel sets is detected, and the angle of data continuity based on the reference axis in the input image is detected based on the correlation.

The angle of data continuity means an angle assumed by the reference axis, and the direction of a predetermined dimension where continuity repeatedly appear in the data 3. Continuity repeatedly appearing means a case wherein, for example, the change in value as to the change in position in the data 3, i.e., the cross-sectional shape, is the same, and so forth.

The reference axis may be, for example, an axis indicating the spatial direction X (the horizontal direction of the screen), an axis indicating the spatial direction Y (the vertical direction of the screen), and so forth.

The input image is supplied to an activity detecting unit 401 and data selecting unit 402.

The activity detecting unit 401 detects change in the pixel values as to the spatial direction of the input image, i.e., activity in the spatial direction, and supplies the activity information which indicates the detected results to the data selecting unit 402 and a continuity direction derivation unit 404.

For example, the activity detecting unit 401 detects the change of a pixel value as to the horizontal direction of the screen, and the change of a pixel value as to the vertical direction of the screen, and compares the detected change of the pixel value in the horizontal direction and the change of the pixel value in the vertical direction, thereby detecting whether the change of the pixel value in the horizontal direction is greater as compared with the change of the pixel value in the vertical direction, or whether the change of the pixel value in the vertical direction is greater as compared with the change of the pixel value in the horizontal direction.

The activity detecting unit 401 supplies to the data selecting unit 402 and the continuity direction derivation unit 404 activity information, which is the detection results, indicating that the change of the pixel value in the horizontal direction is greater as compared with the change of the pixel value in the vertical direction, or indicating that the change of the pixel value in the vertical direction is greater as compared with the change of the pixel value in the horizontal direction.

Figure 50:
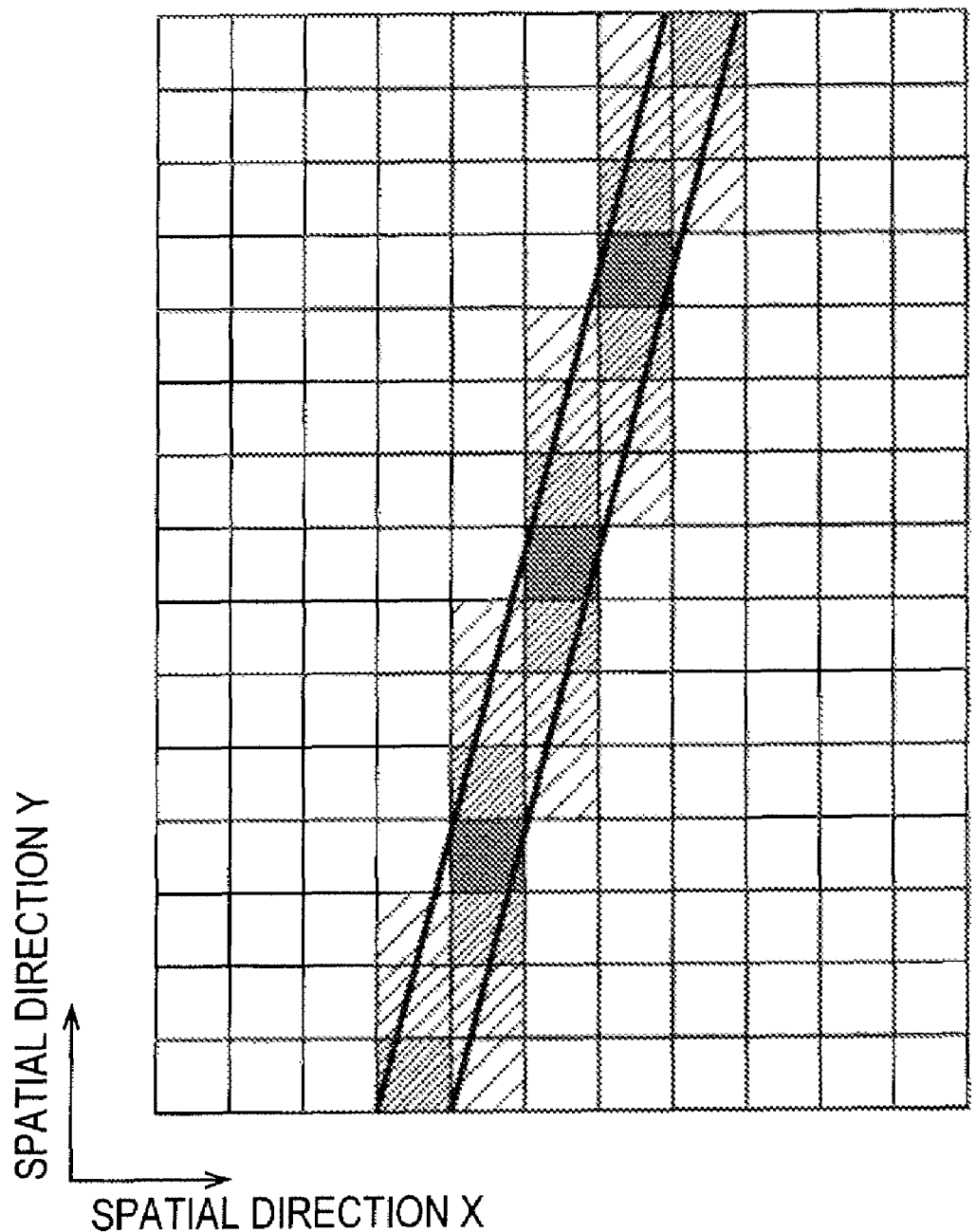
FIG. 50 is a diagram for describing the activity in an input image having data continuity.

In the event that the change of the pixel value in the horizontal direction is greater as compared with the change of the pixel value in the vertical direction, arc shapes (half-disc shapes) or pawl shapes are formed on one row of pixels in the vertical direction, as indicated by FIG. 50 for example, and the arc shapes or pawl shapes are formed repetitively more in the vertical direction. That is to say, in the event that the change of the pixel value in the horizontal direction is greater as compared with the change of the pixel value in the vertical direction, with the reference axis as the axis representing the spatial direction X, the angle of the data continuity based on the reference axis in the input image is a value of any from 45 degrees to 90 degrees.

In the event that the change of the pixel value in the vertical direction is greater as compared with the change of the pixel value in the horizontal direction, arc shapes or pawl shapes are formed on one row of pixels in the vertical direction, for example, and the arc shapes or pawl shapes are formed repetitively more in the horizontal direction. That is to say, in the event that the change of the pixel value in the vertical direction is greater as compared with the change of the pixel value in the horizontal direction, with the reference axis as the axis representing the spatial direction X, the angle of the data continuity based on the reference axis in the input image is a value of any from 0 degrees to 45 degrees.

Figure 51:
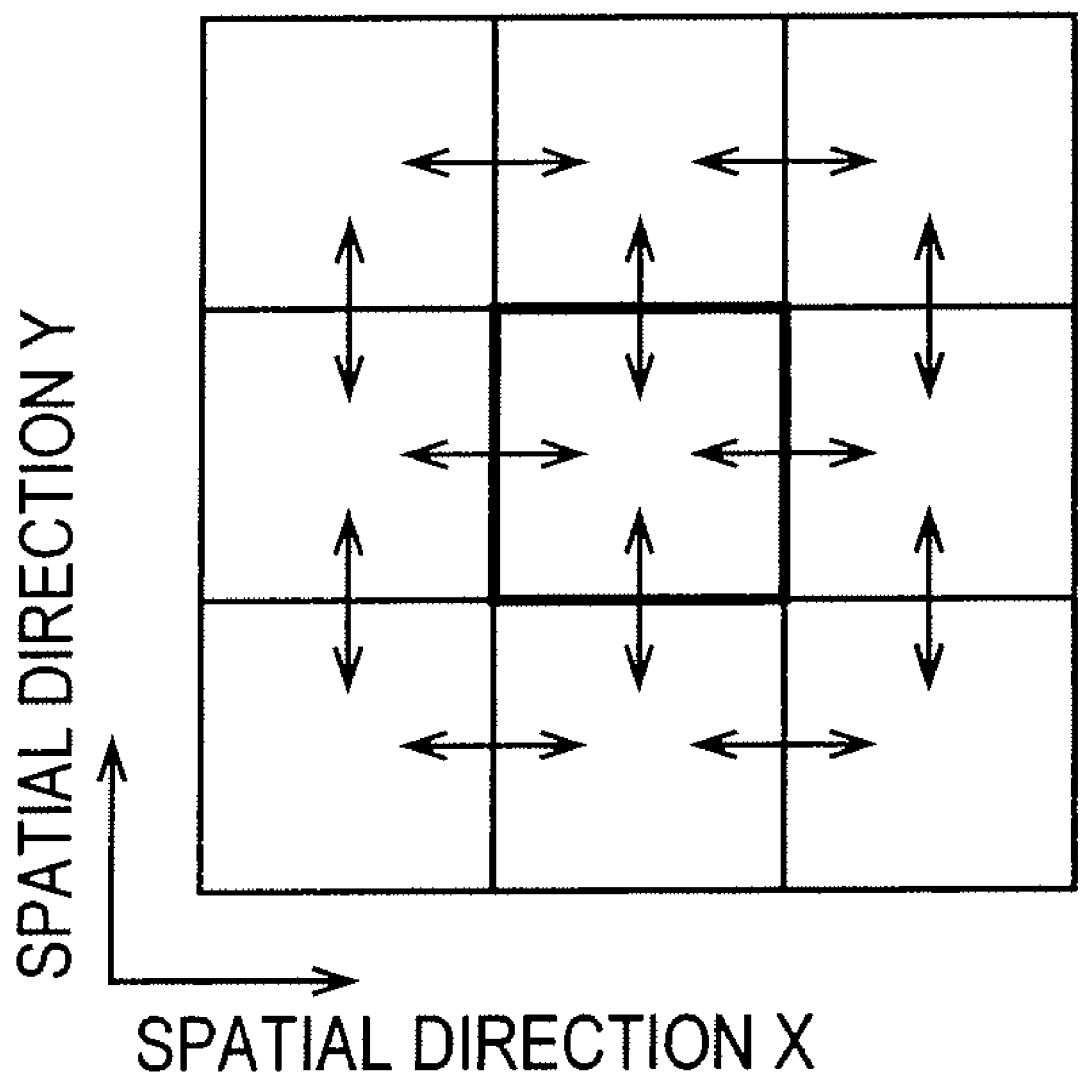
FIG. 51 is a diagram for describing a block for detecting activity.

For example, the activity detecting unit 401 extracts from the input image a block made up of the 9 pixels, 3×3 centered on the pixel of interest, as shown in FIG. 51. The activity detecting unit 401 calculates the sum of differences of the pixels values regarding the pixels vertically adjacent, and the sum of differences of the pixels values regarding the pixels horizontally adjacent. The sum of differences $h_{diff}$ of the pixels values regarding the pixels horizontally adjacent can be obtained with Expression (35).

$$h_{diff} = \Sigma(P_{i+1,j} - P_{i,j}) \quad (35)$$

In the same way, the sum of differences $v_{diff}$ of the pixels values regarding the pixels vertically adjacent can be obtained with Expression (36).

$$v_{diff} = \Sigma(P_{i,j+1} - P_{i,j}) \qquad (36)$$

In Expression (35) and Expression (36), P represents the pixel value, i represents the position of the pixel in the horizontal direction, and j represents the position of the pixel in the vertical direction.

An arrangement may be made wherein the activity detecting unit 401 compares the calculated sum of differences $h_{diff}$ of the pixels values regarding the pixels horizontally adjacent with the sum of differences $v_{diff}$ of the pixels values regarding the pixels vertically adjacent, so as to determine the range of the angle of the data continuity based on the reference axis in the input image. That is to say, in this case, the activity detecting unit 401 determines whether a shape indicated by change in the pixel value as to the position in the spatial direction is formed repeatedly in the horizontal direction, or formed repeatedly in the vertical direction.

For example, change in pixel values in the horizontal direction with regard to an arc formed on pixels in one horizontal row is greater than the change of pixel values in the vertical direction, change in pixel values in the vertical direction with regard to an arc formed on pixels in one horizontal row is greater than the change of pixel values in the horizontal direction, and it can be said that the direction of data continuity, i.e., the change in the direction of the predetermined dimension of a constant feature which the input image that is the data 3 has is smaller in comparison with the change in the orthogonal direction too the data continuity. In other words, the difference of the direction orthogonal to the direction of data continuity (hereafter also referred to as non-continuity direction) is greater as compared to the difference in the direction of data continuity.

Figure 52:
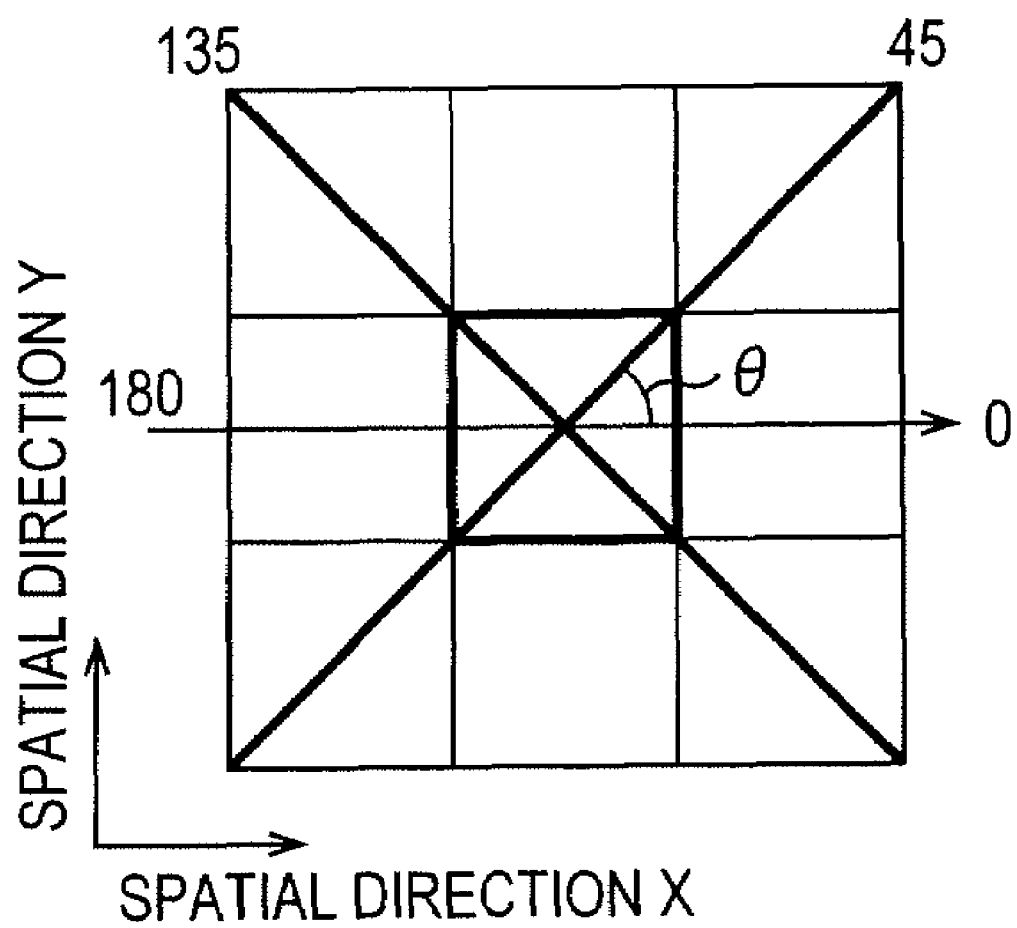
FIG. 52 is a diagram for describing the angle of data continuity as to activity.

For example, as shown in FIG. 52, the activity detecting unit 401 compares the calculated sum of differences $h_{diff}$ of the pixels values regarding the pixels horizontally adjacent with the sum of differences $v_{diff}$ of the pixels values regarding the pixels vertically adjacent, and in the event that the sum of differences $h_{diff}$ of the pixels values regarding the pixels horizontally adjacent is greater, determines that the angle of the data continuity based on the reference axis is a value of any from 45 degrees to 135 degrees, and in the event that the sum of differences $v_{diff}$ of the pixels values regarding the pixels vertically adjacent is greater, determines that the angle of the data continuity based on the reference axis is a value of any from 0 degrees to 45 degrees, or a value of any from 135 degrees to 180 degrees.

For example, the activity detecting unit 401 supplies activity information indicating the determination results to the data selecting unit 402 and the continuity direction derivation unit 404.

Note that the activity detecting unit 401 can detect activity by extracting blocks of arbitrary sizes, such as a block made up of 25 pixels of 5×5, a block made up of 49 pixels of 7×7, and so forth.

The data selecting unit 402 sequentially selects pixels of interest from the pixels of the input image, and extracts multiple sets of pixels made up of a predetermined number of pixels in one row in the vertical direction or one row in the horizontal direction for each angle based on the pixel of interest and the reference axis, based on the activity information supplied from the activity detecting unit 401.

For example, in the event that the activity information indicates that the change in pixel values in the horizontal direction is greater in comparison with the change in pixel values in the vertical direction, this means that the data continuity angle is a value of any from 45 degrees to 135 degrees, so the data selecting unit 402 extracts multiple sets of pixels made up of a predetermined number of pixels in one row in the vertical direction, for each predetermined angle in the range of 45 degrees to 135 degrees, based on the pixel of interest and the reference axis.

In the event that the activity information indicates that the change in pixel values in the vertical direction is greater in comparison with the change in pixel values in the horizontal direction, this means that the data continuity angle is a value of any from 0 degrees to 45 degrees or from 135 degrees to 180 degrees, so the data selecting unit 402 extracts multiple sets of pixels made up of a predetermined number of pixels in one row in the horizontal direction, for each predetermined angle in the range of 0 degrees to 45 degrees or 135 degrees to 180 degrees, based on the pixel of interest and the reference axis.

Also, for example, in the event that the activity information indicates that the angle of data continuity is a value of any from 45 degrees to 135 degrees, the data selecting unit 402 extracts multiple sets of pixels made up of a predetermined number of pixels in one row in the vertical direction, for each predetermined angle in the range of 45 degrees to 135 degrees, based on the pixel of interest and the reference axis.

In the event that the activity information indicates that the angle of data continuity is a value of any from 0 degrees to 45 degrees or from 135 degrees to 180 degrees, the data selecting unit 402 extracts multiple sets of pixels made up of a predetermined number of pixels in one row in the horizontal direction, for each predetermined angle in the range of 0 degrees to 45 degrees or 135 degrees to 180 degrees, based on the pixel of interest and the reference axis.

The data selecting unit 402 supplies the multiple sets made up of the extracted pixels to an error estimating unit 403.

The error estimating unit 403 detects correlation of pixel sets for each angle with regard to the multiple sets of extracted pixels.

For example, with regard to the multiple sets of pixels made up of a predetermined number of pixels in one row in the vertical direction corresponding to one angle, the error estimating unit 403 detects the correlation of the pixels values of the pixels at corresponding positions of the pixel sets. With regard to the multiple sets of pixels made up of a predetermined number of pixels in one row in the horizontal direction corresponding to one angle, the error estimating unit 403 detects the correlation of the pixels values of the pixels at corresponding positions of the sets.

The error estimating unit 403 supplies correlation information indicating the detected correlation to the continuity direction derivation unit 404. The error estimating unit 403 calculates the sum of the pixel values of pixels of a set including the pixel of interest supplied from the data selecting unit 402 as values indicating correlation, and the absolute value of difference of the pixel values of the pixels at corresponding positions in other sets, and supplies the sum of absolute value of difference to the continuity direction derivation unit 404 as correlation information.

Based on the correlation information supplied from the error estimating unit 403, the continuity direction derivation unit 404 detects the data continuity angle based on the reference axis in the input image, corresponding to the lost continuity of the light signals of the actual world 1, and outputs data continuity information indicating an angle. For example, based on the correlation information supplied from the error estimating unit 403, the continuity direction derivation unit 404 detects an angle corresponding to the pixel set with the greatest correlation as the data continuity angle, and outputs data continuity information indicating the angle corresponding to the pixel set with the greatest correlation that has been detected.

The following description will be made regarding detection of data continuity angle in the range of 0 degrees through 90 degrees (the so-called first quadrant).

Figure 53:
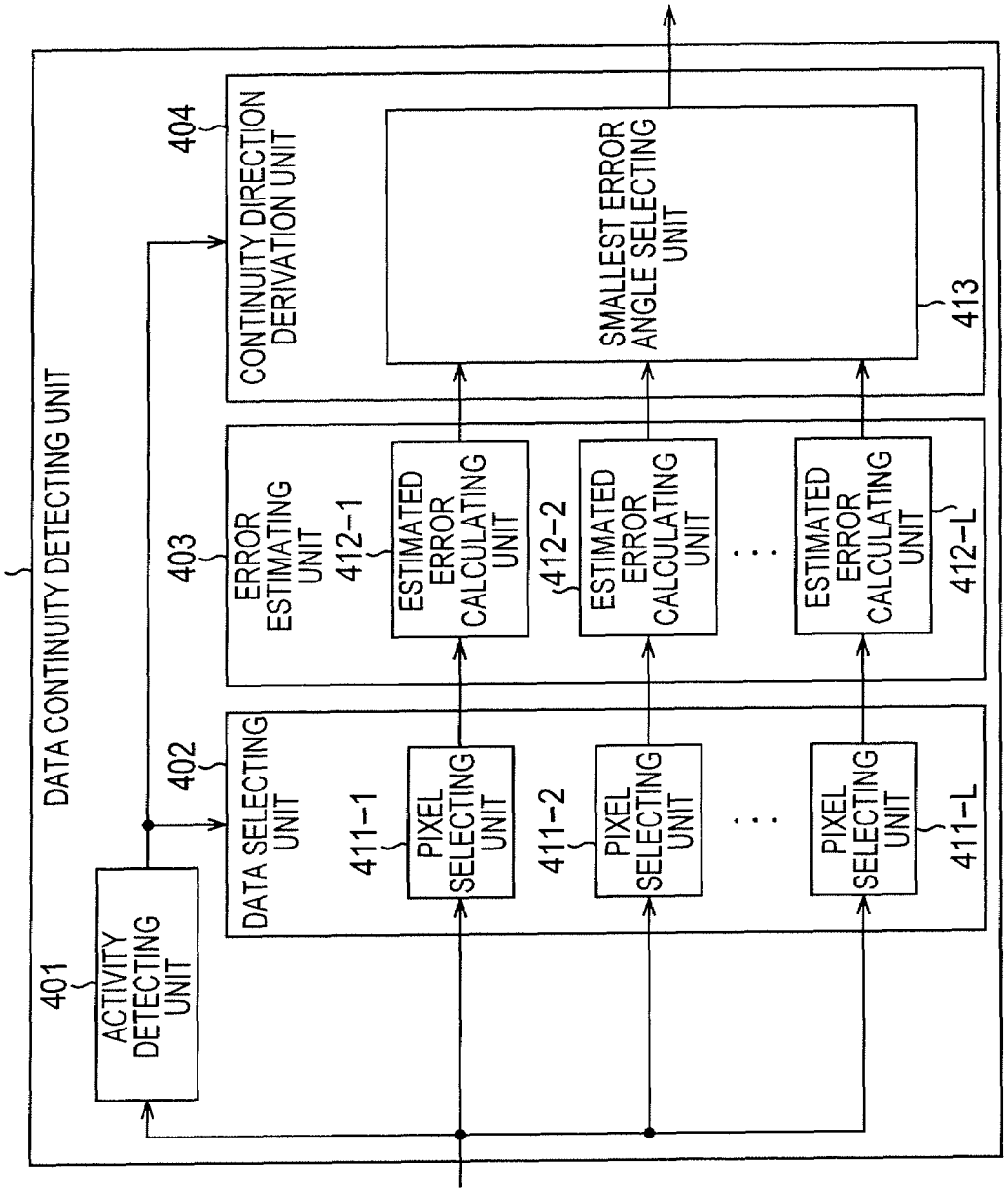
FIG. 53 is a block diagram illustrating a detailed configuration of the data continuity detecting unit 101.

FIG. 53 is a block diagram illustrating a more detailed configuration of the data continuity detecting unit 101 shown in FIG. 49.

The data selecting unit 402 includes pixel selecting unit 411-1 through pixel selecting unit 411-L. The error estimating unit 403 includes estimated error calculating unit 412-1 through estimated error calculating unit 412-L. The continuity direction derivation unit 404 includes a smallest error angle selecting unit 413.

First, description will be made regarding the processing of the pixel selecting unit 411-1 through pixel selecting unit 411-L in the event that the data continuity angle indicated by the activity information is a value of any from 45 degrees to 135 degrees.

The pixel selecting unit 411-1 through pixel selecting unit 411-L set straight lines of mutually differing predetermined angles which pass through the pixel of interest, with the axis indicating the spatial direction X as the reference axis. The pixel selecting unit 411-1 through pixel selecting unit 411-L select, of the pixels belonging to a vertical row of pixels to which the pixel of interest belongs, a predetermined number of pixels above the pixel of interest, and predetermined number of pixels below the pixel of interest, and the pixel of interest, as a set.

Figure 54:
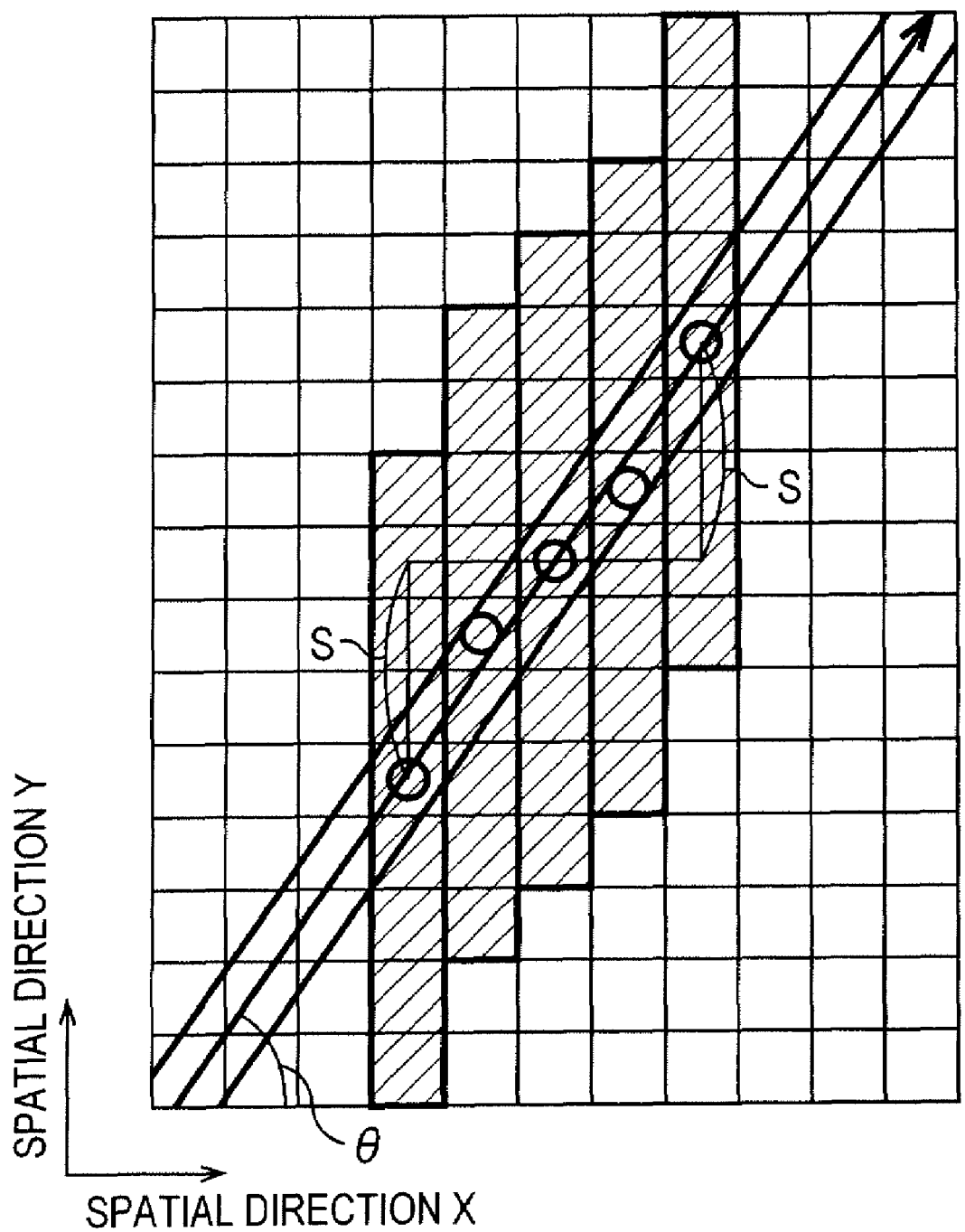
FIG. 54 is a diagram describing a set of pixels.

For example, as shown in FIG. 54, the pixel selecting unit 411-1 through pixel selecting unit 411-L select 9 pixels centered on the pixel of interest, as a set of pixels, from the pixels belonging to a vertical row of pixels to which the pixel of interest belongs.

In FIG. 54, one grid-shaped square (one grid) represents one pixel. In FIG. 54, the circle shown at the center represents the pixel of interest.

The pixel selecting unit 411-1 through pixel selecting unit 411-L select, from pixels belonging to a vertical row of pixels to the left of the vertical row of pixels to which the pixel of interest belongs, a pixel at the position closest to the straight line set for each. In FIG. 54, the circle to the lower left of the pixel of interest represents an example of a selected pixel. The pixel selecting unit 411-1 through pixel selecting unit 411-L then select, from the pixels belonging to the vertical row of pixels to the left of the vertical row of pixels to which the pixel of interest belongs, a predetermined number of pixels above the selected pixel, a predetermined number of pixels below the selected pixel, and the selected pixel, as a set of pixels.

For example, as shown in FIG. 54, the pixel selecting unit 411-1 through pixel selecting unit 411-L select 9 pixels centered on the pixel at the position closest to the straight line, from the pixels belonging to the vertical row of pixels to the left of the vertical row of pixels to which the pixel of interest belongs, as a set of pixels.

The pixel selecting unit 411-1 through pixel selecting unit 411-L select, from pixels belonging to a vertical row of pixels second left from the vertical row of pixels to which the pixel of interest belongs, a pixel at the position closest to the straight line set for each. In FIG. 54, the circle to the far left represents an example of the selected pixel. The pixel selecting unit 411-1 through pixel selecting unit 411-L then select, as a set of pixels, from the pixels belonging to the vertical row of pixels second left from the vertical row of pixels to which the pixel of interest belongs, a predetermined number of pixels above the selected pixel, a predetermined number of pixels below the selected pixel, and the selected pixel.

For example, as shown in FIG. 54, the pixel selecting unit 411-1 through pixel selecting unit 411-L select 9 pixels centered on the pixel at the position closest to the straight line, from the pixels belonging to the vertical row of pixels second left from the vertical row of pixels to which the pixel of interest belongs, as a set of pixels.

The pixel selecting unit 411-1 through pixel selecting unit 411-L select, from pixels belonging to a vertical row of pixels to the right of the vertical row of pixels to which the pixel of interest belongs, a pixel at the position closest to the straight line set for each. In FIG. 54, the circle to the upper right of the pixel of interest represents an example of a selected pixel. The pixel selecting unit 411-1 through pixel selecting unit 411-L then select, from the pixels belonging to the vertical row of pixels to the right of the vertical row of pixels to which the pixel of interest belongs, a predetermined number of pixels above the selected pixel, a predetermined number of pixels below the selected pixel, and the selected pixel, as a set of pixels.

For example, as shown in FIG. 54, the pixel selecting unit 411-1 through pixel selecting unit 411-L select 9 pixels centered on the pixel at the position closest to the straight line, from the pixels belonging to the vertical row of pixels to the right of the vertical row of pixels to which the pixel of interest belongs, as a set of pixels.

The pixel selecting unit 411-1 through pixel selecting unit 411-L select, from pixels belonging to a vertical row of pixels second right from the vertical row of pixels to which the pixel of interest belongs, a pixel at the position closest to the straight line set for each. In FIG. 54, the circle to the far right represents an example of the selected pixel. The pixel selecting unit 411-1 through pixel selecting unit 411-L then select, from the pixels belonging to the vertical row of pixels second right from the vertical row of pixels to which the pixel of interest belongs, a predetermined number of pixels above the selected pixel, a predetermined number of pixels below the selected pixel, and the selected pixel, as a set of pixels.

For example, as shown in FIG. 54, the pixel selecting unit 411-1 through pixel selecting unit 411-L select 9 pixels centered on the pixel at the position closest to the straight line, from the pixels belonging to the vertical row of pixels second right from the vertical row of pixels to which the pixel of interest belongs, as a set of pixels.

Thus, the pixel selecting unit 411-1 through pixel selecting unit 411-L each select five sets of pixels.

The pixel selecting unit 411-1 through pixel selecting unit 411-L select pixel sets for (lines set to) mutually different angles. For example, the pixel selecting unit 411-1 selects sets of pixels regarding 45 degrees, the pixel selecting unit 411-2 selects sets of pixels regarding 47.5 degrees, and the pixel selecting unit 411-3 selects sets of pixels regarding 50 degrees. The pixel selecting unit 411-1 through pixel selecting unit 411-L select sets of pixels regarding angles every 2.5 degrees, from 52.5 degrees through 135 degrees.

Note that the number of pixel sets may be an optional number, such as 3 or 7, for example, and does not restrict the present invention. Also, the number of pixels selected as one set may be an optional number, such as 5 or 13, for example, and does not restrict the present invention.

Note that the pixel selecting unit 411-1 through pixel selecting unit 411-L may be arranged to select pixel sets from pixels within a predetermined range in the vertical direction. For example, the pixel selecting unit 411-1 through pixel selecting unit 411-L can select pixel sets from 121 pixels in the vertical direction (60 pixels upward from the pixel of interest, and 60 pixels downward). In this case, the data continuity detecting unit 101 can detect the angle of data continuity up to 88.09 degrees as to the axis representing the spatial direction X.

The pixel selecting unit 411-1 supplies the selected set of pixels to the estimated error calculating unit 412-1, and the pixel selecting unit 411-2 supplies the selected set of pixels to the estimated error calculating unit 412-2. In the same way, each pixel selecting unit 411-3 through pixel selecting unit 411-L supplies the selected set of pixels to each estimated error calculating unit 412-3 through estimated error calculating unit 412-L.

The estimated error calculating unit 412-1 through estimated error calculating unit 412-L detect the correlation of the pixels values of the pixels at positions in the multiple sets, supplied from each of the pixel selecting unit 411-1 through pixel selecting unit 411-L. For example, the estimated error calculating unit 412-1 through estimated error calculating unit 412-L calculates, as a value indicating the correlation, the sum of absolute values of difference between the pixel values of the pixels of the set containing the pixel of interest, and the pixel values of the pixels at corresponding positions in other sets, supplied from one of the pixel selecting unit 411-1 through pixel selecting unit 411-L.

More specifically, based on the pixel values of the pixels of the set containing the pixel of interest and the pixel values of the pixels of the set made up of pixels belonging to one vertical row of pixels to the left side of the pixel of interest supplied from one of the pixel selecting unit 411-1 through pixel selecting unit 411-L, the estimated error calculating unit 412-1 through estimated error calculating unit 412-L calculates the difference of the pixel values of the topmost pixel, then calculates the difference of the pixel values of the second pixel from the top, and so on to calculate the absolute values of difference of the pixel values in order from the top pixel, and further calculates the sum of absolute values of the calculated differences. Based on the pixel values of the pixels of the set containing the pixel of interest and the pixel values of the pixels of the set made up of pixels belonging to one vertical row of pixels two to the left from the pixel of interest supplied from one of the pixel selecting unit 411-1 through pixel selecting unit 411-L, the estimated error calculating unit 412-1 through estimated error calculating unit 412-L calculates the absolute values of difference of the pixel values in order from the top pixel, and calculates the sum of absolute values of the calculated differences.

Then, based on the pixel values of the pixels of the set containing the pixel of interest and the pixel values of the pixels of the set made up of pixels belonging to one vertical row of pixels to the right side of the pixel of interest supplied from one of the pixel selecting unit 411-1 through pixel selecting unit 411-L, the estimated error calculating unit 412-1 through estimated error calculating unit 412-L calculates the difference of the pixel values of the topmost pixel, then calculates the difference of the pixel values of the second pixel from the top, and so on to calculate the absolute values of difference of the pixel values in order from the top pixel, and further calculates the sum of absolute values of the calculated differences. Based on the pixel values of the pixels of the set containing the pixel of interest and the pixel values of the pixels of the set made up of pixels belonging to one vertical row of pixels two to the right from the pixel of interest supplied from one of the pixel selecting unit 411-1 through pixel selecting unit 411-L, the estimated error calculating unit 412-1 through estimated error calculating unit 412-L calculates the absolute values of difference of the pixel values in order from the top pixel, and calculates the sum of absolute values of the calculated differences.

The estimated error calculating unit 412-1 through estimated error calculating unit 412-L add all of the sums of absolute values of difference of the pixel values thus calculated, thereby calculating the aggregate of absolute values of difference of the pixel values.

The estimated error calculating unit 412-1 through estimated error calculating unit 412-L supply information indicating the detected correlation to the smallest error angle selecting unit 413. For example, the estimated error calculating unit 412-1 through estimated error calculating unit 412-L supply the aggregate of absolute values of difference of the pixel values calculated, to the smallest error angle selecting unit 413.

Note that the estimated error calculating unit 412-1 through estimated error calculating unit 412-L are not restricted to the sum of absolute values of difference of pixel values, and can also calculate other values as correlation values as well, such as the sum of squared differences of pixel values, or correlation coefficients based on pixel values, and so forth.

The smallest error angle selecting unit 413 detects the data continuity angle based on the reference axis in the input image which corresponds to the continuity of the image which is the lost actual world 1 light signals, based on the correlation detected by the estimated error calculating unit 412-1 through estimated error calculating unit 412-L with regard to mutually different angles. That is to say, based on the correlation detected by the estimated error calculating unit 412-1 through estimated error calculating unit 412-L with regard to mutually different angles, the smallest error angle selecting unit 413 selects the greatest correlation, and takes the angle regarding which the selected correlation was detected as the data continuity angle based on the reference axis, thereby detecting the data continuity angle based on the reference axis in the input image.

For example, of the aggregates of absolute values of difference of the pixel values supplied from the estimated error calculating unit 412-1 through estimated error calculating unit 412-L, the smallest error angle selecting unit 413 selects the smallest aggregate. With regard to the pixel set of which the selected aggregate was calculated, the smallest error angle selecting unit 413 makes reference to a pixel belonging to the one vertical row of pixels two to the left from the pixel of interest and at the closest pixel position to the straight line, and to a pixel belonging to the one vertical row of pixels two to the right from the pixel of interest and at the closest pixel position to the straight line.

Figure 55:
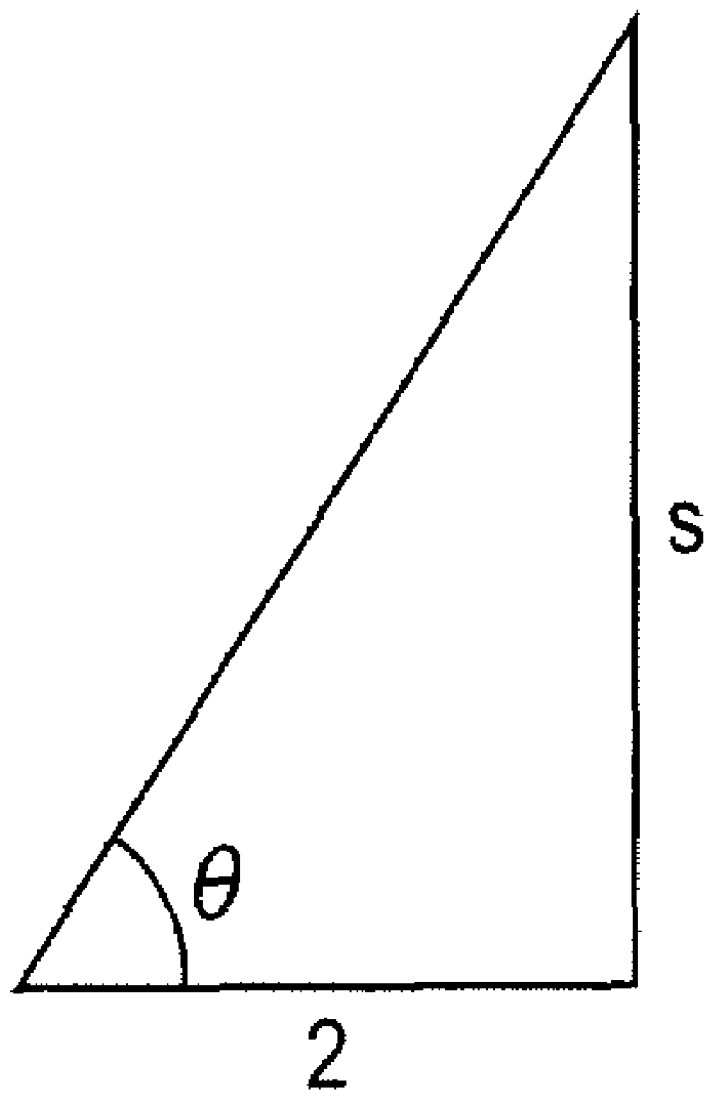
FIG. 55 is a diagram describing the relation between the position of a pixel set and the angle of data continuity.

As shown in FIG. 54, the smallest error angle selecting unit 413 obtains the distance S in the vertical direction of the position of the pixels to reference from the position of the pixel of interest. As shown in FIG. 55, the smallest error angle selecting unit 413 detects the angle θ of data continuity based on the axis indicating the spatial direction X which is the reference axis in the input image which is image data, that corresponds to the lost actual world 1 light signals continuity, from Expression (37).

$$\theta = \tan^{-1}\frac{S}{2} \tag{37}$$

Next, description will be made regarding the processing of the pixel selecting unit 411-1 through pixel selecting unit 411-L in the event that the data continuity angle indicated by the activity information is a value of any from 0 degrees to 45 degrees and 135 degrees to 180 degrees.

The pixel selecting unit 411-1 through pixel selecting unit 411-L set straight lines of predetermined angles which pass through the pixel of interest, with the axis indicating the spatial direction X as the reference axis, and select, of the pixels belonging to a horizontal row of pixels to which the pixel of interest belongs, a predetermined number of pixels to the left of the pixel of interest, and predetermined number of pixels to the right of the pixel of interest, and the pixel of interest, as a pixel set.

The pixel selecting unit 411-1 through pixel selecting unit 411-L select, from pixels belonging to a horizontal row of pixels above the horizontal row of pixels to which the pixel of interest belongs, a pixel at the position closest to the straight line set for each. The pixel selecting unit 411-1 through pixel selecting unit 411-L then select, from the pixels belonging to the horizontal row of pixels above the horizontal row of pixels to which the pixel of interest belongs, a predetermined number of pixels to the left of the selected pixel, a predetermined number of pixels to the right of the selected pixel, and the selected pixel, as a pixel set.

The pixel selecting unit 411-1 through pixel selecting unit 411-L select, from pixels belonging to a horizontal row of pixels two above the horizontal row of pixels to which the pixel of interest belongs, a pixel at the position closest to the straight line set for each. The pixel selecting unit 411-1 through pixel selecting unit 411-L then select, from the pixels belonging to the horizontal row of pixels two above the horizontal row of pixels to which the pixel of interest belongs, a predetermined number of pixels to the left of the selected pixel, a predetermined number of pixels to the right of the selected pixel, and the selected pixel, as a pixel set.

The pixel selecting unit 411-1 through pixel selecting unit 411-L select, from pixels belonging to a horizontal row of pixels below the horizontal row of pixels to which the pixel of interest belongs, a pixel at the position closest to the straight line set for each. The pixel selecting unit 411-1 through pixel selecting unit 411-L then select, from the pixels belonging to the horizontal row of pixels below the horizontal row of pixels to which the pixel of interest belongs, a predetermined number of pixels to the left of the selected pixel, a predetermined number of pixels to the right of the selected pixel, and the selected pixel, as a pixel set.

The pixel selecting unit 411-1 through pixel selecting unit 411-L select, from pixels belonging to a horizontal row of pixels two below the horizontal row of pixels to which the pixel of interest belongs, a pixel at the position closest to the straight line set for each. The pixel selecting unit 411-1 through pixel selecting unit 411-L then select, from the pixels belonging to the horizontal row of pixels two below the horizontal row of pixels to which the pixel of interest belongs, a predetermined number of pixels to the left of the selected pixel, a predetermined number of pixels to the right of the selected pixel, and the selected pixel, as a pixel set.

Thus, the pixel selecting unit 411-1 through pixel selecting unit 411-L each select five sets of pixels.

The pixel selecting unit 411-1 through pixel selecting unit 411-L select pixel sets for mutually different angles. For example, the pixel selecting unit 411-1 selects sets of pixels regarding 0 degrees, the pixel selecting unit 411-2 selects sets of pixels regarding 2.5 degrees, and the pixel selecting unit 411-3 selects sets of pixels regarding 5 degrees. The pixel selecting unit 411-1 through pixel selecting unit 411-L select sets of pixels regarding angles every 2.5 degrees, from 7.5 degrees through 45 degrees and from 135 degrees through 180 degrees.

The pixel selecting unit 411-1 supplies the selected set of pixels to the estimated error calculating unit 412-1, and the pixel selecting unit 411-2 supplies the selected set of pixels to the estimated error calculating unit 412-2. In the same way, each pixel selecting unit 411-3 through pixel selecting unit 411-L supplies the selected set of pixels to each estimated error calculating unit 412-3 through estimated error calculating unit 412-L.

The estimated error calculating unit 412-1 through estimated error calculating unit 412-L detect the correlation of the pixels values of the pixels at positions in the multiple sets, supplied from each of the pixel selecting unit 411-1 through pixel selecting unit 411-L. The estimated error calculating unit 412-1 through estimated error calculating unit 412-L supply information indicating the detected correlation to the smallest error angle selecting unit 413.

The smallest error angle selecting unit 413 detects the data continuity angle based on the reference axis in the input image which corresponds to the continuity of the image which is the lost actual world 1 light signals, based on the correlation detected by the estimated error calculating unit 412-1 through estimated error calculating unit 412-L.

Figure 56:
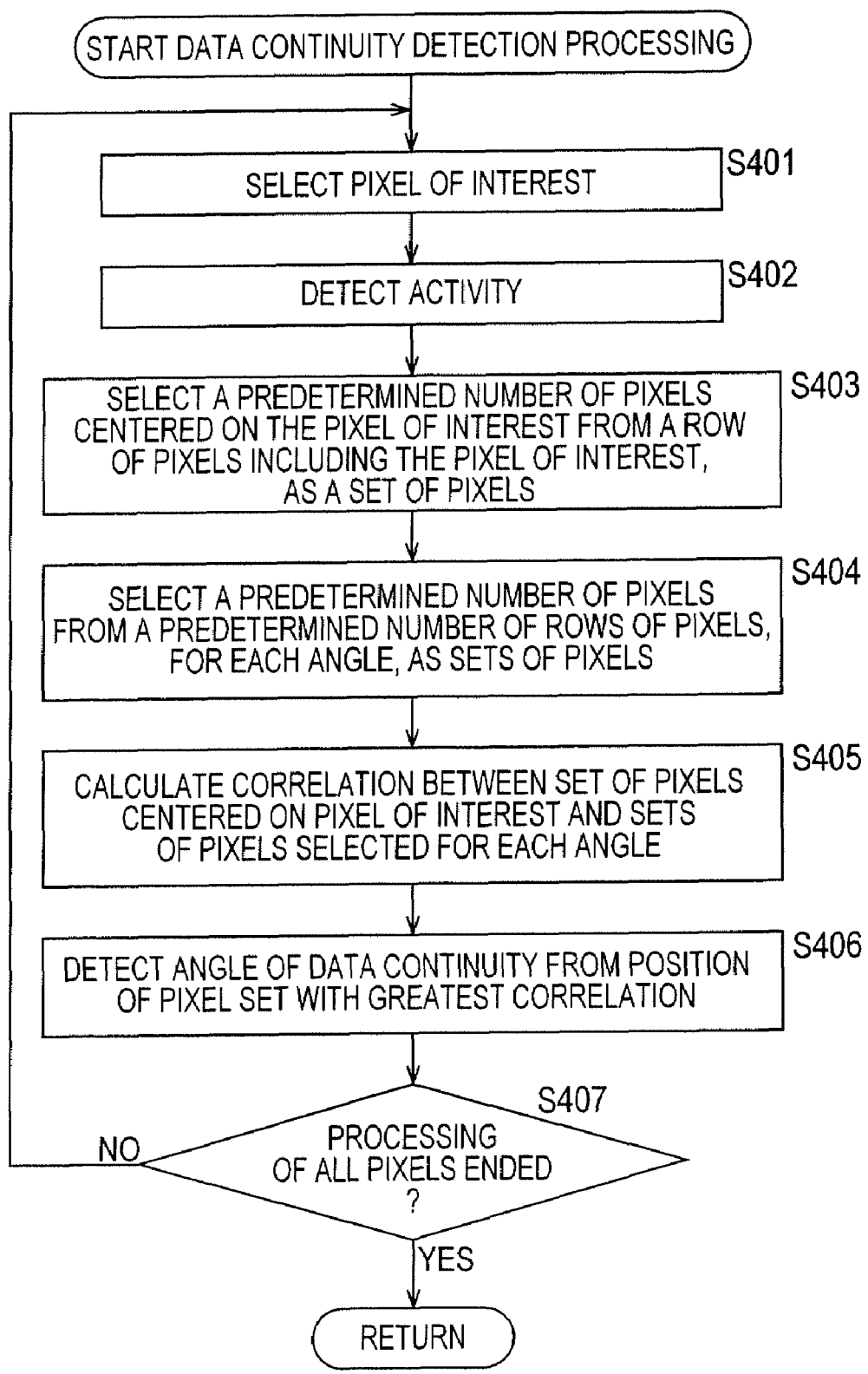
FIG. 56 is a flowchart for describing processing for detecting data continuity.

Next, data continuity detection processing with the data continuity detecting unit 101 of which the configuration is shown in FIG. 49, corresponding to the processing in step S101, will be described with reference to the flowchart in FIG. 56.

In step S401, the activity detecting unit 401 and the data selecting unit 402 select the pixel of interest which is a pixel of interest from the input image. The activity detecting unit 401 and the data selecting unit 402 select the same pixel of interest. For example, the activity detecting unit 401 and the data selecting unit 402 select the pixel of interest from the input image in raster scan order.

In step S402, the activity detecting unit 401 detects activity with regard to the pixel of interest. For example, the activity detecting unit 401 detects activity based on the difference of pixel values of pixels aligned in the vertical direction of a block made up of a predetermined number of pixels centered on the pixel of interest, and the difference of pixel values of pixels aligned in the horizontal direction.

The activity detecting unit 401 detects activity in the spatial direction as to the pixel of interest, and supplies activity information indicating the detected results to the data selecting unit 402 and the continuity direction derivation unit 404.

In step S403, the data selecting unit 402 selects, from a row of pixels including the pixel of interest, a predetermined number of pixels centered on the pixel of interest, as a pixel set. For example, the data selecting unit 402 selects a predetermined number of pixels above or to the left of the pixel of interest, and a predetermined number of pixels below or to the right of the pixel of interest, which are pixels belonging to a vertical or horizontal row of pixels to which the pixel of interest belongs, and also the pixel of interest, as a pixel set.

In step S404, the data selecting unit 402 selects, as a pixel set, a predetermined number of pixels each from a predetermined number of pixel rows for each angle in a predetermined range based on the activity detected by the processing in step S402. For example, the data selecting unit 402 sets straight lines with angles of a predetermined range which pass through the pixel of interest, with the axis indicating the spatial direction X as the reference axis, selects a pixel which is one or two rows away from the pixel of interest in the horizontal direction or vertical direction and which is closest to the straight line, and selects a predetermined number of pixels above or to the left of the selected pixel, and a predetermined number of pixels below or to the right of the selected pixel, and the selected pixel closest to the line, as a pixel set. The data selecting unit 402 selects pixel sets for each angle.

The data selecting unit 402 supplies the selected pixel sets to the error estimating unit 403.

In step S405, the error estimating unit 403 calculates the correlation between the set of pixels centered on the pixel of interest, and the pixel sets selected for each angle. For example, the error estimating unit 403 calculates the sum of absolute values of difference of the pixel values of the pixels of the set including the pixel of interest and the pixel values of the pixels at corresponding positions in other sets, for each angle.

The angle of data continuity may be detected based on the correlation between pixel sets selected for each angle.

The error estimating unit 403 supplies the information indicating the calculated correlation to the continuity direction derivation unit 404.

In step S406, from position of the pixel set having the strongest correlation based on the correlation calculated in the processing in step S405, the continuity direction derivation unit 404 detects the data continuity angle based on the reference axis in the input image which is image data that corresponds to the lost actual world 1 light signal continuity. For example, the continuity direction derivation unit 404 selects the smallest aggregate of the aggregate of absolute values of difference of pixel values, and detects the data continuity angle θ from the position of the pixel set regarding which the selected aggregate has been calculated.

The continuity direction derivation unit 404 outputs data continuity information indicating the angle of the data continuity that has been detected.

In step S407, the data selecting unit 402 determines whether or not processing of all pixels has ended, and in the event that determination is made that processing of all pixels has not ended, the flow returns to step S401, a pixel of interest is selected from pixels not yet taken as the pixel of interest, and the above-described processing is repeated.

In the event that determination is made in step S407 that processing of all pixels has ended, the processing ends.

Thus, the data continuity detecting unit 101 can detect the data continuity angle based on the reference axis in the image data, corresponding to the lost actual world 1 light signal continuity.

Note that an arrangement may be made wherein the data continuity detecting unit 101 of which the configuration is shown in FIG. 49 detects activity in the spatial direction of the input image with regard to the pixel of interest which is a pixel of interest in the frame of interest which is a frame of interest, extracts multiple pixel sets made up of a predetermined number of pixels in one row in the vertical direction or one row in the horizontal direction from the frame of interest and from each of frames before or after time-wise the frame of interest, for each angle and movement vector based on the pixel of interest and the space-directional reference axis, according to the detected activity, detects the correlation of the extracted pixel sets, and detects the data continuity angle in the time direction and spatial direction in the input image, based on this correlation.

Figure 57:
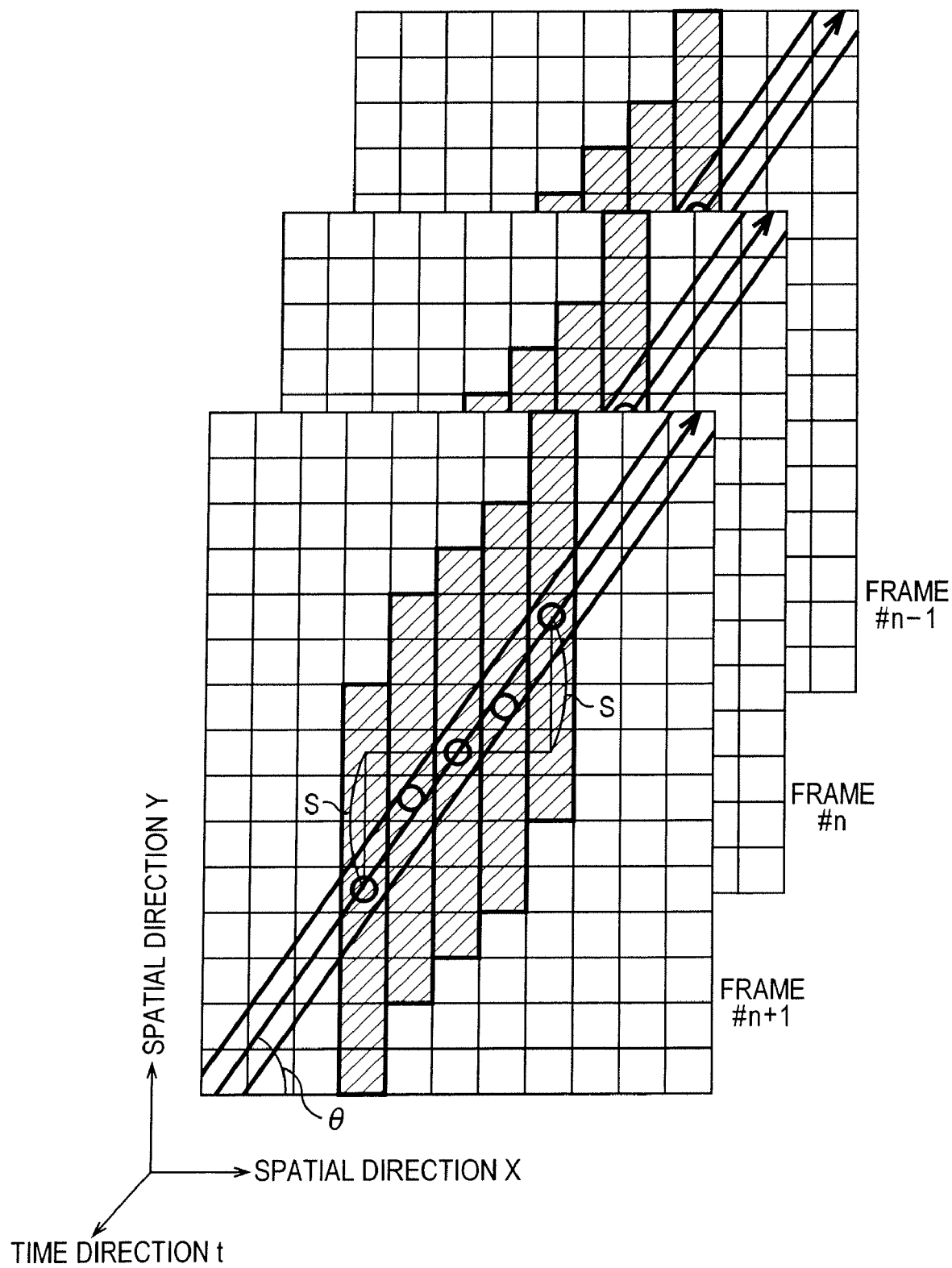
FIG. 57 is a diagram illustrating a set of pixels extracted when detecting the angle of data continuity in the time direction and space direction.

For example, as shown in FIG. 57, the data selecting unit 402 extracts multiple pixel sets made up of a predetermined number of pixels in one row in the vertical direction or one row in the horizontal direction from frame #n which is the frame of interest, frame #n−1, and frame #n+1, for each angle and movement vector based on the pixel of interest and the space-directional reference axis, according to the detected activity.

The frame #n−1 is a frame which is previous to the frame #n time-wise, and the frame #n+1 is a frame following the frame #n time-wise. That is to say, the frame #n−1, frame #n, and frame #n+1, are displayed in the order of frame #n−1, frame #n, and frame #n+1.

The error estimating unit 403 detects the correlation of pixel sets for each single angle and single movement vector, with regard to the multiple sets of the pixels that have been extracted. The continuity direction derivation unit 404 detects the data continuity angle in the temporal direction and spatial direction in the input image which corresponds to the lost actual world 1 light signal continuity, based on the correlation of pixel sets, and outputs the data continuity information indicating the angle.

Next, description will be made regarding another embodiment example of the actual world estimating unit 102 (FIG. 3) with reference to FIG. 58 through FIG. 88.

Figure 58:
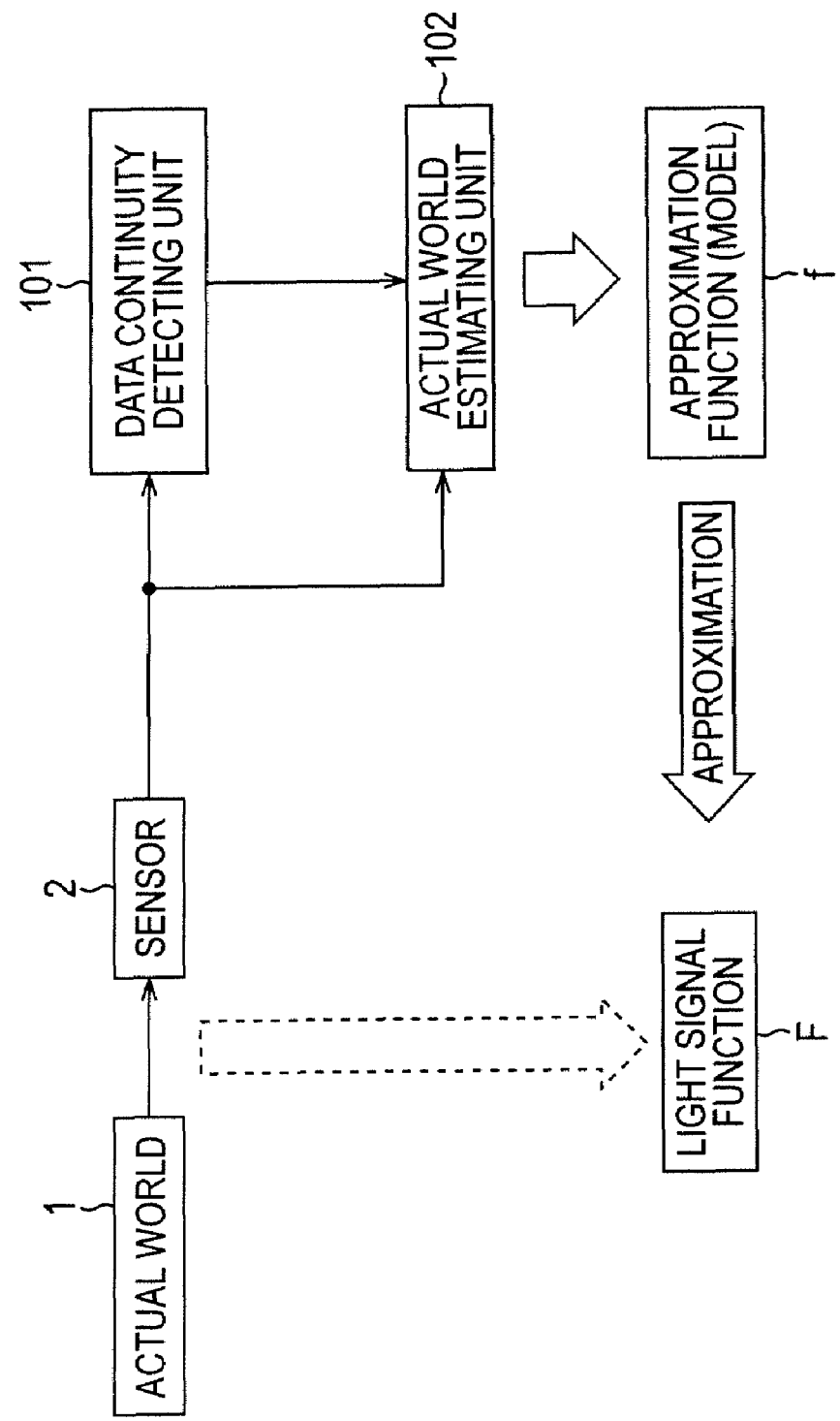
FIG. 58 is a diagram for describing the principle of function approximation, which is an example of an embodiment of the actual world estimating unit shown in FIG. 3.

FIG. 58 is a diagram for describing the principle of this embodiment example.

As shown in FIG. 58, a signal (light intensity allocation) in the actual world 1, which is an image cast on the sensor 2, is represented with a predetermined function F. Note that hereafter, with the description of this embodiment example, the signal serving as an image in the actual world 1 is particularly referred to as a light signal, and the function F is particularly referred to as a light signal function F.

With this embodiment example, in the event that the light signal in the actual world 1 represented with the light signal function F has predetermined continuity, the actual world estimating unit 102 estimates the light signal function F by approximating the light signal function F with a predetermined function f using an input image (image data including continuity of data corresponding to continuity) from the sensor 2, and data continuity information (data continuity information corresponding to continuity of the input image data) from the data continuity detecting unit 101. Note that with the description of this embodiment example, the function f is particularly referred to as an approximation function f, hereafter.

In other words, with this embodiment example, the actual world estimating unit 102 approximates (describes) the image (light signal in the actual world 1) represented with the light signal function F using a model 161 (FIG. 4) represented with the approximation function f. Accordingly, hereafter, this embodiment example is referred to as a function approximating method.

Now, description will be made regarding the background wherein the present applicant has invented the function approximating method, prior to entering the specific description of the function approximating method.

Figure 59:
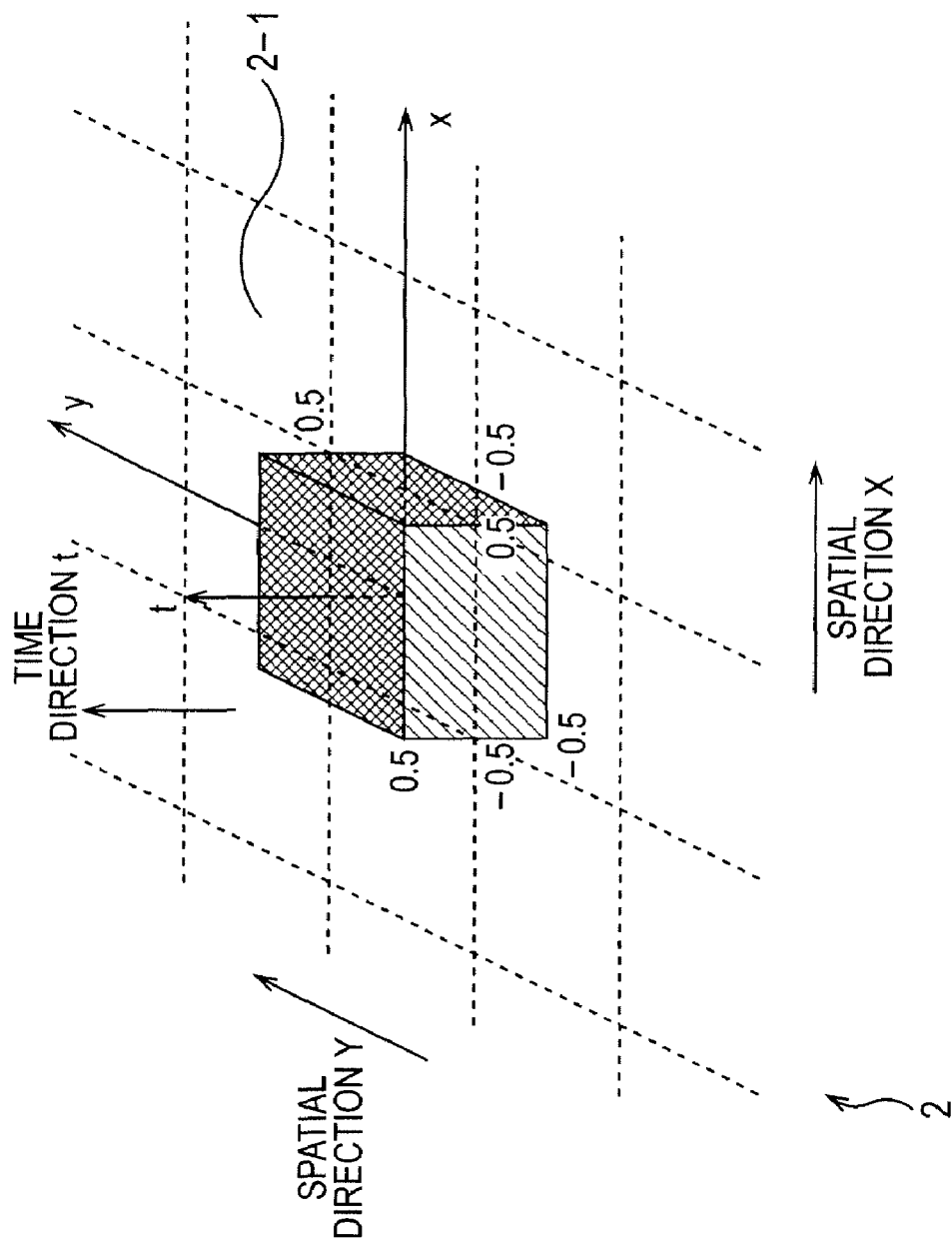
FIG. 59 is a diagram for describing integration effects in the event that the sensor is a CCD.

FIG. 59 is a diagram for describing integration effects in the case in which the sensor 2 is treated as a CCD.

As shown in FIG. 59, multiple detecting elements 2-1 are disposed on the plane of the sensor 2.

With the example in FIG. 59, a direction in parallel with a predetermined side of the detecting elements 2-1 is taken as the X direction, which is one direction in the spatial direction, and the a direction orthogonal to the X direction is taken as the Y direction, which is another direction in the spatial direction. Also, the direction perpendicular to the X-Y plane is taken as the direction t serving as the temporal direction.

Also, with the example in FIG. 59, the spatial shape of each detecting element 2-1 of the sensor 2 is represented with a square of which one side is 1 in length. The shutter time (exposure time) of the sensor 2 is represented with 1.

Further, with the example in FIG. 59, the center of one detecting element 2-1 of the sensor 2 is taken as the origin (position x=0 in the X direction, and position y=0 in the Y direction) in the spatial direction (X direction and Y direction), and the intermediate point-in-time of the exposure time is taken as the origin (position t=0 in the t direction) in the temporal direction (t direction).

In this case, the detecting element 2-1 of which the center is in the origin (x=0, y=0) in the spatial direction subjects the light signal function F(x, y, t) to integration with a range between −0.5 and 0.5 in the X direction, range between −0.5 and 0.5 in the Y direction, and range between −0.5 and 0.5 in the t direction, and outputs the integral value thereof as a pixel value P.

That is to say, the pixel value P output from the detecting element 2-1 of which the center is in the origin in the spatial direction is represented with the following Expression (38).

$$P = \int_{-0.5}^{+0.5} \int_{-0.5}^{+0.5} \int_{-0.5}^{+0.5} F(x, y, t)\,dx\,dy\,dt \quad (38)$$

The other detecting elements 2-1 also output the pixel value P shown in Expression (38) by taking the center of the subject detecting element 2-1 as the origin in the spatial direction in the same way.

Figure 60:
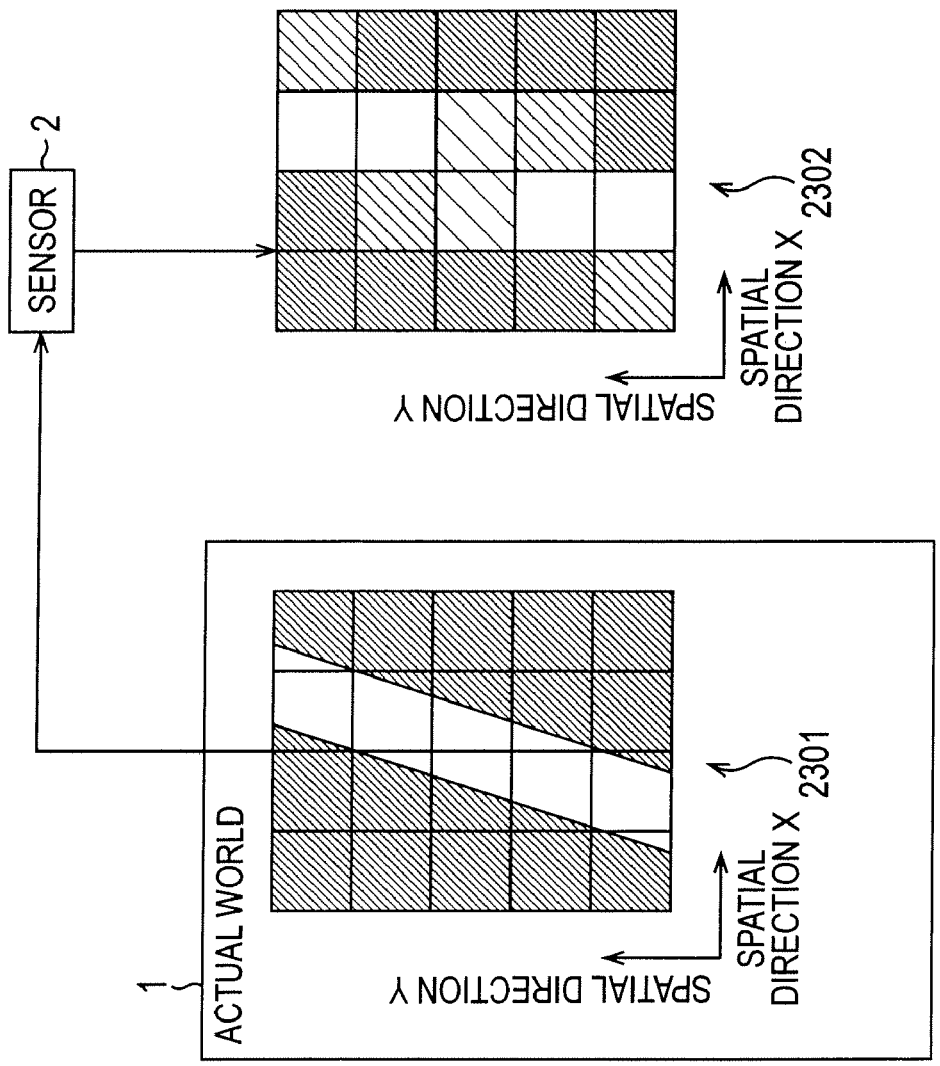
FIG. 60 is a diagram for describing a specific example of the integration effects of the sensor shown in FIG. 59.

FIG. 60 is a diagram for describing a specific example of the integration effects of the sensor 2.

In FIG. 60, the X direction and Y direction represent the X direction and Y direction of the sensor 2 (FIG. 59).

A portion 2301 of the light signal in the actual world 1 (hereafter, such a portion is referred to as a region) represents an example of a region having predetermined continuity.

Note that the region 2301 is a portion of the continuous light signal (continuous region). On the other hand, in FIG. 60, the region 2301 is shown as divided into 20 small regions (square regions) in reality. This is because of representing that the size of the region 2301 is equivalent to the size wherein the four detecting elements (pixels) of the sensor 2 in the X direction, and also the five detecting elements (pixels) of the sensor 2 in the Y direction are arrayed. That is to say, each of the 20 small regions (virtual regions) within the region 2301 is equivalent to one pixel.

Also, a white portion shown in the drawing within the region 2301 represents a light signal corresponding to a fine line. Accordingly, the region 2301 has continuity in the direction wherein a fine line continues. Hereafter, the region 2301 is referred to as the fine-line-including actual world region 2301.

In this case, when the fine-line-including actual world region 2301 (a portion of a light signal in the actual world 1) is detected by the sensor 2, region 2302 (hereafter, this is referred to as a fine-line-including data region 2302) of the input image (pixel values) is output from the sensor 2 by integration effects.

Note that each pixel of the fine-line-including data region 2302 is represented as an image in the drawing, but is data representing a predetermined value in reality. That is to say, the fine-line-including actual world region 2301 is changed (distorted) to the fine-line-including data region 2302, which is divided into 20 pixels (20 pixels in total of 4 pixels in the X direction and also 5 pixels in the Y direction) each having a predetermined pixel value by the integration effects of the sensor 2.

Figure 61:
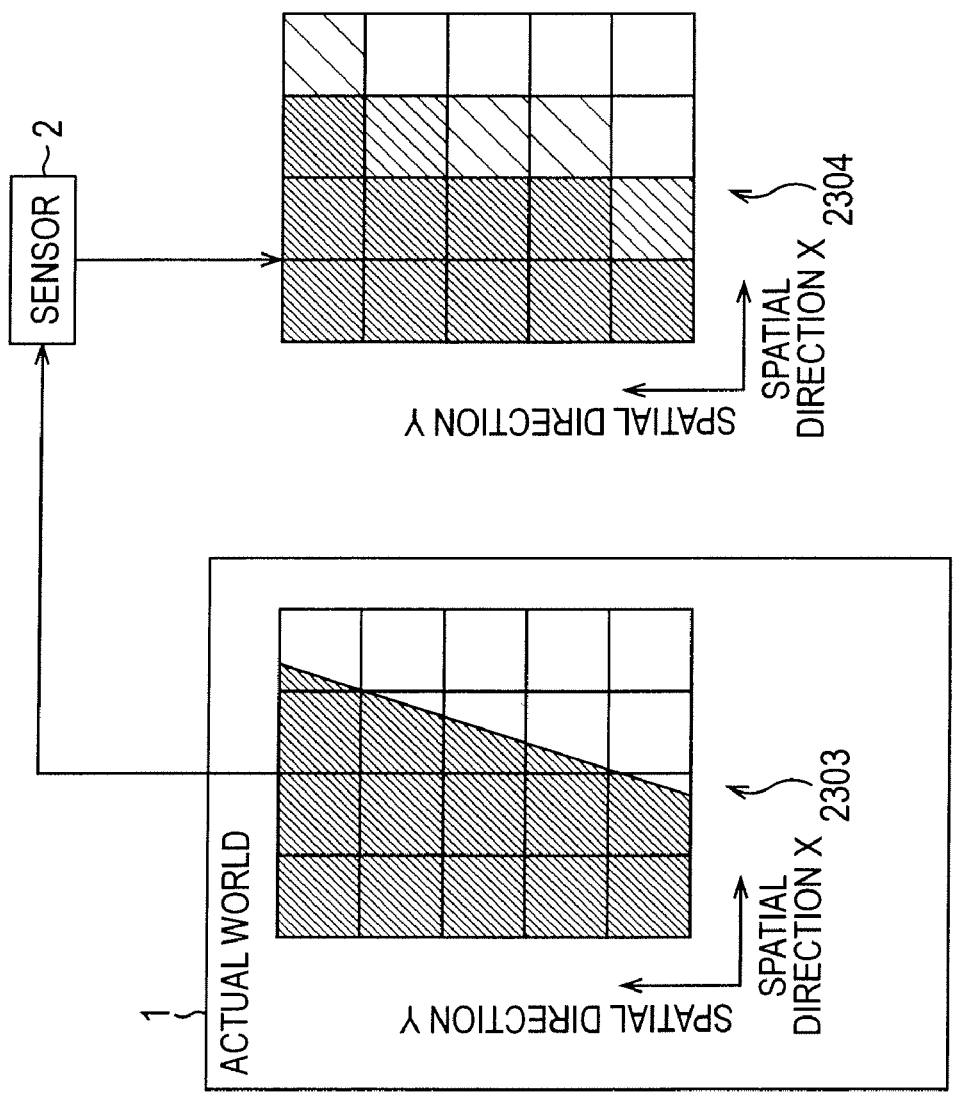
FIG. 61 is a diagram for describing another specific example of the integration effects of the sensor shown in FIG. 59.

FIG. 61 is a diagram for describing another specific example (example different from FIG. 60) of the integration effects of the sensor 2.

In FIG. 61, the X direction and Y direction represent the X direction and Y direction of the sensor 2 (FIG. 59).

A portion (region) 2303 of the light signal in the actual world 1 represents another example (example different from the fine-line-including actual world region 2301 in FIG. 60) of a region having predetermined continuity.

Note that the region 2303 is a region having the same size as the fine-line-including actual world region 2301. That is to say, the region 2303 is also a portion of the continuous light signal in the actual world 1 (continuous region) as with the fine-line-including actual world region 2301 in reality, but is shown as divided into 20 small regions (square regions) equivalent to one pixel of the sensor 2 in FIG. 61.

Also, the region 2303 includes a first portion having predetermined first light intensity (value), and a second portion edge having predetermined second light intensity (value). Accordingly, the region 2303 has continuity in the direction wherein the edges continue. Hereafter, the region 2303 is referred to as the two-valued-edge-including actual world region 2303.

In this case, when the two-valued-edge-including actual world region 2303 (a portion of the light signal in the actual world 1) is detected by the sensor 2, a region 2304 (hereafter, referred to as two-valued-edge-including data region 2304) of the input image (pixel value) is output from the sensor 2 by integration effects.

Note that each pixel value of the two-valued-edge-including data region 2304 is represented as an image in the drawing as with the fine-line-including data region 2302, but is data representing a predetermined value in reality. That is to say, the two-valued-edge-including actual world region 2303 is changed (distorted) to the two-valued-edge-including data region 2304, which is divided into 20 pixels (20 pixels in total of 4 pixels in the X direction and also 5 pixels in the Y direction) each having a predetermined pixel value by the integration effects of the sensor 2.

Conventional image processing devices have regarded image data output from the sensor 2 such as the fine-line-including data region 2302, two-valued-edge-including data region 2304, and the like as the origin (basis), and also have subjected the image data to the subsequent image processing. That is to say, regardless of that the image data output from the sensor 2 had been changed (distorted) to data different from the light signal in the actual world 1 by integration effects, the conventional image processing devices have performed image processing on assumption that the data different from the light signal in the actual world 1 is correct.

As a result, the conventional image processing devices have provided a problem wherein based on the waveform (image data) of which the details in the actual world is distorted at the stage wherein the image data is output from the sensor 2, it is very difficult to restore the original details from the waveform.

Accordingly, with the function approximating method, in order to solve this problem, as described above (as shown in FIG. 58), the actual world estimating unit 102 estimates the light signal function F by approximating the light signal function F (light signal in the actual world 1) with the approximation function f based on the image data (input image) such as the fine-line-including data region 2302, and two-valued-edge-including data region 2304 output from the sensor 2.

Thus, at a later stage than the actual world estimating unit 102 (in this case, the image generating unit 103 in FIG. 3), the processing can be performed by taking the image data wherein integration effects are taken into consideration, i.e., image data that can be represented with the approximation function f as the origin.

Hereafter, description will be made independently regarding three specific methods (first through third function approximating methods), of such a function approximating method with reference to the drawings.

First, description will be made regarding the first function approximating method with reference to FIG. 62 through FIG. 76.

Figure 62:
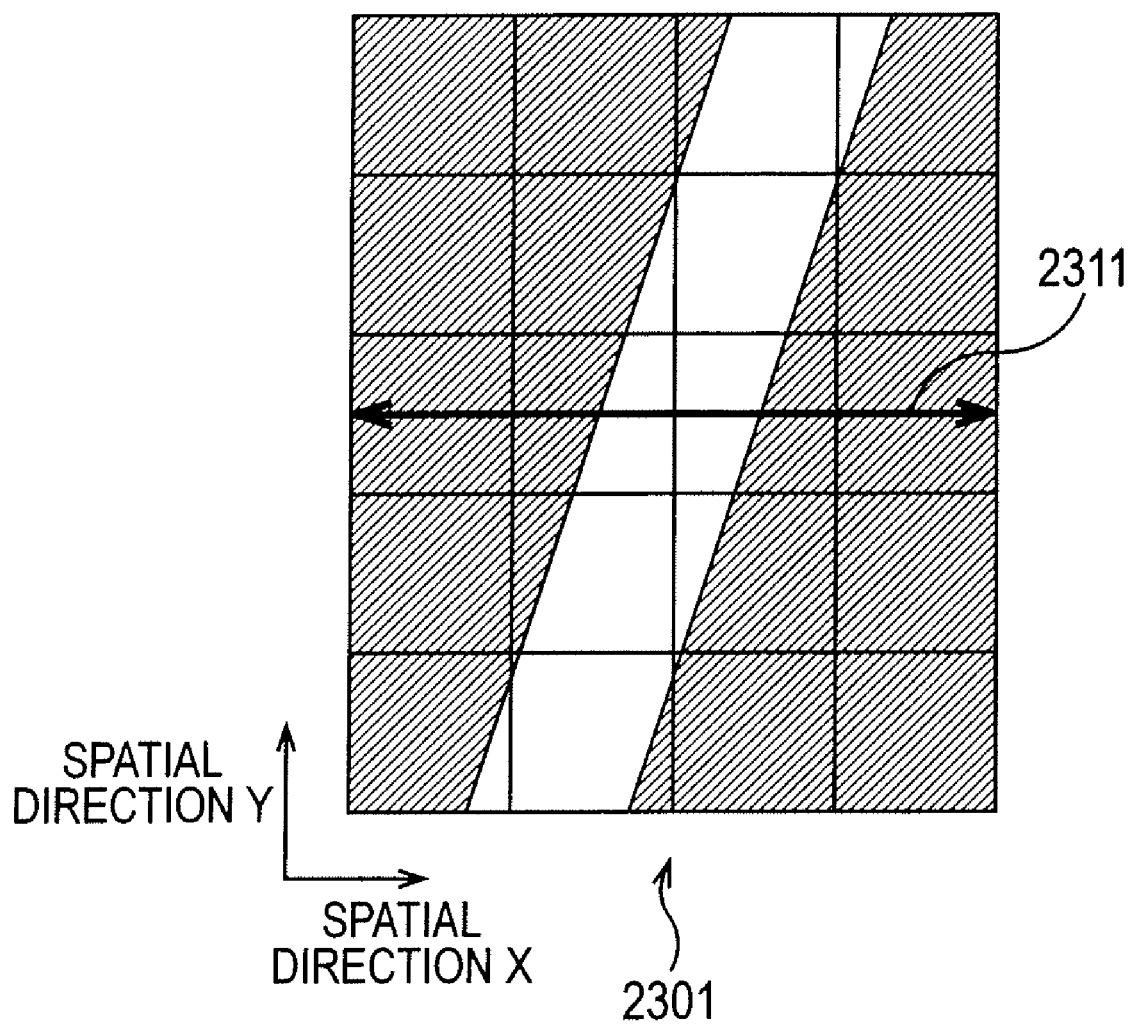
FIG. 62 is a diagram representing a fine-line-inclusive actual world region shown in FIG. 60.

FIG. 62 is a diagram representing the fine-line-including actual world region 2301 shown in FIG. 60 described above again.

In FIG. 62, the X direction and Y direction represent the X direction and Y direction of the sensor 2 (FIG. 59).

The first function approximating method is a method for approximating a one-dimensional waveform (hereafter, such a waveform is referred to as an X cross-sectional waveform F(x)) wherein the light signal function F(x, y, t) corresponding to the fine-line-including actual world region 2301 such as shown in FIG. 62 is projected in the X direction (direction of an arrow 2311 in the drawing), with the approximation function f(x) serving as an n-dimensional (n is an arbitrary integer) polynomial, for example. Accordingly, hereafter, the first function approximating method is particularly referred to as a one-dimensional approximating method.

Note that with the one-dimensional approximating method, the X cross-sectional waveform F(x), which is to be approximated, is not restricted to a waveform corresponding to the fine-line-including actual world region 2301 in FIG. 62, of course. That is to say, as described later, with the one-dimensional approximating method, any waveform can be approximated as long as the X cross-sectional waveform F(x) corresponds to the light signals in the actual world 1 having continuity.

Also, the direction of the projection of the light signal function F(x, y, t) is not restricted to the X direction, or rather the Y direction or t direction may be employed. That is to say, with the one-dimensional approximating method, a function F(y) wherein the light signal function F(x, y, t) is projected in the Y direction may be approximated with a predetermined approximation function f(y), or a function F(t) wherein the light signal function F(x, y, t) is projected in the t direction may be approximated with a predetermined approximation function f(t).

More specifically, the one-dimensional approximating method is a method for approximating, for example, the X cross-sectional waveform F(x) with the approximation function f(x) serving as an n-dimensional polynomial such as shown in the following Expression (39).

$$f(x) = w_0 + w_1 x + w_2 x + \ldots + w_n x^n = \sum_{i=0}^{n} w_i x^i \quad (39)$$

That is to say, with the one-dimensional approximating method, the actual world estimating unit 102 estimates the X cross-sectional waveform F(x) by calculating the coefficient (features) $w_i$ of $x^i$ in Expression (39).

This calculation method of the features $w_i$ is not restricted to a particular method, for example, the following first through third methods may be employed.

That is to say, the first method is a method that has been employed so far.

On the other hand, the second method is a method that has been newly invented by the present applicant, which is a method that considers continuity in the spatial direction as to the first method.

However, as described later, with the first and second methods, the integration effects of the sensor 2 are not taken into consideration. Accordingly, an approximation function f(x) obtained by substituting the features $w_i$ calculated by the first method or the second method for the above Expression (39) is an approximation function regarding an input image, but strictly speaking, cannot be referred to as the approximation function of the X cross-sectional waveform F(x).

Consequently, the present applicant has invented the third method that calculates the features $w_i$ further in light of the integration effects of the sensor 2 as to the second method. An approximation function f(x) obtained by substituting the features $w_i$ calculated with this third method for the above Expression (39) can be referred to as the approximation function of the X cross-sectional waveform F(x) in that the integration effects of the sensor 2 are taken into consideration.

Thus, strictly speaking, the first method and the second method cannot be referred to as the one-dimensional approximating method, and the third method alone can be referred to as the one-dimensional approximating method.

Figure 63:
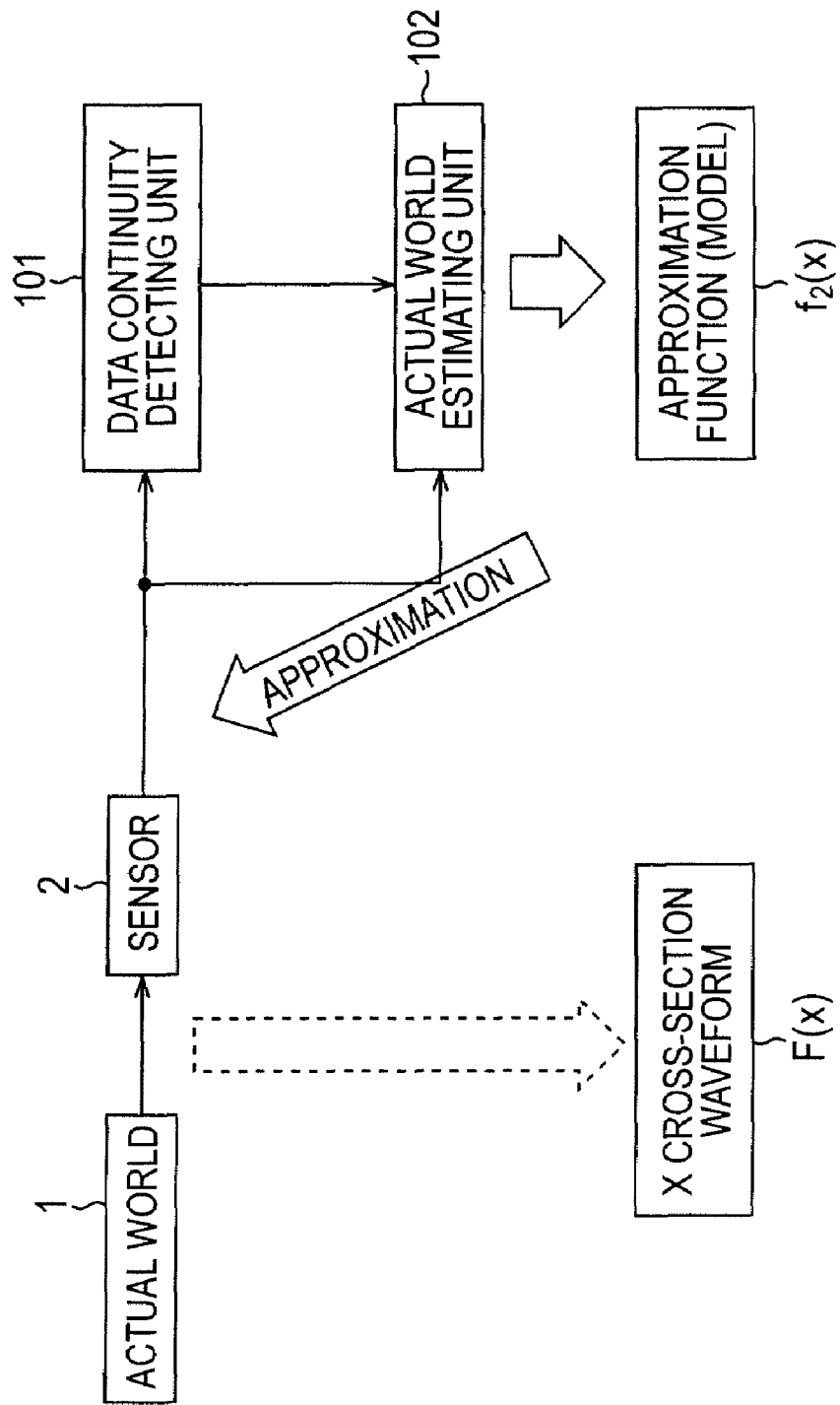
FIG. 63 is a diagram for describing the principle of an example of an embodiment of the actual world estimating unit shown in FIG. 3, in comparison with the example shown in FIG. 58.

In other words, as shown in FIG. 63, the second method is different from the one-dimensional approximating method. That is to say, FIG. 63 is a diagram for describing the principle of the embodiment corresponding to the second method.

As shown in FIG. 63, with the embodiment corresponding to the second method, in the event that the light signal in the actual world 1 represented with the light signal function F has predetermined continuity, the actual world estimating unit 102 does not approximate the X cross-sectional waveform F(x) with an input image (image data including continuity of data corresponding to continuity) from the sensor 2, and data continuity information (data continuity information corresponding to continuity of input image data) from the data continuity detecting unit 101, but approximates the input image from the sensor 2 with a predetermined approximation function $f_2(x)$.

Thus, it is hard to say that the second method is a method having the same level as the third method in that approximation of the input image alone is performed without considering the integral effects of the sensor 2. However, the second method is a method superior to the conventional first method in that the second method takes continuity in the spatial direction into consideration.

Hereafter, description will be made independently regarding the details of the first method, second method, and third method in this order.

Note that hereafter, in the event that the respective approximation functions f(x) generated by the first method, second method, and third method are distinguished from that of the other method, they are particularly referred to as approximation function $f_1(x)$, approximation function $f_2(x)$, and approximation function $f_3(x)$ respectively.

First, description will be made regarding the details of the first method.

Figure 64:
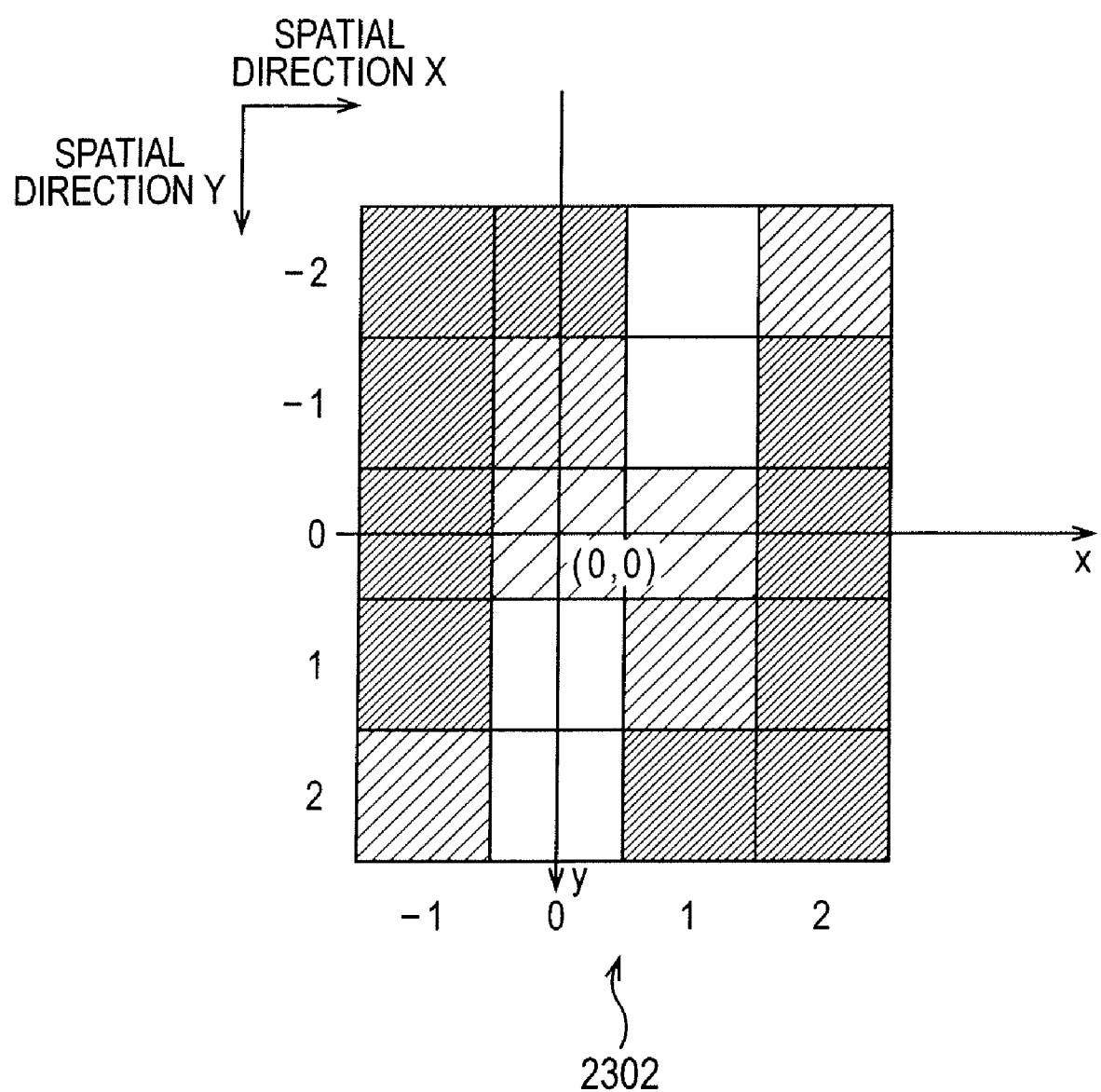
FIG. 64 is a diagram representing the fine-line-inclusive data region shown in FIG. 60.

With the first method, on condition that the approximation function $f_1(x)$ shown in the above Expression (39) holds within the fine-line-including actual world region 2301 in FIG. 64, the following prediction equation (40) is defined.

$$P(x, y) = f_1(x) + e \quad (40)$$

In Expression (40), x represents a pixel position relative as to the X direction from a pixel of interest. y represents a pixel position relative as to the Y direction from the pixel of interest. e represents a margin of error. Specifically, for example, as shown in FIG. 64, let us say that the pixel of interest is the second pixel in the X direction from the left, and also the third pixel in the Y direction from the bottom in the drawing, of the fine-line-including data region 2302 (data of which the fine-line-including actual world region 2301 (FIG. 62) is detected by the sensor 2, and output). Also, let us say that the center of the pixel of interest is the origin (0, 0), and a coordinates system (hereafter, referred to as a pixel-of-interest coordinates system) of which axes are an x axis and y axis respectively in parallel with the X direction and Y direction of the sensor 2 (FIG. 59) is set. In this case, the coordinates value (x, y) of the pixel-of-interest coordinates system represents a relative pixel position.

Also, in Expression (40), P(x, y) represents a pixel value in the relative pixel positions (x, y). Specifically, in this case, the P(x, y) within the fine-line-including data region 2302 is such as shown in FIG. 65.

Figure 65:
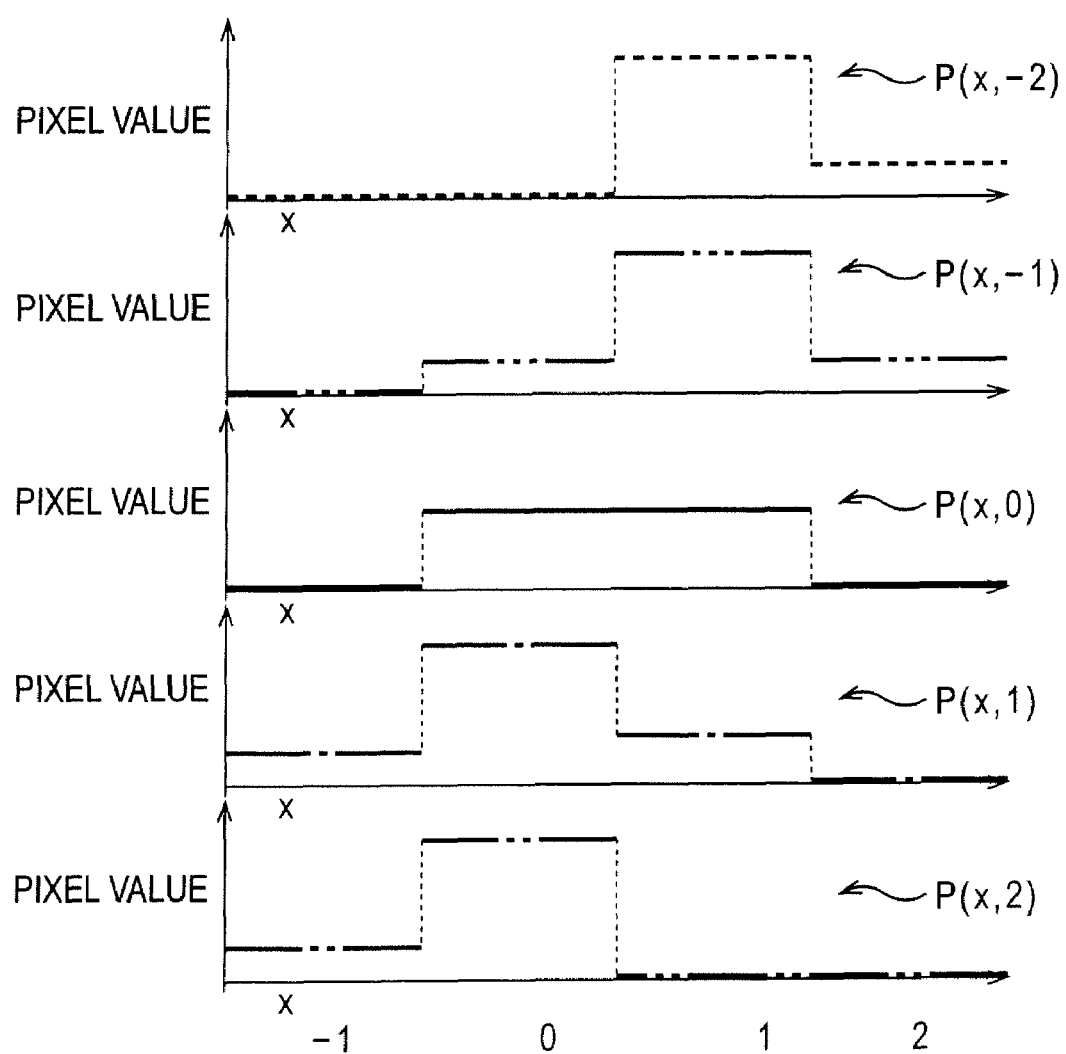
FIG. 65 is a diagram wherein each of the pixel values contained in the fine-line-inclusive data region shown in FIG. 64 are plotted on a graph.

FIG. 65 represents this pixel value P(x, y) in a graphic manner.

In FIG. 65, the respective vertical axes of the graphs represent pixel values, and the horizontal axes represent a relative position x in the X direction from the pixel of interest. Also, in the drawing, the dashed line in the first graph from the top represents an input pixel value P(x, −2), the broken triple-dashed line in the second graph from the top represents an input pixel value P(x, −1), the solid line in the third graph from the top represents an input pixel value P(x, 0), the broken line in the fourth graph from the top represents an input pixel value P(x, 1), and the broken double-dashed line in the fifth graph from the top (the first from the bottom) represents an input pixel value P(x, 2) respectively.

Upon the 20 input pixel values P(x, −2), P(x, −1), P (x, 0), P(x, 1), and P(x, 2) (however, x is any one integer value of −1 through 2) shown in FIG. 65 being substituted for the above Expression (40) respectively, 20 equations as shown in the following Expression (41) are generated. Note that each $e_k$ (k is any one of integer values 1 through 20) represents a margin of error.

$$P(-1, -2) = f_1(-1) + e_1 \quad (41)$$
$$P(0, -2) = f_1(0) + e_2$$
$$P(1, -2) = f_1(1) + e_3$$
$$P(2, -2) = f_1(2) + e_4$$
$$P(-1, -1) = f_1(-1) + e_5$$
$$P(0, -1) = f_1(0) + e_6$$
$$P(1, -1) = f_1(1) + e_7$$
$$P(2, -1) = f_1(2) + e_8$$
$$P(-1, 0) = f_1(-1) + e_9$$
$$P(0, 0) = f_1(0) + e_{10}$$
$$P(1, 0) = f_1(1) + e_{11}$$
$$P(2, 0) = f_1(2) + e_{12}$$
$$P(-1, 1) = f_1(-1) + e_{13}$$
$$P(0, 1) = f_1(0) + e_{14}$$
$$P(1, 1) = f_1(1) + e_{15}$$
$$P(2, 1) = f_1(2) + e_{16}$$
$$P(-1, 2) = f_1(-1) + e_{17}$$

-continued
$$P(0, 2) = f_1(0) + e_{18}$$
$$P(1, 2) = f_1(1) + e_{19}$$
$$P(2, 2) = f_1(2) + e_{20}$$

Expression (41) is made up of 20 equations, so in the event that the number of the features $w_i$ of the approximation function $f_1(x)$ is less than 20, i.e., in the event that the approximation function $f_1(x)$ is a polynomial having the number of dimensions less than 19, the features $w_i$ can be calculated using the least square method, for example. Note that the specific solution of the least square method will be described later.

Figure 66:
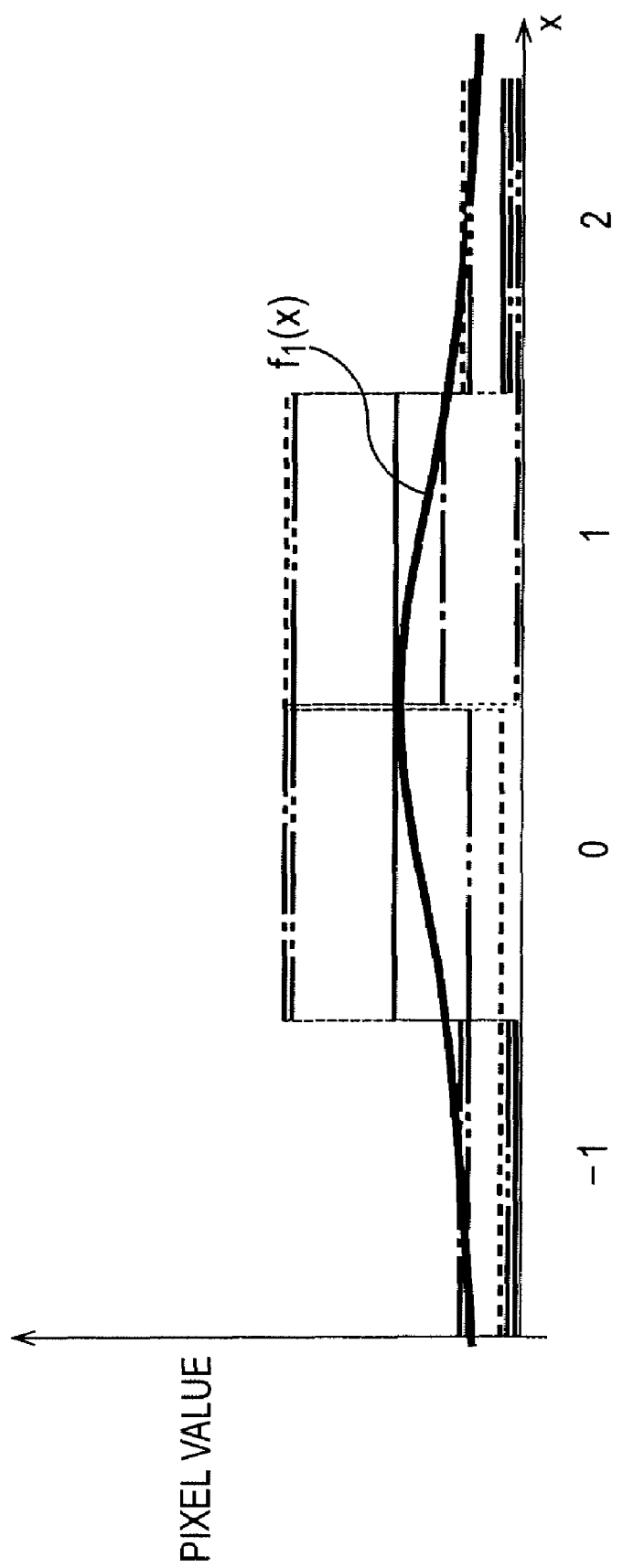
FIG. 66 is a diagram wherein an approximation function, approximating the pixel values contained in the fine-line-inclusive data region shown in FIG. 65, is plotted on a graph.

For example, if we say that the number of dimensions of the approximation function $f_1(x)$ is five, the approximation function $f_1(x)$ calculated with the least square method using Expression (41) (the approximation function $f_1(x)$ generated by the calculated features $w_i$) becomes a curve shown in FIG. 66.

Note that in FIG. 66, the vertical axis represents pixel values, and the horizontal axis represents a relative position x from the pixel of interest.

That is to say, for example, if we supplement the respective 20 pixel values P(x, y) (the respective input pixel values P(x, −2), P(x, −1), P(x, 0), P(x, 1), and P(x, 2) shown in FIG. 65) making up the fine-line-including data region 2302 in FIG. 64 along the x axis without any modification (if we regard a relative position y in the Y direction as constant, and overlay the five graphs shown in FIG. 65), multiple lines (dashed line, broken triple-dashed line, solid line, broken line, and broken double-dashed line) in parallel with the x axis, such as shown in FIG. 66, are distributed.

However, in FIG. 66, the dashed line represents the input pixel value P(x, −2), the broken triple-dashed line represents the input pixel value P(x, −1), the solid line represents the input pixel value P(x, 0), the broken line represents the input pixel value P(x, 1), and the broken double-dashed line represents the input pixel value P(x, 2) respectively. Also, in the event of the same pixel value, lines more than 2 lines are overlaid in reality, but in FIG. 66, the lines are drawn so as to distinguish each line, and so as not to overlay each line.

The respective 20 input pixel values (P(x, −2), P(x, −1), P(x, 0), P(x, 1), and P(x, 2)) thus distributed, and a regression curve (the approximation function $f_1(x)$ obtained by substituting the features $w_i$ calculated with the least square method for the above Expression (38)) so as to minimize the error of the value $f_1(x)$ become a curve (approximation function $f_1(x)$) shown in FIG. 66.

Thus, the approximation function $f_1(x)$ represents nothing but a curve connecting in the X direction the means of the pixel values (pixel values having the same relative position x in the X direction from the pixel of interest) P(x, −2), P(x, −1), P(x, 0), P(x, 1), and P(x, 2) in the Y direction. That is to say, the approximation function $f_1(x)$ is generated without considering continuity in the spatial direction included in the light signal.

Figure 67:
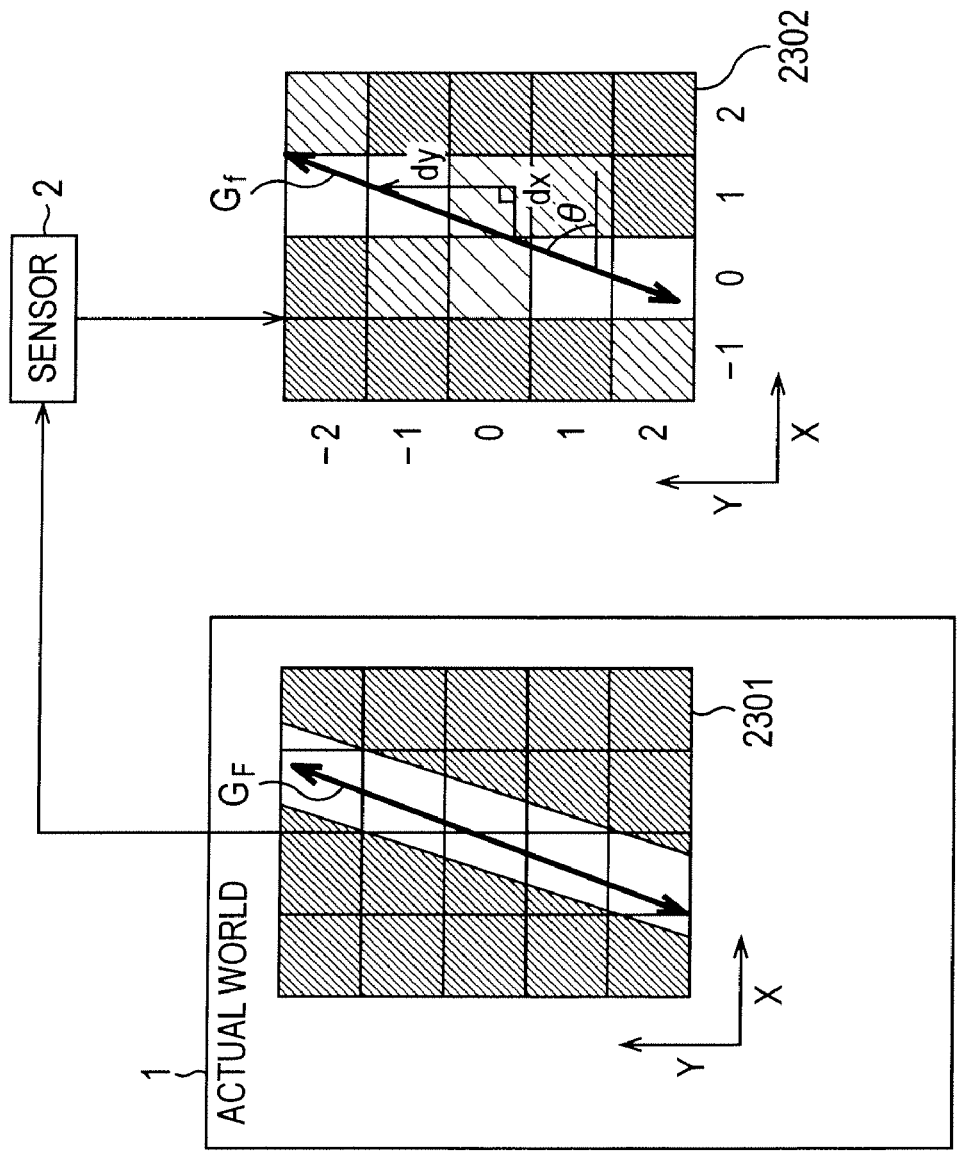
FIG. 67 is a diagram for describing the continuity in the spatial direction which the fine-line-inclusive actual world region shown in FIG. 60 has.

For example, in this case, the fine-line-including actual world region 2301 (FIG. 62) is regarded as a subject to be approximated. This fine-line-including actual world region 2301 has continuity in the spatial direction, which is represented with a gradient $G_F$, such as shown in FIG. 67. Note that in FIG. 67, the X direction and Y direction represent the X direction and Y direction of the sensor 2 (FIG. 59).

Accordingly, the data continuity detecting unit 101 (FIG. 58) can output an angle θ (angle θ generated between the direction of data continuity represented with a gradient $G_f$ corresponding to the gradient $G_F$, and the X direction) such as shown in FIG. 67 as data continuity information corresponding to the gradient $G_F$ as continuity in the spatial direction However, with the first method, the data continuity information output from the data continuity detecting unit 101 is not employed at all.

In other words, such as shown in FIG. 67, the direction of continuity in the spatial direction of the fine-line-including actual world region 2301 is a general angle θ direction. However, the first method is a method for calculating the features $w_i$ of the approximation function $f_1(x)$ on assumption that the direction of continuity in the spatial direction of the fine-line-including actual world region 2301 is the Y direction (i.e., on assumption that the angle θ is 90°).

Consequently, the approximation function $f_1(x)$ becomes a function of which the waveform gets dull, and the detail decreases than the original pixel value. In other words, though not shown in the drawing, with the approximation function $f_1(x)$ generated with the first method, the waveform thereof becomes a waveform different from the actual X cross-sectional waveform F(x).

To this end, the present applicant has invented the second method for calculating the features $w_i$ by further taking continuity in the spatial direction into consideration (utilizing the angle θ) as to the first method.

That is to say, the second method is a method for calculating the features $w_i$ of the approximation function $f_2(x)$ on assumption that the direction of continuity of the fine-line-including actual world region 2301 is a general angle θ direction.

Specifically, for example, the gradient $G_f$ representing continuity of data corresponding to continuity in the spatial direction is represented with the following Expression (42).

$$G_f = \tan\theta = \frac{dy}{dx} \quad (42)$$

Note that in Expression (42), dx represents the amount of fine movement in the X direction such as shown in FIG. 67, dy represents the amount of fine movement in the Y direction as to the dx such as shown in FIG. 67.

In this case, if we define the shift amount $C_x(y)$ as shown in the following Expression (43), with the second method, an equation corresponding to Expression (40) employed in the first method becomes such as the following Expression (44).

$$C_x(y) = \frac{y}{G_f} \quad (43)$$

$$P(x, y) = f_2(x - C_x(y)) + e \quad (44)$$

That is to say, Expression (40) employed in the first method represents that the position x in the X direction of the pixel center position (x, y) is the same value regarding the pixel value P(x, y) of any pixel positioned in the same position. In other words, Expression (40) represents that pixels having the same pixel value continue in the Y direction (exhibits continuity in the Y direction).

On the other hand, Expression (44) employed in the second method represents that the pixel value P(x, y) of a pixel of which the center position is (x, y) is not identical to the pixel value (approximate equivalent to $f_2(x)$) of a pixel positioned in a place distant from the pixel of interest (a pixel of which the center position is the origin (0, 0)) in the X direction by x, and is the same value as the pixel value (approximate equivalent to $f_2(x+C_x(y))$) of a pixel positioned in a place further distant from the pixel thereof in the X direction by the shift amount $C_x(y)$ (pixel positioned in a place distant from the pixel of interest in the X direction by $x+C_x(y)$). In other words, Expression (44) represents that pixels having the same pixel value continue in the angle θ direction corresponding to the shift amount $C_x(y)$ (exhibits continuity in the general angle θ direction).

Thus, the shift amount $C_x(y)$ is the amount of correction considering continuity (in this case, continuity represented with the gradient $G_F$ in FIG. 67 (strictly speaking, continuity of data represented with the gradient $G_f$)) in the spatial direction, and Expression (44) is obtained by correcting Expression (40) with the shift amount $C_x(y)$.

In this case, upon the 20 pixel values P(x, y) (however, x is any one integer value of −1 through 2, and y is any one integer value of −2 through 2) of the fine-line-including data region 2302 shown in FIG. 64 being substituted for the above Expression (44) respectively, 20 equations as shown in the following Expression (45) are generated.

$$\begin{aligned}
P(-1, -2) &= f_2(-1 - C_x(-2)) + e_1 \\
P(0, -2) &= f_2(0 - C_x(-2)) + e_2 \\
P(1, -2) &= f_2(1 - C_x(-2)) + e_3 \\
P(2, -2) &= f_2(2 - C_x(-2)) + e_4 \\
P(-1, -1) &= f_2(-1 - C_x(-1)) + e_5 \\
P(0, -1) &= f_2(0 - C_x(-1)) + e_6 \\
P(1, -1) &= f_2(1 - C_x(-1)) + e_7 \\
P(2, -1) &= f_2(2 - C_x(-1)) + e_8 \\
P(-1, 0) &= f_2(-1) + e_9 \\
P(0, 0) &= f_2(0) + e_{10} \\
P(1, 0) &= f_2(1) + e_{11} \\
P(2, 0) &= f_2(2) + e_{12} \\
P(-1, 1) &= f_2(-1 - C_x(1)) + e_{13} \\
P(0, 1) &= f_2(0 - C_x(1)) + e_{14} \\
P(1, 1) &= f_2(1 - C_x(1)) + e_{15} \\
P(2, 1) &= f_2(2 - C_x(1)) + e_{16} \\
P(-1, 2) &= f_2(-1 - C_x(2)) + e_{17} \\
P(0, 2) &= f_2(0 - C_x(2)) + e_{18} \\
P(1, 2) &= f_2(1 - C_x(2)) + e_{19} \\
P(2, 2) &= f_2(2 - C_x(2)) + e_{20}
\end{aligned} \quad (45)$$

Expression (45) is made up of 20 equations, as with the above Expression (41). Accordingly, with the second method, as with the first method, in the event that the number of the features $w_i$ of the approximation function $f_2(x)$ is less than 20, i.e., the approximation function $f_2(x)$ is a polynomial having the number of dimensions less than 19, the features $w_i$ can be calculated with the least square method, for example. Note that the specific solution regarding the least square method will be described later.

For example, if we say that the number of dimensions of the approximation function $f_2(x)$ is five as with the first method, with the second method, the features $w_i$ are calculated as follows.

Figure 68:
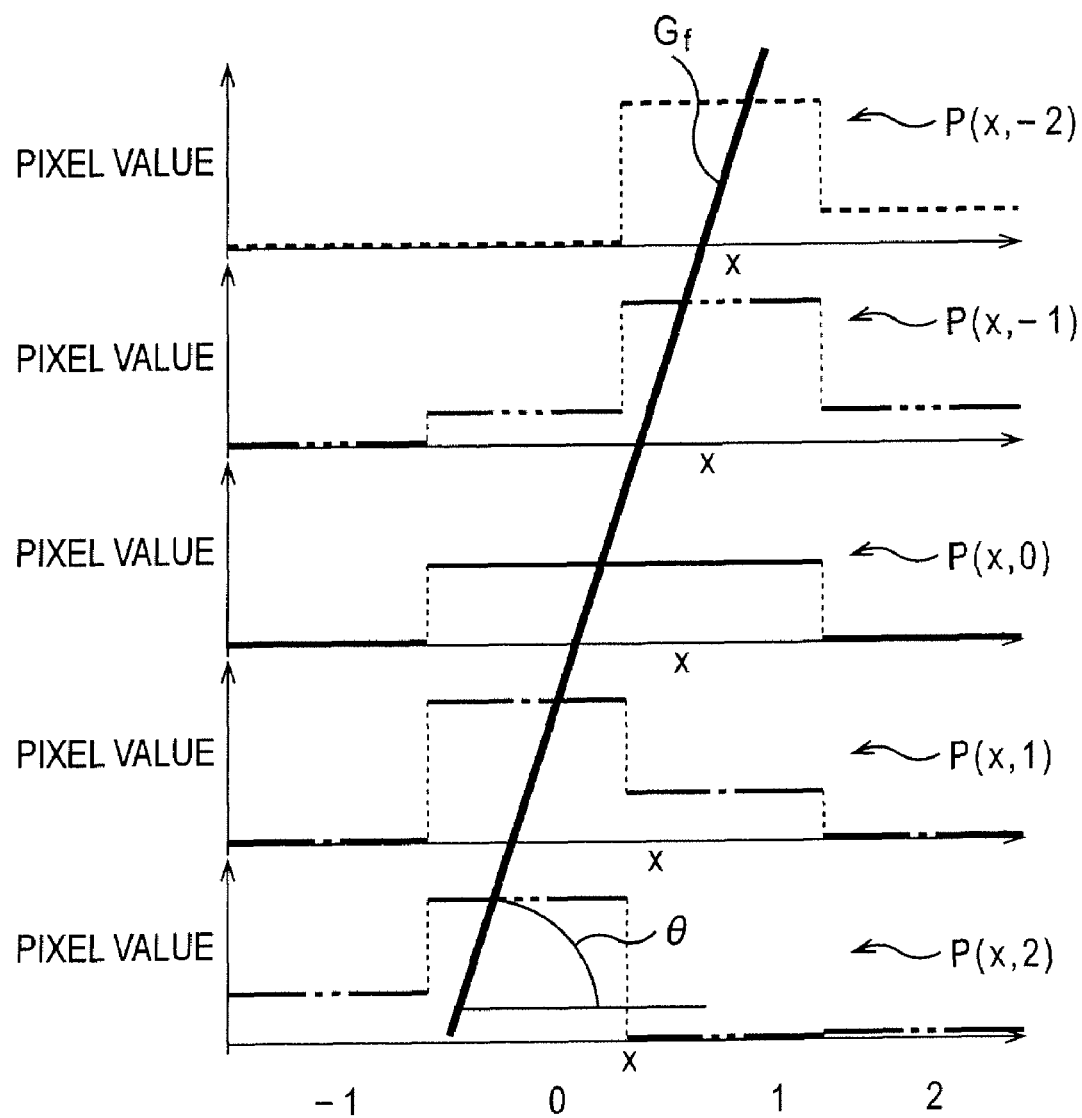
FIG. 68 is a diagram wherein each of the pixel values contained in the fine-line-inclusive data region shown in FIG. 64 are plotted on a graph.

That is to say, FIG. 68 represents the pixel value $P(x, y)$ shown in the left side of Expression (45) in a graphic manner. The respective five graphs shown in FIG. 68 are basically the same as shown in FIG. 65.

As shown in FIG. 68, the maximal pixel values (pixel values corresponding to fine lines) are continuous in the direction of continuity of data represented with the gradient $G_f$.

Figure 69:
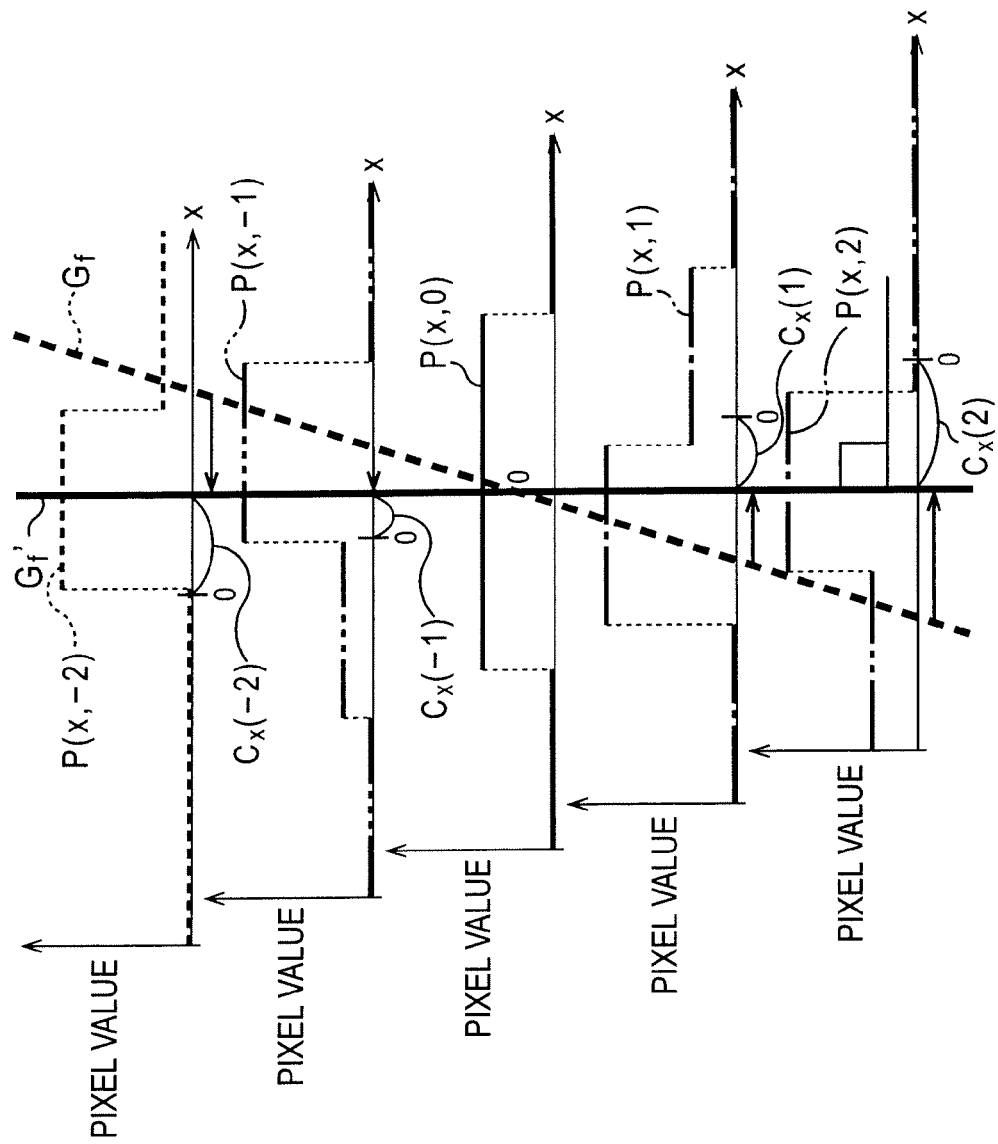
FIG. 69 is a diagram for describing a state wherein each of the input pixel values indicated in FIG. 68 are shifted by a predetermined shift amount.

Consequently, with the second method, if we supplement the respective input pixel values $P(x, -2)$, $P(x, -1)$, $P(x, 0)$, $P(x, 1)$, and $P(x, 2)$ shown in FIG. 68, for example, along the x axis, we supplement the pixel values after the pixel values are changed in the states shown in FIG. 69 instead of supplementing the pixel values without any modification as with the first method (let us assume that y is constant, and the five graphs are overlaid in the states shown in FIG. 68).

That is to say, FIG. 69 represents a state wherein the respective input pixel values $P(x, -2)$, $P(x, -1)$, $P(x, 0)$, $P(x, 1)$, and $P(x, 2)$ shown in FIG. 68 are shifted by the shift amount $C_x(y)$ shown in the above Expression (43). In other words, FIG. 69 represents a state wherein the five graphs shown in FIG. 68 are moved as if the gradient $G_F$ representing the actual direction of continuity of data were regarded as a gradient $G_F'$ (in the drawing, a straight line made up of a dashed line were regarded as a straight line made up of a solid line).

Figure 70:
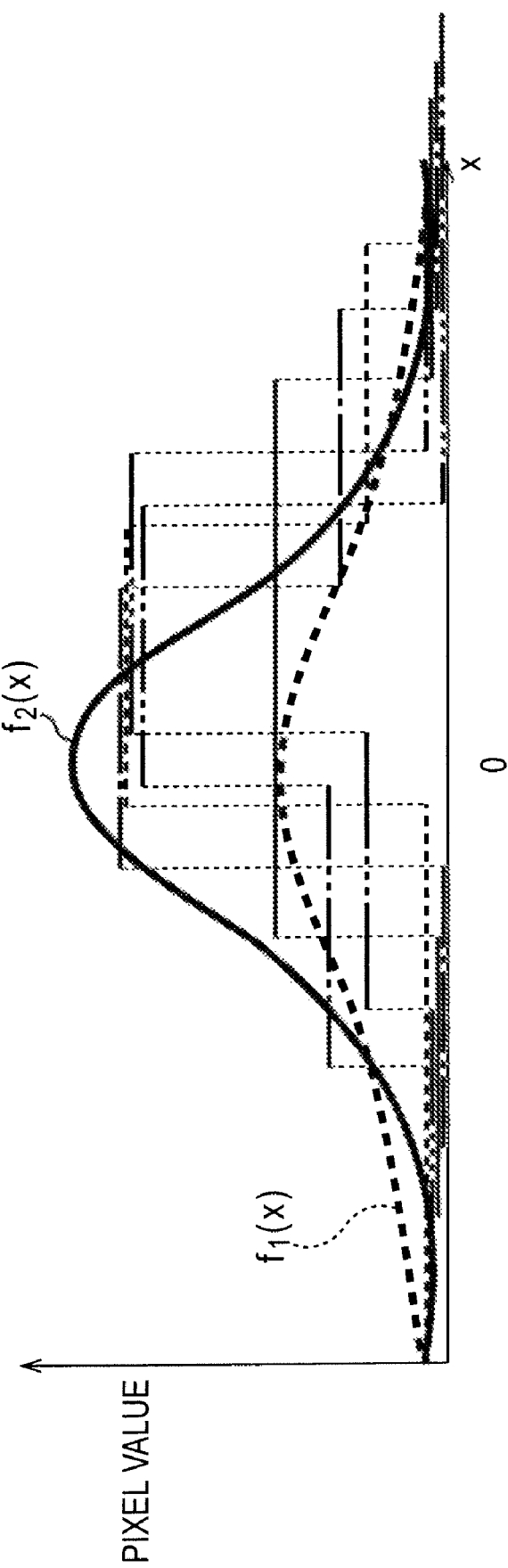
FIG. 70 is a diagram wherein an approximation function, approximating the pixel values contained in the fine-line-inclusive data region shown in FIG. 65, is plotted on a graph, taking into consideration the spatial-direction continuity.

In the states in FIG. 69, if we supplement the respective input pixel values $P(x, -2)$, $P(x, -1)$, $P(x, 0)$, $P(x, 1)$, and $P(x, 2)$, for example, along the x axis (in the states shown in FIG. 69, if we overlay the five graphs), multiple lines (dashed line, broken triple-dashed line, solid line, broken line, and broken double-dashed line) in parallel with the x axis, such as shown in FIG. 70, are distributed.

Note that in FIG. 70, the vertical axis represents pixel values, and the horizontal axis represents a relative position x from the pixel of interest. Also, the dashed line represents the input pixel value $P(x, -2)$, the broken triple-dashed line represents the input pixel value $P(x, -1)$, the solid line represents the input pixel value $P(x, 0)$, the broken line represents the input pixel value $P(x, 1)$, and the broken double-dashed line represents the input pixel value $P(x, 2)$ respectively. Further, in the event of the same pixel value, lines more than 2 lines are overlaid in reality, but in FIG. 70, the lines are drawn so as to distinguish each line, and so as not to overlay each line.

The respective 20 input pixel values $P(x, y)$ (however, x is any one integer value of $-1$ through 2, and y is any one integer value of $-2$ through 2) thus distributed, and a regression curve (the approximation function $f_2(x)$ obtained by substituting the features $w_i$ calculated with the least square method for the above Expression (38)) to minimize the error of the value $f_2(x+C_x(y))$ become a curve $f_2(x)$ shown in the solid line in FIG. 70.

Thus, the approximation function $f_2(x)$ generated with the second method represents a curve connecting in the X direction the means of the input pixel values $P(x, y)$ in the angle θ direction (i.e., direction of continuity in the general spatial direction) output from the data continuity detecting unit 101 (FIG. 58).

On the other hand, as described above, the approximation function $f_1(x)$ generated with the first method represents nothing but a curve connecting in the X direction the means of the input pixel values $P(x, y)$ in the Y direction (i.e., the direction different from the continuity in the spatial direction).

Accordingly, as shown in FIG. 70, the approximation function $f_2(x)$ generated with the second method becomes a function wherein the degree of dullness of the waveform thereof decreases, and also the degree of decrease of the detail as to the original pixel value decreases less than the approximation function $f_1(x)$ generated with the first method. In other words, though not shown in the drawing, with the approximation function $f_2(x)$ generated with the second method, the waveform thereof becomes a waveform closer to the actual X cross-sectional waveform $F(x)$ than the approximation function $f_1(x)$ generated with the first method.

However, as described above, the approximation function $f_2(x)$ is a function considering continuity in the spatial direction, but is nothing but a function generated wherein the input image (input pixel value) is regarded as the origin (basis). That is to say, as shown in FIG. 63 described above, the approximation function $f_2(x)$ is nothing but a function that approximated the input image different from the X cross-sectional waveform $F(x)$, and it is hard to say that the approximation function $f_2(x)$ is a function that approximated the X cross-sectional waveform $F(x)$. In other words, the second method is a method for calculating the features $w_i$ on assumption that the above Expression (44) holds, but does not take the relation in Expression (38) described above into consideration (does not consider the integration effects of the sensor 2).

Consequently, the present applicant has invented the third method that calculates the features $w_i$ of the approximation function $f_3(x)$ by further taking the integration effects of the sensor 2 into consideration as to the second method.

That is to say, the third method is a method that introduces the concept of a spatial mixture or time mixture. Now, considering both spatial mixture and time mixture will complicate the description, so only spatial mixture will be considered here of spatial mixture and time mixture, and time mixture will be ignored.

Description will be made regarding spatial mixture with reference to FIG. 71 prior to description of the third method.

Figure 71:
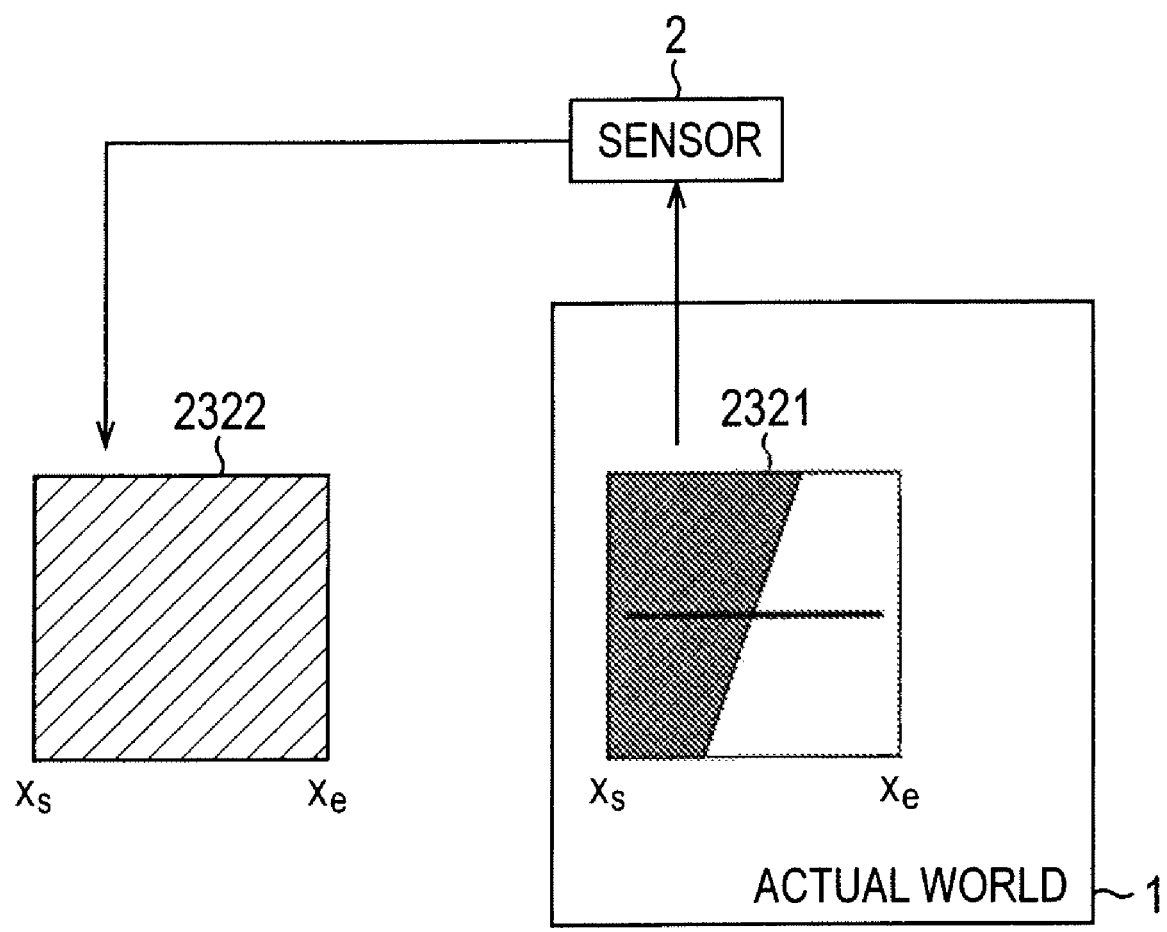
FIG. 71 is a diagram for describing space-mixed region.

In FIG. 71, a portion 2321 (hereafter, referred to as a region 2321) of a light signal in the actual world 1 represents a region having the same area as one detecting element (pixel) of the sensor 2.

Upon the sensor 2 detecting the region 2321, the sensor 2 outputs a value (one pixel value) 2322 obtained by the region 2321 being subjected to integration in the temporal and spatial directions (X direction, Y direction, and t direction). Note that the pixel value 2322 is represented as an image in the drawing, but is actually data representing a predetermined value.

The region 2321 in the actual world 1 is clearly classified into a light signal (white region in the drawing) corresponding to the foreground (the above fine line, for example), and a light signal (black region in the drawing) corresponding to the background.

On the other hand, the pixel value 2322 is a value obtained by the light signal in the actual world 1 corresponding to the foreground and the light signal in the actual world 1 corresponding to the background being subjected to integration. In other words, the pixel value 2322 is a value corresponding to a level wherein the light level corresponding to the foreground and the light level corresponding to the background are spatially mixed.

Thus, in the event that a portion corresponding to one pixel (detecting element of the sensor 2) of the light signals in the actual world 1 is not a portion where the light signals having the same level are spatially uniformly distributed, but a portion where the light signals having a different level such as a foreground and background are distributed, upon the region thereof being detected by the sensor 2, the region becomes one pixel value as if the different light levels were spatially mixed by the integration effects of the sensor 2 (integrated in the spatial direction). Thus, a region made up of pixels in which an image (light signals in the actual world 1) corresponding to a foreground, and an image (light signals in the actual world 1) corresponding to a background are subjected to spatial integration, that is, mixed as it were, which is spatial mixing, is referred to as a spatial mixed region here.

Figure 72:
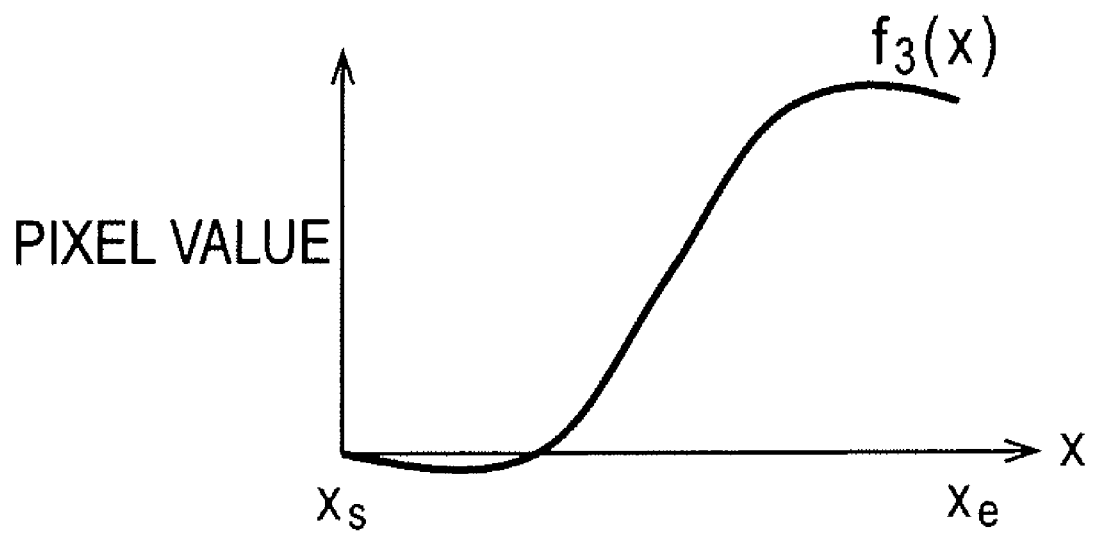
FIG. 72 is a diagram for describing an approximation function approximating actual-world signals in a space-mixed region.

Accordingly, with the third method, the actual world estimating unit 102 (FIG. 58) estimates the X cross-sectional waveform F(x) representing the original region 2321 in the actual world 1 (of the light signals in the actual world 1, the portion 2321 corresponding to one pixel of the sensor 2) by approximating the X cross-sectional waveform F(x) with the approximation function $f_3(x)$ serving as a one-dimensional polynomial such as shown in FIG. 72.

That is to say, FIG. 72 represents an example of the approximation function $f_3(x)$ corresponding to the pixel value 2322 serving as a spatial mixed region (FIG. 71), i.e., the approximation function $f_3(x)$ that approximates the X cross-sectional waveform F(x) corresponding to the solid line within the region 2331 in the actual world 1 (FIG. 71). In FIG. 72, the axis in the horizontal direction in the drawing represents an axis in parallel with the side from the upper left end $x_s$ to lower right end $x_e$ of the pixel corresponding to the pixel value 2322 (FIG. 71), which is taken as the x axis. The axis in the vertical direction in the drawing is taken as an axis representing pixel values.

In FIG. 72, the following Expression (46) is defined on condition that the result obtained by subjecting the approximation function $f_3(x)$ to integration in a range (pixel width) from the $x_s$ to the $x_e$ is generally identical with the pixel values P(x, y) output from the sensor 2 (dependent on a margin of error e alone).

$$P = \int_{x_s}^{x_e} f_3(x) dx + e \qquad (46)$$

$$= \int_{x_s}^{x_e} (w_0 + w_1 x + w_2 x^2 + \ldots + w_n x^n) dx + e$$

$$= w_0(x_e - x_s) + \ldots + w_{n-1} \frac{x_e^n - x_s^n}{n} + w_n \frac{x_e^{n+1} - x_s^{n+1}}{n+1} + e$$

In this case, the features $w_i$ of the approximation function $f_3(x)$ are calculated from the 20 pixel values P(x, y) (however, x is any one integer value of −1 through 2, and y is any one integer value of −2 through 2) of the fine-line-including data region 2302 shown in FIG. 67, so the pixel value P in Expression (46) becomes the pixel values P(x, y).

Also, as with the second method, it is necessary to take continuity in the spatial direction into consideration, and accordingly, each of the start position $x_s$ and end position $x_e$ in the integral range in Expression (46) is dependent upon the shift amount $C_x(y)$. That is to say, each of the start position $x_s$ and end position $x_e$ of the integral range in Expression (46) is represented such as the following Expression (47).

$$x_s = x - C_x(y) - 0.5 \qquad (47)$$
$$x_e = x - C_x(y) + 0.5$$

In this case, upon each pixel value of the fine-line-including data region 2302 shown in FIG. 67, i.e., each of the input pixel values P(x, −2), P(x, −1), P(x, 0), P(x, 1), and P(x, 2) (however, x is any one integer value of −1 through 2) shown in FIG. 68 being substituted for the above Expression (46) (the integral range is the above Expression (47)), 20 equations shown in the following Expression (48) are generated.

$$P(-1, -2) = \int_{-1-C_x(-2)-0.5}^{-1-C_x(-2)+0.5} f_3(x)dx + e_1, \qquad (48)$$

$$P(0, -2) = \int_{0-C_x(-2)-0.5}^{0-C_x(-2)+0.5} f_3(x)dx + e_2,$$

$$P(1, -2) = \int_{1-C_x(-2)-0.5}^{1-C_x(-2)+0.5} f_3(x)dx + e_3,$$

$$P(2, -2) = \int_{2-C_x(-2)-0.5}^{2-C_x(-2)+0.5} f_3(x)dx + e_4,$$

$$P(-1, -1) = \int_{-1-C_x(-1)-0.5}^{-1-C_x(-1)+0.5} f_3(x)dx + e_5,$$

$$P(0, -1) = \int_{0-C_x(-1)-0.5}^{0-C_x(-1)+0.5} f_3(x)dx + e_6,$$

$$P(1, -1) = \int_{1-C_x(-1)-0.5}^{1-C_x(-1)+0.5} f_3(x)dx + e_7,$$

$$P(2, -1) = \int_{2-C_x(-1)-0.5}^{2-C_x(-1)+0.5} f_3(x)dx + e_8,$$

$$P(-1, 0) = \int_{-1-0.5}^{-1+0.5} f_3(x)dx + e_9,$$

$$P(0, 0) = \int_{0-0.5}^{0+0.5} f_3(x)dx + e_{10},$$

$$P(1, 0) = \int_{1-0.5}^{1+0.5} f_3(x)dx + e_{11},$$

$$P(2, 0) = \int_{2-0.5}^{2+0.5} f_3(x)dx + e_{12},$$

$$P(-1, 1) = \int_{-1-C_x(1)-0.5}^{-1-C_x(1)+0.5} f_3(x)dx + e_{13},$$

$$P(0, 1) = \int_{0-C_x(1)-0.5}^{0-C_x(1)+0.5} f_3(x)dx + e_{14},$$

$$P(1, 1) = \int_{1-C_x(1)-0.5}^{1-C_x(1)+0.5} f_3(x)dx + e_{15},$$

$$P(2, 1) = \int_{2-C_x(1)-0.5}^{2-C_x(1)+0.5} f_3(x)dx + e_{16},$$

$$P(-1, 2) = \int_{-1-C_x(2)-0.5}^{-1-C_x(2)+0.5} f_3(x)dx + e_{17},$$

$$P(0, 2) = \int_{0-C_x(2)-0.5}^{0-C_x(2)+0.5} f_3(x)dx + e_{18},$$

$$P(1, 2) = \int_{1-C_x(2)-0.5}^{1-C_x(2)+0.5} f_3(x)dx + e_{19},$$

$$P(2, 2) = \int_{2-C_x(2)-0.5}^{2-C_x(2)+0.5} f_3(x)dx + e_{20}$$

Expression (48) is made up of 20 equations as with the above Expression (45). Accordingly, with the third method as with the second method, in the event that the number of the features $w_i$ of the approximation function $f_3(x)$ is less than 20, i.e., in the event that the approximation function $f_3(x)$ is a polynomial having the number of dimensions less than 19, for example, the features $w_i$ may be calculated with the least square method. Note that the specific solution of the least square method will be described later.

Figure 73:
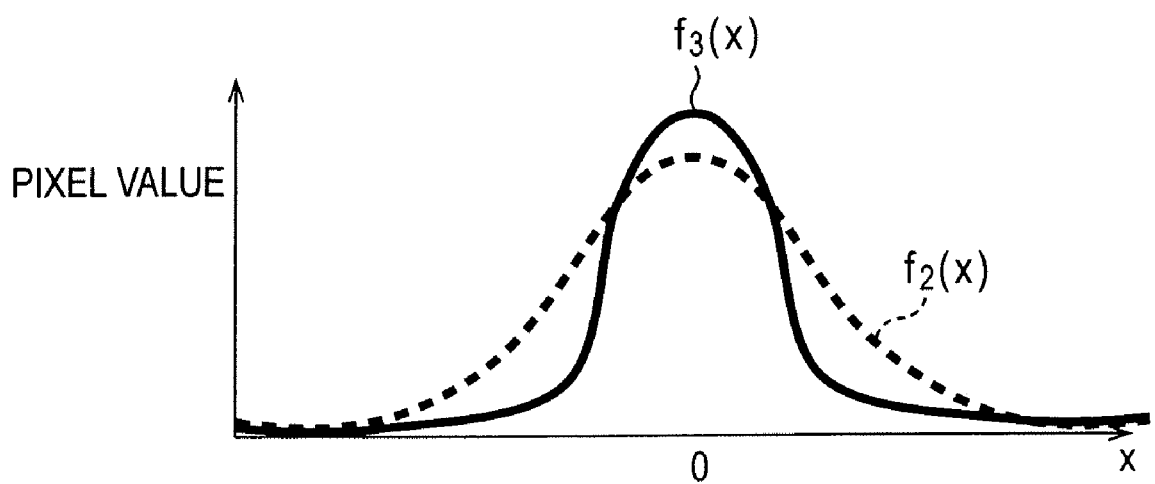
FIG. 73 is a diagram wherein an approximation function, approximating the actual world signals corresponding to the fine-line-inclusive data region shown in FIG. 65, is plotted on a graph, taking into consideration both the sensor integration properties and the spatial-direction continuity.

For example, if we say that the number of dimensions of the approximation function $f_3(x)$ is five, the approximation function $f_3(x)$ calculated with the least square method using Expression (48) (the approximation function $f_3(x)$ generated with the calculated features $w_i$) becomes a curve shown with the solid line in FIG. 73.

Note that in FIG. 73, the vertical axis represents pixel values, and the horizontal axis represents a relative position x from the pixel of interest.

As shown in FIG. 73, in the event that the approximation function $f_3(x)$ (a curve shown with a solid line in the drawing) generated with the third method is compared with the approximation function $f_2(x)$ (a curve shown with a dashed line in the drawing) generated with the second method, a pixel value at x=0 becomes great, and also the gradient of the curve creates a steep waveform. This is because details increase more than the input pixels, resulting in being unrelated to the resolution of the input pixels. That is to say, we can say that the approximation function $f_3(x)$ approximates the X cross-sectional waveform F(x). Accordingly, though not shown in the drawing, the approximation function $f_3(x)$ becomes a waveform closer to the X cross-sectional waveform F(x) than the approximation function $f_2(x)$.

Figure 74:
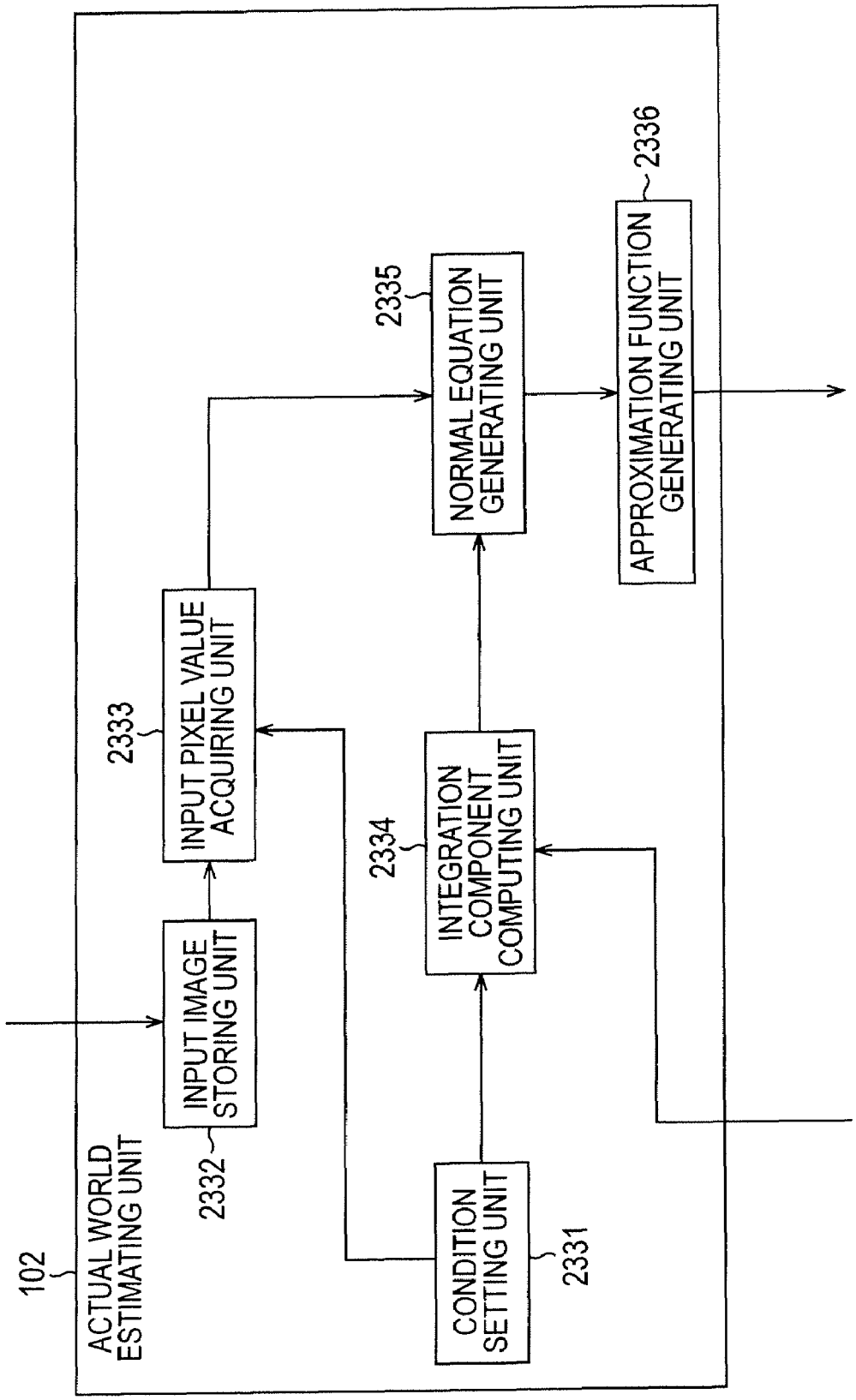
FIG. 74 is a block diagram for describing a configuration example of the actual world estimating unit using, of function approximation techniques having the principle shown in FIG. 58, primary polynomial approximation.

FIG. 74 represents a configuration example of the actual world estimating unit 102 employing such a one-dimensional approximating method.

In FIG. 74, the actual world estimating unit 102 estimates the X cross-sectional waveform F(x) by calculating the features $w_i$ using the above third method (least square method) for example, and generating the approximation function f(x) of the above Expression (39) using the calculated features $w_i$.

As shown in FIG. 74, the actual world estimating unit 102 includes a conditions setting unit 2331, input image storage unit 2332, input pixel value acquiring unit 2333, integral component calculation unit 2334, normal equation generating unit 2335, and approximation function generating unit 2336.

The conditions setting unit 2331 sets a pixel range (hereafter, referred to as a tap range) used for estimating the X cross-sectional waveform F(x) corresponding to a pixel of interest, and the number of dimensions n of the approximation function f(x).

The input image storage unit 2332 temporarily stores an input image (pixel values) from the sensor 2.

The input pixel value acquiring unit 2333 acquires, of the input images stored in the input image storage unit 2332, an input image region corresponding to the tap range set by the conditions setting unit 2231, and supplies this to the normal equation generating unit 2335 as an input pixel value table. That is to say, the input pixel value table is a table in which the respective pixel values of pixels included in the input image region are described. Note that a specific example of the input pixel value table will be described later.

Now, the actual world estimating unit 102 calculates the features $w_i$ of the approximation function f(x) with the least square method using the above Expression (46) and Expression (47) here, but the above Expression (46) can be represented such as the following Expression (49).

$$P(x, y) = \sum_{i=0}^{n} w_i \times \frac{(x - C_x(y) + 0.5)^{i+1} - (x - C_x(y) - 0.5)^{i+1}}{i+1} + e \quad (49)$$

-continued
$$= \sum_{i=0}^{n} w_i \times S_i(x_s, x_e) + e$$

In Expression (49), $S_i(x_s, x_e)$ represents the integral components of the i-dimensional term. That is to say, the integral components $S_i(x_s, x_e)$ are shown in the following Expression (50).

$$S_i(x_s, x_e) = \frac{x_e^{i+1} - x_s^{i+1}}{i+1} \quad (50)$$

The integral component calculation unit 2334 calculates the integral components $S_i(x_s, x_e)$.

Specifically, the integral components $S_i(x_s, x_e)$ (however, the value $x_s$ and value $x_e$ are values shown in the above Expression (46)) shown in Expression (50) may be calculated as long as the relative pixel positions (x, y), shift amount $C_x(y)$, and i of the i-dimensional terms are known. Also, of these, the relative pixel positions (x, y) are determined by the pixel of interest and the tap range, the shift amount $C_x(y)$ is determined by the angle θ (by the above Expression (41) and Expression (43)), and the range of i is determined by the number of dimensions n, respectively.

Accordingly, the integral component calculation unit 2334 calculates the integral components $S_i(x_s, x_e)$ based on the tap range and the number of dimensions set by the conditions setting unit 2331, and the angle θ of the data continuity information output from the data continuity detecting unit 101, and supplies the calculated results to the normal equation generating unit 2335 as an integral component table.

The normal equation generating unit 2335 generates the above Expression (46), i.e., a normal equation in the case of obtaining the features $w_i$ of the right side of Expression (49) with the least square method using the input pixel value table supplied from the input pixel value acquiring unit 2333, and the integral component table supplied from the integral component calculation unit 2334, and supplies this to the approximation function generating unit 2336 as a normal equation table. Note that a specific example of a normal equation will be described later.

The approximation function generating unit 2336 calculates the respective features $w_i$ of the above Expression (49) (i.e., the respective coefficients $w_i$ of the approximation function f(x) serving as a one-dimensional polynomial) by solving a normal equation included in the normal equation table supplied from the normal equation generating unit 2335 using the matrix solution, and outputs these to the image generating unit 103.

Next, description will be made regarding the actual world estimating processing (processing in step S102 in FIG. 29) of the actual world estimating unit 102 (FIG. 74) which employs the one-dimensional approximating method with reference to the flowchart in FIG. 75.

For example, let us say that an input image, which is a one-frame input image output from the sensor 2, including the fine-line-including data region 2302 in FIG. 60 described above has been already stored in the input image storage unit 2332. Also, let us say that the data continuity detecting unit 101 has subjected, at the continuity detection processing in step S101 (FIG. 29), the fine-line-including data region 2302 to the processing thereof, and has already output the angle θ as data continuity information.

Figure 75:
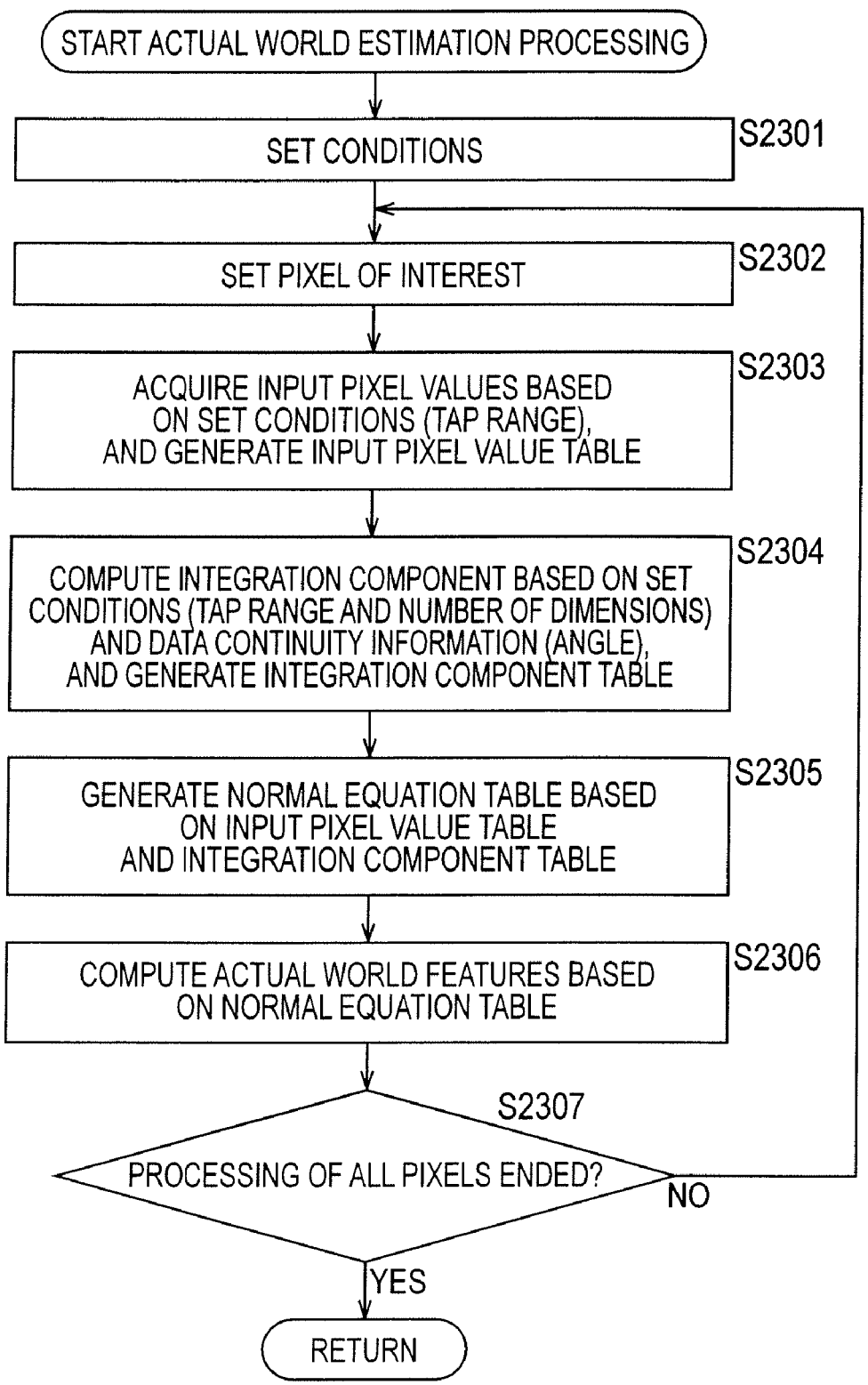
FIG. 75 is a flowchart for describing actual world estimation processing which the actual world estimating unit of the configuration shown in FIG. 74 executes.

In this case, the conditions setting unit 2331 sets conditions (a tap range and the number of dimensions) in step S2301 in FIG. 75.

Figure 76:
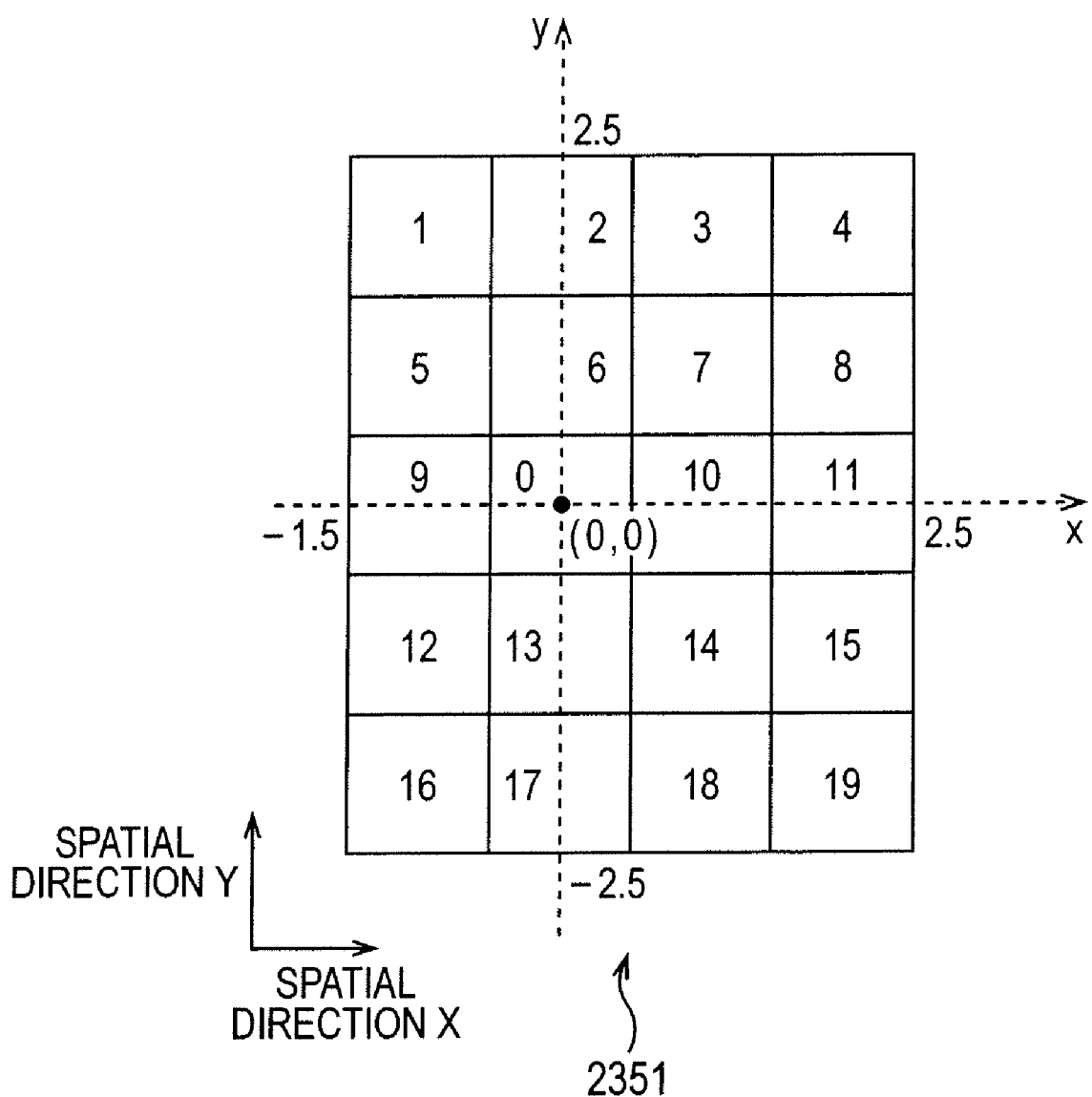
FIG. 76 is a diagram for describing a tap range.

For example, let us say that a tap range 2351 shown in FIG. 76 is set, and 5 dimensions are set as the number of dimensions.

That is to say, FIG. 76 is a diagram for describing an example of a tap range. In FIG. 76, the X direction and Y direction are the X direction and Y direction of the sensor 2 (FIG. 59) respectively. Also, the tap range 2351 represents a pixel group made up of 20 pixels in total (20 squares in the drawing) of 4 pixels in the X direction, and also 5 pixels in the Y direction.

Further, as shown in FIG. 76, let us say that a pixel of interest is set at the second pixel from the left and also the third pixel from the bottom in the drawing, of the tap range 2351. Also, let us say that each pixel is denoted with a number l such as shown in FIG. 76 (l is any integer value of 0 through 19) according to the relative pixel positions (x, y) from the pixel of interest (a coordinate value of a pixel-of-interest coordinates system wherein the center (0, 0) of the pixel of interest is taken as the origin).

Now, description will return to FIG. 75, wherein in step S2302, the conditions setting unit 2331 sets a pixel of interest.

In step S2303, the input pixel value acquiring unit 2333 acquires an input pixel value based on the condition (tap range) set by the conditions setting unit 2331, and generates an input pixel value table. That is to say, in this case, the input pixel value acquiring unit 2333 acquires the fine-line-including data region 2302 (FIG. 64), and generates a table made up of 20 input pixel values P(l) as an input pixel value table.

Note that in this case, the relation between the input pixel values P(l) and the above input pixel values P(x, y) is a relation shown in the following Expression (51). However, in Expression (51), the left side represents the input pixel values P(l), and the right side represents the input pixel values P(x, y).

$$P(0) = P(0, 0) \qquad (51)$$
$$P(1) = P(-1, 2)$$
$$P(2) = P(0, 2)$$
$$P(3) = P(1, 2)$$
$$P(4) = P(2, 2)$$
$$P(5) = P(-1, 1)$$
$$P(6) = P(0, 1)$$
$$P(7) = P(1, 1)$$
$$P(8) = P(2, 1)$$
$$P(9) = P(-1, 0)$$
$$P(10) = P(1, 0)$$
$$P(11) = P(2, 0)$$
$$P(12) = P(-1, -1)$$
$$P(13) = P(0, -1)$$
$$P(14) = P(1, -1)$$
$$P(15) = P(2, -1)$$
$$P(16) = P(-1, -2)$$
$$P(17) = P(0, -2)$$

-continued
$$P(18) = P(1, -2)$$
$$P(19) = P(2, -2)$$

In step S2304, the integral component calculation unit 2334 calculates integral components based on the conditions (a tap range and the number of dimensions) set by the conditions setting unit 2331, and the data continuity information (angle θ) supplied from the data continuity detecting unit 101, and generates an integral component table.

In this case, as described above, the input pixel values are not P(x, y) but P(l), and are acquired as the value of a pixel number l, so the integral component calculation unit 2334 calculates the above integral components $S_i(x_s, x_e)$ in Expression (50) as a function of l such as the integral components $S_i(l)$ shown in the left side of the following Expression (52).

$$S_i(l) = S_i(x_s, x_e) \qquad (52)$$

Specifically, in this case, the integral components $S_i(l)$ shown in the following Expression (53) are calculated.

$$S_i(0) = S_i(-0.5, 0.5) \qquad (53)$$
$$S_i(1) = S_i(-1.5 - C_x(2), -0.5 - C_x(2))$$
$$S_i(2) = S_i(-0.5 - C_x(2), 0.5 - C_x(2))$$
$$S_i(3) = S_i(0.5 - C_x(2), 1.5 - C_x(2))$$
$$S_i(4) = S_i(1.5 - C_x(2), 2.5 - C_x(2))$$
$$S_i(5) = S_i(-1.5 - C_x(1), -0.5 - C_x(1))$$
$$S_i(6) = S_i(-0.5 - C_x(1), 0.5 - C_x(1))$$
$$S_i(7) = S_i(0.5 - C_x(1), 1.5 - C_x(1))$$
$$S_i(8) = S_i(1.5 - C_x(1), 2.5 - C_x(1))$$
$$S_i(9) = S_i(-1.5, -0.5)$$
$$S_i(10) = S_i(0.5, 1.5)$$
$$S_i(11) = S_i(1.5, 2.5)$$
$$S_i(12) = S_i(-1.5 - C_x(-1), -0.5 - C_x(-1))$$
$$S_i(13) = S_i(-0.5 - C_x(-1), 0.5 - C_x(-1))$$
$$S_i(14) = S_i(0.5 - C_x(-1), 1.5 - C_x(-1))$$
$$S_i(15) = S_i(1.5 - C_x(-1), 2.5 - C_x(-1))$$
$$S_i(16) = S_i(-1.5 - C_x(-2), -0.5 - C_x(-2))$$
$$S_i(17) = S_i(-0.5 - C_x(-2), 0.5 - C_x(-2))$$
$$S_i(18) = S_i(0.5 - C_x(-2), 1.5 - C_x(-2))$$
$$S_i(19) = S_i(1.5 - C_x(-2), 2.5 - C_x(-2))$$

Note that in Expression (53), the left side represents the integral components $S_i(l)$, and the right side represents the integral components $S_i(x_s, x_e)$. That is to say, in this case, i is 0 through 5, and accordingly, the 120 $S_i(l)$ in total of the 20 $S_0(l)$, 20 $S_1(l)$, 20 $S_2(l)$ 20 $S_3(l)$, 20 $S_4(l)$, and 20 $S_5(l)$ are calculated.

More specifically, first the integral component calculation unit 2334 calculates each of the shift amounts $C_x(-2)$, $C_x(-1)$, $C_x(1)$, and $C_x(2)$ using the angle θ supplied from the data continuity detecting unit 101. Next, the integral component calculation unit 2334 calculates each of the 20 integral components $S_i(x_s, x_e)$ shown in the right side of Expression (52) regarding each of i=0 through 5 using the calculated shift amounts $C_x(-2)$, $C_x(-1)$, $C_x(1)$, and $C_x(2)$. That is to say, the 120 integral components $S_i(x_s, x_e)$ are calculated. Note that with this calculation of the integral components $S_i(x_s, x_e)$, the above Expression (50) is used. Subsequently, the integral component calculation unit 2334 converts each of the calculated 120 integral components $S_i(x_s, x_e)$ into the corresponding integral components $S_i(l)$ in accordance with Expression (53), and generates an integral component table including the converted 120 integral components $S_i(l)$.

Note that the sequence of the processing in step S2303 and the processing in step S2304 is not restricted to the example in FIG. 75, the processing in step S2304 may be executed first, or the processing in step S2303 and the processing in step S2304 may be executed simultaneously.

Next, in step S2305, the normal equation generating unit 2335 generates a normal equation table based on the input pixel value table generated by the input pixel value acquiring unit 2333 at the processing in step S2303, and the integral component table generated by the integral component calculation unit 2334 at the processing in step S2304.

Specifically, in this case, the features $w_i$ of the following Expression (54) corresponding to the above Expression (49) are calculated using the least square method. A normal equation corresponding to this is represented as the following Expression (55).

$$P(l) = \sum_{i=0}^{n} w_i \times S_i(l) + e \quad (54)$$

$$\begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \begin{pmatrix} w_0 \\ w_1 \\ \vdots \\ w_n \end{pmatrix} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (55)$$

Note that in Expression (55), L represents the maximum value of the pixel number l in the tap range. n represents the number of dimensions of the approximation function f(x) serving as a polynomial. Specifically, in this case, n=5, and L=19.

If we define each matrix of the normal equation shown in Expression (55) as the following Expressions (56) through (58), the normal equation is represented as the following Expression (59).

$$S_{MAT} = \begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \quad (56)$$

$$W_{MAT} = \begin{pmatrix} w_0 \\ w_1 \\ \vdots \\ w_n \end{pmatrix} \quad (57)$$

$$P_{MAT} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (58)$$

$$S_{MAT} W_{MAT} = P_{MAT} \quad (59)$$

As shown in Expression (57), the respective components of the matrix $W_{MAT}$ are the features $w_i$ to be obtained. Accordingly, in Expression (59), if the matrix $S_{MAT}$ of the left side and the matrix $P_{MAT}$ of the right side are determined, the matrix $W_{MAT}$ (i.e., features $w_i$) may be calculated with the matrix solution.

Specifically, as shown in Expression (56), the respective components of the matrix $S_{MAT}$ may be calculated as long as the above integral components $S_i(l)$ are known. The integral components $S_i(l)$ are included in the integral component table supplied from the integral component calculation unit 2334, so the normal equation generating unit 2335 can calculate each component of the matrix $S_{MAT}$ using the integral component table.

Also, as shown in Expression (58), the respective components of the matrix $P_{MAT}$ may be calculated as long as the integral components $S_i(l)$ and the input pixel values P(l) are known. The integral components $S_i(l)$ is the same as those included in the respective components of the matrix $S_{MAT}$, also the input pixel values P(l) are included in the input pixel value table supplied from the input pixel value acquiring unit 2333, so the normal equation generating unit 2335 can calculate each component of the matrix $P_{MAT}$ using the integral component table and input pixel value table.

Thus, the normal equation generating unit 2335 calculates each component of the matrix $S_{MAT}$ and matrix $P_{MAT}$, and outputs the calculated results (each component of the matrix $S_{MAT}$ and matrix $P_{MAT}$) to the approximation function generating unit 2336 as a normal equation table.

Upon the normal equation table being output from the normal equation generating unit 2335, in step S2306, the approximation function generating unit 2336 calculates the features $w_i$ (i.e., the coefficients $w_i$ of the approximation function f(x) serving as a one-dimensional polynomial) serving as the respective components of the matrix $W_{MAT}$ in the above Expression (59) based on the normal equation table.

Specifically, the normal equation in the above Expression (59) can be transformed as the following Expression (60).

$$| W_{MAT} = S_{MAT}^{-1} P_{MAT} \qquad (60)$$

In Expression (60), the respective components of the matrix $W_{MAT}$ in the left side are the features $w_i$ to be obtained. The respective components regarding the matrix $S_{MAT}$ and matrix $P_{MAT}$ are included in the normal equation table supplied from the normal equation generating unit 2335. Accordingly, the approximation function generating unit 2336 calculates the matrix $W_{MAT}$ by calculating the matrix in the right side of Expression (60) using the normal equation table, and outputs the calculated results (features $w_i$) to the image generating unit 103.

In step S2307, the approximation function generating unit 2336 determines regarding whether or not the processing of all the pixels has been completed.

In step S2307, in the event that determination is made that the processing of all the pixels has not been completed, the processing returns to step S2302, wherein the subsequent processing is repeatedly performed. That is to say, the pixels that have not become a pixel of interest are sequentially taken as a pixel of interest, and the processing in step S2302 through S2307 is repeatedly performed.

In the event that the processing of all the pixels has been completed (in step S2307, in the event that determination is made that the processing of all the pixels has been completed), the estimating processing of the actual world 1 ends.

Note that the waveform of the approximation function f(x) generated with the coefficients (features) $w_i$ thus calculated becomes a waveform such as the approximation function $f_3(x)$ in FIG. 73 described above.

Thus, with the one-dimensional approximating method, the features of the approximation function f(x) serving as a one-dimensional polynomial are calculated under the assumption, for example, that a waveform having the same form as the one-dimensional X cross-sectional waveform F(x) is continuous in the direction of continuity. Accordingly, with the one-dimensional approximating method, the features of the approximation function f(x) can be calculated with less amount of calculation processing than other function approximating methods.

Next, description will be made regarding the second function approximating method with reference to FIG. 77 through FIG. 83.

Figure 77:
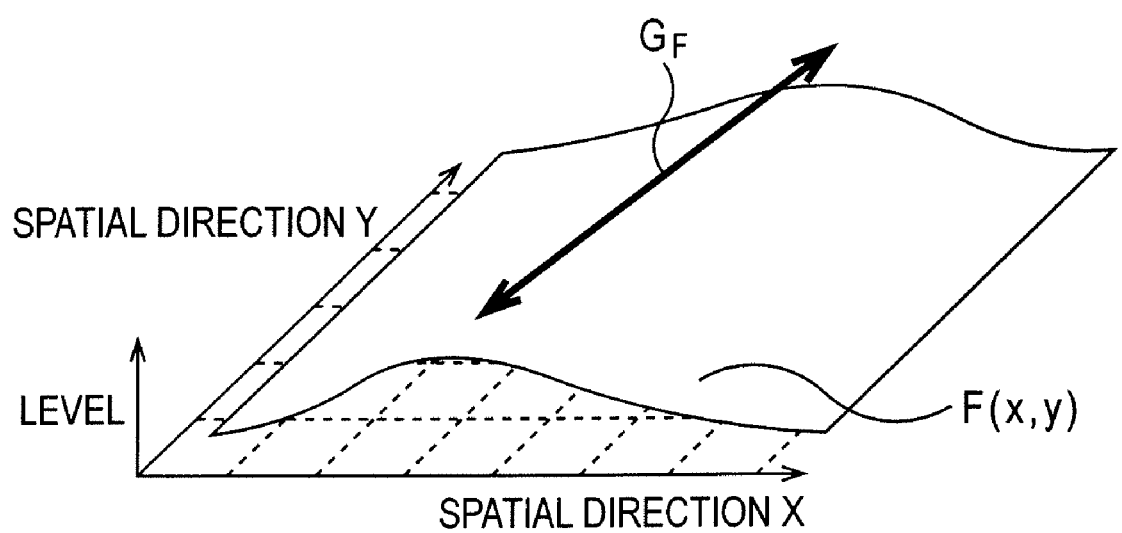
FIG. 77 is a diagram for describing actual world signals having continuity in the spatial direction.

That is to say, the second function approximating method is a method wherein the light signal in the actual world 1 having continuity in the spatial direction represented with the gradient $G_F$ such as shown in FIG. 77 for example is regarded as a waveform F(x, y) on the X-Y plane (on the plane level in the X direction serving as one direction of the spatial directions, and in the Y direction orthogonal to the X direction), and the waveform F(x, y) is approximated with the approximation function f(x, y) serving as a two-dimensional polynomial, thereby estimating the waveform F(x, y). Accordingly, hereafter, the second function approximating method is referred to as a two-dimensional polynomial approximating method.

Note that in FIG. 77, the horizontal direction represents the X direction serving as one direction of the spatial directions, the upper right direction represents the Y direction serving as the other direction of the spatial directions, and the vertical direction represents the level of light respectively. $G_F$ represents the gradient as continuity in the spatial direction.

Figure 78:
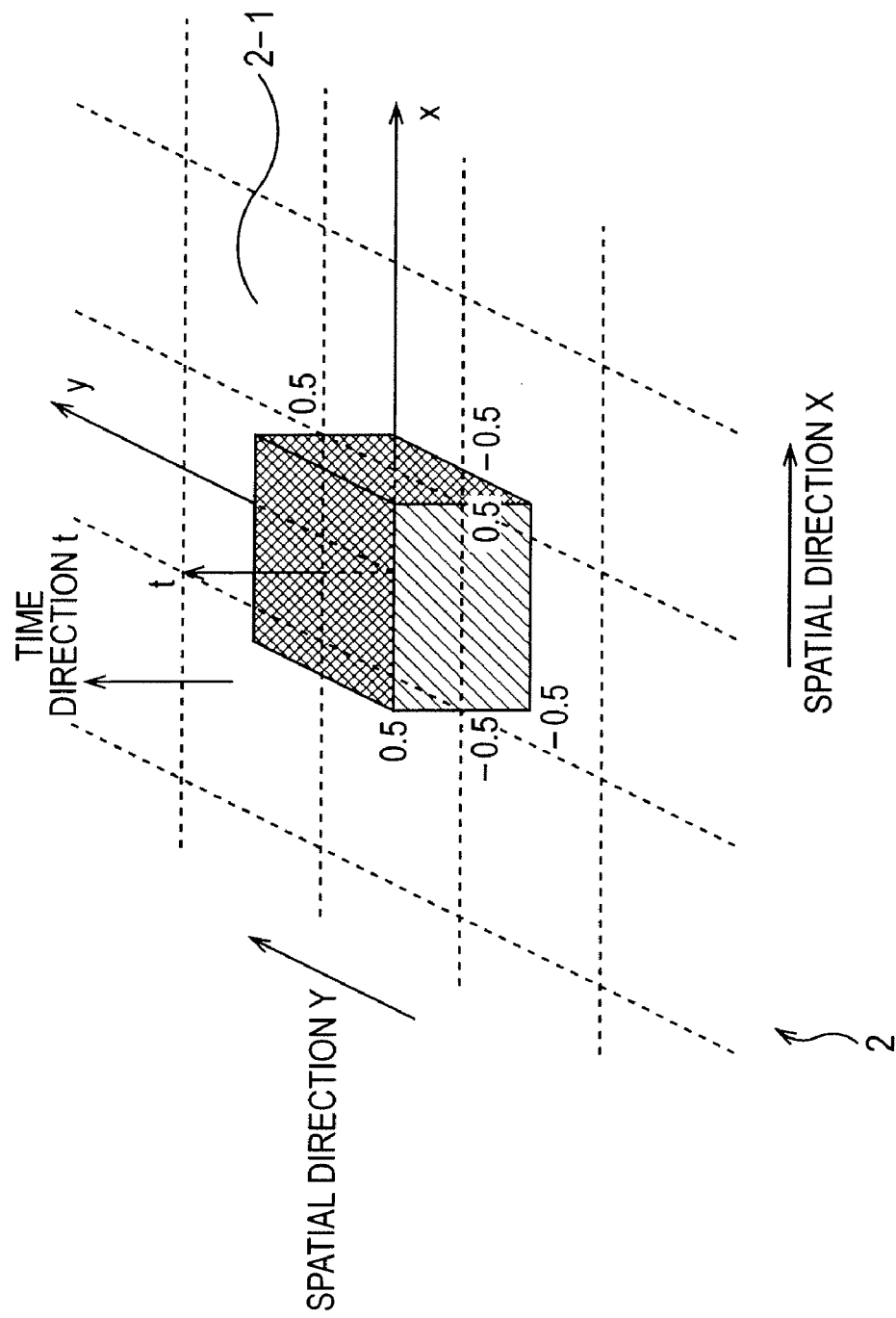
FIG. 78 is a diagram for describing integration effects in the event that the sensor is a CCD.

Also, with description of the two-dimensional polynomial approximating method, let us say that the sensor 2 is a CCD made up of the multiple detecting elements 2-1 disposed on the plane thereof, such as shown in FIG. 78.

With the example in FIG. 78, the direction in parallel with a predetermined side of the detecting elements 2-1 is taken as the X direction serving as one direction of the spatial directions, and the direction orthogonal to the X direction is taken as the Y direction serving as the other direction of the spatial directions. The direction orthogonal to the X-Y plane is taken as the t direction serving as the temporal direction.

Also, with the example in FIG. 78, the spatial shape of the respective detecting elements 2-1 of the sensor 2 is taken as a square of which one side is 1 in length. The shutter time (exposure time) of the sensor 2 is taken as 1.

Further, with the example in FIG. 78, the center of one certain detecting element 2-1 of the sensor 2 is taken as the origin (the position in the X direction is x=0, and the position in the Y direction is y=0) in the spatial directions (X direction and Y direction), and also the intermediate point-in-time of the exposure time is taken as the origin (the position in the t direction is t=0) in the temporal direction (t direction).

In this case, the detecting element 2-1 of which the center is in the origin (x=0, y=0) in the spatial directions subjects the light signal function F(x, y, t) to integration with a range of −0.5 through 0.5 in the X direction, with a range of −0.5 through 0.5 in the Y direction, and with a range of −0.5 through 0.5 in the t direction, and outputs the integral value as the pixel value P.

That is to say, the pixel value P output from the detecting element 2-1 of which the center is in the origin in the spatial directions is represented with the following Expression (61).

$$P = \int_{-0.5}^{+0.5} \int_{-0.5}^{+0.5} \int_{-0.5}^{+0.5} F(x, y, t) dx\, dy\, dt \qquad (61)$$

Similarly, the other detecting elements 2-1 output the pixel value P shown in Expression (61) by taking the center of the detecting element 2-1 to be processed as the origin in the spatial directions.

Incidentally, as described above, the two-dimensional polynomial approximating method is a method wherein the light signal in the actual world 1 is handled as a waveform F(x, y) such as shown in FIG. 77 for example, and the two-dimensional waveform F(x, y) is approximated with the approximation function f(x, y) serving as a two-dimensional polynomial.

First, description will be made regarding a method representing such the approximation function f(x, y) with a two-dimensional polynomial.

As described above, the light signal in the actual world 1 is represented with the light signal function F(x, y, t) of which variables are the position on the three-dimensional space x, y, and z, and point-in-time t. This light signal function F(x, y, t), i.e., a one-dimensional waveform projected in the X direction at an arbitrary position y in the Y direction is referred to as an X cross-sectional waveform F(x), here.

When paying attention to this X cross-sectional waveform F(x), in the event that the signal in the actual world 1 has continuity in a certain direction in the spatial directions, it can be conceived that a waveform having the same form as the X cross-sectional waveform F(x) continues in the continuity direction. For example, with the example in FIG. 77, a waveform having the same form as the X cross-sectional waveform F(x) continues in the direction of the gradient $G_F$. In other words, it can be said that the waveform F(x, y) is formed by a waveform having the same form as the X cross-sectional waveform F(x) continuing in the direction of the gradient $G_F$.

Accordingly, the approximation function f(x, y) can be represented with a two-dimensional polynomial by considering that the waveform of the approximation function f(x, y) approximating the waveform F(x, y) is formed by a waveform having the same form as the approximation function f(x) approximating the X cross-sectional F(x) continuing.

Description will be made in more detail regarding the representing method of the approximation function f(x, y).

For example, let us say that the light signal in the actual world 1 such as shown in FIG. 77 described above, i.e., a light signal having continuity in the spatial direction represented with the gradient $G_F$ is detected by the sensor 2 (FIG. 78), and output as an input image (pixel value).

Figure 79:
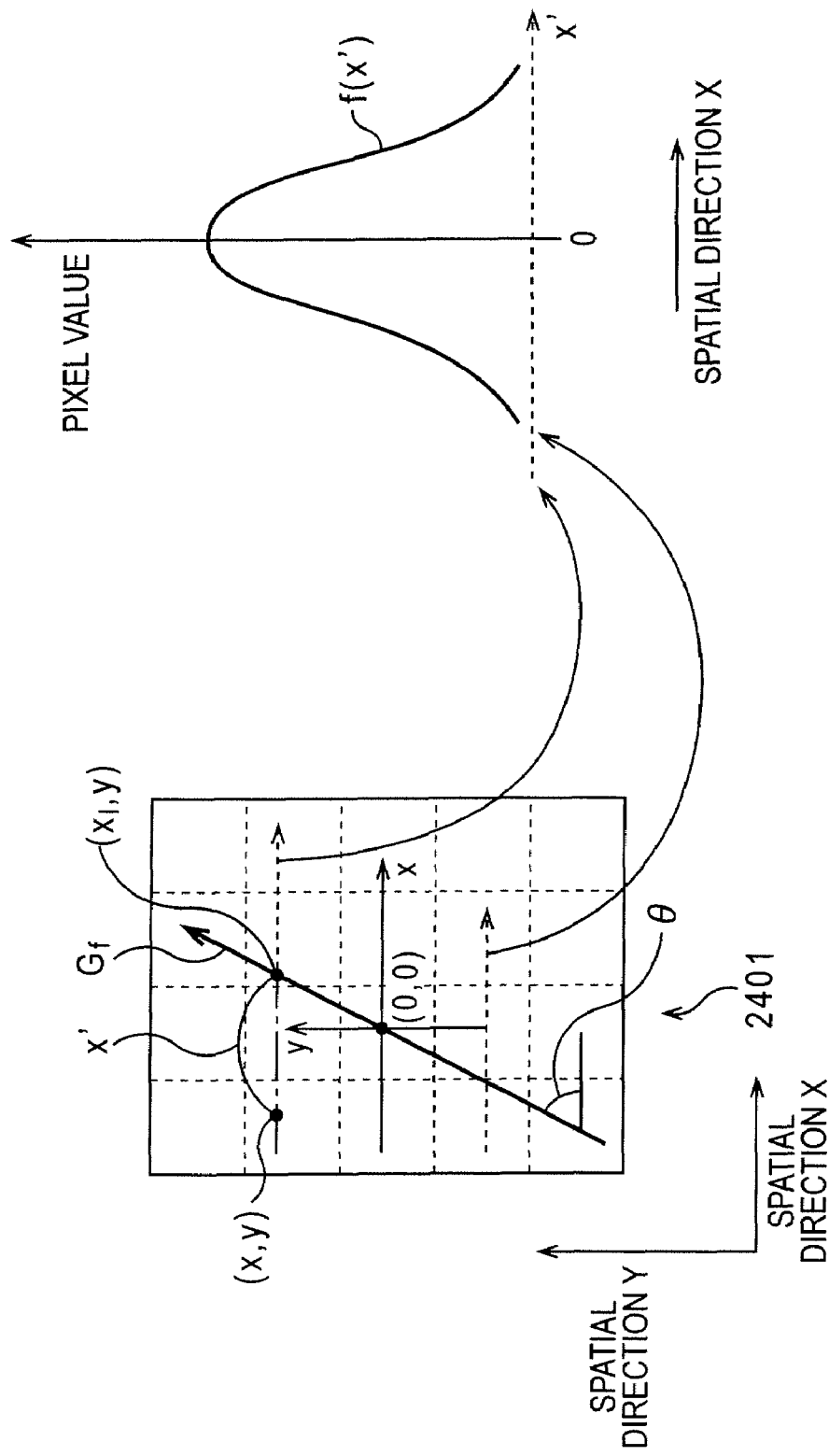
FIG. 79 is a diagram for describing distance in the cross-sectional direction.

Further, let us say that as shown in FIG. 79, the data continuity detecting unit 101 (FIG. 3) subjects an input image region 2401 made up of 20 pixels (in the drawing, 20 squares represented with dashed line) in total of 4 pixels in the X direction and also 5 pixels in the Y direction, of this input image, to the processing thereof, and outputs an angle θ (angle θ generated between the direction of data continuity represented with the gradient $G_f$ corresponding to the gradient $G_F$, and the X direction) as one of the data continuity information.

Note that with the input image region 2401, the horizontal direction in the drawing represents the X direction serving as one direction in the spatial directions, and the vertical direction in the drawing represents the Y direction serving as the other direction of the spatial directions.

Also, in FIG. 79, an (x, y) coordinates system is set such that a pixel in the second pixel from the left, and also the third pixel from the bottom is taken as a pixel of interest, and the center of the pixel of interest is taken as the origin (0, 0). A relative distance (hereafter, referred to as a cross-sectional direction distance) in the X direction as to the straight line (straight line having the gradient $G_f$ representing the direction of data continuity) having an angle θ passing through the origin (0, 0) is described as x'.

Further, in FIG. 79, the graph on the right side is a function wherein an X cross-sectional waveform F(x') is approximated, which represents an approximation function f(x') serving as an n-dimensional (n is an arbitrary integer) polynomial. Of the axes in the graph on the right side, the axis in the horizontal direction in the drawing represents a cross-sectional direction distance, and the axis in the vertical direction in the drawing represents pixel values.

In this case, the approximation function f(x') shown in FIG. 79 is an n-dimensional polynomial, so is represented as the following Expression (62).

$$f(x') = w_0 + w_1 x' + w_2 x'^2 + \ldots + w_n x'^n = \sum_{i=0}^{n} w_i x'^i \tag{62}$$

Also, since the angle θ is determined, the straight line having angle θ passing through the origin (0, 0) is uniquely determined, and a position $x_1$ in the X direction of the straight line at an arbitrary position y in the Y direction is represented as the following Expression (63). However, in Expression (63), s represents cot θ (=1□□□θ).

$$x_l = s \times y \tag{63}$$

That is to say, as shown in FIG. 79, a point on the straight line corresponding to continuity of data represented with the gradient $G_f$ is represented with a coordinate value ($x_1$, y).

The cross-sectional direction distance x' is represented as the following Expression (64) using Expression (63).

$$x' = x - x_l = x - s \times y \tag{64}$$

Accordingly, the approximation function f(x, y) at an arbitrary position (x, y) within the input image region 2401 is represented as the following Expression (65) using Expression (62) and Expression (64).

$$f(x, y) = \sum_{i=0}^{n} w_i (x - s \times y)^i \tag{65}$$

Note that in Expression (65), $w_i$ represents coefficients of the approximation function f(x, y). Note that the coefficients $w_i$ of the approximation function f including the approximation function f(x, y) can be evaluated as the features of the approximation function f. Accordingly, the coefficients $w_i$ of the approximation function f are also referred to as the features $w_i$ of the approximation function f.

Thus, the approximation function f(x, y) having a two-dimensional waveform can be represented as the polynomial of Expression (65) as long as the angle θ is known.

Accordingly, if the actual world estimating unit 102 can calculate the features $w_i$ of Expression (65), the actual world estimating unit 102 can estimate the waveform F(x, y) such as shown in FIG. 77.

Consequently, hereafter, description will be made regarding a method for calculating the features $w_i$ of Expression (65).

That is to say, upon the approximation function f(x, y) represented with Expression (65) being subjected to integration with an integral range (integral range in the spatial direction) corresponding to a pixel (the detecting element 2-1 of the sensor 2 (FIG. 78)), the integral value becomes the estimated value regarding the pixel value of the pixel. It is the following Expression (66) that this is represented with an equation. Note that with the two-dimensional polynomial approximating method, the temporal direction t is regarded as a constant value, so Expression (66) is taken as an equation of which variables are the positions x and y in the spatial directions (X direction and Y direction).

$$P(x, y) = \int_{y-0.5}^{y+0.5} \int_{x-0.5}^{x+0.5} \sum_{i=0}^{n} w_i (x - s \times y)^i + e \tag{66}$$

In Expression (66), P(x, y) represents the pixel value of a pixel of which the center position is in a position (x, y) (relative position (x, y) from the pixel of interest) of an input image from the sensor 2. Also, e represents a margin of error.

Thus, with the two-dimensional polynomial approximating method, the relation between the input pixel value P(x, y) and the approximation function f(x, y) serving as a two-dimensional polynomial can be represented with Expression (66), and accordingly, the actual world estimating unit 102 can estimate the two-dimensional function F(x, y) (waveform F(x, y) wherein the light signal in the actual world 1 having continuity in the spatial direction represented with the gradient $G_F$ (FIG. 77) is represented focusing attention on the spatial direction) by calculating the features $w_i$ with, for example, the least square method or the like using Expression

(66) (by generating the approximation function f(x, y) by substituting the calculated features $w_i$ for Expression (64)).

Figure 80:
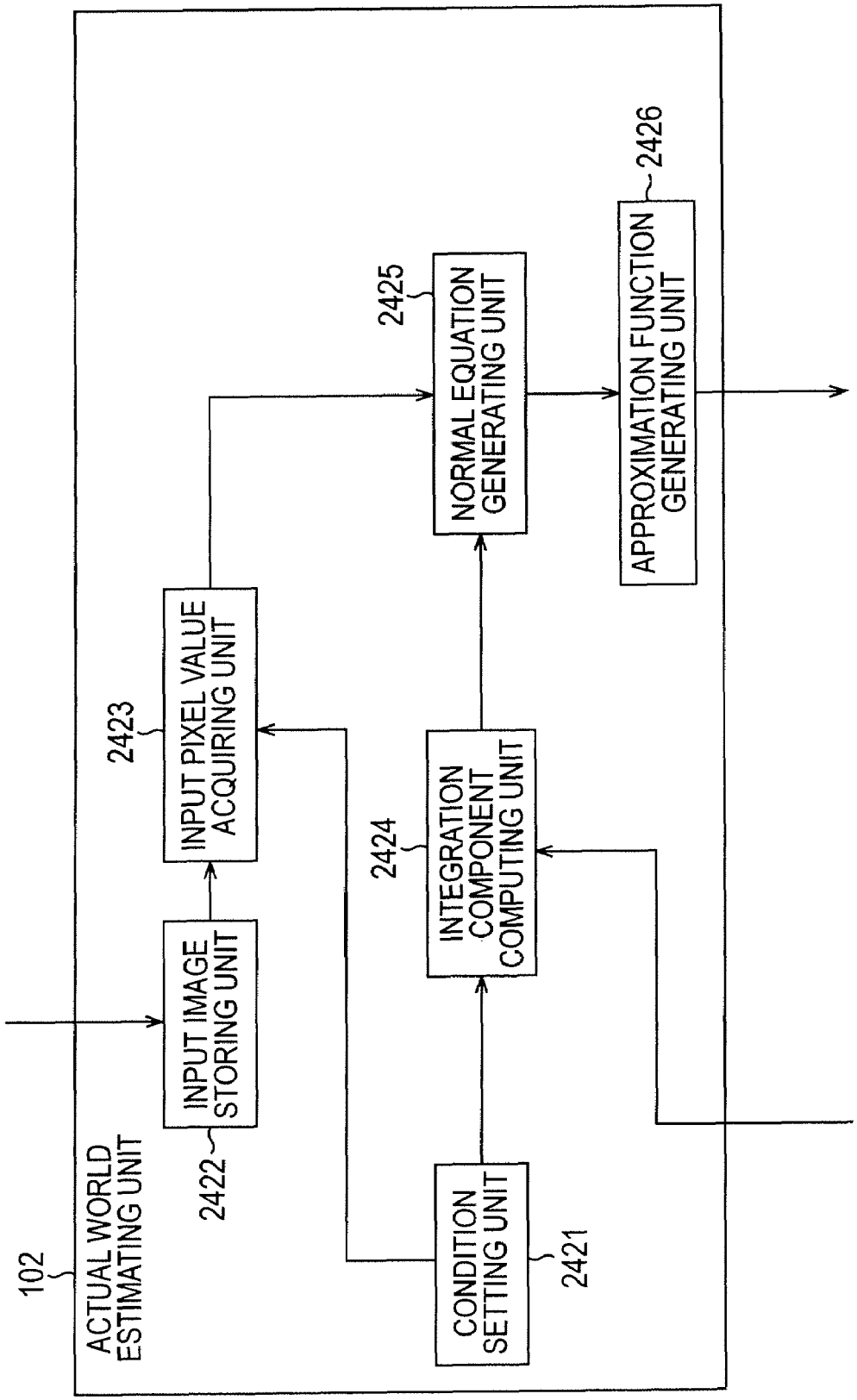
FIG. 80 is a block diagram for describing a configuration example of the actual world estimating unit using, of function approximation techniques having the principle shown in FIG. 58, quadratic polynomial approximation.

FIG. 80 represents a configuration example of the actual world estimating unit 102 employing such a two-dimensional polynomial approximating method.

As shown in FIG. 80, the actual world estimating unit 102 includes a conditions setting unit 2421, input image storage unit 2422, input pixel value acquiring unit 2423, integral component calculation unit 2424, normal equation generating unit 2425, and approximation function generating unit 2426.

The conditions setting unit 2421 sets a pixel range (tap range) used for estimating the function F(x, y) corresponding to a pixel of interest, and the number of dimensions n of the approximation function f(x, y).

The input image storage unit 2422 temporarily stores an input image (pixel values) from the sensor 2.

The input pixel value acquiring unit 2423 acquires, of the input images stored in the input image storage unit 2422, an input image region corresponding to the tap range set by the conditions setting unit 2421, and supplies this to the normal equation generating unit 2425 as an input pixel value table. That is to say, the input pixel value table is a table in which the respective pixel values of pixels included in the input image region are described. Note that a specific example of the input pixel value table will be described later.

Incidentally, as described above, the actual world estimating unit 102 employing the two-dimensional approximating method calculates the features $w_i$ of the approximation function f(x, y) represented with the above Expression (65) by solving the above Expression (66) using the least square method.

Expression (66) can be represented as the following Expression (71) by using the following Expression (70) obtained by the following Expressions (67) through (69).

$$\int x^i dx = \frac{x^{i+1}}{i+1} \tag{67}$$

$$\int (x - s \times y)^i dx = \frac{(x - s \times y)^{i+1}}{(i+1)} \tag{68}$$

$$\int (x - s \times y)^i dy = \frac{(x - s \times y)^{i+1}}{s(i+1)} \tag{69}$$

$$\int_{y-0.5}^{y+0.5} \int_{x-0.5}^{x+0.5} (x - s \times y)^i dx\, dy = \int_{y-0.5}^{y+0.5} \left[ \frac{(x - s \times y)^{i+1}}{(i+1)} \right]_{x-0.5}^{x+0.5} dy = \tag{70}$$

$$\int_{y-0.5}^{y+0.5} \frac{(x+0.5 - s \times y)^{i+1} - (x-0.5 - s \times y)^{i+1}}{i+1} dy =$$

$$\left[ \frac{(x+0.5 - s \times y)^{i+2}}{s(i+1)(i+2)} \right]_{y-0.5}^{y+0.5} - \left[ \frac{(x-0.5 - s \times y)^{i+2}}{s(i+1)(i+2)} \right]_{y-0.5}^{y+0.5} =$$

$$\frac{(x+0.5 - s \times y + 0.5s)^{i+2} - (x+0.5 - s \times y - 0.5s)^{i+2} - (x-0.5 - s \times y + 0.5s)^{i+2} + (x-0.5 - s \times y - 0.5s)^{i+2}}{s(i+1)(i+2)}$$

$$P(x, y) = \sum_{i=0}^{n} \frac{w_i}{s(i+1)(i+2)} \{(x+0.5 - s \times y + 0.5s)^{i+2} - \tag{71}$$

$$(x+0.5 - s \times y - 0.5s)^{i+2} - (x-0.5 - s \times y + 0.5s)^{i+2} +$$

$$(x-0.5 - s \times y - 0.5s)^{i+2}\} + e$$

$$= \sum_{i=0}^{n} w_i s_i(x-0.5, x+0.5, y-0.5, y+0.5) + e$$

In Expression (71), $S_i(x-0.5, x+0.5, y-0.5, y+0.5)$ represents the integral components of i-dimensional terms. That is to say, the integral components $S_i(x-0.5, x+0.5, y-0.5, y+0.5)$ are as shown in the following Expression (72).

$$s_i\begin{pmatrix} x-0.5, x+0.5, \\ y-0.5, y+0.5 \end{pmatrix} = \tag{72}$$

$$\frac{(x+0.5 - s \times y + 0.5s)^{i+2} - (x+0.5 - s \times y - 0.5s)^{i+2} - (x-0.5 - s \times y + 0.5s)^{i+2} + (x-0.5 - s \times y - 0.5s)^{i+2}}{s(i+1)(i+2)}$$

The integral component calculation unit 2424 calculates the integral components $S_i(x-0.5, x+0.5, y-0.5, y+0.5)$.

Specifically, the integral components $S_i(x-0.5, x+0.5, y-0.5, y+0.5)$ shown in Expression (72) can be calculated as long as the relative pixel positions (x, y), the variable s and i of i-dimensional terms in the above Expression (65) are known. Of these, the relative pixel positions (x, y) are determined with a pixel of interest, and a tap range, the variable s is cot θ, which is determined with the angle θ, and the range of i is determined with the number of dimensions n respectively.

Accordingly, the integral component calculation unit 2424 calculates the integral components $S_i(x-0.5, x+0.5, y-0.5, y+0.5)$ based on the tap range and the number of dimensions set by the conditions setting unit 2421, and the angle θ of the data continuity information output from the data continuity detecting unit 101, and supplies the calculated results to the normal equation generating unit 2425 as an integral component table.

The normal equation generating unit 2425 generates a normal equation in the case of obtaining the above Expression (66), i.e., Expression (71) by the least square method using the input pixel value table supplied from the input pixel value acquiring unit 2423, and the integral component table supplied from the integral component calculation unit 2424, and outputs this to the approximation function generating unit 2426 as a normal equation table. Note that a specific example of a normal equation will be described later.

The approximation function generating unit 2426 calculates the respective features $w_i$ of the above Expression (66) (i.e., the coefficients $w_i$ of the approximation function f(x, y) serving as a two-dimensional polynomial) by solving the normal equation included in the normal equation table supplied from the normal equation generating unit 2425 using the matrix solution, and output these to the image generating unit 103.

Next, description will be made regarding the actual world estimating processing (processing in step S102 in FIG. 29) to which the two-dimensional polynomial approximating method is applied, with reference to the flowchart in FIG. 81.

For example, let us say that the light signal in the actual world 1 having continuity in the spatial direction represented with the gradient $G_F$ has been detected by the sensor 2 (FIG. 78), and has been stored in the input image storage unit 2422 as an input image corresponding to one frame. Also, let us say that the data continuity detecting unit 101 has subjected the region 2401 shown in FIG. 79 described above of the input image to processing in the continuity detecting processing in step S101 (FIG. 29), and has output the angle θ as data continuity information.

In this case, in step S2401, the conditions setting unit 2421 sets conditions (a tap range and the number of dimensions).

Figure 82:
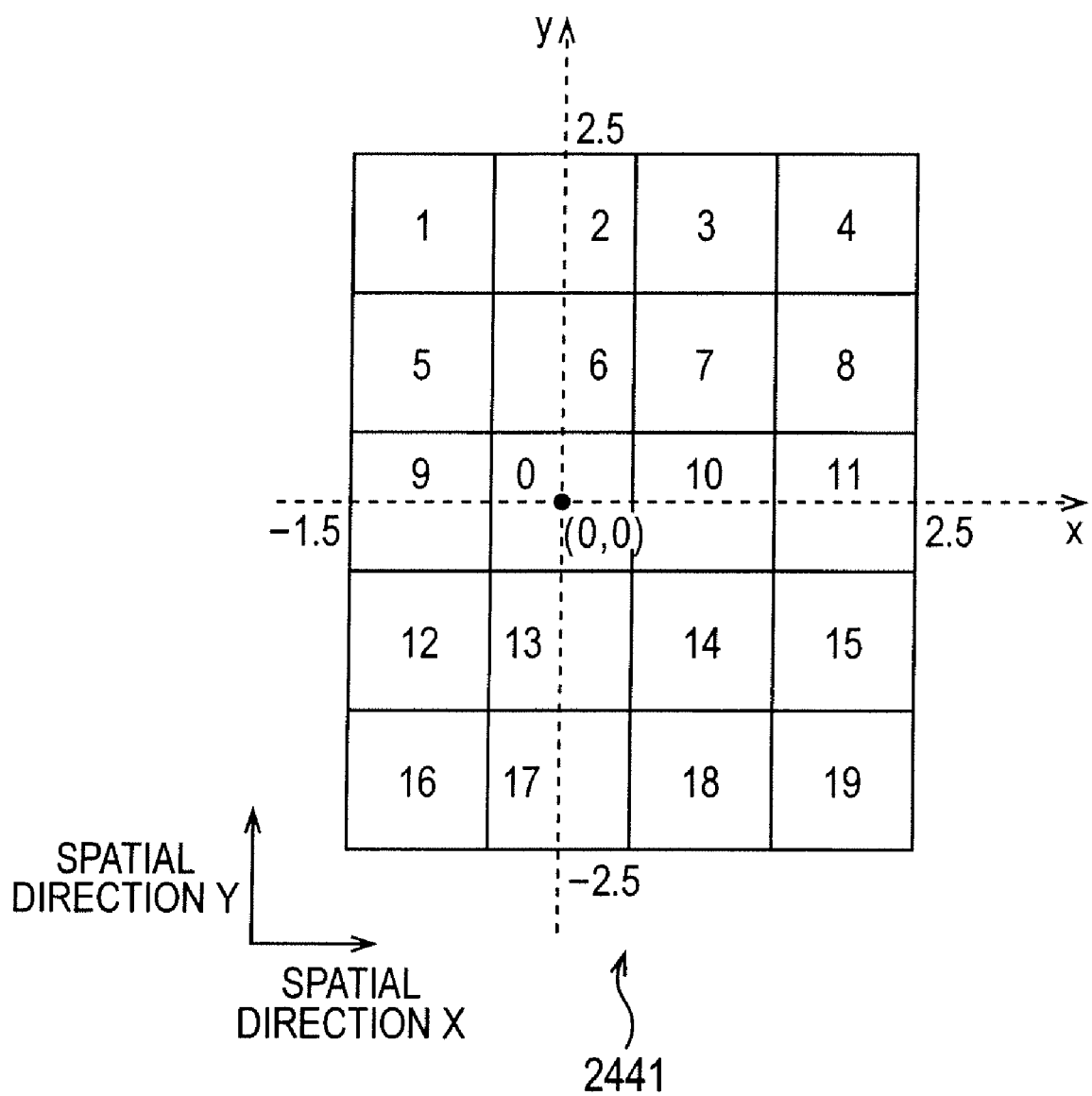
FIG. 82 is a diagram for describing a tap range.

For example, let us say that a tap range 2441 shown in FIG. 82 has been set, and also 5 has been set as the number of dimensions.

FIG. 82 is a diagram for describing an example of a tap range. In FIG. 82, the X direction and Y direction represent the X direction and Y direction of the sensor 2 (FIG. 78). Also, the tap range 2441 represents a pixel group made up of 20 pixels (20 squares in the drawing) in total of 4 pixels in the X direction and also 5 pixels in the Y direction.

Further, as shown in FIG. 82, let us say that a pixel of interest has been set to a pixel, which is the second pixel from the left and also the third pixel from the bottom in the drawing, of the tap range 2441. Also, let us say that each pixel is denoted with a number 1 such as shown in FIG. 82 (l is any integer value of 0 through 19) according to the relative pixel positions (x, y) from the pixel of interest (a coordinate value of a pixel-of-interest coordinates system wherein the center (0, 0) of the pixel of interest is taken as the origin).

Now, description will return to FIG. 81, wherein in step S2402, the conditions setting unit 2421 sets a pixel of interest.

In step S2403, the input pixel value acquiring unit 2423 acquires an input pixel value based on the condition (tap range) set by the conditions setting unit 2421, and generates an input pixel value table. That is to say, in this case, the input pixel value acquiring unit 2423 acquires the input image region 2401 (FIG. 79), generates a table made up of 20 input pixel values P(l) as an input pixel value table.

Note that in this case, the relation between the input pixel values P(l) and the above input pixel values P(x, y) is a relation shown in the following Expression (73). However, in Expression (73), the left side represents the input pixel values P(l), and the right side represents the input pixel values P(x, y).

$$P(0) = P(0, 0)$$
$$P(1) = P(-1, 2)$$
$$P(2) = P(0, 2)$$
$$P(3) = P(1, 2)$$
$$P(4) = P(2, 2)$$
$$P(5) = P(-1, 1)$$
$$P(6) = P(0, 1)$$
$$P(7) = P(1, 1)$$
$$P(8) = P(2, 1)$$
$$P(9) = P(-1, 0)$$
$$P(10) = P(1, 0)$$
$$P(11) = P(2, 0)$$
$$P(12) = P(-1, -1)$$
$$P(13) = P(0, -1)$$
$$P(14) = P(1, -1)$$
$$P(15) = P(2, -1)$$
$$P(16) = P(-1, -2)$$
$$P(17) = P(0, -2)$$
$$P(18) = P(1, -2)$$
$$P(19) = P(2, -2)$$
(73)

In step S2404, the integral component calculation unit 2424 calculates integral components based on the conditions (a tap range and the number of dimensions) set by the conditions setting unit 2421, and the data continuity information (angle θ) supplied from the data continuity detecting unit 101, and generates an integral component table.

In this case, as described above, the input pixel values are not P(x, y) but P(l), and are acquired as the value of a pixel number l, so the integral component calculation unit 2424 calculates the integral components Si (x−0.5, x+0.5, y−0.5, y+0.5) in the above Expression (72) as a function of l such as the integral components $S_i(l)$ shown in the left side of the following Expression (74).

$$S_i(l) = S_i(x - 0.5, x + 0.5, y - 0.5, y + 0.5) \quad (74)$$

Specifically, in this case, the integral components $S_i(l)$ shown in the following Expression (75) are calculated.

$$S_i(0) = S_i(-0.5, 0.5, -0.5, 0.5)$$ (75)
$$S_i(1) = S_i(-1.5, -0.5, 1.5, 2.5)$$
$$S_i(2) = S_i(-0.5, 0.5, 1.5, 2.5)$$
$$S_i(3) = S_i(0.5, 1.5, 1.5, 2.5)$$
$$S_i(4) = S_i(1.5, 2.5, 1.5, 2.5)$$
$$S_i(5) = S_i(-1.5, -0.5, 0.5, 1.5)$$
$$S_i(6) = S_i(-0.5, 0.5, 0.5, 1.5)$$
$$S_i(7) = S_i(0.5, 1.5, 0.5, 1.5)$$
$$S_i(8) = S_i(1.5, 2.5, 0.5, 1.5)$$
$$S_i(9) = S_i(-1.5, -0.5, -0.5, 0.5)$$
$$S_i(10) = S_i(0.5, 1.5, -0.5, 0.5)$$
$$S_i(11) = S_i(1.5, 2.5, -0.5, 0.5)$$
$$S_i(12) = S_i(-1.5, -0.5, -1.5, -0.5)$$
$$S_i(13) = S_i(-0.5, 0.5, -1.5, -0.5)$$
$$S_i(14) = S_i(0.5, 1.5, -1.5, -0.5)$$
$$S_i(15) = S_i(1.5, 2.5, -1.5, -0.5)$$
$$S_i(16) = S_i(-1.5, -0.5, -2.5, 1.5)$$
$$S_i(17) = S_i(-0.5, 0.5, -2.5, -1.5)$$
$$S_i(18) = S_i(0.5, 1.5, -2.5, 1.5)$$
$$S_i(19) = S_i(1.5, 2.5, -2.5, -1.5)$$

Note that in Expression (75), the left side represents the integral components $S_i(l)$, and the right side represents the integral components $S_i$(x−0.5, x+0.5, y−0.5, y+0.5). That is to say, in this case, i is 0 through 5, and accordingly, the 120 $S_i(l)$ in total of the 20 $S_0(l)$, 20 $S_1(l)$, 20 $S_2(l)$, 20 $S_3(l)$, 20 $S_4(l)$, and 20 $S_5(l)$ are calculated.

More specifically, first the integral component calculation unit 2424 calculates cot θ corresponding to the angle θ supplied from the data continuity detecting unit 101, and takes the calculated result as a variable s. Next, the integral component calculation unit 2424 calculates each of the 20 integral components $S_i$(x−0.5, x+0.5, y−0.5, y+0.5) shown in the right side of Expression (74) regarding each of i=0 through 5 using the calculated variable s. That is to say, the 120 integral components $S_i(x-0.5, x+0.5, y-0.5, y+0.5)$ are calculated. For computing the integration component $S_i(x-0.5, x+0.5, y-0.5, y+0.5)$, the above-described Expression (72) is used. Also the integration component computing unit 2424 converts each of the 120 computed integration components $S_i(x-0.5, x+0.5, y-0.5, y+0.5)$ into the corresponding $S_i(l)$ respectively, according to Expression (75), and generates an integration component table containing the 120 converted $S_i(l)$.

Figure 81:
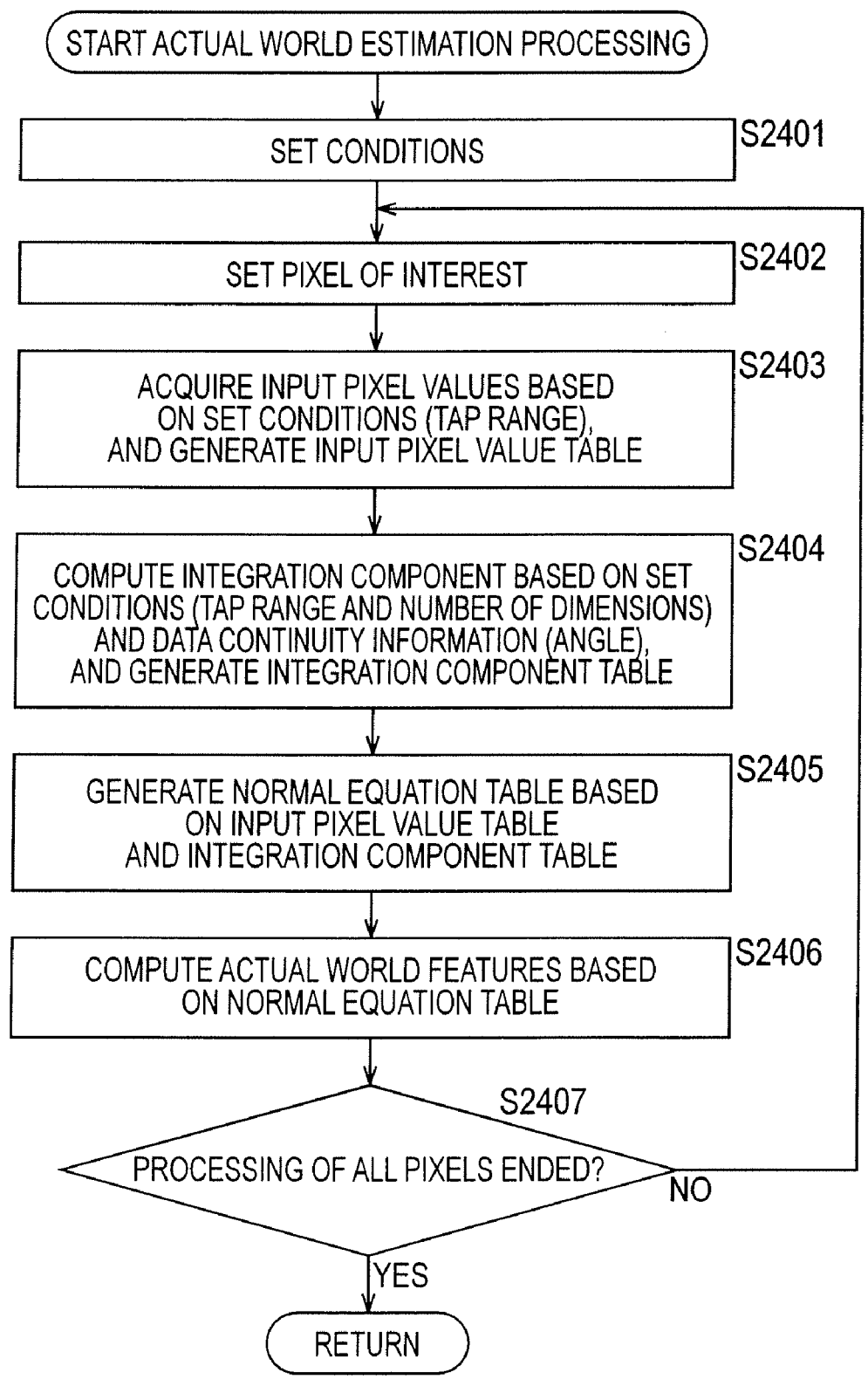
FIG. 81 is a flowchart for describing actual world estimation processing which the actual world estimating unit of the configuration shown in FIG. 80 executes.

Note that the sequence of the processing in step S2403 and the processing in step S2404 is not restricted to the example in FIG. 81, the processing in step S2404 may be executed first, or the processing in step S2403 and the processing in step S2404 may be executed simultaneously.

Next, in step S2405, the normal equation generating unit 2425 generates a normal equation table based on the input pixel value table generated by the input pixel value acquiring unit 2423 at the processing in step S2403, and the integral component table generated by the integral component calculation unit 2424 at the processing in step S2404.

Specifically, in this case, the features $w_i$ are calculated with the least square method using the above Expression (71) (however, in Expression (70), the $S_i(l)$ into which the integral components $S_i(x-0.5, x+0.5, y-0.5, y+0.5)$ are converted using Expression (74) is used, so a normal equation corresponding to this is represented as the following Expression (76).

$$\begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \begin{pmatrix} w_0 \\ w_1 \\ \vdots \\ w_n \end{pmatrix} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (76)$$

Note that in Expression (76), L represents the maximum value of the pixel number l in the tap range. n represents the number of dimensions of the approximation function f(x) serving as a polynomial. Specifically, in this case, n=5, and L=19.

If we define each matrix of the normal equation shown in Expression (76) as the following Expressions (77) through (79), the normal equation is represented as the following Expression (80).

$$S_{MAT} = \begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \quad (77)$$

$$W_{MAT} = \begin{pmatrix} w_0 \\ w_1 \\ \vdots \\ w_n \end{pmatrix} \quad (78)$$

$$P_{MAT} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (79)$$

$$S_{MAT} W_{MAT} = P_{MAT} \quad (80)$$

As shown in Expression (78), the respective components of the matrix $W_{MAT}$ are the features $w_i$ to be obtained. Accordingly, in Expression (80), if the matrix $S_{MAT}$ of the left side and the matrix $P_{MAT}$ of the right side are determined, the matrix $W_{MAT}$ may be calculated with the matrix solution.

Specifically, as shown in Expression (77), the respective components of the matrix $S_{MAT}$ may be calculated with the above integral components $S_i(l)$. That is to say, the integral components $S_i(l)$ are included in the integral component table supplied from the integral component calculation unit 2424, so the normal equation generating unit 2425 can calculate each component of the matrix $S_{MAT}$ using the integral component table.

Also, as shown in Expression (79), the respective components of the matrix $P_{MAT}$ may be calculated with the integral components $S_i(l)$ and the input pixel values P(l) That is to say, the integral components $S_i(l)$ is the same as those included in the respective components of the matrix $S_{MAT}$, also the input pixel values P(l) are included in the input pixel value table supplied from the input pixel value acquiring unit 2423, so the normal equation generating unit 2425 can calculate each component of the matrix $P_{MAT}$ using the integral component table and input pixel value table.

Thus, the normal equation generating unit 2425 calculates each component of the matrix $S_{MAT}$ and matrix $P_{MAT}$, and outputs the calculated results (each component of the matrix $S_{MAT}$ and matrix $P_{MAT}$) to the approximation function generating unit 2426 as a normal equation table.

Upon the normal equation table being output from the normal equation generating unit 2425, in step S2406, the approximation function generating unit 2426 calculates the features $w_i$ (i.e., the coefficients $w_i$ of the approximation function f(x, y) serving as a two-dimensional polynomial) serving as the respective components of the matrix $W_{MAT}$ in the above Expression (80) based on the normal equation table.

Specifically, the normal equation in the above Expression (80) can be transformed as the following Expression (81).

$$W_{MAT} = S_{MAT}^{-1} P_{MAT} \qquad (81)$$

In Expression (81), the respective components of the matrix $W_{MAT}$ in the left side are the features $w_i$ to be obtained. The respective components regarding the matrix $S_{MAT}$ and matrix $P_{MAT}$ are included in the normal equation table supplied from the normal equation generating unit 2425. Accordingly, the approximation function generating unit 2426 calculates the matrix $W_{MAT}$ by calculating the matrix in the right side of Expression (81) using the normal equation table, and outputs the calculated results (features $w_i$) to the image generating unit 103.

In step S2407, the approximation function generating unit 2426 determines regarding whether or not the processing of all the pixels has been completed.

In step S2407, in the event that determination is made that the processing of all the pixels has not been completed, the processing returns to step S2402, wherein the subsequent processing is repeatedly performed. That is to say, the pixels that have not become a pixel of interest are sequentially taken as a pixel of interest, and the processing in step S2402 through S2407 is repeatedly performed.

In the event that the processing of all the pixels has been completed (in step S2407, in the event that determination is made that the processing of all the pixels has been completed), the estimating processing of the actual world 1 ends.

As description of the two-dimensional polynomial approximating method, an example for calculating the coefficients (features) $w_i$ of the approximation function $f(x, y)$ corresponding to the spatial directions (X direction and Y direction) has been employed, but the two-dimensional polynomial approximating method can be applied to the temporal and spatial directions (X direction and t direction, or Y direction and t direction) as well.

That is to say, the above example is an example in the case of the light signal in the actual world 1 having continuity in the spatial direction represented with the gradient $G_F$ (FIG. 77), and accordingly, the equation including two-dimensional integration in the spatial directions (X direction and Y direction), such as shown in the above Expression (66). However, the concept regarding two-dimensional integration can be applied not only to the spatial direction but also to the temporal and spatial directions (X direction and t direction, or Y direction and t direction).

In other words, with the two-dimensional polynomial approximating method, even in the case in which the light signal function $F(x, y, t)$, which needs to be estimated, has not only continuity in the spatial direction but also continuity in the temporal and spatial directions (however, X direction and t direction, or Y direction and t direction), this can be approximated with a two-dimensional approximation function f.

Figure 83:
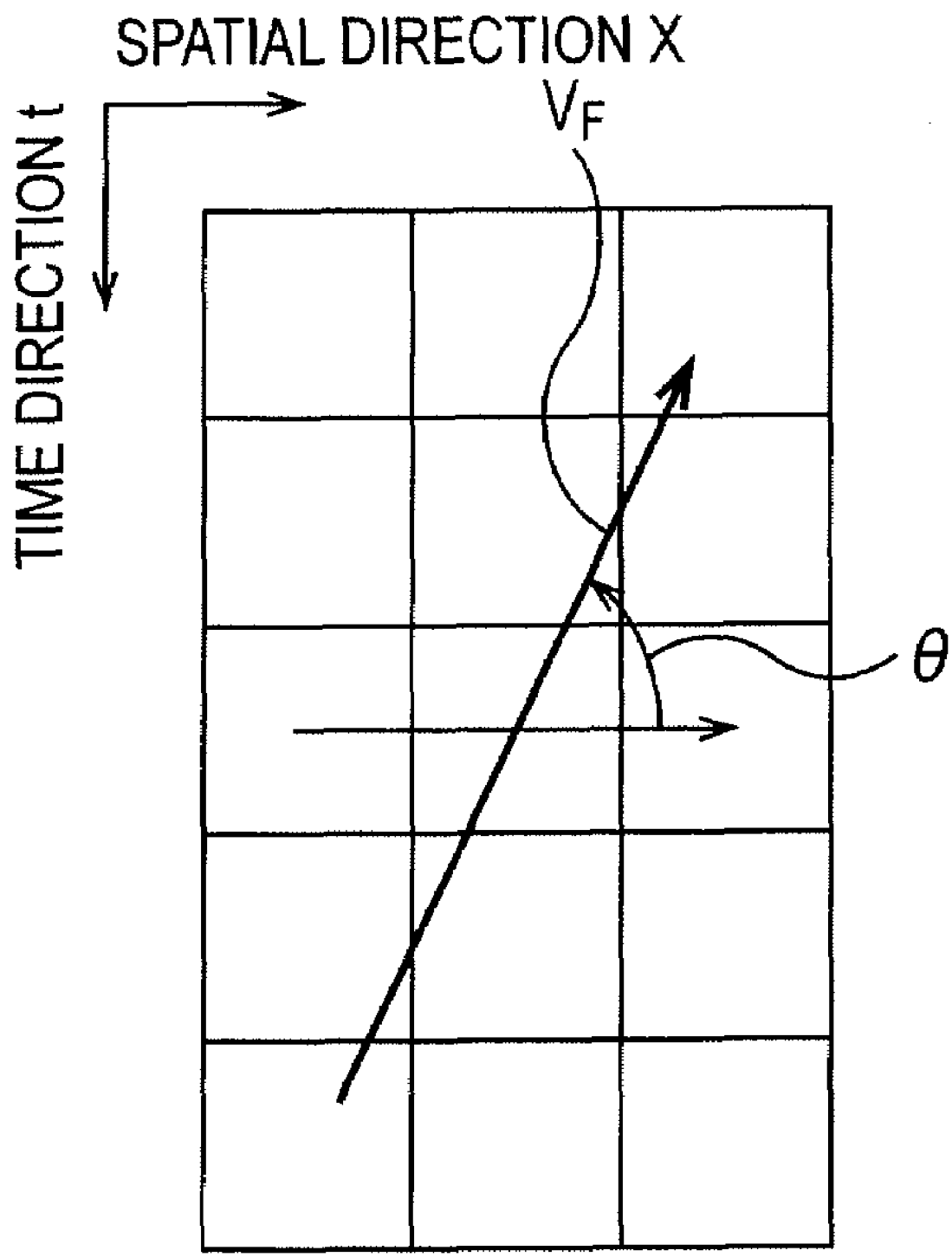
FIG. 83 is a diagram for describing direction of continuity in the time-spatial direction.

Specifically, for example, in the event that there is an object moving horizontally in the X direction at uniform velocity, the direction of movement of the object is represented with like a gradient $V_F$ in the X-t plane such as shown in FIG. 83. In other words, it can be said that the gradient $V_F$ represents the direction of continuity in the temporal and spatial directions in the X-t plane. Accordingly, the data continuity detecting unit 101 can output movement $\theta$ such as shown in FIG. 83 (strictly speaking, though not shown in the drawing, movement $\theta$ is an angle generated by the direction of data continuity represented with the gradient $V_F$ corresponding to the gradient $V_F$ and the X direction in the spatial direction) as data continuity information corresponding to the gradient $V_F$ representing continuity in the temporal and spatial directions in the X-t plane as well as the above angle $\theta$ (data continuity information corresponding to continuity in the spatial directions represented with the gradient $G_F$ in the X-Y plane).

Accordingly, the actual world estimating unit 102 employing the two-dimensional polynomial approximating method can calculate the coefficients (features) $w_i$ of an approximation function $f(x, t)$ in the same method as the above method by employing the movement $\theta$ instead of the angle $\theta$. However, in this case, the equation to be employed is not the above Expression (66) but the following Expression (82).

$$P(x, t) = \int_{t-0.5}^{t+0.5} \int_{x-0.5}^{x+0.5} \sum_{i=0}^{n} w_i (x - s \times t)^i \, dx \, dt + e \qquad (82)$$

Note that in Expression (82), s is $\cot \theta$ (however, $\theta$ is movement).

Also, an approximation function $f(y, t)$ focusing attention on the spatial direction Y instead of the spatial direction X can be handled in the same way as the above approximation function $f(x, t)$.

Thus, the two-dimensional polynomial approximating method takes not one-dimensional but two-dimensional integration effects into consideration, so can estimate the light signals in the actual world 1 more accurately than the one-dimensional approximating method.

Next, description will be made regarding the third function approximating method with reference to FIG. 84 through FIG. 88.

That is to say, the third function approximating method is a method for estimating the light signal function $F(x, y, t)$ by approximating the light signal function $F(x, y, t)$ with the approximation function $f(x, y, t)$ focusing attention on that the light signal in the actual world 1 having continuity in a predetermined direction of the temporal and spatial directions is represented with the light signal function $F(x, y, t)$, for example. Accordingly, hereafter, the third function approximating method is referred to as a three-dimensional function approximating method.

Figure 84:
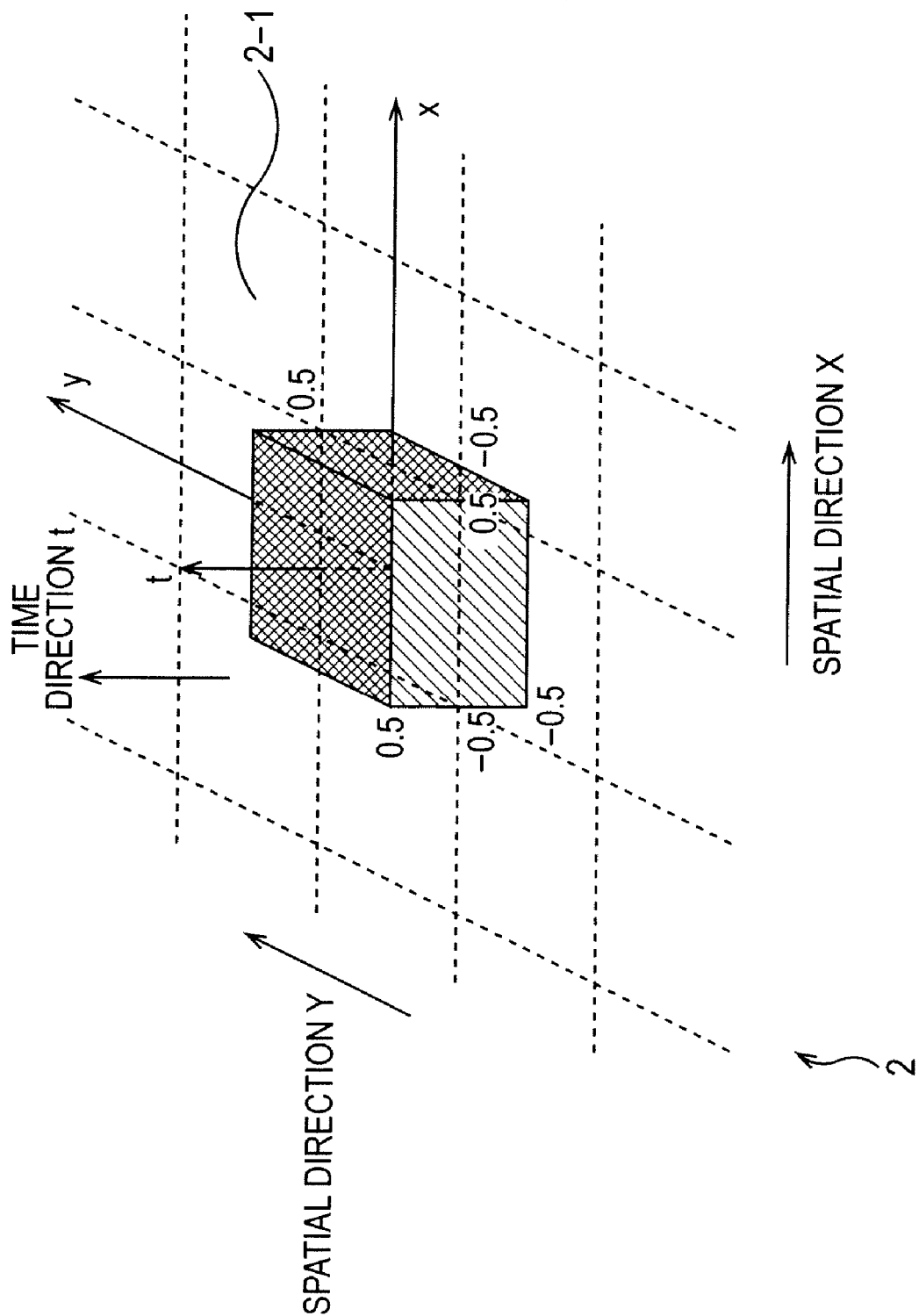
FIG. 84 is a diagram for describing integration effects in the event that the sensor is a CCD.

Also, with description of the three-dimensional function approximating method, let us say that the sensor 2 is a CCD made up of the multiple detecting elements 2-1 disposed on the plane thereof, such as shown in FIG. 84.

With the example in FIG. 84, the direction in parallel with a predetermined side of the detecting elements 2-1 is taken as the X direction serving as one direction of the spatial directions, and the direction orthogonal to the X direction is taken as the Y direction serving as the other direction of the spatial directions. The direction orthogonal to the X-Y plane is taken as the t direction serving as the temporal direction.

Also, with the example in FIG. 84, the spatial shape of the respective detecting elements 2-1 of the sensor 2 is taken as a square of which one side is 1 in length. The shutter time (exposure time) of the sensor 2 is taken as 1.

Further, with the example in FIG. 84, the center of one certain detecting element 2-1 of the sensor 2 is taken as the origin (the position in the X direction is x=0, and the position in the Y direction is y=0) in the spatial directions (X direction and Y direction), and also the intermediate point-in-time of the exposure time is taken as the origin (the position in the t direction is t=0) in the temporal direction (t direction).

In this case, the detecting element 2-1 of which the center is in the origin (x=0, y=0) in the spatial directions subjects the light signal function F(x, y, t) to integration with a range of −0.5 through 0.5 in the X direction, with a range of −0.5 through 0.5 in the Y direction, and with a range of −0.5 through 0.5 in the t direction, and outputs the integral value as the pixel value P.

That is to say, the pixel value P output from the detecting element 2-1 of which the center is in the origin in the spatial directions is represented with the following Expression (83).

$$P = \int_{-0.5}^{+0.5} \int_{-0.5}^{+0.5} \int_{-0.5}^{+0.5} F(x, y, t)\,dx\,dy\,dt \tag{83}$$

Similarly, the other detecting elements 2-1 output the pixel value P shown in Expression (83) by taking the center of the detecting element 2-1 to be processed as the origin in the spatial directions.

Incidentally, as described above, with the three-dimensional function approximating method, the light signal function F(x, y, t) is approximated to the three-dimensional approximation function f(x, y, t).

Specifically, for example, the approximation function f(x, y, t) is taken as a function having N variables (features), a relational expression between the input pixel values P(x, y, t) corresponding to Expression (83) and the approximation function f(x, y, t) is defined. Thus, in the event that M input pixel values P(x, y, t) more than N are acquired, N variables (features) can be calculated from the defined relational expression. That is to say, the actual world estimating unit 102 can estimate the light signal function F(x, y, t) by acquiring M input pixel values P(x, y, t), and calculating N variables (features).

In this case, the actual world estimating unit 102 extracts (acquires) M input images P(x, y, t), of the entire input image by using continuity of data included in an input image (input pixel values) from the sensor 2 as a constraint (i.e., using data continuity information as to an input image to be output from the data continuity detecting unit 101). As a result, the approximation function f(x, y, t) is constrained by continuity of data.

Figure 85:
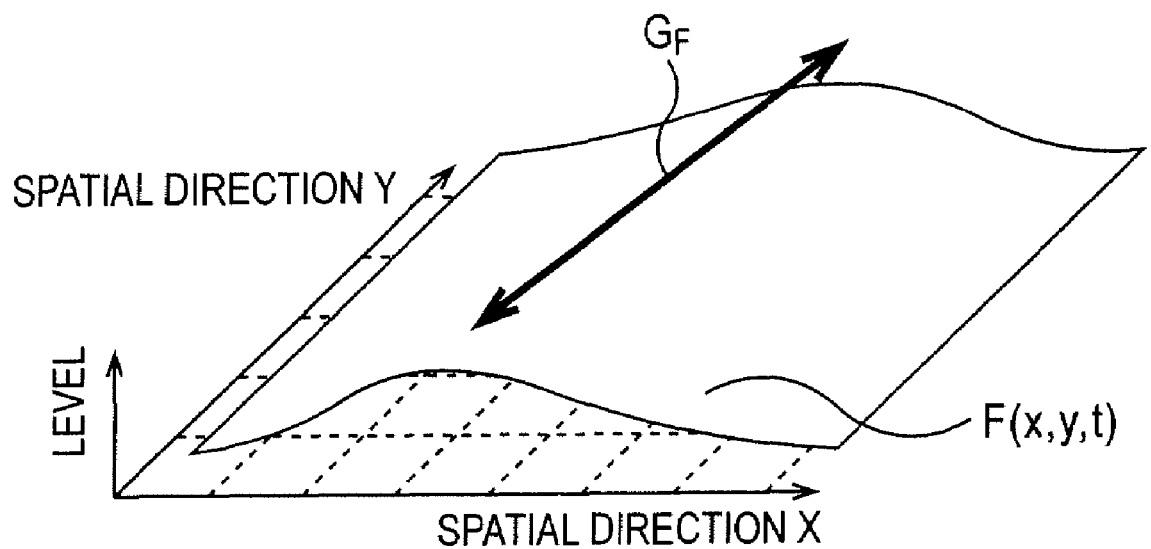
FIG. 85 is a diagram for describing actual world signals having continuity in the spatial direction.

For example, as shown in FIG. 85, in the event that the light signal function F(x, y, t) corresponding to an input image has continuity in the spatial direction represented with the gradient $G_F$, the data continuity detecting unit 101 results in outputting the angle θ (the angle θ generated between the direction of continuity of data represented with the gradient $G_f$ (not shown) corresponding to the gradient $G_F$, and the X direction) as data continuity information as to the input image.

In this case, let us say that a one-dimensional waveform wherein the light signal function F(x, y, t) is projected in the X direction (such a waveform is referred to as an X cross-sectional waveform here) has the same form even in the event of projection in any position in the Y direction.

That is to say, let us say that there is an X cross-sectional waveform having the same form, which is a two-dimensional (spatial directional) waveform continuous in the direction of continuity (angle θ direction as to the X direction), and a three-dimensional waveform wherein such a two-dimensional waveform continues in the temporal direction t, is approximated with the approximation function f(x, y, t).

In other words, an X cross-sectional waveform, which is shifted by a position y in the Y direction from the center of the pixel of interest, becomes a waveform wherein the X cross-sectional waveform passing through the center of the pixel of interest is moved (shifted) by a predetermined amount (amount varies according to the angle θ) in the X direction. Note that hereafter, such an amount is referred to as a shift amount.

This shift amount can be calculated as follows.

That is to say, the gradient $V_f$ (for example, gradient $V_f$ representing the direction of data continuity corresponding to the gradient $V_F$ in FIG. 85) and angle θ are represented as the following Expression (84).

$$G_f = \tan\theta = \frac{dy}{dx} \tag{84}$$

Note that in Expression (84), dx represents the amount of fine movement in the X direction, and dy represents the amount of fine movement in the Y direction as to the dx.

Accordingly, if the shift amount as to the X direction is described as $C_x(y)$, this is represented as the following Expression (85).

$$C_x(y) = \frac{y}{G_f} \tag{85}$$

If the shift amount $C_x(y)$ is thus defined, a relational expression between the input pixel values P(x, y, t) corresponding to Expression (83) and the approximation function f(x, y, t) is represented as the following Expression (86).

$$P(x, y, t) = \int_{t_s}^{t_e} \int_{y_s}^{y_e} \int_{x_s}^{x_e} f(x, y, t)\,dx\,dy\,dt + e \tag{86}$$

In Expression (86), e represents a margin of error. $t_s$ represents an integration start position in the t direction, and $t_e$ represents an integration end position in the t direction. In the same way, $y_s$ represents an integration start position in the Y direction, and $y_e$ represents an integration end position in the Y direction. Also, $x_s$ represents an integration start position in the X direction, and $x_e$ represents an integration end position in the X direction. However, the respective specific integral ranges are as shown in the following Expression (87).

$$\begin{aligned}
t_s &= t - 0.5 \\
t_e &= t + 0.5 \\
y_s &= y - 0.5 \\
y_e &= y + 0.5 \\
x_s &= x - C_x(y) - 0.5 \\
x_e &= x - C_x(y) + 0.5
\end{aligned} \tag{87}$$

As shown in Expression (87), it can be represented that an X cross-sectional waveform having the same form continues in the direction of continuity (angle θ direction as to the X direction) by shifting an integral range in the X direction as to a pixel positioned distant from the pixel of interest by (x, y) in the spatial direction by the shift amount $C_x(y)$.

Thus, with the three-dimensional approximating method, the relation between the pixel values P(x, y, t) and the three-dimensional approximation function f(x, y, t) can be represented with Expression (86) (Expression (87) for the integral range), and accordingly, the light signal function F(x, y, t) (for example, a light signal having continuity in the spatial direction represented with the gradient $V_F$ such as shown in FIG. 85) can be estimated by calculating the N features of the approximation function f(x, y, t), for example, with the least square method using Expression (86) and Expression (87).

Note that in the event that a light signal represented with the light signal function F(x, y, t) has continuity in the spatial direction represented with the gradient $V_F$ such as shown in FIG. 85, the light signal function F(x, y, t) may be approximated as follows.

That is to say, let us say that a one-dimensional waveform wherein the light signal function F(x, y, t) is projected in the Y direction (hereafter, such a waveform is referred to as a Y cross-sectional waveform) has the same form even in the event of projection in any position in the X direction.

In other words, let us say that there is a two-dimensional (spatial directional) waveform wherein a Y cross-sectional waveform having the same form continues in the direction of continuity (angle θ direction as to in the X direction), and a three-dimensional waveform wherein such a two-dimensional waveform continues in the temporal direction t is approximated with the approximation function f(x, y, t).

Accordingly, the Y cross-sectional waveform, which is shifted by x in the X direction from the center of the pixel of interest, becomes a waveform wherein the Y cross-sectional waveform passing through the center of the pixel of interest is moved by a predetermined shift amount (shift amount changing according to the angle θ) in the Y direction.

This shift amount can be calculated as follows.

That is to say, the gradient $G_F$ is represented as the above Expression (84), so if the shift amount as to the Y direction is described as $C_y(x)$, this is represented as the following Expression (88).

$$C_y(x) = G_f \times x \qquad (88)$$

If the shift amount $C_x(y)$ is thus defined, a relational expression between the input pixel values P(x, y, t) corresponding to Expression (83) and the approximation function f(x, y, t) is represented as the above Expression (86), as with when the shift amount $C_x(y)$ is defined.

However, in this case, the respective specific integral ranges are as shown in the following Expression (89).

$$t_s = t - 0.5 \qquad (89)$$
$$t_e = t + 0.5$$
$$y_s = y - C_y(x) - 0.5$$
$$y_e = y - C_y(x) + 0.5$$
$$x_s = x - 0.5$$
$$x_e = x + 0.5$$

As shown in Expression (89) (and the above Expression (86)), it can be represented that a Y cross-sectional waveform having the same form continues in the direction of continuity (angle θ direction as to the X direction) by shifting an integral range in the Y direction as to a pixel positioned distant from the pixel of interest by (x, y), by the shift amount $C_x(y)$.

Thus, with the three-dimensional approximating method, the integral range of the right side of the above Expression (86) can be set to not only Expression (87) but also Expression (89), and accordingly, the light signal function F(x, y, t) (light signal in the actual world 1 having continuity in the spatial direction represented with the gradient $G_F$) can be estimated by calculating the n features of the approximation function f(x, y, t) with, for example, the least square method or the like using Expression (86) in which Expression (89) is employed as an integral range.

Thus, Expression (87) and Expression (89), which represent an integral range, represent essentially the same with only a difference regarding whether perimeter pixels are shifted in the X direction (in the case of Expression (87)) or shifted in the Y direction (in the case of Expression (89)) in response to the direction of continuity.

However, in response to the direction of continuity (gradient $G_F$), there is a difference regarding whether the light signal function F(x, y, t) is regarded as a group of X cross-sectional waveforms, or is regarded as a group of Y cross-sectional waveforms. That is to say, in the event that the direction of continuity is close to the Y direction, the light signal function F(x, y, t) is preferably regarded as a group of X cross-sectional waveforms. On the other hand, in the event that the direction of continuity is close to the X direction, the light signal function F(x, y, t) is preferably regarded as a group of Y cross-sectional waveforms.

Accordingly, it is preferable that the actual world estimating unit 102 prepares both Expression (87) and Expression (89) as an integral range, and selects any one of Expression (87) and Expression (89) as the integral range of the right side of the appropriate Expression (86) in response to the direction of continuity.

Figure 86:
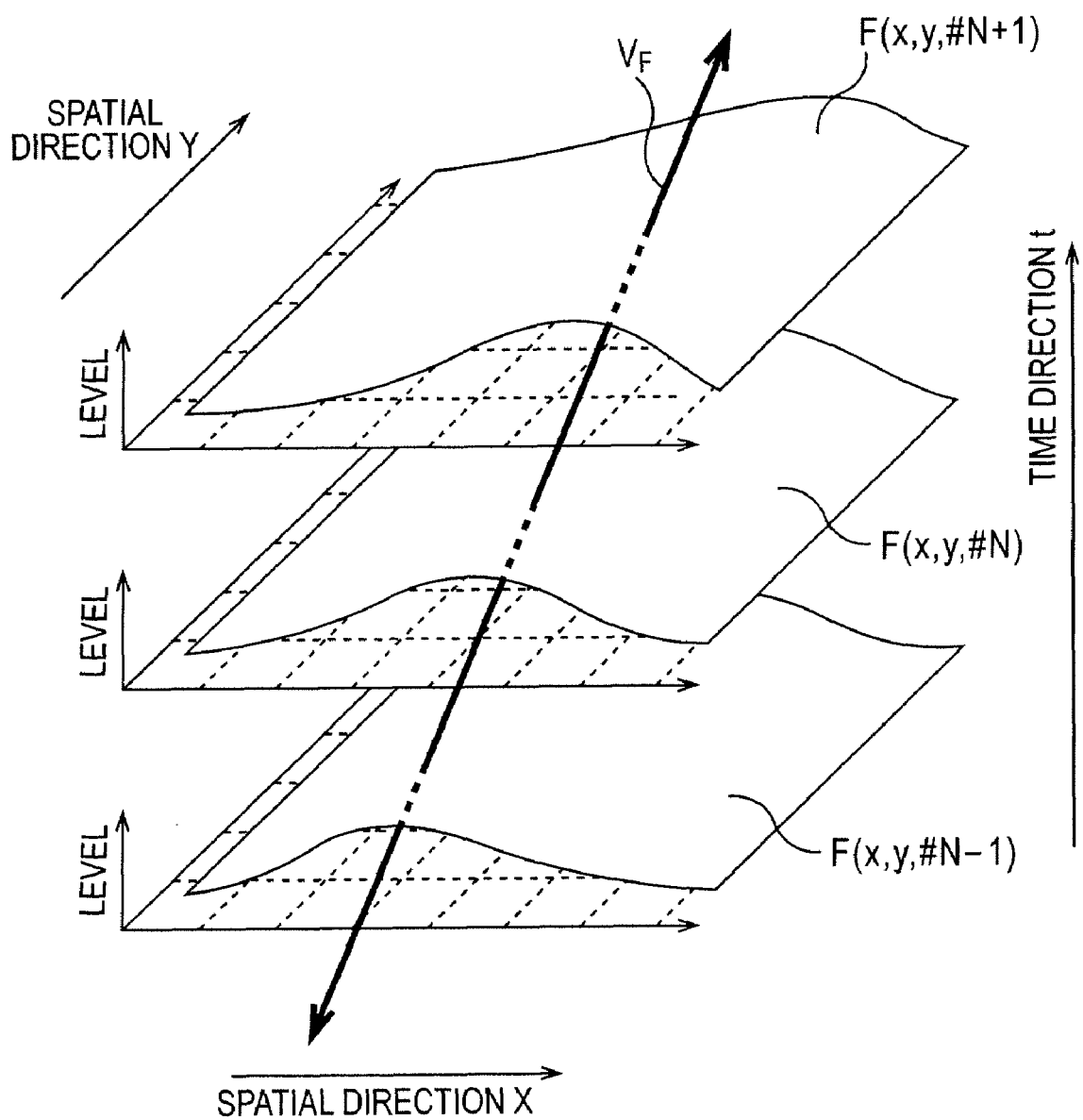
FIG. 86 is a diagram for describing actual world signals having continuity in the space-time directions.

Description has been made regarding the three-dimensional approximation method in the case in which the light signal function F(x, y, t) has continuity (for example, continuity in the spatial direction represented with the gradient $G_F$ in FIG. 85) in the spatial directions (X direction and Y direction), but the three-dimensional approximation method can be applied to the case in which the light signal function F(x, y, t) has continuity (continuity represented with the gradient $V_F$) in the temporal and spatial directions (X direction, Y direction, and t direction), as shown in FIG. 86.

That is to say, in FIG. 86, a light signal function corresponding to a frame #N−1 is taken as F(x, y, #N−1), a light signal function corresponding to a frame #N is taken as F(x, y, #N), and a light signal function corresponding to a frame #N+1 is taken as F(x, y, #N+1).

Note that in FIG. 86, the horizontal direction is taken as the X direction serving as one direction of the spatial directions, the upper right diagonal direction is taken as the Y direction serving as the other direction of the spatial directions, and also the vertical direction is taken as the t direction serving as the temporal direction in the drawing.

Also, the frame #N−1 is a frame temporally prior to the frame #N, the frame #N+1 is a frame temporally following the frame #N. That is to say, the frame #N−1, frame #N, and frame #N+1 are displayed in the sequence of the frame #N−1, frame #N, and frame #N+1.

With the example in FIG. 86, a cross-sectional light level along the direction shown with the gradient $V_F$ (upper right inner direction from lower left near side in the drawing) is regarded as generally constant. Accordingly, with the example in FIG. 86, it can be said that the light signal function F(x, y, t) has continuity in the temporal and spatial directions represented with the gradient $V_F$.

In this case, in the event that a function C(x, y, t) representing continuity in the temporal and spatial directions is defined, and also the integral range of the above Expression

(86) is defined with the defined function C(x, y, t), N features of the approximation function f(x, y, t) can be calculated as with the above Expression (87) and Expression (89).

The function C(x, y, t) is not restricted to a particular function as long as this is a function representing the direction of continuity. However, hereafter, let us say that linear continuity is employed, and $C_x(t)$ and $C_y(t)$ corresponding to the shift amount $C_x(y)$ (Expression (85)) and shift amount $C_y(x)$ (Expression (87)), which are functions representing continuity in the spatial direction described above, are defined as a function C(x, y, t) corresponding thereto as follows.

That is to say, if the gradient as continuity of data in the temporal and spatial directions corresponding to the gradient $G_f$ representing continuity of data in the above spatial direction is taken as $V_f$, and if this gradient $V_f$ is divided into the gradient in the X direction (hereafter, referred to as $V_{fx}$) and the gradient in the Y direction (hereafter, referred to as $V_{fy}$), the gradient $V_{fx}$ is represented with the following Expression (90), and the gradient $V_{fy}$ is represented with the following Expression (91), respectively.

$$V_{fx} = \frac{dx}{dt} \quad (90)$$

$$V_{fy} = \frac{dy}{dt} \quad (91)$$

In this case, the function $C_x(t)$ is represented as the following Expression (92) using the gradient $V_{fx}$ shown in Expression (90).

$$C_x(t) = V_{fx} \times t \quad (92)$$

Similarly, the function $C_y(t)$ is represented as the following Expression (93) using the gradient $V_{fy}$ shown in Expression (91).

$$C_y(t) = V_{fy} \times t \quad (93)$$

Thus, upon the function $C_x(t)$ and function $C_y(t)$, which represent continuity 2511 in the temporal and spatial directions, being defined, the integral range of Expression (86) is represented as the following Expression (94).

$$t_s = t - 0.5 \quad (94)$$
$$t_e = t + 0.5$$
$$y_s = y - C_y(t) - 0.5$$
$$y_e = y - C_y(t) + 0.5$$
$$x_s = x - C_x(t) - 0.5$$
$$x_e = x - C_x(t) + 0.5$$

Thus, with the three-dimensional approximating method, the relation between the pixel values P(x, y, t) and the three-dimensional approximation function f(x, y, t) can be represented with Expression (86), and accordingly, the light signal function F(x, y, t) (light signal in the actual world 1 having continuity in a predetermined direction of the temporal and spatial directions) can be estimated by calculating the n+1 features of the approximation function f(x, y, t) with, for example, the least square method or the like using Expression (94) as the integral range of the right side of Expression (86).

Figure 87:
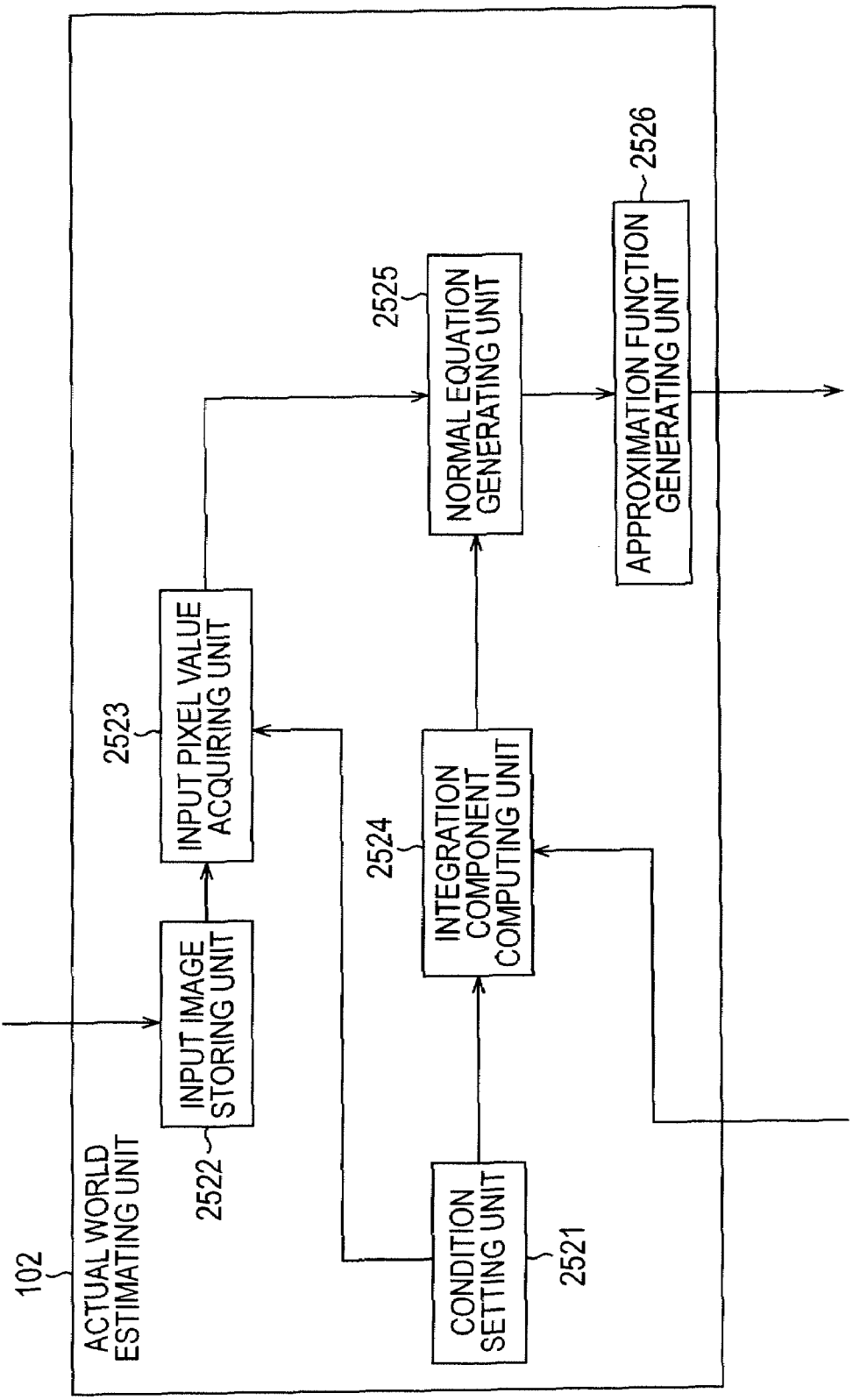
FIG. 87 is a block diagram for describing a configuration example of the actual world estimating unit using, of function approximation techniques having the principle shown in FIG. 58, cubic polynomial approximation.

FIG. 87 represents a configuration example of the actual world estimating unit 102 employing such a three-dimensional approximating method.

Note that the approximation function f(x, y, t) (in reality, the features (coefficients) thereof) calculated by the actual world estimating unit 102 employing the three-dimensional approximating method is not restricted to a particular function, but an n (n=N−1)-dimensional polynomial is employed in the following description.

As shown in FIG. 87, the actual world estimating unit 102 includes a conditions setting unit 2521, input image storage unit 2522, input pixel value acquiring unit 2523, integral component calculation unit 2524, normal equation generating unit 2525, and approximation function generating unit 2526.

The conditions setting unit 2521 sets a pixel range (tap range) used for estimating the light signal function F(x, y, t) corresponding to a pixel of interest, and the number of dimensions n of the approximation function f(x, y, t).

The input image storage unit 2522 temporarily stores an input image (pixel values) from the sensor 2.

The input pixel acquiring unit 2523 acquires, of the input images stored in the input image storage unit 2522, an input image region corresponding to the tap range set by the conditions setting unit 2521, and supplies this to the normal equation generating unit 2525 as an input pixel value table. That is to say, the input pixel value table is a table in which the respective pixel values of pixels included in the input image region are described.

Incidentally, as described above, the actual world estimating unit 102 employing the three-dimensional approximating method calculates the N features (in this case, coefficient of each dimension) of the approximation function f(x, y, t) with the least square method using the above Expression (86) (however, Expression (87), Expression (90), or Expression (94) for the integral range).

The right side of Expression (86) can be represented as the following Expression (95) by calculating the integration thereof.

$$P(x, y, t) = \sum_{i=0}^{n} w_i S_i(x_s, x_e, y_s, y_e, t_s, t_e) + e \quad (95)$$

In Expression (95), $w_i$ represents the coefficients (features) of the i-dimensional term, and also $S_i(x_s, x_e, y_s, y_e, t_s, t_e)$ represents the integral components of the i-dimensional term. However, $x_s$ represents an integral range start position in the X direction, $x_e$ represents an integral range end position in the X direction, $y_s$ represents an integral range start position in the Y direction, $y_e$ represents an integral range end position in the Y direction, $t_s$ represents an integral range start position in the t direction, $t_e$ represents an integral range end position in the t direction, respectively.

The integral component calculation unit 2524 calculates the integral components $S_i(x_s, x_e, y_s, y_e, t_s, t_e)$.

That is to say, the integral component calculation unit 2524 calculates the integral components $S_i(x_s, x_e, y_s, y_e, t_s, t_e)$ based on the tap range and the number of dimensions set by the conditions setting unit 2521, and the angle or movement (as the integral range, angle in the case of using the above Expression (87) or Expression (90), and movement in the case of using the above Expression (94)) of the data continuity information output from the data continuity detecting unit 101, and supplies the calculated results to the normal equation generating unit 2525 as an integral component table.

The normal equation generating unit 2525 generates a normal equation in the case of obtaining the above Expression (95) with the least square method using the input pixel value table supplied from the input pixel value acquiring unit 2523, and the integral component table supplied from the integral component calculation unit 2524, and outputs this to the approximation function generating unit 2526 as a normal equation table. An example of a normal equation will be described later.

The approximation function generating unit 2526 calculates the respective features $w_i$ (in this case, the coefficients $w_i$ of the approximation function f(x, y, t) serving as a three-dimensional polynomial) by solving the normal equation included in the normal equation table supplied from the normal equation generating unit 2525 with the matrix solution, and output these to the image generating unit 103.

Next, description will be made regarding the actual world estimating processing (processing in step S102 in FIG. 29) to which the three-dimensional approximating method is applied, with reference to the flowchart in FIG. 88.

First, in step S2501, the conditions setting unit 2521 sets conditions (a tap range and the number of dimensions).

For example, let us say that a tap range made up of L pixels has been set. Also, let us say that a predetermined number l (l is any one of integer values 0 through L−1) is appended to each of the pixels.

Next, in step S2502, the conditions setting unit 2521 sets a pixel of interest.

In step S2503, the input pixel value acquiring unit 2523 acquires an input pixel value based on the condition (tap range) set by the conditions setting unit 2521, and generates an input pixel value table. In this case, a table made up of L input pixel values P(x, y, t) is generated. Here, let us say that each of the L input pixel values P(x, y, t) is described as P(l) serving as a function of the number l of the pixel thereof. That is to say, the input pixel value table becomes a table including L P(l).

In step S2504, the integral component calculation unit 2524 calculates integral components based on the conditions (a tap range and the number of dimensions) set by the conditions setting unit 2521, and the data continuity information (angle or movement) supplied from the data continuity detecting unit 101, and generates an integral component table.

However, in this case, as described above, the input pixel values are not P(x, y, t) but P(l), and are acquired as the value of a pixel number l, so the integral component calculation unit 2524 results in calculating the integral components $S_i(x_s, x_e, y_s, y_e, t_s, t_e)$ in the above Expression (95) as a function of l such as the integral components $S_i(l)$. That is to say, the integral component table becomes a table including L×i $S_i(l)$.

Figure 88:
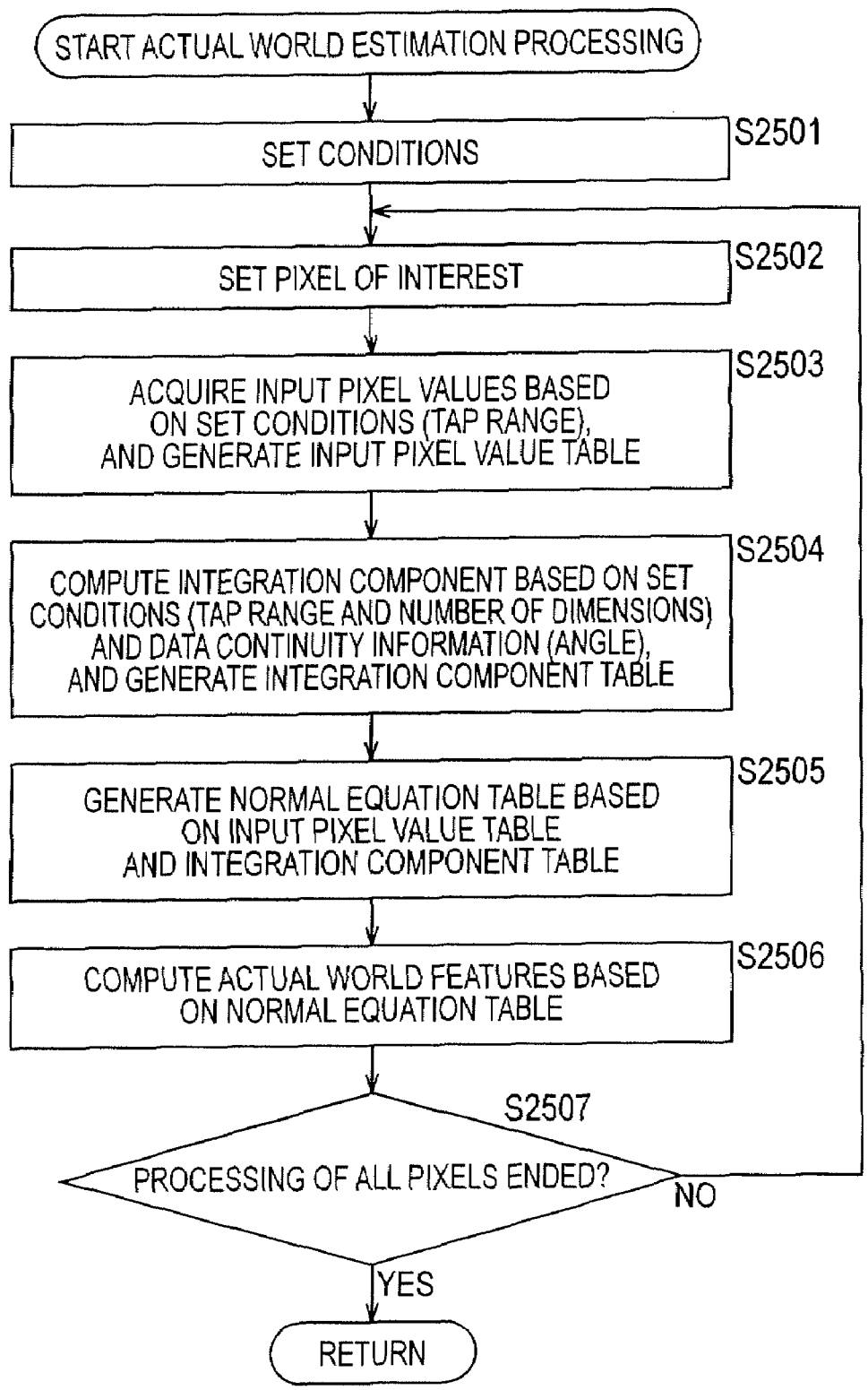
FIG. 88 is a flowchart for describing actual world estimation processing which the actual world estimating unit of the configuration shown in FIG. 87 executes.

Note that the sequence of the processing in step S2503 and the processing in step S2504 is not restricted to the example in FIG. 88, so the processing in step S2504 may be executed first, or the processing in step S2503 and the processing in step S2504 may be executed simultaneously.

Next, in step S2505, the normal equation generating unit 2525 generates a normal equation table based on the input pixel value table generated by the input pixel value acquiring unit 2523 at the processing in step 2503, and the integral component table generated by the integral component calculation unit 2524 at the processing in step S2504.

Specifically, in this case, the features $w_i$ of the following Expression (96) corresponding to the above Expression (95) are calculated using the least square method. A normal equation corresponding to this is represented as the following Expression (97).

$$P(l) = \sum_{i=0}^{n} w_i S_i(l) + e \quad (96)$$

$$\begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \begin{pmatrix} w_0 \\ w_1 \\ \vdots \\ w_n \end{pmatrix} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (97)$$

If we define each matrix of the normal equation shown in Expression (97) as the following Expressions (98) through (100), the normal equation is represented as the following Expression (101).

$$S_{MAT} = \begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \quad (98)$$

$$W_{MAT} = \begin{pmatrix} w_0 \\ w_1 \\ \vdots \\ w_n \end{pmatrix} \quad (99)$$

$$P_{MAT} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (100)$$

$$S_{MAT} W_{MAT} = P_{MAT} \quad (101)$$

As shown in Expression (99), the respective components of the matrix $W_{MAT}$ are the features $w_i$ to be obtained. Accordingly, in Expression (101), if the matrix $S_{MAT}$ of the left side and the matrix $P_{MAT}$ of the right side are determined, the matrix $W_{MAT}$ (i.e., features $w_i$) may be calculated with the matrix solution.

Specifically, as shown in Expression (98), the respective components of the matrix $S_{MAT}$ may be calculated as long as the above integral components $S_i(l)$ are known. The integral components $S_i(l)$ are included in the integral component table supplied from the integral component calculation unit 2524, so the normal equation generating unit 2525 can calculate each component of the matrix $S_{MAT}$ using the integral component table.

Also, as shown in Expression (100), the respective components of the matrix $P_{MAT}$ may be calculated as long as the integral components $S_i(l)$ and the input pixel values $P(l)$ are known. The integral components $S_i(l)$ is the same as those included in the respective components of the matrix $S_{MAT}$, also the input pixel values $P(l)$ are included in the input pixel value table supplied from the input pixel value acquiring unit 2523, so the normal equation generating unit 2525 can calculate each component of the matrix $P_{MAT}$ using the integral component table and input pixel value table.

Thus, the normal equation generating unit 2525 calculates each component of the matrix $S_{MAT}$ and matrix $P_{MAT}$, and outputs the calculated results (each component of the matrix $S_{MAT}$ and matrix $P_{MAT}$) to the approximation function generating unit 2526 as a normal equation table.

Upon the normal equation table being output from the normal equation generating unit 2526, in step S2506, the approximation function generating unit 2526 calculates the features $w_i$ (i.e., the coefficients $w_i$ of the approximation function $f(x, y, t)$) serving as the respective components of the matrix $W_{MAT}$ in the above Expression (101) based on the normal equation table.

Specifically, the normal equation in the above Expression (101) can be transformed as the following Expression (102).

$$W_{MAT} = S_{MAT}^{-1} P_{MAT} \quad (102)$$

In Expression (102), the respective components of the matrix $W_{MAT}$ in the left side are the features $w_i$ to be obtained. The respective components regarding the matrix $S_{MAT}$ and matrix $P_{MAT}$ are included in the normal equation table supplied from the normal equation generating unit 2525. Accordingly, the approximation function generating unit 2526 calculates the matrix $W_{MAT}$ by calculating the matrix in the right side of Expression (102) using the normal equation table, and outputs the calculated results (features $w_i$) to the image generating unit 103.

In step S2507, the approximation function generating unit 2526 determines regarding whether or not the processing of all the pixels has been completed.

In step S2507, in the event that determination is made that the processing of all the pixels has not been completed, the processing returns to step S2502, wherein the subsequent processing is repeatedly performed. That is to say, the pixels that have not become a pixel of interest are sequentially taken as a pixel of interest, and the processing in step S2502 through S2507 is repeatedly performed.

In the event that the processing of all the pixels has been completed (in step S2507, in the event that determination is made that the processing of all the pixels has been completed), the estimating processing of the actual world 1 ends.

As described above, the three-dimensional approximating method takes three-dimensional integration effects in the temporal and spatial directions into consideration instead of one-dimensional or two-dimensional integration effects, and accordingly, can estimate the light signals in the actual world 1 more accurately than the one-dimensional approximating method and two-dimensional polynomial approximating method.

Next, description will be made regarding an embodiment of the image generating unit 103 (FIG. 3) with reference to FIG. 89 through FIG. 110.

Figure 89:
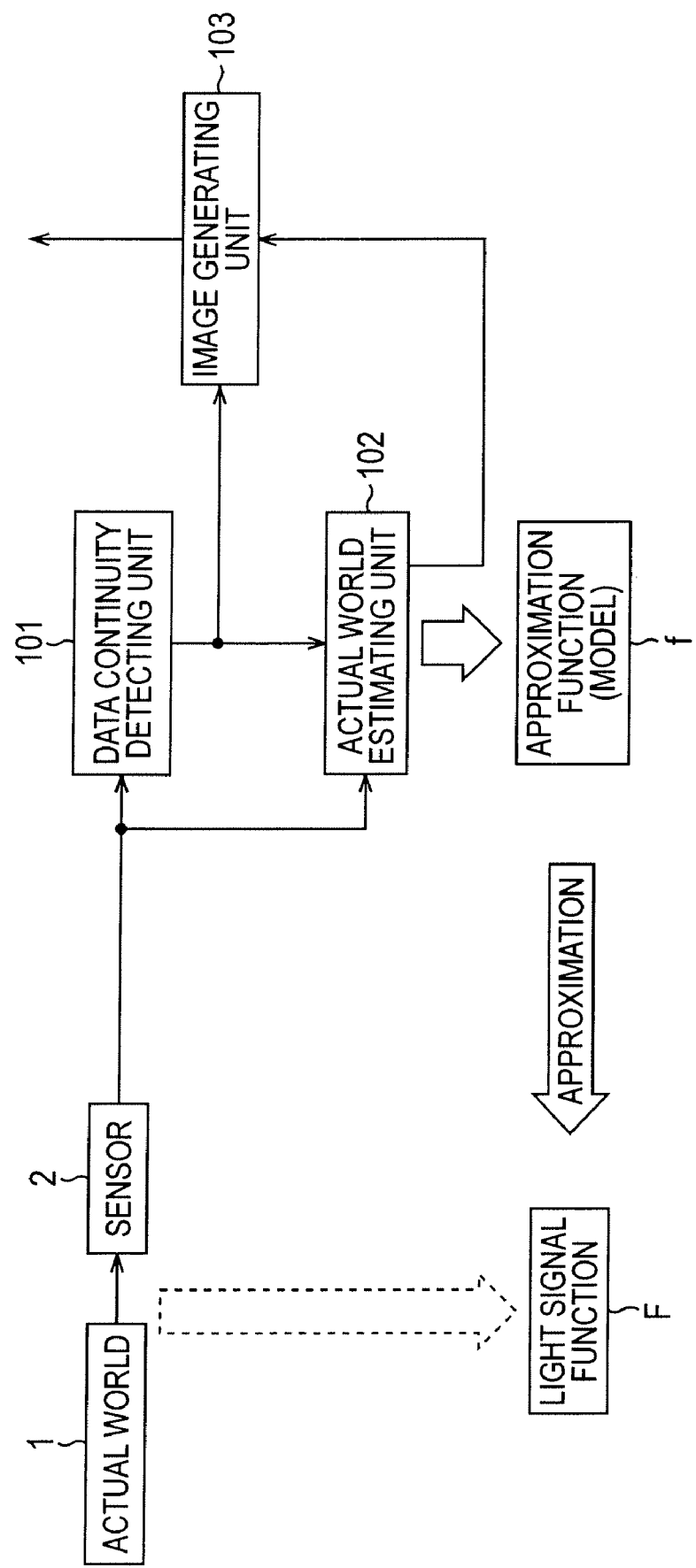
FIG. 89 is a diagram for describing the principle of re-integration, which is an example of an embodiment of the image generating unit shown in FIG. 3.

FIG. 89 is a diagram for describing the principle of the present embodiment.

As shown in FIG. 89, the present embodiment is based on condition that the actual world estimating unit 102 employs a function approximating method. That is to say, let us say that the signals in the actual world 1 (distribution of light intensity) serving as an image cast in the sensor 2 are represented with a predetermined function F, it is an assumption for the actual world estimating unit 102 to estimate the function F by approximating the function F with a predetermined function f using the input image (pixel value P) output from the sensor 2 and the data continuity information output from the data continuity detecting unit 101.

Note that hereafter, with description of the present embodiment, the signals in the actual world 1 serving as an image are particularly referred to as light signals, and the function F is particularly referred to as a light signal function F. Also, the function f is particularly referred to as an approximation function f.

With the present embodiment, the image generating unit 103 integrates the approximation function f with a predetermined time-space range using the data continuity information output from the data continuity detecting unit 101, and the actual world estimating information (in the example in FIG. 89, the features of the approximation function f or approximation function f of which the features are identified) output from the actual world estimating unit 102 based on such an assumption, and outputs the integral value as an output pixel value M (output image). Note that with the present embodiment, an input pixel value is described as P, and an output pixel value is described as M in order to distinguish an input image pixel from an output image pixel.

In other words, upon the light signal function F being integrated once, the light signal function F becomes an input pixel value P, the light signal function F is estimated from the input pixel value P (approximated with the approximation function f), the estimated light signal function F (i.e., approximation function f) is integrated again, and an output pixel value M is generated. Accordingly, hereafter, integration of the approximation function f executed by the image generating unit 103 is referred to as reintegration. Also, the present embodiment is referred to as a reintegration method.

Note that as described later, with the reintegration method, the integral range of the approximation function f in the event that the output pixel value M is generated is not restricted to the integral range of the light signal function F in the event that the input pixel value P is generated (i.e., the vertical width and horizontal width of the detecting element of the sensor 2 for the spatial direction, the exposure time of the sensor 2 for the temporal direction), an arbitrary integral range may be employed.

For example, in the event that the output pixel value M is generated, varying the integral range in the spatial direction of the integral range of the approximation function f enables the pixel pitch of an output image according to the integral range thereof to be varied. That is to say, creation of spatial resolution is available.

In the same way, for example, in the event that the output pixel value M is generated, varying the integral range in the temporal direction of the integral range of the approximation function f enables creation of temporal resolution.

Hereafter, description will be made individually regarding three specific methods of such a reintegration method with reference to the drawings.

That is to say, three specific methods are reintegration methods corresponding to three specific methods of the function approximating method (the above three specific examples of the embodiment of the actual world estimating unit 102) respectively.

Specifically, the first method is a reintegration method corresponding to the above one-dimensional approximating method (one method of the function approximating method). Accordingly, with the first method, one-dimensional reintegration is performed, so hereafter, such a reintegration method is referred to as a one-dimensional reintegration method.

The second method is a reintegration method corresponding to the above two-dimensional polynomial approximating method (one method of the function approximating method). Accordingly, with the second method, two-dimensional reintegration is performed, so hereafter, such a reintegration method is referred to as a two-dimensional reintegration method.

The third method is a reintegration method corresponding to the above three-dimensional approximating method (one method of the function approximating method). Accordingly, with the third method, three-dimensional reintegration is performed, so hereafter, such a reintegration method is referred to as a three-dimensional reintegration method.

Hereafter, description will be made regarding each details of the one-dimensional reintegration method, two-dimensional reintegration method, and three-dimensional reintegration method in this order.

First, the one-dimensional reintegration method will be described.

With the one-dimensional reintegration method, it is assumed that the approximation function f(x) is generated using the one-dimensional approximating method.

That is to say, it is an assumption that a one-dimensional waveform (with description of the reintegration method, a waveform projected in the X direction of such a waveform is referred to as an X cross-sectional waveform F(x)) wherein the light signal function F(x, y, t) of which variables are positions x, y, and z on the three-dimensional space, and a point-in-time t is projected in a predetermined direction (for example, X direction) of the X direction, Y direction, and Z direction serving as the spatial direction, and t direction serving as the temporal direction, is approximated with the approximation function f(x) serving as an n-dimensional (n is an arbitrary integer) polynomial.

In this case, with the one-dimensional reintegration method, the output pixel value M is calculated such as the following Expression (103).

$$M = G_e \times \int_{x_s}^{x_e} f(x)dx \quad (103)$$

Note that in Expression (103), $x_s$ represents an integration start position, $x_e$ represents an integration end position. Also, $G_e$ represents a predetermined gain.

Figure 90:
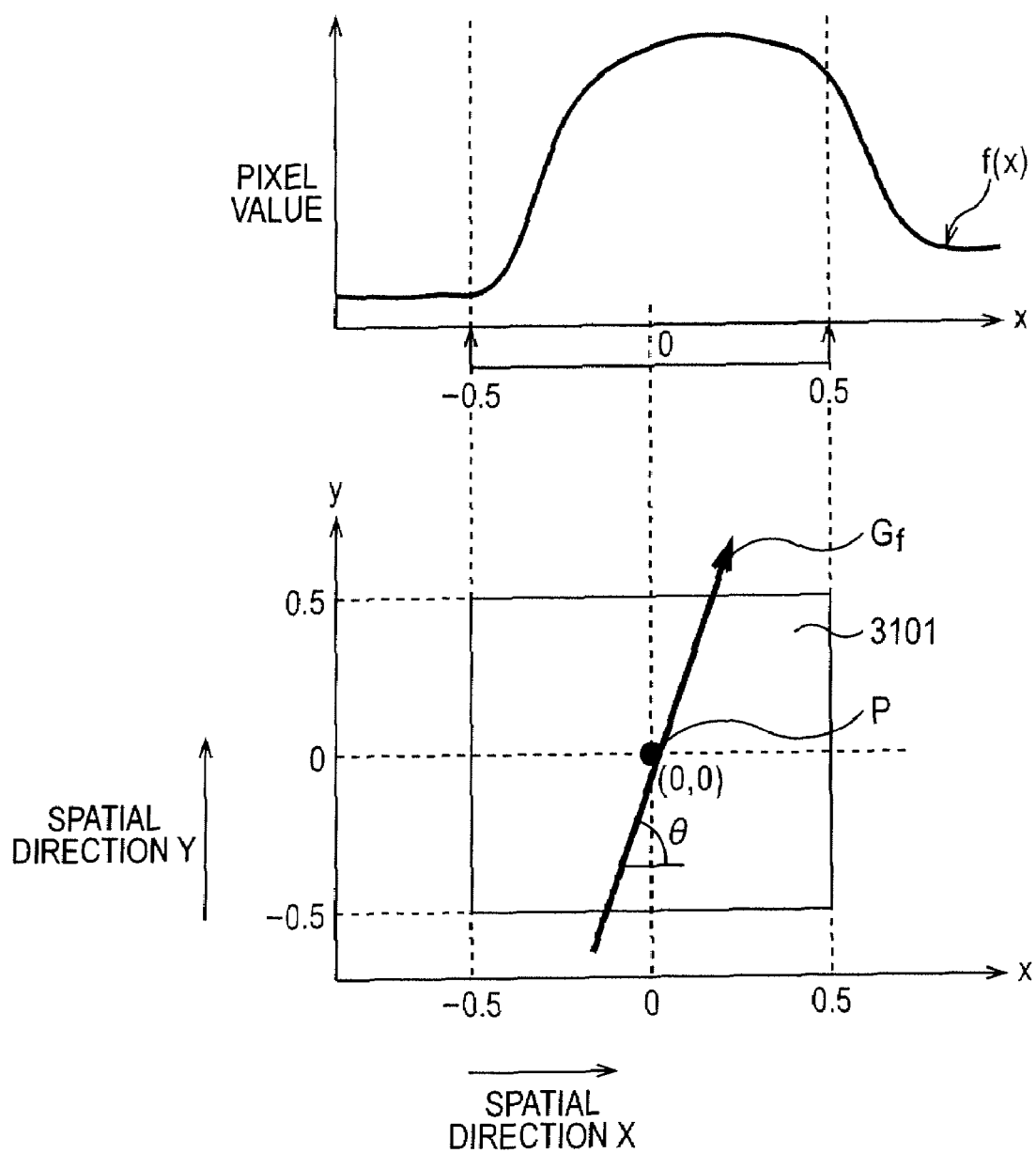
FIG. 90 is a diagram for describing an example of an input pixel and an approximation function for approximation of an actual world signal corresponding to the input pixel.

Specifically, for example, let us say that the actual world estimating unit 102 has already generated the approximation function f(x) (the approximation function f(x) of the X cross-sectional waveform F(x)) such as shown in FIG. 90 with a pixel 3101 (pixel 3101 corresponding to a predetermined detecting element of the sensor 2) such as shown in FIG. 90 as a pixel of interest.

Note that with the example in FIG. 90, the pixel value (input pixel value) of the pixel 3101 is taken as P, and the shape of the pixel 3101 is taken as a square of which one side is 1 in length. Also, of the spatial directions, the direction in parallel with one side of the pixel 3101 (horizontal direction in the drawing) is taken as the X direction, and the direction orthogonal to the X direction (vertical direction in the drawing) is taken as the Y direction.

Also, on the lower side in FIG. 90, the coordinates system (hereafter, referred to as a pixel-of-interest coordinates system) in the spatial directions (X direction and Y direction) of which the center of the pixel 3101 is taken as the origin, and the pixel 3101 in the coordinates system are shown.

Further, on the upward direction in FIG. 90, a graph representing the approximation function f(x) at y=0 (y is a coordinate value in the Y direction in the pixel-of-interest coordinates system shown on the lower side in the drawing) is shown. In this graph, the axis in parallel with the horizontal direction in the drawing is the same axis as the x axis in the X direction in the pixel-of-interest coordinates system shown on the lower side in the drawing (the origin is also the same), and also the axis in parallel with the vertical direction in the drawing is taken as an axis representing pixel values.

In this case, the relation of the following Expression (104) holds between the approximation function f(x) and the pixel value P of the pixel 3101.

$$P = \int_{-0.5}^{0.5} f(x)dx + e \quad (104)$$

Also, as shown in FIG. 90, let us say that the pixel 3101 has continuity of data in the spatial direction represented with the gradient $G_f$. Further, let us say that the data continuity detecting unit 101 (FIG. 89) has already output the angle θ such as shown in FIG. 90 as data continuity information corresponding to continuity of data represented with the gradient $G_f$.

Figure 91:
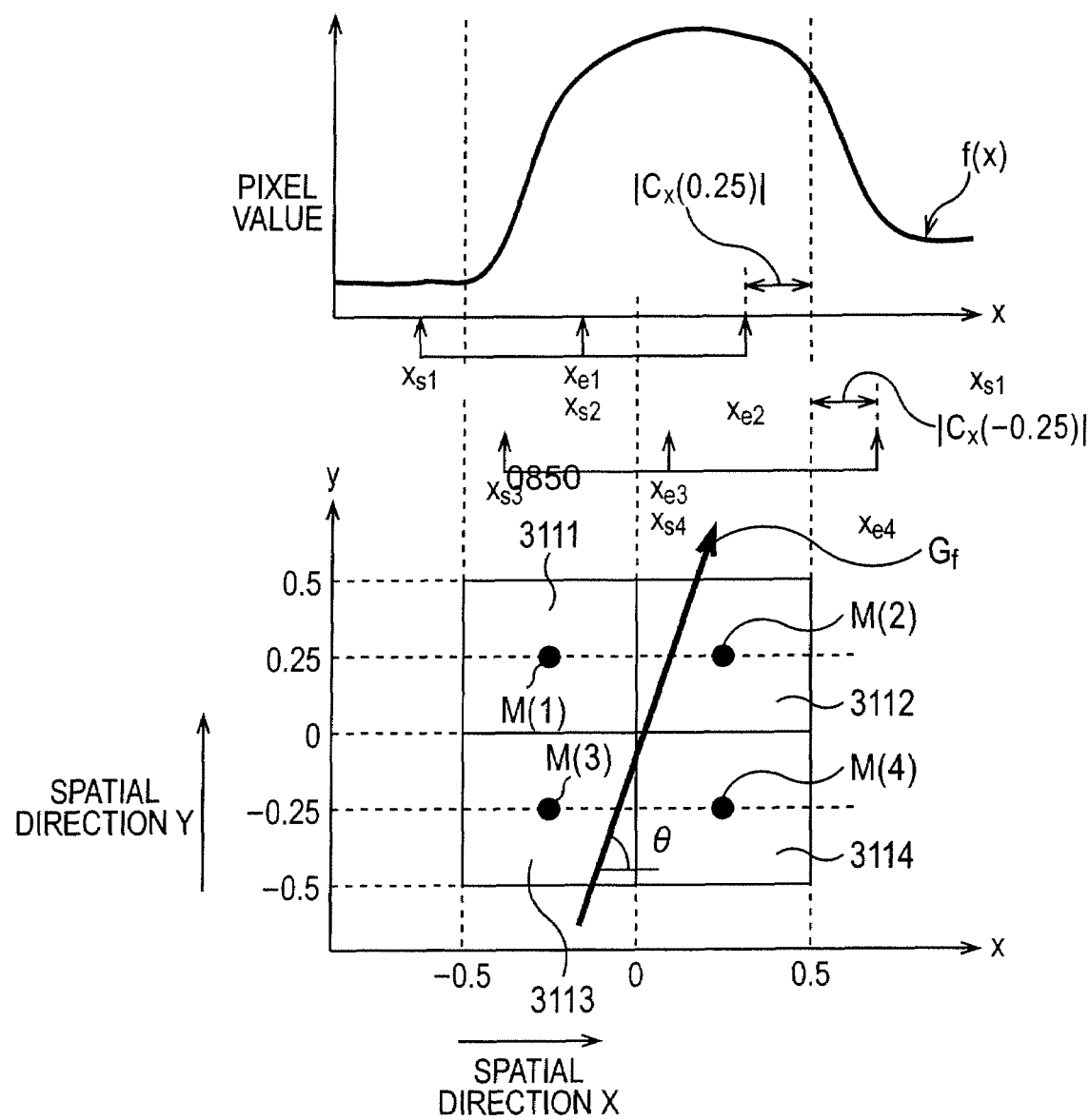
FIG. 91 is a diagram for describing an example of creating four high-resolution pixels in the one input pixel shown in FIG. 90, from the approximation function shown in FIG. 90.

In this case, for example, with the one-dimensional reintegration method, as shown in FIG. 91, four pixels 3111 through 3114 can be newly created in a range of −0.5 through 0.5 in the X direction, and also in a range of −0.5 through 0.5 in the Y direction (in the range where the pixel 3101 in FIG. 90 is positioned).

Note that on the lower side in FIG. 91, the same pixel-of-interest coordinates system as that in FIG. 90, and the pixels 3111 through 3114 in the pixel-of-interest coordinates system thereof are shown. Also, on the upper side in FIG. 91, the same graph (graph representing the approximation function f(x) at y=0) as that in FIG. 90 is shown.

Specifically, as shown in FIG. 91, with the one-dimensional reintegration method, calculation of the pixel value M(1) of the pixel 3111 using the following Expression (105), calculation of the pixel value M(2) of the pixel 3112 using the following Expression (106), calculation of the pixel value M(3) of the pixel 3113 using the following Expression (107), and calculation of the pixel value M(4) of the pixel 3114 using the following Expression (108) are available respectively.

$$M(1) = 2 \times \int_{x_{s1}}^{x_{e1}} f(x)dx \quad (105)$$

-continued $$M(2) = 2 \times \int_{x_{s2}}^{x_{e2}} f(x)dx \quad (106)$$

$$M(3) = 2 \times \int_{x_{s3}}^{x_{e3}} f(x)dx \quad (107)$$

$$M(4) = 2 \times \int_{x_{s4}}^{x_{e4}} f(x)dx \quad (108)$$

Note that $x_{s1}$ in Expression (105), $x_{s2}$ in Expression (106), $x_{s3}$ in Expression (107), and $x_{s4}$ in Expression (108) each represent the integration start position of the corresponding expression. Also, $x_{e1}$ in Expression (105), $x_{e2}$ in Expression (106), $x_{e3}$ in Expression (107), and $x_{e4}$ in Expression (108) each represent the integration end position of the corresponding expression.

The integral range in the right side of each of Expression (105) through Expression (108) becomes the pixel width (length in the X direction) of each of the pixel 3111 through pixel 3114. That is to say, each of $x_{e1}-x_{s1}$, $x_{e2}-x_{s2}$, $x_{e3}-x_{s3}$, and $x_{e4}-x_{s4}$ becomes 0.5.

However, in this case, it can be conceived that a one-dimensional waveform having the same form as that in the approximation function f(x) at y=0 continues not in the Y direction but in the direction of data continuity represented with the gradient $G_f$ (i.e., angle θ direction) (in fact, a waveform having the same form as the X cross-sectional waveform F(x) at y=0 continues in the direction of continuity). That is to say, in the case in which a pixel value f (0) in the origin (0, 0) in the pixel-of-interest coordinates system in FIG. 91 (center of the pixel 3101 in FIG. 90) is taken as a pixel value f1, the direction where the pixel value f1 continues is not the Y direction but the direction of data continuity represented with the gradient $G_f$ (angle θ direction).

In other words, in the case of conceiving the waveform of the approximation function f(x) in a predetermined position y in the Y direction (however, y is a numeric value other than zero), the position corresponding to the pixel value f1 is not a position (0, y) but a position ($C_x(y)$, y) obtained by moving in the X direction from the position (0, y) by a predetermined amount (here, let us say that such an amount is also referred to as a shift amount. Also, a shift amount is an amount depending on the position y in the Y direction, so let us say that this shift amount is described as $C_x(y)$) Accordingly, as the integral range of the right side of each of the above Expression (105) through Expression (108), the integral range needs to be set in light of the position y in the Y direction where the center of the pixel value M(l) to be obtained (however, l is any integer value of 1 through 4) exists, i.e., the shift amount $C_x(y)$.

Specifically, for example, the position y in the Y direction where the centers of the pixel 3111 and pixel 3112 exist is not y=0 but y=0.25.

Accordingly, the waveform of the approximation function f(x) at y=0.25 is equivalent to a waveform obtained by moving the waveform of the approximation function f(x) at y=0 by the shift amount $C_x(0.25)$ in the X direction.

In other words, in the above Expression (105), if we say that the pixel value M(1) as to the pixel 3111 is obtained by integrating the approximation function f(x) at y=0 with a predetermined integral range (from the start position $x_{s1}$ to the end position $x_{e1}$), the integral range thereof becomes not a range from the start position $x_{s1}=-0.5$ to the end position $x_{e1}=0$ (a range itself where the pixel 3111 occupies in the X direction) but the range shown in FIG. 91, i.e., from the start position $x_{s1}=-0.5+C_x(0.25)$ to the end position $x_{e1}=0+C_x(0.25)$ (a range where the pixel 3111 occupies in the X direction in the event that the pixel 3111 is tentatively moved by the shift amount $C_x(0.25)$).

Similarly, in the above Expression (106), if we say that the pixel value M(2) as to the pixel 3112 is obtained by integrating the approximation function f(x) at y=0 with a predetermined integral range (from the start position $x_{s2}$ to the end position $x_{e2}$), the integral range thereof becomes not a range from the start position $x_{s2}=0$ to the end position $x_{e2}=0.5$ (a range itself where the pixel 3112 occupies in the X direction) but the range shown in FIG. 91, i.e., from the start position $x_{s2}=0+C_x(0.25)$ to the end position $x_{e1}=0.5+C_x(0.25)$ (a range where the pixel 3112 occupies in the X direction in the event that the pixel 3112 is tentatively moved by the shift amount $C_x(0.25)$).

Also, for example, the position y in the Y direction where the centers of the pixel 3113 and pixel 3114 exist is not y=0 but y=−0.25.

Accordingly, the waveform of the approximation function f(x) at y=−0.25 is equivalent to a waveform obtained by moving the waveform of the approximation function f(x) at y=0 by the shift amount $C_x(-0.25)$ in the X direction.

In other words, in the above Expression (107), if we say that the pixel value M(3) as to the pixel 3113 is obtained by integrating the approximation function f(x) at y =0 with a predetermined integral range (from the start position $x_{s3}$ to the end position $x_{e3}$), the integral range thereof becomes not a range from the start position $x_{s3}=-0.5$ to the end position $x_{e3}=0$ (a range itself where the pixel 3113 occupies in the X direction) but the range shown in FIG. 91, i.e., from the start position $x_{s3}=-0.5+C_x(-0.25)$ to the end position $x_{e3}=0+C_x(-0.25)$ (a range where the pixel 3113 occupies in the X direction in the event that the pixel 3113 is tentatively moved by the shift amount $C_x(-0.25)$).

Similarly, in the above Expression (108), if we say that the pixel value M(4) as to the pixel 3114 is obtained by integrating the approximation function f(x) at y=0 with a predetermined integral range (from the start position $x_{s4}$ to the end position $x_{e4}$), the integral range thereof becomes not a range from the start position $x_{s4}=0$ to the end position $x_{e4}=0.5$ (a range itself where the pixel 3114 occupies in the X direction) but the range shown in FIG. 91, i.e., from the start position $x_{s4}=0+C_x(-0.25)$ to the end position $x_{e1}=0.5+C_x(-0.25)$ (a range where the pixel 3114 occupies in the X direction in the event that the pixel 3114 is tentatively moved by the shift amount $C_x(-0.25)$).

Accordingly, the image generating unit 102 (FIG. 89) calculates the above Expression (105) through Expression (108) by substituting the corresponding integral range of the above integral ranges for each of these expressions, and outputs the calculated results of these as the output pixel values M(1) through M(4).

Thus, the image generating unit 102 can create four pixels having higher spatial resolution than that of the output pixel 3101, i.e., the pixel 3111 through pixel 3114 (FIG. 91) by employing the one-dimensional reintegration method as a pixel at the output pixel 3101 (FIG. 90) from the sensor 2 (FIG. 89). Further, though not shown in the drawing, as described above, the image generating unit 102 can create a pixel having an arbitrary powered spatial resolution as to the output pixel 3101 without deterioration by appropriately changing an integral range, in addition to the pixel 3111 through pixel 3114.

Figure 92:
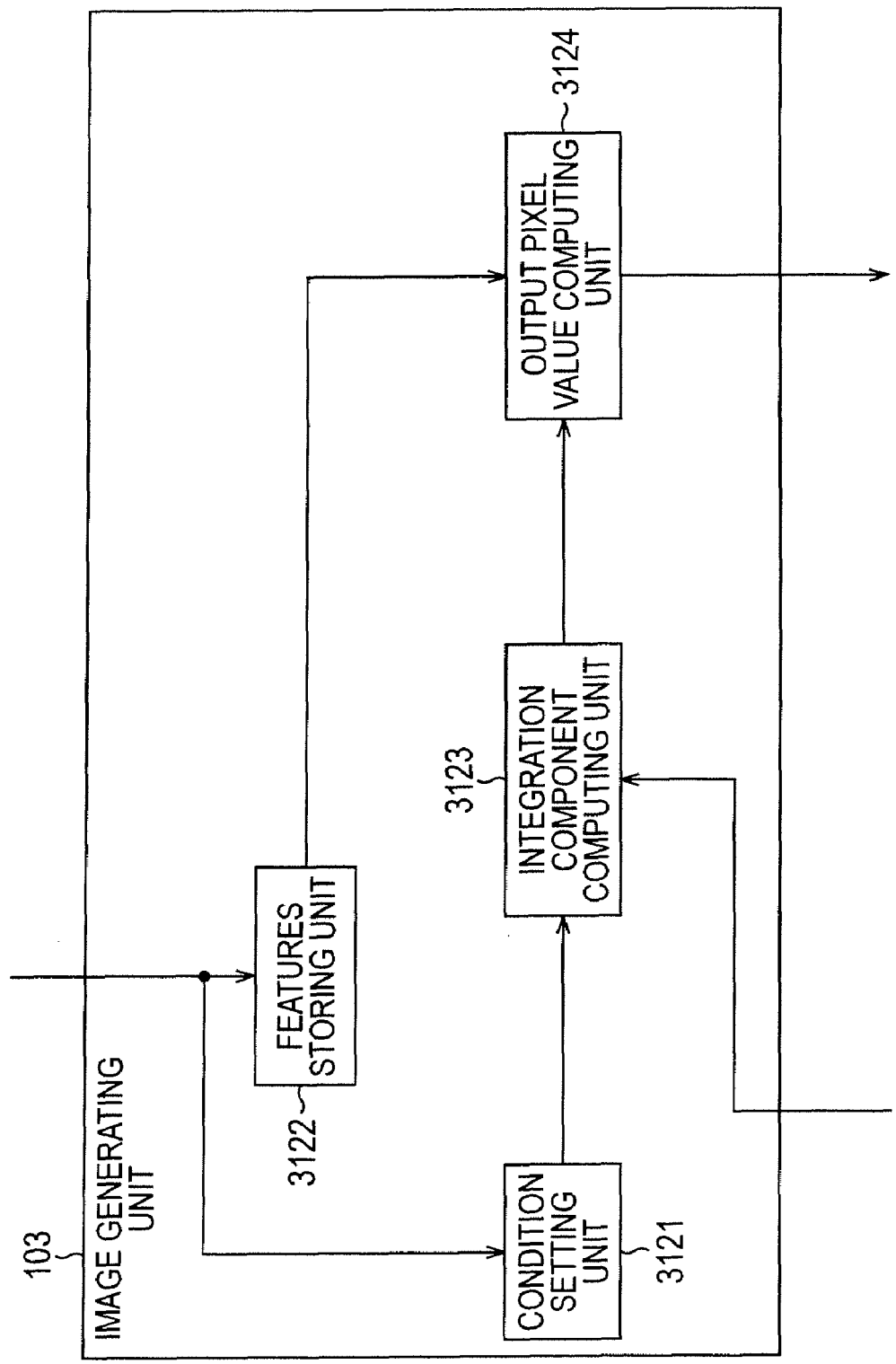
FIG. 92 is a block diagram for describing a configuration example of an image generating unit using, of re-integration techniques having the principle shown in FIG. 89, one-dimensional re-integration technique.

FIG. 92 represents a configuration example of the image generating unit 103 employing such a one-dimensional reintegration method.

As shown in FIG. 92, the image generating unit 103 shown in this example includes a conditions setting unit 3121, features storage unit 3122, integral component calculation unit 3123, and output pixel value calculation unit 3124.

The conditions setting unit 3121 sets the number of dimensions n of the approximation function f(x) based on the actual world estimating information (the features of the approximation function f(x) in the example in FIG. 92) supplied from the actual world estimating unit 102.

The conditions setting unit 3121 also sets an integral range in the case of reintegrating the approximation function f(x) (in the case of calculating an output pixel value). Note that an integral range set by the conditions setting unit 3121 does not need to be the width of a pixel. For example, the approximation function f(x) is integrated in the spatial direction (X direction), and accordingly, a specific integral range can be determined as long as the relative size (power of spatial resolution) of an output pixel (pixel to be calculated by the image generating unit 103) as to the spatial size of each pixel of an input image from the sensor 2 (FIG. 89) is known. Accordingly, the conditions setting unit 3121 can set, for example, a spatial resolution power as an integral range.

The features storage unit 3122 temporally stores the features of the approximation function f(x) sequentially supplied from the actual world estimating unit 102. Subsequently, upon the features storage unit 3122 storing all of the features of the approximation function f(x), the features storage unit 3122 generates a features table including all of the features of the approximation function f(x), and supplies this to the output pixel value calculation unit 3124.

Incidentally, as described above, the image generating unit 103 calculates the output pixel value M using the above Expression (103), but the approximation function f(x) included in the right side of the above Expression (103) is represented as the following Expression (109) specifically.

$$f(x) = \sum_{i=0}^{n} w_i \times x^i dx \qquad (109)$$

Note that in Expression (109), $w_i$ represents the features of the approximation function f(x) supplied from the actual world estimating unit 102.

Accordingly, upon the approximation function f(x) of Expression (109) being substituted for the approximation function f(x) of the right side of the above Expression (103) so as to expand (calculate) the right side of Expression (103), the output pixel value M is represented as the following Expression (110).

$$M = G_e \times \sum_{i=0}^{n} w_i \times \frac{x_e^{i+1} - x_s^{i+1}}{i+1} \qquad (110)$$

$$= \sum_{i=0}^{n} w_i \times k_i(x_s, x_e)$$

In Expression (110), $K_i(x_s, x_e)$ represent the integral components of the i-dimensional term. That is to say, the integral components $K_i(x_s, x_e)$ are such as shown in the following Expression (111).

$$k_i(x_s, x_e) = G_e \times \frac{x_e^{i+1} - x_s^{i+1}}{i+1} \qquad (111)$$

The integral component calculation unit 3123 calculates the integral components $K_i(x_s, x_e)$.

Specifically, as shown in Expression (111), the integral components $K_i(x_s, x_e)$ can be calculated as long as the start position $x_s$ and end position $x_e$ of an integral range, gain $G_e$, and i of the i-dimensional term are known.

Of these, the gain $G_e$ is determined with the spatial resolution power (integral range) set by the conditions setting unit 3121.

The range of i is determined with the number of dimensions n set by the conditions setting unit 3121.

Also, each of the start position $x_s$ and end position $x_e$ of an integral range is determined with the center pixel position (x, y) and pixel width of an output pixel to be generated from now, and the shift amount $C_x(y)$ representing the direction of data continuity. Note that (x, y) represents the relative position from the center position of a pixel of interest when the actual world estimating unit 102 generates the approximation function f(x).

Further, each of the center pixel position (x, y) and pixel width of an output pixel to be generated from now is determined with the spatial resolution power (integral range) set by the conditions setting unit 3121.

Also, with the shift amount $C_x(y)$, and the angle θ supplied from the data continuity detecting unit 101, the relation such as the following Expression (112) and Expression (113) holds, and accordingly, the shift amount $C_x(y)$ is determined with the angle θ.

$$G_f = \tan\theta = \frac{dy}{dx} \qquad (112)$$

$$C_x(y) = \frac{y}{G_f} \qquad (113)$$

Note that in Expression (112), $G_f$ represents a gradient representing the direction of data continuity, θ represents an angle (angle generated between the X direction serving as one direction of the spatial directions and the direction of data continuity represented with a gradient $G_f$) of one of the data continuity information output from the data continuity detecting unit 101 (FIG. 89). Also, dx represents the amount of fine movement in the X direction, and dy represents the amount of fine movement in the Y direction (spatial direction perpendicular to the X direction) as to the dx.

Accordingly, the integral component calculation unit 3123 calculates the integral components $K_i(x_s, x_e)$ based on the number of dimensions and spatial resolution power (integral range) set by the conditions setting unit 3121, and the angle θ of the data continuity information output from the data continuity detecting unit 101, and supplies the calculated results to the output pixel value calculation unit 3124 as an integral component table.

The output pixel value calculation unit 3124 calculates the right side of the above Expression (110) using the features table supplied from the features storage unit 3122 and the integral component table supplied from the integral component calculation unit 3123, and outputs the calculation result as an output pixel value M.

Next, description will be made regarding image generating processing (processing in step S103 in FIG. 29) by the image generating unit 103 (FIG. 92) employing the one-dimensional reintegration method with reference to the flowchart in FIG. 93.

For example, now, let us say that the actual world estimating unit 102 has already generated the approximation function f(x) such as shown in FIG. 90 while taking the pixel 3101 such as shown in FIG. 90 described above as a pixel of interest at the processing in step S102 in FIG. 29 described above.

Also, let us say that the data continuity detecting unit 101 has already output the angle θ such as shown in FIG. 90 as data continuity information at the processing in step S101 in FIG. 29 described above.

Figure 93:
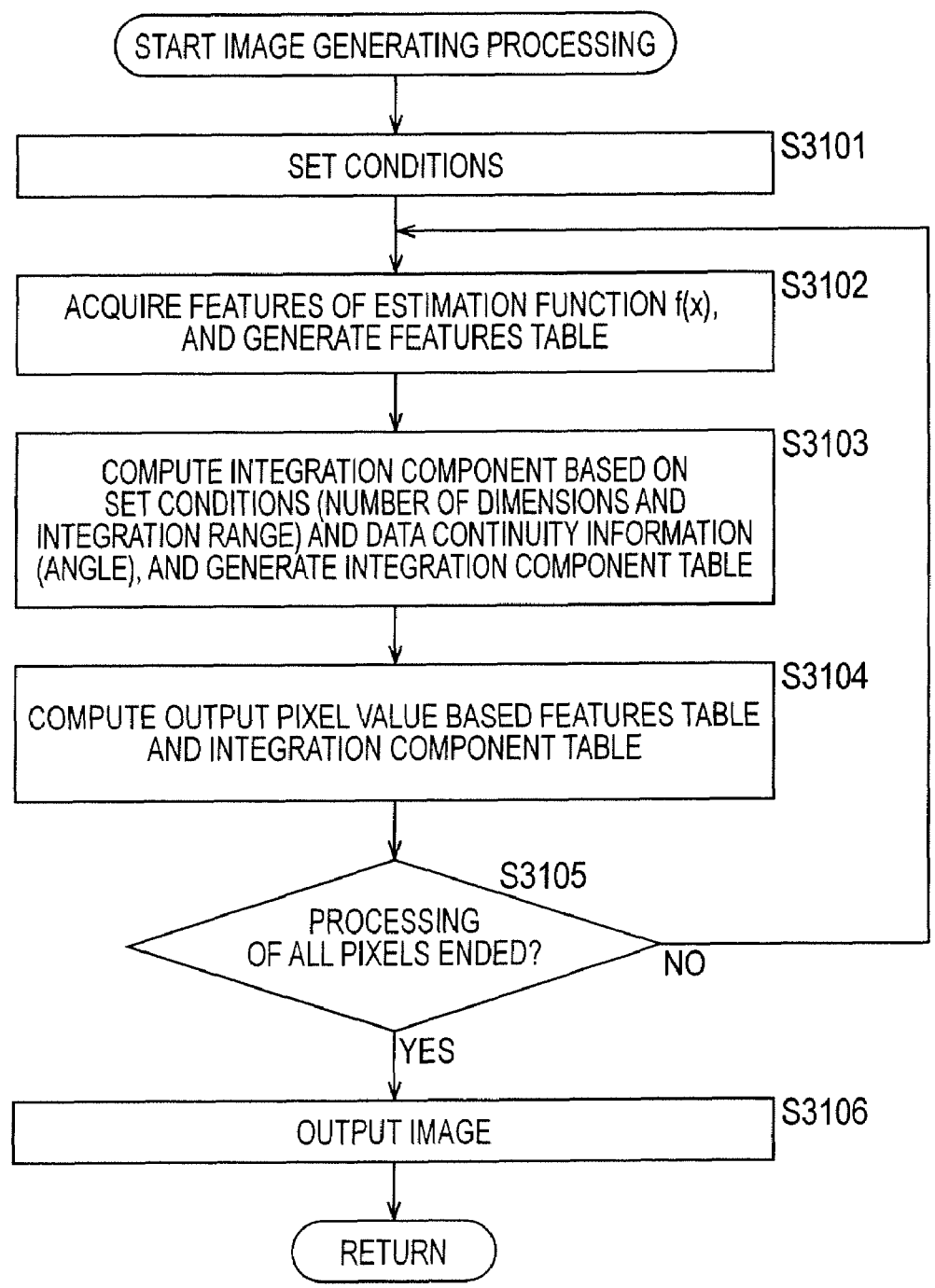
FIG. 93 is a flowchart for describing the image generating processing which the image generating unit of the configuration shown in FIG. 92 executes.

In this case, the conditions setting unit 3121 sets conditions (the number of dimensions and an integral range) at step S3101 in FIG. 93.

For example, now, let us say that 5 has been set as the number of dimensions, and also a spatial quadruple density (spatial resolution power to cause the pitch width of a pixel to become half power in the upper/lower/left/right sides) has been set as an integral range.

That is to say, in this case, consequently, it has been set that the four pixel 3111 through pixel 3114 are created newly in a range of −0.5 through 0.5 in the X direction, and also a range of −0.5 through 0.5 in the Y direction (in the range of the pixel 3101 in FIG. 90), such as shown in FIG. 91.

In step S3102, the features storage unit 3122 acquires the features of the approximation function f(x) supplied from the actual world estimating unit 102, and generates a features table. In this case, coefficients $w_0$ through $W_5$ of the approximation function f(x) serving as a five-dimensional polynomial are supplied from the actual world estimating unit 102, and accordingly, ($w_0$, $w_1$, $w_2$, $w_3$, $w_4$, $w_5$) is generated as a features table.

In step S3103, the integral component calculation unit 3123 calculates integral components based on the conditions (the number of dimensions and integral range) set by the conditions setting unit 3121, and the data continuity information (angle θ) supplied from the data continuity detecting unit 101, and generates an integral component table.

Specifically, for example, if we say that the respective pixels 3111 through 3114, which are to be generated from now, are appended with numbers (hereafter, such a number is referred to as a mode number) 1 through 4, the integral component calculation unit 3123 calculates the integral components $K_i(x_s, x_e)$ of the above Expression (111) as a function of l (however, l represents a mode number) such as integral components $K_i(l)$ shown in the left side of the following Expression (114).

$$K_i(l) = K_i(x_s, x_e) \quad (114)$$

Specifically, in this case, the integral components $K_i(l)$ shown in the following Expression (115) are calculated.

$$k_i(1) = k_i(-0.5 - C_x(-0.25), 0 - C_x(-0.25)) \quad (115)$$
$$k_i(2) = k_i(0 - C_x(-0.25), 0.5 - C_x(-0.25))$$
$$k_i(3) = k_i(-0.5 - C_x(0.25), 0 - C_x(0.25))$$
$$k_i(4) = k_i(0 - C_x(0.25), 0.5 - C_x(0.25))$$

Note that in Expression (115), the left side represents the integral components $K_i(l)$, and the right side represents the integral components $K_i(x_s, x_e)$. That is to say, in this case, l is any one of 1 through 4, and also i is any one of 0 through 5, and accordingly, 24 $K_i(l)$ in total of 6 $K_i(1)$, 6 $K_i(2)$, 6 $K_i(3)$, and 6 $K_i(4)$ are calculated.

More specifically, first, the integral component calculation unit 3123 calculates each of the shift amounts $C_x(-0.25)$ and $C_x(0.25)$ from the above Expression (112) and Expression (113) using the angle θ supplied from the data continuity detecting unit 101.

Next, the integral component calculation unit 3123 calculates the integral components $K_i(x_s, x_e)$ of each right side of the four expressions in Expression (115) regarding i=0 through 5 using the calculated shift amounts $C_x(-0.25)$ and $C_x(0.25)$. Note that with this calculation of the integral components $K_i(x_s, x_e)$, the above Expression (111) is employed.

Subsequently, the integral component calculation unit 3123 converts each of the 24 integral components $K_i(x_s, x_e)$ calculated into the corresponding integral components $K_i(l)$ in accordance with Expression (115), and generates an integral component table including the 24 integral components $K_i(l)$ converted (i.e., 6 $K_i(1)$, 6 $K_i(2)$, 6 $K_i(3)$, and 6 $K_i(4)$).

Note that the sequence of the processing in step S3102 and the processing in step S3103 is not restricted to the example in FIG. 93, the processing in step S3103 may be executed first, or the processing in step S3102 and the processing in step S3103 may be executed simultaneously.

Next, in step S3104, the output pixel value calculation unit 3124 calculates the output pixel values M(1) through M(4) respectively based on the features table generated by the features storage unit 3122 at the processing in step S3102, and the integral component table generated by the integral component calculation unit 3123 at the processing in step S3103.

Specifically, in this case, the output pixel value calculation unit 3124 calculates each of the pixel value M(1) of the pixel 3111 (pixel of mode number 1), the pixel value M(2) of the pixel 3112 (pixel of mode number 2), the pixel value M(3) of the pixel 3113 (pixel of mode number 3), and the pixel value M(4) of the pixel 3114 (pixel of mode number 4) by calculating the right sides of the following Expression (116) through Expression (119) corresponding to the above Expression (110).

$$M(1) = \sum_{i=0}^{5} w_i k_i(1) \quad (116)$$

$$M(2) = \sum_{i=0}^{5} w_i k_i(2) \quad (117)$$

$$M(3) = \sum_{i=0}^{5} w_i k_i(3) \quad (118)$$

$$M(4) = \sum_{i=0}^{5} w_i k_i(4) \quad (119)$$

In step S3105, the output pixel value calculation unit 3124 determines regarding whether or not the processing of all the pixels has been completed.

In step S3105, in the event that determination is made that the processing of all the pixels has not been completed, the processing returns to step S3102, wherein the subsequent processing is repeatedly performed. That is to say, the pixels that have not become a pixel of interest are sequentially taken as a pixel of interest, and the processing in step S3102 through S3104 is repeatedly performed.

In the event that the processing of all the pixels has been completed (in step S3105, in the event that determination is made that the processing of all the pixels has been completed), the output pixel value calculation unit 3124 outputs the image in step S3106. Then, the image generating processing ends.

Next, description will be made regarding the differences between the output image obtained by employing the one-dimensional reintegration method and the output image obtained by employing another method (conventional classification adaptation processing) regarding a predetermined input image with reference to FIG. 94 through FIG. 101.

Figure 94:
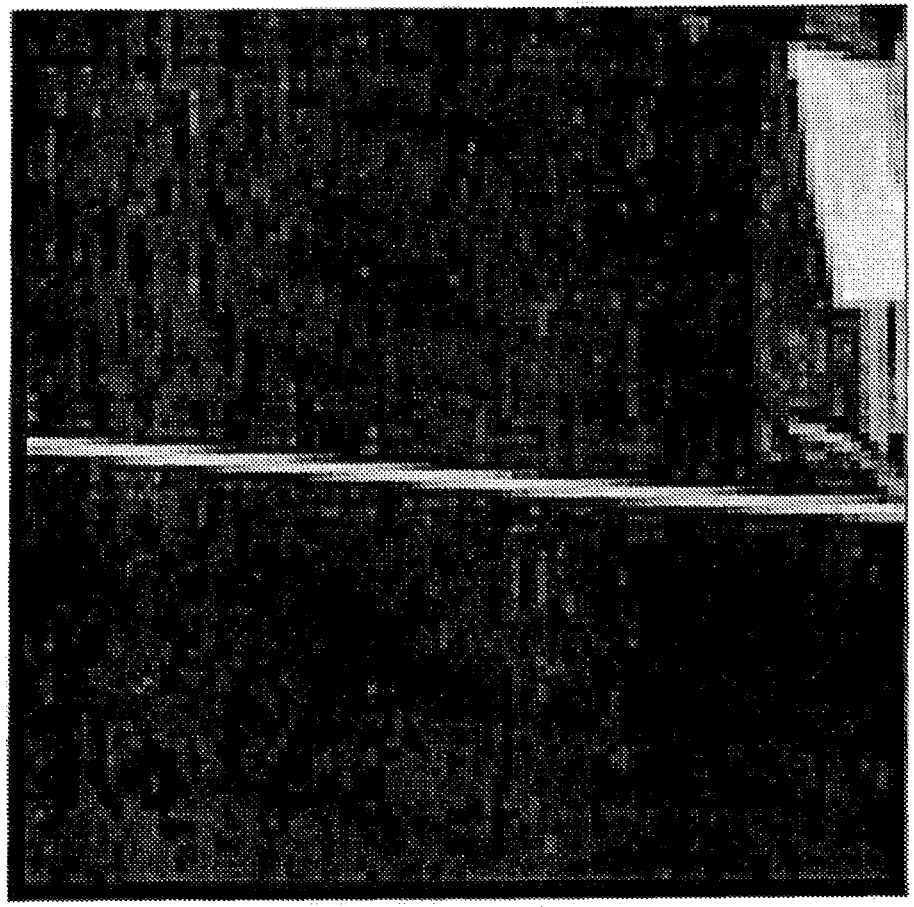
FIG. 94 is a diagram illustrating an example of the original image of the input image.
Figure 95:
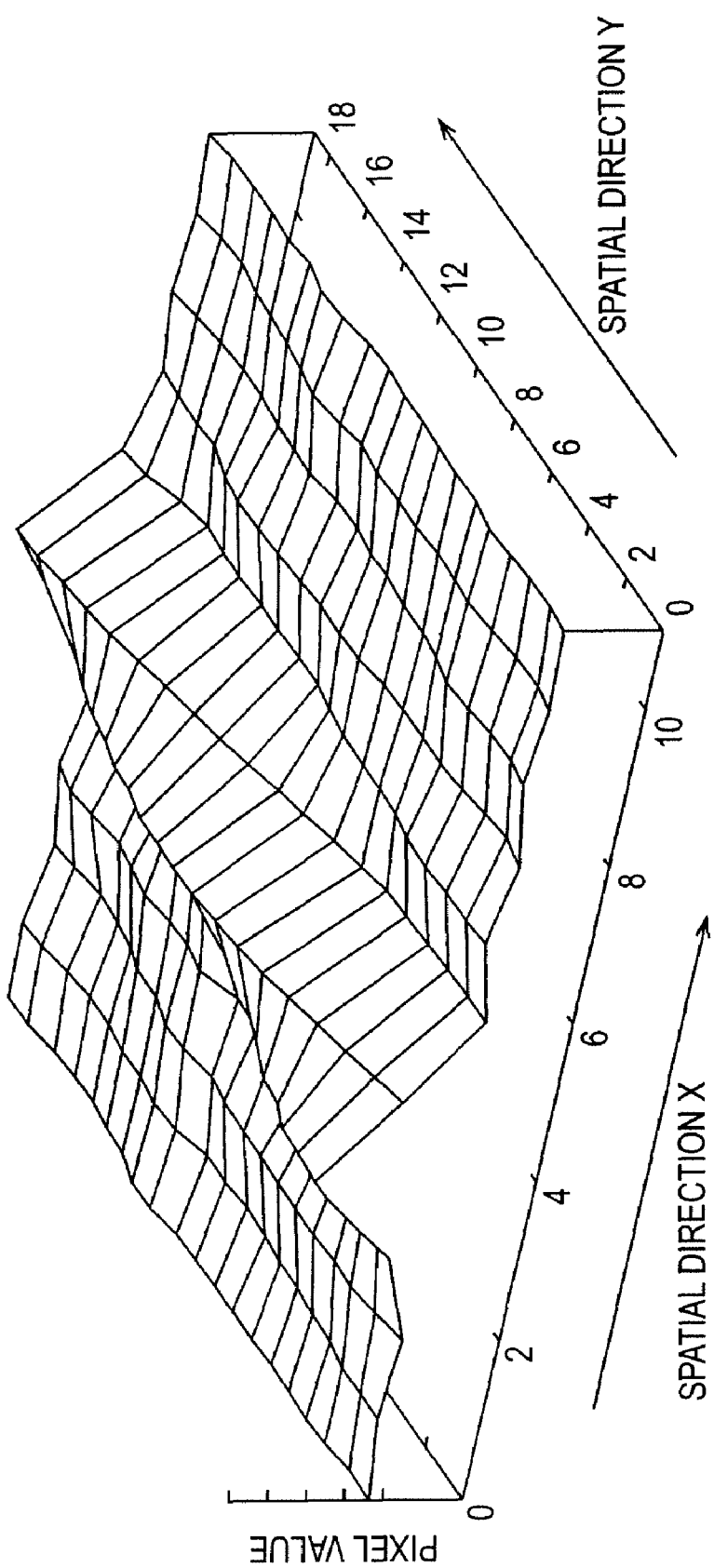
FIG. 95 is a diagram illustrating an example of image data corresponding to the image shown in FIG. 94.

FIG. 94 is a diagram illustrating the original image of the input image, and FIG. 95 illustrates image data corresponding to the original image in FIG. 94. In FIG. 95, the axis in the vertical direction in the drawing represents pixel values, and the axis in the lower right direction in the drawing represents the X direction serving as one direction of the spatial directions of the image, and the axis in the upper right direction in the drawing represents the Y direction serving as the other direction of the spatial directions of the image. Note that the respective axes in later-described FIG. 97, FIG. 99, and FIG. 101 corresponds to the axes in FIG. 95.

Figure 96:
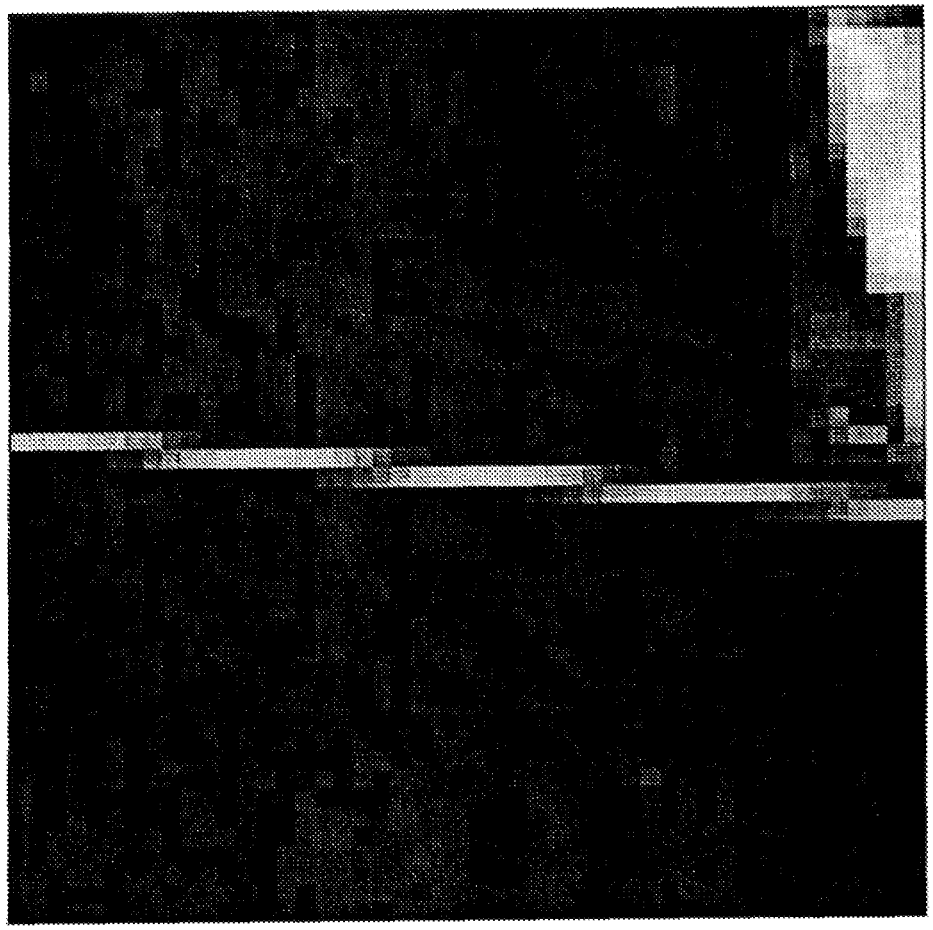
FIG. 96 is a diagram representing an example of an input image.
Figure 97:
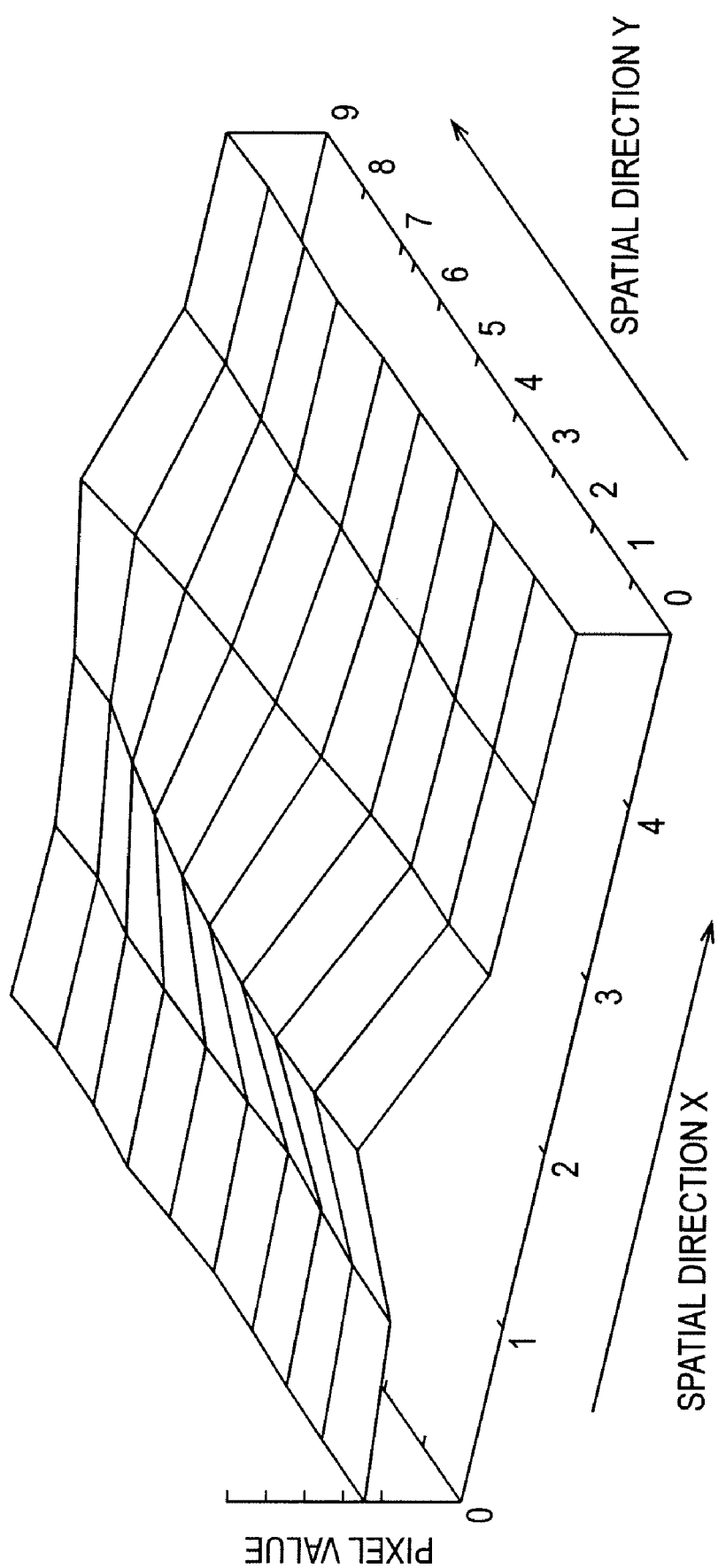
FIG. 97 is a diagram representing an example of image data corresponding to the image shown in FIG. 96.

FIG. 96 is a diagram illustrating an example of an input image. The input image illustrated in FIG. 96 is an image generated by taking the mean of the pixel values of the pixels belonged to a block made up of 2×2 pixels shown in FIG. 94 as the pixel value of one pixel. That is to say, the input image is an image obtained by integrating the image shown in FIG. 94 in the spatial direction, which imitates the integration property of a sensor. Also, FIG. 97 illustrates image data corresponding to the input image in FIG. 96.

The original image illustrated in FIG. 94 includes a fine-line image inclined almost 5° clockwise from the vertical direction. Similarly, the input image illustrated in FIG. 96 includes a fine-line image inclined almost 5° clockwise from the vertical direction.

Figure 98:
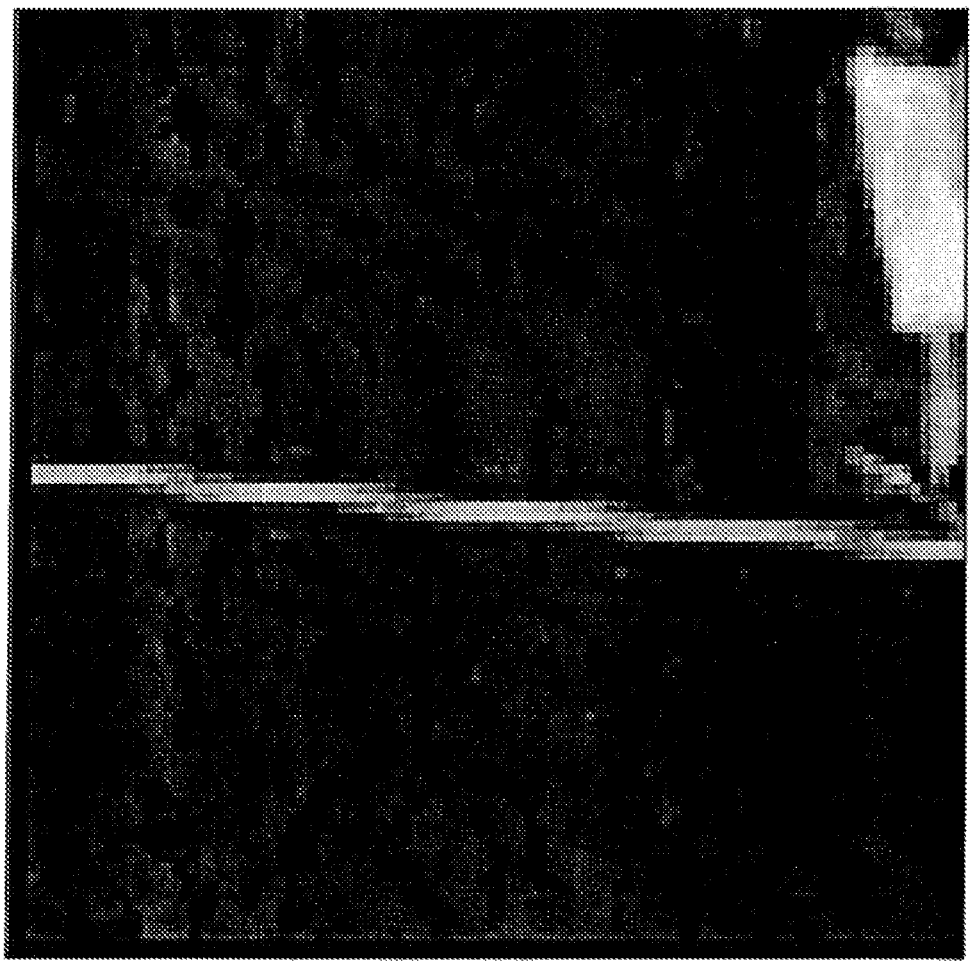
FIG. 98 is a diagram illustrating an example of an image obtained by subjecting an input image to conventional class classification adaptation processing.
Figure 99:
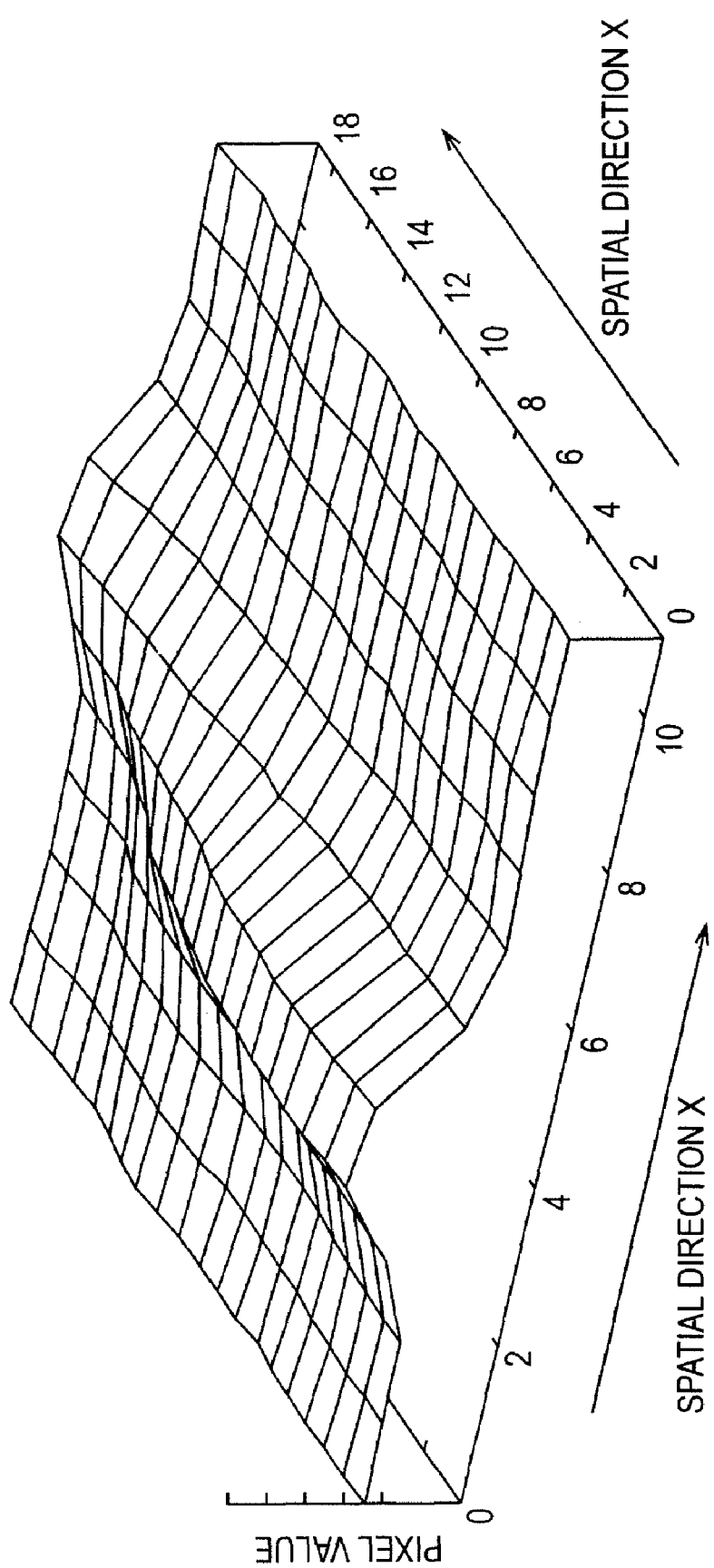
FIG. 99 is a diagram representing an example of image data corresponding to the image shown in FIG. 98.

FIG. 98 is a diagram illustrating an image (hereafter, the image illustrated in FIG. 98 is referred to as the original image) obtained by subjecting the input image illustrated in FIG. 96 to conventional class classification adaptation processing. Also, FIG. 99 illustrates image data corresponding to the conventional image.

Note that the class classification adaptation processing is made up of classification processing and adaptation processing, data is classified based on the property thereof by the class classification processing, and is subjected to the adaptation processing for each class, as described above. With the adaptation processing, for example, a low-quality or standard-quality image is subjected to mapping using a predetermined tap coefficient so as to be converted into a high-quality image.

Figure 100:
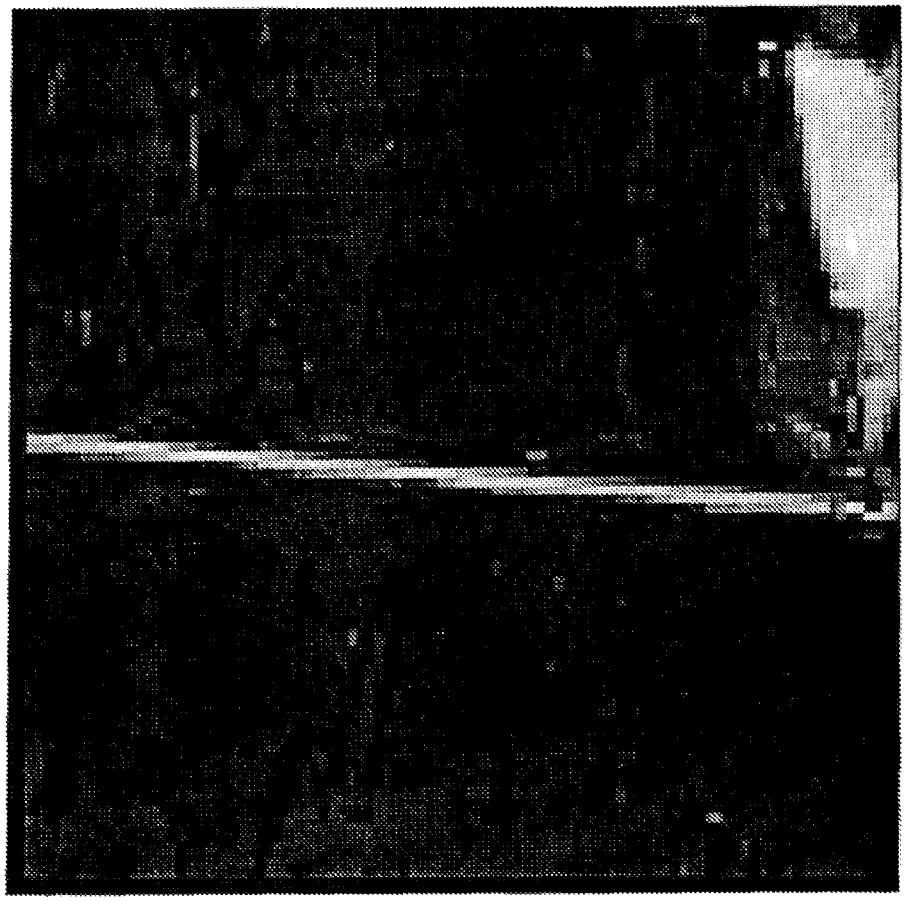
FIG. 100 is a diagram illustrating an example of an image obtained by subjecting an input image to the one-dimensional re-integration technique.
Figure 101:
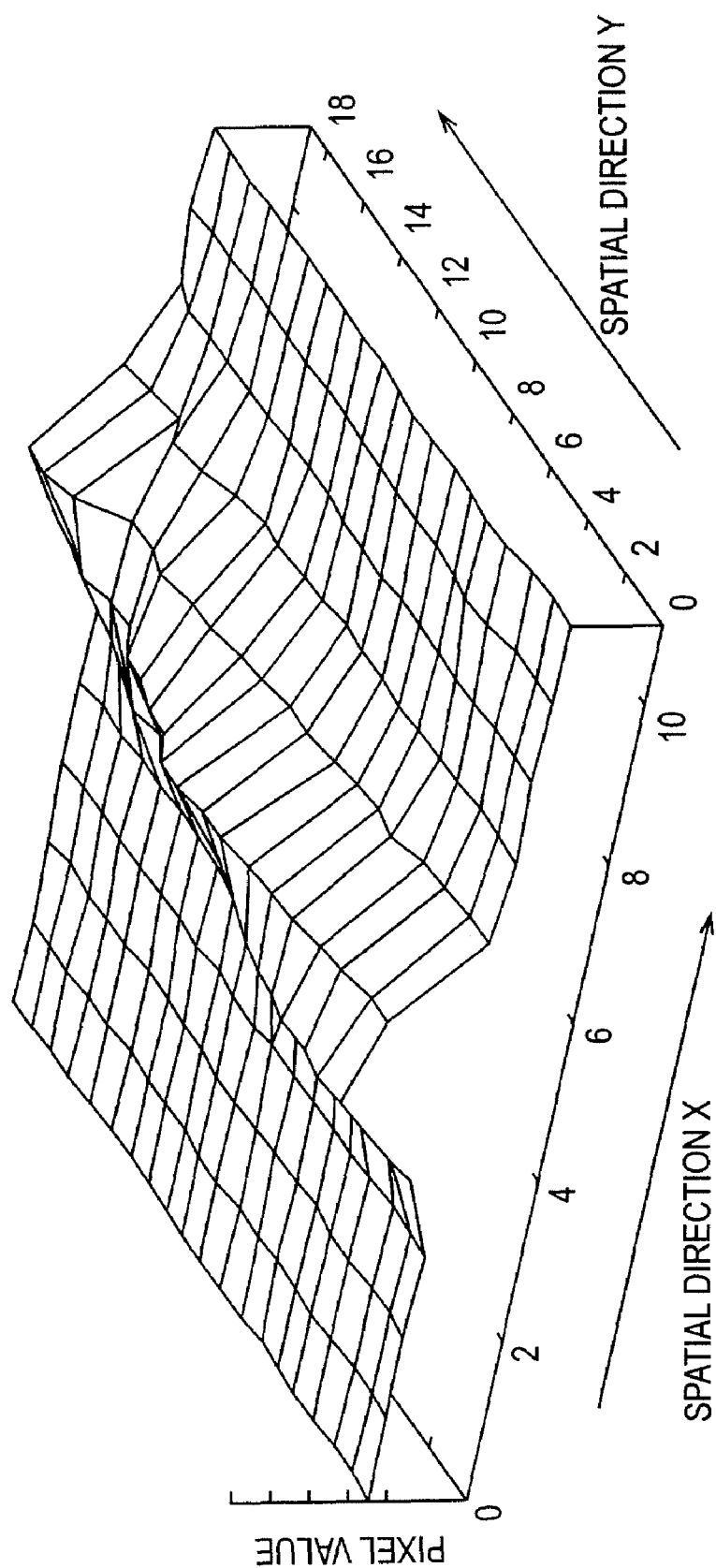
FIG. 101 is a diagram illustrating an example of image data corresponding to the image shown in FIG. 100.

FIG. 100 is a diagram illustrating an image (hereafter, the image illustrated in FIG. 100 is referred to as a reintegration image) obtained by applying the one-dimensional reintegration method, to the input image illustrated in FIG. 96. Also, FIG. 101 illustrates image data corresponding to the reintegration image.

It can be understood that upon the conventional image in FIG. 98 being compared with the reintegration image in FIG. 100, a fine-line image is different from that in the original image in FIG. 94 in the conventional image, but on the other hand, the fine-line image is almost the same as that in the original image in FIG. 94 in the reintegration image.

This difference is caused by a difference wherein the conventional class classification adaptation processing is a method for performing processing on the basis (origin) of the input image in FIG. 96, but on the other hand, the one-dimensional reintegration method is a method for estimating the original image in FIG. 94 (generating the approximation function f(x) corresponding to the original image) in light of continuity of a fine line, and performing processing (performing reintegration so as to calculate pixel values) on the basis (origin) of the original image estimated.

Thus, with the one-dimensional reintegration method, the output image (pixel value) is generated by integrating the approximation function f(x) in an arbitrary range, using an approximation function f(x) such as a primary polynomial generated by a one-dimensional approximation method (the approximation function f(x) of the X-cross section waveform F(x) of the actual world) as a standard (origin).

Accordingly, with the one-dimensional reintegration method, it becomes possible to output an image more similar to the original image (the light signal in the actual world 1 which is to be cast in the sensor 2) in comparison with the conventional other methods.

Also, with the one-dimensional reintegration method, as described above, the integral range is arbitrary, and accordingly, it becomes possible to create resolution (temporal resolution or spatial resolution) different from the resolution of an input image by varying the integral range. That is to say, it becomes possible to generate an image having arbitrary powered resolution as well as an integer value as to the resolution of the input image.

Further, the one-dimensional reintegration method enables calculation of an output image (pixel values) with less calculation processing amount than other reintegration methods.

Next, description will be made regarding a two-dimensional reintegration method with reference to FIG. 102 through FIG. 108.

The two-dimensional reintegration method is based on condition that the approximation function f(x, y) has been generated with the two-dimensional polynomial approximating method.

Figure 102:
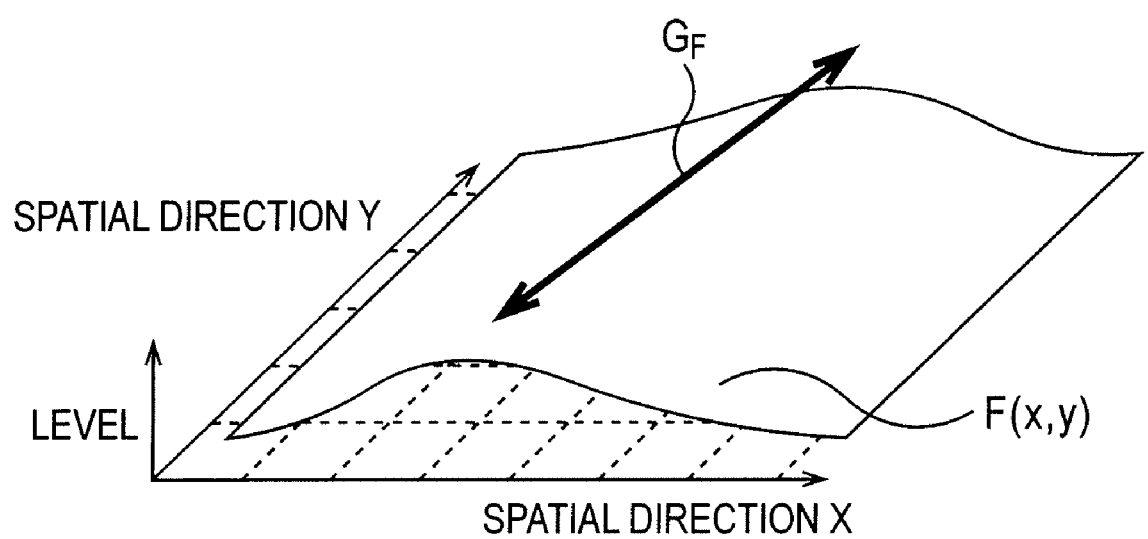
FIG. 102 is a diagram for describing actual-world signals having continuity in the spatial direction.

That is to say, for example, it is an assumption that the image function F(x, y, t) representing the light signal in the actual world 1 (FIG. 89) having continuity in the spatial direction represented with the gradient $G_F$ has been approximated with a waveform projected in the spatial directions (X direction and Y direction), i.e., the waveform F(x, y) on the X-Y plane has been approximated with the approximation function f(x, y) serving as a n-dimensional (n is an arbitrary integer) polynomial, such as shown in FIG. 102.

In FIG. 102, the horizontal direction represents the X direction serving as one direction in the spatial directions, the upper right direction represents the Y direction serving as the other direction in the spatial directions, and the vertical direction represents light levels, respectively in the drawing. $G_F$ represents gradient as continuity in the spatial directions.

Note that with the example in FIG. 102, the direction of continuity is taken as the spatial directions (X direction and Y direction), so the projection function of a light signal to be approximated is taken as the function F(x, y), but as described later, the function F(x, t) or function F(y, t) may be a target of approximation according to the direction of continuity.

In the case of the example in FIG. 102, with the two-dimensional reintegration method, the output pixel value M is calculated as the following Expression (120).

$$M = G_e \times \int_{y_s}^{y_e} \int_{x_s}^{x_e} f(x, y) dx dy \qquad (120)$$

Note that in Expression (120), $y_s$ represents an integration start position in the Y direction, and $y_e$ represents an integration end position in the Y direction. Similarly, $x_s$ represents an integration start position in the X direction, and $x_e$ represents an integration end position in the X direction. Also, $G_e$ represents a predetermined gain.

In Expression (120), an integral range can be set arbitrarily, and accordingly, with the two-dimensional reintegration method, it becomes possible to create pixels having an arbitrary powered spatial resolution as to the original pixels (the pixels of an input image from the sensor 2 (FIG. 89)) without deterioration by appropriately changing this integral range.

Figure 103:
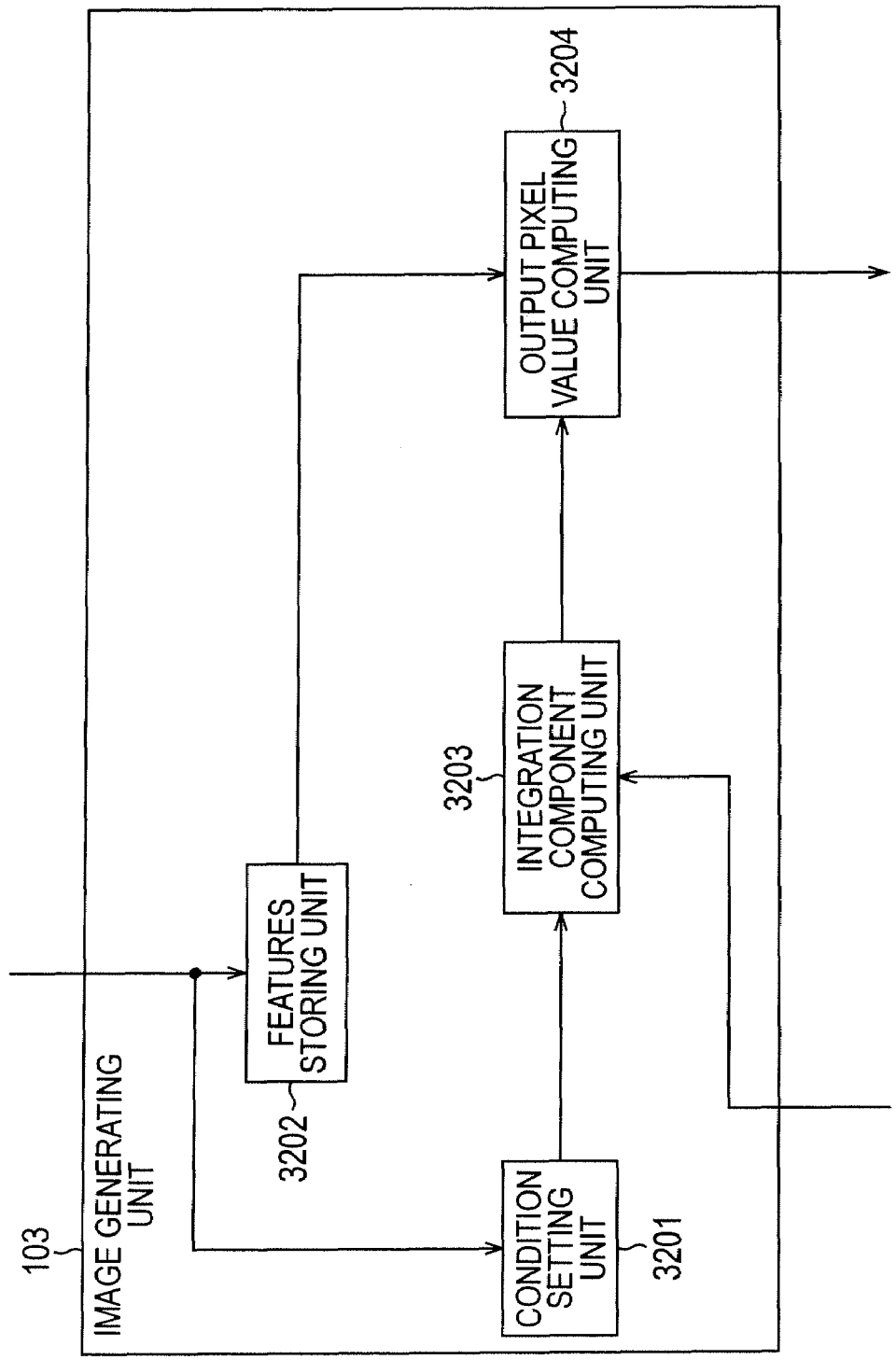
FIG. 103 is a block diagram for describing a configuration example of an image generating unit which uses, of the re-integration techniques having the principle shown in FIG. 89, a two-dimensional re-integration technique.

FIG. 103 represents a configuration example of the image generating unit 103 employing the two-dimensional reintegration method.

As shown in FIG. 103, the image generating unit 103 in this example includes a conditions setting unit 3201, features storage unit 3202, integral component calculation unit 3203, and output pixel value calculation unit 3204.

The conditions setting unit 3201 sets the number of dimensions n of the approximation function f(x, y) based on the actual world estimating information (with the example in FIG. 103, the features of the approximation function f(x, y)) supplied from the actual world estimating unit 102.

The conditions setting unit 3201 also sets an integral range in the case of reintegrating the approximation function f(x, y) (in the case of calculating an output pixel value). Note that an integral range set by the conditions setting unit 3201 does not need to be the vertical width or the horizontal width of a pixel. For example, the approximation function f(x, y) is integrated in the spatial directions (X direction and Y direction), and accordingly, a specific integral range can be determined as long as the relative size (power of spatial resolution) of an output pixel (pixel to be generated from now by the image generating unit 103) as to the spatial size of each pixel of an input image from the sensor 2 is known. Accordingly, the conditions setting unit 3201 can set, for example, a spatial resolution power as an integral range.

The features storage unit 3202 temporally stores the features of the approximation function f(x, y) sequentially supplied from the actual world estimating unit 102. Subsequently, upon the features storage unit 3202 storing all of the features of the approximation function f(x, y), the features storage unit 3202 generates a features table including all of the features of the approximation function f(x, y), and supplies this to the output pixel value calculation unit 3204.

Now, description will be made regarding the details of the approximation function f(x, y).

For example, now, let us say that the light signals (light signals represented with the wave F(x, y)) in the actual world 1 (FIG. 89) having continuity in the spatial directions represented with the gradient $G_F$ shown in FIG. 102 described above have been detected by the sensor 2 (FIG. 89), and have been output as an input image (pixel values).

Figure 104:
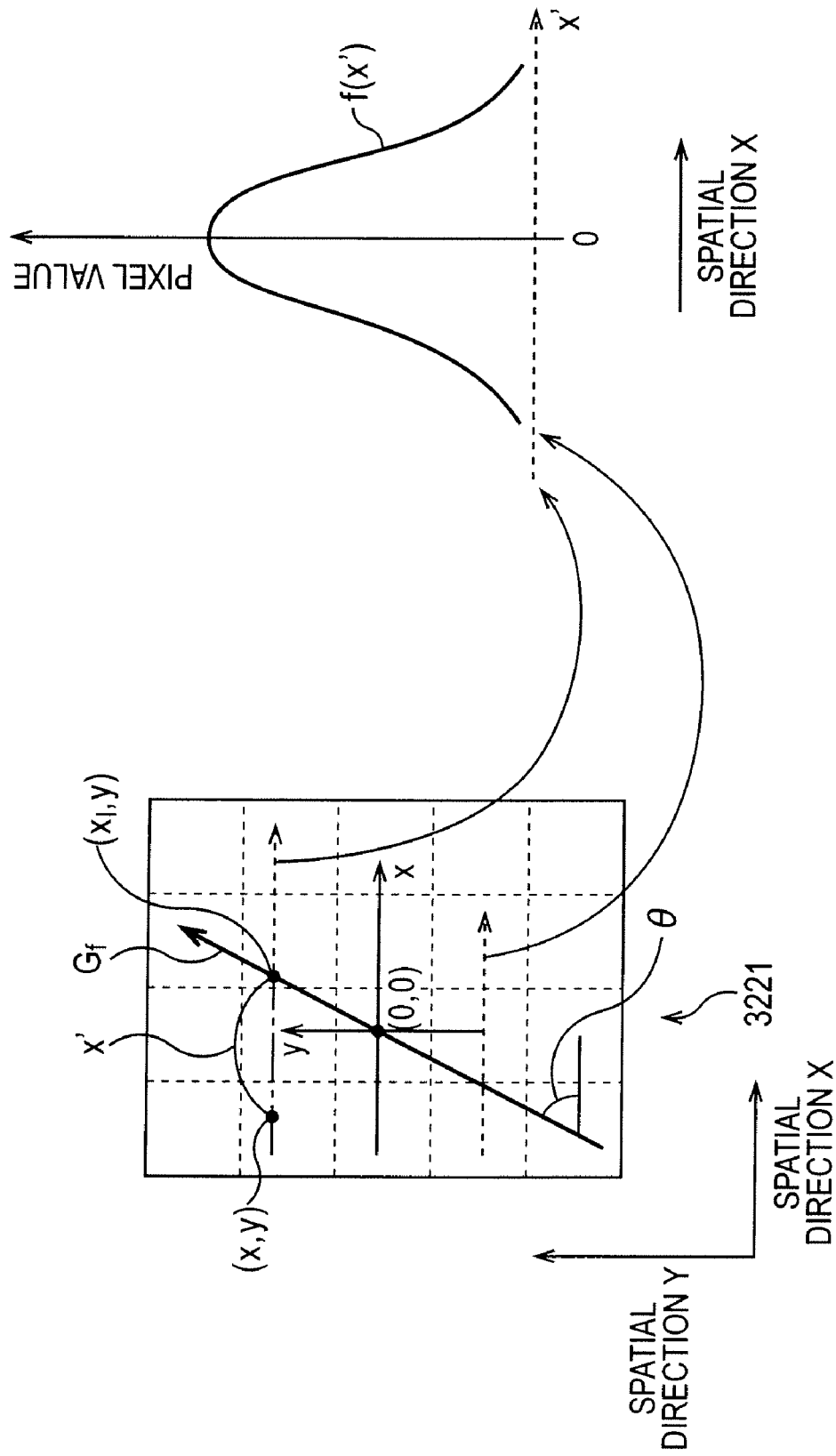
FIG. 104 is a diagram for describing distance in the cross-sectional direction.

Further, for example, let us say that the data continuity detecting unit 101 (FIG. 3) has subjected a region 3221 of an input image made up of 20 pixels in total (20 squares represented with a dashed line in the drawing) of 4 pixels in the X direction and also 5 pixels in the Y direction of this input image to the processing thereof, and has output an angle θ (angle θ generated between the direction of data continuity represented with the gradient $G_f$ corresponding to the gradient $G_F$ and the X direction) as one of data continuity information, as shown in FIG. 104.

Note that as viewed from the actual world estimating unit 102, the data continuity detecting unit 101 should simply output the angle θ at a pixel of interest, and accordingly, the processing region of the data continuity detecting unit 101 is not restricted to the above region 3221 in the input image.

Also, with the region 3221 in the input image, the horizontal direction in the drawing represents the X direction serving as one direction of the spatial directions, and the vertical direction in the drawing represents the Y direction serving the other direction of the spatial directions.

Further, in FIG. 104, a pixel, which is the second pixel from the left, and also the third pixel from the bottom, is taken as a pixel of interest, and an (x, y) coordinates system is set so as to take the center of the pixel of interest as the origin (0, 0). A relative distance (hereafter, referred to as a cross-sectional direction distance) in the X direction as to a straight line (straight line of the gradient $G_f$ representing the direction of data continuity) having an angle θ passing through the origin (0, 0) is taken as x'.

Further, in FIG. 104, the graph on the right side represents the approximation function f(x') serving as a n-dimensional (n is an arbitrary integer) polynomial, which is a function approximating a one-dimensional waveform (hereafter, referred to as an X cross-sectional waveform F(x')) wherein the image function F(x, y, t) of which variables are positions x, y, and z on the three-dimensional space, and point-in-time t is projected in the X direction at an arbitrary position y in the Y direction. Of the axes in the graph on the right side, the axis in the horizontal direction in the drawing represents a cross-sectional direction distance, and the axis in the vertical direction in the drawing represents pixel values.

In this case, the approximation function f(X') shown in FIG. 104 is a n-dimensional polynomial, so is represented as the following Expression (121).

$$f(x') = w_0 + w_1 x' + w_2 x'^2 + \ldots + w_n x'^n = \sum_{i=0}^{n} w_i x'^i \qquad (121)$$

Also, since the angle θ is determined, the straight line having angle θ passing through the origin (0, 0) is uniquely determined, and a position $x_1$ in the X direction of the straight line at an arbitrary position y in the Y direction is represented as the following Expression (122). However, in Expression (122), s represents cot θ.

$$x_1 = s \times y \qquad (122)$$

That is to say, as shown in FIG. 104, a point on the straight line corresponding to continuity of data represented with the gradient $G_f$ is represented with a coordinate value ($x_1$, y).

The cross-sectional direction distance X' is represented as the following Expression (123) using Expression (122).

$$x' = x - x_1 = x - s \times y \qquad (123)$$

Accordingly, the approximation function f(x, y) at an arbitrary position (x, y) within the input image region 3221 is represented as the following Expression (124) using Expression (121) and Expression (123).

$$f(x, y) = \sum_{i=0}^{n} w_i (x - s \times y)^i \quad (124)$$

Note that in Expression (124), $w_i$ represents the features of the approximation function f(x, y).

Now, description will return to FIG. 103, wherein the features $w_i$ included in Expression (124) are supplied from the actual world estimating unit 102, and stored in the features storage unit 3202. Upon the features storage unit 3202 storing all of the features $w_i$ represented with Expression (124), the features storage unit 3202 generates a features table including all of the features $w_i$, and supplies this to the output pixel value calculation unit 3204.

Also, upon the right side of the above Expression (120) being expanded (calculated) by substituting the approximation function f(x, y) of Expression (124) for the approximation function f(x, y) in the right side of Expression (120), the output pixel value M is represented as the following Expression (125).

$$M = G_e \times \sum_{i=0}^{n} w_i \times \frac{\left\{\begin{array}{l}(x_e - sxy_e)^{i+2} - (x_e - sxy_s)^{i+2} - \\ (x_s - sxy_e)^{i+2} + (x_s - sxy_s)^{i+2}\end{array}\right\}}{s(i+1)(i+2)} \quad (125)$$

$$= \sum_{i=0}^{n} w_i \times k_i(x_s, x_e, y_s, y_e)$$

In Expression (125), $K_i(x_s, x_e, y_s, y_e)$ represent the integral components of the i-dimensional term. That is to say, the integral components $K_i(x_s, x_e, y_s, y_e)$ are such as shown in the following Expression (126).

$$k_i(x_s, x_e, y_s, y_e) = G_e \times \frac{\left\{\begin{array}{l}(x_e - sxy_e)^{i+2} - (x_e - sxy_s)^{i+2} - \\ (x_s - sxy_e)^{i+2} + (x_s - sxy_s)^{i+2}\end{array}\right\}}{s(i+1)(i+2)} \quad (126)$$

The integral component calculation unit 3203 calculates the integral components $K_i(x_s, x_e, y_s, y_e)$. Specifically, as shown in Expression (125) and Expression (126), the integral components $K_i(x_s, x_e, y_s, y_e)$ can be calculated as long as the start position $x_s$ in the X direction and end position $x_e$ in the X direction of an integral range, the start position $y_s$ in the Y direction and end position $y_e$ in the Y direction of an integral range, variable s, gain $G_e$, and i of the i-dimensional term are known.

Of these, the gain $G_e$ is determined with the spatial resolution power (integral range) set by the conditions setting unit 3201.

The range of i is determined with the number of dimensions n set by the conditions setting unit 3201.

A variable s is, as described above, cot θ, so is determined with the angle θ output from the data continuity detecting unit 101.

Also, each of the start position $x_s$ in the X direction and end position $x_e$ in the X direction of an integral range, and the start position $y_s$ in the Y direction and end position $y_e$ in the Y direction of an integral range is determined with the center pixel position (x, y) and pixel width of an output pixel to be generated from now. Note that (x, y) represents a relative position from the center position of the pixel of interest when the actual world estimating unit 102 generates the approximation function f(x).

Further, each of the center pixel position (x, y) and pixel width of an output pixel to be generated from now is determined with the spatial resolution power (integral range) set by the conditions setting unit 3201.

Accordingly, the integral component calculation unit 3203 calculates integral components $K_i(x_s, x_e, y_s, y_e)$ based on the number of dimensions and the spatial resolution power (integral range) set by the conditions setting unit 3201, and the angle θ of the data continuity information output from the data continuity detecting unit 101, and supplies the calculated result to the output pixel value calculation unit 3204 as an integral component table.

The output pixel value calculation unit 3204 calculates the right side of the above Expression (125) using the features table supplied from the features storage unit 3202, and the integral component table supplied from the integral component calculation unit 3203, and outputs the calculated result to the outside as the output pixel value M.

Next, description will be made regarding image generating processing (processing in step S103 in FIG. 29) by the image generating unit 103 (FIG. 104) employing the two-dimensional reintegration method with reference to the flowchart in FIG. 105.

Figure 106:
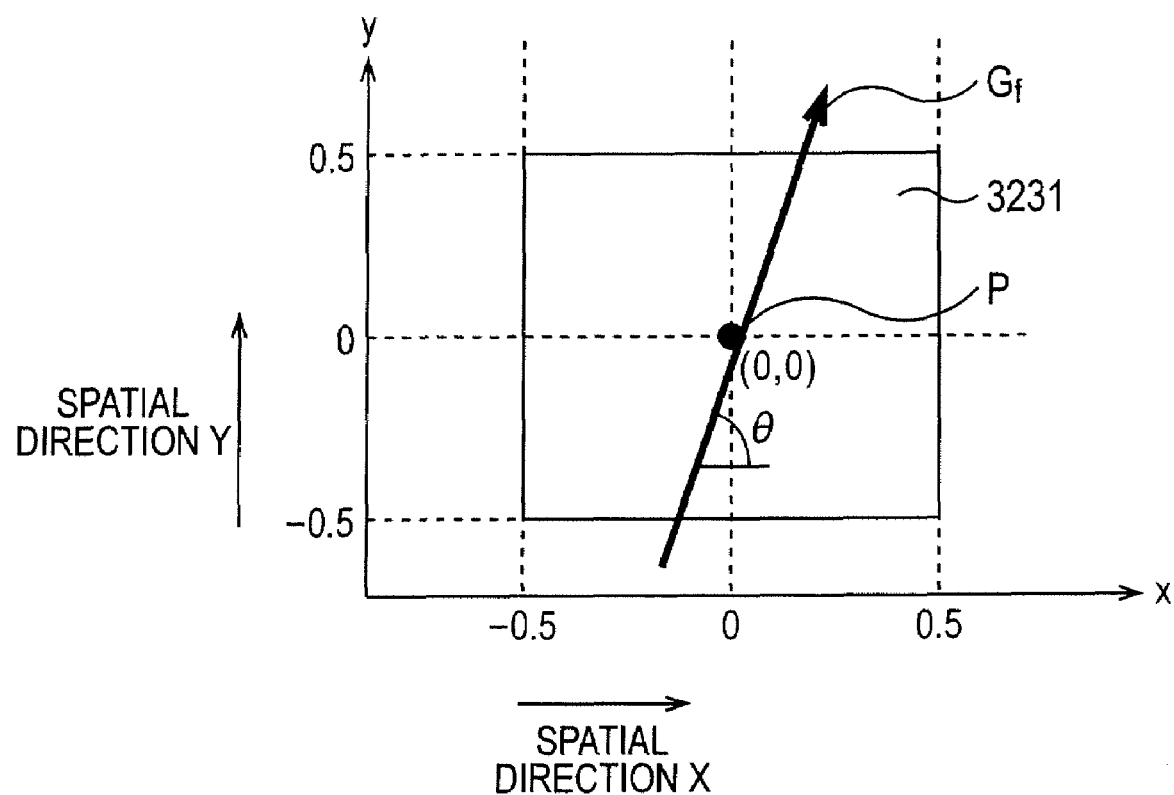
FIG. 106 is a diagram for describing an example of an input pixel.

For example, let us say that the light signals represented with the function F(x, y) shown in FIG. 102 have been cast in the sensor 2 so as to become an input image, and the actual world estimating unit 102 has already generated the approximation function f(x, y) for approximating the function F(x, y) with one pixel 3231 such as shown in FIG. 106 as a pixel of interest at the processing in step S102 in FIG. 29 described above.

Note that in FIG. 106, the pixel value (input pixel value) of the pixel 3231 is taken as P, and the shape of the pixel 3231 is taken as a square of which one side is 1 in length. Also, of the spatial directions, the direction in parallel with one side of the pixel 3231 is taken as the X direction, and the direction orthogonal to the X direction is taken as the Y direction. Further, a coordinates system (hereafter, referred to as a pixel-of-interest coordinates system) in the spatial directions (X direction and Y direction) of which the origin is the center of the pixel 3231 is set.

Also, let us say that in FIG. 106, the data continuity detecting unit 101, which takes the pixel 3231 as a pixel of interest, has already output the angle θ as data continuity information corresponding to continuity of data represented with the gradient $G_f$ at the processing in step S101 in FIG. 29 described above.

Description will return to FIG. 105, and in this case, the conditions setting unit 3201 sets conditions (the number of dimensions and an integral range) at step S3201.

For example, now, let us say that 5 has been set as the number of dimensions, and also spatial quadruple density (spatial resolution power to cause the pitch width of a pixel to become half power in the upper/lower/left/right sides) has been set as an integral range.

Figure 107:
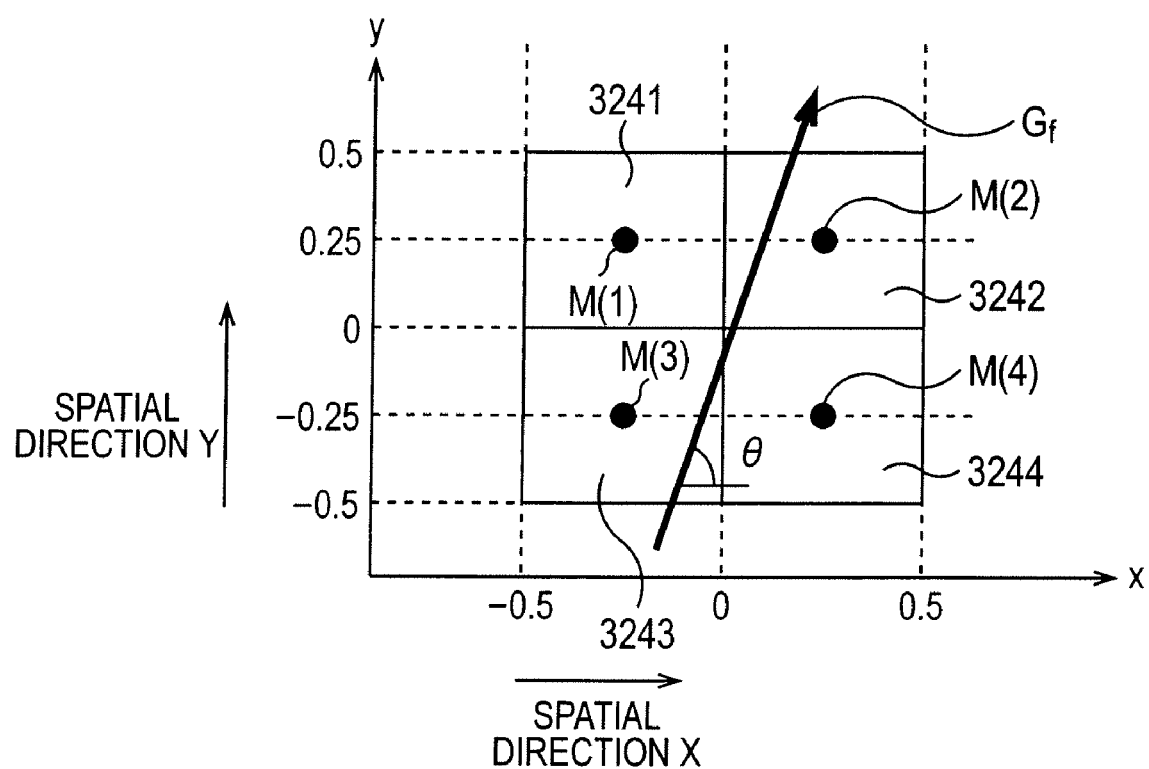
FIG. 107 is a diagram for describing an example of creating four high-resolution pixels in the one input pixel shown in FIG. 106, with the two-dimensional re-integration technique.

That is to say, in this case, it has been set that the four pixel 3241 through pixel 3244 are created newly in a range of −0.5 through 0.5 in the X direction, and also a range of −0.5 through 0.5 in the Y direction (in the range of the pixel 3231 in FIG. 106), such as shown in FIG. 107. Note that in FIG. 107 as well, the same pixel-of-interest coordinates system as that in FIG. 106 is shown.

Also, in FIG. 107, M(1) represents the pixel value of the pixel 3241 to be generated from now, M(2) represents the pixel value of the pixel 3242 to be generated from now, M(3) represents the pixel value of the pixel 3243 to be generated from now, and M(4) represents the pixel value of the pixel 3244 to be generated from now.

Description will return to FIG. 105, in step S3202, the features storage unit 3202 acquires the features of the approximation function f(x, y) supplied from the actual world estimating unit 102, and generates a features table. In this case, the coefficients $w_0$ through $W_5$ of the approximation function f(x) serving as a 5-dimensional polynomial are supplied from the actual world estimating unit 102, and accordingly, $(w_0, w_1, w_2, w_3, w_4, w_5)$ is generated as a features table.

In step S3203, the integral component calculation unit 3203 calculates integral components based on the conditions (the number of dimensions and an integral range) set by the conditions setting unit 3201, and the data continuity information (angle θ) supplied from the data continuity detecting unit 101, and generates an integral component table.

Specifically, for example, let us say that numbers (hereafter, such a number is referred to as a mode number) 1 through 4 are respectively appended to the pixel 3241 through pixel 3244 to be generated from now, the integral component calculation unit 3203 calculates the integral components $K_i(x_s, x_e, y_s, y_e)$ of the above Expression (125) as a function of l (however, l represents a mode number) such as the integral components $K_i(l)$ shown in the left side of the following Expression (127).

$$K_i(l) = K_i(x_s, x_e, y_s, y_e) \quad (127)$$

Specifically, in this case, the integral components $K_i(l)$ shown in the following Expression (128) are calculated.

$$k_i(1) = k_i(-0.5, 0, 0, 0.5)$$
$$k_i(2) = k_i(0, 0.5, 0, 0.5)$$
$$k_i(3) = k_i(-0.5, 0, -0.5, 0)$$
$$k_i(4) = k_i(0, 0.5, -0.5, 0) \quad (128)$$

Note that in Expression (128), the left side represents the integral components $K_i(l)$, and the right side represents the integral components $K_i(x_s, x_e, y_s, y_e)$. That is to say, in this case, l is any one of 1 thorough 4, and also i is any one of 0 through 5, and accordingly, 24 $K_i(l)$ in total of 6 $K_i(1)$, 6 $K_i(2)$, 6 $K_i(3)$, and 6 $K_i(4)$ are calculated.

More specifically, first, the integral component calculation unit 3203 calculates the variable s (s=cot θ) of the above Expression (122) using the angle θ supplied from the data continuity detecting unit 101.

Next, the integral component calculation unit 3203 calculates the integral components $K_i(x_s, x_e, y_s, y_e)$ of each right side of the four expressions in Expression (128) regarding i=0 through 5 using the calculated variable s. Note that with this calculation of the integral components $K_i(x_s, x_e, y_s, y_e)$, the above Expression (125) is employed.

Subsequently, the integral component calculation unit 3203 converts each of the 24 integral components $K_i(x_s, x_e, y_s, y_e)$ calculated into the corresponding integral components $K_i(l)$ in accordance with Expression (128), and generates an integral component table including the 24 integral components $K_i(l)$ converted (i.e., 6 $K_i(1)$, 6 $K_i(2)$, 6 $K_i(3)$, and 6 $K_i(4)$).

Figure 105:
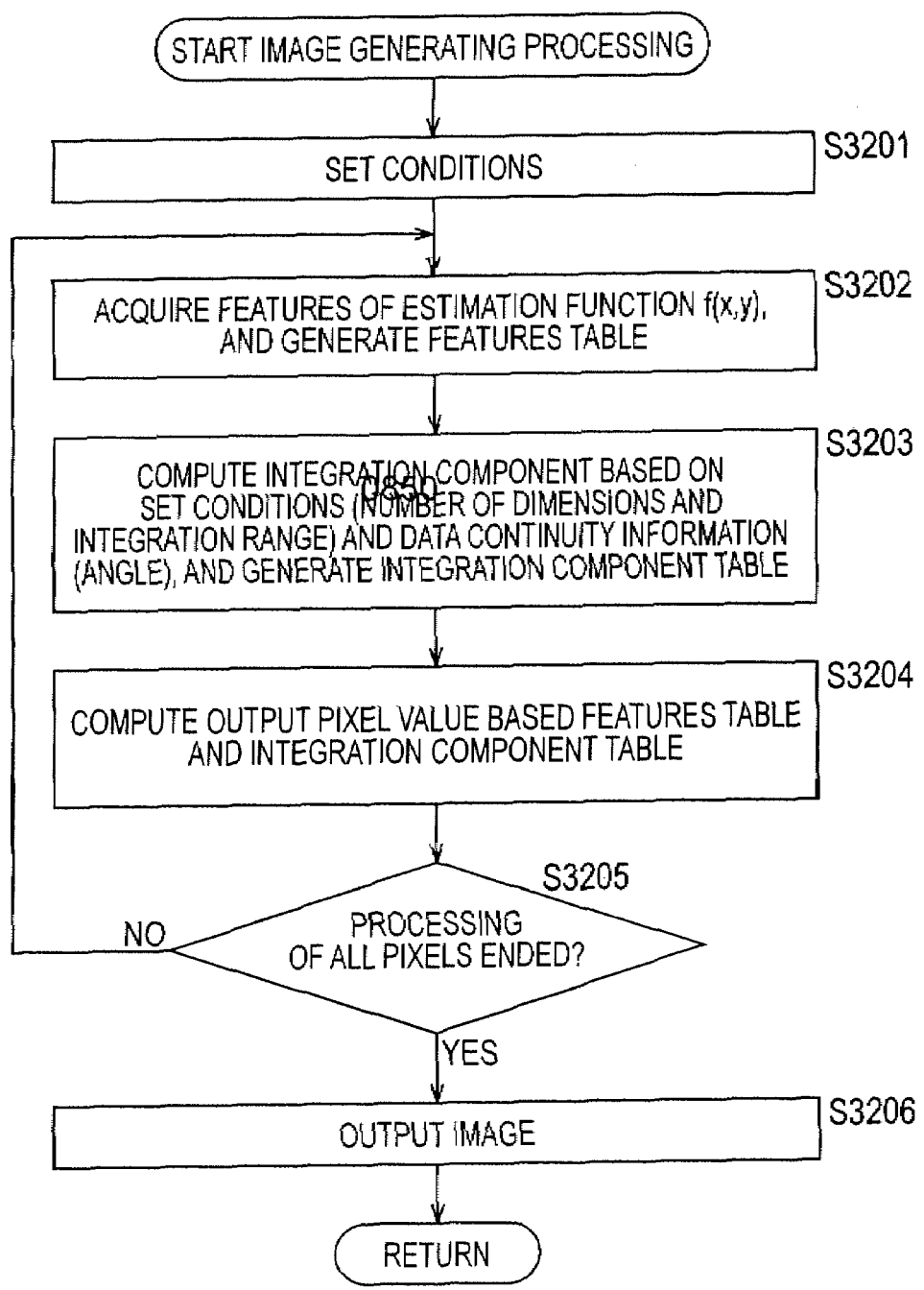
FIG. 105 is a flowchart for describing the image generating processing which the image generating unit of the configuration shown in FIG. 103 executes.

Note that the sequence of the processing in step S3202 and the processing in step S3203 is not restricted to the example in FIG. 105, the processing in step S3203 may be executed first, or the processing in step S3202 and the processing in step S3203 may be executed simultaneously.

Next, in step S3204, the output pixel value calculation unit 3204 calculates the output pixel values M(1) through M(4) respectively based on the features table generated by the features storage unit 3202 at the processing in step S3202, and the integral component table generated by the integral component calculation unit 3203 at the processing in step S3203.

Specifically, in this case, the output pixel value calculation unit 3204 calculates each of the pixel value M(1) of the pixel 3241 (pixel of mode number 1), the pixel value M(2) of the pixel 3242 (pixel of mode number 2), the pixel value M(3) of the pixel 3243 (pixel of mode number 3), and the pixel value M(4) of the pixel 3244 (pixel of mode number 4) shown in FIG. 107 by calculating the right sides of the following Expression (129) through Expression (132) corresponding to the above Expression (125).

$$M(1) = \sum_{i=0}^{n} w_i \times k_i(1) \quad (129)$$

$$M(2) = \sum_{i=0}^{n} w_i \times k_i(2) \quad (130)$$

$$M(3) = \sum_{i=0}^{n} w_i \times k_i(3) \quad (131)$$

$$M(4) = \sum_{i=0}^{n} w_i \times k_i(4) \quad (132)$$

However, in this case, each n of Expression (129) through Expression (132) becomes 5.

In step S3205, the output pixel value calculation unit 3204 determines regarding whether or not the processing of all the pixels has been completed.

In step S3205, in the event that determination is made that the processing of all the pixels has not been completed, the processing returns to step S3202, wherein the subsequent processing is repeatedly performed. That is to say, the pixels that have not become a pixel of interest are sequentially taken as a pixel of interest, and the processing in step S3202 through S3204 is repeatedly performed.

In the event that the processing of all the pixels has been completed (in step S3205, in the event that determination is made that the processing of all the pixels has been completed), the output pixel value calculation unit 3204 outputs the image in step S3206. Then, the image generating processing ends.

Thus, four pixels having higher spatial resolution than the input pixel 3231, i.e., the pixel 3241 through pixel 3244 (FIG. 107) can be created by employing the two-dimensional reintegration method as a pixel at the pixel 3231 of the input image (FIG. 106) from the sensor 2 (FIG. 89). Further, though not shown in the drawing, as described above, the image generating unit 103 can create a pixel having an arbitrary powered spatial resolution as to the input pixel 3231 without deterioration by appropriately changing an integral range, in addition to the pixel 3241 through pixel 3244.

As described above, as description of the two-dimensional reintegration method, an example for subjecting the approximation function f(x, y) as to the spatial directions (X direction and Y direction) to two-dimensional integration has been employed, but the two-dimensional reintegration method can be applied to the time-space directions (X direction and t direction, or Y direction and t direction).

That is to say, the above example is an example in the case in which the light signals in the actual world 1 (FIG. 89) have continuity in the spatial directions represented with the gradient $G_F$ such as shown in FIG. 102, and accordingly, an expression including two-dimensional integration in the spatial directions (X direction and Y direction) such as shown in the above Expression (120) has been employed. However, the concept regarding two-dimensional integration can be applied not only to the spatial direction but also the time-space directions (X direction and t direction, or Y direction and t direction).

In other words, with the two-dimensional polynomial approximating method serving as an assumption of the two-dimensional reintegration method, it is possible to perform approximation using a two-dimensional approximation function f even in the case in which the image function F(x, y, t) representing the light signals has continuity in the time-space directions (however, X direction and t direction, or Y direction and t direction) as well as continuity in the spatial directions.

Figure 108:
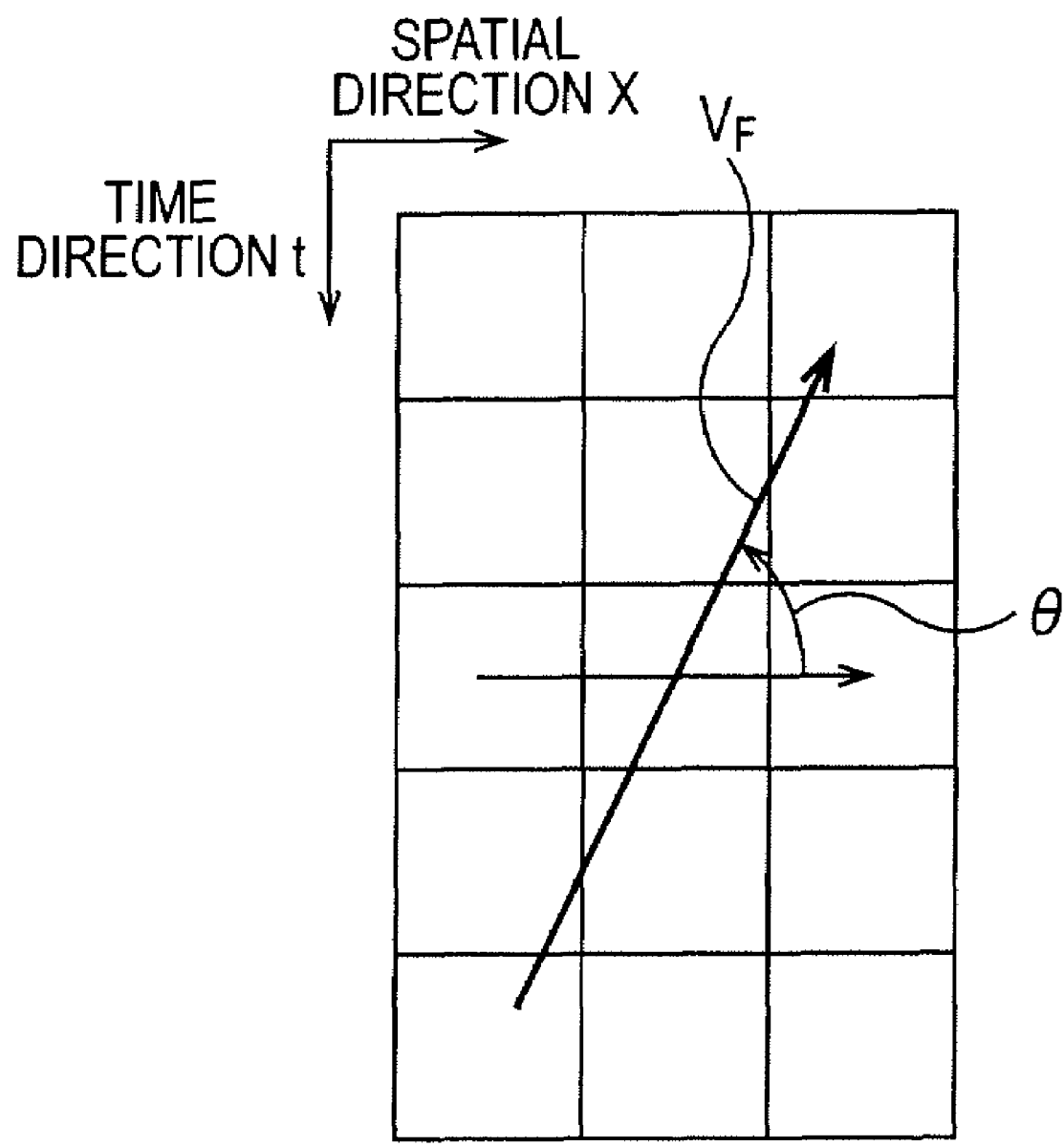
FIG. 108 is a diagram for describing the direction of continuity in the space-time directions.

Specifically, for example, in the event that there is an object moving horizontally in the X direction at uniform velocity, the direction of movement of the object is represented with like a gradient $V_F$ in the X-t plane such as shown in FIG. 108. In other words, it can be said that the gradient $V_F$ represents the direction of continuity in the time-space directions in the X-t plane. Accordingly, the data continuity detecting unit 101 (FIG. 89) can output movement θ such as shown in FIG. 108 (strictly speaking, though not shown in the drawing, movement θ is an angle generated by the direction of data continuity represented with the gradient $V_f$ corresponding to the gradient $V_F$ and the X direction in the spatial direction) as data continuity information corresponding to the gradient $V_F$ representing continuity in the time-space directions in the X-t plane as well as the above angle θ (data continuity information corresponding to the gradient $G_F$ representing continuity in the spatial directions in the X-Y plane).

Also, the actual world estimating unit 102 (FIG. 89) employing the two-dimensional polynomial approximating method can calculate the coefficients (features) $w_i$ of an approximation function f(x, t) with the same method as the above method by employing the movement θ instead of the angle θ described above. However, in this case, the equation to be employed is not the above Expression (124) but the following Expression (133).

$$f(x, y) = \sum_{i=0}^{n} w_i(x - s \times t) \qquad (133)$$

Note that in Expression (133), s is cot θ (however, θ is movement).

Accordingly, the image generating unit 103 (FIG. 89) employing the two-dimensional reintegration method can calculate the pixel value M by substituting the f(x, t) of the above Expression (133) for the right side of the following Expression (134), and calculating this.

$$M = G_e \times \int_{t_s}^{t_e} \int_{x_s}^{x_e} f(x, t) dx dt \qquad (134)$$

Note that in Expression (134), $t_s$ represents an integration start position in the t direction, and $t_e$ represents an integration end position in the t direction. Similarly, $x_s$ represents an integration start position in the X direction, and $x_e$ represents an integration end position in the X direction. $G_e$ represents a predetermined gain.

Alternately, an approximation function f(y, t) focusing attention on the spatial direction Y instead of the spatial direction X can be handled as the same way as the above approximation function f(x, t).

Incidentally, in Expression (133), it becomes possible to obtain data not integrated in the temporal direction, i.e., data without movement blurring by regarding the t direction as constant, i.e., by performing integration while ignoring integration in the t direction. In other words, this method may be regarded as one of two-dimensional reintegration methods in that reintegration is performed on condition that one certain dimension of the two-dimensional approximation function f is constant, or in fact, may be regarded as one of one-dimensional reintegration methods in that one-dimensional reintegration in the X direction is performed.

Also, in Expression (134), an integral range may be set arbitrarily, and accordingly, with the two-dimensional reintegration method, it becomes possible to create a pixel having an arbitrary powered resolution as to the original pixel (pixel of an input image from the sensor 2 (FIG. 89)) without deterioration by appropriately changing this integral range.

That is to say, with the two-dimensional reintegration method, it becomes possible to create temporal resolution by appropriately changing an integral range in the temporal direction t. Also, it becomes possible to create spatial resolution by appropriately changing an integral range in the spatial direction X (or spatial direction Y). Further, it becomes possible to create both temporal resolution and spatial resolution by appropriately changing each integral range in the temporal direction t and in the spatial direction X.

Note that as described above, creation of any one of temporal resolution and spatial resolution may be performed even with the one-dimensional reintegration method, but creation of both temporal resolution and spatial resolution cannot be performed with the one-dimensional reintegration method in theory, which becomes possible only by performing two-dimensional or more reintegration. That is to say, creation of both temporal resolution and spatial resolution becomes possible only by employing the two-dimensional reintegration method and a later-described three-dimensional reintegration method.

Also, the two-dimensional reintegration method takes not one-dimensional but two-dimensional integration effects into consideration, and accordingly, an image more similar to the light signal in the actual world 1 (FIG. 89) may be created.

Next, description will be made regarding a three-dimensional reintegration method with reference to FIG. 109 and FIG. 110.

With the three-dimensional reintegration method, the approximation function f(x, y, t) has been created using the three-dimensional approximating method, which is an assumption.

In this case, with the three-dimensional reintegration method, the output pixel value M is calculated as the following Expression (135).

$$M = G_e \times \int_{t_s}^{t_e} \int_{y_s}^{y_e} \int_{x_s}^{x_e} f(x, y, t) dx dy dt \qquad (135)$$

Note that in Expression (135), $t_s$ represents an integration start position in the t direction, and $t_e$ represents an integration end position in the t direction. Similarly, $y_s$ represents an integration start position in the Y direction, and $y_e$ represents an integration end position in the Y direction. Also, $x_s$ represents an integration start position in the X direction, and $x_e$ represents an integration end position in the X direction. $G_e$ represents a predetermined gain.

Also, in Expression (135), an integral range may be set arbitrarily, and accordingly, with the three-dimensional reintegration method, it becomes possible to create a pixel having an arbitrary powered time-space resolution as to the original pixel (pixel of an input image from the sensor 2 (FIG. 89)) without deterioration by appropriately changing this integral range. That is to say, upon the integral range in the spatial direction being reduced, a pixel pitch can be reduced without restraint. On the other hand, upon the integral range in the spatial direction being enlarged, a pixel pitch can be enlarged without restraint. Also, upon the integral range in the temporal direction being reduced, temporal resolution can be created based on an actual waveform.

Figure 109:
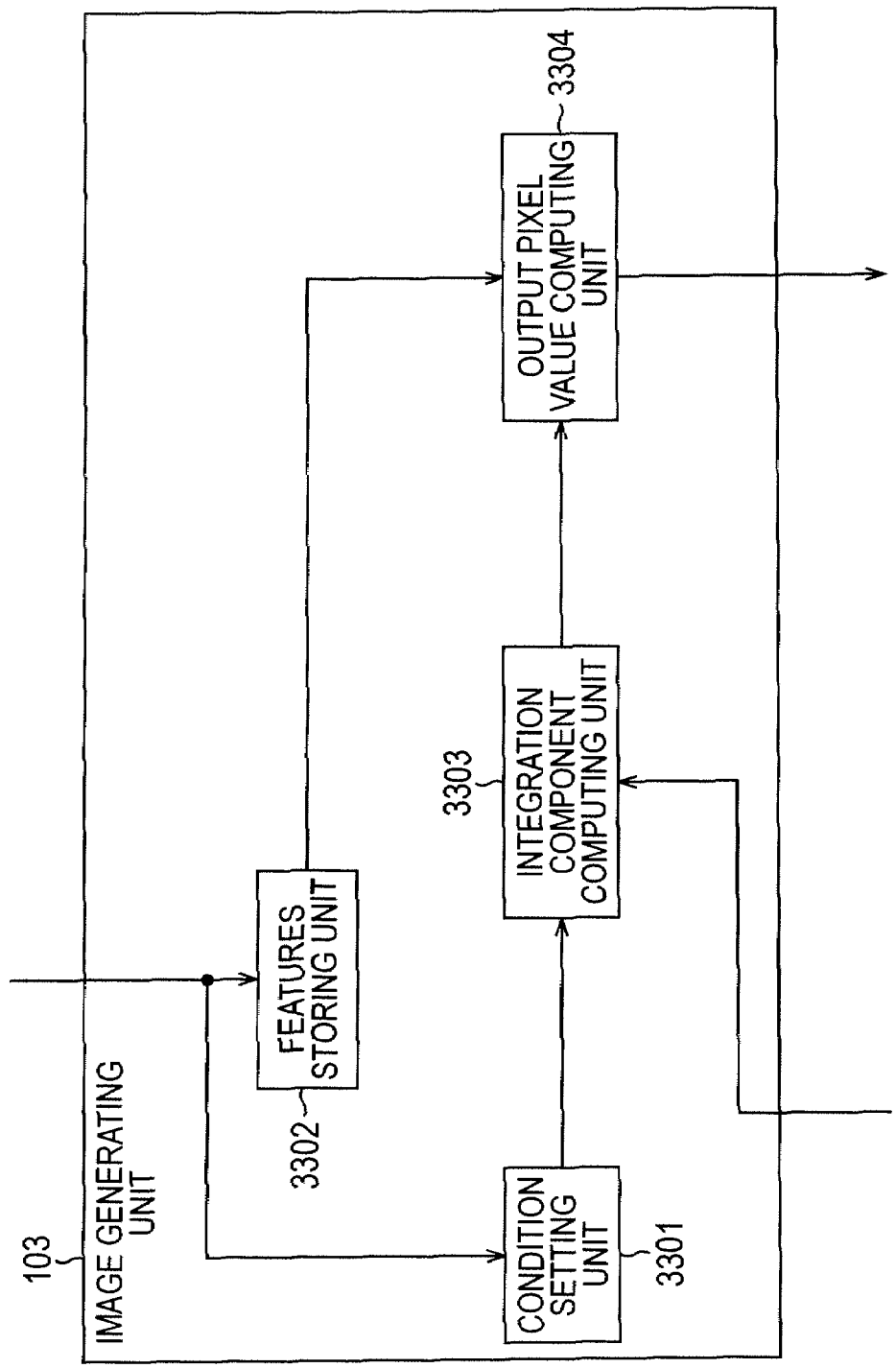
FIG. 109 is a block diagram for describing a configuration example of the image generating unit which uses, of the re-integration techniques having the principle shown in FIG. 89, a three-dimensional re-integration technique.

FIG. 109 represents a configuration example of the image generating unit 103 employing the three-dimensional reintegration method.

As shown in FIG. 109, this example of the image generating unit 103 includes a conditions setting unit 3301, features storage unit 3302, integral component calculation unit 3303, and output pixel value calculation unit 3304.

The conditions setting unit 3301 sets the number of dimensions n of the approximation function f(x, y, t) based on the actual world estimating information (with the example in FIG. 109, features of the approximation function f(x, y, t)) supplied from the actual world estimating unit 102.

The conditions setting unit 3301 sets an integral range in the case of reintegrating the approximation function f(x, y, t) (in the case of calculating output pixel values). Note that an integral range set by the conditions setting unit 3301 needs not to be the width (vertical width and horizontal width) of a pixel or shutter time itself. For example, it becomes possible to determine a specific integral range in the spatial direction as long as the relative size (spatial resolution power) of an output pixel (pixel to be generated from now by the image generating unit 103) as to the spatial size of each pixel of an input image from the sensor 2 (FIG. 89) is known. Similarly, it becomes possible to determine a specific integral range in the temporal direction as long as the relative time (temporal resolution power) of an output pixel value as to the shutter time of the sensor 2 (FIG. 89) is known. Accordingly, the conditions setting unit 3301 can set, for example, a spatial resolution power and temporal resolution power as an integral range.

The features storage unit 3302 temporally stores the features of the approximation function f(x, y, t) sequentially supplied from the actual world estimating unit 102. Subsequently, upon the features storage unit 3302 storing all of the features of the approximation function f(x, y, t), the features storage unit 3302 generates a features table including all of the features of the approximation function f(x, y, t), and supplies this to the output pixel value calculation unit 3304.

Incidentally, upon the right side of the approximation function f(x, y) of the right side of the above Expression (135) being expanded (calculated), the output pixel value M is represented as the following Expression (136).

$$M = \sum_{i=0}^{n} w_i \times k_i(x_s, x_e, y_s, y_e, t_s, t_e) \qquad (136)$$

In Expression (136), $K_i(x_s, x_e, y_s, y_e, t_s, t_e)$ represents the integral components of the i-dimensional term. However, $x_s$ represents an integration range start position in the X direction, $x_e$ represents an integration range end position in the X direction, $y_s$ represents an integration range start position in the Y direction, $y_e$ represents an integration range end position in the Y direction, $t_s$ represents an integration range start position in the t direction, and $t_e$ represents an integration range end position in the t direction, respectively.

The integral component calculation unit 3303 calculates the integral components $K_i(x_s, x_e, y_s, y_e, t_s, t_e)$. Specifically, the integral component calculation unit 3303 calculates the integral components $K_i(x_s, x_e, y_s, y_e, t_s, t_e)$ based on the number of dimensions and the integral range (spatial resolution power or temporal resolution power) set by the conditions setting unit 3301, and the angle θ or movement θ of the data continuity information output from the data continuity detecting unit 101, and supplies the calculated results to the output pixel value calculation unit 3304 as an integral component table.

The output pixel value calculation unit 3304 calculates the right side of the above Expression (136) using the features table supplied from the features storage unit 3302, and the integral component table supplied from the integral component calculation unit 3303, and outputs the calculated result to the outside as the output pixel value M.

Next, description will be made regarding image generating processing (processing in step S103 in FIG. 29) by the image generating unit 103 (FIG. 109) employing the three-dimensional reintegration method with reference to the flowchart in FIG. 110.

For example, let us say that the actual world estimating unit 102 (FIG. 89) has already generated an approximation function f(x, y, t) for approximating the light signals in the actual world 1 (FIG. 89) with a predetermined pixel of an input image as a pixel of interest at the processing in step S102 in FIG. 29 described above.

Also, let us say that the data continuity detecting unit 101 (FIG. 89) has already output the angle θ or movement θ as data continuity information with the same pixel as the actual world estimating unit 102 as a pixel of interest at the processing in step S101 in FIG. 29.

Figure 110:
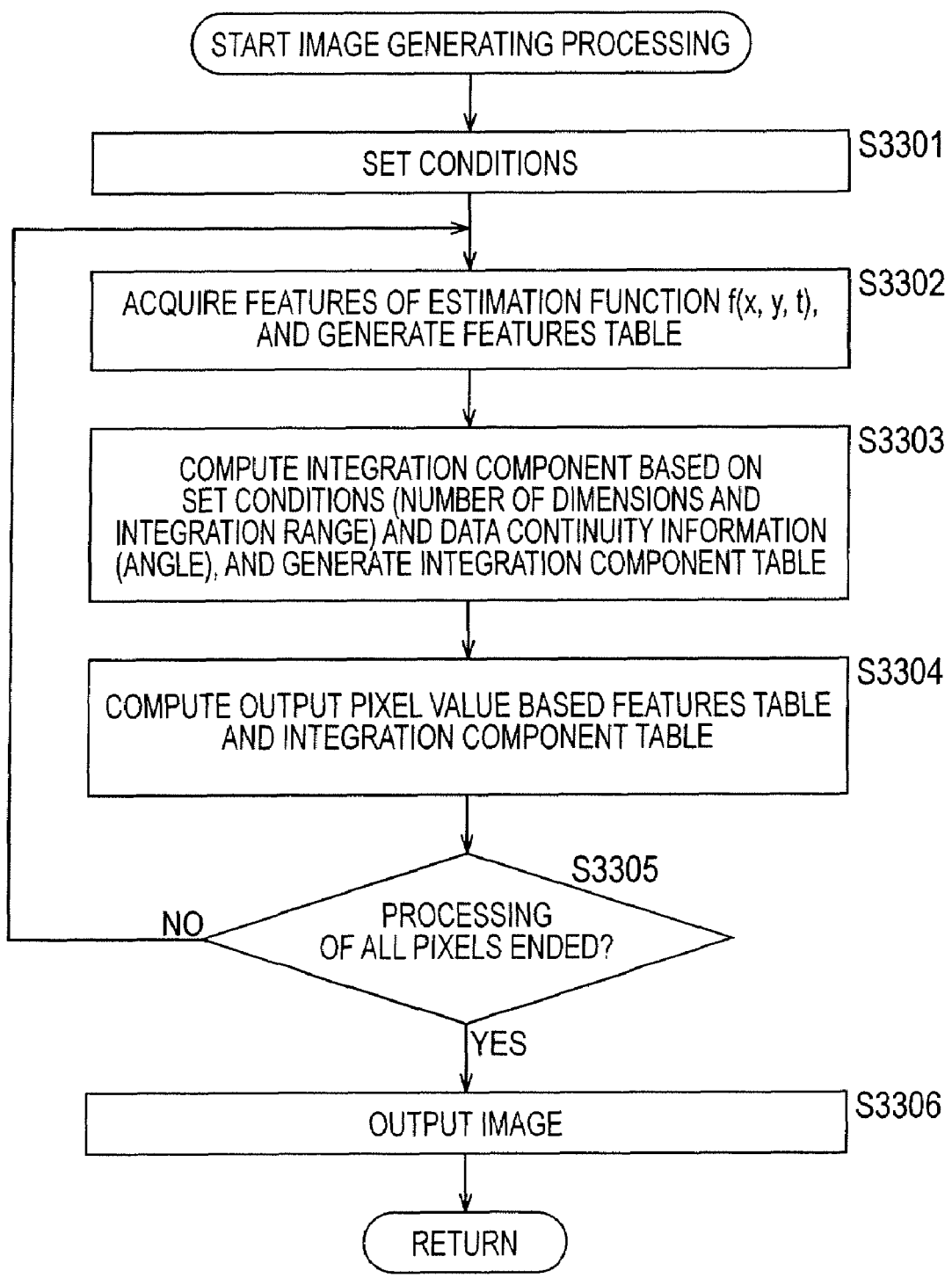
FIG. 110 is a flowchart for describing the image generating processing which the image generating unit of the configuration shown in FIG. 109 executes.

In this case, the conditions setting unit 3301 sets conditions (the number of dimensions and an integral range) at step S3301 in FIG. 110.

In step S3302, the features storage unit 3302 acquires the features $w_i$ of the approximation function f(x, y, t) supplied from the actual world estimating unit 102, and generates a features table.

In step S3303, the integral component calculation unit 3303 calculates integral components based on the conditions (the number of dimensions and an integral range) set by the conditions setting unit 3301, and the data continuity information (angle θ or movement θ) supplied from the data continuity detecting unit 101, and generates an integral component table.

Note that the sequence of the processing in step S3302 and the processing in step S3303 is not restricted to the example in FIG. 110, the processing in step S3303 may be executed first, or the processing in step S3302 and the processing in step S3303 may be executed simultaneously.

Next, in step S3304, the output pixel value calculation unit 3304 calculates each output pixel value based on the features table generated by the features storage unit 3302 at the processing in step S3302, and the integral component table generated by the integral component calculation unit 3303 at the processing in step S3303.

In step S3305, the output pixel value calculation unit 3304 determines regarding whether or not the processing of all the pixels has been completed.

In step S3305, in the event that determination is made that the processing of all the pixels has not been completed, the processing returns to step S3302, wherein the subsequent processing is repeatedly performed. That is to say, the pixels that have not become a pixel of interest are sequentially taken as a pixel of interest, and the processing in step S3302 through S3304 is repeatedly performed.

In the event that the processing of all the pixels has been completed (in step S3305, in the event that determination is made that the processing of all the pixels has been completed), the output pixel value calculation unit 3304 outputs the image in step S3306. Then, the image generating processing ends.

Thus, in the above Expression (135), an integral range may be set arbitrarily, and accordingly, with the three-dimensional reintegration method, it becomes possible to create a pixel having an arbitrary powered resolution as to the original pixel (pixel of an input image from the sensor 2 (FIG. 89)) without deterioration by appropriately changing this integral range.

That is to say, with the three-dimensional reintegration method, appropriately changing an integral range in the temporal direction enables temporal resolution to be created. Also, appropriately changing an integral range in the spatial direction enables spatial resolution to be created. Further, appropriately changing each integral range in the temporal direction and in the spatial direction enables both temporal resolution and spatial resolution to be created.

Specifically, with the three-dimensional reintegration method, approximation is not necessary when degenerating three dimension to two dimension or one dimension, thereby enabling high-precision processing. Also, movement in an oblique direction may be processed without degenerating to two dimension. Further, no degenerating to two dimension enables process at each dimension. For example, with the two-dimensional reintegration method, in the event of degenerating in the spatial directions (X direction and Y direction), process in the t direction serving as the temporal direction cannot be performed. On the other hand, with the thee-dimensional reintegration method, any process in the time-space directions may be performed.

Note that as described above, creation of any one of temporal resolution and spatial resolution may be performed even with the one-dimensional reintegration method, but creation of both temporal resolution and spatial resolution cannot be performed with the one-dimensional reintegration method in theory, which becomes possible only by performing two-dimensional or more reintegration. That is to say, creation of both temporal resolution and spatial resolution becomes possible only by employing the above two-dimensional reintegration method and the three-dimensional reintegration method.

Also, the three-dimensional reintegration method takes not one-dimensional and two-dimensional but three-dimensional integration effects into consideration, and accordingly, an image more similar to the light signal in the actual world 1 (FIG. 89) may be created.

Next, with the signal processing device 4 shown in FIG. 3, data continuity is detected at the data continuity detecting unit 101, and estimation of actual world 1 signal waveforms, i.e., for example, an approximation function approximating the X-cross-section waveform F(x), is obtained at the actual world estimating unit 102, based on the continuity.

Thus, waveform estimation of actual world 1 signals is performed at the signal processing device 4 based on continuity, so in the event that the continuity detected by the data continuity detecting unit 101 is incorrect or detection precision thereof is poor, the estimation precision of the waveform of the actual world 1 signals is also poor.

Also, the signal processing device 4 performs signal processing based on continuity which actual world 1 signals, which is an image in this case, for example, have, signal processing with better precision than signal processing with other signal processing devices can be performed for the parts of the actual world 1 signals where continuity exists, and consequently, an image closer to the image corresponding to the actual world 1 signals can be output.

However, the signal processing device 4 cannot perform signal processing for parts of the actual world 1 signals where no clear continuity exists at the same level of precision as four parts were continuity does exist, since the signal processing is being performed based on continuity, and consequently, an image including error with regard to the image corresponding to the actual world 1 signals is output.

Accordingly, in order to obtain an image closer to the image corresponding to the actual world 1 signals with the signal processing device 4, processing regions where signal processing with the signal processing device 4 is to be performed, precision of the continuity used with the signal processing device 4, and so forth, are issues.

Here, FIG. 111 illustrates the configuration example of another embodiment of the signal processing device 4 in FIG. 1.

In FIG. 111, the signal processing device 4 comprises a processing region setting unit 10001, a continuity setting unit 10002, an actual world estimating unit 10003, an image generating unit 10004, an image display unit 10005, and a user I/F (Interface) 10006.

With the signal processing device 4 of which the configuration is shown in FIG. 111, image data (input image) which is an example of the data 3, is input from the sensor 2 (FIG. 1), and the input image is supplied to the processing region setting unit 10001, the continuity setting unit 10002, the actual world estimating unit 10003, the image generating unit 10004, and the image display unit 10005.

The processing region setting unit 10001 sets the processing region for the input image, and supplies processing region information identifying the processing region to the continuity setting unit 10002, the actual world estimating unit 10003, and the image generating unit 10004.

The continuity setting unit 10002 recognizes the processing region in the input image from the processing region information supplied from the processing regions setting unit 10001, sets the continuity of the actual world 1 signals lost from the image data at that processing region, and supplies continuity information representing that continuity to the actual world estimating unit 10003 and the image generating unit 10004.

The actual world estimating unit 10003 is configured of a model generating unit 10011, equation generating unit 10012, and actual world waveform estimating unit 10013, and estimates the actual world 1 signals from the image data within the processing region, according to the continuity of the corresponding actual world 1 signals.

That is to say, the model generating unit 10011 recognizes the processing region in the input image from the processing region information supplied from the processing region setting unit 10001, generates a function serving as a model which models the relation between the pixel values of the pixels within the processing region and the actual world 1 signals, according to the pixels making up the processing region and the continuity of the actual world 1 signals corresponding to the image data in the processing region, and supplies this to the equation generating unit 10012.

The question generating unit 10012 recognizes the processing region in the input image from the processing region information supplied from the processing regions setting unit 10001. Further, the equation generating unit 10012 substitutes the pixel values of each of the pixels making up the processing region into the function serving as a model that has been supplied from the model generating unit 10011, thereby generating an equation, which is supplied to the actual world waveform estimating unit 10013.

The actual world waveform estimating unit 10013 estimates the waveform of the actual world 1 signals, by computing the equation supplied from the equation generating unit 10012. That is to say, the actual world waveform estimating unit 10013 obtains an approximation function approximating the actual world 1 signals by solving the equation supplied from the equation generating unit 10012, and supplies the approximation function to the image generating unit 10004, as estimation results of the waveform of the actual world 1 signals. Note that approximation function approximating the actual world 1 signals include functions with constant function values, regardless of argument value.

The image generating unit 10004 generates signals closer approximating the actual world 1 signals, based on the approximation function representing the waveform of the actual world 1 signals estimated at the actual world estimating unit 10003, and the continuity information supplied from the continuity setting unit 10002. That is to say, the image generating unit 10004 recognizes the processing region in the input image from the processing region information supplied from the processing region setting unit 10001, and generates image data closer approximating the image corresponding to the actual world 1 signals with regard to the processing region, based on the approximation function supplied from (the actual world waveform estimating unit 10013) of the actual world estimating unit 10003, and the continuity information supplied from the continuity setting unit 10002.

Further, the image generating unit 10004 synthesizes the input image and image data generated based on the approximation function (hereafter referred to as approximation image as appropriate), generates an image wherein the portion of the processing region of the input image has been substituted with the approximation image, and supplies the image as an output image to the image display unit 10005.

The image display unit 10005 is configured of a CRT (Cathode Ray Tube) or an LCD (Liquid Crystal Display), and displays input images, or output images supplied from the image generating unit 10004.

Note that the image display unit 10005 can be configured of single or multiple CRTs or LCDs. In the event of configuring the image display unit 10005 with a single CRT or LCD, an arrangement maybe made wherein the screen of the single CRT or LCD is divided into multiple screens, with input images displayed on one screen and output images displayed on another screen. Further, in the event of configuring the image display unit 10005 of multiple CRTs or LCDs, an arrangement may be made wherein input images are displayed on one CRT or LCD, and outputs images are displayed on another CRT or LCD.

Also, the image display unit 10005 performs display of various types in accordance with the output of the user I/F 10006. That is to say, the image display unit 10005 displays a cursor, for example, and in the event that the user operates the user I/F 10006 so as to move the cursor, the cursor is moved in accordance with the operations thereof. Also, in the event that the user operates the user I/F 10006 so as to select a predetermined range, the image display unit 10005 displays a frame surrounding the range selected on the screen in accordance with the operations thereof.

The user I/F 10006 is operated by the user, and in accordance with the user operations, supplies information relating to at least one of, for example, processing range, continuity, and real world signals, to the processing region setting unit 10001, continuity setting unit 10002, or actual world estimating unit 10003.

That is to say, the user views an input image or output image displayed on the image display unit 10005, and operates the user I/F 10006 so as to provide input with regard to the input image or output image. The user I/F 10006 is operated by the user, and in accordance with the user operations, supplies information relating to processing range, continuity, or real world signals, to the processing region setting unit 10001, continuity setting unit 10002, or actual world estimating unit 10003, as assisting information for assisting the processing of the processing region setting unit 10001, continuity setting unit 10002, or actual world estimating unit 10003.

Upon assisting information being supplied from the user I/F 10006, the processing region setting unit 10001, continuity setting unit 10002, or actual world estimating unit 10003 each perform setting of processing region, setting of continuity, or estimation of actual world 1 signals, based on the assisting information.

Note however, that the processing region setting unit 10001, continuity setting unit 10002, or actual world estimating unit 10003, can each perform the setting of processing region, setting of continuity, or estimation of actual world 1 signals, even without using the assisting information, i.e., even without the user operating the user I/F 10006.

Specifically, with the processing region setting unit 10001, processing can be performed in the same way as with the data continuity detecting unit 101 shown in FIG. 3, as described with reference to FIG. 30 to FIG. 48, wherein a continuity region is detected from the input image, and a rectangular (oblong) region surrounding the continuity region is set as a processing region.

Also, with the continuity setting unit 10002, processing can be performed in the same way as with the data continuity detecting unit 101 shown in FIG. 3, as described with reference to FIG. 49 through FIG. 57, wherein data continuity is detected from the input image, and the continuity of the corresponding actual world 1 signals is set based on the continuity of that data, i.e., for example, the data continuity is set as continuity of the actual world 1 signals with no change.

Further, with the actual world estimating unit 10003, processing may be performed in the same way as with the actual world estimating unit 102 shown in FIG. 3, as described with reference to FIG. 58 through FIG. 88, where actual world 1 signals are estimated from the image data of the processing region set by the processing region setting unit 10001, corresponding to the continuity set by the continuity setting unit 10002. Note that while the data continuity has been used for estimating actual world 1 signals that the actual world estimating unit 102 in FIG. 3, an arrangement may be made wherein the continuity of corresponding actual world 1 signals is used instead of the data continuity for estimating actual world 1 signals.

Figure 112:
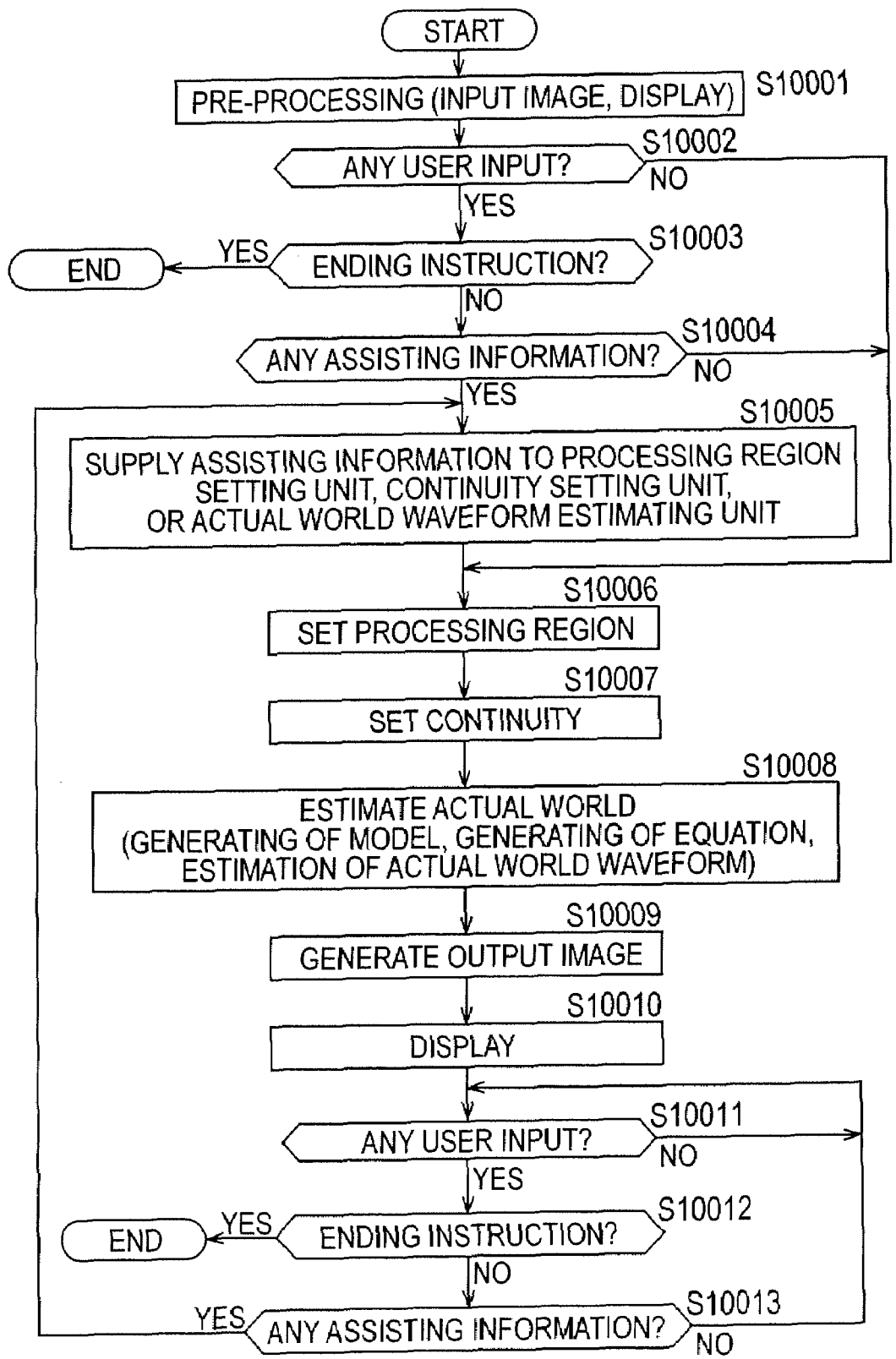
FIG. 112 is a flowchart for describing the processing of the signal processing device 4 shown in FIG. 111.

Next, the processing of the signal processing device 4 shown in FIG. 111 will be described with reference to the flowchart in FIG. 112.

First, in step S10001, the signal processing device 4 performs pre-processing, and the flow proceeds to step S10002. That is to say, the signal processing device 4 supplies one frame or one field, for example, of the input image, supplied from the sensor 2 (FIG. 1) as data 3, to the processing region setting unit 10001, continuity setting unit 10002, actual world estimating unit 10003, image generating unit 10004, and image display unit 10005. Further, the signal processing unit 4 causes the image display unit 10005 to display the input image.

In step S10002, the user I/F 10006 determines whether or not there has been some sort of user input, by the user operating the user I/F 10006. In step S10002, in the event that determination is made that there is no user input, i.e., in the event that the user has made no operations, step S10003 through step S10005 are skipped, and the flow proceeds to step S10006.

Also, in the event that determination is made in step S10002 that there has been user input, i.e., in the event that the user has viewed the input image displayed on the image display unit 10005 and operated the user I/F 10006, thereby making user input indicating some sort of instruction or information, the flow proceeds to step S10003, where the user I/F 10006 determines whether or not the user input is ending instructions for instructing ending of the processing of the signal processing device 4.

In the event that determination is made in step S10003 that the user input is ending instructions, the signal processing device 4 ends processing.

Also, in the event that determination is made in step S10003 that the user input is not ending instructions, the flow proceeds to step S10004, where the user I/F 10006 determines whether or not the user input is assisting information. In the event that determination is made in step S10004 that the user input is not assisting information, the flow skips step S10005, and proceeds to step S10006.

Also, in the event that determination is made in step S10004 that the user input is assisting information, the flow proceeds to step S10005, where the user I/F 10006 supplies the assisting information to the processing region setting unit 10001, continuity setting unit 10002, or actual world estimating unit 10006, and the flow proceeds to step S10006.

In step S10006, the processing region setting unit 10001 sets the processing region based on the input image, and supplies the processing region information identifying the processing region to the continuity setting unit 10002, actual world estimating unit 10003, and image generating unit 10004, and the flow proceeds to step S10007. Now, in the event that assisting information has been supplied from the user I/F 10006 in that immediately-preceding step S10005, the processing region setting unit 10001 performs setting of the processing region using that assisting information.

In step S10007, the continuity setting unit 10002 recognizes the processing region in the input image, from the processing region information supplied from the processing region setting unit 10001. Further, the continuity setting unit 10002 sets continuity of the actual world 1 signals that has been lost in the image data of the processing region, and supplies continuity information indicating the continuity thereof to the actual world estimating unit 10003, and the flow proceeds to step S10008. Now, in the event that assisting information has been supplied from the user I/F 10006 in that immediately-preceding step S10005, the continuity setting unit 10002 performs setting of continuity using that assisting information.

In step S10008, the actual world estimating unit 10003 estimates actual world 1 signals regarding to the image data with in the processing region of the input image, according to the continuity of the corresponding actual world 1 signals.

That is to say, at the actual world estimating unit 10003, the model generating unit 10011 recognizes the processing region in the input image, from the processing region information supplied from the processing region setting unit 10001, and also recognizes continuity of the actual world 1 signals corresponding to the image data in the processing region, from the continuity information supplied from the continuity setting unit 10002. Further the model generating unit 10011 generates a function serving as a model modeling the relation between the pixel values of each of the pixels within the processing region and the actual world 1 signals, according to the pixels making up the processing region in the input image, and the continuity of actual world 1 signals corresponding to the image data of the processing region, and supplies this to the equation generating unit 10012.

The equation generating unit 10012 recognizes the processing region in the input image from the processing region information supplied from the processing region setting unit 10001, and substitutes the pixel values of each of the pixels of the input image making up the processing region into the function serving as the model which is supplied from the model generating unit 10011, thereby generating an equation for obtaining an approximation function approximating the actual world 1 signals, which is supplied to the actual world waveform estimating unit 10013.

The actual world waveform estimating unit 10013 estimates the waveform of the actual world 1 signals by computing the equation supplied from the equation generating unit 10012. That is, the actual world waveform estimating unit 10013 obtains the approximation function serving as a model modeling the actual world 1 signals by solving the equation supplied from the equation generating unit 10012, and supplies the approximation function to the image generating unit 10004 as estimation results of the waveform of the actual world 1 signals.

Note that with the actual world estimating unit 10003, in the event that assisting information has been supplied from the user I/F 10006 in the immediately-preceding step S10005, at the model generating unit 10011 and equation generating unit 10012, processing is performed using that assisting information.

Following processing of step S10008, the flow proceeds to step S10009, where the image generating unit 10004 generates signals closer approximating the actual world 1 signals based on the approximation function approximating the waveform of the actual world 1 signals supplied from (the actual world waveform estimating unit 10013 of) the actual world estimating unit 10003. That is to say, the image generating unit 10004 recognizes the processing region in the input image from the processing region information supplied from the processing region setting unit 10001, and with regard to this processing region, generates an approximation image which is image data closer approximating the image corresponding to the actual world 1 signals, based on the approximation function supplied from the actual world estimating unit 10003. Further the image generating unit 10004 generates, as an output image, an image wherein the portion of the processing region of the input image has been replaced with the approximation image, and supplies this to the image display 10005, and the flow proceeds from step S10009 to step S10010.

In step S10010, the image display unit 10005 displays the output image supplied from the image generating unit 10004 instead of the input image displayed in step S10001, or along with the input image, and the flow proceeds to step S10011.

In step S10011, the user I/F 10006 determines whether or not there has been user input of some sort by the user operating the user I/F 10006, in the same way as with step S10002, and in the event that determination is made that there has been no user input, i.e., in the event that the user has made no operations, the flow returns to step S10011, and awaits user input.

Also, in the event that determination is made in step S10011 that there has been user input, i.e., in the event that the user has viewed the input image or output image displayed on the image display unit 10005 and operated the user I/F 10006, thereby making some sort of user input indicating instruction or information, the flow proceeds to step S10012, where the user I/F 10006 determines whether or not the user input is ending instructions instructing ending of the processing of the signal processing device 4.

In the event that determination is made in step S10012 that the user input is ending instructions, the signal processing device 4 ends processing.

Also, in the event that determination is made in step S10012 that the user input is not ending instructions, the flow proceeds to step S10013, where the user I/F 10006 determines whether or not the user input is assisting information. In the event that determination is made in step S10013 that the user input is not assisting information, the flow returns to step S10011, and the same processing is repeated thereafter.

Also, in step S10013, in the event that determination is made that the user input is assisting information, the flow returns to step S10005, and as described above, the user I/F 10006 supplies the assisting information to the processing region setting unit 10001, the continuity setting unit 10002, or the actual world estimating unit 10006. The flow then proceeds from step S10005 to step S10006, and hereafter the same processing is repeated.

As described above, with the signal processing device 4 shown in FIG. 111, assisting information for assisting the processing region setting unit 10001, the continuity setting unit 10002, or the actual world estimating unit 10006, is supplied from the user I/F 10006 to the processing region setting unit 10001, the continuity setting unit 10002, or the actual world estimating unit 10003 and processing region setting, continuity setting, or actual world 1 signals estimation is performed at the processing region setting unit 10001, the continuity setting unit 10002, or the actual world estimating unit 10003 based on the assisting information from the user I/F 10006, thereby improving the processing precision of the processing region setting unit 10001, the continuity setting unit 10002, or the actual world estimating unit 10003, and enabling, for example, a high-quality output image meeting user preferences.

Next, various types of application examples of the signal processing device 4 shown in FIG. 111 will be described.

FIG. 113 illustrates a configuration example of an embodiment of an application of the signal processing device 4 shown in FIG. 111.

An image of, for example, one frame or one field as the data 3 from the sensor 2 is input into the signal processing device 4 in FIG. 113. Here, let us say that an object having a predetermined shape is displayed in the input image, such object moving in the horizontal direction (crosswise direction) of the input image at a constant speed of v pixels per shutter time (exposure time). In other words, regarding the input image, the object is moving in the horizontal direction at the movement amount of v pixels, and therefore because of the time integration effect of the sensor 2, the light signal of the object and the light signal of the portion other than the object are mixed (time mixture), and thus, the image is blurred at portions such as the borders of the object. With the signal processign device 4 shown in FIG. 113, a high-quality output image is generated, wherein movement blurring due to such time mixture has been eliminated from the input image.

In FIG. 113, the processing region setting unit 15011, the continuity setting unit 15012, the actual world estimating unit 15013, image generating unit 15014, image display unit 15015, and user I/F 15016, each correspond to the processing region setting unit 10001, the continuity setting unit 10002, the actual world estimating unit 10003, image generating unit 10004, image display unit 10005, and user I/F 10006 shown in FIG. 111, and basically perform the same processing as the processing region setting unit 10001, the continuity setting unit 10002, the actual world estimating unit 10003, image generating unit 10004, image display unit 10005, and user I/F 10006. Further, in FIG. 113, the actual world estimating unit 15013 comprises a model generating unit 15021, an equation generating unit 15022, and actual world waveform estimating unit 15023. The model generating unit 15021, equation generating unit 15022, and actual world waveform estimating unit 15023 correspond to each of the model generating unit 10011, equation generating unit 10012, and actual world waveform estimating unit 10013 in FIG. 111, and basically perform the same functions as each of the model generating unit 10011, equation generating unit 10012, and actual world waveform estimating unit 10013.

Note however, that in FIG. 113, the assisting information which the user I/F 15016 outputs by the user operating the user I/F 15016, is supplied only to the equation generating unit 15022.

In other words, in FIG. 113, by operating the user I/F 15016, with the equation generating unit 15022, the user can set the constraint conditions which constrain the relation between each of the pixels of an image with no movement blurring, which is an image of the actual world 1 corresponding to the input image, and when the user performs an operation to set the constraint conditions, the user I/F 15016 supplies the constraint condition information expressing the constraint conditions set by the operation to the equation generating unit 15022.

Specifically, for example, a user who views an image displayed on the image display unit 15015 reflecting a blurring image guesses the original image, that is to say, an image without movement blurring which is an image of the actual world 1 corresponding to the input image. Also, for example, the user guesses predetermined regions where blurring is occurring as the edge portions, and guesses the relation of the pixel values between each of the pixels (the constraint conditions), such as the difference being large between the pixel values (level) between the adjacent pixels at the edge portions. Further, the user can set the conditions suitable for the guessed relation of the pixels value between each of the pixels into the equation generating unit 15022, by operating the user I/F 15016.

Also, in FIG. 113, the processing region information, which is supplied from the processing region setting unit 15011 to the actual world estimating unit 15013, is supplied to the model generating unit 15021 and the equation generating unit 15022 of the actual world estimating unit 15013. The model generating unit 15021 and the equation generating unit 15022 recognize the processing region in the input image from the processing region information which is supplied from the processing region setting unit 15011.

The continuity setting unit 15012 sets a movement amount (movement vector) in the input image as the continuity information that an object is moving in the horizontal direction of the image at the constant speed of v pixels per shutter time, and supplies this movement amount v as the continuity information to the model generating unit 15021 of the actual world estimating unit 15013.

The model generating unit 15021 generates an equation (hereafter referred to as model equation as appropriate) as a model (hereafter referred to as relation model as appropriate), modeling the relation between the signal of the actual world 1 and the pixel values of each of the pixels of the movement blurring image as the input image which considers the movement amount v as the continuity information supplied from the continuity setting unit 15012, regarding the processing region recognized by the processing region information which is supplied from the processing region setting unit 15011, and supplies the generated model equation to the equation generating unit 15022.

The equation generating unit 15022 generates a constraint condition Expression (hereafter referred to as constraint condition expression as appropriate), based on the constraint condition information supplied from the user I/F 15016, and substitutes the pixel values of each of the pixels of the input image comprising the processing region into this constraint condition expression and the model equation which is supplied from the model generating unit 15021 to the equation generating unit 15022, and thus, generates an equation to find the approximation function as a model (hereafter referred to as approximation model) wherein the signal of the actual world 1 is modeled, and supplies this to the actual world waveform estimating unit 15023.

The actual world waveform estimating unit 15023 estimates the waveform of the signal of the actual world 1, by computing the equation supplied from the equation generating unit 15022. In other words, the actual world waveform estimating unit 15023 finds the approximation function as an approximation model, and supplies the approximation function to the image generating unit 15014 as the estimation result of the signal waveform of the actual world 1. Here, the approximation function which approximates the signal of the actual world 1 has contained a function value that is a fixed function, regardless of the argument value.

The image generating unit 15014 recognizes the processing region of the input image, based on the processing region information supplied from the processing region setting unit 15011. Also, the image generating unit 15014 generates a signal more closely approximating the signal of the actual world 1, from the approximation function supplied from the actual world waveform estimating unit 15023, that is to say, generates an image with no movement blurring, and replaces the image of the processing region of the input image with an image wherein the image has no movement blurring, generates this as an output image, and supplies this to the image display unit 15015.

Figure 114:
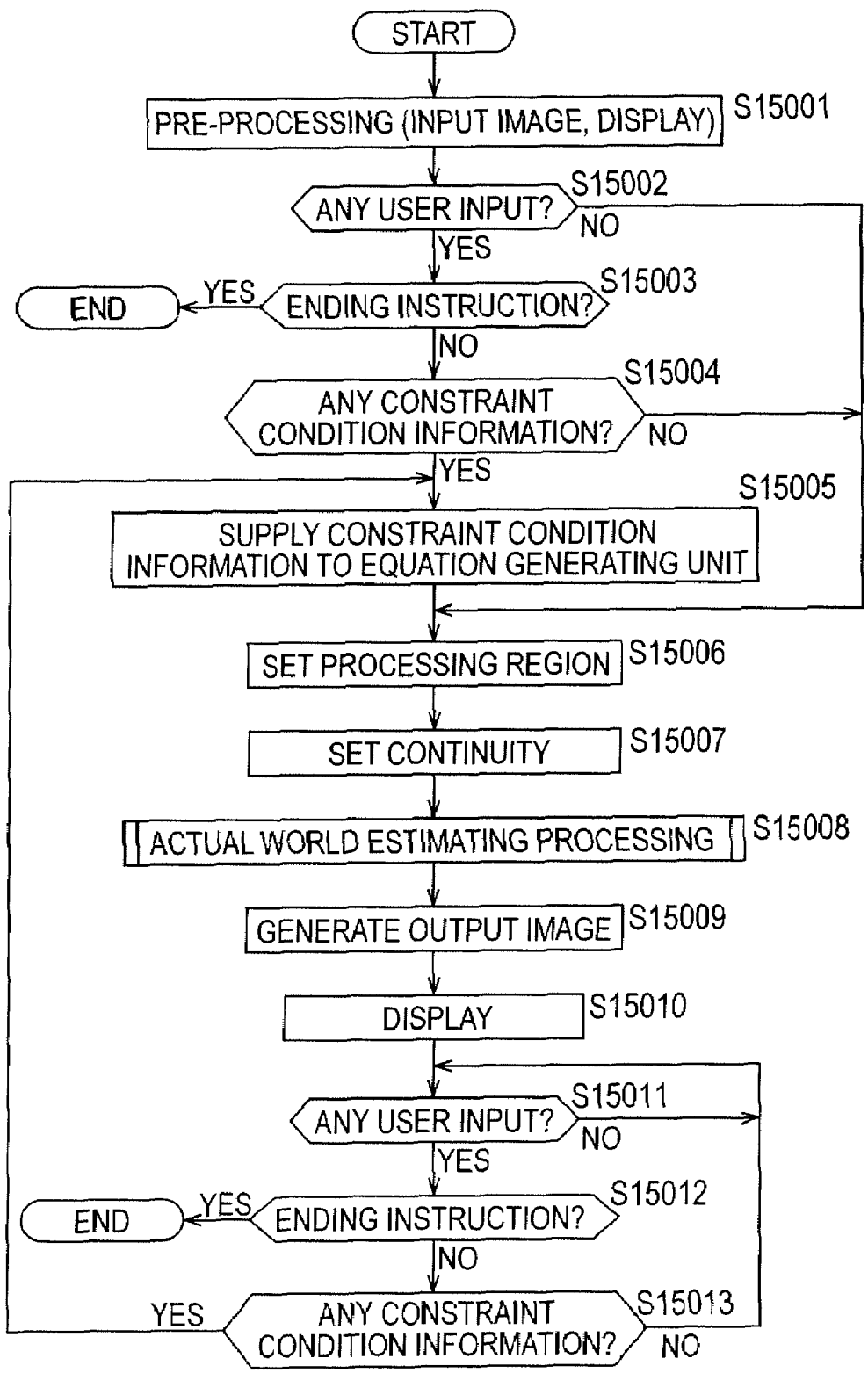
FIG. 114 is a flowchart for describing the processing of the signal processing device 4 shown in FIG. 113.

Next, the processing of the signal processing device 4 in FIG. 113 will be described with reference to the flowchart in FIG. 114.

First, in step S15001, the signal processing device 4 performs pre-processing, and the flow proceeds to step S15002. That is to say, the signal processing device 4 supplies one frame or one field, for example, of the input image, supplied from the sensor 2 (FIG. 1) as data 3, to the processing region setting unit 15011, continuity setting unit 15012, actual world estimating unit 15013, image generating unit 15014, and image display unit 15015. Further, the signal processing unit 4 causes the image display unit 15015 to display the input image.

In step S15002, the user I/F 15016 determines whether or not there has been some sort of user input, by the user operating the user I/F 15016. In step S15002, in the event that determination is made that there is no user input, i.e., in the event that the user has made no operations, step S15003 through step S15005 are skipped, and the flow proceeds to step S15006.

On the other hand, in step S15002, in the event that determination is made that there has been user input, i.e., in the event that the user has viewed the input image displayed on the image display unit 15015 and operated the user I/F 15016, thereby making user input indicating some sort of instruction or information, the flow proceeds to step S15003, where the user I/F 15016 determines whether or not the user input is user instructions instructing ending of the processing of the signal processing device 4.

In the event that determination is made in step S15003 that the user input is ending instructions, the signal processing device 4 ends the processing.

Also, in the event that determination is made in step S15003 that the user input is not ending instructions, the flow proceeds to step S15004, where the user I/F 15016 determines whether or not the user input is constraint condition information. In the event that determination is made in step S15004 that the user input is not constraint condition information, step S15005 is skipped, and the flow proceeds to step S15006.

Also, in the event that determination is made in step S15004 that the user input is constraint condition information, the flow proceeds to step S15005, where the user I/F 15016 supplies the constraint condition information to the equation generating unit 15022, and the flow proceeds to step S15006.

In step S15006, the processing region setting unit 15011 sets the processing region based on the input image, and supplies the processing region information identifying the processing region to the continuity setting unit 15012, the model generating unit 15021 and the equation generating unit 15022 of the actual world estimating unit 15013, and image generating unit 15014, and the flow proceeds to step S15007. Now, the setting of the processing region in step S15006 can be arranged by the user inputting the processing region instruction information by operating the user I/F 15016, and can be performed based on this processing region instruction information, or can be performed with no processing region instruction information from the user.

In step S15007, the continuity setting unit 15012 recognizes the processing region in the input image, from the processing region information supplied from the processing region setting unit 15011. Further, the continuity setting unit 15012 sets the continuity of the signal of the actual world 1, of which one portion of continuity has been lost of the image data of the processing region, and the continuity information showing this continuity is supplied to the model generating unit 15021 of the actual world estimating unit 15013, and the flow proceeds to step S15008. Here the continuity setting unit 15012 sets the movement amount v, expressing that the movement is in the horizontal direction at a constant speed of v pixels per shutter time (exposure time), as the continuity information, and supplies this to the model generating unit 15021 of the actual world estimating unit 15013. Here, the continuity setting unit 15012 sets the movement amount showing only the movement size as continuity information, under the premise that the object is moving in a horizontal direction, but a movement vector showing the size and direction of the movement of the object can be set as continuity information as well. The setting of continuity in step S15007 can be arranged by the user inputting the continuity instruction information by operating the user I/F 15016, and can be performed based on this continuity instruction information, or can be performed with no continuity instruction information from the user.

The actual world estimating unit 15013 performs actual world estimating processing in step S15008. In other words, with the actual world estimating unit 15013, the model generating unit 15021 generates an equation (model equation) as the model (relation model) wherein the relation of the pixel values of each of the pixels of the input image which has movement blurring and the signal of the actual world 1 is modeled, based on the movement amount v supplied from the continuity setting unit 15012 in step S15007 and the processing region information supplied from the processing region setting unit 15011 in step S15006, and the generated model is supplied to the equation generating unit 15022.

The equation generating unit 15022 generates a constraint condition expression based on the constraint condition information supplied from the user I/F 15016 in step S15005, and further, generates an equation for finding the approximation function of the model (approximation model) wherein the signal of the actual world 1 is modeled, from the constraint condition expression and the model equation supplied from the model generating unit 15021 to the equation generating unit 15022, and substitutes the pixel values of each of the pixels of the input image into this equation, and supplies this to the actual world waveform estimating unit 15023.

The actual world waveform estimating unit 15023 estimates the waveform of the signal of the actual world 1, that is to say, finds the approximation function as a model which models the signal of the actual world 1, by calculating the equation supplied from the equation generating unit 15022, and supplies this approximation function to the image generating unit 15014 as the estimation result of the signal waveform of the actual world 1.

The actual world estimating processing of step S15008 will be described in detail later with reference to FIG. 130.

After the processing in step S15008, the flow proceeds to step S15009, and the image generating unit 15014 generates a signal more closely approximating the signal from the actual world 1, from the approximation function supplied from the actual world waveform estimating unit 15023, that is to say, generates an image with no movement blurring, and based on the processing region information supplied from the processing region setting unit 15011, replaces the portion of the processing region of the input image with an image which has no movement blurring generated, generates this as an output image, and supplies this to the image display unit 15015, and the flow proceeds to step S15010.

In step S15010, the image display unit 15015 displays the output image supplied from the image generating unit 15014 instead of the input image displayed in step S15001, or along with the input image, and the flow proceeds to step S15011.

In step S15011, as with the case of step S15002, the user I/F 12006 determines whether or not there has been some sort of user input by the user operating the user I/F 15016, and in the event that determination is made that there has been no user input, i.e., in the event that the user has made no operations, the flow returns to step S15011, and awaits some sort of user input.

Also, in the event that determination is made in step S15011 that there has been user input, i.e., in the event that the user has viewed the input image or output image displayed on the image display unit 15015 and operated the user I/F 15016, thereby making user input representing some sort of instructions or information, the flow proceeds to step S15012, where the user I/F 15016 determines whether or not the user input is ending instructions instructing ending of the processing of the signal processing device 4.

In the event that determination is made in step S15012 that the user input is ending instructions, the signal processing device 4 ends processing.

On the other hand, in the event that determination is made in step S15012 that the user input is not ending instructions, the flow proceeds to step S15013, where the user I/F 15016 determines whether or not the user input is constraint condition information. In the event that determination is made in step S15013 that the user input is not constraint condition information, the flow returns to step S15011, and the same processing is repeated thereafter.

Also, in step S15013, in the event that determination is made that the user input is constraint condition information, the flow returns to step S15005, and as described above, the user I/F 15016 supplies the constraint condition information to the equation generating unit 15022. The flow then proceeds from step S15005 to step S15006, and hereafter the same processing is repeated.

Now, in the event that the signal processing device 4 repeats the processing of step S15005 through step S15013, the processing of the above-described step S15006 and S15007 are the same as that set by the first processing S15006 and S15007, and the same process as the first process may be repeated, or may be skipped.

Thus, with the signal processing device 4 in FIG. 113, by finding an approximation function as a model wherein the signal of the actual world 1 is modeled, an output image of high image quality with no movement blurring can be generated.

Also, by operating the user I/F 15016, the user can set constraint conditions which constrain the relation between each of the pixels in the original image having no movement blurring, and in the event that a new constraint condition is input, an image without movement blurring can be requested again, and therefore an output image of high image quality according to the preference of the user can be easily acquired.

With the signal processing device 4 in FIG. 113, an output image without movement blurring is generated by finding an approximation function which approximates the light signal of the actual world 1, but this output image can be viewed as having the movement blurring removed from the input image. Accordingly, it can be said that processing is performed for movement blurring removal with the signal processing device 4 in FIG. 113.

The processing for movement blurring removal with the signal processing device 4 in FIG. 113 will be described in detail below. First, by modeling (formulating) the mechanism for movement blurring generation, a relation model is generated which models the relation between the pixel values of each of the pixels of the input image with movement blurring and the signal of the actual world 1. The light signal of the actual world 1 has no movement blurring, and therefore the relation model is a modeling of the relation between the pixel values of each of the pixels of the movement blurring image and the pixel values of each of the pixels of the image with no movement blurring.

Figure 115:
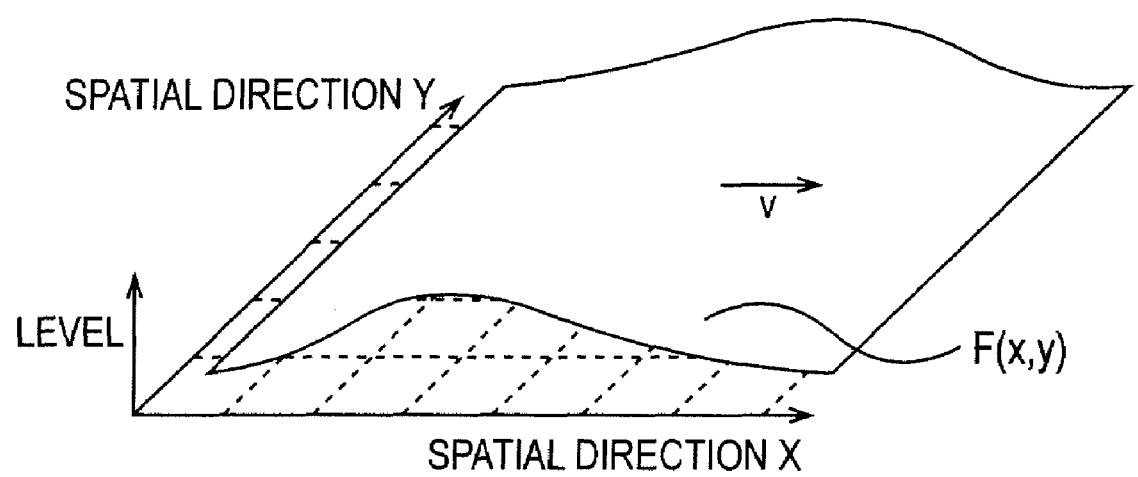
FIG. 115 is a diagram describing a light signal of an actual world 1.

FIG. 115 is a diagram describing the light signal of the actual world 1.

The light signal of the actual world 1 is to be regarded as a waveform F(x,y) on an X-Y plane (a plane formed of the X direction which is one direction of a spatial direction, and a Y direction which is perpendicular to the X direction) as illustrated in FIG. 115. The signal input into the signal processing device 4 of FIG. 113 is moving in the horizontal direction at the movement amount of v pixels as described above, and therefore is the same value as the waveform F(x,y) which is moving at the movement amount of v pixels per shutter time in the same direction as the spatial direction X. Hereafter, the waveform F(x,y) will be called the light signal function F(x, y).

The actual world estimating unit 15013 of the signal processing device 4 in FIG. 113 estimates a light signal function F(x,y) of the actual world 1 by finding an approximation function f(x,y) which approximates the light signal function F(x,y) of the actual world 1, based on the input image from the sensor 2.

The input image which is the output of the sensor 2 is the image data configured with multiple pixels wherein the above-described light signal of the actual world 1 (the light signal function F(x,y)) is projected as pixel values from the detecting elements (pixels) of the sensor which has an integration effect.

The integration effect in the case that the sensor 2 is a CCD will be described with reference to FIG. 116.

Figure 116:
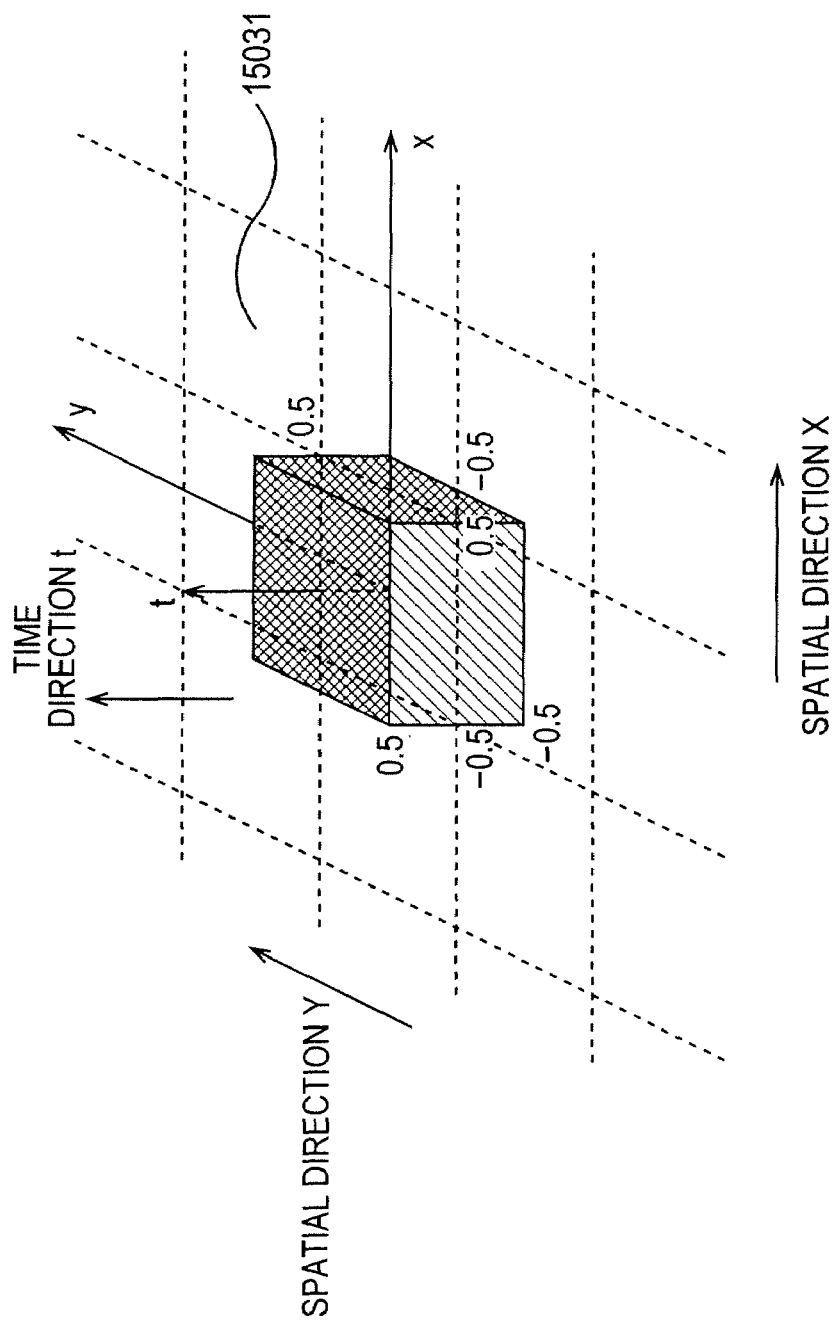
FIG. 116 is a diagram describing the integration effect in the event that the sensor 2 is a CCD.

As shown in FIG. 116, multiple detecting elements (pixels) 15031 are disposed on the plane of the sensor 2.

In the example shown in FIG. 116, the direction parallel to 1 predetermined side of the detecting element 15031 is the X direction which is one direction in the spatial direction, and the direction perpendicular to the X direction is the Y direction, which is the other direction in the spatial directions. The direction perpendicular to the X-Y plane is the t direction, which is the time direction.

Also, with the example in FIG. 116, the spatial shape of the respective detecting elements 15031 (corresponding to the pixels of the image data output by the sensor 2) of the sensor 2 is taken as a square of which one side is 1 in length. The shutter time (exposure time) of the sensor 2 is taken as 1.

Further, with the example in FIG. 116, the center of one detecting element 15031 of the sensor 2 is taken as the origin (position x=0 in the X direction, and position y=0 in the Y direction) in the spatial direction (X direction and Y direction), and the intermediate point-in-time of the exposure time is taken as the origin (position t=0 in the t direction) in the temporal direction (t direction).

In this case, the detecting element 15031 of which the center is in the origin (x=0, y=0) in the spatial direction subjects the light signal function F(x, y, t) to integration with a range between −0.5 and 0.5 in the X direction, range between −0.5 and 0.5 in the Y direction, and range between −0.5 and 0.5 in the t direction, and outputs the integral value thereof as a pixel value P.

That is to say, the pixel value P output from the detecting element 15031 of which the center is in the origin in the spatial direction is represented with the following Expression (137).

$$P = \int_{-0.5}^{+0.5} \int_{-0.5}^{+0.5} \int_{-0.5}^{+0.5} F(x, y, t) dx dy dt \quad (137)$$

The other detecting elements 15031 also output the pixel value P shown in Expression (137) by taking the center of the subject detecting element 15031 as the origin in the spatial direction in the same way.

Thus, the input image from the sensor 2 is a collection of data wherein each of the detecting elements (pixels) 15031 has a constant pixel value due to the integration effect of the sensor 2. Also, the integration effect of the sensor 2 comprises the integration of the spatial direction (X-Y direction) of the light signal of the actual world 1 (special mixture) and the integration in the time direction (t direction) (time mixture).

Accordingly, even in the cases wherein movement blurring of an object is occurring in an input image, strictly speaking the pixel value of each of the pixels of the input image is the value generated by both the spatial integration effect and the time integration effect (spatial mixture and time mixture have occurred), but with the movement blurring due to the movement of an object in the horizontal direction, the effect of the time integration effect is great, and therefore with this embodiment, in order to model the generation of movement blurring more easily, let us say that the approximation function f(x,y) is modeled as having generated only the time integration effect by the object moving v pixels per shutter time.

Figure 117:
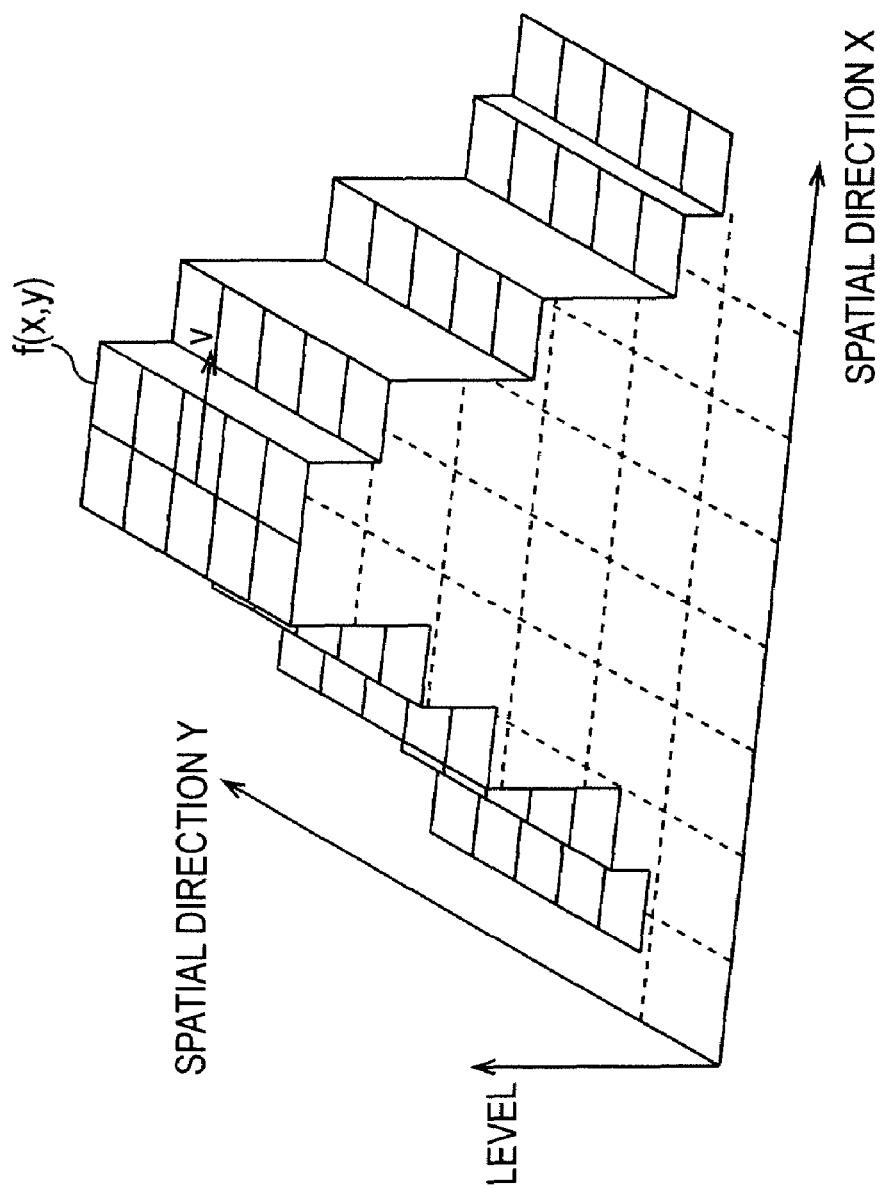
FIG. 117 is a diagram showing an approximation function f(x,y) of the actual world 1.

In other words, the approximation function f(x,y) approximating the actual world 1 has no spatial integration effect, as illustrated in FIG. 117, that is to say, is a function having a constant value within the various pixels of the sensor, and let us say that pixel values of the various pixels of the input image with movement blurring occurring are time-integrated values by the approximation function f(x,y) in FIG. 117 moving in the horizontal direction at a constant speed at the movement amount v.

Figure 118:
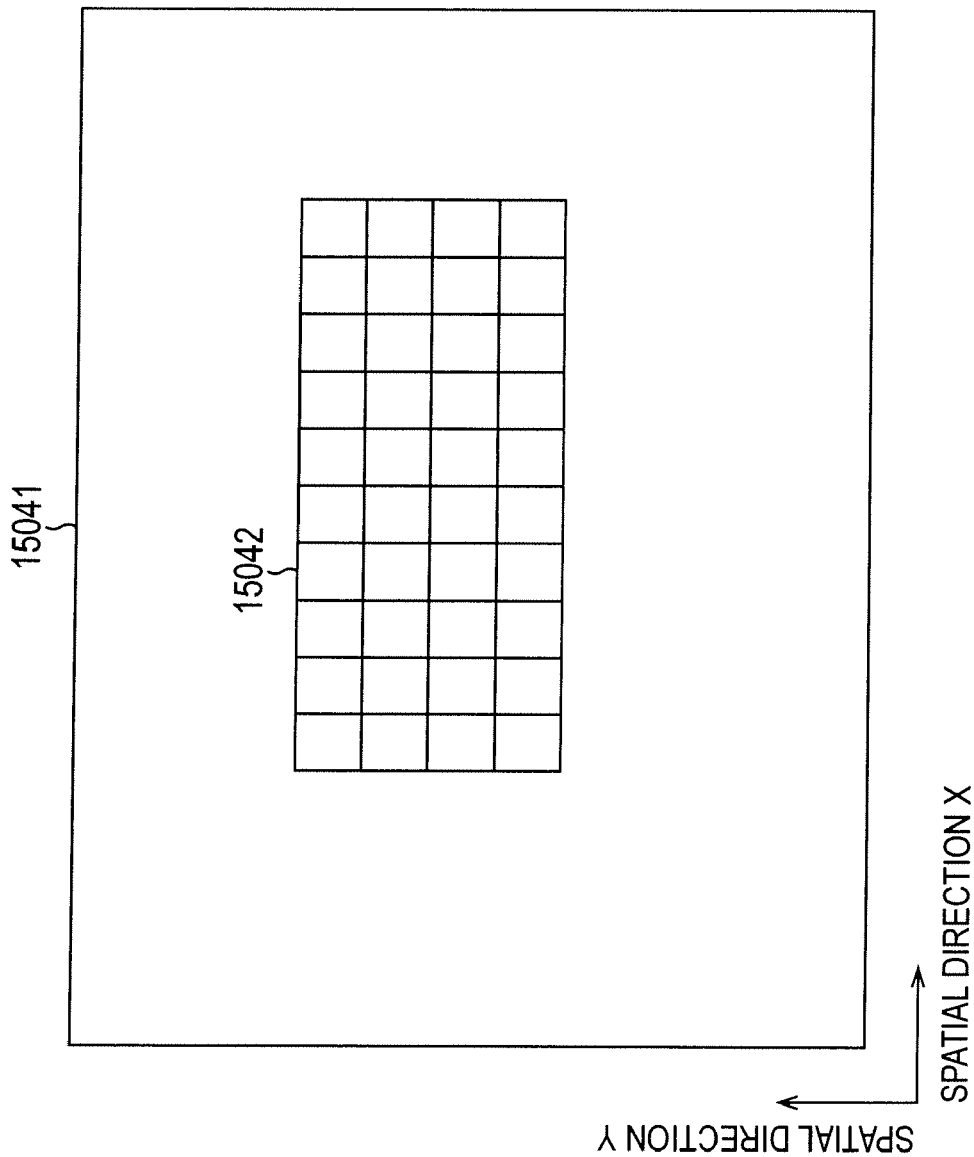
FIG. 118 is a diagram describing an input image to be input in the signal processing device 4 of FIG. 113, and a processing region.

FIG. 118 is a diagram illustrating the relation of the input image which is input in the signal processing device 4 and the processing region which is set in the processing region setting unit 15011.

The image 15041 (input image) which is input from the sensor 2 (FIG. 1) into the signal processing device 4 is an image having a predetermined number of pixels in the spatial direction of the X direction and the spatial direction of the Y direction.

A region 15042 which is a portion or all of the image 15041 is set as the processing region by the process region setting unit 15011. The information illustrating the region 15042 within the image 15041 is supplied as processing region information from the processing region setting unit 15011 to the continuity setting unit 15012, the actual world estimating unit 15013, and the image generating unit 15014. Hereafter the region 15042 will be called the processing region 15042.

Figure 119:
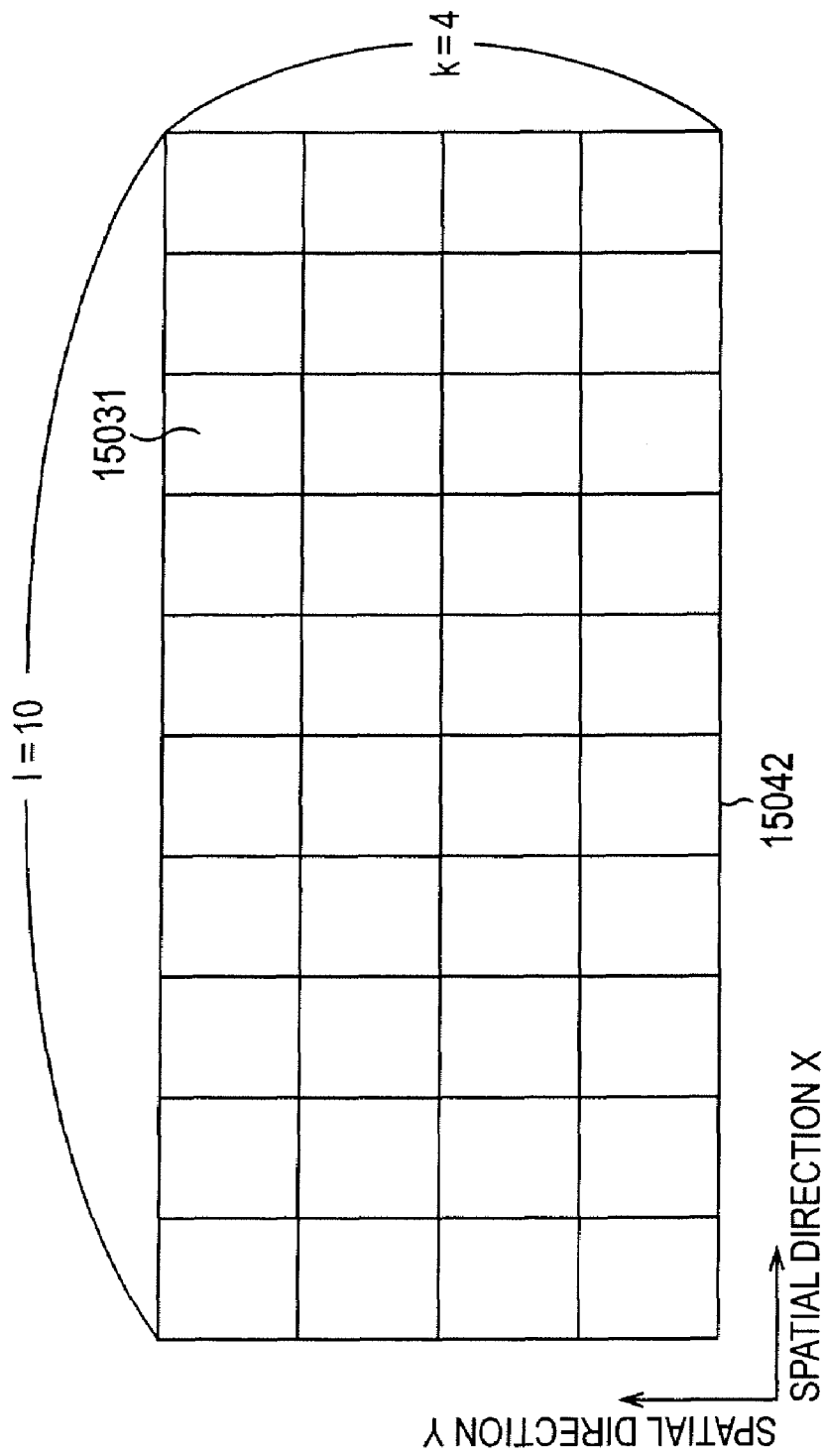
FIG. 119 is a diagram describing an example of a processing region set in the signal processing device 4 of the FIG. 113.

FIG. 119 is a diagram illustrating the processing region 15042.

The processing region 15042 is a region having a processing region width of l=10 pixels and line number of k=4, for example, as illustrated in FIG. 119. In other words, in FIG. 119, the processing region 15042 is comprised of 10×4=40 pixels.

Figure 120:
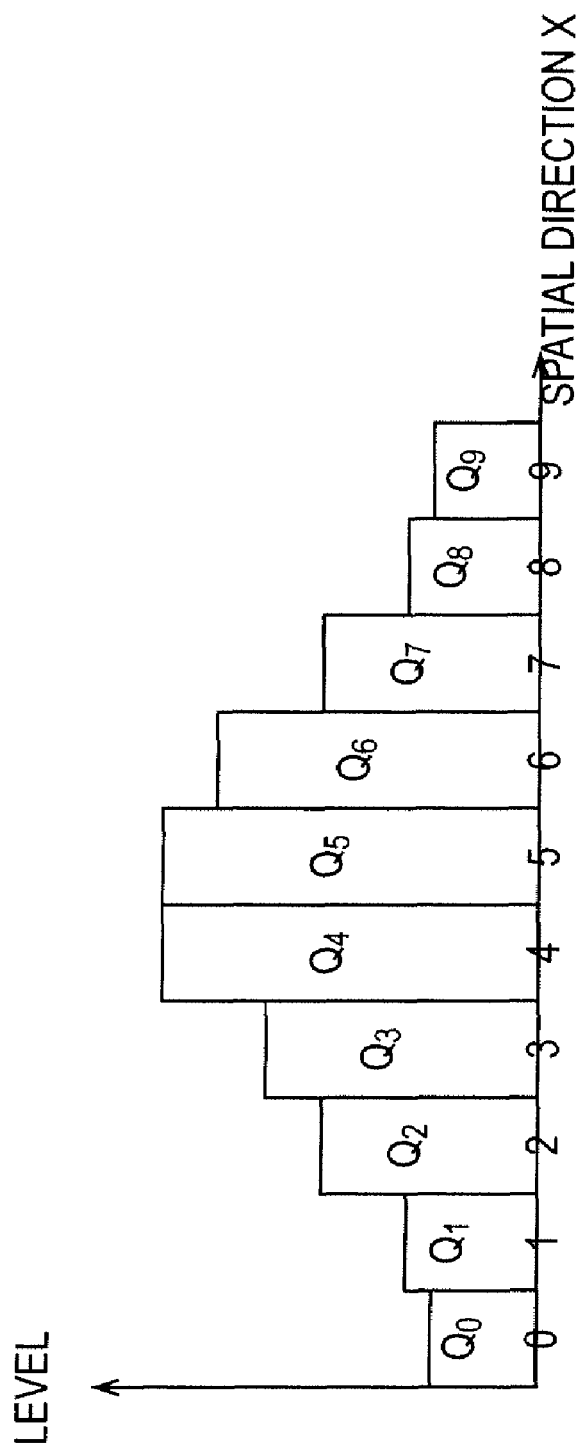

FIG. 120 is a diagram illustrating the approximation function f(x,y) in FIG. 117 at the timing of a predetermined instant regarding one line wherein the value of y is the predetermined value $y_c$ ($y=y_c$), within the processing region 15042. In other words, FIG. 120 is a diagram illustrating the approximation function f(x, $y_c$) at the timing of a predetermined instant. This approximation function f(x, $y_c$) is an approximation function f(x, y) illustrating the relation pixel level and the position of the special direction X when the time direction t and the spatial direction Y is at a fixed value, and this will simply be called an approximation function f(x).

The approximation function in FIG. 120 can be expressed as the following Expression (138).

$$f(x) = \begin{cases} Q_0 & -0.5 \leq x < 0.5 \\ Q_1 & 0.5 \leq x < 1.5 \\ Q_2 & 1.5 \leq x < 2.5 \\ Q_3 & 2.5 \leq x < 3.5 \\ Q_4 & 3.5 \leq x < 4.5 \\ Q_5 & 4.5 \leq x < 5.5 \\ Q_6 & 5.5 \leq x < 6.5 \\ Q_7 & 6.5 \leq x < 7.5 \\ Q_8 & 7.5 \leq x < 8.5 \\ Q_9 & 8.5 \leq x < 9.5 \end{cases} \quad (138)$$

Figure 121:
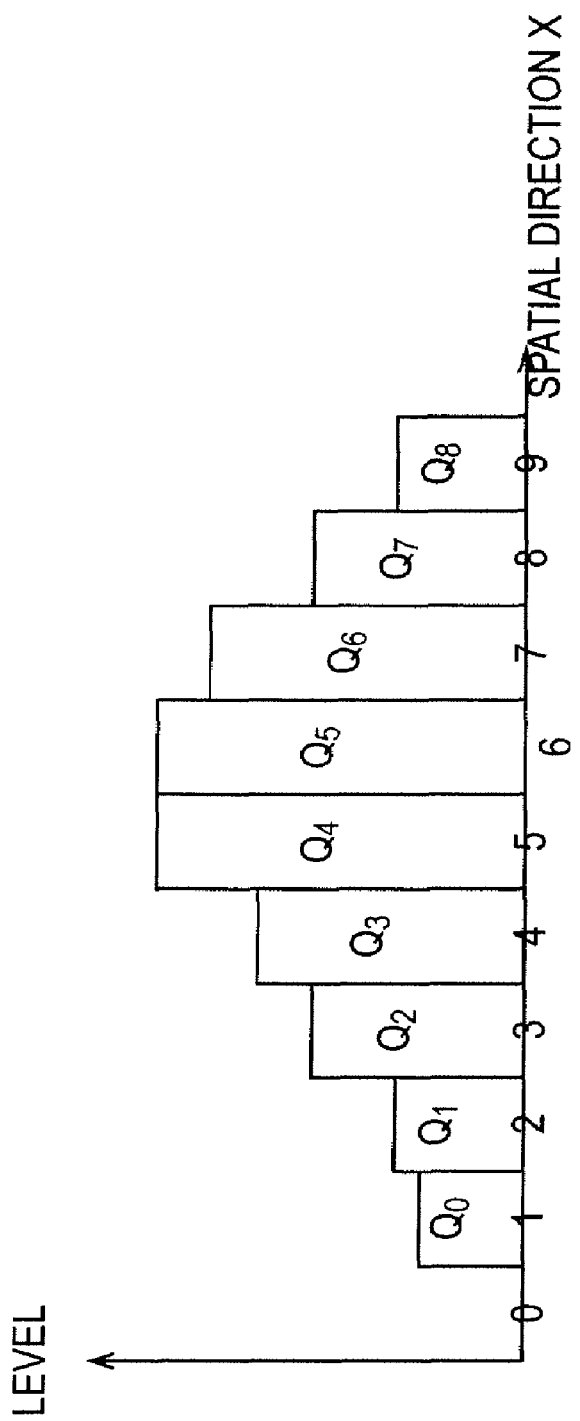

Expression (138) is an approximation function f(x) at the timing of an instant, and actually, the approximation function f(x) has a movement amount v, and therefore after a 1/v time in FIG. 120, becomes such as that illustrated in FIG. 121. The approximation function in FIG. 120 can be expressed as the following Expression (139).

$$f(x) = \begin{cases} 0 & -0.5 \leq x < 0.5 \\ Q_0 & 0.5 \leq x < 1.5 \\ Q_1 & 1.5 \leq x < 2.5 \\ Q_2 & 2.5 \leq x < 3.5 \\ Q_3 & 3.5 \leq x < 4.5 \\ Q_4 & 4.5 \leq x < 5.5 \\ Q_5 & 5.5 \leq x < 6.5 \\ Q_6 & 6.5 \leq x < 7.5 \\ Q_7 & 7.5 \leq x < 8.5 \\ Q_8 & 8.5 \leq x < 9.5 \end{cases} \quad (139)$$

Figure 122:
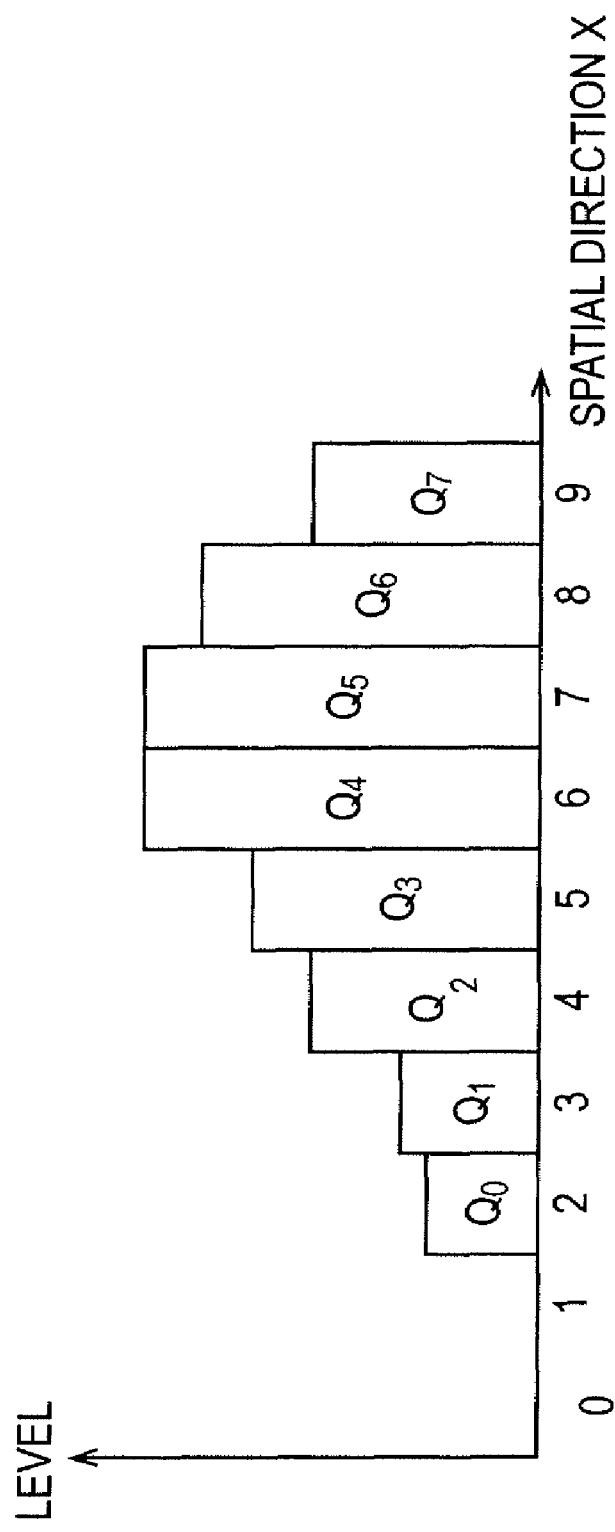

Further, after a 1/v time in FIG. 121, the function becomes such as that illustrated in FIG. 122, and the approximation function f(x) at this time is represented with the following Expression (140).

$$f(x) = \begin{cases} 0 & -0.5 \leq x < 0.5 \\ 0 & 0.5 \leq x < 1.5 \\ Q_0 & 1.5 \leq x < 2.5 \\ Q_1 & 2.5 \leq x < 3.5 \\ Q_2 & 3.5 \leq x < 4.5 \\ Q_3 & 4.5 \leq x < 5.5 \\ Q_4 & 5.5 \leq x < 6.5 \\ Q_5 & 6.5 \leq x < 7.5 \\ Q_6 & 7.5 \leq x < 8.5 \\ Q_7 & 8.5 \leq x < 9.5 \end{cases} \quad (140)$$

Figure 123:
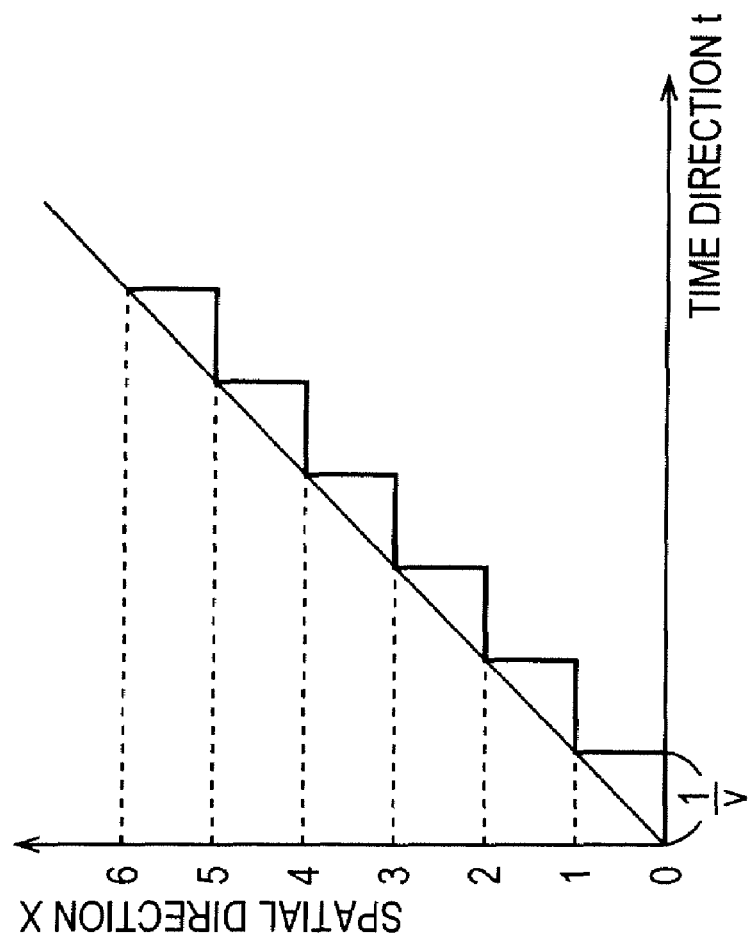

Here the movement amount v of the object can be considered as a simplified form as illustrated in FIG. 123, by the movement of the approximation function f(x) illustrated in FIG. 120 through FIG. 122. In other words, the object moves instantly to the center of the pixel next over in the x direction every 1/v time, and stays there for the period 1/v time. Accordingly, during the 1/v time, the pixel value of the same value as when the object is not moving as accumulated in the pixels of the sensor. Also, during the next 1/v time, the pixel values that are the same as when the object is not moving, is accumulated as to the pixel that was advanced only one pixel worth in the x direction.

In other words, in the event that the object (the light signal of the actual world 1) is moving at the movement amount v, each pixel can be considered to have 1/v times the pixel value as the same pixel value when the object is not moving at the movement amount v, accumulated in order, for every 1/v time.

As described above, even if we think of the object as moving only one pixel worth in the x direction instantly every 1/v time, the object can be seen as moving at the same speed in the x direction with the movement amount of v pixels for each unit of time, when viewed at a macro level, as illustrated by a straight line in FIG. 123.

The accumulation by the detecting elements of the sensor (time integration) of the object having the movement amount v will be further described with reference to FIG. 124 through FIG. 126.

Figure 124:
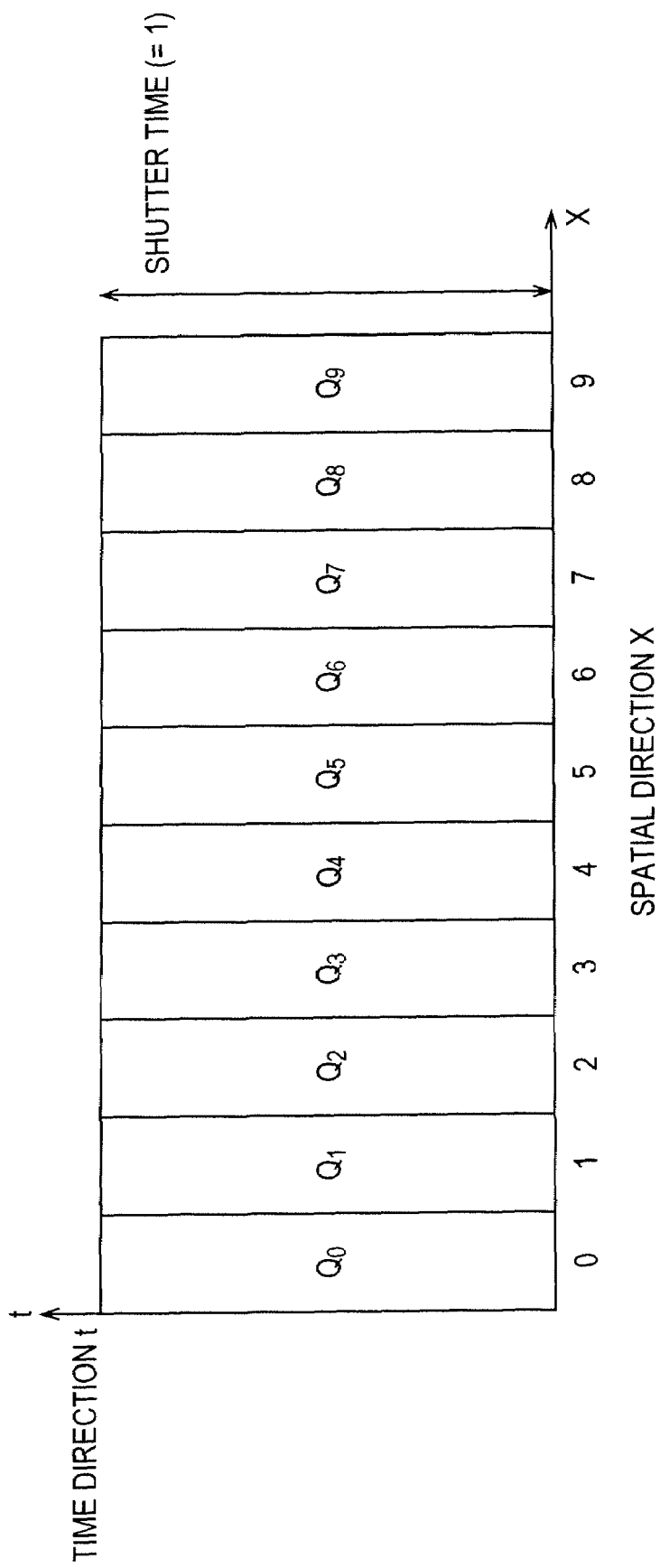

FIG. 124 is a diagram showing the approximation function f(x) of $y=y_c$ at a predetermined precise timing, illustrated in FIG. 120, with a X-t plane.

In FIG. 124, the width of the X direction of each pixel 15031 is 1, as described in FIG. 116, and the height in the t-direction is the shutter time (=1). Also, the area (the width in the X direction x the height in the t-direction) of each pixel 15031 are each the pixel values $Q_0$ through $Q_9$ accumulated (expressed by the total amount of electric charge) in each pixel 15031. These pixel values $Q_0$ through $Q_9$ are the pixel values of the image with no movement blurring.

Figure 125:
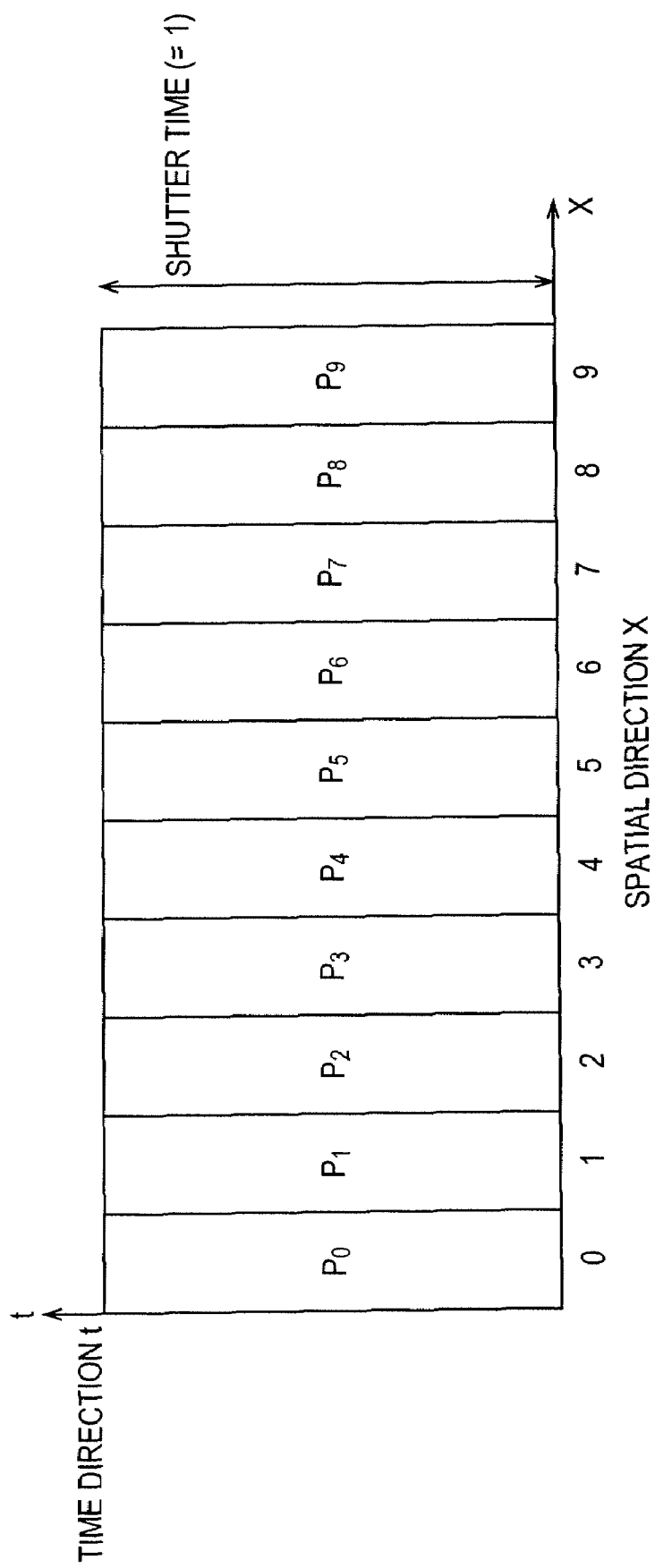

On the other hand, FIG. 125 is a diagram illustrating the pixel values, which are time-integrated and accumulated, when the object is moving at the movement amount v so as to correspond to the pixel values $Q_0$ through $Q_9$ in FIG. 124, as $P_0$ through $P_9$. In other words this is a diagram of an X-t plane of the pixel values $P_0$ through $P_9$ of the input image, regarding one line of the $y=y_c$ within the processing region 15042.

Figure 126:
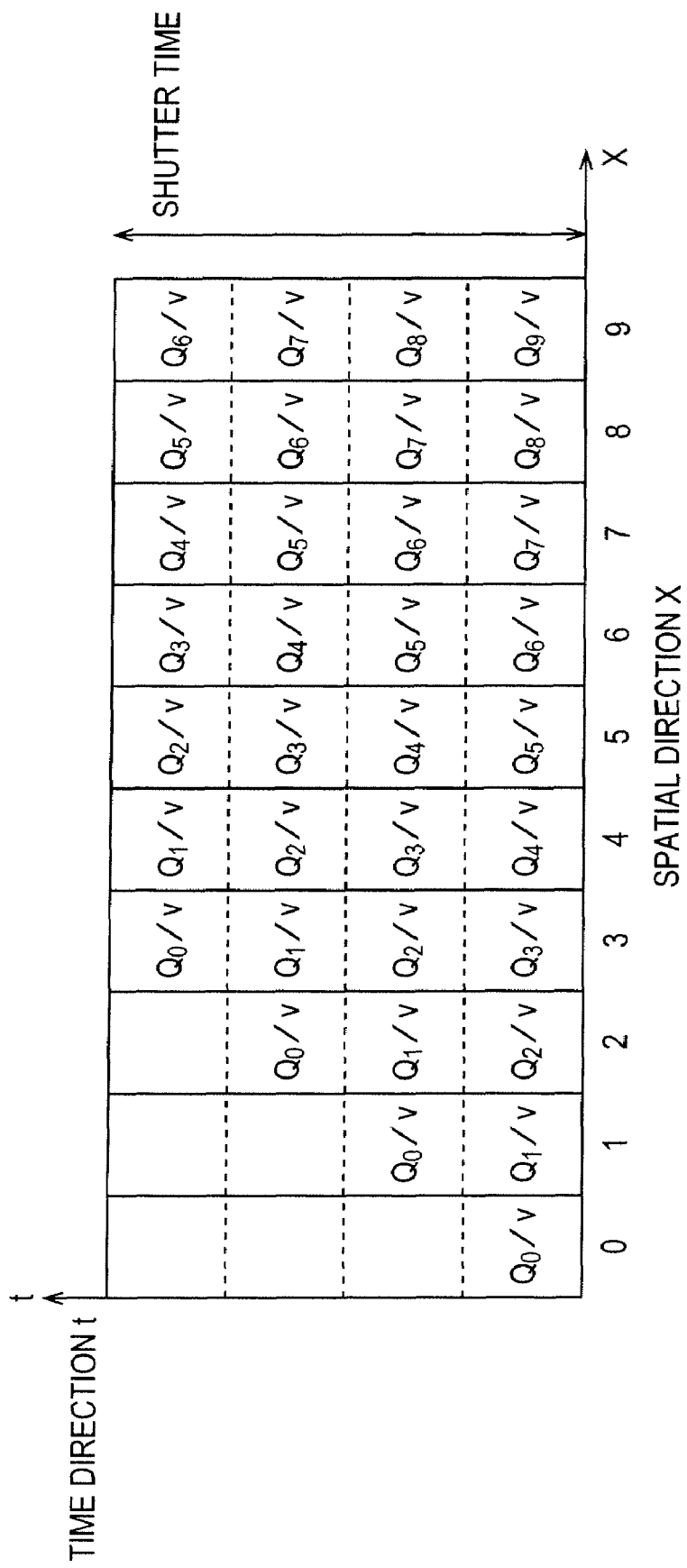

For example, based on the movement of the object described in the above-described FIG. 120 through FIG. 123 with v=4 (pixels), when the pixel values $P_0$ through $P_9$ of FIG. 125 are expressed using the pixel values $Q_0$ through $Q_9$ in FIG. 124, the result is such as that in FIG. 126.

In other words, for the first 1/v time of the shutter time, the pixel values (the electric charge corresponding thereto) equivalent to 1/v of the pixel value $Q_h$ (h=0 through $_9$) with no movement blurring are accumulated into each of the pixels where x=h. Then, for the next 1/v time, the pixels move over one pixel worth of the movement direction side in the X direction (the pixel on the right side in the diagram), and the pixel values equivalent to 1/v of the same pixel value $Q_h$ (h=0 through 8) are accumulated into each of the pixels where x=h. Hereafter, similarly, for each 1/v time, as the pixels move over one pixel worth of the movement direction side in the X direction, the pixel values equivalent to 1/v of the pixel value $Q_h$ (h=0 through 8) are accumulated. Hereafter, as long as the variable h which is a reference numeral has no special restriction, the variable h will express an integer where h=0 through 9.

In other words, with the pixel wherein X=0 is the center thereof (hereafter, this will be called a pixel with X=0), 1/v of the pixel value of the pixel value $Q_0$ ($Q_0$/v) is accumulated. With the pixel wherein X=1 is the center to the immediate right of the pixel wherein X=0 (hereafter this will be called the X=1 pixel), the pixel value ($Q_1$/v) which is 1/v of the pixel value $Q_1$ and the pixel value ($Q_1$/v) which is 1/v of the pixel value $Q_0$ are accumulated. With the pixel wherein X=2 is the center to the immediate right of the pixel wherein X=1 (hereafter this will be called the X=2 pixel), the pixel value ($Q_0$/v) which is 1/v of the pixel value $Q_0$, the pixel value ($Q_1$/v) which is 1/v of the pixel value $Q_1$, and the pixel value ($Q_2$/v) which is 1/v of the pixel value $Q_2$ are accumulated. Thereafter, the pixel values which are 1/v of the pixel values $Q_h$ are similarly moved over each 1/v time for each pixel, and accumulated.

The following Expression (141) is acquired when expressing the relation illustrated in FIGS. 125 and 126 with an expression.

$$(Q_0 + Q_1 + Q_2 + Q_3)/v = P_3 \quad (141)$$
$$(Q_1 + Q_2 + Q_3 + Q_4)/v = P_4$$
$$(Q_2 + Q_3 + Q_4 + Q_5)/v = P_5$$
$$(Q_3 + Q_4 + Q_5 + Q_6)/v = P_6$$
$$(Q_4 + Q_5 + Q_6 + Q_7)/v = P_7$$
$$(Q_5 + Q_6 + Q_7 + Q_8)/v = P_8$$
$$(Q_6 + Q_7 + Q_8 + Q_9)/v = P_9$$

Here, with the pixels wherein x=0, 1, or 2, there is a blank (unknown) region of the accumulated pixel values. Therefore, each of the $P_0$, $P_1$, and $P_2$ has not acquired an accumulated pixel value within the entire shutter time, and so cannot build an expression.

Expression (141) is a simultaneous equation wherein the mechanism of movement blurring generation is modeled, with the pixel values of each of the pixels of the movement blurring image being considered to be the accumulated (integrated) value wherein the pixel values of each of the pixels of an image with no movement blurring are accumulated (integrated), while moving at the movement amount v. In Expression (141), the pixel value $P_h$ when the object is moving at the movement amount v is the pixel value already known of the input image to be input into the signal processing device 4, and the pixel values $Q_h$ when the object has no movement expresses the pixel value to be found with no blurring.

Thus, the pixel values $P_h$ when the object is moving at the movement amount v can be said to be the pixel value wherein the pixel values $Q_h$ when the object has no movement are mixed for 1/v time each (time mixture). Hereafter, the pixel value $P_h$ when the object is moving at the movement amount v is called the mixed pixel value $P_h$, and the pixel values $Q_h$ when the object has no movement is simply called the pixel values $Q_h$. The approximation function f(x) as an approximation model wherein the signal of the actual world 1 is modeled is configured with a value of $Q_h$, as expressed in Expression (139) with the above-described example, and so Expression (141) is a model equation as a relation model wherein relation of the pixel values of each of the pixels of the movement blurring image as the input image and the signal of the actual world 1 is modeled. Also, finding the pixel value $Q_h$ with no movement blurring is the same as finding the approximation function f(x) wherein the actual world estimating unit 15013 has modeled the signal of the actual world 1.

The above-described simultaneous equation (141) can be built by setting the processing region width l of the processing region 15042 and the movement amount v. However, the simultaneous equation (141) only has 7 expressions, compared to the 10 variables of the pixel values $Q_h$. Accordingly, it is difficult to find the pixel values $Q_h$ with only Expression (141).

Therefore, two methods will be described for having at least the same number of expressions and number of variables.

Figure 127:
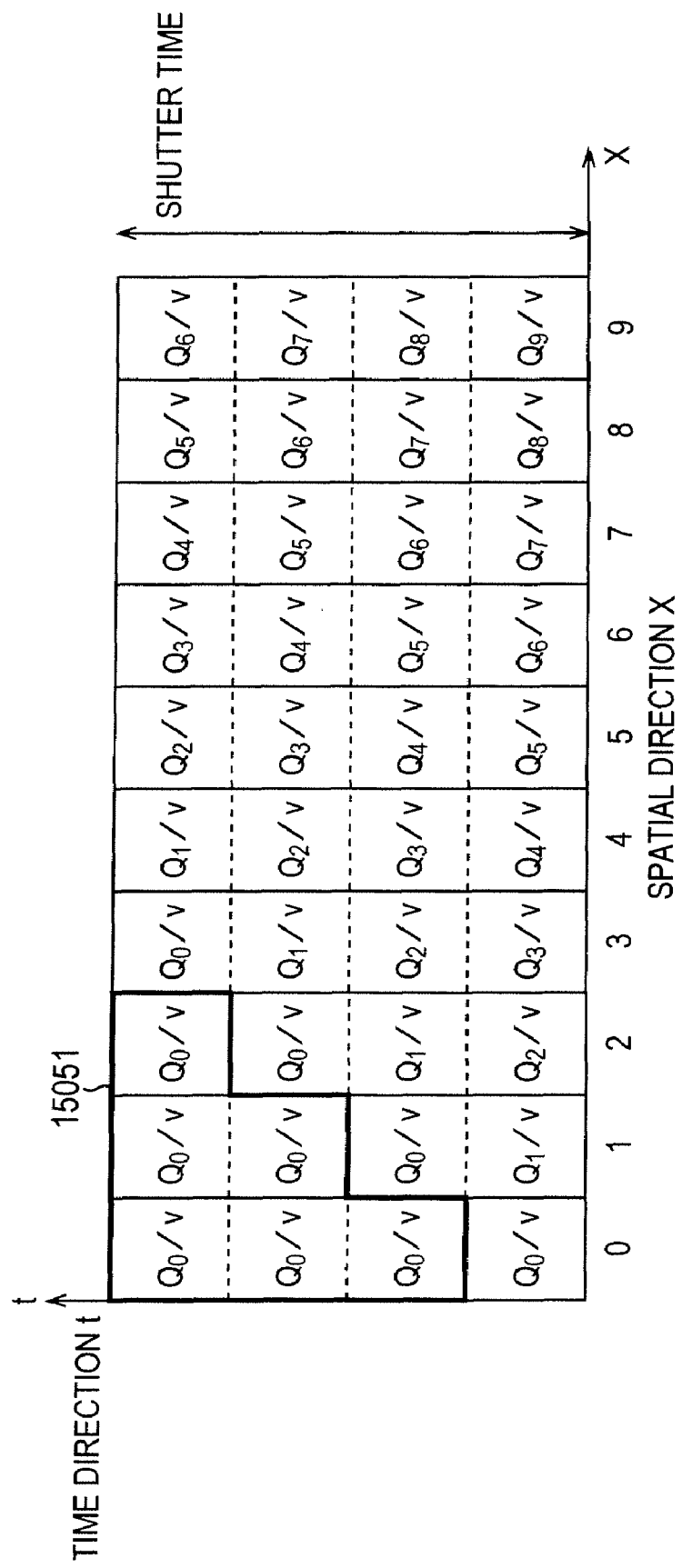

The first method is a method of hypothesizing that the edge portions of the processing region is "flat". That is to say, as shown in FIG. 127, this is a method of hypothesizing that the accumulated pixel value as to the blank (unknown) region 15051 of the pixel value is the same as the pixel value ($Q_0$/v) of 1/v of the pixel value $Q_0$, which is the edge portion of the first 1/v time.

In this case, the following Expression (142) can be newly acquired.

$$(Q_0 + Q_0 + Q_0 + Q_0)/v = P_0 \quad (142)$$
$$(Q_0 + Q_0 + Q_0 + Q_1)/v = P_1$$
$$(Q_0 + Q_0 + Q_1 + Q_2)/v = P_2$$

From Expression (141) and Expression (142), the number of expressions is 10 and the number of variables is 10, and so the pixel value $Q_h$ can be found.

With the processing which is described with reference to the flowchart in FIG. 114, in the event that there is no specification (setting) for constraint conditions by the user, that is to say, in the event that constraint condition information of the equation generating unit 15022 is not supplied form the user I/F 15016, for example the first method may be used. However, with the first method, the edge portions of the processing region are hypothesized as being "flat", and so the image configured from the pixel value $Q_h$ to be found with the first method can have noise generated in some cases.

Thus, in the case that constraint condition information is supplied from the user I/F 15016 to the equation generating unit 15022, a second method can be applied which is different from the first method. The second method is a method for acquiring a number of expressions greater than the number of variables by combining Expression (141) with an Expression (hereafter referred to as a constraint condition expression), which is built that hypothesizes (constrains) the relation of the pixel values of the adjacent various pixels in the image with no blurring.

In general, an image often has a spatial correlation, and therefore adjacent pixels often do not differ greatly. Thus, for example, a condition (hereafter referred to as a constraint condition) can be hypothesized to say that the difference is 0 (hereafter this will be called "adjacent pixel difference=0") for the pixel value $Q_h$ between each of the pixels not generating movement blurring. This constraint condition can be expressed with the following Expression (143).

$$Q_{h-1} - Q_h = 0 \quad h = 1, \ldots, (l-1) \quad (143)$$

Also, for example, a condition stating that "the pixel values are changing smoothly" can be hypothesized. This constraint condition can be expressed with the following Expression (144).

$$-Q_{h-1} + 2Q_h - Q_{h+1} = 0 \quad h = 1, \ldots, (l-2) \tag{144}$$

The user viewing an image displayed on the image display unit 15015 reflecting a blurred object guesses the original image, that is to say, an image without movement blurring which is an image of the actual world 1 corresponding to the input image, and can set the relation equation (constraint conditions) between the pixels which expresses the guessed state, into the equation generating unit 15022, by operating the user I/F 15016.

With the signal processing device 4 in FIG. 113, the constraint condition of Expression (143) is said to be set by the user (the constraint condition information is supplied from the user I/F 15016 which instructs Expression (143)). In this event, regarding the line illustrated in FIG. 124, a constraint condition expression can be acquired with is expressed with the following Expression (145).

$$\begin{aligned}
Q_0 - Q_1 &= 0 \\
Q_1 - Q_2 &= 0 \\
Q_2 - Q_3 &= 0 \\
Q_3 - Q_4 &= 0 \\
Q_4 - Q_5 &= 0 \\
Q_5 - Q_6 &= 0 \\
Q_6 - Q_7 &= 0 \\
Q_7 - Q_8 &= 0 \\
Q_8 - Q_9 &= 0
\end{aligned} \tag{145}$$

Expression (145) has 9 expressions, and when added to Expression (141), the number of expressions is 16, and the number of variables $Q_h$ is 10, and so for example, by using the least-square method, a variable $Q_h$ wherein the sum of squares of error generated in the various expressions is the smallest, can be calculated. In other words, the pixel value $Q_h$ with the movement blurring removed (with no movement blurring) may be estimated.

Specifically, if the error generated in each of the expressions in Expression (141) is $e_{mi}$ (i=3 through 9), and the error generated in each of the expressions in Expression (145) is $e_{bj}$ (b=0 through 8), Expression (141) and Expression (145) can be expressed by Expression (146) and Expression (147), respectively.

$$\begin{aligned}
(Q_0 + Q_1 + Q_2 + Q_3)/v &= P_3 + e_{m3} \\
(Q_1 + Q_2 + Q_3 + Q_4)/v &= P_4 + e_{m4} \\
(Q_2 + Q_3 + Q_4 + Q_5)/v &= P_5 + e_{m5} \\
(Q_3 + Q_4 + Q_5 + Q_6)/v &= P_6 + e_{m6} \\
(Q_4 + Q_5 + Q_6 + Q_7)/v &= P_7 + e_{m7} \\
(Q_5 + Q_6 + Q_7 + Q_8)/v &= P_8 + e_{m8} \\
(Q_6 + Q_7 + Q_8 + Q_9)/v &= P_9 + e_{m9}
\end{aligned} \tag{146}$$

$$\begin{aligned}
Q_0 - Q_1 &= 0 + e_{b0} \\
Q_1 - Q_2 &= 0 + e_{b1} \\
Q_2 - Q_3 &= 0 + e_{b2} \\
Q_3 - Q_4 &= 0 + e_{b3} \\
Q_4 - Q_5 &= 0 + e_{b4} \\
Q_5 - Q_6 &= 0 + e_{b5} \\
Q_6 - Q_7 &= 0 + e_{b6} \\
Q_7 - Q_8 &= 0 + e_{b7} \\
Q_8 - Q_9 &= 0 + e_{b8}
\end{aligned} \tag{147}$$

From Expression (146) and Expression (147), the following Expression (148) holds.

$$\begin{bmatrix}
1/v & 1/v & 1/v & 1/v & 0 & 0 & 0 & 0 & 0 & 0 \\
0 & 1/v & 1/v & 1/v & 1/v & 0 & 0 & 0 & 0 & 0 \\
0 & 0 & 1/v & 1/v & 1/v & 1/v & 0 & 0 & 0 & 0 \\
0 & 0 & 0 & 1/v & 1/v & 1/v & 1/v & 0 & 0 & 0 \\
0 & 0 & 0 & 0 & 1/v & 1/v & 1/v & 1/v & 0 & 0 \\
0 & 0 & 0 & 0 & 0 & 1/v & 1/v & 1/v & 1/v & 0 \\
0 & 0 & 0 & 0 & 0 & 0 & 1/v & 1/v & 1/v & 1/v \\
1 & -1 & 0 & 0 & 0 & 0 & 0 & 0 & 0 & 0 \\
0 & 1 & -1 & 0 & 0 & 0 & 0 & 0 & 0 & 0 \\
0 & 0 & 1 & -1 & 0 & 0 & 0 & 0 & 0 & 0 \\
0 & 0 & 0 & 1 & -1 & 0 & 0 & 0 & 0 & 0 \\
0 & 0 & 0 & 0 & 1 & -1 & 0 & 0 & 0 & 0 \\
0 & 0 & 0 & 0 & 0 & 1 & -1 & 0 & 0 & 0 \\
0 & 0 & 0 & 0 & 0 & 0 & 1 & -1 & 0 & 0 \\
0 & 0 & 0 & 0 & 0 & 0 & 0 & 1 & -1 & 0 \\
0 & 0 & 0 & 0 & 0 & 0 & 0 & 0 & 1 & -1
\end{bmatrix}
\begin{bmatrix} Q_0 \\ Q_1 \\ Q_2 \\ Q_3 \\ Q_4 \\ Q_5 \\ Q_6 \\ Q_7 \\ Q_8 \\ Q_9 \end{bmatrix}
=
\begin{bmatrix} P_3 \\ P_4 \\ P_5 \\ P_6 \\ P_7 \\ P_8 \\ P_9 \\ 0 \\ 0 \\ 0 \\ 0 \\ 0 \\ 0 \\ 0 \\ 0 \\ 0 \end{bmatrix}
+
\begin{bmatrix} e_{m3} \\ e_{m4} \\ e_{m5} \\ e_{m6} \\ e_{m7} \\ e_{m8} \\ e_{m9} \\ e_{b0} \\ e_{b1} \\ e_{b2} \\ e_{b3} \\ e_{b4} \\ e_{b5} \\ e_{b6} \\ e_{b7} \\ e_{b8} \end{bmatrix}
\tag{148}$$

Hereafter, as long as the variables i and j have no special restrictions, the variable i will express an integer where i=3 through 9 and j will express an integer where j=0 through 8.

Expression (148) is replaced with Expression (149), using a matrix A, and column vectors x, y, and e.

$$Ax = y + e \quad (149)$$

In this case, the total sum E of the squared errors of the error $e_{mi}$ of Expression (146) and the error $e_{bj}$ of Expression (147) can be expressed with the following expression.

$$\begin{aligned} E &= |e|^2 \\ &= \sum e_{mi}^2 + \sum e_{bj}^2 \\ &= (Ax - y)^T(Ax - y) \\ &= x^T A^T A x - 2 x^T A^T y + y^T y \end{aligned} \quad (150)$$

In order to find the $Q_h$ for which the total sum E of the squared error is the smallest, the fact that the total sum E of the squared error of the equation (150) can have 0 as the value partially differentiated with the column vector x with $Q_h$ as a component leads into the following expression.

$$\frac{\partial E}{\partial x} = 2(A^T A x - A^T y) = 0 \quad (151)$$

From Expression (151), the column vector x (a column vector x with the pixel value of $Q_h$ as a component) to be found can be expressed with Expression (152).

$$x = (A^T A)^{-1} A^T y \quad (152)$$

Now, with Expression (152), the superscript T means transposing, and the superscript −1 means an inverse matrix.

By substituting the column vector y, of which the mixed image value $P_i$ is a component, into Expression (152) and computing this, the pixel value $Q_h$ with the movement blurring removed (with no movement blurring) can be estimated.

Figure 128:
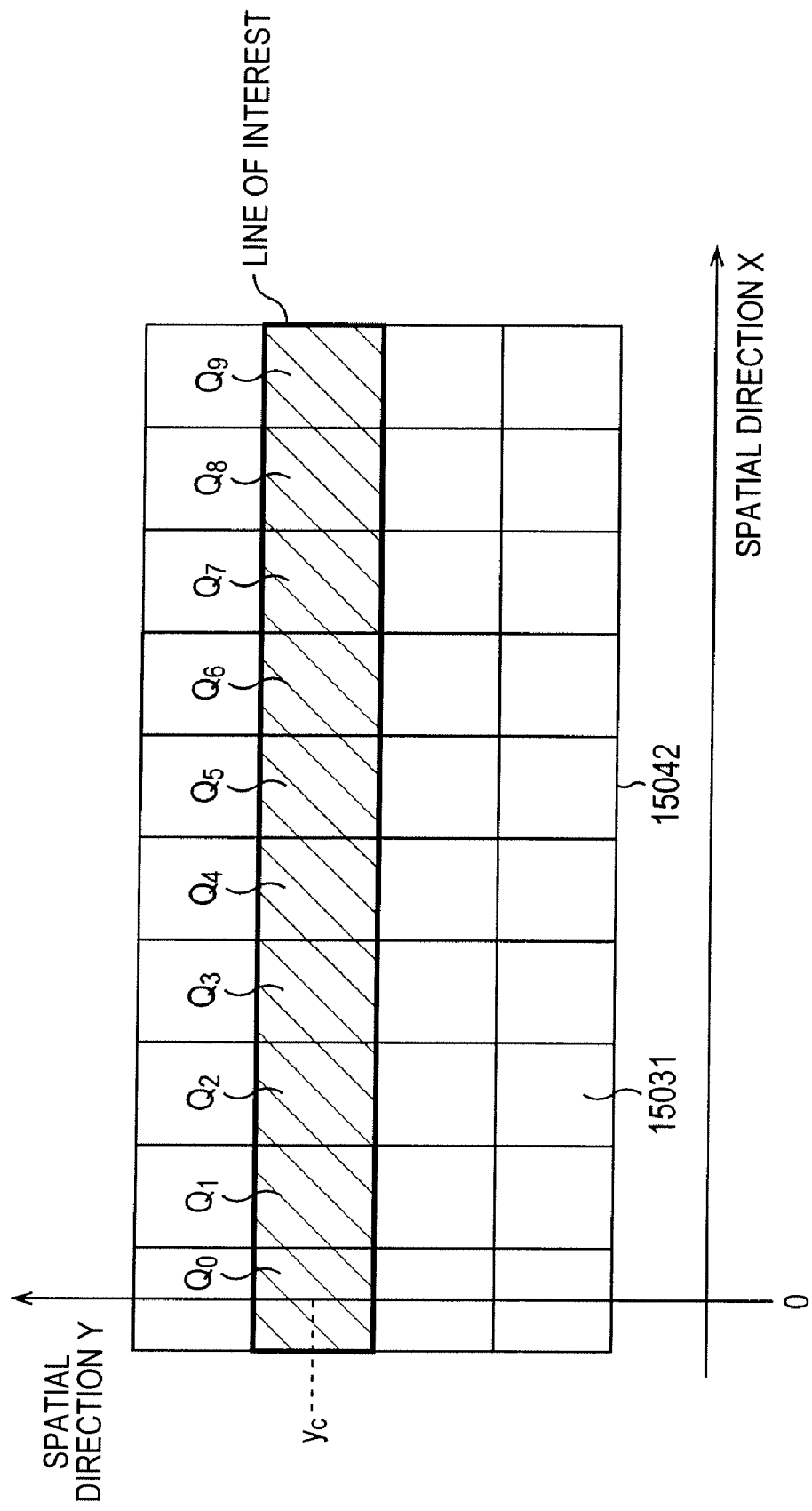

FIG. 128 is a diagram illustrating again the processing region 15042.

A column vector x (=pixel value $Q_h$) which can be found from Expression (152) is a column vector x (=pixel value $Q_h$) of one line of the y=$y_c$ of the processing region 15042 illustrated in FIG. 128, and therefore in order to estimate a pixel value with no movement blurring for all pixels in the processing region 15042, the computation of Expression (152) must be repeated the same number of times k (=4) as the line number.

In other words, as with the y=$y_c$ line in the above description, if the one line which performs processing to find the pixel value $Q_h$ with no movement blurring is called the line of interest, the actual world estimating unit 15013 sets each of all of the lines, in order, as the line of interest, and by performing processing to estimate the pixel values $Q_0$ through $Q_9$, which is the approximation function f(x) of the line of interest, an image with no movement blurring can be estimated regarding the processing region 15042 of the input image.

Figure 129:
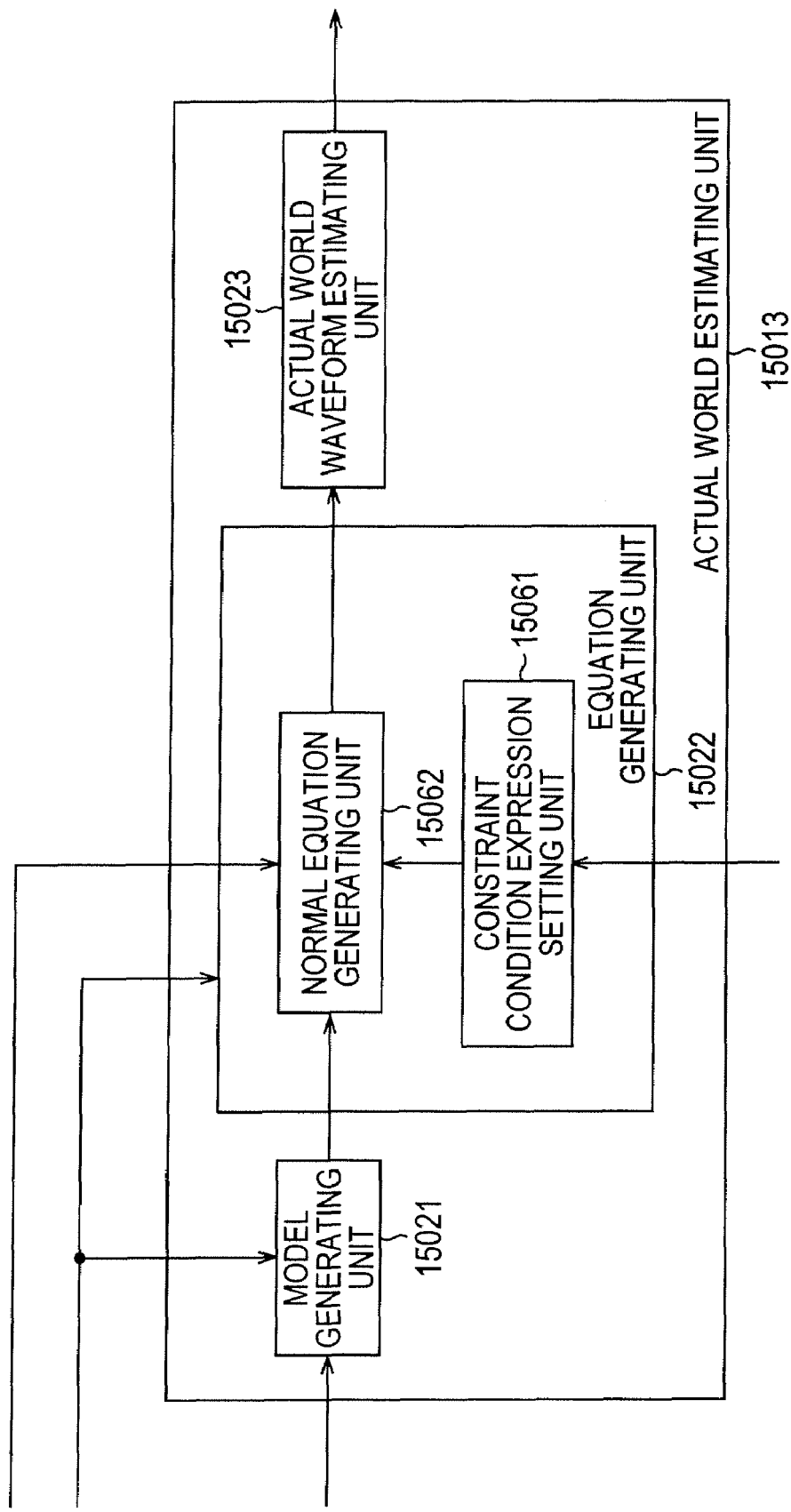

FIG. 129 is a configuration example of the inside of the actual world estimating unit 15013 in FIG. 113.

The actual world estimating unit 15013 comprises a model generating unit 15021, an equation generating unit 15022, and an actual world waveform estimating unit 15023. Further, the equation generating unit 15022 comprises a constraint condition setting unit 15061 and a normal equation generating unit 15062.

The movement amount v as the continuity information is supplied to the model generating unit 15021 from the continuity setting unit 15012 as continuity information. The movement amount v in this example expresses that the object is moving in the horizontal direction only v pixels per shutter time, within the processing region of the input image which is set by the processing region setting unit 15011, and for example, v=4, as with the above-described example. Also, the movement amount v may be a value which differs for each line, and in the event that the movement amount v differs for each line, k number, equal to the number of lines, of the movement amount v is supplied as continuity information from the continuity setting unit 15012 to the model generating unit 15021.

Also, processing region information which specifies the processing region within the input image is also supplied to the model generating unit 15021 from the processing region setting unit 15011. In the case of using a processing region with a rectangular-shaped region as the processing region, the processing region information can be expressed, for example, by coordinate values at opposite angles of a rectangular-shaped processing region as to an absolute coordinates system wherein a predetermined position (pixel) of the input image is the origin, or the center coordinate of the processing region and the width (horizontal direction) and the height (vertical direction) of the processing region, or the like.

The model generating unit 15021 acquires, for example, a processing region width of l, and k line numbers, as illustrated in FIG. 119, from the processing region information supplied from the processing region setting unit 15011. In this example, let us say that the processing region 15042 is rectangular-shaped, and for example, has l=10 and k=4. In this case, the processing region width of each line (the number of pixels) are the same, but with the processing region 15042, each line can have a different processing region width. In the case that the processing region width l differs for each line, the model generating unit 15021 acquires a processing region width l of the same number (k) as the number of lines.

Also, the model generating unit 15021 generates an equation (model equation) of a mixed pixel value $P_i$ which is shown in the above-described Expression (141), based on the movement amount v supplied from the continuity setting unit 15012 and the processing region width l and k number of lines acquired from the processing region information, and supplies this to the normal equation generating unit 15062.

The constraint condition information specified by the user operating the user I/F 15016 is supplied to the constraint condition setting unit 15061 from the user I/F 15016. For example, the user performs an operation with the user I/F 15016 to select (specify) the desired constraint condition from the constraint conditions which constrain the relation of the pixel values $Q_h$ of each of the pixels of an image with no movement blurring, such as the above-described Expression (143) or Expression (144), which have been set in advance inside the constraint condition setting unit 15061, and the user I/F 15016 supplies the information describing the selected constraint conditions as the constraint condition information to the constraint condition setting unit 15061.

The constraint condition setting unit 15061 selects a constraint condition expression corresponding to the constraint condition information supplied from the user I/F 15016 from the constraint condition expressions within the constraint condition setting unit 15061 itself. Further, the constraint condition setting unit 15061 acquires the processing region width l based on the processing region information of the input image supplied from the equation generating unit 15022 from the processing region setting unit 15011, and generates only the number, which corresponds to the processing region width l, of the constraint condition expressions. For example, in the event that Expression (143) is used which has the condition "adjacent pixel difference=0" as the constraint condition information, the constraint condition setting unit 15061 generates the constraint condition expression expressed by the above-described Expression (145), by acquiring the processing region width l based on the processing region information supplied from the processing region setting unit 15011, and supplies this to the normal equation generating unit 15062. In the example of the processing region 15042 illustrated in FIG. 119, the processing region 15042 is rectangular-shaped, and the processing region width l is the same of each line, but in the case that the processing region width l differs for each line, the number of constraint condition expressions also differ for each line.

The equation with k number of mixed pixel value $P_i$, which is the same as the number of lines, (Expression (141)) from the model generating unit 15021 and the constraint condition Expression (Expression (145)) corresponding to the constraint condition selected by the user operating the user I/F 15016 from the constraint condition setting unit 15061 are supplied to the normal equation generating unit 15062.

First, as illustrated in FIG. 128, the normal equation generating unit 15062 selects a predetermined line from the processing region 15042 as a line of interest. Then the normal equation generating unit 15062 generates a normal equation corresponding to the selected line of interest, which is expressed by Expression (148) (Expression (149)), from a mixed pixel value $P_i$ equation expressed by Expression (141) which is supplied from the model generating unit 15021, and a constraint condition expression expressed by Expression (145) which is supplied from the constraint condition setting unit 15061.

Further, the normal equation generating unit 15062 computes the matrix $(A^T A)^{-1} A^T$, which is a coefficient of the column vector y of the right side of Expression (152), and substitutes the mixed pixel value $P_i$ which is acquired based on the input image supplied from the sensor 2 (FIG. 1) into the column vector y. The matrix $(A^T A)^{-1} A^T$ is computed, and Expression (152) into which the mixed pixel value $P_i$ is substituted is further supplied from the normal equation generating unit 15062 to the actual world waveform estimating unit 15023.

When the normal equation generating unit 15062 finishes the above-described generation of the normal equation, the computation of the matrix $(A^T A)^{-1} A^T$, and the processing such as the substitution of the mixed pixel value $P_i$, a line not yet selected is selected as the next line of interest, and similar processing is performed as to the selected next line of interest.

The actual world waveform estimating unit 15023, by computing Expression (152) which is supplied from the normal equation generating unit 15062, finds the column vector x, that is to say, the pixel value $Q_h$ with no movement blurring (approximation function), and supplies this to the image generating unit 15014 (FIG. 113).

The image generating unit 15014 replaces a portion of the processing region 15042 of the input image with the image of the pixel value $Q_h$ with no movement blurring, which is supplied from the actual world waveform estimating unit 15023, based on the processing region information supplied from the processing region setting unit 15011, and generates this as an output image, and supplies this to the image display unit 15015.

Next, the actual world estimating processing of the actual world estimating unit 15013 in step S15008 in FIG. 114 will be described inn detail with reference to the flowchart in FIG. 130.

First, in step S15031, the model generating unit 15021 acquires the processing region width l and the number of lines k, based on the processing region information supplied from the processing region setting unit 15011, and the flow proceeds to step S15032.

In step S15032, the model generating unit 15021 acquires the movement amount v, which is equivalent to the number of lines k in the processing region 15042, from the continuity setting unit 15012, and the flow proceeds to step S15033.

In step S15033, the model generating unit 15021 generates an equation for the mixed pixel value $P_i$ for each line, and the flow proceeds to step S15034. In other words, the model generating unit 15021 generates k number of model equations (expressions (141)).

In step S15034, the constraint condition setting unit 15061 selects the constraint condition expression corresponding to the constraint condition information supplied from the user I/F 15016, from the constraint condition expressions existing within the constraint condition setting unit itself. Also, the constraint condition setting unit 15061 acquires the processing region width l from the processing region information of the input image which is supplied from the equation generating unit 15022 from the processing region setting unit 15011, and generates an constraint condition Expression (Expression (145)) corresponding to the constraint condition information from the users interface 15016, which comprises a number of equations corresponding to the processing region width l, and the flow proceeds to step S15035.

In step S15035, the normal equation generating unit 15062 selects one predetermined line as the line of interest from the processing region 15042, and the flow proceeds to step S15036.

In step S15036, the normal equation generating unit 15062 generates a normal equation expressed by Expression (148) (Expression (149)) from the equation (model equation) of the mixed pixel value $P_i$ expressed by Expression (141) which is supplied from the model generating unit 15021, and the equation (constraint condition expression) of the constraint condition expressed by Expression (145) which is supplied from the constraint condition setting unit 15061, and the flow proceeds to step S15037.

In step S15037, the normal equation generating unit 15062 computes the matrix $(A^T A)^{-1} A^T$, which is a coefficient of the column vector y of the right side of Expression (152), and the flow proceeds to step S15038.

In step S15038, the normal equation generating unit 15062 substitutes the mixed pixel value $P_i$ which is acquired based on the input image supplied from the sensor 2 (FIG. 1) into the column vector y, and the flow proceeds to step S15039.

In step S15039, the actual world waveform estimating unit 15023 computes a normal equation. That is to say, the actual world waveform estimating unit 15023 find a pixel value $Q_h$ with no movement blurring by computing Expression (152) which is supplied from the normal equation generating unit 15062, and the flow proceeds to step S15040.

In step S15040, determination is made as to whether or not processing is performed to find a pixel value $Q_h$ with no movement blurring as to all lines of the processing region 15042. In the event that it is determined that processing is not performed to find a pixel value $Q_h$ with no movement blurring as to all lines of the processing region 15042, the process is returned to step S15035, and the processing in steps S15035 through S15040 is repeated. That is to say, a line not yet selected of the processing region 15042 is selected as the next line of interest, and processing is performed to find a pixel value $Q_h$ with no movement blurring.

On the other hand, in the event that it is determined that processing is performed to find a pixel value $Q_h$ with no movement blurring as to all lines of the processing region 15042, the actual world estimating processing ends and returns.

Thus, by generating a normal equation (Expression (148)) as to one line which is the line of interest of the processing region 15042, and repeating the processing to find a pixel value $Q_h$ with no movement blurring k number of times, which is the number of lines in the processing region 15042, the pixel value $Q_h$ with no movement blurring can be found across the entire region of the processing region 15042.

In the event that the movement amount v and the processing region width l are each the same for each line of the processing region 15042, the matrix A in Expression (148) is the same for every line. Accordingly, the matrix $(A^TA)^{-1}A^T$ in Expression (148) also is the same for every line, and the processing to compute the matrix $(A^TA)^{-1}A^T$ for each line can be omitted.

Next, the actual world estimating processing of the actual world estimating unit 15013 in step S15008 in FIG. 114 in the event that the movement amount v and the processing region width l are each the same for each line of the processing region 15042 will be described with reference to the flowchart of FIG. 131. However, the portions in FIG. 131 which are similar to the flowchart in FIG. 130 will omit the description thereof as appropriate.

Figure 130:
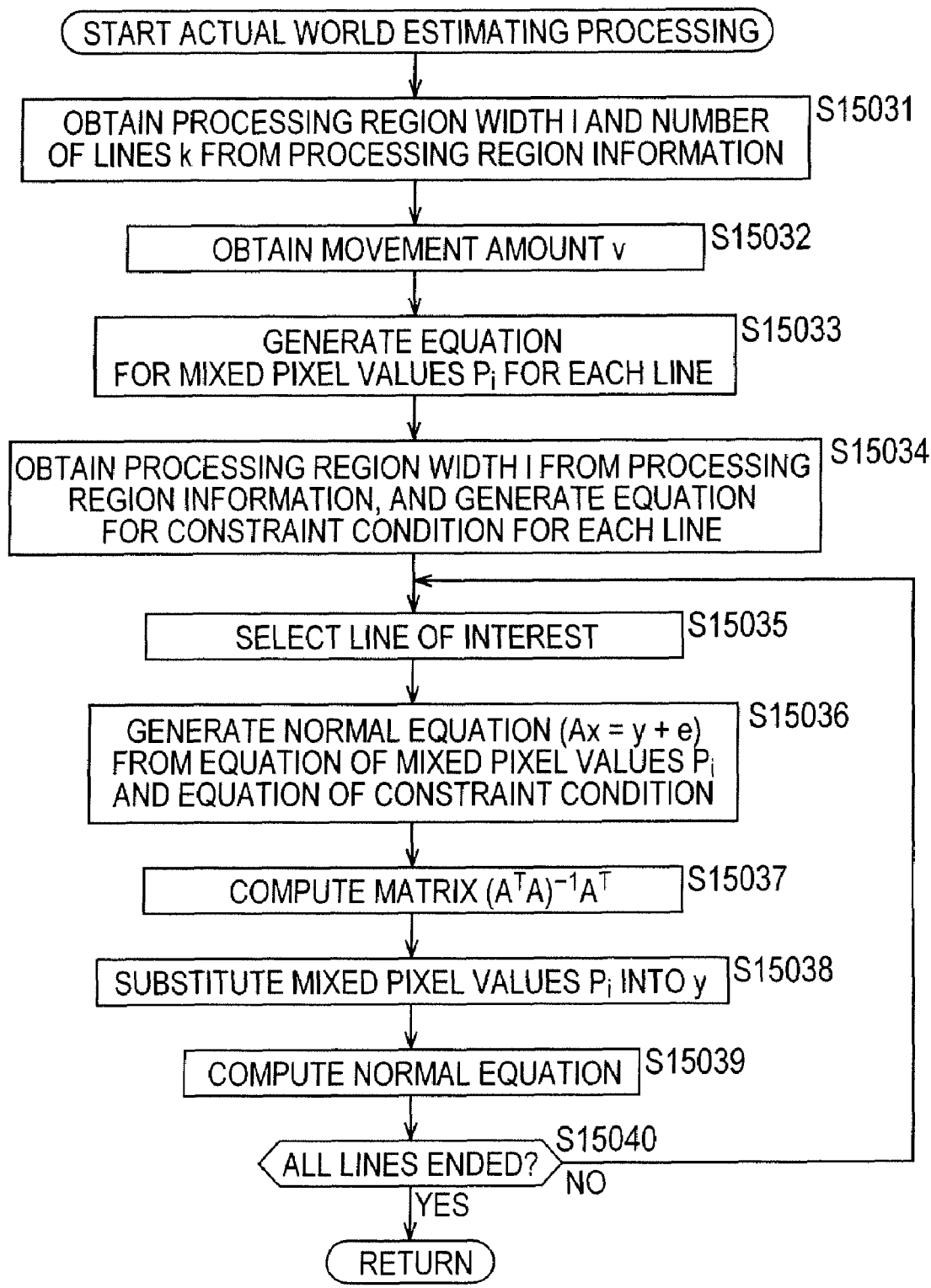
Figure 131:
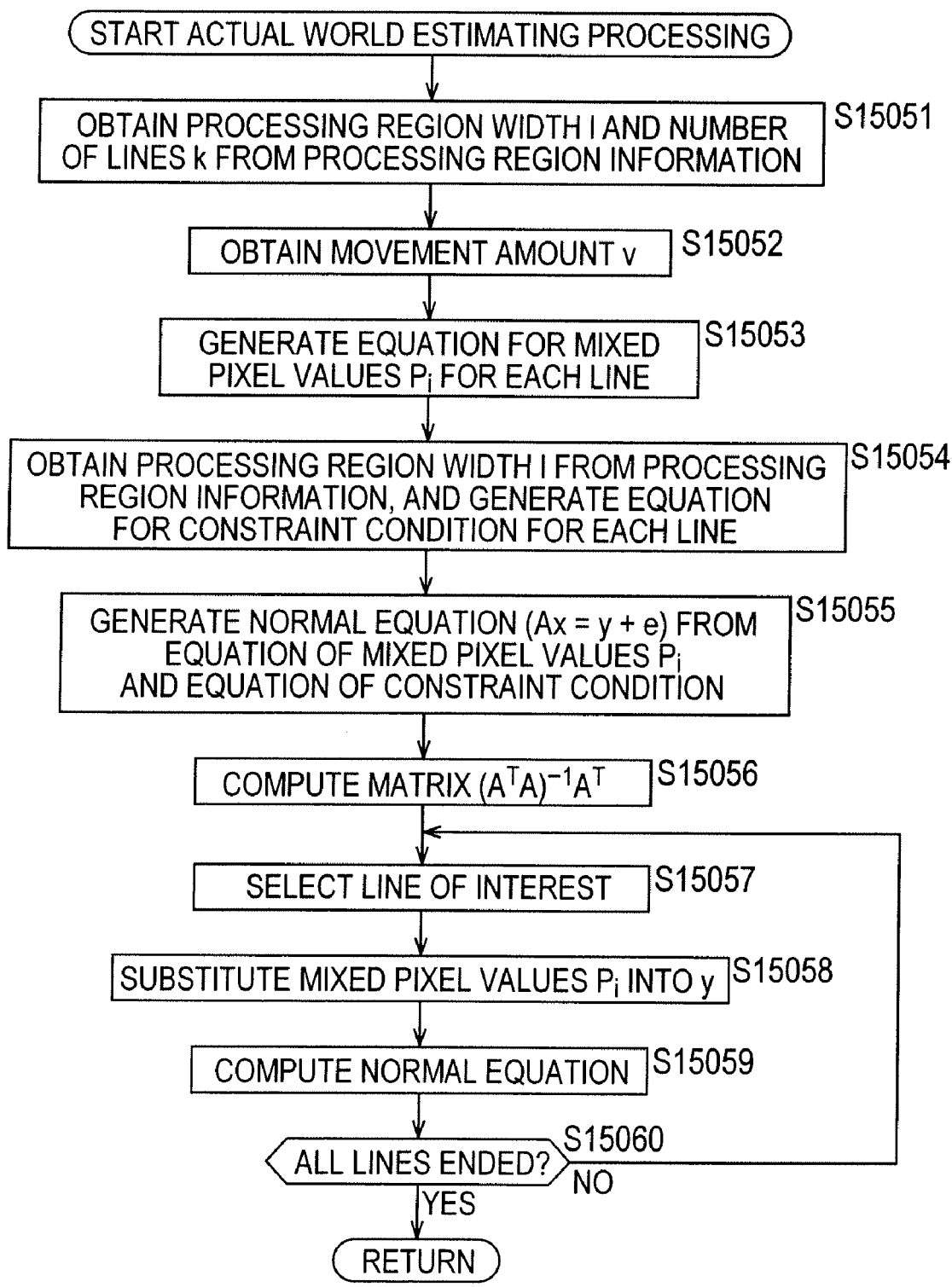

In FIG. 131, the processing in step S15057 which corresponds to step S15035 in FIG. 130 is positioned not between step S15054 and S15055, but between steps S15056 and S15058. Further, in step S15060, if it is determined that processing is not performed to find a pixel value $Q_h$ with no movement blurring as to all lines of the processing region 15042, the process is returned to step S15057.

In other words, in the event that the movement amount v and the processing region width l of each line of the processing region 15042 are each the same, the normal equation generated in step S15055 is the same for each line, and therefore, after computing the matrix $(A^TA)^{-1}A^T$ as to the first line of interest in step S15056, computing the matrix $(A^TA)^{-1}A^T$ as to the remaining lines of interest (the processing in step S15056) is not necessary. Accordingly, the selection of the line of interest (step S15057), the substitution of the mixed pixel value $P_i$ (the processing in step S15058), and the computation of the normal equation (the processing in step S15059) only need be executed in order, as to the lines not selected in the processing region 15042.

Thus, with the embodiment illustrated in FIG. 113, a normal equation is generated from an equation of the mixed pixel value $P_i$ wherein a pixel value generating movement blurring is modeled with a pixel value with no movement blurring (model equation), and a constraint condition expression using the relation between adjacent pixels of a pixel value with no movement blurring, and by computing this normal equation, a pixel value with no movement blurring (approximation function) is found, and therefore an image with good image quality can be generated.

FIGS. 132 through 134 are diagrams to describe the processing results by the signal processing device 4 in FIG. 113.

FIG. 132 illustrates an input image to be input in the signal processing device 4 in FIG. 113. With the input image in FIG. 132, the characters "TAL" are moving in the direction from left to right at the same speed, and movement blurring is occurring in the horizontal direction.

FIG. 133 is an image using the above-described first method, that is to say, a expression hypothesizing that the edge portion of the processing region is flat is added to the model equation from the input image in FIG. 132 and a normal equation is generated, and the image in FIG. 133 is generated by computing the normal equation. As is clear by comparing FIG. 132 and FIG. 133, in the image in FIG. 133, the movement blurring occurring in the input image in FIG. 132 is reduced, and the characters "TAL" are relatively clearly displayed.

On the other hand, FIG. 134 is an image using the above-described second method, that is to say, a normal equation is generated by adding a conditional expression constraining the relation of the adjacent pixel values from the input image in FIG. 132 to the model equation, and the image in FIG. 134 is generated by computing the normal equation. In the image in FIG. 134 also, the movement blurring occurring in the input image in FIG. 132 is reduced, and the characters "TAL" are clearly displayed.

With the embodiments in FIGS. 132 through 134, the image in FIG. 134 by the second method is an image with has less noise and no movement blurring as compared to the image in FIG. 133 by the first method.

In the above example, the constraint condition information supplied from the user I/F 15016 to the constraint condition setting unit 15061 is said to be information expressing which constraint condition the user has selected (specified) from the several constraint conditions which are set in advance internally in the constraint condition setting unit 15061, but it can be such that the user can directly input the constraint condition expression by operating the user I/F 15016.

With the embodiment of the signal processing device 4 illustrated in FIG. 113, an image with no movement blurring is generated such that the total sum E of the squared error expressed with Expression (150) becomes as small as possible, that is to say, generated such that the error occurring in the equation of the mixed pixel value $P_i$ and the error occurring in the constraint condition expression becomes as small as possible. Corresponding thereto, for example, of the error $e_{mi}$ occurring in the equation of the mixed pixel value $P_i$ of Expression (146) and the error $e_{bj}$ occurring in the constraint condition expression of Expression (147), one error or the other can be made as small as possible, and thus the balance (weighting) of the model equation and the constraint condition expression can be adjusted and thus generate an image with no movement blurring.

FIG. 135 illustrates such a configuration example of the embodiment of the signal processing device 4, which generates an image with no movement blurring by adjusting the weighting of the equation of the mixed pixel value $P_i$ (the model equation) and the equation of the constraint conditions (constraint condition expression).

In other words, FIG. 135 illustrates a configuration example of another embodiment of the application example of the signal processing device 4 illustrated in FIG. 111.

An image of one frame or one field, for example, as the data 3 of the sensor 2 is input into the signal processing device 4 in FIG. 135. Here, let us say that an object having a predetermined shape which moves at a fixed speed of v pixels per shutter time (exposure time) in the horizontal direction (sideways direction) of the image is displayed in the input image. That is to say, the object is moving at the movement amount of v pixels in the horizontal direction, and therefore the light signal of the object and the light signal of the portions other than the object are mixed (time mixture) by the time-integration effect of the sensor 2, and thus, the input image becomes a blurred image in portions such as the edge portions of the object. The signal processing device 4 shown in FIG. 135 generates high-quality output images wherein movement blurring occurring due to such temporal mixing has been removed from the input image.

In FIG. 135, the processing region setting unit 15081, the continuity setting unit 15082, the actual world estimating unit 15083, image generating unit 15084, image display unit 15085, and user I/F 15086, each correspond to the processing region setting unit 10001, the continuity setting unit 10002, the actual world estimating unit 10003, image generating unit 10004, image display unit 10005, and user I/F 10006 shown in FIG. 111, and basically perform the same processing as the processing region setting unit 10001, the continuity setting unit 10002, the actual world estimating unit 10003, image generating unit 10004, image display unit 10005, and user I/F 10006. Further, in FIG. 135, the actual world estimating unit 15083 comprises a model generating unit 15091, an equation generating unit 15092, and actual world waveform estimating unit 15093. The model generating unit 15091, equation generating unit 15092, and actual world waveform estimating unit 15093 correspond to each of the model generating unit 10011, equation generating unit 10012, and actual world waveform estimating unit 10013 in FIG. 111, and basically perform the same functions as each of the model generating unit 10011, equation generating unit 10012, and actual world waveform estimating unit 10013.

Note however, that in FIG. 135, the assisting information which the user I/F 15086 outputs by the user operating the user I/F 15086, is supplied to the equation generating unit 15092.

In other words, in FIG. 135, by operating the user I/F 15086, with the equation generating unit 15092, the user can set the constraint conditions which constrain the relation between each of the pixels of an image with no movement blurring, which is an image of the actual world 1 corresponding to the input image, and when the user performs an operation to set the constraint conditions, the user I/F 15086 supplies the constraint condition information expressing the constraint conditions set by the operation to the equation generating unit 15092.

Specifically, for example, a user who views an image reflecting a blurring image displayed on the image display unit 15085 guesses the original image, that is to say, an image without movement blurring which is an image of the actual world 1 corresponding to the input image. Also, for example, the user guesses predetermined regions where blurring is occurring as the edge portions, and guesses the relation of the pixel values between each of the pixels (the constraint conditions), such as the difference being large between the pixel values (level) between the adjacent pixels at the edge portions. Further, the user can set the conditions suitable for the guessed relation of the pixels value between each of the pixels into the equation generating unit 15092, by operating the user I/F 15086.

Also, in FIG. 135, the processing region information, which is supplied from the processing region setting unit 15081 to the actual world estimating unit 15083, is supplied to the model generating unit 15091 and the equation generating unit 15092 of the actual world estimating unit 15083. The model generating unit 15091 and the equation generating unit 15092 recognize the processing region in the input image from the processing region information which is supplied from the processing region setting unit 15081.

The continuity setting unit 15082 sets a movement amount (movement vector) v in the input image as the continuity information that an object is moving in the horizontal direction of the image at the constant speed of v pixels per shutter time, and supplies this movement amount v as the continuity information to the model generating unit 15091 of the actual world estimating unit 15083.

The model generating unit 15091 generates an equation (hereafter referred to as model equation as appropriate) as a model (hereafter referred to as relation model as appropriate), wherein the relation between the signal of the actual world 1 and the pixel values of each of the pixels of the movement blurring image as the input image which considers the movement amount v as the continuity information supplied from the continuity setting unit 15082, regarding the processing region recognized by the processing region information which is supplied from the processing region setting unit 15081, and supplies the generated model equation to the equation generating unit 15092.

The equation generating unit 15092 generates a constraint condition Expression (hereafter referred to as constraint condition expression as appropriate), based on the constraint condition information supplied from the user I/F 15086. Also, the equation generating unit 15092 sets the weighting into the constraint condition expression for adjusting the balance of the model equation supplied from the model generating unit 15091, and substitutes the pixel values of each of the pixels of the input image comprising the processing region into the equation formed from the weighted constraint condition expression and the model equation, and thus, generates an equation to find the approximation function as a model (hereafter referred to as approximation model) wherein the signal of the actual world 1 is modeled, and supplies this to the actual world waveform estimating unit 15093.

The actual world waveform estimating unit 15093 estimates the waveform of the signal of the actual world 1 by computing the equation supplied from the equation generating unit 15092. In other words, the actual world waveform estimating unit 15093 finds the approximation function as an approximation model, and supplies the approximation function to the image generating unit 15084 as the estimation result of the signal waveform of the actual world 1. Note that approximation function approximating the actual world 1 signals include functions with constant function values, regardless of argument value.

The image generating unit 15084 recognizes the processing region in the input image from the processing region information supplied from the processing regions setting unit 15081. Also, the image generating unit 15084 generates a signal more closely approximating the signal of the actual world 1, from the approximation function supplied from the actual world waveform estimating unit 15093, that is to say, generates an image with no movement blurring, and replaces the image of the processing region of the input image with an output image wherein the image has no movement blurring, generates this as an output image, and supplies this to the image display unit 15085.

Next, the processing of the signal processing device 4 in FIG. 135 will be described with reference to the flowchart in FIG. 136.

First, in step S15081, the signal processing device 4 performs pre-processing, and the flow proceeds to step S15082. That is to say, the signal processing device 4 supplies one frame or one field, for example, of the input image, supplied from the sensor 2 (FIG. 1) as data 3, to the processing region setting unit 15081, continuity setting unit 15082, actual world estimating unit 15083, image generating unit 15084, and image display unit 15085. Further, the signal processing unit 4 causes the image display unit 15085 to display the input image.

In step S15082, the user I/F 15086 determines whether or not there has been some sort of user input, by the user operating the user I/F 15086. In step S15082, in the event that determination is made that there is no user input, i.e., in the event that the user has made no operations, the flow skips steps S15083 through S15085, and proceeds to step S15086.

On the other hand, in the event that determination is made in step S15082 that there has been user input, i.e., in the event that the user has viewed the input image displayed on the image display unit 15085 and operated the user I/F 15086, thereby making user input indicating some sort of instruction or information, the flow proceeds to step S15083, where the user I/F 15086 determines whether or not the user input is ending instructions for instructing ending of the processing of the signal processing device 4.

In the event that determination is made in step S15083 that the user input is ending instructions, the signal processing device 4 ends processing.

On the other hand, in the event that determination is made in step S15083 that the user input is not ending instructions, the flow proceeds to step S15084, where the user I/F 15086 determines whether or not the user input is constraint condition information. In the event that determination is made in step S15084 that the user input is not constraint condition information, the flow skips step S15085, and proceeds to step S15086.

Also, in step S15084, in the event that the user input is determined to be constraint condition information, the flow proceeds to step S15085, and the user I/F 15086 supplies the constraint condition information to the equation generating unit 15092, and the flow proceeds to step S15086.

In step S15086, the processing region setting unit 15081 sets the processing region based on the input image, and supplies the processing region information identifying the processing region to the continuity setting unit 15082, model generating unit 15091 and equation generating unit 15092 of actual world estimating unit 15083, and image generating unit 15084, and the flow proceeds to step S15087. Here, in the setting of processing region in step S15086 the user inputs the processing region instruction information by operating the user I/F 15086, and this can be performed based on the processing region instruction information, or it can be performed without processing region instruction information from the user.

In step S15087, the continuity setting unit 15082 recognizes the processing region in the input image, from the processing region information supplied from the processing region setting unit 15081. Further, the continuity setting unit 15082 sets the continuity of the actual world 1 signals lost from one portion of the continuity in the image data at that processing region, and supplies continuity information representing that continuity to the model generating unit 15091 of the actual world estimating unit 15083 and the flow proceeds to step S15088.

Here the continuity setting unit 15082 sets the movement amount v, expressing that the movement is in the horizontal direction at a constant speed of v pixels per shutter time (exposure time), as the continuity information, and supplies this to the model generating unit 15091 of the actual world estimating unit 15083. The continuity setting unit 15082 sets the movement amount showing only the movement size as continuity information, under the premise that the object is moving in a horizontal direction, but a movement vector showing the size and direction of the movement of the object can be set as continuity information as well. The setting of continuity in step S15087 can be arranged by the user inputting the continuity instruction information by operating the user I/F 15086, and can be performed based on this continuity instruction information, or can be performed with no continuity instruction information from the user.

The actual world estimating unit 15083 performs actual world estimating processing in step S15008. In other words, with the actual world estimating unit 15083, the model generating unit 15091 generates an equation (model equation) as the model (relation model) wherein the relation of the pixel values of each of the pixels of the input image which has movement blurring and the signal of the actual world 1 is modeled, based on the movement amount v supplied from the continuity setting unit 15082 in step S15087 and the processing region information supplied from the processing region setting unit 15081 in step S15086, and the generated model equation is supplied to the equation generating unit 15092.

The equation generating unit 15092 generates a constraint condition expression based on the constraint condition information supplied from the user I/F 15086 in step S15085, and sets the weighting for adjusting the balance with the model equation in the generated constraint condition expression. Also, the equation generating unit 15092 generates an equation for finding the approximation function as the model (approximation model) wherein the signal of the actual world 1 is modeled, from the weighted constraint condition expression and the model equation supplied from the model generating unit 15091 to the equation generating unit 15092, and substitutes the pixel values of each of the pixels of the input image into this equation, and supplies this to the actual world waveform estimating unit 15093. In the event that the user has not specified (set) constraint condition information, that is to say, in the event that NO is determined to be the case in step S15082 or S15084, the equation generating unit 15092 performs predetermined processing such as a method for solving a simultaneous equation formed of a model equation and an equation hypothesizing that the edge portions of the processing region is "flat", as described in the embodiment in FIG. 113, for example.

Now, the weighting can be set for the constraint condition expression only, for the model equation only, or for both the constraint condition expression and the model equation.

The actual world waveform estimating unit 15093 estimates the waveform of the actual world 1 signal, that is to say, finds the approximation function as a model wherein the actual world 1 signal is modeled, by computing the equation supplied from the equation generating unit 15092, and the approximation function is supplied to the image generating unit 15084 as the estimation result of the signal waveform of the actual world 1.

The details of the actual world estimating process of step S15088 will be described later with reference to FIG. 138.

After the processing in step S15088, the flow proceeds to step S15089, and the image generating unit 15084 generates a signal more closely approximating the signal of the actual world 1, from the approximation function supplied from the actual world waveform estimating unit 15093, that is to say, generates an image with no movement blurring, and based on the processing region information supplied from the processing region setting unit 15081, converts the portion of the processing region of the input image into an image which has no movement blurring generated, generates this as an output image, and supplies this to the image display unit 15085, and the flow proceeds to step S15090.

In step S15090, the image display unit 15085 displays the output image supplied from the image generating unit 15084 instead of the input image displayed in step S15081, or along with the input image, and the flow proceeds to step S15091.

In step S15091, as with the case of step S15082, the user I/F 15086 determines whether or not there has been some sort of user input by the user operating the user I/F 15086, and in the event that determination is made that there has been no user input, i.e., in the event that the user has made no operations, the flow returns to step S15091, and awaits some sort of user input.

Also, in the event that determination is made in step S15091 that there has been user input, i.e., in the event that the user has viewed the input image or output image displayed on the image display unit 15085 and operated the user I/F 15086, thereby making user input representing some sort of instructions or information, the flow proceeds to step S15092, where the user I/F 15086 determines whether or not the user input is ending instructions instructing ending of the processing of the signal processing device 4.

In the event that determination is made in step S15092 that the user input is ending instructions, the signal processing device 4 ends processing.

On the other hand, in the event that determination is made in step S15092 that the user input is not ending instructions, the flow proceeds to step S15093, where the user I/F 15086 determines whether or not the user input is constraint condition information. In the event that determination is made in step S15093 that the user input is not constraint condition information, the flow returns to step S15091, and the same processing is repeated thereafter.

Also, in step S15093, in the event that determination is made that the user input is constraint condition information, the flow returns to step S15085, and as described above, the user I/F 15086 supplies the constraint condition information to equation generating unit 15092. The flow then proceeds from step S15085 to step S15086, and hereafter the same processing is repeated. Now, in the event that the signal processing device 4 repeats the processing of step S15085 through step S15093, the processing of the above-described step S15086 and S15087 are the same as that set by the first processing S15086 and S15087, and the same process as the first process may be repeated, or may be skipped.

Thus, with the signal processing device 4 in FIG. 135, by finding an approximation function of a model wherein the signal of the actual world 1 is modeled, an output image of high image quality with no movement blurring can be generated.

Also, by operating the user I/F 15086, the user can set constraint conditions which constrain the relation between each of the pixels in the original image having no movement blurring, and in the event that a new constraint condition is input, an image without movement blurring can be obtained again, and therefore an output image of high image quality according to the preference of the user can be easily acquired.

In the signal processing device 4 in FIG. 135, an output image without movement blurring is generated by finding an approximation function which approximates the light signal of the actual world 1, but this output image can be regarded as having the movement blurring removed from the input image. Accordingly, it can be said that processing is performed for movement blurring removal with the signal processing device 4 in FIG. 135.

Next, the internal configuration of the actual world estimating unit 15083 in FIG. 135 will be described with reference to FIG. 137. With the embodiment in FIG. 135 also, the mechanism for generating movement blurring of objects reflecting in the input image is modeled as a relation of the above-described Expression (141), which is an example shown in FIGS. 125 and 126.

In other words, the pixel values of each of the pixels of the movement blurring image as the input image are values wherein the pixel values (or the electric charge corresponding thereto) of each of the pixels of an image with no movement blurring which accumulate (integrate) while moving at the movement amount v, and models the mechanism for movement blurring generating.

The actual world estimating unit 15083 comprises a model generating unit 15091, an equation generating unit 15092, and an actual world waveform estimating unit 15093. Further, the equation generating unit 15092 comprises a constraint condition setting unit 15101, a weighting changing unit 15012, and a normal equation generating unit 15103.

The movement amount v as the continuity information is supplied to the model generating unit 15091 by the continuity setting unit 15082. The movement amount v in this example expresses the continuity of the object moving in the horizontal direction at a constant speed of v pixels per shutter time, within the processing region of the input image which is set in the processing region setting unit 15081, and for example, v=4, as with the above-described example. Also, the movement amount v may be a value which differs for each line, and in the event that the movement amount v differs for each line, k number, equal to the number of lines, of the movement amount v is supplied as continuity information from the continuity setting unit 15082 to the model generating unit 15091.

Also, processing region information which specifies the processing region within the input image is also supplied to the model generating unit 15091 from the processing region setting unit 15081. In the case of using a rectangular-shaped region as the processing region, the processing region information can be expressed, for example, by coordinate values at opposite angles of a rectangular-shaped processing region as to an absolute coordinates system wherein a predetermined position (pixel) of the input image is the origin, or the center coordinate of the processing region and the width (horizontal direction) and the height (vertical direction) of the processing region.

The model generating unit 15091 acquires, for example, a processing region width of l, and k line numbers, as illustrated in FIG. 119, from the processing region information supplied from the processing region setting unit 15081. In this example, let us say that the processing region 15042 is rectangular-shaped, and for example, has l=10 and k=4. In this case, the processing region width of each line (the number of pixels) are the same, but with the processing region 15042, each line may have a different processing region width. In the case that the processing region width l differs for each line, the model generating unit 15091 acquires a processing region width l of the same number (k) as the number of lines.

Also, the model generating unit 15091 generates an equation (model equation) of a mixed pixel value $P_i$ which is shown in the above-described Expression (141), based on the movement amount v supplied from the continuity setting unit 15012 and the processing region width l and k number of lines acquired from the processing region information, and supplies this to the normal equation generating unit 15103.

The constraint condition information specified by the user operating the user I/F 15086 is supplied to the constraint condition setting unit 15101 from the user I/F 15086. For example, the user performs an operation with the user I/F 15086 to select (specify) the desired constraint condition from the constraint conditions which constrain the relation of the pixel values $Q_h$ of each of the pixels of an image with no movement blurring, such as the above-described Expression (143) or Expression (144), which have been set in advance inside the constraint condition setting unit 15101, and the user I/F 15086 supplies the information describing the selected constraint conditions as the constraint condition information to the constraint condition setting unit 15101.

The constraint condition setting unit 15101 selects a constraint condition expression corresponding to the constraint condition information supplied from the user I/F 15086 from the constraint condition expressions within the constraint condition setting unit 15101 itself. Further, the constraint condition setting unit 15101 acquires the processing region width l based on the processing region information of the input image supplied from the equation generating unit 15092 from the processing region setting unit 15081, and generates only the number which corresponds to the processing region width l, for the constraint condition expressions. For example, in the event that Expression (143) is used which has the condition "adjacent pixel difference=0" as the constraint condition information, the constraint condition setting unit 15101 generates the constraint condition expression expressed by the above-described Expression (145), by acquiring the processing region width l based on the processing region information supplied from the processing region setting unit 15081, and supplies this to the normal equation generating unit 15103. In the example of the processing region 15042 illustrated in FIG. 119, the processing region 15042 is rectangular-shaped, and the processing region width l is the same of each line, but in the case that the processing region width l differs for each line, the number of constraint condition expressions also differ for each line.

A weighting $W_m$ as to the model equation and a weighting $W_b$ as to the constraint condition expression are set in advance in the weighting changing unit 15102. With this embodiment, the weighting coefficient W relating to the constraint condition expression is set by Expression (153), and using only the weighting relating to the constraint condition expression, the balance of the model equation and the constraint condition expression is adjusted.

$$W = W_b / W_m \qquad (153)$$

The weighting changing unit 15102 changes the weighting of the model equation and the constraint condition expression in the normal equation generated by the normal equation generating unit 15103, by supplying the weighting coefficient W to the normal equation generating unit 15103.

The mixed pixel value $P_i$ equation with the same number of k as the line numbers from the model generating unit 15091 (Expression (141)) and the constraint condition Expression (Expression (145)) corresponding to the constraint conditions selected from the constraint condition setting unit 15101 by the user operating the user I/F 15086 are supplied to the normal equation generating unit 15103.

With the normal equation generating unit 15103, the weighting coefficient W is set by the weighting changing unit 15102, regarding Expression (147) wherein the error $e_{bj}$ is considered in the constraint condition Expression (145) which is supplied from the constraint condition setting unit 15101 (the weighting W as to the model equation and constraint condition [equation?] which was 1:1 is changed).

In other words, Expression (147) is changed into the following Expression (154) of which both sides are multiplied by the weighting W. Here, the weighting coefficient W is for example a predetermined value such as 0.1. In this case, a pixel value $Q_h$, which makes the error $e_{mi}$ of the model equation smaller than the error $e_{bj}$ of the constraint condition expression, is found.

$$W(Q_0 - Q_1) = We_{b0} \qquad (154)$$

$$W(Q_1 - Q_2) = We_{b1}$$

$$W(Q_2 - Q_3) = We_{b2}$$

$$W(Q_3 - Q_4) = We_{b3}$$

$$W(Q_4 - Q_5) = We_{b4}$$

$$W(Q_5 - Q_6) = We_{b5}$$

$$W(Q_6 - Q_7) = We_{b6}$$

$$W(Q_7 - Q_8) = We_{b7}$$

$$W(Q_8 - Q_9) = We_{b8}$$

The normal equation generating unit 15103 selects one predetermined line as the line of interest from the processing region 15042 as shown in FIG. 128. Then, the normal equation generating unit 15103 generates the normal equation expressed by the following Expression (155), from the mixed pixel value $P_i$ equation (model equation) expressed by Expression (141) which is supplied from the model generating unit 15091 corresponding to the selected line of interest, and the constraint condition expression expressed by Expression (154) wherein the weighting coefficient W is added to Expression (145) which is supplied from the constraint condition setting unit 15101.

$$\begin{bmatrix} 1/v & 1/v & 1/v & 1/v & 0 & 0 & 0 & 0 & 0 & 0 \\ 0 & 1/v & 1/v & 1/v & 1/v & 0 & 0 & 0 & 0 & 0 \\ 0 & 0 & 1/v & 1/v & 1/v & 1/v & 0 & 0 & 0 & 0 \\ 0 & 0 & 0 & 1/v & 1/v & 1/v & 1/v & 0 & 0 & 0 \\ 0 & 0 & 0 & 0 & 1/v & 1/v & 1/v & 1/v & 0 & 0 \\ 0 & 0 & 0 & 0 & 0 & 1/v & 1/v & 1/v & 1/v & 0 \\ 0 & 0 & 0 & 0 & 0 & 0 & 1/v & 1/v & 1/v & 1/v \\ W & -W & 0 & 0 & 0 & 0 & 0 & 0 & 0 & 0 \\ 0 & W & -W & 0 & 0 & 0 & 0 & 0 & 0 & 0 \\ 0 & 0 & W & -W & 0 & 0 & 0 & 0 & 0 & 0 \\ 0 & 0 & 0 & W & -W & 0 & 0 & 0 & 0 & 0 \\ 0 & 0 & 0 & 0 & W & -W & 0 & 0 & 0 & 0 \\ 0 & 0 & 0 & 0 & 0 & W & -W & 0 & 0 & 0 \\ 0 & 0 & 0 & 0 & 0 & 0 & W & -W & 0 & 0 \\ 0 & 0 & 0 & 0 & 0 & 0 & 0 & W & -W & 0 \\ 0 & 0 & 0 & 0 & 0 & 0 & 0 & 0 & W & -W \end{bmatrix} \qquad (155)$$

-continued $$\begin{bmatrix} Q_0 \\ Q_1 \\ Q_2 \\ Q_3 \\ Q_4 \\ Q_5 \\ Q_6 \\ Q_7 \\ Q_8 \\ Q_9 \end{bmatrix} = \begin{bmatrix} P_3 \\ P_4 \\ P_5 \\ P_6 \\ P_7 \\ P_8 \\ P_9 \\ 0 \\ 0 \\ 0 \\ 0 \\ 0 \\ 0 \\ 0 \\ 0 \end{bmatrix} + \begin{bmatrix} e_{m3} \\ e_{m4} \\ e_{m5} \\ e_{m6} \\ e_{m7} \\ e_{m8} \\ e_{m9} \\ We_{b0} \\ We_{b1} \\ We_{b2} \\ We_{b3} \\ We_{b4} \\ We_{b5} \\ We_{b6} \\ We_{b7} \\ We_{b8} \end{bmatrix}$$

$e_{mi}$ is the error occurring in each expression in Expression (141), and $e_{bj}$ is the error occurring in each expression in Expression (154).

Here, Expression (155) will be replaced by Expression (156), using the matrix A' and the column vectors x, y, and e'.

$$A'x = y + e' \tag{156}$$

In this case, the total sum E' of the squared error of the error $e_{mi}$ of Expression (146) and the error $e_{bj}$ of Expression (154) can be expressed with the following expression.

$$E' = \sum e_{mi}^2 + W^2 \sum e_{bj}^2 \tag{157}$$

In order to find the $Q_h$ for which the total sum E of the squared error is the smallest, the column vector x (the column vector x with the pixel value $Q_h$ as a component) can be expressed by Expression (158), from the equation similar to the above-described equations (150) and (151).

$$x = (A'^T A')^{-1} A'^T y \tag{158}$$

Now, with Expression (158), the superscript T means transposing, and the superscript −1 means an inverse matrix.

With Expression (157), when the weighting coefficient W is small, a sharp image can be found which can better satisfy Expression (141) even with some noise allowed, and on the other hand, when the weighting coefficient W is large, an image which is flat with little noise that can satisfy Expression (145), rather than Expression (141), can be found. That is to say, by adjusting the value of the weighting coefficient W, the balance of "sharpness" and "noise" can be adjusted.

The normal equation generating unit 15103 computes the matrix $(A'^T A')^{-1} A'^T$, which is a coefficient of the column vector y of the right side of Expression (158), and substitutes the mixed pixel value $P_i$ which is acquired based on the input image supplied from the sensor 2 (FIG. 1) into the column vector y. The matrix $(A'^T A')^{-1} A'^T$ is computed, and Expression (158) into which the mixed pixel value Pi is substituted is further supplied from the normal equation generating unit 15103 to the actual world waveform estimating unit 15093.

When the normal equation generating unit 15103 finishes the above-described generation of the normal equation, the computation of the matrix $(A'^T A')^{-1} A'^T$, and the processing such as the substitution of the mixed pixel value $P_i$ regarding the selected line of interest, a line not yet selected is selected as the next line of interest, and similar processing is performed as to the selected next line of interest.

The actual world waveform estimating unit 15093, by computing Expression (158) which is supplied from the normal equation generating unit 15103, finds the column vector x, that is to say, the pixel value $Q_h$ with no movement blurring, and supplies this to the image generating unit 15084 (FIG. 135).

The image generating unit 15084 replaces a portion of the processing region 15042 of the input image with the image of the pixel value $Q_h$ with no movement blurring, which is supplied from the actual world waveform estimating unit 15093, based on the processing region information supplied from the processing region setting unit 15081, and generates this as an output image, and supplies this to the image display unit 15085.

Next, the actual world estimating processing of the actual world estimating unit 15083 in step S15088 in FIG. 136 will be described with reference to the flowchart in FIG. 138.

First, in step S15101, the model generating unit 15091 acquires the processing region width l and the number of lines k, based on the processing region information supplied from the processing region setting unit 15081, and the flow proceeds to step S15102.

In step S15102, the model generating unit 15091 acquires the movement amount v, which is equivalent to the number of lines k in the processing region 15042, from the continuity setting unit 15082, and the flow proceeds to step S15103.

In step S15103, the model generating unit 15091 generates an equation for the mixed pixel value $P_i$ for each line, and the flow proceeds to step S15104. In other words, the model generating unit 15091 generates k number of model equations (expressions (141)).

In step S15104, the constraint condition setting unit 15101 selects the constraint condition expression corresponding to the constraint condition information supplied from the user I/F 15086, from the constraint condition expressions existing within the constraint condition setting unit itself. Also, the constraint condition setting unit 15101 acquires the processing region width l from the processing region information of the input image which is supplied from the equation generating unit 15092 from the processing region setting unit 15081, and generates an constraint condition Expression (Expression (145)) corresponding to the constraint condition information from the user I/F 15086, which comprises a number of equations corresponding to the processing region width l, and the flow proceeds to step S15105.

In step S15105, the weighting changing unit 15102 supplies the weighting coefficient W expressed by Expression (153), which is set in advance internally within the weighting changing unit 15102 itself, to the normal equation generating unit 15103, and changes the weighting as to the constraint condition expression, and the flow proceeds to step S15106. That is to say, the weighting changing unit 15102 generates the above-described Expression (154) at the normal equation generating unit 15103.

In step S15106, the normal equation generating unit 15103 selects one predetermined line as the line of interest from the processing region 15042, and the flow proceeds to step S15107.

In step S15107, the normal equation generating unit 15103 generates a normal equation expressed by Expression (155) (Expression (156)) from Expression (146), wherein the errore$_{mi}$ is considered of the various expressions of the equation of the mixed pixel value P$_i$ expressed by Expression (141), which is supplied from the model generating unit 15091, and the constraint condition Expression (154) obtained by changing the weighting of Expression (147) wherein the error e$_{bj}$ is considered regarding Expression (145) which is supplied from the constraint condition setting unit 15101, by the weighting changing unit 15102 in step S15105, and the flow proceeds to step S15108.

In step S15108, the normal equation generating unit 15103 computes the matrix $(A'^T A')^{-1} A'^T$, which is a coefficient of the column vector y of the right side of Expression (158), and the flow proceeds to step S15109.

In step S15109, the normal equation generating unit 15103 substitutes the mixed pixel value P$_i$ which is acquired based on the input image supplied from the sensor 2 (FIG. 1) into the column vector y, and the flow proceeds to step S15110.

In step S15110, the actual world waveform estimating unit 15093 computes a normal equation. That is to say, the actual world waveform estimating unit 15093 finds a pixel value Q$_h$ with no movement blurring by computing Expression (158) which is supplied from the normal equation generating unit 15103, and the flow proceeds to step S15111.

In step S15111, determination is made as to whether or not processing is performed to find a pixel value Q$_h$ with no movement blurring as to all lines of the processing region 15042. In the event that it is determined that processing is not performed to find a pixel value Q$_h$ with no movement blurring as to all lines of the processing region 15042, the process is returned to step S15106, and the processing in steps S15106 through S15111 is repeated. That is to say, a line not yet selected of the processing region 15042 is selected as the next line of interest, and processing is performed to find a pixel value Q$_h$ with no movement blurring.

On the other hand, in the event that it is determined that processing is performed to find a pixel value Q$_h$ with no movement blurring as to all lines of the processing region 15042, the actual world estimating processing ends and returns.

Thus, by generating a normal equation (Expression (155)) as to one line which is the line of interest of the processing region 15042, and repeating the processing to find a pixel value Q$_h$ with no movement blurring k number of times, which is the number of lines in the processing region 15042, the pixel value Q$_h$ with no movement blurring can be found across the entire region of the processing region 15042.

In the event that the movement amount v and the processing region width l are each the same for each line of the processing region 15042, the matrix A in Expression (155) is the same for every line. Accordingly, the matrix $(A'^T A')^{-1} A'^T$ in Expression (158) also is the same for every line, and the processing to compute the matrix $(A'^T A')^{-1} A'^T$ for each line can be omitted.

Next, the actual world estimating processing of the actual world estimating unit 15083 in step S15088 in FIG. 136 in the event that the movement amount v and the processing region width l are each the same for each line of the processing region 15042 will be described with reference to the flowchart of FIG. 139. However, the portions in FIG. 139 which are similar to the flowchart in FIG. 138 will omit the description thereof as appropriate.

In FIG. 139, the processing in step S15138 which corresponds to step S15106 in FIG. 138 is positioned not between step S15135 and S15136, but between steps S15137 and S15139. Further, in step S15141, if it is determined that processing is not performed to find a pixel value Q$_h$ with no movement blurring as to all lines of the processing region 15042, the process is returned to step S15138.

In other words, in the event that the movement amount v and the processing region width l of each line of the processing region 15042 are each the same, the normal equation generated in step S15136 is the same for each line, and therefore, after computing the matrix $(A'^T A')^{-1} A'^T$ as to the first line of interest in step S15137, computing the matrix $(A'^T A')^{-1} A'^T$ as to the remaining lines of interest (the processing in step S15137) is not necessary. Accordingly, the selection of the line of interest (step S15138), the substitution of the mixed pixel value P$_i$ (the processing in step S15139), and the computation of the normal equation (the processing in step S15140) only need be executed in order, as to the lines not selected in the processing region 15042.

Thus, with the embodiment illustrated in FIG. 135, a normal equation is generated from an equation of the mixed pixel value P$_i$ wherein a pixel value generating movement blurring is modeled with a pixel value with no movement blurring (model equation), and a constraint condition expression using the relation between adjacent pixels of a pixel value with no movement blurring, and by computing this normal equation, a pixel value with no movement blurring (approximation function) is found, and therefore an image with good image quality can be generated.

Also, because the balance (weighting) of the mixed pixel value Pi equation and the constraint condition expression can be adjusted, an image can be generated with no movement blurring, which considers "sharpness" and "noise" and has the image quality according to the preference of the user.

With the above-described example, the constraint condition information supplied from the user I/F 15086 to the constraint condition setting unit 15101 is said to be information showing which constraint condition the user has selected (instructed), out of the multiple constraint conditions previously set internally in the constraint condition setting unit 15101, but it may be set up such that that user can directly input the constraint condition expression by operating the user I/F 15086.

With the embodiment of the signal processing device 4 in FIG. 135, the weighting coefficient W relating to the constraint condition expression, which adjusts the weighting (balance) of the mixed pixel value Pi equation and the constraint condition expression, has been a predetermined value which is set in advance (0.1 in the above case).

However, setting the weighting coefficient W relating to the constraint condition expression as a predetermined value (fixed value) is to apply the constraint conditions as to the places (relation between pixels) wherein the constraint condition is not established, similar to the places wherein the constraint condition is established, which causes deterioration of the processing image in some cases.

Therefore, next, an embodiment will be described wherein the signal processing device 4 can determine the weighting relating to the constraint condition expression and so forth corresponding to the activity (features) of the input image.

FIG. 140 is a configuration example of another embodiment with an application example of the signal processing device 4 illustrated in FIG. 111.

An image of, for example, one frame or one field as the data 3 from the sensor 2 is input into the signal processing device 4 in FIG. 140. Here, an object having a predetermined shape is displayed in the input image, such object moving in the horizontal direction (crosswise direction) of the image at a constant speed of v pixels per shutter time (exposure time). In other words, regarding the input image, the object is moving in a horizontal direction at the movement amount of v pixels, and therefore because of the time integration effect of the sensor 2, the light signal of the object and the light signal of the portion other than the object are mixed (time mixture), and thus, the image is blurred at portions such as the borders of the object. With the signal processing device 4 in FIG. 140, a high-quality output image is generated which has removed movement blurring from the input image what had occurred due to such time mixture.

In FIG. 140, the processing region setting unit 15111, the continuity setting unit 15112, the actual world estimating unit 15113, image generating unit 15114, image display unit 15115, and user I/F 15116, each correspond to the processing region setting unit 10001, the continuity setting unit 10002, the actual world estimating unit 10003, image generating unit 10004, image display unit 10005, and user I/F 10006 shown in FIG. 111, and basically perform the same processing as the processing region setting unit 10001, the continuity setting unit 10002, the actual world estimating unit 10003, image generating unit 10004, image display unit 10005, and user I/F 10006. Further, in FIG. 140, the actual world estimating unit 15113 comprises a model generating unit 15121, an equation generating unit 15122, and actual world waveform estimating unit 15123. The model generating unit 15121, equation generating unit 15122, and actual world waveform estimating unit 15123 correspond to each of the model generating unit 10011, equation generating unit 10012, and actual world waveform estimating unit 10013 in FIG. 111, and basically perform the same functions as each of the model generating unit 10011, equation generating unit 10012, and actual world waveform estimating unit 10013.

Note however, that in FIG. 140, the assisting information which the user I/F 15116 outputs by the user operating the user I/F 15116, is supplied to the equation generating unit 15122.

In other words, in FIG. 140, by operating the user I/F 15116, with the equation generating unit 15122, the user can set the constraint conditions which constrain the relation between each of the pixels of an image with no movement blurring, which is an image of the actual world 1 corresponding to the input image, and when the user performs an operation to set the constraint conditions, the user I/F 15116 supplies the constraint condition information expressing the constraint conditions set by the operation to the equation generating unit 15122.

Specifically, for example, a user who views an image displayed on the image display unit 15115 reflecting a blurring image guesses the original image, that is to say, an image without movement blurring which is an image of the actual world 1 corresponding to the input image. Also, for example, the user guesses predetermined regions where blurring is occurring as the edge portions, and guesses the relation of the pixel values between each of the pixels (the constraint conditions), such as the difference being large between the pixel values (level) between the adjacent pixels at the edge portions. Further, the user can set the conditions suitable for the guessed relation of the pixels value between each of the pixels into the equation generating unit 15122, by operating the user I/F 15116.

Also, in FIG. 140, the processing region information, which is supplied from the processing region setting unit 15111 to the actual world estimating unit 15113, is supplied to the model generating unit 15121 and the equation generating unit 15122 of the actual world estimating unit 15113. The model generating unit 15121 and the equation generating unit 15122 recognize the processing region in the input image from the processing region information supplied from the processing region setting unit 15111.

The continuity setting unit 15112 sets a movement amount (movement vector) v in the input image as the continuity information that an object is moving in the horizontal direction of the image at the constant speed of v pixels per shutter time, and supplies this movement amount v as the continuity information to the model generating unit 15121 of the actual world estimating unit 15113.

The model generating unit 15121 generates an equation (hereafter referred to as model equation as appropriate) as a model (hereafter referred to as relation model as appropriate), modeling the relation between the signal of the actual world 1 and the pixel values of each of the pixels of the movement blurring image as the input image which considers the movement amount v as the continuity information supplied from the continuity setting unit 15112, regarding the processing region recognized by the processing region information which is supplied from the processing region setting unit 15111, and supplies the generated model equation to the equation generating unit 15122.

The equation generating unit 15122 generates a constraint condition Expression (hereafter referred to as constraint condition expression as appropriate), based on the constraint condition information supplied from the user I/F 15116. Also, the equation generating unit 15122 sets the weighting to be determined by the activity of the input image into the constraint condition expression and the model equation supplied from the model generating unit 15121, and substitutes the pixel values of each of the pixels of the input image comprising the processing region into the equation formed from the weighted constraint condition expression and the model equation, and thus, generates an equation to find the approximation function as a model (hereafter referred to as approximation model) wherein the signal of the actual world 1 is modeled, and supplies this to the actual world waveform estimating unit 15123.

The actual world waveform estimating unit 15123 estimates the waveform of the actual world 1 signals, by computing the equation supplied from the equation generating unit 15122. In other words, the actual world waveform estimating unit 15123 finds the approximation function as an approximation model, and supplies the approximation function to the image generating unit 15114 as the estimation result of the signal waveform of the actual world 1. Note that approximation function approximating the actual world 1 signals include functions with constant function values, regardless of argument value.

The image generating unit 15114 recognizes the processing region in the input image from the processing region information supplied from the processing region setting unit 15111. Also, the image generating unit 15114 generates a signal more closely approximating the signal of the actual world 1, from the approximation function supplied from the actual world waveform estimating unit 15123, that is to say, generates an image with no movement blurring, and replaces the image of the processing region of the input image with an image wherein the image has no movement blurring, generates this as an output image, and supplies this to the image display unit 15115.

Next, the processing of the signal processing device 4 in FIG. 140 will be described with reference to the flowchart in FIG. 141.

First, in step S15161, the signal processing device 4 performs pre-processing, and the flow proceeds to step S15162. That is to say, the signal processing device 4 supplies one frame or one field, for example, of the input image, supplied from the sensor 2 (FIG. 1) as data 3, to the processing region setting unit 15111, continuity setting unit 15112, actual world estimating unit 15113, image generating unit 15114, and image display unit 15115. Further, the signal processing unit 4 causes the image display unit 15115 to display the input image.

In step S15162, the user I/F 15116 determines whether or not there has been some sort of user input, by the user operating the user I/F 15116. In step S15162, in the event that determination is made that there is no user input, i.e., in the event that the user has made no operations, the flow skips steps S15163 through S15165, and proceeds to step S15166.

On the other hand, in step S15162, in the event that determination is made that there has been user input, i.e., in the event that the user has viewed the input image displayed on the image display unit 15115 and operated the user I/F 15116, thereby making user input indicating some sort of instruction or information, the flow proceeds to step S15163, where the user I/F 15116 determines whether or not the user input is user instructions instructing ending of the processing of the signal processing device 4.

In the event that determination is made that in step S15163 that the user input is ending instructions, the signal processing device 4 ends the processing.

On the other hand, in the event that determination is made in step S15163 that the user input is not ending instructions, the flow proceeds to step S15164, where the user I/F 15166 determines whether or not the user input is constraint condition instruction information. In the event that determination is made in step S15164 that the user input is not constraint condition instruction information, step S15165 is skipped, and the flow proceeds to step S15166.

Also, in step S15164, in the event that the user input is determined to be constraint condition information, the flow proceeds to step S15165, and the user I/F 15116 supplies the constraint condition information to the equation generating unit 15122, and the flow proceeds to step S15166.

In step S15166, the processing region setting unit 15111 sets the processing region based on the input image, and supplies the processing region information identifying the processing region to the continuity setting unit 15112, the model generating unit 15121 and equation generating unit 15122 of the actual world estimating unit 15113, and image generating unit 15114, and the flow proceeds to step S15167. Now, an arrangement maybe made wherein the setting of the processing region in step S15166 is performed by the user inputting processing region instruction information by operating the user I/F 15116, so as to be carried out based on the processing region instruction information, or, this may be carried out without processing region instruction information from the user.

In step S15167, the continuity setting unit 15112 recognizes the processing region in the input image, from the processing region information supplied from the processing region setting unit 15111. Further, the continuity setting unit 15112 sets continuity of a part of the continuity of the actual world 1 signals that has been lost in the image data of the processing region, and supplies continuity information indicating the continuity thereof to the model generating unit 15121 of the actual world estimating unit 15113, and the flow proceeds to step S15168. Here, the continuity setting unit 15112 sets the movement amount v, expressing that the movement is in the horizontal direction at a constant speed of v pixels per shutter time (exposure time), as the continuity information, and supplies this to the model generating unit 15121 of the actual world estimating unit 15113. Here, the continuity setting unit 15112 sets the movement amount showing only the movement size as continuity information, under the premise that the object is moving in a horizontal direction, but a movement vector showing the size and direction of the movement of the object can be set as continuity information as well. Now, an arrangement may be made wherein the setting of the continuity in step S15167 is performed by the user inputting continuity instruction information by operating the user I/F 15116, so as to be carried out based on the continuity instruction information, or, this may be carried out without continuity instruction information The actual world estimating unit 15113 performs actual world estimating processing in step S15168. In other words, with the actual world estimating unit 15113, the model generating unit 15121 generates an equation (model equation) as the model (relation model) wherein the relation of the pixel values of each of the pixels of the input image which has movement blurring and the signal of the actual world 1 is modeled, based on the movement amount v supplied from the continuity setting unit 15112 in step S15167 and the processing region information supplied from the processing region setting unit 15111 in step S15166, and the generated model equation is supplied to the equation generating unit 15122.

The equation generating unit 15122 generates a constraint condition expression based on the constraint condition information supplied from the user I/F 15116 in step S15165, and sets the weighting determined from the activity of the input image into the generated constraint condition expression and the model equation supplied from the model generating unit 15121 to the equation generating unit 15122. Then, the equation generating unit 15122 substitutes the pixel values of each of the pixels of the input image comprising the processing region into the equation formed from the weighted constraint condition expression and the model equation, and thus generates the equation for finding the approximation function as a model (approximate model) wherein the signal of the actual world 1 is modeled, and supplies this to the actual world waveform estimating unit 15123. In the event that the user has not specified (set) constraint condition information, that is to say, in the event that NO is determined to be the case in step S15162 or S15164, the equation generating unit 15122 performs predetermined processing such as a method for solving a simultaneous equation formed of a model equation and an equation hypothesizing that the edge portions of the processing region is "flat", as described in the embodiment in FIG. 113, for example.

The actual world waveform estimating unit 15123 estimates the waveform of the actual world 1 signals, by computing the equation supplied from the equation generating unit 15122, that is to say, the actual world waveform estimating unit 15123 obtains an approximation function modeling the actual world 1 signals, and supplies the approximation function to the image generating unit 15114, as estimation results of the waveform of the actual world 1 signals.

The details of the actual world estimating processing in step S15168 will be described later with reference to FIG. 143.

After the processing in step S15168, the flow proceeds to step S15169, and the image generating unit 15114 generates a signal more closely approximating the signal of the actual world 1, from the approximation function supplied from the actual world waveform estimating unit 15123, that is to say, generates an image with no movement blurring, and based on the processing region information supplied from the processing region setting unit 15111, converts the portion of the processing region of the input image into an image which has no movement blurring generated, generates this as an output image, and supplies this to the image display unit 15115, and the flow proceeds to step S15170.

In step S15170, the image display unit 15115 displays the output image supplied from the image generating unit 15114 instead of the input image displayed in step S15161, or along with the input image, and the flow proceeds to step S15171.

In step S15171, as with the case of step S15162, the user I/F 15116 determines whether or not there has been some sort of user input by the user operating the user I/F 15116, and in the event that determination is made that there has been no user input, i.e., in the event that the user has made no operations, the flow returns to step S15171, and awaits some sort of user input.

Also, in the event that determination is made in step S15171 that there has been user input, i.e., in the event that the user has viewed the input image or output image displayed on the image display unit 15115 and operated the user I/F 15116, thereby making user input representing some sort of instructions or information, the flow proceeds to step S15172, where the user I/F 15116 determines whether or not the user input is ending instructions instructing ending of the processing of the signal processing device 4.

In the event that determination is made in step S15172 that the user input is ending instructions, the signal processing device 4 ends the processing.

On the other hand, in the event that determination is made in step S15172 that the user input is not ending instructions, the flow proceeds to step S15173, where the user I/F 15116 determines whether or not the user input is constraint condition information. In the event that determination is made in step S15173 that the user input is not constraint condition information, the flow returns to step S15171, and hereafter the same processing is repeated.

Also, in step S15173, in the event that determination is made that the user input is constraint condition information, the flow returns to step S15165, and as described above, the user I/F 15116 supplies the constraint condition information to the equation generating unit 15122. The flow then proceeds from step S15165 to step S15166, and hereafter the same processing is repeated. In the event that the signal processing device 4 repeats the processing of step S15165 through step S15173, the processing of the above-described step S15166 and S15167 is the same as that set by the first processing S15166 and S15167, and the same process as the first process may be repeated, or may be skipped.

Thus, with the signal processing device 4 in FIG. 140, by finding an approximation function as a model wherein the signal of the actual world 1 is modeled, an output image of high image quality with no movement blurring can be generated.

Also, by operating the user I/F 15116, the user can set constraint conditions which constrain the relation between each of the pixels in the original image having no movement blurring, and in the event that a new constraint condition is input, an image without movement blurring can be obtained again, and therefore an output image of high image quality according to the preference of the user can be easily acquired.

With the signal processing device 4 in FIG. 140, an output image without movement blurring is generated by finding an approximation function which approximates the light signal of the actual world 1, but this output image can be regarded as having the movement blurring removed from the input image. Accordingly, it can be said that processing is performed for movement blurring removal with the signal processing device 4 in FIG. 140.

Next, the configuration of the inside of the actual world estimating unit 15113 in FIG. 140 will be described with reference to FIG. 142. With the embodiment in FIG. 140 also, the mechanism for movement blurring generation of the object projected on the input image is modeled as the relation of the above-described Expression (141), illustrated in FIG. 125 and FIG. 126 which is one example thereof.

In other words, let us say that the mechanism for moment blurring generation is modeled assuming that the pixel values of each of the pixels of the movement blurring image as the input image are values wherein the pixel values (or the electric charge corresponding thereto) of each of the pixels of an image with no movement blurring which are accumulated (integrated) while moving at the movement amount v.

The actual world estimating unit 15113 comprises a model generating unit 15121, an equation generating unit 15122, and an actual world waveform estimating unit 15123. Further, the equation generating unit 15122 comprises a constraint condition setting unit 15131, an activity detecting unit 15132, a weighting changing unit 15133, and a normal equation generating unit 15134.

The movement amount v as the continuity information is supplied to the model generating unit 15121 by the continuity setting unit 15112. The movement amount v in this example expresses the continuity of the object moving in the horizontal direction at a constant speed of v pixels per shutter time, within the processing region of the input image which is set in the processing region setting unit 15111, and for example, let us say that v=4, as with the above-described example. Also, the movement amount v may be a value which differs for each line, and in the event that the movement amount v differs for each line, k number, equal to the number of lines, of the movement amount v is supplied as continuity information from the continuity setting unit 15112 to the model generating unit 15121.

Also, processing region information which specifies the processing region within the input image is also supplied to the model generating unit 15121 from the processing region setting unit 15111. In the case of employing a rectangular-shaped region as the processing region, the processing region information can be expressed, for example, by coordinate values at opposite angles of a rectangular-shaped processing region as to an absolute coordinate system wherein a predetermined position (pixel) of the input image is the origin, or the center coordinate of the processing region and the width (horizontal direction) and the height (vertical direction) of the processing region.

The model generating unit 15121 acquires, for example, a processing region width of l, and k line numbers, as illustrated in FIG. 119, from the processing region information supplied from the processing region setting unit 15111. In this example, let us say that the processing region 15042 is rectangular-shaped, and for example, has l=10 and k=4. In this case, the processing region width of each line (the number of pixels) are the same, but with the processing region 15042, each line can have a different processing region width. In the case that the processing region width l differs for each line, the model generating unit 15121 acquires a processing region width l of the same number (k) as the number of lines.

Also, the model generating unit 15121 generates an equation (model equation) of a mixed pixel value $P_i$ (i=3 through 9) which is shown in the above-described Expression (141), based on the movement amount v supplied from the continuity setting unit 15112 and the processing region width l and k number of lines acquired from the processing region information, and supplies this to the normal equation generating unit 15134.

The constraint condition information specified by the user operating the user I/F 15116 is supplied to the constraint condition setting unit 15131 from the user I/F 15116. For example, the user performs an operation with the user I/F 15116 to select (specify) the desired constraint condition from the constraint conditions which constrain the relation of the pixel values $Q_h$ of each of the pixels of an image with no movement blurring, such as the above-described Expression (143) or Expression (144), which have been set in advance inside the constraint condition setting unit 15131, and the user I/F 15116 supplies the information describing the selected constraint conditions as the constraint condition information to the constraint condition setting unit 15131.

The constraint condition setting unit 15131 selects a constraint condition expression corresponding to the constraint condition information supplied from the user I/F 15116 from the constraint condition expressions within the constraint condition setting unit 15131 itself. Further, the constraint condition setting unit 15131 acquires the processing region width l based on the processing region information of the input image supplied to the equation generating unit 15122 from the processing region setting unit 15111, and generates only the number, which corresponds to the processing region width l, of the constraint condition expressions. For example, in the event that Expression (143) is employed which has the condition "adjacent pixel difference=0" as the constraint condition information, the constraint condition setting unit 15131 generates the constraint condition expression expressed by the above-described Expression (145), by acquiring the processing region width l based on the processing region information supplied from the processing region setting unit 15111, and supplies this to the normal equation generating unit 15134. In the example of the processing region 15042 illustrated in FIG. 119, the processing region 15042 is rectangular-shaped, and the processing region width l is the same of each line, but in the case that the processing region width l differs for each line, the number of constraint condition expressions also differ for each line.

With the activity detecting unit 15132, the activity (features) of each of the pixels (pixel of interest) within the processing region of the input image, which is to become information for the purpose of the weighting changing unit 15133 to determine the weighting $W_{mi}$ as to the equation of each of the mixed pixels $P_i$ (model equation) and the weighting $W_{bj}$ as to each of the constraint condition expressions, is detected.

In other words, the activity detecting unit 15132 detects the value of the adjacent pixel difference $(P_j - P_{j+1})$ between the value of the pixel of interest $P_j$ and the pixel $P_{j+1}$ adjacent to the right thereof, or the like, for example, with each of the pixels within the processing region of the input image as a pixel of interest $P_j$, for example, as activity of the pixel of interest $P_j$, and supplies this to the weighting changing unit 15133.

The weighting changing unit 15133 has a weighting $W_{mi}$ (hereafter will be simply called weighting $W_{mi}$) as to the equation for each of the mixed pixel values $P_i$ (the model equation) and a weighting $W_{bj}$ (hereafter will be simply called weighting $W_{bj}$) as to each of the constraint condition expressions.

By supplying the weighting $W_{mi}$ and the weighting $W_{bj}$ to the normal equation generating unit 15134, the weighting changing unit 15133 changes (sets) the weighting of each of the equations of the mixed pixel value $P_i$ equation supplied from the model generating unit 15121 (the model equation), and the equation formed from the constraint condition expressions supplied from the constraint condition setting unit 15131, which are generated in the normal equation generating unit 15134.

The deterioration of the image comprised by the pixel value $Q_h$ acquired with the actual world estimating unit 15113 can be conceived to occur often in positions where the constraint condition is inappropriate, and thus, adjusting the weighting $W_{bj}$ appropriately is more effective than the weighting $W_{mi}$. Thus, with this embodiment, the weighting $W_{mi}$ is a predetermined value (fixed value), and the weighting $W_{bj}$ is changed based on the activity supplied from the activity detecting unit 15132. Now, the weighting $W_{mi}$ may also be made to be changed by the activity found with similar methods to be described below, or by other methods.

In the event that the "adjacent pixel difference=0"expressed by the above-described Expression (143), for example, is employed as a constraint condition expression, the positions (pixels) wherein the constraint condition expression expressed by Expression (143) is not established are pixels corresponding to the edge portions of the object in the image with no movement blurring. Here, the constraint condition expression expressed by Expression (143) considers the difference between adjacent pixels in the direction of the spatial direction X, and therefore, the edge portion of the object wherein the constraint condition expression is not established is the edge in the direction that the object edge direction (border line) is not in the horizontal direction (a parallel direction to the spatial direction X).

The edge portion of the image with no movement blurring occurring is also the edge in an image with movement blurring. In other words, a pixel which was an edge portion in an image with no movement blurring occurring still has the characteristics of the edge in the vicinity of this pixel even in an image with movement blurring occurring. Accordingly, the weighting $W_{bj}$ can be determined according to the value of the adjacent pixel difference $(P_j - P_{j+1})$ of the image (input image) wherein movement blurring is occurring.

In other words, positions with a large value of the adjacent pixel difference $(P_j - P_{j+1})$ of the input image has a greater probability of being an edge in an image with no movement blurring occurring. Thus, the weighting $W_{bj}$ of the constraint condition expression in the above-described Expression (143) wherein the adjacent pixel difference is small is made to be smaller (the constraint condition is relaxed). There are two methods as will be described below, for example, as methods for causing the weighting $W_{bj}$ to be smaller corresponding to the adjacent pixel difference $(P_j - P_{j+1})$ which shows activity.

The first method is a method employing the inverse ratio of the value of the adjacent pixel difference $(P_j - P_{j+1})$ of the input image as the weighting $W_{bj}$. This can be expressed as the following Expression.

$$W_{bj} = \frac{1}{P_j - P_{j+1}} \quad j = 0, \ldots, 8 \tag{159}$$

The second method is a method setting the weighting $W_{bj}$ of the constraint condition as either 0 or 1, according to the value of the adjacent pixel difference $(P_j - P_{j+1})$ of the input image, and equivalently determining whether or not to include the constraint condition expression. This can be expressed as the following Expression.

$$W_{bj} = \begin{cases} 0 & (P_j - P_{j+1} > Th) \\ 1 & (P_j - P_{j+1} < Th) \end{cases} \quad (160)$$

$$j = 0, \cdots, 8$$

Here, in Expression (160), the threshold value Th is a value which is the basis for determining whether or not to include the constraint condition expression, and can be set in advance in the weighting changing unit 15133. The constraint condition expression wherein the weighting $W_{bj}$ is set as 0 is essentially removed from the condition constraint expression.

The equation of the mixed pixel value $P_i$ having the same number k as the number of lines (Expression (141)) is supplied to the normal equation generating unit 15134 from the model generating unit 15121. Also, the constraint condition Expression (Expression (145)) corresponding to the constraint condition selected by the user operating the user I/F 15116 is supplied to the normal equation generating unit 15134 from the constraint condition setting unit 15132.

With the normal equation generating unit 15134, the weighting $W_{bj}$ is set for Expression (147) wherein the error $e_{bj}$ is considered to the constraint condition Expression (145) supplied from the constraint condition setting unit 15132, by the weighting changing unit 15133 (the weighting $W_{bj}$ as to the model equation and the constraint condition which was has been 1:1 is changed).

In other words, Expression (147) is changed to the following Expression (161) which has multiplied both sides thereof by $W_{bj}$.

$$W_{b0}(Q_0 - Q_1) = W_{b0}e_{b0} \quad (161)$$

$$W_{b1}(Q_1 - Q_2) = W_{b1}e_{b1}$$

$$W_{b2}(Q_2 - Q_3) = W_{b2}e_{b2}$$

$$W_{b3}(Q_3 - Q_4) = W_{b3}e_{b3}$$

$$W_{b4}(Q_4 - Q_5) = W_{b4}e_{b4}$$

$$W_{b5}(Q_5 - Q_6) = W_{b5}e_{b5}$$

$$W_{b6}(Q_6 - Q_7) = W_{b6}e_{b6}$$

$$W_{b7}(Q_7 - Q_8) = W_{b7}e_{b7}$$

$$W_{b8}(Q_8 - Q_9) = W_{b8}e_{b8}$$

Also, with the normal equation generating unit 15134, the weighting $W_{mi}$ is set for Expression (146) wherein the error $e_{mi}$ is considered to the mixed pixel value $P_i$ equation (model equation) (141) supplied from the model generating unit 15121, by the weighting changing unit 15133.

In other words, Expression (146) is changed to the following Expression (162) which has multiplied both sides thereof by the weighting $W_{mi}$.

$$W_{m3} \times (Q_0 + Q_1 + Q_2 + Q_3)/v = W_{m3} \times (P_3 + e_{m3}) \quad (162)$$

$$W_{m4} \times (Q_1 + Q_2 + Q_3 + Q_4)/v = W_{m4} \times (P_4 + e_{m4})$$

$$W_{m5} \times (Q_2 + Q_3 + Q_4 + Q_5)/v = W_{m5} \times (P_5 + e_{m5})$$

$$W_{m6} \times (Q_3 + Q_4 + Q_5 + Q_6)/v = W_{m6} \times (P_6 + e_{m6})$$

$$W_{m7} \times (Q_4 + Q_5 + Q_6 + Q_7)/v = W_{m7} \times (P_7 + e_{m7})$$

$$W_{m8} \times (Q_5 + Q_6 + Q_7 + Q_8)/v = W_{m8} \times (P_8 + e_{m8})$$

$$W_{m9} \times (Q_6 + Q_7 + Q_8 + Q_9)/v = W_{m9} \times (P_9 + e_{m9})$$

As described above, the weighting $W_{mi}$ in Expression (162) is a fixed value, here.

As illustrated in FIG. 128, the normal equation generating unit 15134 selects one predetermined line from the processing region 15042 as the line of interest. Then the normal equation generating unit 15134 generates a normal equation expressed with the following Expression (163) from Expression (161) and Expression (162) corresponding to the selected line of interest.

$$\begin{bmatrix} W_{m3} \\ W_{m4} \\ W_{m5} \\ W_{m6} \\ W_{m7} \\ W_{m8} \\ W_{m9} \\ \hline W_{b0} \\ W_{b1} \\ W_{b2} \\ W_{b3} \\ W_{b4} \\ W_{b5} \\ W_{b6} \\ W_{b7} \\ W_{b8} \end{bmatrix}^T \begin{bmatrix} 1/v & 1/v & 1/v & 1/v & 0 & 0 & 0 & 0 & 0 & 0 \\ 0 & 1/v & 1/v & 1/v & 1/v & 0 & 0 & 0 & 0 & 0 \\ 0 & 0 & 1/v & 1/v & 1/v & 1/v & 0 & 0 & 0 & 0 \\ 0 & 0 & 0 & 1/v & 1/v & 1/v & 1/v & 0 & 0 & 0 \\ 0 & 0 & 0 & 0 & 1/v & 1/v & 1/v & 1/v & 0 & 0 \\ 0 & 0 & 0 & 0 & 0 & 1/v & 1/v & 1/v & 1/v & 0 \\ 0 & 0 & 0 & 0 & 0 & 0 & 1/v & 1/v & 1/v & 1/v \\ \hline 1 & -1 & 0 & 0 & 0 & 0 & 0 & 0 & 0 & 0 \\ 0 & 1 & -1 & 0 & 0 & 0 & 0 & 0 & 0 & 0 \\ 0 & 0 & 1 & -1 & 0 & 0 & 0 & 0 & 0 & 0 \\ 0 & 0 & 0 & 1 & -1 & 0 & 0 & 0 & 0 & 0 \\ 0 & 0 & 0 & 0 & 1 & -1 & 0 & 0 & 0 & 0 \\ 0 & 0 & 0 & 0 & 0 & 1 & -1 & 0 & 0 & 0 \\ 0 & 0 & 0 & 0 & 0 & 0 & 1 & -1 & 0 & 0 \\ 0 & 0 & 0 & 0 & 0 & 0 & 0 & 1 & -1 & 0 \\ 0 & 0 & 0 & 0 & 0 & 0 & 0 & 0 & 1 & -1 \end{bmatrix} \quad (163)$$

$$\begin{bmatrix} Q_0 \\ Q_1 \\ Q_2 \\ Q_3 \\ Q_4 \\ Q_5 \\ Q_6 \\ Q_7 \\ Q_8 \\ Q_9 \end{bmatrix} = \begin{bmatrix} W_{m3} \\ W_{m4} \\ W_{m5} \\ W_{m6} \\ W_{m7} \\ W_{m8} \\ W_{m9} \\ \hline W_{b0} \\ W_{b1} \\ W_{b2} \\ W_{b3} \\ W_{b4} \\ W_{b5} \\ W_{b6} \\ W_{b7} \\ W_{b8} \end{bmatrix}^T \left( \begin{bmatrix} P_3 \\ P_4 \\ P_5 \\ P_6 \\ P_7 \\ P_8 \\ P_9 \\ \hline 0 \\ 0 \\ 0 \\ 0 \\ 0 \\ 0 \\ 0 \\ 0 \\ 0 \end{bmatrix} + \begin{bmatrix} e_{m3} \\ e_{m4} \\ e_{m5} \\ e_{m6} \\ e_{m7} \\ e_{m8} \\ e_{m9} \\ \hline e_{b0} \\ e_{b1} \\ e_{b2} \\ e_{b3} \\ e_{b4} \\ e_{b5} \\ e_{b6} \\ e_{b7} \\ e_{b8} \end{bmatrix} \right)$$

Here, Expression (163) is replaced with Expression (164), using the matrix A" and the column vectors x, y, e".

$$A''x = y + e'' \quad (164)$$

In this case, the total sum E of the squared errors of the error $e_{bj}$ of Expression (161) and the error $e_{mi}$ of Expression (162) can be expressed with the following expression.

$$E'' = \sum (W_{mi}e_{mi})^2 + \sum (W_{bj}e_{bj})^2 \quad (165)$$

In order to find the $Q_h$ which causes the total sum E" of the squared error to be very small, the column vector x (the column vector x with the pixel value $Q_h$ as a component thereof) can be expressed with Expression (166) from the same expression as the above Expression (150) and Expression (151).

$$x = (A''^T A'')^{-1} A''^T y \quad (166)$$

Now, with Expression (166), the superscript T means transposing, and the superscript −1 means an inverse matrix.

Accordingly, the normal equation generating unit 15134 computes the matrix $(A''^T A'')^{-1} A''^T$, which is a coefficient of the column vector y of the right side of Expression (166), and substitutes the mixed pixel value $P_i$ which is acquired based on the input image supplied from the sensor 2 (FIG. 1) into the column vector y. The matrix $(A''^T A'')^{-1} A''^T$ is computed, and Expression (166) into which the mixed pixel value $P_i$ is substituted is supplied from the normal equation generating unit 15134 to the actual world waveform estimating unit 15123.

When the processing such as described above is finished wherein one predetermined line of the processing region 15042 is selected as the line of interest, the normal equation generating unit 15134 selects a line not yet selected as the next line of interest, and similar processing is performed as to the selected next line of interest.

The actual world waveform estimating unit 15123, by computing Expression (166) which is supplied from the normal equation generating unit 15134, finds the column vector x, that is to say, the pixel value $Q_h$ with no movement blurring, and supplies this to the image generating unit 15114 (FIG. 140).

The image generating unit 15114 replaces a portion of the processing region 15042 of the input image with the image of the pixel value $Q_h$ with no movement blurring, which is supplied from the actual world waveform estimating unit 15123, based on the processing region information supplied from the processing region setting unit 15111, and generates this as an output image, and supplies this to the image display unit 15115.

Next, the actual world estimating processing of the actual world estimating unit 15113 in step S15168 in FIG. 141 will be described with reference to the flowchart in FIG. 143.

First, in step S15191, the model generating unit 15121 acquires the processing region width l and the number of lines k, based on the processing region information supplied from the processing region setting unit 15111, and the flow proceeds to step S15192.

In step S15192, the model generating unit 15121 acquires a k number of movement amount v, which is equivalent to the number of lines in the processing region 15042, from the continuity setting unit 15112, and the flow proceeds to step S15193.

In step S15193, the model generating unit 15121 generates an equation for the mixed pixel value $P_i$ for each line, and the flow proceeds to step S15194. In other words, the model generating unit 15121 generates k number of model equations (expressions (141)).

In step S15194, the constraint condition setting unit 15131 selects the constraint condition expression corresponding to the constraint condition information supplied from the user I/F 15116, from the constraint condition expressions existing within the constraint condition setting unit itself. Also, the constraint condition setting unit 15131 acquires the processing region width l from the processing region information of the input image which is supplied from the equation generating unit 15122 from the processing region setting unit 15111, and generates an constraint condition Expression (Expression (145)) corresponding to the constraint condition information from the users interface 15116, which comprises a number of equations corresponding to the processing region width l, and the flow proceeds to step S15195.

In step S15195, the activity detecting unit 15132 detects the activity (features) of each of the pixels within the processing region of the input image which is information for the weighting changing unit 15133 to determine the weighting $W_{bj}$, and supplies this to the weighting changing unit 15133, and the flow proceeds to step S15196.

In step S15196, the weighting changing unit 15133 calculates the weighting $W_{bj}$ to be found with, for example, the above described first or second method, using the activity of each of the pixels within the processing region of the input image, which is supplied from the activity detecting unit 15132. Also, the weighting changing unit 15133 sets the calculated weighting $W_{bj}$ and the weighting $W_{mi}$ provided in advance as a fixed value as the weighting respectively for each of the equations of the mixed pixel value $P_i$ equation of the normal equation generating unit 15134 (model equation) and the expression for constraint conditions (constraint condition expression), and the flow proceeds to step S15197.

In step S15197, the normal equation generating unit 15134 selects one predetermined line from the processing region 15042 as a line of interest, and the flow proceeds to step S15198.

In step S15198, the normal equation generating unit 15134 generates a normal equation expressed by Expression (163) (Expression (164)), from Expression (162) wherein the weighting $W_{mi}$ is changed by the weighting changing unit 15133 in step S15196, as to Expression (146) which considers the error $e_{mi}$ of each of the expressions in the equation of the mixed pixel value $P_i$ expressed with Expression (141), which is supplied from the model generating unit 15121, and the constraint condition Expression (161) wherein the weighting $W_{bj}$ is changed by the weighting changing unit 15133 in step S15196, as to Expression (147) which considers the error $e_{bj}$ of each of the expressions in the constraint condition Expression (145), which is supplied from the constraint condition setting unit 15131, and the flow proceeds to step S15199.

In step S15199, the normal equation generating unit 15134 computes the matrix $(A''^T A'')^{-1} A''^T$, which is a coefficient of the column vector y of the right side of Expression (166), and the flow proceeds to step S15200.

In step S15200, the normal equation generating unit 15134 substitutes the mixed pixel value $P_i$ which is acquired based on the input image supplied from the sensor 2 (FIG. 1) into the column vector y, and the flow proceeds to step S15201.

In step S15201, the actual world waveform estimating unit 15123 computes a normal equation. That is to say, the actual world waveform estimating unit 15123 finds a pixel value $Q_h$ with no movement blurring by computing Expression (166) which is supplied from the normal equation generating unit 15134, and the flow proceeds to step S15202.

In step S15202, determination is made as to whether or not processing is performed to find a pixel value $Q_h$ with no movement blurring as to all lines of the processing region 15042. In the event that it is determined that processing is not performed to find a pixel value $Q_h$ with no movement blurring as to all lines of the processing region 15042, the process is returned to step S15197, and the processing in steps S15197 through S15202 is repeated. That is to say, a line not yet selected of the processing region 15042 is selected as the next line of interest, and processing is performed to find a pixel value $Q_h$ with no movement blurring.

On the other hand, in the event that it is determined that processing is performed to find a pixel value $Q_h$ with no movement blurring as to all lines of the processing region 15042, the actual world estimating processing ends and returns.

Thus, by generating a normal equation (Expression (163)) as to one line which is the line of interest of the processing region 15042, and repeating the processing to find a pixel value $Q_h$ with no movement blurring k number of times, which is the number of lines in the processing region 15042, the pixel value $Q_h$ with no movement blurring can be found across the entire region of the processing region 15042.

Thus, with the embodiment illustrated in FIG. 140, a normal equation is generated from an equation of the mixed pixel value $P_t$ wherein a pixel value generating movement blurring is modeled with a pixel value with no movement blurring, and a constraint condition expression using the relation between adjacent pixels of a pixel value with no movement blurring, and by computing this normal equation, a pixel value with no movement blurring is found, and therefore an image with good image quality can be generated.

Also, the weighting of each of the constraint conditions expressions is changed based on the activity of the input image, and therefore an image with good image quality can be generated according to the features of the input image.

FIGS. 144 through 146 are diagrams describing the processing results of the signal processing device 4 in FIG. 140.

FIG. 144 illustrates an input image to be input in the signal processing device 4 in FIG. 140. With the input image in FIG. 144, the characters "TAL" are moving in the direction from left to right at the same speed, and movement blurring is occurring in the horizontal direction.

FIG. 145 illustrates an output image wherein the input image in FIG. 144 has been processed by the signal processing device 4 in FIG. 135. That is to say, this is an output image as to the input shown in FIG. 144, wherein the weighting $W_{bj}$ regarding the constraint conditions is applied to all constraint condition expressions as the same weight. As is clear by comparing FIG. 144 and FIG. 145, in the image in FIG. 145, the movement blurring occurring in the input image in FIG. 144 is reduced, and the characters "TAL" are relatively clearly displayed.

On the other hand, FIG. 146 illustrates the output image wherein the input image in FIG. 144 has been processed by the signal processing device 4 in FIG. 140 which is the above-described embodiment, using the above-described second method. That is, this is an output image as to the input shown in FIG. 144, wherein the weighting $W_{bj}$ regarding the constraint condition expressions is set to 0 or to 1 depending on the activity. In the image in FIG. 146 also, the movement blurring occurring in the input image in FIG. 144 is reduced, and the characters "TAL" are clearly displayed.

Now, with the embodiment in FIG. 144 through FIG. 146, the processed image in FIG. 146 is an image wherein the edge portion is clearer than the processed image in FIG. 145.

Also, in the above-described example, the constraint condition information supplied from the user I/F 15116 to the constraint condition setting unit 15131 is said to be information showing which constraint condition the user has selected (specified) from the multiple constraint conditions set in advance inside the constraint condition setting unit 15131, but the user may directly input the constraint condition expression by operating the user I/F 15116.

Also, in the case that the above-described second method is used with the weighting changing unit 15133, the threshold value Th which is a value that is a basis for determining whether or not to input a constraint condition expression is said to be set in advance internally, but the user can also adjust the threshold value Th as appropriate by operating the user I/F 15116 while viewing the processing image displayed on the image display unit 15115. FIG. 147 illustrates a configuration example of another embodiment of an application example of the signal processing device 4 in FIG. 111.

An image of, for example, one frame or one field as the data 3 from the sensor 2 is input into the signal processing device 4 in FIG. 147. Here, let us say that an object having a predetermined shape is displayed in the input image, such object moving in the horizontal direction (crosswise direction) of the image at a constant speed of v pixels per shutter time (exposure time). In other words, regarding the input image, the object is moving in the horizontal direction at the movement amount of v pixels, and therefore because of the time integration effect of the sensor 2, the light signal of the object and the light signal of the portion other than the object are mixed (time mixture), and thus, the image is blurred at portions such as the borders of the object. Thus, with the signal processing device 4 in FIG. 147, an output image of high image quality with no movement blurring can be generated by such time mixture.

In FIG. 147, the processing region setting unit 15151, the continuity setting unit 15152, the actual world estimating unit 15153, image generating unit 15154, image display unit 15155, and user I/F 15156, each correspond to the processing region setting unit 10001, the continuity setting unit 10002, the actual world estimating unit 10003, image generating unit 10004, image display unit 10005, and user I/F 10006 shown in FIG. 111, and basically perform the same processing as the processing region setting unit 10001, the continuity setting unit 10002, the actual world estimating unit 10003, image generating unit 10004, image display unit 10005, and user I/F 10006. Further, in FIG. 147, the actual world estimating unit 15153 comprises a model generating unit 15161, an equation generating unit 15162, and actual world waveform estimating unit 15163. The model generating unit 15161, equation generating unit 15162, and actual world waveform estimating unit 15163 correspond to each of the model generating unit 10011, equation generating unit 10012, and actual world waveform estimating unit 10013 in FIG. 111, and basically perform the same functions as each of the model generating unit 10011, equation generating unit 10012, and actual world waveform estimating unit 10013.

Note however, that in FIG. 147, the assisting information which the user I/F 15156 outputs by the user operating the user I/F 15156, is supplied only to the equation generating unit 15162.

In other words, in FIG. 147, by operating the user I/F 15116, with the equation generating unit 15162, the user can set the constraint conditions which constrain the relation between each of the pixels of an image with no movement blurring, which is an image of the actual world 1 corresponding to the input image and the weighting as to the constraint condition thereof, and when the user performs an operation to set the constraint conditions or an operation to set the weighting, the user I/F 15156 supplies the constraint condition information expressing the constraint conditions set by the operation or the weighting as to the constraint condition to the equation generating unit 15162.

Specifically, for example, a user who views an image displayed on the image display unit 15155 reflecting a blurring image guesses the original image, that is to say, an image without movement blurring which is an image of the actual world 1 corresponding to the input image. Also, for example, the user guesses predetermined regions where blurring is occurring as the edge portions, and guesses the relation of the pixel values between each of the pixels (the constraint conditions), such as the difference being large between the pixel values (level) between the adjacent pixels at the edge portions. Further, the user can set the conditions suitable for the guessed relation of the pixels value between each of the pixels into the equation generating unit 15162, by operating the user I/F 15156.

Also, in FIG. 147, the processing region information, which is supplied from the processing region setting unit 15151 to the actual world estimating unit 15153, is supplied to the model generating unit 15161 and the equation generating unit 15162 of the actual world estimating unit 15153. The model generating unit 15161 and the equation generating unit 15162 recognize the processing region in the input image from the processing region information supplied from the processing region setting unit 15151.

The continuity setting unit 15152 sets a movement amount (movement vector) v in the input image as the continuity information that an object is moving in the horizontal direction of the image at the constant speed of v pixels per shutter time, and supplies this movement amount v as the continuity information to the model generating unit 15161 of the actual world estimating unit 15153.

The model generating unit 15161 generates an equation (hereafter referred to as model equation as appropriate) as a model (hereafter referred to as relation model as appropriate), modeling the relation between the signal of the actual world 1 and the pixel values of each of the pixels of the movement blurring image as the input image which considers the movement amount v as the continuity information supplied from the continuity setting unit 15152, regarding the processing region recognized by the processing region information which is supplied from the processing region setting unit 15151, and supplies the generated model equation to the equation generating unit 15162.

The equation generating unit 15162 generates a constraint condition Expression (hereafter referred to as constraint condition expression as appropriate), based on the constraint condition information supplied from the user I/F 15156. Also, the equation generating unit 15162 sets the weighting supplied from the user I/F 15156 into the constraint condition expression and the model equation supplied to the equation generating unit 15162 by the model generating unit 15161, and substitutes the pixel values of each of the pixels of the input image comprising the processing region into the equation formed from the weighted constraint condition expression and the model equation, and thus, generates an equation to find the approximation function as a model (hereafter referred to as approximation model) wherein the signal of the actual world 1 is modeled, and supplies this to the actual world waveform estimating unit 15163.

The actual world waveform estimating unit 15163 estimates the waveform of the actual world 1 signal, by computing the equation supplied from the equation generating unit 15162. In other words, the actual world waveform estimating unit 15163 finds the approximation function as an approximation model, and supplies the approximation function to the image generating unit 15154 as the estimation result of the signal waveform of the actual world 1. Note that approximation function approximating the actual world 1 signals include functions with constant function values, regardless of argument value.

The image generating unit 15154 recognizes the processing region in the input image, based on the processing region information supplied from the processing region setting unit 15151. Also, the image generating unit 15154 generates a signal more closely approximating the signal of the actual world 1, from the approximation function supplied from the actual world waveform estimating unit 15163, that is to say, generates an image with no movement blurring, and replaces the image of the processing region of the input image with an output image wherein the image has no movement blurring, generates this as an output image, and supplies this to the image display unit 15155.

Next, the processing of the signal processing device 4 in FIG. 147 will be described with reference to the flowchart in FIG. 148.

First, in step S15211, the signal processing device 4 performs pre-processing, and the flow proceeds to step S15212. That is to say, the signal processing device 4 supplies one frame or one field, for example, of the input image, supplied from the sensor 2 (FIG. 1) as data 3, to the processing region setting unit 15151, continuity setting unit 15152, actual world estimating unit 15153, image generating unit 15154, and image display unit 15155. Further, the signal processing unit 4 causes the image display unit 15155 to display the input image.

In step S15212, the user I/F 15156 determines whether or not there has been some sort of user input, by the user operating the user I/F 15156. In step S15212, in the event that determination is made that there is no user input, i.e., in the event that the user has made no operations, the flow skips steps S15213 through S15215, and proceeds to step S15216.

On the other hand, in step S15212, in the event that determination is made that there has been user input, i.e., in the event that the user has viewed the input image displayed on the image display unit 15155 and operated the user I/F 15156, thereby making user input indicating some sort of instruction or information, and in the event that there has been some sort of user input, the flow proceeds to step S15213, where the user I/F 15156 determines whether or not the user input is user instructions instructing ending of the processing of the signal processing device 4.

In the event that determination is made that in step S15213 that the user input is ending instructions, the signal processing device 4 ends the processing.

On the other hand, in the event that determination is made in step S15213 that the user input is not ending instructions, the flow proceeds to step S15214, where the user I/F 15156 determines whether or not the user input is constraint condition information or weighting. In the event that determination is made in step S15214 that the user input is not constraint condition information nor weighting, step S15215 is skipped, and the flow proceeds to step S15216.

Also, in step S15214, in the event that the user input is determined to be constraint condition information or weighting, the flow proceeds to step S15215, and the user I/F 15156 supplies the constraint condition information or weighting to the equation generating unit 15162, and the flow proceeds to step S15216. With the user I/F 15156, both the constraint condition information and the weighting can be input, and in the event that the user inputs both the constraint condition information and the weighting, the user I/F 15156 supplies both the constraint condition information and the weighting to the equation generating unit 15162.

In step S15216, the processing region setting unit 15151 sets the processing region based on the input image, and supplies the processing region information identifying the processing region to the continuity setting unit 15152, the model generating unit 15161 and equation generating unit 15162 of the actual world estimating unit 15153, and image generating unit 15154, and the flow proceeds to step S15217. Now, an arrangement maybe made wherein the setting of the processing region in step S15216 is performed by the user inputting processing region instruction information by operating the user I/F 15156, so as to be carried out based on the processing region instruction information, or, this may be carried out without processing region instruction information from the user.

In step S15217, the continuity setting unit 15152 recognizes the processing region in the input image, from the processing region information supplied from the processing region setting unit 15151. Further, the continuity setting unit 15152 sets the continuity of the actual world 1 signals of which a portion of the continuity is lost in the processing region image data, and supplies continuity information representing the continuity for the processing region to the model generating unit 15161 of the actual world estimating unit 15153, and the flow proceeds to step S15218. Here, the continuity setting unit 15152 sets the movement amount v, expressing that the movement is in the horizontal direction at a constant speed of v pixels per shutter time (exposure time), as the continuity information, and supplies this to the model generating unit 15161 of the actual world estimating unit 15153. Here, the continuity setting unit 15152 sets the movement amount showing only the movement size as continuity information, under the premise that the object is moving in a horizontal direction, but a movement vector showing the size and direction of the movement of the object can be set as continuity information as well. The setting of continuity in step S15217 can be arranged by the user inputting the continuity instruction information by operating the user I/F 15156, and can be performed based on this continuity instruction information, or can be performed with no continuity instruction information from the user.

The actual world estimating unit 15153 performs actual world estimating processing in step S15218. In other words, with the actual world estimating unit 15153, the model generating unit 15161 generates an equation (model equation) as the model (relation model) wherein the relation of the pixel values of each of the pixels of the input image which has movement blurring and the signal of the actual world 1 is modeled, based on the movement amount v supplied from the continuity setting unit 15152 in step S15217 and the processing region information supplied from the processing region setting unit 15151 in step S15216, and the generated model equation is supplied to the equation generating unit 15162.

The equation generating unit 15162 generates a constraint condition expression based on the constraint condition information supplied from the user I/F 15156 in step S15215, and sets the weighting supplied from the user I/F 15156 into the generated constraint condition expression and into the model equation supplied from the model generating unit 15161 to the equation generating unit 15162. Also, the equation generating unit 15162 substitutes the pixel values of each of the pixels of the input image into an equation formed from the weighted constraint condition expression and the model equation, and thus generates an equation for finding the approximation function as the model (approximation model) wherein the signal of the actual world 1 is modeled, and supplies this to the actual world waveform estimating unit 15163. In the event that the user has not specified (set) constraint condition information, that is to say, in the event that NO is determined to be the case in steps S15212 or S15214, the equation generating unit 15162 performs predetermined processing such as a method for solving a simultaneous equation formed of a model equation and an equation hypothesizing that the edge portion of the processing region is "flat", as described in the embodiment in FIG. 113.

Now, the weighting can be set for the model equation only, for the constraint condition expression only, or for both the constraint condition expression and the model equation.

The actual world waveform estimating unit 15163 estimates the waveform of the actual world 1 signal, that is to say, obtains an approximation function approximating the actual world 1 signals by solving the equation supplied from the equation generating unit 15162, and supplies the approximation function to the image generating unit 15154, as estimation results of the waveform of the actual world 1 signals.

The details of the actual world estimating process of step S15218 will be described later with reference to FIG. 150.

After the processing in step S15218, the flow proceeds to step S15219, and the image generating unit 15154 generates a signal more closely approximating the signal of the actual world 1, from the approximation function supplied from the actual world waveform estimating unit 15163, that is to say, generates an image with no movement blurring, and based on the processing region information supplied from the processing region setting unit 15151, replaces the portion of the processing region of the input image with an image which has no movement blurring generated, generates this as an output image, and supplies this to the image display unit 15155, and the flow proceeds to step S15220.

In step S15220, the image display unit 15155 displays the output image supplied from the image generating unit 15154 instead of the input image displayed in step S15211, or along with the input image, and the flow proceeds to step S15221.

In step S15221, as with the case of step S15212, the user I/F 15156 determines whether or not there has been some sort of user input by the user operating the user I/F 15156, and in the event that determination is made that there has been no user input, i.e., in the event that the user has made no operations, the flow returns to step S15221, and awaits some sort of user input.

Also, in the event that determination is made in step S15221 that there has been user input, i.e., in the event that the user has viewed the input image or output image displayed on the image display unit 15155 and operated the user I/F 15156, thereby making user input representing some sort of instructions or information, the flow proceeds to step S15222, where the user I/F 15156 determines whether or not the user input is ending instructions instructing ending of the processing of the signal processing device 4.

In the event that determination is made in step S15222 that the user input is ending instructions, the signal processing device 4 ends the processing.

On the other hand, in the event that determination is made in step S15222 that the user input is not ending instructions, the flow proceeds to step S15223, where the user I/F 15156 determines whether or not the user input is constraint condition information or weighting. In the event that determination is made in step S15223 that the user input is not constraint condition information nor weighting, the flow returns to step S15221, and hereafter the same processing is repeated.

Also, in the event that determination is made in step S15223 that the user input is constraint condition information or weighting, the flow returns to step S15215, and as described above, the user I/F 15156 supplies the constraint condition information or weighting to the equation generating unit 15162. Then the flow proceeds from step S15215 to S15216, and hereafter the same processing is repeated. Now, in the event that the signal processing device 4 repeats the processing of step S15215 through step S15223, the processing of the above-described step S15216 and S15217 are the same as that set by the first processing S15216 and S15217, and the same process as the first process may be repeated, or may be skipped.

Thus, with the signal processing device 4 in FIG. 147, by finding an approximation function as a model wherein the signal of the actual world 1 is modeled, an output image of high image quality with no movement blurring can be generated.

Also, by operating the user I/F 15156, the user can set constraint conditions which constrain the relation between each of the pixels in the original image having no movement blurring, and in the event that a new constraint condition is input, an image without movement blurring can be requested again, and therefore an output image of high image quality according to the preference of the user can be easily acquired.

In the signal processing device 4 in FIG. 147, an output image without movement blurring is generated by finding an approximation function which approximates the light signal of the actual world 1, but this output image can be regarded as having the movement blurring removed from the input image. Accordingly, it can be said that processing is performed for movement blurring removal with the signal processing device 4 in FIG. 147.

Next, the internal configuration of the actual world estimating unit 15153 in FIG. 147 will be described with reference to FIG. 149. With the embodiment in FIG. 147 also, the mechanism for generating movement blurring of objects reflecting in the input image is modeled as a relation of the above-described Expression (141), which is an example shown in FIGS. 125 and 126.

In other words, let us say that the mechanism for movement blurring generating is modeled assuming that the pixel values of each of the pixels of the movement blurring image as the input image are values wherein the pixel values (or the electric charge corresponding thereto) of each of the pixels of an image with no movement blurring which are accumulates (integrated) while moving at the movement amount v.

The actual world estimating unit 15153 comprises a model generating unit 15161, an equation generating unit 15162, and an actual world waveform estimating unit 15163. Further, the equation generating unit 15162 comprises a constraint condition setting unit 15171, a weighting changing unit 15172, and a normal equation generating unit 15173.

The movement amount v as the continuity information is supplied to the model generating unit 15161 by the continuity setting unit 15152. The movement amount v in this example expresses the continuity of the object moving in the horizontal direction at a constant speed of v pixels per shutter time, within the processing region of the input image which is set by the processing region setting unit 15151, and for example, let us say that v=4, as with the above-described example.

Also, the movement amount v can be a value which differs for each line, and in the event that the movement amount v differs for each line, k number, equal to the number of lines, of the movement amount v is supplied as continuity information from the continuity setting unit 15152 to the model generating unit 15161.

Also, processing region information which specifies the processing region within the input image is also supplied to the model generating unit 15161 from the processing region setting unit 15151. In the case of using a rectangular-shaped region as the processing region, the processing region information can be expressed, for example, by coordinate values at opposite angles of a rectangular-shaped processing region as to an absolute coordinates system wherein a predetermined position (pixel) of the input image is the origin, or the center coordinate of the processing region and the width (horizontal direction) and the height (vertical direction) of the processing region, or the like.

The model generating unit 15161 acquires, for example, a processing region width of l, and k line numbers, as illustrated in FIG. 119, from the processing region information supplied from the processing region setting unit 15151. In this example, let us say that the processing region 15042 is rectangular-shaped, and for example, has l=10 and k=4. In this case, the processing region width of each line (the number of pixels) are the same, but with the processing region 15042, each line can have a different processing region width. In the case that the processing region width l differs for each line, the model generating unit 15021 acquires k, which is hew same number as the number of lines of the processing region width l.

Also, the model generating unit 15161 generates an equation (model equation) of a mixed pixel value $P_i$ which is shown in the above-described Expression (141), based on the movement amount v supplied from the continuity setting unit 15152 and the processing region width l and k number of lines acquired from the processing region information, and supplies this to the normal equation generating unit 15173.

The constraint condition information specified by the user operating the user I/F 15156 is supplied to the constraint condition setting unit 15171 from the user I/F 15156. For example, the user performs an operation with the user I/F 15156 to select (specify) the desired constraint condition from the constraint conditions which constrain the relation of the pixel values $Q_h$ of each of the pixels of an image with no movement blurring, such as the above-described Expression (143) or Expression (144), which have been set in advance inside the constraint condition setting unit 15171, and the user I/F 15156 supplies the information describing the selected constraint conditions as the constraint condition information to the constraint condition setting unit 15171.

The constraint condition setting unit 15171 selects a constraint condition expression corresponding to the constraint condition information supplied from the user I/F 15156 from the constraint condition expressions within the constraint condition setting unit 15171 itself. Further, the constraint condition setting unit 15171 acquires the processing region width l based on the processing region information of the input image supplied to the equation generating unit 15162 from the processing region setting unit 15151, and generates only the number which corresponds to the processing region width l, of he constraint condition expressions. For example, in the event that Expression (143) is used which has the condition "adjacent pixel difference=0" as the constraint condition information, the constraint condition setting unit 15171 generates the constraint condition expression expressed by the above-described Expression (145), by acquiring the processing region width l based on the processing region information supplied from the processing region setting unit 15151, and supplies this to the normal equation generating unit 15173. In the example of the processing region 15042 illustrated in FIG. 119, the processing region 15042 is rectangular-shaped, and the processing region width l is the same of each line, but in the case that the processing region width l differs for each line, the number of constraint condition expressions also differ for each line.

The weighting changing unit 15172 has a weighting $W_{mi}$ (hereafter will be referred to simply as weighting $W_{mi}$) as to the equation for each of the mixed pixel values $P_i$ (the model equation) and a weighting $W_{bj}$ (hereafter will be referred to simply as weighting $W_{bj}$) as to the constraint condition expression. The values for each of the weighting $W_{mi}$ and the weighting $W_{bj}$ are supplied from the user I/F 15156 by the user operating the user I/F 15156, and are changed from the default value (for example, 1). In other words, the user can decide (set) each of the values for the weighting $W_{mi}$ and the weighting $W_{bj}$, by operating the user I/F 15156. The weighting changing unit 15172 supplies each of the weighting $W_{mi}$ and the weighting $W_{bj}$, set by the user, to the normal equation generating unit 15173, and sets (changes) the weighting of the expressions corresponding to each of the model equation and the constraint condition expression of the normal equation generating unit 15173.

Specifically, with the normal equation generating unit 15173, the weighting $W_{bj}$ is set by the weighting changing unit 15172, as to Expression (147) which considers the error $e_{bj}$ in the constraint condition Expression (145) which is supplied from the constraint condition setting unit 15171. In other words, Expression (147) is changed to Expression (161) which has multiplied both sides thereof by the weighting $W_{bj}$.

Also, with the normal equation generating unit 15173, the weighting $W_{mi}$ is set by the weighting changing unit 15172, as to Expression (146) which considers the error $e_{mi}$ in the equation for mixed pixel value $P_i$ (model equation) (141) which is supplied from the model generating unit 15161. In other words, Expression (146) is changed to the above-described Expression (162) which has multiplied both sides thereof by the weighting $W_{mi}$.

The normal equation generating unit 15173 selects one predetermined line from the processing region 15042 as the line of interest, as illustrated in FIG. 128. Then the normal equation generating unit 15173 generates the normal equation expressed in the above-described Expression (163) from Expression (161) and Expression (162), corresponding to the selected line of interest.

Here, Expression (163) is replaced with Expression (164), using the matrix A" and the column vectors x, y, e". In this case, the total sum E" of the squared errors of the error $e_{bj}$ of Expression (161) and the error $e_{mi}$ of Expression (162) can be expressed with Expression (165), and in order to find the $Q_h$ which causes the total sum E" of the squared errors to be the minimum, the column vector x (the column vector x with the pixel value $Q_h$ as a component thereof) can be expressed with Expression (166), similar to the above-described Expressions (150) and (151).

Accordingly, the normal equation generating unit 15173 computes the matrix $(A"^T A")^{-1} A"^T$, which is a coefficient of the column vector y of the right side of Expression (166), and substitutes the mixed pixel value $P_i$ which is acquired based on the input image supplied from the sensor 2 (FIG. 1) into the column vector y. The matrix $(A"^T A")^{-1} A"^T$ is computed, and Expression (166) into which the mixed pixel value $P_i$ is substituted is supplied from the normal equation generating unit 15173 to the actual world waveform estimating unit 15163.

When the processing such as described above is finished wherein one predetermined line of the processing region 15042 is selected as the line of interest, the normal equation generating unit 15173 selects a line not yet selected as the next line of interest, and similar processing is performed as to the selected next line of interest.

The actual world waveform estimating unit 15163, by computing Expression (166) which is supplied from the normal equation generating unit 15173, finds the column vector x, that is to say, the pixel value $Q_h$ with no movement blurring, and supplies this to the image generating unit 15154 (FIG. 147).

The image generating unit 15154 replaces a portion of the processing region 15042 of the input image with the image of the pixel value $Q_h$ with no movement blurring, which is supplied from the actual world waveform estimating unit 15163, based on the processing region information supplied from the processing region setting unit 15151, and generates this as an output image, and supplies this to the image display unit 15155.

Next, the actual world estimating processing of the actual world estimating unit 15153 in step S15218 in FIG. 148 will be described with reference to the flowchart in FIG. 150.

First, in step S15251, the model generating unit 15161 acquires the processing region width l and the number of lines k, based on the processing region information supplied from the processing region setting unit 15151, and the flow proceeds to step S15252.

In step S15252, the model generating unit 15161 acquires k movement amounts v, k being equivalent to the number of lines in the processing region 15042, from the continuity setting unit 15152, and the flow proceeds to step S15253.

In step S15253, the model generating unit 15161 generates an equation for the mixed pixel value $P_i$ for each line, and the flow proceeds to step S15254. In other words, the model generating unit 15161 generates k number of model equations (Expression (141)).

In step S15254, the constraint condition setting unit 15171 selects the constraint condition expression corresponding to the constraint condition information supplied from the user I/F 15156, from the constraint condition expressions existing within the constraint condition setting unit itself. Also, the constraint condition setting unit 15171 acquires the processing region width l from the processing region information of the input image which is supplied from the equation generating unit 15162 from the processing region setting unit 15151, and generates an constraint condition Expression (Expression (145)) corresponding to the constraint condition information from the user I/F 15156, which comprises the number of equations corresponding to the processing region width l, and the flow proceeds to step S15255.

In step S15255, the weighting changing unit 15172 sets the weighting of each expression of the mixed pixel value $P_i$ which is supplied from the model generating unit 15161 (the model equation) and the constraint condition expression which is supplied from the constraint condition setting unit 15171, by supplying the weighting $W_{bj}$ and the weighting $W_{mi}$ which are supplied from the user I/F 15156 to the normal equation generating unit 15173, and the flow proceeds to step S15256.

In step S15256, the normal equation generating unit 15173 selects one predetermined line from the processing region 15042 as the line of interest, and the flow proceeds to step S15257. In step S15257, the normal equation generating unit 15173 generates a normal equation expressed by Expression (163) (Expression (164)) from the constraint condition Expression (161) wherein the weighting $W_{bj}$ is changed by the weighting changing unit 15172 as to step S15255, in Expression (145) supplied from the constraint condition setting unit 15171 and Expression (162) wherein the weighting $W_{mi}$ is changed by the weighting changing unit 15172 in step S12522 as to Expression (146) considering the error $e_{mi}$ of each of the expressions of the mixed pixel value Pi expressed by Expression (141) supplied from the model generating unit 15161, and the flow proceeds to step S15258.

In step S15258, the normal equation generating unit 15173 computes the matrix $(A''^T A'')^{-1} A''^T$, which is a coefficient of the column vector y of the right side of Expression (166), and the flow proceeds to step S15259.

In step S15259, the normal equation generating unit 15173 substitutes the mixed pixel value $P_i$ which is acquired based on the input image supplied from the sensor 2 (FIG. 1) into the column vector y, and the flow proceeds to step S15260.

In step S15260, the actual world waveform estimating unit 15163 computes a normal equation. That is to say, the actual world waveform estimating unit 15163 finds a pixel value $Q_h$ with no movement blurring by computing Expression (166) which is supplied from the normal equation generating unit 15173, and the flow proceeds to step S15261.

In step S15261, determination is made as to whether or not processing is performed to find a pixel value $Q_h$ with no movement blurring as to all lines of the processing region 15042. In the event that it is determined that processing is not performed to find a pixel value $Q_h$ with no movement blurring as to all lines of the processing region 15042, the process is returned to step S15256, and the processing in steps S15256 through S15261 is repeated. That is to say, a line not yet selected of the processing region 15042 is selected as the next line of interest, and processing is performed to find a pixel value $Q_h$ with no movement blurring.

On the other hand, in the event that it is determined that processing is performed to find a pixel value $Q_h$ with no movement blurring as to all lines of the processing region 15042, the actual world estimating processing ends and returns.

Thus, by generating a normal equation (Expression (163)) as to one line which is taken as the line of interest of the processing region 15042, and repeating the processing to find a pixel value $Q_h$ with no movement blurring k number of times, which is the number of lines in the processing region 15042, the pixel value $Q_h$ with no movement blurring can be found across the entire region of the processing region 15042.

Here, in the event that the movement amount v and processing region width l for each line of the processing region 15042 are each the same, and that the weighting $W_{bj}$ and the weighting $W_{mi}$ supplied from the user I/F 15156 to the weighting changing unit 15172 is set (supplied) similarly with each line of the processing region 15042, the matrix A of Expression (163) becomes the same for each line. Accordingly, the matrix $(A''^T A'')^{-1} A''^T$ of Expression (166) becomes the same for each line, and so the processing for computing the matrix $(A''^T A'')^{-1} A''^T$ for each line can be omitted.

Thus, the actual world estimating processing of the actual world estimating unit 15153 in step S15218 in FIG. 148, in the event that the movement amount v and processing region width l for each line of the processing region 15042 are each the same, and that the weighting $W_{bj}$ and the weighting $W_{mi}$ supplied from the user I/F 15156 to the weighting changing unit 15172 is set (supplied) similarly with each line of the processing region 15042, will be described with reference to the flowchart in FIG. 151. Now, with regard to the portions in FIG. 151 which are similar to the flowchart in FIG. 150, the description thereof will be omitted as appropriate.

In FIG. 151, the processing of step S15288 corresponding to step S15256 in FIG. 150 is not positioned between steps S15285 and S15286, but rather between steps S15287 and S15289. Further, in step S15291, in the event that it is determined that the processing for finding the pixel value $Q_h$ without movement blurring is not performed as to all of the lines in the processing region 15042, the processing returns the flow to step S15288.

In other words, in the event that the movement amount v and processing region width l for each line of the processing region 15042 are each the same, and that the weighting $W_{bj}$ and the weighting $W_{mi}$ supplied from the user I/F 15156 to the weighting changing unit 15172 is set (supplied) similarly with each line of the processing region 15042, the normal equation generated in step S15286 becomes the same for each line, and therefore, after computing the matrix $(A''^T A'')^{-1} A''^T$ as to the first line of interest in step S15287, computing the matrix $(A''^T A'')^{-1} A''^T$ (the processing in step S15287) as to the line of interest hereafter is not necessary. Accordingly, the selection of the line of interest (step S15288), the substitution of the mixed pixel value $P_i$ (the processing in step S15289), and the computing of the normal equation (the processing in step S15290) need only be executed in order, as to the lines in the processing region 15042 which have not yet been selected.

Thus, with the embodiment illustrated in FIG. 147, a normal equation is generated from the equation of the mixed pixel value $P_i$ wherein the pixel value with movement blurring occurring is modeled with a pixel value with no movement blurring, and the constraint condition expression using the relation between the adjacent pixels of the pixel values with no movement blurring, and by computing this normal equation, a pixel value with no movement blurring can be found, and thus an image with good image quality can be generated.

Also, the weighting for each of the mixed pixel value $P_i$ equation and constraint condition expression is supplied to the signal processing device 4 and set as desired values by the user operating the user I/F 15156, and therefore, an image of high image quality according to the preference of the user can be generated.

In the above-described example, the information showing which constraint condition the user selected (specified) from the several constraint conditions previously set inside the constraint condition setting unit 15171 is used as the constraint condition information supplied from the user I/F 15156 to the constraint condition setting unit 15171, but the user may also directly input the constraint condition expression by operating the user I/F 15156.

Also, in addition to the above-described embodiment, with the constraint condition setting unit 15171, the predetermined constraint conditions are determined (fixed), the user can operate the user I/F 15156 to select the constraint conditions, or use an embodiment wherein directly inputting the constraint condition expression is not necessary.

Now, with the continuity setting unit 15012 in FIG. 113 (similar with other continuity setting units), the movement as the continuity information can be set based on the user operation, but also can be set by detecting the movement from the input image.

The detecting method of the movement with the continuity setting unit 15012 in FIG. 113 will be described.

In the event that a certain object is moving in an input image, as for a method for detecting movement vector serving as the movement of the object for example, the so-called block matching method has been known.

However, with the block matching method, matching is performed between the frame of interest and the frames before and after the frame of interest, so that movements cannot be detected easily with the frame of interest alone.

To this end, the continuity setting unit 15012 is configured so as to detect movements from an input image having one frame alone.

FIG. 152 illustrates a configuration example of the continuity setting unit 15012 in FIG. 113.

With the continuity setting unit 15012 of which the configuration is shown in FIG. 152, the movement direction of an object in the processing region of the an input image is detected, and the input image is corrected such that the movement direction becomes the horizontal direction. Subsequently, the features subjected to the one-dimensional differentiation in the movement direction of the object in the input image, which are the differential value of the pixel values of pixels adjacent in the movement direction, are detected.

Further, the correlation is detected between the features of the pixel of interest and the features of the corresponding pixel with a predetermined distance in the movement direction, and the movement amount of the object is detected according to the distance between the corresponding pixel and the pixel of interest, which exhibits the maximum detected correlation.

The continuity setting unit 15012 of which the configuration is shown in FIG. 152 includes a movement direction detecting unit 11201, a movement direction correcting unit 11202, a features detecting unit 11203, and a movement amount detecting unit 11204.

Further, the movement direction detecting unit 11201 includes an activity computing unit 11211, and an activity evaluating unit 11212. The movement direction correcting unit 11202 includes an affine transformation unit 11213.

The features detecting unit 11203 includes a difference computing unit 11214, a difference evaluating unit 11215, an intermediate image creating unit 11216, an intermediate image creating unit 11217, frame memory 11218, a sign inverting unit 11219, and frame memory 11220.

Further, the movement amount detecting unit 11204 includes a correlation detecting unit 11221, and a correlation evaluating unit 11222.

With the continuity setting unit 15012 wherein the configuration is illustrated is FIG. 152, the input image is supplied to the movement direction detecting unit 11201 and the movement direction correcting unit 11202. Further, the processing region information that is output from the processing region setting unit 15011 in FIG. 113 is also supplied to the movement direction detecting unit 11201 and the movement direction correcting unit 11202.

The movement direction detecting unit 11201 acquires the input image and the processing region information, and detects the movement direction in the processing region from the acquired input image.

When capturing a moving object, movement blurring occurs on the image of the object. This is caused by actions of the image sensor of a camera or video camera serving as the sensor 2 for capturing the image of an object.

That is to say, an image sensor such as a CCD (Charge Coupled Device) or CMOS (Complementary Metal-Oxide Semiconductor) sensor consecutively converts the incident light into electric charge for each pixel during exposure time (shutter time), and further converts the electric charge into one pixel value. When an object to be captured is in a stationary state, the image (light) of the same portion of the object is converted into one pixel value during exposure time. The image thus captured includes no movement blurring.

On the other hand, when an object is moving, the image of the portion of the object to be cast into one pixel changes during exposure time, and the images of different portions of the object are converted into one pixel value by accident. Speaking inversely, the image of one portion of the object is cast into multiple pixel values, which is movement blurring.

Movement blurring occurs in the movement direction of the object.

Upon focusing on the pixel values of pixels arrayed in the movement direction of the portion where movement blurring occurs (region including movement blurring), the image of generally the same range portion of the object is projected to the pixel values of the pixels arrayed in the movement direction. Accordingly, we can say that change in the pixel values of the pixels arrayed in the movement direction at the portion where movement blurring occurs is further reduced.

The movement direction detecting unit 11201 detects a movement direction based on such change, i.e., activity in the pixel value of a pixel in the processing region of an input image.

More specifically, the activity computing unit 11211 of the movement direction detecting unit 11201 computes change (activity) in the pixel values of pixels arrayed in various directions for each predetermined direction. For example, the activity computing unit 11211 computes the difference between the pixel values of the pixels positioned corresponding to each direction for each predetermine direction as activity. The activity computing unit 11211 supplies information indicating change in the computed pixel values to the activity evaluating unit 11212.

The activity evaluating unit 11212 selects the minimum change in the pixel value, of change in the pixel values of the pixels for each predetermined direction supplied from the activity computing unit 11211, and takes the direction corresponding to the selected change in the pixel value as the movement direction.

The movement direction detecting unit 11201 supplies movement direction information indicating the movement direction thus detected to the movement direction correcting unit 11202.

The movement direction correcting unit 11202 is supplied with processing region information as well. The movement direction correcting unit 11202 converts the image data within the processing region in the input image based on the movement direction information supplied from the movement direction detecting unit 11201 such that the movement direction becomes the horizontal direction of the image.

For example, the affine transformation unit 11213 of the movement direction correcting unit 11202 subjects the image data within the processing region in the input image to affine transformation based on the movement direction information supplied from the movement direction detecting unit 11201 such that the movement direction shown in the movement direction information becomes the horizontal direction of the image.

The movement direction correcting unit 11202 supplies the image data within the processing region in the input image converted such that the movement direction becomes the horizontal direction of the image to the features detecting unit 11203.

Now, with the input image, the hypothesis is that the object is moving in the horizontal direction (from the left to the right direction), and therefore the continuity setting unit 15012 can be configured without providing the movement direction detecting unit 11201 and the movement direction correcting unit 11202.

The features detecting unit 11203 detects the features of the image supplied from the movement direction correcting unit 11202.

That is to say, the difference computing unit 11214 of the features detecting unit 11203 sets a pixel selected by selecting one pixel from the pixels in the processing region of the input image, as a pixel of interest. Subsequently, the difference computing unit 11214 of the features detecting unit 11203 obtains a difference value by subtracting the pixel value of the pixel adjacent to the pixel of interest on the right side from the pixel value of the pixel of interest.

The difference computing unit 11214 obtains difference values by taking the pixels in the processing region of the input image as a pixel of interest in order. That is to say, the difference computing unit 11214 obtains difference values regarding all of the pixels in the processing region of the input image. The difference computing unit 11214 supplies the difference values thus computed to the difference evaluating unit 11215 along with information indicating the position of the pixel of interest corresponding to each obtained difference value (positional information indicating the position on the screen of each difference value).

The difference evaluating unit 11215 determines regarding whether or not the difference values are 0 or more, supplies the difference values equal to or greater than 0 to the intermediate image creating unit 11216 along with the positional information indicating the position on the screen of each difference value, and supplies the difference values less than 0 to the intermediate image creating unit 11217 along with the positional information indicating the position on the screen of each difference value.

The intermediate image creating unit 11216 creates, based on the difference values equal to or greater than 0 supplied from the difference evaluating unit 11215 along with the positional information indicating the position on the screen of the difference values, an intermediate image made up of each difference value. That is to say, the intermediate image creating unit 11216 creates an intermediate image by setting the difference values equal to or greater than 0 supplied from the difference evaluating unit 11215 to the pixels at the positions on the screen indicated by the positional information, and setting 0 to the pixels at the positions where no difference value is supplied from the difference evaluating unit 11215. The intermediate image creating unit 11216 supplies the intermediate image thus created (hereafter, referred to as non-inverted intermediate image) to the frame memory 11218.

The intermediate image creating unit 11217 creates, based on the difference values less than 0 (negative values) supplied from the difference evaluating unit 11215 along with the positional information indicating the positions on the screen of the difference values, an intermediate image made up of the difference values. That is to say, the intermediate image creating unit 11217 creates an intermediate image by setting the difference values less than 0 supplied from the difference evaluating unit 11215 to the pixels at the positions on the screen indicated by the positional information, and setting 0 to the pixels at the positions where no difference value is supplied from the difference evaluating unit 11215. The intermediate image creating unit 11216 supplies the intermediate image thus created to the sign inverting unit 11219.

The sign inverting unit 11219 inverts the signs of the difference values less than 0 set to the pixels of the intermediate image supplied from the intermediate image creating unit 11217. The signs of the value 0 set to the pixels of the intermediate image are not inverted. That is to say, the sign inverting unit 11219 selects the difference values less than 0 set to the pixels of the intermediate image supplied from the intermediate image creating unit 11217, and converts the selected difference values less than 0 into the values greater than 0 having the same absolute values as the difference values. For example, the difference value, which is −15, is converted into 15 by inverting the sign thereof. The sign inverting unit 11219 supplies the intermediate image thus sign-inverted (hereafter referred to as inverted intermediate image) to the frame memory 11220.

The frame memory 11218 supplies the non-inverted intermediate image made up of the difference values equal to or greater than 0 and 0 to the movement amount detecting unit 11204 as features. The frame memory 11220 supplies the inverted intermediate image made up of the difference values greater than 0 of which the signs are inverted and 0 to the movement amount detecting unit 11204 as features.

The movement detecting unit 11204 detects movements based on the features supplied from the features detecting unit 11203. That is to say, the movement detecting unit 11204 detects the correlation between the features of at least the pixel of interest, of the pixels of the image of the object in the processing region of the input image, and the features of the corresponding pixel allocated in the movement direction as to the pixel of interest, and detects the movement amount of the image of the object in the processing region of the input image according to the detected correlation.

The correlation detecting unit 11221 of the movement amount detecting unit 11204 detects the correlation between the non-inverted intermediate image serving as features supplied from the frame memory 11218 of the features detecting unit 11203, and the inverted intermediate image serving as features supplied from the frame memory 11220 of the features detecting unit 11203. The correlation detecting unit 11221 supplies the detected correlation to the correlation evaluating unit 11222.

More specifically describing, for example, the correlation detecting unit 11221 of the movement amount detecting unit 11204 moves (shifts) the inverted intermediate image made up of the difference values of which the signs are inverted so as to be greater than 0, and 0 supplied from the frame memory 11220 of the features detecting unit 11203, in the horizontal direction of the screen in units of pixel as to the non-inverted intermediate image made up of the difference values equal to or greater than 0, and 0 supplied from the frame memory 11218 of the features detecting unit 11203. That is to say, the correlation detecting unit 11221 moves the positions on the screen of the pixels making up the inverted intermediate image in the horizontal direction.

The positional relation on the screen between the pixels of the non-inverted intermediate image and the pixels of the inverted intermediate image changes by moving (the pixels of) the inverted intermediate image in the horizontal direction on the screen. For example, the corresponding pixel of the inverted intermediate image positioned on the screen corresponding to the pixel of interest of the non-inverted intermediate image before movement results in departing from the position corresponding to the pixel of interest of the non-inverted intermediate image by the movement distance after movement. More specifically, when the non-inverted intermediate image is moved to the right by 20 pixels, the corresponding pixel of the inverted intermediate image departs from the position corresponding to the pixel of interest of the non-inverted intermediate image to the right by 20 pixels. Speaking inversely, the corresponding pixel of the inverted intermediate image positioned on the screen corresponding to the pixel of interest of the non-inverted intermediate image after movement departs from the position corresponding to the pixel of interest by the movement distance before movement.

The correlation detecting unit 11221 computes the difference between the pixel values of the pixels corresponding to the non-inverted intermediate image and the inverted intermediate image moved, and takes the sum of the differential absolute values as a correlation value.

For example, the correlation detecting unit 11221 moves (shifts) the inverted intermediate image in the horizontal direction of the screen in increments of one pixel in a range of 70 pixels in the left direction of the screen through 70 pixels in the right direction of the screen as to the non-inverted intermediate image, computes the difference between the pixel values of the pixels to be positioned at the same position on the screen regarding the non-inverted intermediate image and the inverted intermediate image moved for each moved position (each movement distance), and takes the sum of the differential absolute values as a correlation value.

For example, when the inverted intermediate image is moved to the left direction of the screen as to the non-inverted intermediate image, the movement distance is represented with a negative (minus). When the inverted intermediate image is moved to the right direction of the screen as to the non-inverted intermediate image, the movement distance is represented with a positive (plus). The correlation detecting unit 11221 computes the difference between the pixel values of the pixels to be positioned at the same position on the screen regarding the non-inverted intermediate image and the inverted intermediate image moved for each movement distance of −70 pixels through +70 pixels, and takes the sum of the differential absolute values as a correlation value.

The correlation detecting unit 11221 supplies the correlation value corresponding to the movement distance to the correlation evaluating unit 11222. That is to say, the correlation detecting unit 11221 supplies a pair of the movement distance and the correlation value to the correlation evaluating unit 11222.

The correlation evaluating unit 11222 detects the movement amount of the image of the object in the processing region of the input image according to the correlation. More specifically, the correlation evaluating unit 11222 takes, of the correlations supplied from the correlation detecting unit 11221, the movement distance corresponding to the maximum (strongest) correlation as a movement amount.

For example, the correlation evaluating unit 11222 selects the minimum value, of the sum of the differential absolute values serving as the correlation value supplied from the correlation detecting unit 11221, and sets the movement distance corresponding to the selected minimum value to the movement amount.

The correlation evaluating unit 11222 outputs the detected movement amount.

FIG. 153 through FIG. 155 are diagrams for describing the principle for detecting movements by the continuity setting unit 15012 in FIG. 152.

Now, let us say that a white foreground object serving as an object to be captured is disposed in front of a black background object serving as another object to be captured, and is moving from the left side to the right side, and a camera having an image sensor such as a CCD or CMOS sensor captures the foreground object along with the background object with a predetermined exposure time (shutter time).

In this case, upon focusing on one frame of the image to be output from the camera, the background object is black, so that the camera outputs, for example, a pixel value 0 as to the background object image. The foreground object is white, so that the camera outputs, for example, a pixel value 255 as to the foreground object image. Note that here, let us say that the camera outputs a pixel value in a range of 0 through $2^8-1$.

The diagram in the upper side of FIG. 153 is a diagram illustrating the pixel values of the image to be output by the camera when the foreground object is in a stationary state at the position at the moment that the shutter of the camera opens (moment of starting exposure).

The diagram in the lower side of FIG. 153 is a diagram illustrating the pixel values of the image to be output by the camera when the foreground object is in a stationary state at the position at the moment that the shutter of the camera closes (moment of ending exposure).

As shown in FIG. 153, the movement amount of the image of the foreground object is a distance wherein the image of the foreground object moves from the moment that the shutter of the camera opens until the moment that the shutter of the camera closes.

FIG. 154 is a diagram illustrating the pixel values of the image to be output from the camera when the foreground object moving in front of the background object is captured by the camera. The image sensor of the camera consecutively converts the image (light) of the object into electric charge during exposure time (shutter time) for each pixel, and further converts the electric charge into one pixel value, and accordingly, the image of the foreground object 11251 is projected into the pixel values of the multiple pixels. The maximum pixel value of the image shown in FIG. 154 is small as compared with the maximum pixel value of the image shown in FIG. 153.

The slope width of the pixel values shown in FIG. 154 corresponds to the width of the image of the background object.

Upon the difference value as to the adjacent pixel on the right side being computed, and set to the pixel regarding each pixel of the image shown in FIG. 154, the image made up of the difference values shown in FIG. 155 is obtained.

That is to say, one pixel is selected from the pixels of the image shown in FIG. 154, and set to as a pixel of interest to which attention is paid. Subsequently, the difference value is obtained by subtracting the pixel value of the pixel adjacent to the pixel of interest on the right side from the pixel value of the pixel of interest. The difference value is set to the pixel at the position corresponding to the pixel of interest. The pixels of the image shown in FIG. 154 are taken as a pixel of interest in order, and the image made up of the difference values shown in FIG. 155 is obtained.

The difference value having a negative (minus) sign emerges on the one-pixel left side as to the position of the foreground object at the moment that the shutter of the camera opens shown in the diagram on the upper side of FIG. 153, and the difference value having a positive (plus) sign emerges on the one-pixel left side as to the position of the foreground object at the moment that the shutter of the camera closes shown in the diagram on the lower side of FIG. 153.

Accordingly, upon matching being performed between a value obtained by inverting the sign of the difference value having a negative (minus) sign and the difference value having a positive (plus) sign shown in FIG. 155, the movement distance of the value obtained by inverting the sign of the difference value having a negative (minus) sign is the same as the movement amount on the basis of the difference value having a positive (plus) sign when performing matching, for example.

For example, on the basis of the difference value having a positive (plus) sign, the value obtained by inverting the sign of the difference value having a negative (minus) sign is moved in the horizontal direction, the correlation between the value obtained by inverting the negative difference value and the positive difference value is detected for each movement distance thereof, thereby detecting the maximum (strongest) correlation. The movement distance when the maximum correlation is detected is the same as the movement amount.

More specifically, for example, on the basis of the difference value having a positive (plus) sign, the value obtained by inverting the sign of the difference value having a negative (minus) sign is moved in the horizontal direction, as the correlation between the value obtained by inverting the negative difference value and the positive difference value for each movement distance thereof, the positive difference value is subtracted from the inverted value for each pixel. Subsequently, the minimum value within the subtracted results, i.e., the maximum correlation is detected. The movement distance corresponding to the detected maximum correlation is the same as the movement amount.

As described above, the movement amount, which is the amount wherein the image of the object moves, can be detected from one frame of the image during exposure time (shutter time).

That is to say, the difference computing unit 11214 of the features detecting unit 11203 selects one pixel from pixels in the processing region of the input image, sets this as a pixel of interest, and subtracts the pixel value of the pixel adjacent to the pixel of interest on the right side from the pixel value of the pixel of interest, thereby computing the difference values shown in FIG. 155, for example. The difference evaluating unit 11215 classifies the difference values into the positive difference values and the negative difference values based on the signs of the difference values.

The intermediate image creating unit 11216 creates, from the classified positive difference values, a non-inverted intermediate image made up of the positive difference values thereof. The intermediate image creating unit 11217 creates, from the classified negative difference values, an intermediate image made up of the negative difference values thereof. The sign inverting unit 11219 creates a non-inverted intermediate image by inverting the signs of the negative pixel values of the intermediate image made up of the negative difference values.

The movement amount detecting unit 11204 obtains the movement distance of the non-inverted intermediate image and the inverted intermediate image, which have the strongest correlation, and takes the obtained movement distance as the movement amount.

When the features detecting unit 11203 detects the image of the moving object, and detects the features of the image of the moving object, the movement amount detecting unit 11204 detects a correlation based on the features, and detects the movement amount of the image of the object within the input image according to the detected correlation.

Also, when the features amount detecting unit 11203 selects the pixel of interest to which attention is paid from the pixels belonged to the image of the moving object, and detects the features of the pixel of interest, the movement amount detecting unit 11204 detects the correlation between the features of the pixel of interest and the features of the corresponding pixel to be allocated in the movement direction as to the pixel of interest, and detects the movement amount of the image of the object in the processing region of the input image according to the detected correlation.

FIG. 156 is a flowchart for describing the processing for detecting a movement amount by the continuity setting unit 15012 in FIG. 152.

In step S11201, the movement direction detecting unit 11201 and the movement direction correcting unit 11202 acquire the input image and the processing region information, and the flow proceeds to step S11202.

In step S11202, the activity computing unit 11211 of the movement direction detecting unit 112011 computes activity regarding the pixels of the processing region in the input image acquired in the processing in step S11201, and the flow proceeds to step S11203.

For example, the activity computing unit 11211 selects the pixel of interest to which attention is paid, of the pixels of the processing region in the input image. The activity computing unit 11211 extracts a predetermined number of perimeter pixels in the vicinity of the pixel of interest. For example, the activity computing unit 11211 extracts perimeter pixels made up of 5×5 pixels (5 pixels by 5 pixels) centered on the pixel of interest.

Subsequently, the activity computing unit 11211 detects activity corresponding to the predetermined direction on the image from the extracted perimeter pixels.

With the following description, a pixel array in the horizontal direction is referred to as a row, and a pixel array in the vertical direction is referred to as a column.

Regarding 5×5 perimeter pixels for example, the activity computing unit 11211 detects activity as to the angle of 90 degrees (vertical direction of the screen) on the basis of the horizontal direction of the screen by computing the differences between the pixel values of the adjacent pixels in the up-and-down (vertical) direction on the screen, dividing the sum of the differential absolute values computed by the number of differences, and taking the result as activity.

For example, the difference of pixel values is computed regarding the two pixels adjacent in the up-to-down direction on the screen of 20 pairs, the sum of the differential absolute values computed is divided by 20, and the result (quotient) is set to the activity as to the angle of 90 degrees.

Regarding 5×5 perimeter pixels for example, the activity computing unit 11211 detects activity as to the angle of 76 degrees ($\tan^{-1}(4/1)$) on the basis of the horizontal direction of the screen by computing the differences between the respective pixel values of the leftmost pixel through the fourth pixel from the left in the lowest row, and the respective pixel values of the pixels on the four-pixel upper side and also on one-pixel right side as to the respective pixels, dividing the sum of the differential absolute values computed by the number of differences, and taking the result as activity.

For example, the difference of pixel values is computed regarding the two pixels in the upper right direction having a distance of four pixels in the vertical direction, and one pixel in the horizontal direction of four pairs, the sum of the differential absolute values computed is divided by four, and the result (quotient) is set to the activity as to the angle of 76 degrees.

The activity computing unit 11211 detects activity as to the angle in a range of 90 degrees through 180 degrees on the basis of the horizontal direction of the screen with the same processing. In the event of detecting activity as to the angle in a range of 90 degrees through 180 degrees, activity is calculated based on the difference of the pixel values of the pixels positioned in the upper left direction.

The activity thus detected is taken as the activity as to the pixel of interest.

Note that the detected activity may be the activity as to the perimeter pixels.

Also, description has been made that the perimeter pixels are made up of 5×5 pixels (5 pixels by 5 pixels), but pixels having a desired range may be employed regardless of 5×5 pixels. In the event of employing a great number of perimeter pixels, angular resolution improves.

The activity computing unit 11211 supplies information indicating activity corresponding to multiple directions to the activity evaluating unit 11212.

Returning to FIG. 156, in step S11203, the activity evaluating unit 11212 obtains the movement direction by selecting the minimum activity based on the activity corresponding to a predetermined direction calculated in the processing in step S11202, and taking the selected direction as the movement direction, and the flow proceeds to step S11204.

In step S11204, the movement direction correcting unit 11202 converts the image data in the processing region of the input image based on the movement direction obtained in the processing in step S11203 such that the movement direction becomes the horizontal direction of the image, and the flow proceeds to step S11205. For example, in step S11204, the affine transformation unit 11213 of the movement direction correcting unit 11202 subjects the image data in the processing region of the input image to affine transformation based on the movement direction obtained in the processing in step S11203 such that the movement direction becomes the horizontal direction of the image. More specifically, for example, the affine transformation unit 11213 subjects the image data in the processing region of the input image to affine transformation so as to rotate 18degrees in the clockwise direction on the basis of the horizontal direction of the screen when the movement direction is the angle of 18 degrees.

In step S11205, the difference computing unit 11214 of the features detecting unit 11203 computes the difference value of the pixel value as to the pixel adjacent in the horizontal direction regarding each pixel in the processing region of the input image converted such that the movement direction becomes the horizontal direction of the screen in the processing in step S11204, and the flow proceeds to step S11206.

For example, in step S11205, the difference computing unit 11214 sets a pixel of interest to which attention is paid by selecting one pixel from the pixels in the processing region of the input image. Subsequently, the difference computing unit 11214 obtains the difference value by subtracting the pixel value of the pixel adjacent to the pixel of interest on the right side from the pixel value of the pixel of interest.

In step S11206, the difference evaluating unit 11215 of the features detecting unit 11203 allocates the difference values based on the signs of the difference values, and the flow proceeds to step S11207. That is to say, the difference evaluating unit 11215 supplies the difference values equal to or greater than 0 to the intermediate image creating unit 11216, and supplies the difference values less than 0 to the intermediate image creating unit 11217. In this case, the difference evaluating unit 11215 supplies the difference values to the intermediate image creating unit 11216 or the intermediate image creating unit 11217 along with the positional information indicating the position of each difference value on the screen.

In step S11207, the intermediate image creating unit 11216 of the features detecting unit 11203 creates an intermediate image made up of the positive difference values based on the difference values equal to or greater than 0 (positive difference values) allocated in the processing in step S11206, and the flow proceeds to step S11208. That is to say, in step S11207, the intermediate image creating unit 11216 creates an intermediate image by setting the positive difference values to the pixels at the positions on the screen indicated with the positional information, and setting 0 to the pixels at the positions where no difference value was supplied.

Thus, a non-inverted intermediate image is created in the processing in step S11207. In step S11208, the intermediate image creating unit 11217 of the features detecting unit 11203 creates an intermediate image made up of the negative difference values based on the difference values less than 0 (negative difference values) allocated in the processing in step S11206, and the flow proceeds to step S11209. That is to say, in step S11208, the intermediate image creating unit 11217 creates an intermediate image by setting the negative difference values to the pixels at the positions on the screen indicated with the positional information, and setting 0 to the pixels at the positions where no difference value was supplied.

In step S11209, the sign inverting unit 11219 of the features detecting unit 11203 inverts the signs of the negative difference values of the intermediate image made up of the negative difference values created in the processing in step S11208. That is to say, in step S11209, the negative difference values set to the pixels of the negative intermediate image are converted into the positive values having the same absolute values.

Thus, in step S11209, a non-inverted intermediate image is created, and then the flow proceeds to step S11210.

In step S11210, the movement amount detecting unit 11204 executes correlation detecting processing. The details of the processing in step S11210 will be described later with reference to the flowchart in FIG. 157.

In step S11211, the correlation evaluating unit 11222 selects the strongest correlation, of the correlations detected in the processing in step S11210, and the flow proceeds to step S11212. For example, in step S11211, of the correlation values serving as the sum of the differential absolute values of the pixel values, the minimum correlation value is selected.

In step S11212, the correlation evaluating unit 11222 sets the movement distance corresponding to the strongest correlation selected in the processing in step S11211 to the movement amount, and the flow proceeds to step S11213. For example, in step S11212, of the correlation values serving as the sum of the differential absolute values of the pixel values, the movement distance of the inverted intermediate image stored in the processing in step S11223 described later corresponding to the selected minimum correlation value is set to the movement amount.

In step S11213, the movement amount detecting unit 11204 outputs the movement amount detected in the processing in step S11210, and the processing ends.

FIG. 157 is a flowchart for describing correlation detecting processing corresponding to the processing in step S11210.

In step S11221, the correlation detecting unit 11221 of the movement amount detecting unit 11204 moves the positions of the pixels of the inverted intermediate image created in the processing in step S11209 in the horizontal direction in increments of pixel, and the flow proceeds to step S11222.

In step S11222, the correlation detecting unit 11221 detects the correlation between the non-inverted intermediate image and the inverted intermediate image of which the positions of the pixels are moved in the processing in step S11221, and the flow proceeds to step S11223. For example, in step S11222, the differences are computed between the pixel values of the pixels of the non-inverted intermediate image and the pixel values of the pixels of the inverted intermediate image at the corresponding positions on the screen, and the sum of the computed differential absolute values is detected as a correlation value. The correlation detecting unit 11221 supplies correlation information indicating the detected correlation to the correlation evaluating unit 11222 along with the movement distance of the pixels of the inverted intermediate image in the processing in step S11221.

In step S11223, the correlation evaluating unit 11222 stores the correlation detected in the processing in step S11222 along with the movement distance of the pixels of the inverted intermediate image in the processing in step S11221, and the flow proceeds to step S11224. For example, the correlation evaluating unit 11222 stores the correlation value serving as the sum of the differential absolute values of the pixel values along with the movement distance of the pixels of the inverted intermediate image in the processing in step S11221.

In step S11224, the correlation detecting unit 11221 determines regarding whether or not correlation as to all of the movement distances has been detected, and in the event that determination is made that correlation has not been detected with some movement distances, the flow returns to step S11221, where the processing for detecting correlation as to the next movement distance is repeated.

For example, in step S11224, the correlation detecting unit 11221 determines whether or not all correlations have been detected in a case of moving pixels of the inverted intermediate image in the range of 70 pixels in the left direction in the image through 70 pixels in the right direction in the image.

In the event that determination is made in step S11224 that the correlations for all movements amount have been detected, the processing ends (returns).

Thus, the correlation detecting unit 11221 can detect correlation.

As described above, the continuity setting unit 15012 of which the configuration is shown in FIG. 152 can detect movement amount from one frame in an image.

Now, while movement has been detected here with regard to a processing region, an arrangement may be made wherein movement over the entire screen due to hand shaking, for example, can be detected, by processing the entire screen.

Also, even in the event that there are a great amount of repetitive patterns of the same design in the input image, these can be detected in an accurate manner so long as the movement distance and movement direction of the processing region in the input image to be processed is constant.

While movement amount detection from one frame in an image has been described above, it is needless to say that an arrangement may be made wherein movement amount is detected from one field.

Also, an arrangement may be made wherein the movement amount is detected regarding only the perimeter of the selected pixel of interest.

The above-described embodiments include, besides embodiments of the invention described in the Claims, embodiments regarding the first and second signal processing devices given below.

A first signal processing device comprises: processing region setting means for setting the processing region within data, wherein light signals of the real world have been projected on a plurality of pixels each having time integration effects and a part of the continuity of the real world light signals has been lost; movement vector setting means for setting movement vectors of an object within the image data corresponding to the continuity of the real world light signals of which a part of the continuity has been lost in the image data; model generating means for modeling the region between pixel values of each of the pixels within the processing region and pixel values of each of the pixels where there is no movement blurring, with the understanding that the pixel values of each of the pixels within the processing region are values obtained by pixel values of each of the pixels without movement blurring as to the object being integrated while moving corresponding to a movement vector; normal equation generating means for generating normal equations from a first equation wherein the pixel values of the pixels within the processing region have been substituted into a model generated by the model generating means, and a second equation for constraining the relation between the pixels where there is no movement blurring; activity detecting means for detecting the activity corresponding to each of the pixels within the processing region; weight changing means for changing the weighting as to a part of the first and second equations according to the detection results by the activity detecting means; and actual world estimating means for estimating the pixel values of each of the pixels where there is no movement blurring, by computing the normal equations generated by the normal equation generating means and of which the weighting has been changed by the weight changing means.

With the second signal processing device, in addition to the features of the first signal processing device, the weighting changing means change the weighting as to a portion of the first and second equations, corresponding to the pixel of interest, to zero, when the activity corresponding to the pixel of interest within the processing region of the image data is greater than the predetermined threshold value.

The above-described embodiments also include embodiments regarding signal processing methods, programs, and recording mediums, given below.

A signal processing method, program, and recording medium, comprise: a processing region setting step for setting the processing region within data, wherein light signals of the real world have been projected on a plurality of pixels each having time integration effects and a part of the continuity of the real world light signals has been lost; a movement vector setting step for setting movement vectors of an object within the image data corresponding to the continuity of the real world light signals of which a part of the continuity has been lost in the image data; a model generating step for modeling the region between pixel values of each of the pixels within the processing region and pixel values of each of the pixels where there is no movement blurring, with the understanding that the pixel values of each of the pixels within the processing region are values obtained by pixel values of each of the pixels without movement blurring as to the object being integrated while moving corresponding to a movement vector; a normal equation generating step for generating normal equations from a first equation wherein the pixel values of the pixels within the processing region have been substituted into a model generated in the model generating step, and a second equation for constraining the relation between the pixels where there is no movement blurring; an activity detecting step for detecting the activity corresponding to each of the pixels within the processing region; a weight changing step for changing the weighting as to a part of the first and second equations according to the detection results in the activity detecting step; and an actual world estimating step for estimating the pixel values of each of the pixels where there is no movement blurring, by computing the normal equations generated by the normal equation generating step and of which the weighting has been changed in the weight changing step.

INDUSTRIAL APPLICABILITY

As described above, according to the present invention, images and the like closer approximating real world signals can be obtained.

The invention claimed is:

1. A signal processing device comprising:
a processing region setting unit configured to set a processing region within image data wherein a light signal of a real world is projected on a plurality of pixels, each having a time integration effect, and a portion of a continuity of the light signal of the real world is lost;
a movement vector setting unit configured to set movement vectors for an object within said image data corresponding to the continuity of the light signal of the real world, wherein a portion of the continuity thereof of said image data is lost;
a model generator configured to model a relation between a pixel value of each of the pixels within said processing region and a pixel value of each of the pixels without movement blurring occurring, assuming that the pixel values of each of the pixels within said processing region is a value wherein the pixel value of each of the pixels without said movement blurring occurring which correspond to said object is integrated while shifting corresponding to said movement vectors;
a normal equation generator configured to generate a normal equation using a first equation wherein the pixel value of each of the pixels within said processing region is substituted into a model generated by said model generator, and a second equation which constrains the relation between each of the pixels without said movement blurring occurring;
an activity detector configured to detect activities corresponding to each of the pixels within said processing region;
a weighting change unit configured to change a weighting of a portion of said first or said second equation, according to detection results of said activity detector, said weighting change unit configured to change the weighting of a portion of said first and second equations as to a pixel of interest to zero when activity corresponding to a pixel of interest within said processing region of said image data is at or above a predetermined threshold; and
a real world estimating unit configured to estimate the pixel value for each pixel wherein said movement blurring is not occurring, by computing said normal equation which is generated by said normal equation generator, and wherein the weighting thereof is changed by said weighting change unit.

2. A signal processing method comprising:
using a processor to perform the following;
setting a processing region within image data wherein a light signal of a real world is projected on a plurality of pixels, each having a time integration effect, and a portion of a continuity of the light signal of the real world is lost;
setting movement vectors for an object within said image data corresponding to the continuity of the light signal of the real world, wherein a portion of the continuity of said image data is lost;
generating a model of a relation between a pixel value of each of the pixels within said processing region and a pixel value of each of the pixels without said movement blurring occurring, assuming that the pixel value of each of the pixels within said processing region is a value wherein the pixel value of each of the pixels without said movement blurring occurring which correspond to said object is integrated while shifting corresponding to said movement vectors;
generating a normal equation using a first equation wherein the pixel value of each of the pixels within said processing region is substituted into the model generated by said generating a model, and a second equation which constrains the relation between each of the pixels without said movement blurring occurring;
detecting activities corresponding to each of the pixels within said processing region;
changing a weighting of a portion of said first or said second equation, according to detection results from said detecting, said changing including changing the weighting of a portion of said first and second equations as to a pixel of interest to zero when activity corresponding to a pixel of interest within said processing region of said image data is at or above a predetermined threshold; and
estimating a pixel value of each pixel wherein said movement blurring is not occurring, by computing said normal equation which is generated by said generating a normal equation, and wherein the weighting thereof is changed by said changing.

3. A computer-readable recording medium including computer executable instructions, wherein the instructions, when executed by a computer, cause the computer to perform a method comprising:
setting a processing region within image data wherein a light signal of a real world is projected on a plurality of pixels, each having a time integration effect, and a portion of a continuity of the light signal of the real world is lost;
setting movement vectors for an object within said image data corresponding to the continuity of the light signal of the real world, wherein a portion of the continuity of said image data is lost;
generating a model of a relation between a pixel value of each of the pixels within said processing region and a pixel value of each of the pixels without movement blurring occurring, assuming that the pixel value of each of the pixels within said processing region is a value wherein the pixel value of each of the pixels without said movement blurring occurring which correspond to said object is integrated while shifting corresponding to said movement vectors;
generating a normal equation using a first equation wherein the pixel value of each of the pixels within said processing region is substituted into the model generated by the generating a model, and a second equation which constrains the relation between each of the pixels without said movement blurring occurring;
detecting activities corresponding to each of the pixels within said processing region;
changing a weighting of a portion of said first or said second equation, according to detection results from said activity detecting, said changing including changing the weighting of a portion of said first and second equations as to a pixel of interest to zero when activity corresponding to a pixel of interest within said processing region of said image data is at or above a predetermined threshold; and
estimating a pixel value of each pixel wherein said movement blurring is not occurring, by computing said normal equation which is generated by said generating a normal equation, and wherein the weighting thereof is changed in said changing.

* * * * *